US012658484B2

(12) United States Patent
Chen et al.

(10) Patent No.: US 12,658,484 B2
(45) Date of Patent: **\*Jun. 16, 2026**

(54) SYSTEMS AND METHODS FOR MINIMIZING AND PREVENTING DENDRITE FORMATION IN ELECTROCHEMICAL CELLS

(71) Applicant: 24M Technologies, Inc., Cambridge, MA (US)

(72) Inventors: Junzheng Chen, Concord, MA (US); Naoki Ota, Lexington, MA (US); Chad Alan Hartzog, Columbus, IN (US); Xiaoming Liu, Newton, MA (US); Michelle Robyn Brouwer, Woburn, MA (US); Anthony D'Angelo, Medford, MA (US); Daniel Salazar, Brookline, MA (US); Timothy Allen Hans, Perry, FL (US); Junhua Song, Sudbury, MA (US)

(73) Assignee: 24M Technologies, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 19/391,887

(22) Filed: Nov. 17, 2025

(65) Prior Publication Data

US 2026/0074302 A1 Mar. 12, 2026

Related U.S. Application Data

(63) Continuation of application No. 19/197,732, filed on May 2, 2025, now Pat. No. 12,500,278, which is a
(Continued)

(51) Int. Cl.
H01M 10/42 (2006.01)
H01M 4/131 (2010.01)
(Continued)

(52) U.S. Cl.
CPC ....... H01M 10/4235 (2013.01); H01M 4/131 (2013.01); H01M 4/133 (2013.01);
(Continued)

(58) Field of Classification Search
None
See application file for complete search history.

(56) References Cited

U.S. PATENT DOCUMENTS

| | | | |
|---|---|---|---|
| 3,625,771 A | 12/1971 | Arrance et al. | |
| 3,647,554 A | 3/1972 | Arrance et al. | |

(Continued)

FOREIGN PATENT DOCUMENTS

| | | |
|---|---|---|
| CA | 2605874 A1 | 1/2007 |
| CA | 2886154 A1 | 4/2014 |

(Continued)

OTHER PUBLICATIONS

Gomez-Martin et al., "Opportunities and Challenges of Li2C4O4 as Pre-Lithiation Additive for the Positive Electrode in NMC622||Silicon/ Graphite Lithium Ion Cells," Advanced Science, Aug. 2022, 9(24):2201742, 15 pages.

(Continued)

*Primary Examiner* — Scott J. Chmielecki
(74) *Attorney, Agent, or Firm* — Cooley LLP

(57) ABSTRACT

Embodiments described herein relate to electrochemical cells with dendrite prevention mechanisms. In some aspects, an electrochemical cell can include an anode disposed on an anode current collector, a cathode disposed on a cathode current collector, the cathode having a first thickness at a proximal end of the cathode and a second thickness at a distal end of the cathode, the second thickness greater than the first thickness, a first separator disposed on the anode, a second separator disposed on the cathode, an interlayer disposed between the first separator and the second separa-
(Continued)

tor, the interlayer including electroactive material and having a proximal end and a distal end, and a power source electrically connected to the proximal end of the cathode and the proximal end of the interlayer, the power source configured to maintain a voltage difference between the cathode and the interlayer below a threshold value.

30 Claims, 126 Drawing Sheets

Related U.S. Application Data continuation of application No. 18/741,165, filed on Jun. 12, 2024, now Pat. No. 12,322,762, which is a continuation of application No. 18/650,789, filed on Apr. 30, 2024, now Pat. No. 12,119,458, which is a continuation of application No. 18/543,515, filed on Dec. 18, 2023, now Pat. No. 11,984,564.

(60) Provisional application No. 63/546,980, filed on Nov. 2, 2023, provisional application No. 63/528,213, filed on Jul. 21, 2023, provisional application No. 63/470,679, filed on Jun. 2, 2023, provisional application No. 63/461,506, filed on Apr. 24, 2023, provisional application No. 63/450,208, filed on Mar. 6, 2023, provisional application No. 63/433,269, filed on Dec. 16, 2022.

(51) Int. Cl.

| | |
|---|---|
| *H01M 4/133* | (2010.01) |
| *H01M 4/134* | (2010.01) |
| *H01M 4/1391* | (2010.01) |
| *H01M 4/1393* | (2010.01) |
| *H01M 4/1395* | (2010.01) |
| *H01M 10/0562* | (2010.01) |
| *H01M 10/44* | (2006.01) |
| *H01M 10/48* | (2006.01) |
| *H01M 50/403* | (2021.01) |
| *H01M 50/431* | (2021.01) |
| *H01M 50/449* | (2021.01) |
| *H02J 7/80* | (2026.01) |

(52) U.S. Cl.
CPC ......... *H01M 4/134* (2013.01); *H01M 4/1391* (2013.01); *H01M 4/1393* (2013.01); *H01M 4/1395* (2013.01); *H01M 10/0562* (2013.01); *H01M 10/425* (2013.01); *H01M 10/44* (2013.01); *H01M 10/48* (2013.01); *H01M 50/403* (2021.01); *H01M 50/431* (2021.01); *H01M 50/449* (2021.01); *H02J 7/80* (2026.01); *H01M 2010/4271* (2013.01); *H01M 2200/00* (2013.01); *H01M 2300/0068* (2013.01)

(56) References Cited

U.S. PATENT DOCUMENTS

| | | | |
|---|---|---|---|
| 3,703,413 | A | 11/1972 | Arrance |
| 4,338,177 | A | 7/1982 | Withers et al. |
| 4,342,637 | A | 8/1982 | Withers et al. |
| 4,670,110 | A | 6/1987 | Withers et al. |
| 4,711,719 | A | 12/1987 | Leenaars et al. |
| 4,826,743 | A | 5/1989 | Nazri |
| 4,916,033 | A | 4/1990 | Gourdine |
| 5,162,175 | A | 11/1992 | Visco et al. |
| 5,194,341 | A | 3/1993 | Bagley et al. |
| 5,314,765 | A | 5/1994 | Bates |
| 5,326,391 | A | 7/1994 | Anderson et al. |
| 5,340,669 | A | 8/1994 | Chaloner-Gill et al. |
| 5,350,645 | A | 9/1994 | Lake et al. |
| 5,415,954 | A | 5/1995 | Gauthier et al. |
| 5,418,091 | A | 5/1995 | Gozdz et al. |
| 5,439,760 | A | 8/1995 | Howard et al. |
| 5,549,717 | A | 8/1996 | Takeuchi et al. |
| 5,569,520 | A | 10/1996 | Bates |
| 5,597,659 | A | 1/1997 | Morigaki et al. |
| 5,691,005 | A | 11/1997 | Morigaki et al. |
| 5,731,104 | A | 3/1998 | Ventura et al. |
| 5,778,515 | A | 7/1998 | Menon |
| 5,824,434 | A | 10/1998 | Kawakami et al. |
| 5,840,087 | A | 11/1998 | Gozdz et al. |
| 5,882,721 | A | 3/1999 | Delnick |
| 5,888,431 | A | 3/1999 | Tonar et al. |
| 5,894,656 | A | 4/1999 | Menon et al. |
| 5,948,464 | A | 9/1999 | Delnick |
| 5,983,488 | A | 11/1999 | Erickson et al. |
| 6,002,239 | A | 12/1999 | Maloizel |
| 6,148,503 | A | 11/2000 | Delnick et al. |
| 6,153,337 | A | 11/2000 | Carlson et al. |
| 6,156,190 | A | 12/2000 | Xia et al. |
| 6,162,563 | A | 12/2000 | Miura et al. |
| 6,172,795 | B1 | 1/2001 | Carlson |
| 6,183,901 | B1 | 2/2001 | Ying et al. |
| 6,190,426 | B1 | 2/2001 | Thibault et al. |
| 6,194,098 | B1 | 2/2001 | Ying et al. |
| 6,210,831 | B1 | 4/2001 | Gorkovenko et al. |
| 6,224,846 | B1 | 5/2001 | Hurlburt et al. |
| 6,268,087 | B1 | 7/2001 | Kim et al. |
| 6,277,514 | B1 | 8/2001 | Ying et al. |
| 6,277,981 | B1 | 8/2001 | Tu et al. |
| 6,287,720 | B1 | 9/2001 | Yamashita et al. |
| 6,306,545 | B1 | 10/2001 | Carlson et al. |
| 6,328,770 | B1 | 12/2001 | Gozdz |
| 6,344,293 | B1 | 2/2002 | Geronov |
| 6,358,397 | B1 | 3/2002 | Lyublinski |
| 6,387,564 | B1 | 5/2002 | Yamashita et al. |
| 6,406,814 | B1 | 6/2002 | Gorkovenko et al. |
| 6,410,182 | B1 | 6/2002 | Ying et al. |
| 6,423,444 | B1 | 7/2002 | Ying et al. |
| 6,423,447 | B1 | 7/2002 | Ohsaki et al. |
| 6,432,586 | B1 | 8/2002 | Zhang |
| 6,436,583 | B1 | 8/2002 | Mikhaylik |
| 6,444,344 | B1 | 9/2002 | Saito et al. |
| 6,451,484 | B1 | 9/2002 | Han et al. |
| 6,488,721 | B1 | 12/2002 | Carlson |
| 6,495,292 | B1 | 12/2002 | Yen |
| 6,497,780 | B1 | 12/2002 | Carlson |
| 6,589,692 | B2 | 7/2003 | Takami |
| 6,679,926 | B1 | 1/2004 | Kajiura et al. |
| 6,682,856 | B1 | 1/2004 | Watanabe et al. |
| 6,723,467 | B2 | 4/2004 | Yoshida et al. |
| 6,724,512 | B2 | 4/2004 | Carlson et al. |
| 6,811,928 | B2 | 11/2004 | Aihara et al. |
| 6,846,435 | B1 | 1/2005 | Bohnen et al. |
| 6,883,347 | B2 | 4/2005 | Ayub |
| 6,946,218 | B2 | 9/2005 | Crouch, Jr. et al. |
| 6,962,182 | B2 | 11/2005 | Cordonnier et al. |
| 6,991,874 | B1 | 1/2006 | Möhwald et al. |
| 7,014,948 | B2 | 3/2006 | Lee et al. |
| 7,029,796 | B2 | 4/2006 | Choi et al. |
| 7,066,971 | B1 | 6/2006 | Carlson |
| 7,070,632 | B1 | 7/2006 | Visco et al. |
| 7,081,142 | B1 | 7/2006 | Carlson |
| 7,115,339 | B2 | 10/2006 | Nakajima et al. |
| 7,135,250 | B2 | 11/2006 | Sasaki et al. |
| 7,160,603 | B2 | 1/2007 | Carlson |
| 7,378,185 | B2 | 5/2008 | Fujikawa et al. |
| 7,396,612 | B2 | 7/2008 | Ohata et al. |
| 7,402,184 | B2 | 7/2008 | Ikuta et al. |
| 7,419,743 | B2 | 9/2008 | Fujikawa et al. |
| 7,422,825 | B2 | 9/2008 | Inoue et al. |
| 7,470,488 | B2 | 12/2008 | Lee et al. |
| 7,560,193 | B2 | 7/2009 | Ikuta et al. |
| 7,575,606 | B2 | 8/2009 | Fukumoto et al. |
| 7,595,130 | B2 | 9/2009 | Kawabata et al. |
| 7,638,230 | B2 | 12/2009 | Fujita et al. |
| 7,638,241 | B2 | 12/2009 | Lee et al. |

(56) References Cited

U.S. PATENT DOCUMENTS

| 7,662,517 B2 | 2/2010 | Lee et al. |
| 7,674,559 B2 | 3/2010 | Min et al. |
| 7,682,740 B2 | 3/2010 | Yong et al. |
| 7,682,751 B2 | 3/2010 | Kato et al. |
| 7,687,202 B2 | 3/2010 | Nishino et al. |
| 7,695,870 B2 | 4/2010 | Park et al. |
| 7,704,641 B2 | 4/2010 | Yong et al. |
| 7,709,140 B2 | 5/2010 | Hennige et al. |
| 7,709,152 B2 | 5/2010 | Kim et al. |
| 7,709,153 B2 | 5/2010 | Lee et al. |
| 7,745,042 B2 | 6/2010 | Fujino et al. |
| 7,745,050 B2 | 6/2010 | Kajita et al. |
| 7,754,375 B2 | 7/2010 | Fujikawa et al. |
| 7,754,377 B2 | 7/2010 | Ohata et al. |
| 7,758,998 B2 | 7/2010 | Ohata et al. |
| 7,759,004 B2 | 7/2010 | Ikuta et al. |
| 7,811,700 B2 | 10/2010 | Hennige et al. |
| 7,816,038 B2 | 10/2010 | Ohata et al. |
| 7,829,242 B2 | 11/2010 | Hörpel et al. |
| 7,981,548 B2 | 7/2011 | Mimura |
| 8,076,027 B2 | 12/2011 | Honda et al. |
| 8,277,981 B2 | 10/2012 | Kim et al. |
| 8,574,743 B2 | 11/2013 | Kim et al. |
| 8,722,226 B2 | 5/2014 | Chiang et al. |
| 8,722,227 B2 | 5/2014 | Chiang et al. |
| 8,778,552 B2 | 7/2014 | Chiang et al. |
| 8,883,347 B2 | 11/2014 | Baba et al. |
| 8,993,159 B2 | 3/2015 | Chiang et al. |
| 9,070,954 B2 | 6/2015 | Carlson et al. |
| 9,153,833 B2 | 10/2015 | Chiang et al. |
| 9,178,200 B2 | 11/2015 | Bazzarella et al. |
| 9,180,412 B2 | 11/2015 | Jo et al. |
| 9,184,464 B2 | 11/2015 | Chiang et al. |
| 9,203,092 B2 | 12/2015 | Slocum et al. |
| 9,293,781 B2 | 3/2016 | Chiang et al. |
| 9,350,009 B1 | 5/2016 | Lim et al. |
| 9,362,583 B2 | 6/2016 | Chiang et al. |
| 9,385,392 B2 | 7/2016 | Chiang et al. |
| 9,401,501 B2 | 7/2016 | Bazzarella et al. |
| 9,437,864 B2 | 9/2016 | Tan et al. |
| 9,484,569 B2 | 11/2016 | Doherty et al. |
| 9,509,176 B2 | 11/2016 | Carter et al. |
| 9,583,780 B2 | 2/2017 | Chiang et al. |
| 9,614,231 B2 | 4/2017 | Carter et al. |
| 9,786,944 B2 | 10/2017 | Chiang et al. |
| 9,812,674 B2 | 11/2017 | Bazzarella et al. |
| 9,825,280 B2 | 11/2017 | Chiang et al. |
| 9,831,518 B2 | 11/2017 | Chiang et al. |
| 9,831,519 B2 | 11/2017 | Chiang et al. |
| 9,831,522 B2 | 11/2017 | Tan et al. |
| 10,115,970 B2 | 10/2018 | Ota et al. |
| 10,122,044 B2 | 11/2018 | Tan et al. |
| 10,153,651 B2 | 12/2018 | Taylor et al. |
| 10,181,587 B2 | 1/2019 | Ota et al. |
| 10,230,128 B2 | 3/2019 | Chiang et al. |
| 10,236,518 B2 | 3/2019 | Chiang et al. |
| 10,411,310 B2 | 9/2019 | Chiang et al. |
| 10,483,582 B2 | 11/2019 | Chiang et al. |
| 10,497,935 B2 | 12/2019 | Ota et al. |
| 10,522,870 B2 | 12/2019 | Tan et al. |
| 10,566,581 B2 | 2/2020 | Bazzarella et al. |
| 10,566,603 B2 | 2/2020 | Slocum et al. |
| 10,593,952 B2 | 3/2020 | Ota et al. |
| 10,601,239 B2 | 3/2020 | Taylor et al. |
| 10,637,038 B2 | 4/2020 | Zagars et al. |
| 10,734,672 B2 | 8/2020 | Chen et al. |
| 10,777,852 B2 | 9/2020 | Woodford et al. |
| 10,854,869 B2 | 12/2020 | Bazzarella et al. |
| 10,886,521 B2 | 1/2021 | Zagars et al. |
| 10,910,858 B2 | 2/2021 | Taylor et al. |
| 10,957,940 B2 | 3/2021 | Tan et al. |
| 10,964,973 B2 | 3/2021 | Tan et al. |
| 11,005,087 B2 | 5/2021 | Ota et al. |
| 11,018,365 B2 | 5/2021 | Chiang et al. |
| 11,024,903 B2 | 6/2021 | Ota et al. |
| 11,069,888 B2 | 7/2021 | Liu et al. |
| 11,094,487 B2 | 8/2021 | Lawrence et al. |
| 11,094,976 B2 | 8/2021 | Chiang et al. |
| 11,121,437 B2 | 9/2021 | Bazzarella et al. |
| 11,139,467 B2 | 10/2021 | Zagars et al. |
| 11,145,909 B2 | 10/2021 | Chiang et al. |
| 11,309,531 B2 | 4/2022 | Slocum et al. |
| 11,316,156 B2 | 4/2022 | Woo et al. |
| 11,342,567 B2 | 5/2022 | Chiang et al. |
| 11,394,023 B2 | 7/2022 | Ofer et al. |
| 11,394,049 B2 | 7/2022 | Tan et al. |
| 11,462,722 B2 | 10/2022 | Aranami et al. |
| 11,469,065 B2 | 10/2022 | Lawrence et al. |
| 11,476,551 B2 | 10/2022 | Tyler et al. |
| 11,552,368 B2 | 1/2023 | Holman et al. |
| 11,575,146 B2 | 2/2023 | Taylor et al. |
| 11,594,793 B2 | 2/2023 | Bazzarella et al. |
| 11,611,061 B2 | 3/2023 | Zagars et al. |
| 11,631,920 B2 | 4/2023 | Bazzarella et al. |
| 11,646,437 B2 | 5/2023 | Bazzarella et al. |
| 11,652,203 B2 | 5/2023 | Zagars et al. |
| 11,742,525 B2 | 8/2023 | Aranami et al. |
| 11,749,804 B2 | 9/2023 | Chen et al. |
| 11,757,129 B2 | 9/2023 | Tan et al. |
| 11,764,353 B2 | 9/2023 | Ota et al. |
| 11,799,085 B2 | 10/2023 | Chae et al. |
| 11,804,595 B2 | 10/2023 | Ota et al. |
| 11,811,119 B2 | 11/2023 | Chiang et al. |
| 11,831,026 B2 | 11/2023 | Ota et al. |
| 11,855,250 B2 | 12/2023 | Taylor et al. |
| 11,876,194 B2 | 1/2024 | Chiang et al. |
| 11,888,144 B2 | 1/2024 | Slocum et al. |
| 11,909,077 B2 | 2/2024 | Chiang et al. |
| 11,942,654 B2 | 3/2024 | Bazzarella et al. |
| 11,961,990 B2 | 4/2024 | Ota et al. |
| 11,984,564 B1 * | 5/2024 | Chen ................. H01M 10/0525 |
| 12,009,551 B2 | 6/2024 | Bazzarella et al. |
| 12,068,445 B2 | 8/2024 | Bazzarella et al. |
| 12,068,486 B2 | 8/2024 | Lawrence et al. |
| 12,095,025 B2 | 9/2024 | Tan et al. |
| 12,100,816 B2 | 9/2024 | Chen |
| 12,107,211 B2 | 10/2024 | Chen et al. |
| 12,107,252 B2 | 10/2024 | Aranami et al. |
| 12,119,458 B2 * | 10/2024 | Chen ................. H01M 10/0525 |
| 12,125,984 B2 | 10/2024 | Zagars et al. |
| 12,142,721 B2 | 11/2024 | Taylor |
| 12,176,519 B2 | 12/2024 | Zagars et al. |
| 12,183,909 B2 | 12/2024 | Zagars et al. |
| 12,199,240 B2 | 1/2025 | Tan et al. |
| 12,272,818 B2 | 4/2025 | Ota et al. |
| 12,278,344 B2 | 4/2025 | Chen et al. |
| 12,322,762 B2 * | 6/2025 | Chen ................. H01M 10/0525 |
| 12,322,763 B2 | 6/2025 | Chen et al. |
| 12,322,832 B2 | 6/2025 | Carlson et al. |
| 12,334,518 B1 | 6/2025 | Chen et al. |
| 12,347,874 B2 | 7/2025 | Ota et al. |
| 12,362,395 B2 | 7/2025 | Chen et al. |
| 12,362,398 B2 | 7/2025 | Aranami et al. |
| 12,368,157 B2 | 7/2025 | Doherty et al. |
| 12,381,277 B2 | 8/2025 | Chen et al. |
| 12,401,088 B2 | 8/2025 | Chen |
| 12,401,089 B2 | 8/2025 | Chen |
| 12,407,065 B2 | 9/2025 | Chen |
| 12,407,073 B2 | 9/2025 | Tyler et al. |
| 12,456,780 B2 | 10/2025 | Chen et al. |
| 12,469,927 B2 | 11/2025 | Bazzarella et al. |
| 12,476,288 B2 | 11/2025 | Chen et al. |
| 12,500,278 B2 | 12/2025 | Chen et al. |
| 2001/0000485 A1 | 4/2001 | Ying et al. |
| 2001/0038938 A1 | 11/2001 | Takahashi et al. |
| 2001/0053475 A1 | 12/2001 | Ying et al. |
| 2002/0092155 A1 | 7/2002 | Carlson et al. |
| 2002/0141029 A1 | 10/2002 | Carlson et al. |
| 2003/0003363 A1 | 1/2003 | Daido et al. |
| 2003/0003369 A1 | 1/2003 | Dai |
| 2003/0035995 A1 | 2/2003 | Ohsaki et al. |
| 2003/0059675 A1 | 3/2003 | Sasaki et al. |
| 2003/0118910 A1 | 6/2003 | Carlson |
| 2003/0124429 A1 | 7/2003 | Okada et al. |

(56) References Cited

U.S. PATENT DOCUMENTS

| | | |
|---|---|---|
| 2003/0171784 A1 | 9/2003 | Dodd et al. |
| 2004/0038090 A1 | 2/2004 | Faris |
| 2004/0043295 A1 | 3/2004 | Rodriguez et al. |
| 2004/0058246 A1 | 3/2004 | Choi et al. |
| 2004/0175626 A1 | 9/2004 | Dasgupta et al. |
| 2004/0185335 A1 | 9/2004 | Carlson |
| 2004/0188880 A1 | 9/2004 | Bauer et al. |
| 2004/0241540 A1 | 12/2004 | Tsutsumi et al. |
| 2005/0022370 A1 | 2/2005 | Fu et al. |
| 2005/0026037 A1 | 2/2005 | Riley et al. |
| 2005/0221190 A1 | 10/2005 | Sudano et al. |
| 2005/0255345 A1 | 11/2005 | Gerritse et al. |
| 2005/0255769 A1 | 11/2005 | Henninge et al. |
| 2005/0266305 A1 | 12/2005 | Ohata et al. |
| 2006/0008698 A1 | 1/2006 | Kim et al. |
| 2006/0040181 A1 | 2/2006 | Kim et al. |
| 2006/0127753 A1 | 6/2006 | Nakashima et al. |
| 2006/0172158 A1 | 8/2006 | Min et al. |
| 2006/0172185 A1 | 8/2006 | Mimura |
| 2006/0177732 A1 | 8/2006 | Visco et al. |
| 2006/0222954 A1 | 10/2006 | Skotheim et al. |
| 2006/0275661 A1 | 12/2006 | Kim et al. |
| 2007/0009803 A1 | 1/2007 | Kim et al. |
| 2007/0065714 A1 | 3/2007 | Hambitzer et al. |
| 2007/0108120 A1 | 5/2007 | Carlson |
| 2007/0110990 A1 | 5/2007 | Carlson |
| 2007/0111070 A1 | 5/2007 | Carlson |
| 2007/0178384 A1 | 8/2007 | Kajita et al. |
| 2007/0184350 A1 | 8/2007 | Kim et al. |
| 2007/0189959 A1 | 8/2007 | Carlson et al. |
| 2007/0190408 A1 | 8/2007 | Inoue et al. |
| 2007/0204458 A1 | 9/2007 | Fujita et al. |
| 2007/0243460 A1 | 10/2007 | Carlson et al. |
| 2007/0269714 A1 | 11/2007 | Watanabe et al. |
| 2008/0032197 A1 | 2/2008 | Horpel et al. |
| 2008/0160412 A1 | 7/2008 | Kasamatsu et al. |
| 2008/0166202 A1 | 7/2008 | Dunlap et al. |
| 2008/0193845 A1 | 8/2008 | Muraoka et al. |
| 2008/0285208 A1 | 11/2008 | Sung et al. |
| 2009/0011337 A1 | 1/2009 | Kajita et al. |
| 2009/0017380 A1 | 1/2009 | Honda et al. |
| 2009/0029261 A1 | 1/2009 | Thomas-Alyea et al. |
| 2009/0067119 A1 | 3/2009 | Katayama et al. |
| 2009/0087728 A1 | 4/2009 | Less et al. |
| 2009/0098457 A1 | 4/2009 | Kwon et al. |
| 2009/0155676 A1 | 6/2009 | Zhamu et al. |
| 2009/0155678 A1 | 6/2009 | Less et al. |
| 2009/0197175 A1 | 8/2009 | Nagai et al. |
| 2009/0197183 A1 | 8/2009 | Kato |
| 2009/0202912 A1 | 8/2009 | Baba et al. |
| 2009/0246631 A1 | 10/2009 | Hojo et al. |
| 2009/0246636 A1 | 10/2009 | Chiang et al. |
| 2009/0269489 A1 | 10/2009 | Hennige et al. |
| 2009/0290288 A1 | 11/2009 | Mitchell et al. |
| 2009/0311587 A1 | 12/2009 | Best et al. |
| 2010/0003592 A1 | 1/2010 | Baba et al. |
| 2010/0003595 A1 | 1/2010 | Issaev et al. |
| 2010/0047671 A1 | 2/2010 | Chiang et al. |
| 2010/0055370 A1 | 3/2010 | Diehl et al. |
| 2010/0104817 A1 | 4/2010 | Carlson |
| 2010/0175245 A1 | 7/2010 | Do et al. |
| 2010/0261065 A1 | 10/2010 | Babinec et al. |
| 2010/0285352 A1 | 11/2010 | Juzkow et al. |
| 2010/0323264 A1 | 12/2010 | Chiang et al. |
| 2011/0052987 A1 | 3/2011 | Katayama et al. |
| 2011/0097623 A1 | 4/2011 | Marinis, Jr. et al. |
| 2011/0189520 A1 | 8/2011 | Carter et al. |
| 2011/0200848 A1 | 8/2011 | Chiang et al. |
| 2011/0228385 A1 | 9/2011 | Avison et al. |
| 2011/0274948 A1 | 11/2011 | Duduta et al. |
| 2011/0281171 A1 | 11/2011 | Yong et al. |
| 2012/0028129 A1 | 2/2012 | Furuya |
| 2012/0050848 A1 | 3/2012 | Carlson et al. |
| 2012/0069429 A1 | 3/2012 | Barrett et al. |
| 2012/0107680 A1 | 5/2012 | Amiruddin et al. |
| 2012/0115029 A1 | 5/2012 | Carlson |
| 2012/0135257 A1 | 5/2012 | Carlson et al. |
| 2012/0141877 A1 | 6/2012 | Choi et al. |
| 2012/0164499 A1 | 6/2012 | Chiang et al. |
| 2012/0189898 A1 | 7/2012 | Wakizaka et al. |
| 2012/0231321 A1 | 9/2012 | Huang et al. |
| 2012/0258348 A1 | 10/2012 | Hayakawa et al. |
| 2013/0055559 A1 | 3/2013 | Slocum et al. |
| 2013/0065122 A1 | 3/2013 | Chiang et al. |
| 2013/0089770 A1 | 4/2013 | Nishikawa |
| 2013/0149613 A1 | 6/2013 | Yoshikawa et al. |
| 2013/0171500 A1 | 7/2013 | Xu et al. |
| 2013/0224555 A1 | 8/2013 | Hong et al. |
| 2013/0260207 A1 | 10/2013 | Uemura |
| 2013/0309547 A1 | 11/2013 | Bazzarella et al. |
| 2013/0323542 A1 | 12/2013 | Wijayawardhana et al. |
| 2013/0337319 A1 | 12/2013 | Doherty et al. |
| 2013/0337349 A1 | 12/2013 | Brost et al. |
| 2013/0344367 A1 | 12/2013 | Chiang et al. |
| 2014/0004437 A1 | 1/2014 | Slocum et al. |
| 2014/0030623 A1 | 1/2014 | Chiang et al. |
| 2014/0039710 A1 | 2/2014 | Carter et al. |
| 2014/0065464 A1 | 3/2014 | Masarapu et al. |
| 2014/0154546 A1 | 6/2014 | Carter et al. |
| 2014/0170464 A1 | 6/2014 | Iwase |
| 2014/0170524 A1 | 6/2014 | Chiang et al. |
| 2014/0248521 A1 | 9/2014 | Chiang et al. |
| 2014/0315084 A1 | 10/2014 | Liu et al. |
| 2014/0315097 A1 | 10/2014 | Tan et al. |
| 2015/0024279 A1 | 1/2015 | Tan et al. |
| 2015/0030933 A1 | 1/2015 | Goetzen et al. |
| 2015/0056426 A1 | 2/2015 | Grouchko et al. |
| 2015/0064537 A1 | 3/2015 | Christensen et al. |
| 2015/0129081 A1 | 5/2015 | Chiang et al. |
| 2015/0140371 A1 | 5/2015 | Slocum |
| 2015/0162586 A1 | 6/2015 | Fleischmann et al. |
| 2015/0171398 A1 | 6/2015 | Roumi |
| 2015/0171406 A1 | 6/2015 | Bazzarella et al. |
| 2015/0249249 A1 | 9/2015 | Ortega et al. |
| 2015/0280267 A1 | 10/2015 | Chiang et al. |
| 2015/0295272 A1 | 10/2015 | Chiang et al. |
| 2015/0299551 A1 | 10/2015 | Ota et al. |
| 2015/0340676 A1 | 11/2015 | Schmidhauser et al. |
| 2015/0357626 A1 | 12/2015 | Holman et al. |
| 2015/0364790 A1 | 12/2015 | Yonehara et al. |
| 2016/0006081 A1* | 1/2016 | Eaglesham ........... H01M 10/48 |
| | | 429/61 |
| 2016/0013461 A1 | 1/2016 | Mizuno et al. |
| 2016/0013507 A1 | 1/2016 | Chiang et al. |
| 2016/0054590 A1 | 2/2016 | Flitsch et al. |
| 2016/0056437 A1 | 2/2016 | Huang et al. |
| 2016/0056490 A1 | 2/2016 | Chiang et al. |
| 2016/0056491 A1 | 2/2016 | Chiang et al. |
| 2016/0105042 A1 | 4/2016 | Taylor et al. |
| 2016/0126543 A1 | 5/2016 | Ota et al. |
| 2016/0133916 A1 | 5/2016 | Zagars et al. |
| 2016/0141579 A1 | 5/2016 | Seok et al. |
| 2016/0141621 A1 | 5/2016 | Negishi et al. |
| 2016/0190536 A1 | 6/2016 | Park et al. |
| 2016/0190544 A1 | 6/2016 | Slocum et al. |
| 2016/0211503 A1 | 7/2016 | Schemberg et al. |
| 2016/0218375 A1 | 7/2016 | Chiang et al. |
| 2016/0268621 A1 | 9/2016 | Chiang et al. |
| 2016/0308218 A1 | 10/2016 | Ota et al. |
| 2016/0344006 A1 | 11/2016 | Ota et al. |
| 2016/0372784 A1 | 12/2016 | Hayner et al. |
| 2016/0372802 A1 | 12/2016 | Chiang et al. |
| 2017/0018798 A1 | 1/2017 | Tan et al. |
| 2017/0025646 A1 | 1/2017 | Ota et al. |
| 2017/0025674 A1 | 1/2017 | Tan et al. |
| 2017/0033389 A1 | 2/2017 | Chiang et al. |
| 2017/0033390 A1 | 2/2017 | Chiang et al. |
| 2017/0077464 A1 | 3/2017 | Bazzarella et al. |
| 2017/0098857 A1 | 4/2017 | Carlson et al. |
| 2017/0104246 A1 | 4/2017 | Takeda |
| 2017/0149088 A1* | 5/2017 | Ueno ................. H01M 10/446 |
| 2017/0162863 A1 | 6/2017 | Doherty et al. |
| 2017/0187078 A1* | 6/2017 | Keates ............. H01M 10/0525 |
| 2017/0214034 A1 | 7/2017 | Ota et al. |

(56) References Cited

U.S. PATENT DOCUMENTS

| | | |
|---|---|---|
| 2017/0237111 A1 | 8/2017 | Holman et al. |
| 2017/0237112 A1 | 8/2017 | Holman et al. |
| 2017/0271638 A1 | 9/2017 | Xu et al. |
| 2017/0288281 A1 | 10/2017 | Chiang et al. |
| 2017/0324073 A1 | 11/2017 | Herle |
| 2018/0034090 A1 | 2/2018 | Chiang et al. |
| 2018/0108893 A1 | 4/2018 | Yang |
| 2018/0175428 A1 | 6/2018 | Chiang et al. |
| 2018/0175445 A1 | 6/2018 | Tan et al. |
| 2018/0219250 A1 | 8/2018 | Delobel et al. |
| 2018/0233708 A1 | 8/2018 | Bazzarella et al. |
| 2018/0233722 A1 | 8/2018 | Holman et al. |
| 2018/0287220 A1 | 10/2018 | Woodford et al. |
| 2019/0036101 A1 | 1/2019 | Tyler et al. |
| 2019/0044196 A1* | 2/2019 | Kang ..................... H01M 4/628 |
| 2019/0058184 A1 | 2/2019 | Bazzarella et al. |
| 2019/0181496 A1 | 6/2019 | Visco et al. |
| 2019/0245242 A1 | 8/2019 | Tan et al. |
| 2019/0267598 A1 | 8/2019 | Xu et al. |
| 2019/0319460 A1 | 10/2019 | Taylor et al. |
| 2019/0326562 A1 | 10/2019 | Ota et al. |
| 2019/0348705 A1 | 11/2019 | Chen et al. |
| 2019/0355998 A1 | 11/2019 | Chiang et al. |
| 2019/0363351 A1 | 11/2019 | Ota et al. |
| 2019/0393477 A1 | 12/2019 | Lawrence et al. |
| 2020/0014025 A1 | 1/2020 | Zagars et al. |
| 2020/0044296 A1 | 2/2020 | Chiang et al. |
| 2020/0106094 A1 | 4/2020 | Ota et al. |
| 2020/0144686 A1 | 5/2020 | Jang et al. |
| 2020/0161688 A1 | 5/2020 | Chiang et al. |
| 2020/0207237 A1 | 7/2020 | Zuo et al. |
| 2020/0212405 A1 | 7/2020 | Wong et al. |
| 2020/0220118 A1 | 7/2020 | Bazzarella et al. |
| 2020/0220204 A1 | 7/2020 | Tan et al. |
| 2020/0259338 A1 | 8/2020 | Taylor et al. |
| 2020/0266407 A1 | 8/2020 | Honda et al. |
| 2020/0266479 A1 | 8/2020 | Hupfer et al. |
| 2020/0303707 A1 | 9/2020 | Zhou et al. |
| 2020/0321597 A1 | 10/2020 | Zagars et al. |
| 2020/0321601 A1 | 10/2020 | Slocum et al. |
| 2020/0358129 A1 | 11/2020 | Chen et al. |
| 2020/0395069 A1 | 12/2020 | Tang et al. |
| 2020/0395583 A1 | 12/2020 | Carlson et al. |
| 2020/0411825 A1 | 12/2020 | Bazzarella et al. |
| 2021/0021009 A1 | 1/2021 | Li et al. |
| 2021/0080364 A1 | 3/2021 | Lee et al. |
| 2021/0091366 A1 | 3/2021 | Bazzarella et al. |
| 2021/0167351 A1 | 6/2021 | Zagars et al. |
| 2021/0226192 A1 | 7/2021 | Aranami et al. |
| 2021/0249678 A1 | 8/2021 | Chiang et al. |
| 2021/0249695 A1 | 8/2021 | Aranami et al. |
| 2021/0257679 A1* | 8/2021 | Tour ..................... H01M 4/382 |
| 2021/0265631 A1 | 8/2021 | Chen et al. |
| 2021/0273268 A1* | 9/2021 | Yu ..................... H01M 10/4235 |
| 2021/0296733 A1 | 9/2021 | Carlson et al. |
| 2021/0359527 A1 | 11/2021 | Taylor et al. |
| 2021/0376380 A1 | 12/2021 | Tan et al. |
| 2021/0384516 A1 | 12/2021 | Lawrence et al. |
| 2021/0399557 A1 | 12/2021 | Ono et al. |
| 2022/0006157 A1 | 1/2022 | Nakazawa et al. |
| 2022/0021019 A1 | 1/2022 | Tan et al. |
| 2022/0029207 A1 | 1/2022 | Chiang et al. |
| 2022/0037749 A1 | 2/2022 | Bazzarella et al. |
| 2022/0052403 A1 | 2/2022 | Chen et al. |
| 2022/0077445 A1 | 3/2022 | Ota et al. |
| 2022/0085440 A1 | 3/2022 | Ota et al. |
| 2022/0093929 A1 | 3/2022 | Chen et al. |
| 2022/0115710 A1 | 4/2022 | Zagars et al. |
| 2022/0172916 A1 | 6/2022 | Lawrence et al. |
| 2022/0173446 A1 | 6/2022 | Chiang et al. |
| 2022/0200097 A1 | 6/2022 | Lee et al. |
| 2022/0200306 A1 | 6/2022 | Kusachi et al. |
| 2022/0231274 A1 | 7/2022 | Zagars et al. |
| 2022/0238923 A1 | 7/2022 | Chen et al. |
| 2022/0263104 A1 | 8/2022 | Chiang et al. |
| 2022/0263193 A1 | 8/2022 | Chen et al. |
| 2022/0278427 A1 | 9/2022 | Lawrence et al. |
| 2022/0285669 A1 | 9/2022 | Doherty et al. |
| 2022/0294079 A1 | 9/2022 | Zhang et al. |
| 2022/0299572 A1* | 9/2022 | Aoki ..................... G01R 31/389 |
| 2022/0342597 A1 | 10/2022 | Liu et al. |
| 2022/0344775 A1 | 10/2022 | Carlson et al. |
| 2022/0344776 A1 | 10/2022 | Carlson |
| 2022/0352597 A1* | 11/2022 | Chen ..................... H01M 4/131 |
| 2022/0352598 A1 | 11/2022 | Avison et al. |
| 2023/0018078 A1 | 1/2023 | Slocum et al. |
| 2023/0022329 A1 | 1/2023 | Chen et al. |
| 2023/0085181 A1 | 3/2023 | Tan et al. |
| 2023/0090853 A1 | 3/2023 | Tyler et al. |
| 2023/0098274 A1 | 3/2023 | Carlson et al. |
| 2023/0118961 A1 | 4/2023 | Chen et al. |
| 2023/0133464 A1 | 5/2023 | Ota et al. |
| 2023/0170169 A1 | 6/2023 | Lawrence et al. |
| 2023/0178707 A1 | 6/2023 | Aranami et al. |
| 2023/0238562 A1 | 7/2023 | Kusachi et al. |
| 2023/0261247 A1 | 8/2023 | Ju et al. |
| 2023/0282906 A1 | 9/2023 | Chen et al. |
| 2023/0291063 A1 | 9/2023 | Holman et al. |
| 2023/0307803 A1 | 9/2023 | Bazzarella et al. |
| 2023/0327068 A1 | 10/2023 | Tyler et al. |
| 2023/0327077 A1 | 10/2023 | Zagars et al. |
| 2023/0327178 A1 | 10/2023 | Taylor et al. |
| 2023/0335748 A1 | 10/2023 | Chen et al. |
| 2023/0352755 A1 | 11/2023 | Aragon et al. |
| 2023/0369603 A1 | 11/2023 | Ota et al. |
| 2023/0369719 A1 | 11/2023 | Bazzarella et al. |
| 2023/0378512 A1 | 11/2023 | Bazzarella et al. |
| 2023/0395771 A1 | 12/2023 | Zagars et al. |
| 2023/0411695 A1 | 12/2023 | Narita et al. |
| 2024/0039001 A1 | 2/2024 | Kusachi et al. |
| 2024/0039120 A1 | 2/2024 | Carlson |
| 2024/0047689 A1 | 2/2024 | Hartzog et al. |
| 2024/0047772 A1 | 2/2024 | Hartzog et al. |
| 2024/0047810 A1 | 2/2024 | Hartzog et al. |
| 2024/0047832 A1 | 2/2024 | Hartzog et al. |
| 2024/0055702 A1 | 2/2024 | Ota et al. |
| 2024/0063417 A1 | 2/2024 | Chiang et al. |
| 2024/0079647 A1 | 3/2024 | Tan et al. |
| 2024/0088355 A1 | 3/2024 | Ota et al. |
| 2024/0106003 A1 | 3/2024 | Aranami et al. |
| 2024/0128541 A1 | 4/2024 | Nematollahi |
| 2024/0178502 A1 | 5/2024 | Ota |
| 2024/0204264 A1 | 6/2024 | Chen et al. |
| 2024/0204288 A1 | 6/2024 | Nematollahi |
| 2024/0213572 A1 | 6/2024 | Nematollahi |
| 2024/0234705 A1 | 7/2024 | Ota et al. |
| 2024/0274855 A1 | 8/2024 | Chiang et al. |
| 2024/0274864 A1 | 8/2024 | Taylor et al. |
| 2024/0291050 A1 | 8/2024 | Chen et al. |
| 2024/0304942 A1 | 9/2024 | Patel et al. |
| 2024/0347799 A1 | 10/2024 | Chiang |
| 2024/0372212 A1 | 11/2024 | Chen et al. |
| 2024/0372213 A1 | 11/2024 | Chen et al. |
| 2024/0372214 A1 | 11/2024 | Chen et al. |
| 2024/0405299 A1 | 12/2024 | Nakao |
| 2024/0405391 A1 | 12/2024 | Bazzarella |
| 2024/0413407 A1 | 12/2024 | Chen et al. |
| 2024/0413482 A1 | 12/2024 | Bazzarella et al. |
| 2024/0429399 A1 | 12/2024 | Lawrence et al. |
| 2024/0429429 A1 | 12/2024 | Bazzarella et al. |
| 2024/0429463 A1 | 12/2024 | Chen et al. |
| 2024/0429466 A1 | 12/2024 | Chen et al. |
| 2025/0023009 A1 | 1/2025 | Ota et al. |
| 2025/0046860 A1 | 2/2025 | Chen et al. |
| 2025/0054939 A1 | 2/2025 | Aranami |
| 2025/0070261 A1 | 2/2025 | Zagars |
| 2025/0105337 A1 | 3/2025 | Taylor et al. |
| 2025/0105449 A1 | 3/2025 | Carlson et al. |
| 2025/0183262 A1 | 6/2025 | Zagars et al. |
| 2025/0192188 A1 | 6/2025 | Hartzog et al. |
| 2025/0210728 A1 | 6/2025 | Chen et al. |
| 2025/0273749 A1 | 8/2025 | Chen et al. |
| 2025/0273751 A1 | 8/2025 | Chen et al. |
| 2025/0279467 A1 | 9/2025 | Tan |

(56) References Cited

U.S. PATENT DOCUMENTS

| | | | |
|---|---|---|---|
| 2025/0286154 A1 | 9/2025 | Chen et al. | |
| 2025/0364645 A1 | 11/2025 | Chen et al. | |
| 2025/0372814 A1 | 12/2025 | Chen et al. | |

FOREIGN PATENT DOCUMENTS

| | | | |
|---|---|---|---|
| CN | 1285084 A | 2/2001 | |
| CN | 1492523 A | 4/2004 | |
| CN | 1167163 C | 9/2004 | |
| CN | 1175505 C | 11/2004 | |
| CN | 101504991 A | 8/2009 | |
| CN | 101796668 A | 8/2010 | |
| CN | 101946344 A | 1/2011 | |
| CN | 102242464 A | 11/2011 | |
| CN | 102437302 A | 5/2012 | |
| CN | 102460772 A | 5/2012 | |
| CN | 202221791 U | 5/2012 | |
| CN | 102640329 A | 8/2012 | |
| CN | 102769116 A | 11/2012 | |
| CN | 102959765 A | 3/2013 | |
| CN | 101796668 B | 8/2013 | |
| CN | 103262305 A | 8/2013 | |
| CN | 103282408 A | 9/2013 | |
| CN | 103283060 A | 9/2013 | |
| CN | 102640329 B | 11/2015 | |
| CN | 105247703 A | 1/2016 | |
| CN | 106654130 A | 5/2017 | |
| CN | 214280149 U | 9/2021 | |
| EP | 0143562 A1 | 6/1985 | |
| EP | 0523840 A1 | 1/1993 | |
| EP | 0600718 A2 | 6/1994 | |
| EP | 0523840 B1 | 4/1996 | |
| EP | 0814520 A2 | 12/1997 | |
| EP | 0836238 A1 | 4/1998 | |
| EP | 0848435 A1 | 6/1998 | |
| EP | 0875950 A2 | 11/1998 | |
| EP | 0892449 A1 | 1/1999 | |
| EP | 0600718 B1 | 4/2000 | |
| EP | 1156544 A2 | 11/2001 | |
| EP | 0836238 B1 | 11/2005 | |
| EP | 0848435 B1 | 5/2007 | |
| EP | 3133671 A1 | 2/2017 | |
| EP | 4117104 A1 | 1/2023 | |
| FR | 3007207 A1 | 12/2014 | |
| JP | S4610339 Y1 | 4/1971 | |
| JP | H05283108 A | 10/1993 | |
| JP | H0614077 A | 1/1994 | |
| JP | H06140077 A | 5/1994 | |
| JP | H06275313 A | 9/1994 | |
| JP | H087895 A | 1/1996 | |
| JP | H08255615 A | 10/1996 | |
| JP | H0927343 A | 1/1997 | |
| JP | H10214639 A | 8/1998 | |
| JP | H10228925 A | 8/1998 | |
| JP | H11233144 A | 8/1999 | |
| JP | 2000011986 A | 1/2000 | |
| JP | 2000323129 A | 11/2000 | |
| JP | 2001143690 A | 5/2001 | |
| JP | 2002042882 A | 2/2002 | |
| JP | 2002203542 A | 7/2002 | |
| JP | 2002532852 A | 10/2002 | |
| JP | 2003517418 A | 5/2003 | |
| JP | 2003223926 A | 8/2003 | |
| JP | 2004119367 A | 4/2004 | |
| JP | 2005022674 A | 1/2005 | |
| JP | 2005190785 A | 7/2005 | |
| JP | 2005235695 A | 9/2005 | |
| JP | 2006236994 A | 9/2006 | |
| JP | 2006269358 A | 10/2006 | |
| JP | 2007227136 A | 9/2007 | |
| JP | 2007258160 A | 10/2007 | |
| JP | 2008041404 A | 2/2008 | |
| JP | 2008048838 A | 3/2008 | |
| JP | 2008066094 A | 3/2008 | |
| JP | 2008123988 A | 5/2008 | |
| JP | 2008140551 A | 6/2008 | |
| JP | 2008171593 A | 7/2008 | |
| JP | 2008210541 A | 9/2008 | |
| JP | 2008226566 A | 9/2008 | |
| JP | 2008234879 A | 10/2008 | |
| JP | 2008266593 A | 11/2008 | |
| JP | 2009064566 A | 3/2009 | |
| JP | 2009176552 A | 8/2009 | |
| JP | 2009188037 A | 8/2009 | |
| JP | 4426721 B2 | 3/2010 | |
| JP | 2010056036 A | 3/2010 | |
| JP | 2010123383 A | 6/2010 | |
| JP | 2010146839 A | 7/2010 | |
| JP | 2010202987 A | 9/2010 | |
| JP | 2010232048 A | 10/2010 | |
| JP | 2011065849 A | 3/2011 | |
| JP | 2011129304 A | 6/2011 | |
| JP | 2011233144 A | 11/2011 | |
| JP | 2012018773 A | 1/2012 | |
| JP | 2012049052 A | 3/2012 | |
| JP | 2012069283 A | 4/2012 | |
| JP | 4932263 B2 | 5/2012 | |
| JP | 5183016 B2 | 4/2013 | |
| JP | 2013161684 A | 8/2013 | |
| JP | 2013535113 A | 9/2013 | |
| JP | 2013535773 A | 9/2013 | |
| JP | 2013211185 A | 10/2013 | |
| JP | 2013218913 A | 10/2013 | |
| JP | 2014127440 A | 7/2014 | |
| JP | 2015018635 A | 1/2015 | |
| JP | 2015504234 A | 2/2015 | |
| JP | 2015230796 A | 12/2015 | |
| JP | 2016110886 A | 6/2016 | |
| JP | 2016517161 A | 6/2016 | |
| JP | 2016149202 A | 8/2016 | |
| JP | 6275313 B2 | 2/2018 | |
| JP | 2020537304 A | 12/2020 | |
| JP | 2021093379 A | 6/2021 | |
| KR | 20070069171 A | 7/2007 | |
| KR | 20080063793 A | 7/2008 | |
| KR | 20090026190 A | 3/2009 | |
| KR | 20090052556 A | 5/2009 | |
| KR | 20090123894 A | 12/2009 | |
| KR | 20100137530 A | 12/2010 | |
| KR | 20110079744 A | 7/2011 | |
| KR | 20110116489 A | 10/2011 | |
| KR | 20120062333 A | 6/2012 | |
| KR | 20120110111 A | 10/2012 | |
| KR | 20130036043 A | 4/2013 | |
| KR | 20130054346 A | 5/2013 | |
| KR | 20140024464 A | 2/2014 | |
| KR | 20150004358 A | 1/2015 | |
| KR | 20150108040 A | 9/2015 | |
| KR | 20170106523 A | 9/2017 | |
| WO | WO-9102385 A1 | 2/1991 | |
| WO | WO-9103080 A1 | 3/1991 | |
| WO | WO-9708763 A1 | 3/1997 | |
| WO | WO-9931751 A1 | 6/1999 | |
| WO | WO-9933125 A1 | 7/1999 | |
| WO | WO-9957770 A1 | 11/1999 | |
| WO | WO-0076011 A2 | 12/2000 | |
| WO | WO-0103824 A1 | 1/2001 | |
| WO | WO-0076011 A3 | 4/2001 | |
| WO | WO-0139293 A2 | 5/2001 | |
| WO | WO-0139303 A1 | 5/2001 | |
| WO | WO-2005011043 A1 | 2/2005 | |
| WO | WO-2005022674 A1 | 3/2005 | |
| WO | WO-2006080265 A1 | 8/2006 | |
| WO | WO-2006123892 A1 | 11/2006 | |
| WO | WO-2007006011 A2 | 1/2007 | |
| WO | WO-2007066768 A1 | 6/2007 | |
| WO | WO-2007076011 A1 | 7/2007 | |
| WO | WO-2007095348 A2 | 8/2007 | |
| WO | WO-2007135790 A1 | 11/2007 | |
| WO | WO-2007120763 A3 | 3/2008 | |
| WO | WO-2008087966 A1 | 7/2008 | |
| WO | WO-2008099468 A1 | 8/2008 | |
| WO | WO-2008114727 A1 | 9/2008 | |
| WO | WO-2008143005 A1 | 11/2008 | |

(56)　　　　References Cited

FOREIGN PATENT DOCUMENTS

| WO | WO-2008150070 A1 | 12/2008 |
| WO | WO-2009014388 A2 | 1/2009 |
| WO | WO-2009026467 A1 | 2/2009 |
| WO | WO-2009044741 A1 | 4/2009 |
| WO | WO-2009066946 A2 | 5/2009 |
| WO | WO-2009066946 A3 | 8/2009 |
| WO | WO-2009120812 A2 | 10/2009 |
| WO | WO-2010016881 A1 | 2/2010 |
| WO | WO-2010021248 A1 | 2/2010 |
| WO | WO-2010103824 A1 | 9/2010 |
| WO | WO-2010138176 A1 | 12/2010 |
| WO | WO-2010138177 A1 | 12/2010 |
| WO | WO-2010138179 A1 | 12/2010 |
| WO | WO-2011065849 A1 | 6/2011 |
| WO | WO-2011112885 A1 | 9/2011 |
| WO | WO-2012005139 A1 | 1/2012 |
| WO | WO-2012011157 A1 | 1/2012 |
| WO | WO-2012011944 A2 | 1/2012 |
| WO | WO-2012113157 A1 | 8/2012 |
| WO | WO-2013139303 A1 | 9/2013 |
| WO | WO-2013146126 A1 | 10/2013 |
| WO | WO-2013154623 A1 | 10/2013 |
| WO | WO-2014052533 A1 | 4/2014 |
| WO | WO-2014119665 A1 | 8/2014 |
| WO | WO-2014147888 A1 | 9/2014 |
| WO | WO-2014179355 A1 | 11/2014 |
| WO | WO-2015004069 A1 | 1/2015 |
| WO | WO-2015074065 A1 | 5/2015 |
| WO | WO-2016168715 A1 | 10/2016 |
| WO | WO-2017008081 A1 | 1/2017 |
| WO | WO-2018050067 A1 | 3/2018 |
| WO | WO-2019074925 A1 | 4/2019 |
| WO | WO-2019103011 A1 | 5/2019 |
| WO | WO-2019136467 A1 | 7/2019 |
| WO | WO-2021087465 A1 | 5/2021 |
| WO | WO-2021212050 A1 | 10/2021 |
| WO | WO-2022040103 A1 | 2/2022 |
| WO | WO-2022232625 A2 | 11/2022 |
| WO | WO-2024130246 A1 | 6/2024 |

OTHER PUBLICATIONS

Holtmann et al., "Boehmite-based ceramic separator for lithium-ion batteries," Journal of Applied Electrochemistry, Jan. 2016, vol. 46, pp. 69-76.

Ikezawa A., et al., "Performance of Li4Ti5O12-based Reference Electrode for the Electrochemical Analysis of All-solid-state Lithium-ion Batteries," Electrochemistry Communications, Jul. 2020, vol. 116: 106743, 5 pages.

Kim et al., "Preparation of a Trilayer Separator and its Application to Lithium-ion Batteries", Journal of Power Sources, Elsevier SA, CH, Jul. 2, 2010, vol. 195, No. 24, pp. 8302-8305.

Lawrence et al., U.S. Appl. No. 63/622,201, titled "Systems and methods of folding electrochemical cell tabs for energy density improvement", filed Jan. 28, 2024, 23 pages.

Liu et al., "Controllable long-term lithium replenishment for enhancing energy density and cycle life of lithium-ion batteries," Energy & Environmental Science, 2024, Published on Dec. 28, 2023, 17(3):1163-1174.

Matsuzaki et al., "Application of Na2CO3 as a Sacrificial Electrode Additive in Na-ion Batteries to Compensate for the Sodium Deficiency in Na2/3[Fe1/2Mn1/2]O2," Batteries & Supercaps, May 2024, 7(5):e202400009, 9 pages.

Nestler et al., "Separators—Technology Review: Ceramic based Separators for Secondary Batteries," AIP Conference Proceedings, Jan. 1, 2014, vol. 1597(1), pp. 155-184, New York, US, ISSN: 3084-243X, DOI: 10,1063/1.4878486.

PCT Application No. PCT/US2020/058564, International Preliminary Report on Patentability mailed May 12, 2022, Applicant 24M Technologies, Inc.; 9 pages.

PCT Application No. PCT/US2020/058564, International Search Report and Written Opinion mailed Feb. 1, 2021, Applicant 24M Technologies, Inc.; 12 pages.

PCT Application No. PCT/US2022/027104, International Preliminary Report on Patentability mailed Nov. 9, 2023, Applicant 24M Technologies, Inc.; 8 pages.

PCT Application No. PCT/US2022/027104, International Search Report and Written Opinion mailed Dec. 13, 2022, Applicant 24M Technologies, Inc.; 12 pages.

PCT Application No. PCT/US2023/084611, International Preliminary Report on Patentability mailed Jun. 26, 2025, Applicant 24M Technologies, Inc.; 6 pages.

PCT Application No. PCT/US2023/084611, International Search Report and Written Opinion for International mailed Apr. 18, 2024, Applicant 24M Technologies, Inc.; 9 pages.

Piana M., et al., "Stability of a Pyrrolidinum-Based Ionic Liquid in Li-0 2 Cells," Journal of the Electrochemical Society, Jan. 2014, vol. 161(14), pp. A1992-A2001.

Steven et al., U.S. Appl. No. 60/773,487 titled "Methods of preparing separators for electrochemical cells," filed Feb. 15, 2006, 30 pages.

Takemura et al., "A Powder Particle Size Effect on Ceramic Powder Based Separator for Lithium Rechargeable Battery," Journal of Power Sources, Aug. 2005, vol. 146(102), pp. 779-783.

Uhlhorn, et al., "Synthesis of Ceramic Membranes: Part I Synthesis of non-supported and supported γ-alumina membranes without defects," Journal of Materials Science, Jan. 1992, 27, pp. 527-537.

U.S. Appl. No. 15/262,581, filed Sep. 12, 2016; Inventor Chiang, Yet-Ming et al.

U.S. Appl. No. 15/425,368, filed Feb. 6, 2017; Inventor Slocum, Alexander H.

U.S. Appl. No. 16/139,791, filed Sep. 24, 2018; Inventor Ota, Naoki et al.

U.S. Appl. No. 16/736,553, filed Jan. 7, 2020; Inventor Ota, Naoki et al.

U.S. Appl. No. 18/223,894, filed Jul. 19, 2023; Inventor Chen, Junzheng et al.

U.S. Appl. No. 18/411,431, filed Jan. 12, 2024; Inventor Chiang, Yet-Ming et al.

U.S. Appl. No. 18/543,515, Notice of Allowance mailed Apr. 4, 2024; Inventor Chen, Junzheng et al.; 10 pages.

U.S. Appl. No. 18/543,515, Office Action mailed Feb. 9, 2024; Inventor Chen, Junzheng et al.; 14 pages.

U.S. Appl. No. 18/543,959, Corrected Notice of Allowance mailed Jul. 31, 2024; Inventor Chen, Junzheng et al.; 2 pages.

U.S. Appl. No. 18/543,959, Non-Final Office Action mailed May 1, 2024; Inventor Chen, Junzheng et al.; 8 pages.

U.S. Appl. No. 18/543,959, Notice of Allowance mailed Jul. 22, 2024; Inventor Chen, Junzheng et al.; 9 pages.

U.S. Appl. No. 18/543,959, Restriction Requirement mailed Apr. 9, 2024; Inventor Chen, Junzheng et al.; 6 pages.

U.S. Appl. No. 18/650,789, Corrected Notice of Allowance mailed Aug. 19, 2024; Inventor Chen, Junzheng et al.; 6 pages.

U.S. Appl. No. 18/650,789, Notice of Allowance mailed Jul. 19, 2024; Inventor Chen, Junzheng et al.; 8 pages.

U.S. Appl. No. 18/741,165, Non-Final Office Action mailed Nov. 22, 2024; Inventor Chen, Junzheng et al.; 7 pages.

U.S. Appl. No. 18/741,165, Notice of Allowance mailed Feb. 4, 2025; Inventor Chen, Junzheng et al.; 9 pages.

U.S. Appl. No. 18/741,181, Corrected Notice of Allowance mailed May 9, 2025; Inventor Chen, Junzheng et al.; 6 pages.

U.S. Appl. No. 18/741,181, Final Office Action mailed Jan. 6, 2025; Inventor Chen, Junzheng et al.; 16 pages.

U.S. Appl. No. 18/741,181, Non-Final Office Action mailed Oct. 15, 2024; Inventor Chen, Junzheng et al.; 19 pages.

U.S. Appl. No. 18/741,181, Notice of Allowance mailed Apr. 28, 2025; Inventor Chen, Junzheng et al.; 8 pages.

U.S. Appl. No. 18/810,183, Non-Final Office Action mailed Nov. 18, 2024; Inventor Chen, Junzheng et al.; 8 pages.

U.S. Appl. No. 18/810,183, Notice of Allowance mailed Feb. 12, 2025; Inventor Chen, Junzheng et al.; 8 pages.

U.S. Appl. No. 18/810,183, Restriction Requirement mailed Oct. 10, 2024; Inventor Chen, Junzheng et al.; 6 pages.

U.S. Appl. No. 18/824,314, Non-Final Office Action mailed Nov. 5, 2024; Inventor Chen, Junzheng et al.; 7 pages.

(56) References Cited

OTHER PUBLICATIONS

U.S. Appl. No. 18/824,314, Notice of Allowance mailed Dec. 11, 2024; Inventor Chen, Junzheng et al.; 8 pages.

U.S. Appl. No. 18/974,585, filed Dec. 9, 2024; Inventor Tan, Taison et al.

U.S. Appl. No. 19/068,803, filed Mar. 3, 2025; Inventor Ota, Naoki et al.

U.S. Appl. No. 19/076,674, Examiner Interview Summary mailed Oct. 8, 2025; Inventor Chen, Junzheng et al.; 7 pages.

U.S. Appl. No. 19/076,674, Office Action mailed Aug. 11, 2025; Inventor Chen, Junzheng et al.; 19 pages.

U.S. Appl. No. 19/076,674, Restriction Requirement mailed May 15, 2025; Inventor Chen, Junzheng et al.; 7 pages.

U.S. Appl. No. 19/197,732, Ex Parte Quayle Action mailed Jun. 4, 2025; Inventor Chen, Junzheng et al.; 4 pages.

U.S. Appl. No. 19/197,732, Notice of Allowance mailed Aug. 21, 2025; Inventor Chen, Junzheng et al.; 8 pages.

U.S. Appl. No. 19/200,210, Final Office Action mailed Jul. 25, 2025; Inventor Chen, Junzheng et al.; 8 pages.

U.S. Appl. No. 19/200,210, Non-Final Office Action mailed Jun. 24, 2025; Inventor Chen, Junzheng et al.; 10 pages.

U.S. Appl. No. 19/200,210, Notice of Allowance mailed Sep. 5, 2025; Inventor Chen, Junzheng et al.; 8 pages.

U.S. Appl. No. 19/210,930, Examiner Interview Summary mailed Sep. 26, 2025, Inventor Chen, Junzheng et al.; 3 pages.

U.S. Appl. No. 19/210,930, Non-Final Office Action mailed Jul. 21, 2925; Inventor Chen, Junzheng et al.; 11 pages.

U.S. Appl. No. 19/210,930, Notice of Allowance mailed Nov. 10, 2025; Inventor Chen, Junzheng et al.; 8 pages.

U.S. Appl. No. 19/210,930, Office Action mailed Oct. 8, 2025; Inventor Chen, Junzheng et al.; 9 pages.

U.S. Appl. No. 19/221,004, filed May 28, 2025; Inventor Ota, Naoki et al.

U.S. Appl. No. 19/237,604, filed Jun. 13, 2025; Inventor Aranami, Junji et al.

U.S. Appl. No. 19/240,917, filed Jun. 17, 2025; Inventor Doherty, Tristan et al.

U.S. Appl. No. 19/247,506, filed Jun. 24, 2025; Inventor Chen, Junzheng et al.

U.S. Appl. No. 19/247,525, filed Jun. 24, 2025; Inventor Chen, Junzheng et al.

U.S. Appl. No. 19/298,872, filed Aug. 13, 2025; Inventor Chen, Junzheng et al.

U.S. Appl. No. 19/361,563, filed Oct. 17, 2025; Inventor Bazzarella, Ricardo et al.

U.S. Appl. No. 19/367,782, filed Oct. 23, 2025; Inventor Chen, Junzheng et al.

Zhang et al., "Sulfonated polyimide/AlOOH composite membranes with decreased vanadium permeability and increased stability for vanadium redox flow battery", Journal of Solid State Electrochemistry, Springer, Berlin, DE, vol. 18, No. 12, Jul. 18, 2014, pp. 3479-3490.

* cited by examiner

Battery Management System 6302

Dendrite Control 6303

System Controller 6301

SYSTEMS AND METHODS FOR MINIMIZING AND PREVENTING DENDRITE FORMATION IN ELECTROCHEMICAL CELLS

CROSS-REFERENCE TO RELATED APPLICATIONS

This application is a continuation of U.S. patent application Ser. No. 19/197,732, entitled "Systems and Methods for Minimizing and Preventing Dendrite Formation in Electrochemical Cells," and filed on May 2, 2025, which is a continuation of U.S. patent application Ser. No. 18/741,165, entitled "Systems and Methods for Minimizing and Preventing Dendrite Formation in Electrochemical Cells," and filed on Jun. 12, 2024, now U.S. Pat. No. 12,322,762, which is a continuation of U.S. patent application Ser. No. 18/650,789, entitled "Systems and Methods for Minimizing and Preventing Dendrite Formation in Electrochemical Cells," and filed on Apr. 30, 2024, now U.S. Pat. No. 12,119,458, which is a continuation of U.S. patent application Ser. No. 18/543,515, entitled "Systems and Methods for Minimizing and Preventing Dendrite Formation in Electrochemical Cells," and filed on Dec. 18, 2023, now U.S. Pat. No. 11,984,564, which claims priority to and the benefit of U.S. Provisional Patent Application No. 63/433,269, filed Dec. 16, 2022 and titled, "Systems and Methods for Minimizing and Preventing Dendrite Formation in Electrochemical Cells," U.S. Provisional Patent Application No. 63/450,208, filed Mar. 6, 2023 and titled, "Systems and Methods for Minimizing and Preventing Dendrite Formation in Electrochemical Cells," U.S. Provisional Patent Application No. 63/461,506, filed Apr. 24, 2023 and titled, "Systems and Methods for Minimizing and Preventing Dendrite Formation in Electrochemical Cells," U.S. Provisional Patent Application No. 63/470,679, filed Jun. 2, 2023 and titled, "Systems and Methods for Minimizing and Preventing Dendrite Formation in Electrochemical Cells," U.S. Provisional Patent Application No. 63/528,213, filed Jul. 21, 2023 and titled, "Systems and Methods for Minimizing and Preventing Dendrite Formation in Electrochemical Cells," and U.S. Provisional Patent Application No. 63/546,980, filed Nov. 2, 2023 and titled, "Systems and Methods for Minimizing and Preventing Dendrite Formation in Electrochemical Cells," the disclosures of which are hereby incorporated by reference in their entirety.

TECHNICAL FIELD

Embodiments described herein relate to electrochemical cells formulated to minimize damage from dendrite formation.

BACKGROUND

Dendrite formation in electrochemical cells can lead to short circuiting and heat generation. Heat generation in electrochemical cells is a safety issue that can have dangerous results. Thermal runaway can lead to fires and thermal decomposition of the electrochemical cell materials. By minimizing the size to which dendrites can grow, significant safety issues can be avoided.

SUMMARY

Embodiments described herein relate to electrochemical cells with dendrite prevention mechanisms, and methods of producing and operating the same. In some aspects, an electrochemical cell can include an anode disposed on an anode current collector, a cathode disposed on a cathode current collector, the cathode having a first thickness at a proximal end of the cathode and a second thickness at a distal end of the cathode, the second thickness greater than the first thickness, a first separator disposed on the anode, a second separator disposed on the cathode, an interlayer disposed between the first separator and the second separator, the interlayer including electroactive material and having a proximal end and a distal end, and a power source electrically connected to the proximal end of the cathode and the proximal end of the interlayer, the power source configured to maintain a voltage difference between the cathode and the interlayer below a threshold value. In some embodiments, the threshold value can be about 0.01 V. In some embodiments, the interlayer can include $Li_{(1-x)}NMC$ wherein x is an integer. In some embodiments, the anode can include graphite. In some embodiments, the second thickness can be greater than the first thickness by about 500 nm to about 5 μm.

BRIEF DESCRIPTION OF THE DRAWINGS

FIGS. 2A-2B are illustrations of an electrochemical cell with an interlayer, according to an embodiment.

FIGS. 3A-3B are illustrations of an electrochemical cell with an interlayer, according to an embodiment.

FIGS. 4A-4B are illustrations of an electrochemical cell with multiple interlayers, according to an embodiment.

FIG. 13 is an illustration of an electrochemical cell with an interlayer, according to an embodiment.

FIGS. 17A-17B are illustrations of an electrochemical cell with an interlayer, according to an embodiment.

FIG. 18 is an illustration of an electrochemical cell with an interlayer, according to an embodiment.

FIG. 19 is an illustration of an electrochemical cell with an interlayer, according to an embodiment.

FIG. 20 is an illustration of an electrochemical cell with an interlayer, according to an embodiment.

FIG. 23 is an illustration of an electrochemical cell with an interlayer, according to an embodiment.

FIG. 26 is an illustration of an electrochemical cell with an interlayer, according to an embodiment.

FIG. 29 is an illustration of an electrochemical cell with an interlayer, according to an embodiment.

FIG. 30 is an illustration of an electrochemical cell with an interlayer, according to an embodiment.

FIG. 31 is an illustration of an electrochemical cell with an interlayer, according to an embodiment.

FIG. 33 is an illustration of an electrochemical cell with an interlayer, according to an embodiment.

FIG. 34 is an illustration of an electrochemical cell with multiple interlayers, according to an embodiment.

FIG. 35 is an illustration of an electrochemical cell with multiple interlayers, according to an embodiment.

FIG. 38 is an illustration of an electrochemical cell with multiple interlayers, according to an embodiment.

FIG. 39 is an illustration of an electrochemical cell with multiple interlayers, according to an embodiment.

FIG. 44 is an illustration of an electrochemical cell with multiple interlayers, according to an embodiment.

FIG. 45 is an illustration of an electrochemical cell with multiple interlayers, according to an embodiment.

FIG. 48 is an illustration of an electrochemical cell with multiple interlayers, according to an embodiment.

FIG. 50 is an illustration of an electrochemical cell with multiple interlayers, according to an embodiment.

FIGS. 51A-51C are illustrations of a method for preparing an electrochemical cell with an interlayer, according to an embodiment.

FIGS. 52A-52C are illustrations of a method for preparing an electrochemical cell with an interlayer, according to an embodiment.

FIGS. 59A-59C are illustrations of an electrochemical cell with an interlayer, according to an embodiment.

FIG. 60 is an illustration of an electrochemical cell with multiple interlayers, according to an embodiment.

FIG. 63 is a block diagram of an electrochemical cell system, according to an embodiment.

FIG. 68 is an illustration of an electrochemical cell with an interlayer, according to an embodiment.

FIG. 70A-70B are illustrations of an electrochemical cell with an interlayer and associated control logic, according to an embodiment.

FIG. 72 shows interrelationships between a controller and related devices, according to an embodiment.

FIGS. 78A-78C are illustrations of an electrochemical cell with multiple interlayers, according to an embodiment.

FIGS. 82A-82B are illustrations of a collection of electrochemical cell stacks, according to an embodiment.

FIG. 92 is an illustration of the formation of a dual ion system.

DETAILED DESCRIPTION

Figure 1:
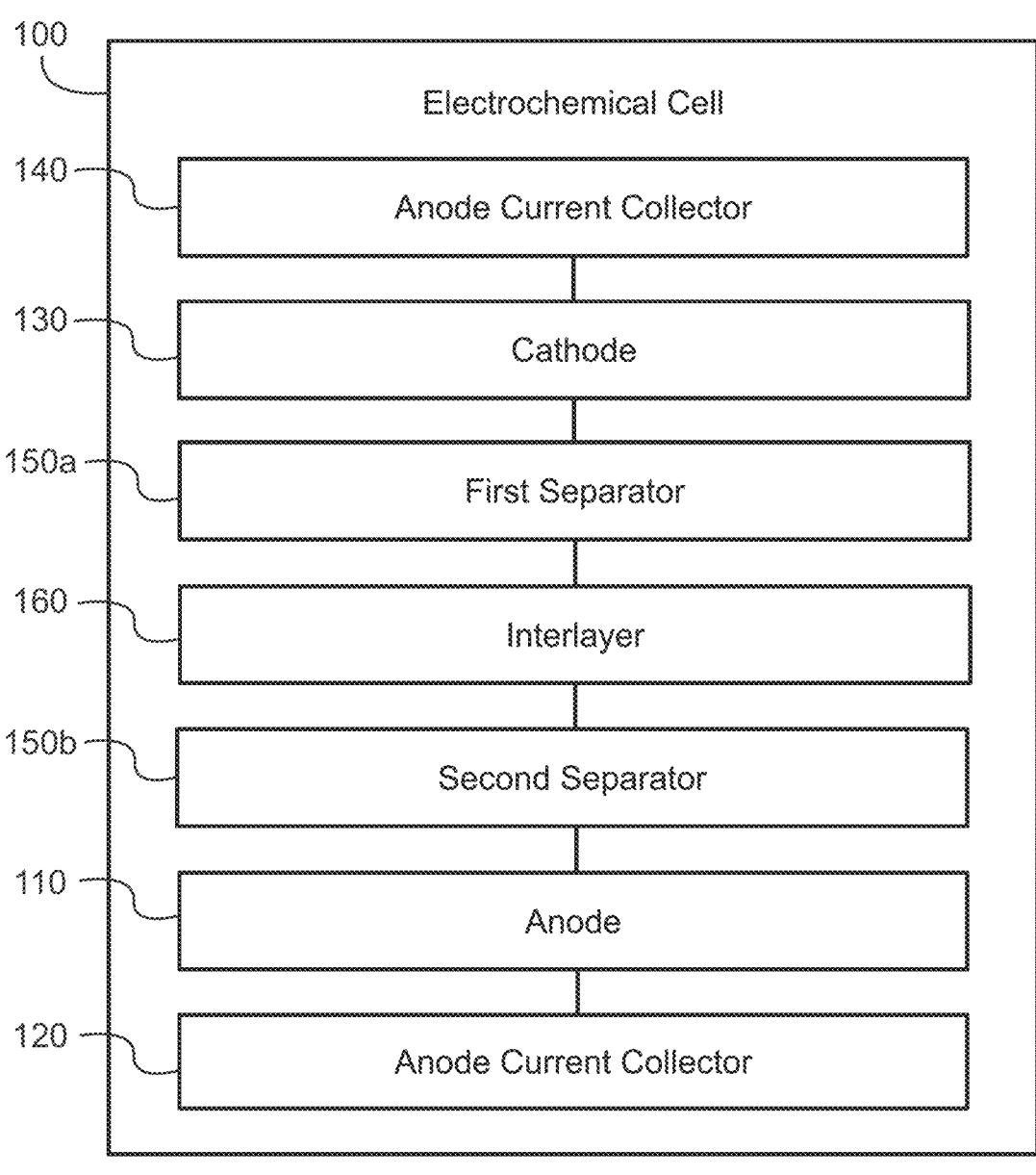
FIG. 1 is a block diagram of an electrochemical cell with an interlayer, according to an embodiment.

Embodiments described herein relate to cells with interlayers, and methods of operating the same. An interlayer can include a layer of electroactive material placed between an anode and a cathode of an electrochemical cell. The interlayer can be disposed between a first separator and a second separator. Interlayers can be used to detect dendrites before they grow too large, such that the dendrites would cause safety hazards. A battery management system (BMS) can be connected to the electrochemical cell to detect when a dendrite enters the interlayer and safely discharge the remaining energy in the electrochemical cell. In some embodiments, the discharge energy can be used to power other devices, such as heaters, removing cell energy to create a safe condition.

In some embodiments, the BMS can be used to draw energy through the interlayer, causing the dendrite to dissolve. This effectively removes the dendrite from the electrochemical cell. In some embodiments, energy for dissolution of the dendrite can be produced via a power supply in the BMS. In some embodiments, energy for dissolution of the dendrite can be produced by drawing energy from the cathode to increase the interlayer voltage relative to the anode.

In some embodiments, the BMS can be used to detect the voltage of the interlayer with respect to the anode, in order to detect the formation of the dendrite. The detection can include the estimation of the relative voltage of the interlayer to both the anode and the cathode. If the voltage of the interlayer decreases with respect to the cathode (e.g., if the voltage difference between the interlayer and the cathode is greater than about 0.1 V, greater than about 0.2 V, greater than about 0.3 V, greater than about 0.4 V, greater than about 0.5 V, greater than about 0.6 V, greater than about 0.7 V, greater than about 0.8 V, greater than about 0.9 V, greater than about 1 V, greater than about 1.5 V, greater than about 2 V, greater than about 2.5 V, or greater than about 3 V, inclusive of all values and ranges therebetween), a signal can be provided to a vehicle housing the electrochemical cell to set a warning that the vehicle needs service. The threshold voltage can be a function of the design of the electrochemical cell and the interlayer. In some embodiments, the voltage difference between the interlayer and the anode can be used to trigger the service warning. In some embodiments, a combination of voltages between the anode, cathode, and/or the interlayer can be used to trigger the service warning. In some embodiments, a rate of change of the voltage of the interlayer can be used to evaluate warnings and faults in the electrochemical cell and/or in the vehicle. In some embodiments, the rate of change of the interlayer voltage can be used to perform control functions to eliminate the dendrite.

In some embodiments, a significant voltage difference between the interlayer and the cathode (e.g., at least about 0.5 V, at least about 1 V, at least about 1.5 V, at least about 2 V, at least about 2.5 V, at least about 3 V, at least about 3.5 V, at least about 4 V, at least about 4.5 V, at least about 5 V, at least about 5.5 V, or at least about 6 V, inclusive of all values and ranges therebetween) can trigger a warning signal that electrochemical cell failure and/or vehicle failure is imminent. In some embodiments, the BMS can limit discharge current of the electrochemical cell to create a reduction of power to the vehicle. This can be by directly limiting power and/or by communication of limits to a vehicle controller or another controller in the vehicle, depending on the vehicle's design.

In some embodiments, voltage can be measured between the anode and the interlayer. In some embodiments, the voltage can be measured between the cathode and the interlayer. In some embodiments, the voltages can be measured via a proportional-integral (PI) loop. The voltage between the anode and the interlayer and the voltage between the cathode and the interlayer preferably remain consistent throughout a charging process. In some embodiments, an external component can be used to maintain the interlayer near the cathode voltage. In some embodiments, the external component can include a diode, a resistor, a fuse, a transistor (Bi junction, field-effect transistor (FET), etc.), or any combination thereof.

In some embodiments, the interlayer can be chemically configured to remove the dendrite as the dendrite protrudes into the interlayer. For example, a high potential applied to the interlayer can oxidize and dissolve the dendrite. In some embodiments, the interlayer can include one or more solid layers that physically block dendrites from penetrating the interlayer. In some embodiments, the solid layer can include a solid-state electrolyte.

In some embodiments, a resistance can be applied to the interlayer. The resistance can provide a continuous excitation of the interlayer such that a dendrite would not be able to form across the dendrite and both separator layers. Such a prevention method can be used as part of an overall control strategy where the voltage potential, current, resistance to interlayer could be changed based on a control algorithm.

A control system can act in an active prevention mode, where the potential of the interlayer is modulated or changed to apply different voltage potentials. The voltage potentials can be increased (i.e., changed to be more similar to cathode side) or decreased (changed to be more similar to anode side) to maintain the cell function. When the dendrite forms and interfaces with the interlayer, the voltage of the interlayer is increased to be more similar to the cathode potential, with respect to the anode. The dendrite is dissolved or remediated, and the voltage potential of the interlayer returns to near the voltage potential of the cathode with respect to the anode.

Dendrite growth in lithium cells is often detected via a thermal event (i.e., a sudden spike in temperature). In many cases, cell damage has already occurred once the thermal event is detected. Embodiments described herein relate to measurement of voltage potential of a separator layer (i.e., including an interlayer) relative to the anode and/or the cathode. Voltage potential is used to detect dendrite growth into the separator layer. Dendrite growth causes a voltage change in the separator layer relative to the anode and/or the cathode. Detection of the voltage change allows direct sensing of the dendrite growth before a safety event occurs.

In some embodiments, the voltage potential of the interlayer can be altered or modulated to stop the growth of the dendrite or make the dendrite shrink. The voltage can be actively changed by a control system to remediate the dendrite formation at a separator layer. Voltage increases relative to an anode can prevent dendritic growth through a separator. Voltage decreases relative to an anode can dissolve dendritic growth in the active area. Modulation of the voltage on the interlayer separator can affect the ability of the electrodes to flow current into the cell. For example, inputting a voltage to the separator layer that is greater than the anode can reduce, or prevent charge current from flowing into the cell. This will provide a means to control current flow within the cell without utilizing an traditional external switching device, or as a primary or secondary means of current flow control.

Further descriptions of electrochemical cells with multiple separators and interlayers can be found in U.S. Patent Publication No. 2022/0352597 ("the '597 publication"), filed Apr. 29, 2022 and titled "Electrochemical Cells with Multiple Separators and Methods of Producing the Same," the disclosure of which is hereby incorporated by reference in its entirety.

In some embodiments, electrodes described herein can include conventional solid electrodes. In some embodiments, the solid electrodes can include binders. In some embodiments, electrodes described herein can include semi-solid electrodes. Semi-solid electrodes described herein can be made: (i) thicker (e.g., greater than 100 μm-up to 2,000 μm or even greater) due to the reduced tortuosity and higher electronic conductivity of the semi-solid electrode, (ii) with higher loadings of active materials, and (iii) with a simplified manufacturing process utilizing less equipment. These relatively thick semi-solid electrodes decrease the volume, mass and cost contributions of inactive components with respect to active components, thereby enhancing the commercial appeal of batteries made with the semi-solid electrodes. In some embodiments, the semi-solid electrodes described herein are binderless and/or do not use binders that are used in conventional battery manufacturing. Instead, the volume of the electrode normally occupied by binders in conventional electrodes, is now occupied by: 1) electrolyte, which has the effect of decreasing tortuosity and increasing the total salt available for ion diffusion, thereby countering the salt depletion effects typical of thick conventional electrodes when used at high rate, 2) active material, which has the effect of increasing the charge capacity of the battery, or 3) conductive additive, which has the effect of increasing the electronic conductivity of the electrode, thereby countering the high internal impedance of thick conventional electrodes. The reduced tortuosity and a higher electronic conductivity of the semi-solid electrodes described herein, results in superior rate capability and charge capacity of electrochemical cells formed from the semi-solid electrodes. Since the semi-solid electrodes described herein, can be made substantially thicker than conventional electrodes, the ratio of active materials (i.e., the semi-solid cathode and/or anode) to inactive materials (i.e., the current collector and separator) can be much higher in a battery formed from electrochemical cell stacks that include semi-solid electrodes relative to a similar battery formed form electrochemical cell stacks that include conventional electrodes. This substantially increases the overall charge capacity and energy density of a battery that includes the semi-solid electrodes described herein.

In some embodiments, the electrode materials described herein can be a flowable semi-solid or condensed liquid composition. In some embodiments, the electrode materials described herein can be binderless or substantially free of binder. A flowable semi-solid electrode can include a suspension of an electrochemically active material (anodic or cathodic particles or particulates), and optionally an electronically conductive material (e.g., carbon) in a non-aqueous liquid electrolyte. Said another way, the active electrode particles and conductive particles are co-suspended in an electrolyte to produce a semi-solid electrode. Examples of battery architectures utilizing semi-solid suspensions are described in International Patent Publication No. WO 2012/024499, entitled "Stationary, Fluid Redox Electrode," and International Patent Publication No. WO 2012/088442, entitled "Semi-Solid Filled Battery and Method of Manufacture," the entire disclosures of which are hereby incorporated by reference.

As used in this specification, the singular forms "a," "an," and "the" include plural referents unless the context clearly dictates otherwise. Thus, for example, the term "a member" is intended to mean a single member or a combination of members, "a material" is intended to mean one or more materials, or a combination thereof.

The term "substantially" when used in connection with "cylindrical," "linear," and/or other geometric relationships is intended to convey that the structure so defined is nominally cylindrical, linear or the like. As one example, a portion of a support member that is described as being "substantially linear" is intended to convey that, although linearity of the portion is desirable, some non-linearity can occur in a "substantially linear" portion. Such non-linearity can result from manufacturing tolerances, or other practical considerations (such as, for example, the pressure or force applied to the support member). Thus, a geometric construction modified by the term "substantially" includes such geometric properties within a tolerance of plus or minus 5% of the stated geometric construction. For example, a "substantially linear" portion is a portion that defines an axis or center line that is within plus or minus 5% of being linear.

As used herein, the term "set" and "plurality" can refer to multiple features or a singular feature with multiple parts. For example, when referring to a set of electrodes, the set of electrodes can be considered as one electrode with multiple portions, or the set of electrodes can be considered as multiple, distinct electrodes. Additionally, for example, when referring to a plurality of electrochemical cells, the plurality of electrochemical cells can be considered as multiple, distinct electrochemical cells or as one electrochemical cell with multiple portions. Thus, a set of portions or a plurality of portions may include multiple portions that are either continuous or discontinuous from each other. A plurality of particles or a plurality of materials can also be fabricated from multiple items that are produced separately and are later joined together (e.g., via mixing, an adhesive, or any suitable method).

As used herein, the term "semi-solid" refers to a material that is a mixture of liquid and solid phases, for example, such as a particle suspension, a slurry, a colloidal suspension, an emulsion, a gel, or a micelle.

FIG. 1 is a block diagram of an electrochemical cell 100 with an interlayer 160, according to an embodiment. As shown, the electrochemical cell 100 includes an anode 110 disposed on an anode current collector 120, a cathode 130 disposed on a cathode current collector 140, a first separator 150a, and a second separator 150b disposed between the anode 110 and the cathode 130, with the interlayer 160 disposed between the first separator 150a and the second separator 150b.

In some embodiments, the anode 110 and/or the cathode 130 can include at least about 0.1%, at least about 0.2%, at least about 0.3%, at least about 0.4%, at least about 0.5%, at least about 0.6%, at least about 0.7%, at least about 0.8%, at least about 0.9%, at least about 1%, at least about 2%, at least about 3%, at least about 4%, at least about 5%, at least about 6%, at least about 7%, at least about 8%, at least about 9%, at least about 10%, at least about 11%, at least about 12%, at least about 13%, at least about 14%, at least about 15%, at least about 16%, at least about 17%, at least about 18%, at least about 19%, at least about 20%, at least about 21%, at least about 22%, at least about 23%, or at least about 24% by volume of liquid electrolyte solution. In some embodiments, the anode 110 and/or the cathode 130 can include no more than about 25%, no more than about 24%, no more than about 23%, no more than about 22%, no more than about 21%, no more than about 20%, no more than about 19%, no more than about 18%, no more than about 17%, no more than about 16%, no more than about 15%, no more than about 14%, no more than about 13%, no more than about 12%, no more than about 11%, no more than about 10%, no more than about 9%, no more than about 8%, no more than about 7%, no more than about 6%, no more than about 5%, no more than about 4%, no more than about 3%, no more than about 2%, no more than about 1%, no more than about 0.9%, no more than about 0.8%, no more than about 0.7%, no more than about 0.6%, no more than about 0.5%, no more than about 0.4%, no more than about 0.3%, or no more than about 0.2% by volume of liquid electrolyte solution.

Combinations of the above-referenced volumetric percentages of liquid electrolyte solution in the anode 110 and/or the cathode 130 are also possible (e.g., at least about 0.1% and no more than about 25% or at least about 5% and no more than about 10%), inclusive of all values and ranges therebetween. In some embodiments, the anode 110 and/or the cathode 130 can include about 0.1%, about 0.2%, about 0.3%, about 0.4%, about 0.5%, about 0.6%, about 0.7%, about 0.8%, about 0.9%, about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, or about 25% by volume of liquid electrolyte solution.

In some embodiments, the anode current collector 120 and/or the cathode current collector 140 can be composed of copper, aluminum, titanium, or other metals that do not form alloys or intermetallic compounds with lithium, carbon, and/or coatings comprising such materials disposed on another conductor. In some embodiments, the anode current collector 120 and/or the cathode current collector 140 can have a thickness of at least about 1 μm, at least about 5 μm, at least about 10 μm, at least about 15 μm, at least about 20 μm, at least about 25 μm, at least about 30 μm, at least about 35 μm, at least about 40 μm, or at least about 45 μm. In some embodiments, the anode current collector 120 and/or the cathode current collector 140 can have a thickness of no more than about 50 μm, no more than about 45 μm, no more than about 40 μm, no more than about 35 μm, no more than about 30 μm, no more than about 25 μm, no more than about 20 μm, no more than about 15 μm, no more than about 10 μm, or no more than about 5 μm. Combinations of the above-referenced thicknesses of the anode current collector 120 and/or the cathode current collector 140 are also possible (e.g., at least about 1 μm and no more than about 50 μm or at least about 10 μm and no more than about 30 μm), inclusive of all values and ranges therebetween. In some embodiments, the anode current collector 120 and/or the cathode current collector 140 can have a thickness of about 1 μm, about 5 μm, about 10 μm, about 15 μm, about 20 μm, about 25 μm, about 30 μm, about 35 μm, about 40 μm, about 45 μm, or about 50 μm.

In some embodiments, the anode 110 can include a first electrolyte and the cathode 130 can include a second electrolyte. In other words, and the anode 110 can include an anolyte and the cathode 130 can include a catholyte. In some embodiments, the electrochemical cell 100 can include an anolyte disposed on the anode side of the separators 150. In some embodiments, the electrochemical cell 100 can include a catholyte disposed on the cathode side of the separators 150. In some embodiments, the electrochemical cell 100 can include a selectively permeable membrane. In some embodiments, the selectively permeable membrane can be disposed between the first separator 150a and the second separator 150b. Electrochemical cells with anolytes, catholytes, and/or selectively permeable membranes are described in U.S. Pat. No. 10,734,672 ("the '672 patent"), filed Jan. 8, 2019, and titled, "Electrochemical Cells Including Selectively Permeable Membranes, Systems and Methods of Manufacturing the Same," the disclosure of which is hereby incorporated by reference in its entirety.

As shown, the first separator 150a is disposed on the anode 110 while the second separator 150b is disposed on the cathode 130. In some embodiments, the separators 150 can be disposed on their respective electrodes during production of the electrochemical cell 100. In some embodiments, the first separator 150a and/or the second separator 150b can be composed of polyethylene, polypropylene, high density polyethylene, polyethylene terephthalate, polystyrene, a thermosetting polymer, hard carbon, a thermosetting resin, a polyimide, a ceramic coated separator, an inorganic separator, cellulose, glass fiber, a polyethylenoxide (PEO) polymer in which a lithium salt is complexed to provide lithium conductivity, Nation™ membranes which are proton conductors, or any other suitable separator material, or combinations thereof. In some embodiments, the first separator 150a can be composed of the same material as the second separator 150b. In some embodiments, the first separator 150a can be composed of a different material from the second separator 150b.

In some embodiments, the first separator 150a and/or the second separator 150b can have a porosity of at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, or at least about 90%. In some embodiments, the first separator 150a and/or the second separator 150b can have a porosity of no more than about 95%, no more than about 90%, no more than about 85%, no more than about 80%, no more than about 75%, no more than about 70%, no more than about 65%, no more than about 60%, no more than about 55%, no more than about 50%, no more than about 45%, no more than about 40%, no more than about 35%, no more than about 30%, no more than about 25%, no more than about 20%, or no more than about 15%.

Combinations of the above-referenced porosity percentages of the first separator 150a and/or the second separator 150b are also possible (e.g., at least about 10% and no more than about 95% or at least about 20% and no more than about 40%), inclusive of all values and ranges therebetween. In some embodiments, the first separator 150a and/or the second separator 150b can have a porosity of about 10%, about 15%, about 20%, about 25%, about 30%, about 35%, about 40%, about 45%, about 50%, about 55%, about 60%, about 65%, about 70%, about 75%, about 80%, about 85%, about 90%, or about 95%.

In some embodiments, the first separator 150a can have a different porosity from the second separator 150b. In some embodiments, the porosities of the first separator 150a and the second separator 150b can be selected based on the difference between the anolyte and the catholyte. For example, if the catholyte has a higher vapor pressure and faster evaporation properties than the anolyte, then the second separator 150b can have a lower porosity than the first separator 150a. The lower porosity of the second separator 150b can at least partially prevent the catholyte from evaporating during production.

In some embodiments, the first separator 150a can be composed of a different material from the second separator 150b. In some embodiments, the materials of the first separator 150a and the second separator 150b can be selected to facilitate wettability of the first separator 150a with the anolyte and the second separator 150b with the catholyte 150. For example, an ethylene carbonate/propylene carbonate-based catholyte can wet a polyethylene separator better than a polyimide separator, based on the molecular properties of the materials. An ethylene carbonate/ dimethyl carbonate-based anolyte can wet a polyimide separator better than a polyethylene separator. A full wetting of the first separator 150a and the second separator 150b can give way to better transport of electroactive species via the separators 150. This transport can be facilitated particularly well when the first separator 150a physically contacts the second separator 150b.

As shown, the electrochemical cell 100 includes two separators 150. In some embodiments, the electrochemical cell 100 can include 3, 4, 5, 6, 7, 8, 9, 10, or more than about 10 separators 150. In some embodiments, a layer of liquid electrolyte (not shown) can be disposed between the first separator 150a and the second separator 150b. A layer of liquid electrolyte can promote better adhesion between the separators 150.

In some embodiments, the first separator 150a and/or the second separator 150b can have a thickness of at least about 0.5 μm, at least about 1 μm, at least about 2 μm, at least about 3 μm, at least about 4 μm, at least about 5 μm, at least about 6 μm, at least about 7 μm, at least about 8 μm, at least about 9 μm, at least about 10 μm, at least about 15 μm, at least about 20 μm, or at least about 25 μm. In some embodiments, the first separator 150a and/or the second separator 150b can have a thickness of no more than about 30 μm, no more than about 25 μm, no more than about 20 μm, no more than about 15 μm, no more than about 10 μm, no more than about 9 μm, no more than about 8 μm, no more than about 7 μm, no more than about 6 μm, no more than about 5 μm, no more than about 4 μm, no more than about 3 μm, no more than about 2 μm, or no more than about 1 μm. Combinations of the above-referenced thicknesses of the first separator 150a and/or the second separator 150b are also possible (e.g., at least about 0.5 μm and no more than about 30 μm or at least about 5 μm and no more than about 20 μm), inclusive of all values and ranges therebetween. In some embodiments, the first separator 150a and/or the second separator 150b can have a thickness of about 0.5 μm, about 1 μm, about 2 μm, about 3 μm, about 4 μm, about 5 μm, about 6 μm, about 7 μm, about 8 μm, about 9 μm, about 10 μm, about 15 μm, about 20 μm, about 25 μm, or about 30 μm. In some embodiments, the first separator 150a can have a thickness the same or substantially similar to the thickness of the second separator 150b. In some embodiments, the first separator 150a can have a thickness greater or less than a thickness of the second separator 150b.

In some embodiments, the first separator 150a, the second separator 150b, and the interlayer 160 can form a film. In some embodiments, the film can have a total thickness of at least about 5 μm, at least about 6 μm, at least about 7 μm, at least about 8 μm, at least about 9 μm, at least about 10 μm, at least about 15 μm, at least about 20 μm, at least about 25 μm, at least about 30 μm, at least about 35 μm, at least about 40 μm, or at least about 45 μm. In some embodiments, the film can have a total thickness of no more than about 50 μm, no more than about 45 μm, no more than about 40 μm, no more than about 35 μm, no more than about 30 μm, no more than about 25 μm, no more than about 20 μm, no more than about 15 μm, no more than about 10 μm, no more than about 9 μm, no more than about 8 μm, no more than about 7 μm, or no more than about 6 μm. Combinations of the above-referenced thicknesses are also possible (e.g., at least about 5 μm and no more than about 50 μm or at least about 10 μm and no more than about 40 μm), inclusive of all values and ranges therebetween. In some embodiments, the film can have a total thickness of about 5 μm, about 6 μm, about 7 μm, about 8 μm, about 9 μm, about 10 μm, about 15 μm, about 20 μm, about 25 μm, about 30 μm, about 35 μm, about 40 μm, about 45 μm, or about 50 μm.

In some embodiments, the first separator 150a and/or the second separator 150b can include a solid-state electrolyte sheet. In some embodiments, the solid-state electrolyte sheet can replace the first separator 150a and/or the second separator 150b. In some embodiments, the first separator 150a and/or the second separator 150b can be made with a separator film. In some embodiments, the first separator 150a and/or the second separator 150b can include a coating polymer, a spray polymer, and/or a print polymer. In some embodiments, the first separator 150a and/or the second separator 150b can include a ceramic powder. In some embodiments, the first separator 150a and/or the second separator 150b can be absent of a ceramic powder. In some embodiments, the first separator 150a and/or the second separator 150b can include a ceramic with a liquid electrolyte and/or a solid-state electrolyte.

The interlayer 160 can dissolve dendrites via voltage manipulation. In other words, current can be supplied to the interlayer 160, the anode 110, and/or the cathode 130 to create a potential difference between the interlayer 160 and the anode 110 or the interlayer 160 and the cathode 130 that dissolves dendrites that have formed in the interlayer 160. In some embodiments, the interlayer 160 can include a conductive layer. In some embodiments, the interlayer 160 can include a liquid electrolyte. In some embodiments, the interlayer 160 can include a solid-state electrolyte. In some embodiments, the interlayer 160 can include Ketjen Black, AA-stacked graphene, AB-stacked graphene, carbon, hard carbon, soft carbon, graphite, lithium iron phosphate (LFP), lithium manganese iron phosphate (LMFP), lithium manganese oxide (LMO), $LiNiO_2$ (LNO), nickel manganese cobalt (NMC), lithium nickel manganese oxide (LNMO), lithium cobalt oxide (LCO), Iron (III) fluoride ($FeF_3$), sulfur, vanadium (V) oxide ($V_2O_5$), bismuth trifluoride ($BiF_3$), iron (IV) sulfate ($FeS_2$), or any combination thereof. In some embodiments, the interlayer 160 can create a physical block that prevents vertical growth of the dendrite, such that the dendrite is forced to grow horizontally.

In some embodiments, the interlayer 160 can include an intercalate cathode (e.g., LMOP, LNO, NMC, LFP, LNMO, LCO, and/or LMFP). In some embodiments, the interlayer

160 can include a convertible cathode (e.g., $FeF_3$, sulfur, $V_2O_5$, $BiF_3$, $FeS_2$). In some embodiments, the interlayer 160 can include a high voltage bearable anode. In some embodiments, the interlayer 160 can include a traditional anode (e.g., hard carbon, graphite, and/or silicon). In some embodiments, the interlayer 160 can include a metal. In some embodiments, the interlayer 160 can include a metal alloy. In some embodiments, the metal alloy can include lithium, tin, aluminum, silver, and/or copper. In some embodiments, the interlayer 160 can include a metal oxide. In some embodiments, the metal oxide can include silicon oxide (SiO), zinc oxide (ZnO), copper oxide ($Cu_2O$), lithium titanate (LTO), and/or titanium (IV) oxide ($TiO_2$). In some embodiments, the interlayer 160 can include a semi-solid electrode. In some embodiments, the interlayer 160 can include a coating, a spray, and/or a print polymer. In some embodiments, the interlayer 160 can include a ceramic powder. In some embodiments, the interlayer 160 can include a premade film with a solid-state electrolyte.

In some embodiments, the interlayer 160 can include conductive materials. In some embodiments, the interlayer 160 can include allotropes of carbon including activated carbon, hard carbon, soft carbon, Ketjen, carbon black, graphitic carbon, carbon fibers, carbon microfibers, vapor-grown carbon fibers (VGCF), fullerenic carbons including "buckyballs", carbon nanotubes (CNTs), multiwall carbon nanotubes (MWNTs), single wall carbon nanotubes (SWNTs), graphene, graphene sheets or aggregates of graphene sheets, and materials comprising fullerenic fragments, or any combination thereof. In some embodiments, the interlayer 160 can include a solid-state electrode material. In some embodiments, the solid-state electrolyte can include an oxide-based electrolyte. In some embodiments, the solid-state electrolyte material can include lithium lanthanum zirconium oxide (LLZO), $Li_{1.3}Al_{0.3}Ti_{1.7}(PO_4)_3$ (LATP), lithium phosphorus oxynitride (LiPON), li-ion conducting solid-state electrolyte ceramics (LLTO), and/or $Li_3BO_3$—$Li_2SO_4$—$Li_2CO_3$ (LiBSCO). In some embodiments, the solid-state electrolyte material can include one or more oxide-based solid electrolyte materials including a garnet structure, a perovskite structure, a phosphate-based Lithium Super Ionic Conductor (LISICON) structure, a glass structure such as $La_{0.51}Li_{0.34}TiO_{2.94}$, $Li_{1.3}Al_{0.3}Ti_{1.7}(PO_4)_3$, $Li_{1.4}Al_{0.4}Ti_{1.6}(PO_4)_3$, $Li_7La_3Zr_2O_{12}$, $Li_{6.66}La_3Zr_{1.6}Ta_{0.4}O_{12.9}$(LLZO), $50Li_4SiO_4\cdot50Li_3BO_3$, $Li_{2.9}PO_{3.3}N_{0.46}$ (lithium phosphorousoxynitride, LiPON), $Li_{3.6}Si_{0.6}P_{0.4}O_4$, $Li_3BN_2$, $Li_3BO_3$—$Li_2SO_4$, and/or sulfide containing solid electrolyte materials including a thio-LISICON structure, a glassy structure and a glass-ceramic structure such as $Li_{1.07}Al_{0.69}Ti_{1.46}(PO_4)_3$, $Li_{1.5}Al_{0.5}Ge_{1.5}(PO_4)_3$, $Li_{10}GeP_2S_{12}$ (LGPS), $30Li_2S\cdot26B_2S_3\cdot44LiI$, $63Li_2S\cdot36SiS_2\cdot1Li_3PO_4$, $57Li_2S\cdot38SiS_2\cdot5Li_4SiO_4$, $70Li_2S\cdot30P_2S_5$, $50Li_4SiO_4\cdot50GeS_2$, $Li_7P_3S_{11}$, $Li_{3.25}P_{0.95}S_4$, and $Li_{9.54}Si_{1.74}P_{1.44}S_{11.7}Cl_{0.3}$, and/or closo-type complex hydride solid electrolyte, $LiBH_4$—$LiI$, $LiBH_4$—$LiNH_2$, $LiBH_4$—$P_2S_5$, $Li(CB_XH_{X+1})$—$LiI$, $Li(CB_9H_{10})$— and/or LiI. In some embodiments, the solid-state electrolyte material can be sulfide-based. In some embodiments, the solid-state electrolyte can include lithium phosphorus sulfide (LPS), $Li_{10}GeP_2S_{12}$ (LGPS), lithium tin phosphorus sulfide (LSPS), and/or $Li_{5.5}PS_{4.5}Cl_{1.5}$ (LPSCl). In some embodiments, the solid-state electrolyte material can include a complex hydride solid electrolyte. In some embodiments, the solid-state electrolyte material can include $LiBH_4$—$LiI$ and/or $LiBH_4$—$P_2S_5$.

In some embodiments, when the interlayer 160 includes a solid-state electrolyte, the interlayer 160 can have a porosity of at least about 0%, at least about 5%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, or at least about 90%. In some embodiments, when the interlayer 160 includes a solid-state electrolyte, the interlayer 160 can have a porosity of no more than about 95%, no more than about 90%, no more than about 85%, no more than about 80%, no more than about 75%, no more than about 70%, no more than about 65%, no more than about 60%, no more than about 55%, no more than about 50%, no more than about 45%, no more than about 40%, no more than about 35%, no more than about 30%, no more than about 25%, no more than about 20%, no more than about 15%, no more than about 10%, or no more than about 5%. Combinations of the above-referenced porosities are also possible (e.g., at least about 0% and no more than about 95% or at least about 10% and no more than about 50%), inclusive of all values and ranges therebetween. In some embodiments, when the interlayer includes a solid-state electrolyte, the interlayer 160 can have a porosity of about 0%, about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, or about 95%.

In some embodiments, when the interlayer 160 includes a liquid electrolyte, the interlayer 160 can have a porosity of at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, or at least about 90%. In some embodiments, when the interlayer 160 includes a liquid electrolyte, the interlayer 160 can have a porosity of no more than about 95%, no more than about 90%, no more than about 85%, no more than about 80%, no more than about 75%, no more than about 70%, no more than about 65%, no more than about 60%, no more than about 55%, no more than about 50%, no more than about 45%, no more than about 40%, no more than about 35%, no more than about 30%, no more than about 25%, no more than about 20%, or no more than about 15%. Combinations of the above-referenced porosities are also possible (e.g., at least about 0% and no more than about 95% or at least about 10% and no more than about 50%), inclusive of all values and ranges therebetween. In some embodiments, when the interlayer includes a liquid electrolyte, the interlayer 160 can have a porosity of about 10%, about 15%, about 20%, about 25%, about 30%, about 35%, about 40%, about 45%, about 50%, about 55%, about 60%, about 65%, about 70%, about 75%, about 80%, about 85%, about 90%, or about 95%.

In some embodiments, the interlayer 160 can be pre-coated onto the first separator 150a and/or the second separator 150b. In some embodiments, the interlayer 160 can aid in identifying a contamination amount of lithium or another metal via a BMS. The BMS can then add more voltage and current to the interlayer 160 to dissolve the contamination. The BMS can keep the state of charge (SOC) of the interlayer 160 between a lower bound (e.g., about 10%, about 15%, about 20%, about 25%, about 30%, about 35%, or about 40%, inclusive of all values and ranges therebetween) and an upper bound (e.g., about 60%, about 65%, about 70%, about 75%, about 80%, about 85%, or about 90%, inclusive of all values and ranges therebetween).

Keeping the interlayer 160 between a lower bound and an upper bound of voltage can aid in diminishing dendrite formation while the electrochemical cell 100 is not in use (i.e., via addition of voltage and/or current). In some embodiments, the interlayer 160 can include a tab (not shown) that can be used to monitor the voltage of the interlayer 160 while the electrochemical cell is hot pressed (e.g., via a two-sided hot press or a four-sided hot press with a jelly roll design to fit into a prismatic can).

In some embodiments, the voltage between the anode 110 and the interlayer 160 (and/or the voltage between the anode 110 and the cathode 130) can be kept above a threshold (e.g., about 2 V, about 2.1 V, about 2.2 V, about 2.3 V, about 2.4 V, about 2.5 V, about 2.6 V, about 2.7 V, about 2.8 V, about 2.9 V, about 3 V, about 3.1 V, about 3.2 V, about 3.3 V, about 3.4 V, about 3.5 V, about 3.6 V, about 3.7 V, about 3.8 V, about 3.9 V, about 4 V, about 4.1 V, about 4.2 V, about 4.3 V, about 4.4 V, about 4.5 V, about 4.6 V, about 4.7 V, about 4.8 V, about 4.9 V, about 5 V, about 5.1 V, about 5.2 V, about 5.3 V, about 5.4 V, about 5.5 V, about 5.6 V, about 5.7 V, about 5.8 V, about 5.9 V, or about 6 V, inclusive of all values and ranges therebetween). Keeping the cell voltage above a threshold can prevent dendrite formation. The inclusion of a high-stability salt in the electrolyte can facilitate the application of a high voltage (i.e., at least about 5 V) between the anode 110 and the interlayer 160.

In some embodiments, a high salt concentration (e.g., at least about 2 M, at least about 2.1 M, at least about 2.2 M, at least about 2.3 M, at least about 2.4 M, at least about 2.5 M, at least about 2.6 M, at least about 2.7 M, at least about 2.8 M, at least about 2.9 M, at least about 3 M, at least about 3.1 M, at least about 3.2 M, at least about 3.3 M, at least about 3.4 M, at least about 3.5 M, at least about 3.6 M, at least about 3.7 M, at least about 3.8 M, at least about 3.9 M, at least about 4 M, at least about 4.1 M, at least about 4.2 M, at least about 4.3 M, at least about 4.4 M, at least about 4.5 M, at least about 4.6 M, at least about 4.7 M, at least about 4.8 M, at least about 4.9 M, or at least about 5 M) in the electrolyte can cause side reactions at higher voltages. Maintaining the voltage difference between the anode 110 and the interlayer 160 can prevent these side reactions. Higher stability carbons in the interlayer 160 (e.g., ketjen, graphite, graphene, CNT, and/or hard carbon). In some embodiments, a high-voltage stable metal (e.g., aluminum, gold, platinum) can be used to promote stability in the interlayer 160.

At a low state of charge (SOC), the interlayer 160 can have a voltage lower than a voltage necessary to dissolve dendrites. In some embodiments, a BMS can be activated to provide extra voltage to the interlayer 160 to ensure the voltage is high enough for metal dissolution. If no extra power is available to deliver to the interlayer 160, cycling conditions can be narrowed (e.g., to about 5%, about 10%, about 15%, or about 20% SOC, inclusive of all values and ranges therebetween) in order to limit the formation of dendrites. In some embodiments, the voltage between the anode 110 and the interlayer 160 can be kept above the threshold value by monitoring the potential of the anode 110 and the interlayer 160 and controlling the SOC (i.e., by monitoring and adjusting the cycling). In some embodiments, the voltage between the anode 110 and the interlayer 160 can be maintained by keeping a fixed SOC (e.g., at least about 15%, at least about 20%, at least about 25%, inclusive of all values and ranges therebetween).

Figure 2A:
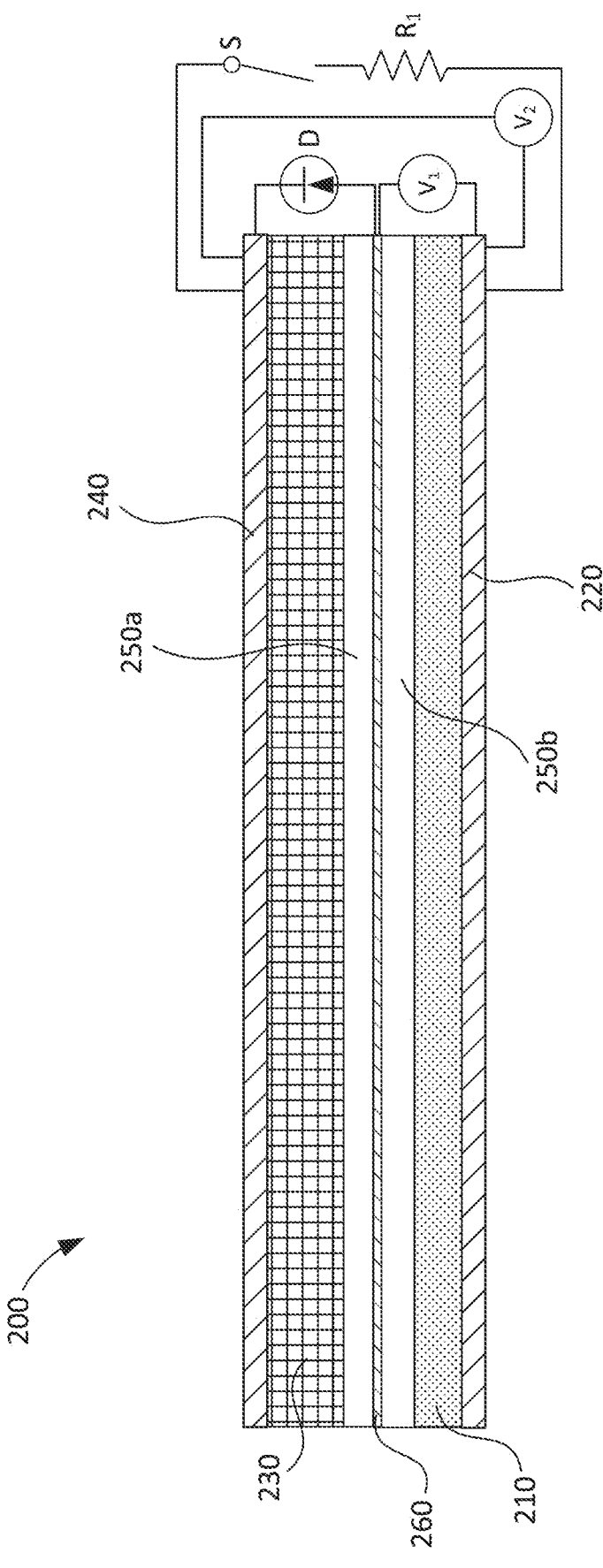
Figure 2B:
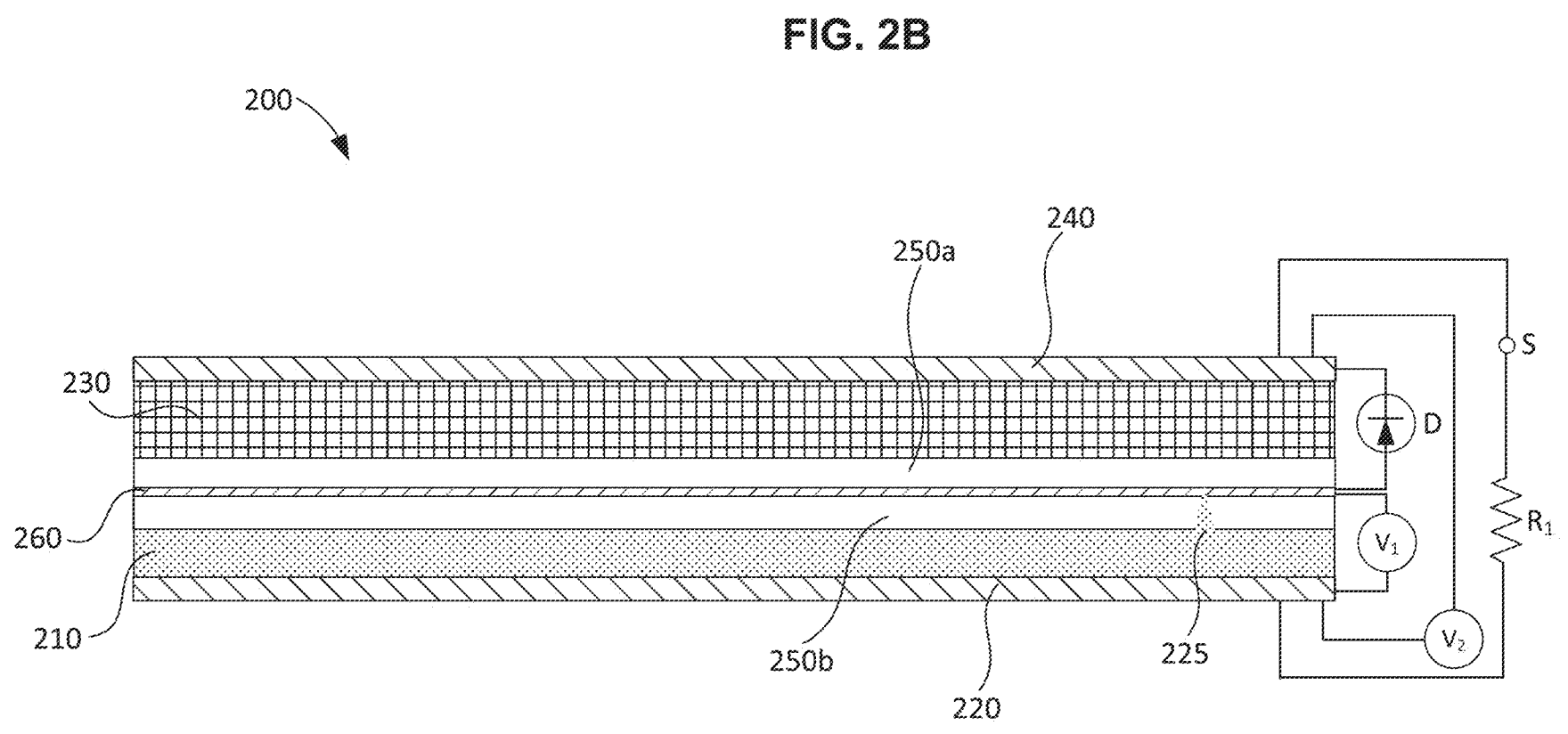

FIGS. 2A-2B are illustrations of an electrochemical cell 200 with an interlayer 260, according to an embodiment. As shown, the electrochemical cell 200 includes an anode 210 disposed on an anode current collector 220, a cathode 230 disposed on a cathode current collector 240, with a first separator 250a and a second separator 250b disposed between the anode 210 and the cathode 230. The interlayer 260 is disposed between the first separator 250a and the second separator 250b. In some embodiments, the anode 210, the anode current collector 220, the cathode 230, the cathode current collector 240, the first separator 250a, the second separator 250b, and the interlayer 260 can be the same or substantially similar to the anode 110, the anode current collector 120, the cathode 130, the cathode current collector 140, the first separator 150a, the second separator 150b, and the interlayer 160, as described above with reference to FIG. 1. Thus, certain aspects of the anode 210, the anode current collector 220, the cathode 230, the cathode current collector 240, the first separator 250a, the second separator 250b, and the interlayer 260 are not described in greater detail herein.

As shown, a voltage $V_1$ is measured between the anode current collector 220 and the interlayer 260, a voltage $V_2$ is measured between the anode current collector 220 and the cathode current collector 240. As shown, a diode D is coupled to the interlayer 260 and the cathode current collector 240 to direct the flow of current in a single direction from the interlayer 260 to the cathode current collector 240. In some embodiments, the diode D can be replaced by a resistor, a fuse, and/or a transistor (e.g., a bi-junction transistor, FET). The anode current collector 220 is coupled to the cathode current collector 240 via a resistor $R_1$ and a switch S.

In FIG. 2A, the switch S is open and the electrochemical cell 200 is functioning normally. In FIG. 2B, a dendrite 225 has formed. The dendrite 225 creates a short circuit between the anode 220 and the interlayer 260, such that the voltage $V_1$ is reduced below a threshold value. Upon detecting that $V_1$ is below the threshold value, the switch S closes, and the electrochemical cell 200 discharges through the resistor $R_1$. In some embodiments, the switch S can be closed during charge of the electrochemical cell 200. In some embodiments, the switch S can be closed during discharge of the electrochemical cell 200. In some embodiments, the threshold value of the voltage $V_1$ can be about 0.001 V, about 0.002 V, about 0.003 V, about 0.004 V, about 0.005 V, about 0.006 V, about 0.007 V, about 0.008 V, about 0.009 V, about 0.01 V, about 0.02 V, about 0.03 V, about 0.04 V, about 0.05 V, about 0.06 V, about 0.07 V, about 0.08 V, about 0.09 V, about 0.1 V, about 0.2 V, about 0.3 V, about 0.4 V, about 0.5 V, about 0.6 V, about 0.7 V, about 0.8 V, about 0.9 V, or about 1 V, inclusive of all values and ranges therebetween.

In some embodiments, multiple electrochemical cells can be connected in series and/or in parallel. As shown, when the switch S closes, a hardware triggered discharge can easily be used to automatically apply an external load to quickly discharge the electrochemical cell 200. This discharge can benefit the functional safety of the electrochemical cell 200. The Failure-in-time (FIT) number of the electrochemical cell 200 or multiple electrochemical cells can be detected for the reliability of detection of dendrites (e.g., based on a contaminant concentration (ppm) value corresponding to a particular voltage). Each electrochemical cell connected in parallel can require a separate monitor. This would increase the controls cost of such a system without individual hardware detection. In some embodiments all of the interlayers from parallel cells can be connected in parallel. Using a switching device can allow duplication of single components (i.e., single transistors are cheaper than BMS monitoring chips). When electrochemical cells are connected fully in series, a battery measurement chip can be used, connecting $V_1$ to a first channel and connecting $V_2$ to a next higher channel. In some embodiments, the BMS can measure/calculate a voltage $V_f$, equal to $V_2-V_1$ to allow a control decision to be made to protect the system. The BMS can react to a short circuit detection via standard balance circuitry or through additional controls. Low integration level monitors can be appropriate for such measurements, as they have a lower controls overhead and cost than more automated BMS devices. Using multiple chip sets can also create redundant safety measurements for voltage and temperature sensing giving additional flexibility to the safety design.

The resistor $R_1$ eases or reduces the flow of current through a direct path between the anode 210 and the cathode 230. In some embodiments, the current flowing along the closed switch S can be used to power an external device. In some embodiments, the current flowing along the closed switch S can be used to provide heat to an external device or heater. As shown, the diode D connects the interlayer 260 to the cathode current collector 240. In some embodiments, the diode D can connect the interlayer 260 to the anode current collector 220 while the voltage is measured between the interlayer 260 and the cathode current collector 240. In other words, the electrochemical energy can flow in the opposite direction to what is depicted in FIGS. 2A-2B.

In some embodiments, the anode 210 can include a semi-solid anode. In some embodiments, the anode 210 can include a conventional solid anode (i.e., with a binder). In some embodiments, the cathode 230 can include a semi-solid cathode. In some embodiments, the cathode 230 can include a conventional solid cathode (i.e., with a binder).

In some embodiments, the electrochemical cell 200 can be subject to high-potential (hipot) testing. In some embodiments, the cathode 230 can be subject to hipot testing. In some embodiments, the anode 210 can be subject to hipot testing. In some embodiments, a full hipot of the electrochemical cell 200 can be conducted with the interlayer 260 acting as a reference layer. In some embodiments, the hipot testing can be conducted with conventional electrode layers.

In some embodiments, the first separator 250a and/or the second separator 250b can be composed of a material that has minimal heat deformation. For example, the first separator 250a and/or the second separator 250b can be composed of cellulose, a cellulosic compound, a thermos-cured resin, a high melting temperature polymer, polyimide, or any combination thereof. In some embodiments, the first separator 250a and/or the second separator 250b can have a melting temperature of at least about 100° C., at least about 110° C., at least about 120° C., at least about 130° C., at least about 140° C., at least about 150° C., at least about 160° C., at least about 170° C., at least about 180° C., at least about 190° C., at least about 200° C., at least about 210° C., at least about 220° C., at least about 230° C., at least about 240° C., at least about 250° C., at least about 260° C., at least about 270° C., at least about 280° C., at least about 290° C., or at least about 300° C. This level of heat resistance prevents shrinkage by the first separator 250a and/or the second separator 250b. In some embodiments, the electrochemical cell 200 can be formed such that the first separator 250a and the second separator 250b do not contact pouch film encasing the electrochemical cell 200. Since dendrite formation is prevented, the first separator 250a and the second separator 250b need not extend substantially outward from the anode current collector 220 or the cathode current collector 240.

In some embodiments, the interlayer 260 can have a thickness of at least about 500 nm, at least about 1 μm, at least about 2 μm, at least about 3 μm, at least about 4 μm, at least about 5 μm, at least about 6 μm, at least about 7 μm, at least about 8 μm, at least about 9 μm, at least about 10 μm, at least about 20 μm, at least about 30 μm, at least about 40 μm, at least about 50 μm, at least about 60 μm, at least about 70 μm, at least about 80 μm, at least about 90 μm, at least about 100 μm, at least about 150 μm, at least about 200 μm, at least about 250 μm, at least about 300 μm, at least about 350 μm, at least about 400 μm, at least about 450 μm, at least about 500 μm, at least about 550 μm, at least about 600 μm, at least about 650 μm, at least about 700 μm, at least about 750 μm, at least about 800 μm, at least about 850 μm, at least about 900 μm, or at least about 950 μm. In some embodiments, the interlayer 260 can have a thickness of no more than about 1,000 μm, no more than about 950 μm, no more than about 900 μm, no more than about 850 μm, no more than about 800 μm, no more than about 750 μm, no more than about 700 μm, no more than about 650 μm, no more than about 600 μm, no more than about 550 μm, no more than about 500 μm, no more than about 450 μm, no more than about 400 μm, no more than about 350 μm, no more than about 300 μm, no more than about 250 μm, no more than about 200 μm, no more than about 150 μm, no more than about 100 μm, no more than about 90 μm, no more than about 80 μm, no more than about 70 μm, no more than about 60 μm, no more than about 50 μm, no more than about 40 μm, no more than about 30 μm, no more than about 20 μm, no more than about 10 μm, no more than about 9 μm, no more than about 8 μm, no more than about 7 μm, no more than about 6 μm, no more than about 5 μm, no more than about 4 μm, no more than about 3 μm, no more than about 2 μm, or no more than about 1 μm. Combinations of the above-referenced thickness values are also possible (e.g., at least about 500 nm and no more than about 1,000 μm or at least about 200 μm and no more than about 700 μm), inclusive of all values and ranges therebetween. In some embodiments, the interlayer 260 can have a thickness of about 10 μm, about 20 μm, about 30 μm, about 40 μm, about 50 μm, about 60 μm, about 70 μm, about 80 μm, about 90 μm, about 100 μm, about 150 μm, about 200 μm, about 250 μm, about 300 μm, about 350 μm, about 400 μm, about 450 μm, about 500 μm, about 550 μm, about 600 μm, about 650 μm, about 700 μm, about 750 μm, about 800 μm, about 850 μm, about 900 μm, about 950 μm, or about 1,000 μm.

In some embodiments, the interlayer 260 can have a conductivity of at least about $1\times10^{-3}$ S/m, at least about $2\times10^{-3}$ S/m, at least about $3\times10^{-3}$ S/m, at least about $4\times10^{-3}$ S/m, at least about $5\times10^{-3}$ S/m, at least about $6\times10^{-3}$ S/m, at least about $7\times10^{-3}$ S/m, at least about $8\times10^{-3}$ S/m, at least about $9\times10^{-3}$ S/m, at least about $1\times10^{-2}$ S/m, at least about $2\times10^{-2}$ S/m, at least about $3\times10^{-2}$ S/m, at least about $4\times10^{-2}$ S/m, at least about $5\times10^{-2}$ S/m, at least about $6\times10^{-2}$ S/m, at least about $7\times10^{-2}$ S/m, at least about $8\times10^{-2}$ S/m, at least about $9\times10^{-2}$ S/m, at least about 0.1 S/m, at least about 0.2 S/m, at least about 0.3 S/m, at least about 0.4 S/m, at least about 0.5 S/m, at least about 0.6 S/m, at least about 0.7 S/m, at least about 0.8 S/m, at least about 0.9 S/m. In some embodiments, the interlayer 260 can have a conductivity of no more than about 1 S/m, no more than about 0.9 S/m, no more than about 0.8 S/m, no more than about 0.7 S/m, no more than about 0.6 S/m, no more than about 0.5 S/m, no more than about 0.4 S/m, no more than about 0.3 S/m, no more than about 0.2 S/m, no more than about 0.1 S/m, no more than about $9\times10^{-2}$ S/m, no more than about $8\times10^{-2}$ S/m, no more than about $7\times10^{-2}$ S/m, no more than about $6\times10^{-2}$ S/m, no more than about $5\times10^{-2}$ S/m, no more than about $4\times10^{-2}$ S/m, no more than about $3\times10^{-2}$ S/m, no more than about $2\times10^{-2}$ S/m, no more than about $1\times10^{-2}$ S/m, no more than about $9\times10^{-3}$ S/m, no more than about $8\times10^{-3}$ S/m, no more than about $7\times10^{-3}$ S/m, no more than about $6\times10^{-3}$ S/m, no more than about $5\times10^{-3}$ S/m, no more than about $4\times10^{-3}$ S/m, no more than about $3\times10^{-3}$ S/m, or no more than about $2\times10^{-3}$ S/m. Combinations of the above-referenced conductivity values are also possible (e.g., at least about $1\times10^{-3}$ S/m and no more than about 1 S/m or at least about at least about $2\times10^{-3}$ S/m and no more than about 0.1 S/cm), inclusive of all values and ranges therebetween. In some embodiments, the interlayer 260 can have a conductivity of about $1\times10^{-3}$ S/m, about $2\times10^{-3}$ S/m, about $3\times10^{-3}$ S/m, about $4\times10^{-3}$ S/m, about $5\times10^{-3}$ S/m, about $6\times10^{-3}$ S/m, about $7\times10^{-3}$ S/m, about $8\times10^{-3}$ S/m, about $9\times10^{-3}$ S/m, about $1\times10^{-2}$ S/m, about $2\times10^{-2}$ S/m, about $3\times10^{-2}$ S/m, about $4\times10^{-2}$ S/m, about $5\times10^{-2}$ S/m, about $6\times10^{-2}$ S/m, about $7\times10^{-2}$ S/m, about $8\times10^{-2}$ S/m, about $9\times10^{-2}$ S/m, about 0.1 S/m, about 0.2 S/m, about 0.3 S/m, about 0.4 S/m, about 0.5 S/m, about 0.6 S/m, about 0.7 S/m, about 0.8 S/m, about 0.9 S/m, or about 1 S/m.

In some embodiments, the interlayer 260 can be electrically coupled to a cathode external to the electrochemical cell 200. In some embodiments, the external cathode can have a higher resistance than the interlayer 260. In some embodiments, the interlayer 260 can be electrically coupled to an anode external to the electrochemical cell 200. In some embodiments, the external anode can have a higher resistance than the interlayer 260. In some embodiments, the interlayer 260 can be electrically connected to an external electrochemical cell. In some embodiments, the interlayer 260 can be electrically connected to an external capacitor. In some embodiments, the interlayer 260 can be electrically connected to an external resistor.

In some embodiments, the potential of the interlayer 260 can be manipulated to dissolve or oxidize the dendrite 225 as the dendrite 225 penetrates the interlayer 260. This is particularly valid when the interlayer 260 includes cathode materials therein. In some embodiments, the voltage difference between the anode 210 and the interlayer 260 can be tuned to at least about 1 V, at least about 1.5 V, at least about 2 V, at least about 2.5 V, at least about 3 V, at least about 3.5 V, at least about 4 V, or at least about 4.5 V. In some embodiments, the voltage difference between the anode 210 and the interlayer 260 can be tuned to no more than about 5 V, no more than about 4.5 V, no more than about 4 V, no more than about 3.5 V, no more than about 3 V, no more than about 2.5 V, no more than about 2 V, or no more than about 1.5 V. Combinations of the above-referenced voltage ranges are also possible (e.g., at least about 1 V and no more than about 5 V or at least about 2 V and no more than about 4 V), inclusive of all values and ranges therebetween. In some embodiments, the voltage difference between the anode 210 and the interlayer 260 can be tuned to about 1 V, about 1.5 V, about 2 V, about 2.5 V, about 3 V, about 3.5 V, about 4 V, about 4.5 V, about 5 V, about 5.5 V, or about 6 V.

In some embodiments, the voltage difference between the cathode 230 and the interlayer 260 can be tuned to at least about 1 V, at least about 1.5 V, at least about 2 V, at least about 2.5 V, at least about 3 V, at least about 3.5 V, at least about 4 V, at least about 4.5 V, at least about 5 V, or at least about 5.5 V. In some embodiments, the voltage difference between the cathode 230 and the interlayer 260 can be tuned to no more than about 6 V, no more than about 5.5 V, no more than about 5 V, no more than about 4.5 V, no more than about 4 V, no more than about 3.5 V, no more than about 3 V, no more than about 2.5 V, no more than about 2 V, or no more than about 1.5 V. Combinations of the above-referenced voltage ranges are also possible (e.g., at least about 1

V and no more than about 5 V or at least about 2 V and no more than about 4 V), inclusive of all values and ranges therebetween. In some embodiments, the voltage difference between the cathode 230 and the interlayer 260 can be tuned to about 1 V, about 1.5 V, about 2 V, about 2.5 V, about 3 V, about 3.5 V, about 4 V, about 4.5 V, about 5 V, about 5.5 V, or about 6 V.

In some embodiments, the impedance through the structural components of the electrochemical cell 200 (i.e., the anode 210, the anode current collector 220, the cathode 230, the cathode current collector 240, and the separator 250) can be less than the impedance through the resistor $R_1$. In some embodiments, the impedance through the structural components of the electrochemical cell 200 can be less than the impedance through the diode D. In some embodiments, the ratio of the impedance through the structural components of the electrochemical cell 200 to the impedance through the resistor $R_1$ can be less than about 1:2, less than about 1:3, less than about 1:4, less than about 1:5, less than about 1:6, less than about 1:7, less than about 1:8, less than about 1:9, less than about 1:10, less than about 1:20, less than about 1:30, less than about 1:40, less than about 1:50, less than about 1:60, less than about 1:70, less than about 1:80, less than about 1:90, or less than about 1:100. In some embodiments, the ratio of the impedance through the structural components of the electrochemical cell 200 to the impedance through the diode D can be less than about 1:2, less than about 1:3, less than about 1:4, less than about 1:5, less than about 1:6, less than about 1:7, less than about 1:8, less than about 1:9, less than about 1:10, less than about 1:20, less than about 1:30, less than about 1:40, less than about 1:50, less than about 1:60, less than about 1:70, less than about 1:80, less than about 1:90, or less than about 1:100.

In some embodiments, the first separator 250$a$ can have a first length and the second separator 250$b$ can have a second length, the second length greater than the first length. In some embodiments, the first separator 250$a$ can have a first width and the second separator 250$b$ can have a second width, the second width greater than the first width. In some embodiments, the interlayer 260 can have a length and/or width greater than the first width and/or the second width, such that a portion of the interlayer 260 is adjacent to the second separator 250$b$ but not the first separator 250$a$. In some embodiments, a tab (not shown) can be attached (e.g., via welding) to the interlayer 260. In some embodiments, the tab can be attached to a portion of the interlayer 260 extending beyond the first separator 250$a$.

In some embodiments, a portion of the first separator 250$a$ and/or the second separator 250$b$ can be removed (e.g., the first separator 250$a$ and/or the second separator 250$b$ can be punched), such that the tab can be attached to the interlayer 260 through the removed section of the first separator 250$a$ and/or the second separator 250$b$. In some embodiments, the electrochemical cell 200 can be contained inside a pouch (not shown). In some embodiments, the pouch can include a first film attached to the anode current collector 220 and a second film attached to the cathode current collector 240. In some embodiments, portion of the pouch can be removed (e.g., punched), such that the tab can be attached to the interlayer 260 through the removed section of the pouch.

Figure 3A:
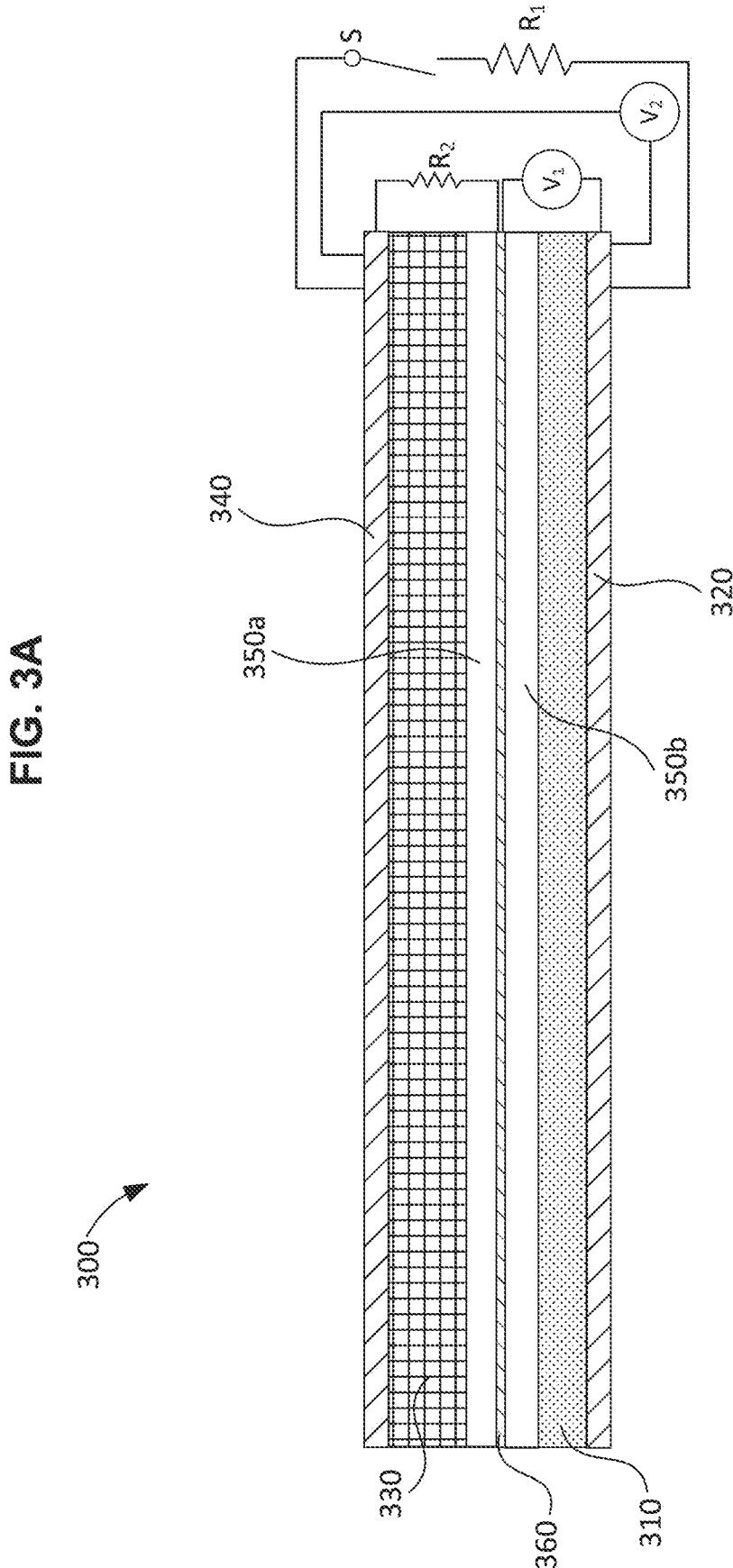
Figure 3B:
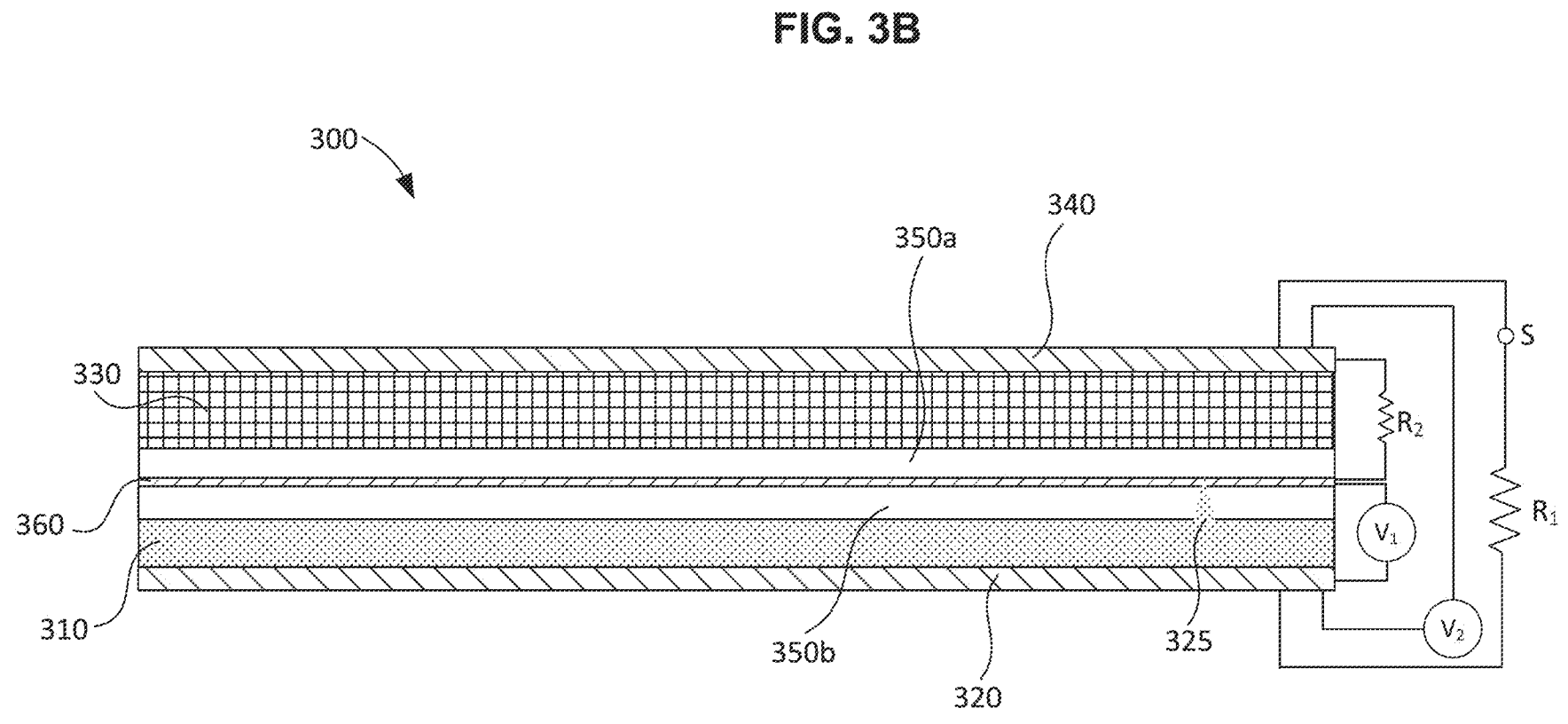

FIGS. 3A-3B are illustrations of an electrochemical cell 300 with an interlayer 360, according to an embodiment. As shown, the electrochemical cell 300 includes an anode 310 disposed on an anode current collector 320, a cathode 330 disposed on a cathode current collector 340, with a first separator 350$a$ and a second separator 350$b$ disposed between the anode 310 and the cathode 330. The interlayer 360 is disposed between the first separator 350a and the second separator 350b. In some embodiments, the anode 310, the anode current collector 320, the cathode 330, the cathode current collector 340, the first separator 350a, the second separator 350b, and the interlayer 360 can be the same or substantially similar to the anode 210, the anode current collector 220, the cathode 230, the cathode current collector 240, the first separator 250a, the second separator 250b, and the interlayer 260, as described above with reference to FIGS. 2A-2B. Thus, certain aspects of the anode 310, the anode current collector 320, the cathode 330, the cathode current collector 340, the first separator 350a, the second separator 350b, and the interlayer 360 are not described in greater detail herein.

As shown, a voltage $V_1$ is measured between the anode current collector 320 and the interlayer 360, a voltage $V_2$ is measured between the anode current collector 320 and the cathode current collector 340. As shown, the anode current collector 320 is coupled to the cathode current collector 340 via a resistor $R_1$ and a switch S. As shown, a resistor $R_2$ is coupled to the interlayer 360 and the cathode current collector 340 to resist current flow in a direction from the interlayer 360 to the cathode current collector 340.

In FIG. 3A, the switch S is open and the electrochemical cell 300 is functioning normally. In FIG. 3B, a dendrite 325 has formed. The dendrite 325 creates a short circuit between the anode 320 and the interlayer 360, such that the voltage $V_1$ is reduced below a threshold value. Upon detecting that $V_1$ is below the threshold value, the switch S closes (see FIG. 3B), and the electrochemical cell 300 discharges through the resistor $R_1$.

As shown, the resistor $R_1$ connects the interlayer 360 to the cathode current collector 340. In some embodiments, the resistor $R_1$ can connect the interlayer 360 to the anode current collector 320 while the voltage is measured between the interlayer 360 and the cathode current collector 340. In other words, the electrochemical energy can flow in the opposite direction to what is depicted in FIGS. 3A-3B.

Figure 4A:
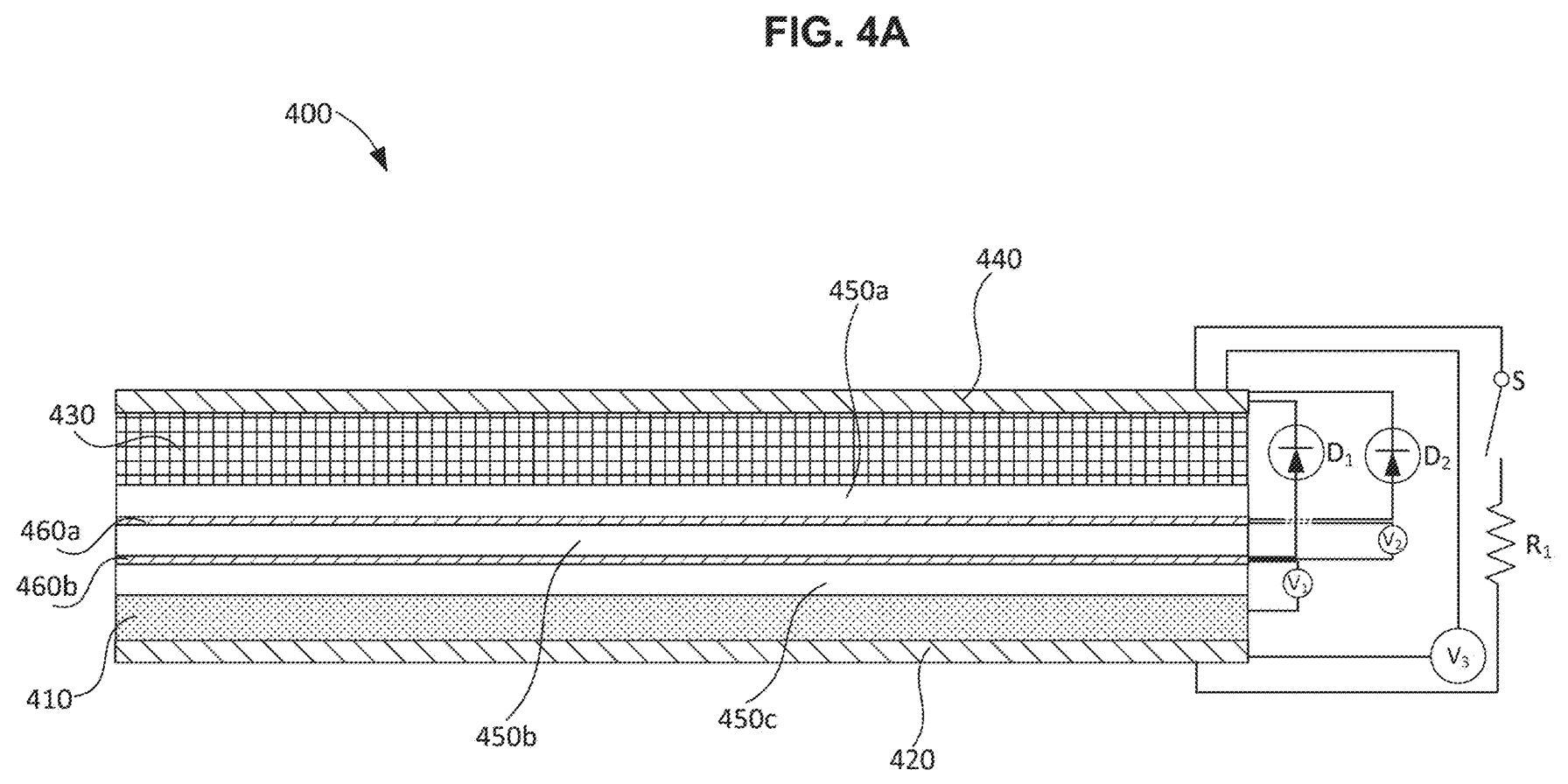
Figure 4B:
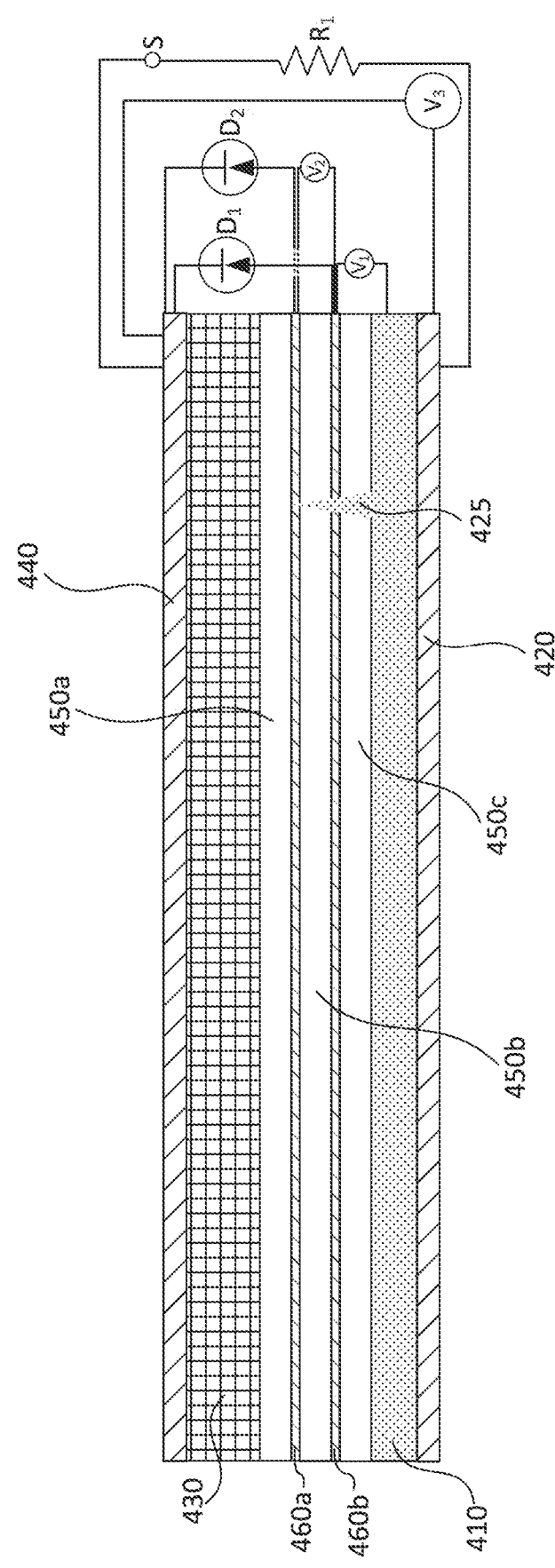

FIGS. 4A-4B are illustrations of an electrochemical cell 400 with multiple interlayers, according to an embodiment. As shown, the electrochemical cell 400 includes an anode 410 disposed on an anode current collector 420, a cathode 430 disposed on a cathode current collector 440, with a first separator 450a, a second separator 450b, and a third separator 450c disposed between the anode 410 and the cathode 430. A first interlayer 460a is disposed between the first separator 450a and the second separator 450b. A second interlayer 460b is disposed between the second separator 450b and the third separator 450c. In some embodiments, the anode 410, the anode current collector 420, the cathode 430, the cathode current collector 440, the first separator 450a, the second separator 450b, and the first interlayer 460a can be the same or substantially similar to the anode 210, the anode current collector 220, the cathode 230, the cathode current collector 240, the first separator 250a, the second separator 250b, and the interlayer 260, as described above with reference to FIGS. 2A-2B. Thus, certain aspects of the anode 410, the anode current collector 420, the cathode 430, the cathode current collector 440, the first separator 450a, the second separator 450b, and the first interlayer 460a are not described in greater detail herein.

As shown, a voltage $V_1$ is measured between the anode current collector 420 and the second interlayer 460b. A voltage $V_2$ is measured between the second interlayer 460b and the first interlayer 460a. As shown, a first diode $D_1$ is coupled to the second interlayer 460b and the cathode current collector 440 to direct the flow of current in a single direction from the second interlayer 460 to the cathode current collector 440. As shown, a second diode $D_2$ is coupled to the first interlayer 460a and the cathode 440. The anode current collector 420 is coupled to the cathode current collector 440 via a resistor $R_1$ and a switch S.

In FIG. 4A, the switch S is open and the electrochemical cell 400 is functioning normally. In FIG. 4B, a dendrite 425 has formed. The dendrite 425 creates a short circuit between the anode 420 and the first interlayer 460a and/or the second interlayer 460b, such that the voltage $V_1$ and/or the voltage $V_2$ are reduced below a threshold value. In some embodiments, a BMS can redirect the flow of current based on $V_1$ decreasing to less than a threshold value. In some embodiments, the BMS can redirect the flow of current based on $V_2$ decreasing to less than a threshold value. In some embodiments, the BMS can redirect the flow of current based on $(V_1+V_2)$ decreasing to less than a threshold value. In some embodiments, the threshold value can be about 0.001 V, about 0.002 V, about 0.003 V, about 0.004 V, about 0.005 V, about 0.006 V, about 0.007 V, about 0.008 V, about 0.009 V, about 0.01 V, about 0.02 V, about 0.03 V, about 0.04 V, about 0.05 V, about 0.06 V, about 0.07 V, about 0.08 V, about 0.09 V, about 0.1 V, about 0.2 V, about 0.3 V, about 0.4 V, about 0.5 V, about 0.6 V, about 0.7 V, about 0.8 V, about 0.9 V, or about 1 V, inclusive of all values and ranges therebetween.

As shown, the electrochemical cell 400 includes 3 separators 450a, 450b, 450c (collectively referred to as separators 450). In some embodiments, the electrochemical cell 400 can include at least about 3, at least about 4, at least about 5, at least about 6, at least about 7, at least about 8, at least about 9, at least about 10, at least about 15, at least about 20, at least about 25, at least about 30, at least about 35, at least about 40, at least about 45, at least about 50, at least about 55, at least about 60, at least about 65, at least about 70, at least about 75, at least about 80, at least about 85, at least about 90, or at least about 95 separators 450. In some embodiments, the electrochemical cell 400 can include no more than about 100, no more than about 95, no more than about 90, no more than about 85, no more than about 80, no more than about 75, no more than about 70, no more than about 65, no more than about 60, no more than about 55, no more than about 50, no more than about 45, no more than about 40, no more than about 35, no more than about 30, no more than about 25, no more than about 20, no more than about 15, no more than about 10, no more than about 9, no more than about 8, no more than about 7, no more than about 6, no more than about 5, or no more than about 4 separators 450. Combinations of the above-referenced numbers of separators 450 are also possible (e.g., at least about 3 and no more than about 100 or at least about 10 and no more than about 40), inclusive of all values and ranges therebetween. In some embodiments, the electrochemical cell 400 can include about 3, about 4, about 5, about 6, about 7, about 8, about 9, about 10, about 15, about 20, about 25, about 30, about 35, about 40, about 45, about 50, about 55, about 60, about 65, about 70, about 75, about 80, about 85, about 90, about 95, or about 100 separators 450.

As shown, the electrochemical cell 400 includes 2 interlayers 460a, 460b (collectively referred to as interlayers 460). Multiple interlayers 460 allow for multiple points along the electrochemical cell, where voltages and voltage differences can be measured. In some embodiments, the electrochemical cell 400 can include at least about 2, at least about 3, at least about 4, at least about 5, at least about 6, at least about 7, at least about 8, at least about 9, at least about 10, at least about 15, at least about 20, at least about 25, at least about 30, at least about 35, at least about 40, at least about 45, at least about 50, at least about 55, at least about 60, at least about 65, at least about 70, at least about 75, at least about 80, at least about 85, at least about 90, or at least about 95 interlayers 460. In some embodiments, the electrochemical cell 400 can include no more than about 100, no more than about 95, no more than about 90, no more than about 85, no more than about 80, no more than about 75, no more than about 70, no more than about 65, no more than about 60, no more than about 55, no more than about 50, no more than about 45, no more than about 40, no more than about 35, no more than about 30, no more than about 25, no more than about 20, no more than about 15, no more than about 10, no more than about 9, no more than about 8, no more than about 7, no more than about 6, no more than about 5, no more than about 4, or no more than about 3 interlayers 460. Combinations of the above-referenced numbers of interlayers 460 are also possible (e.g., at least about 3 and no more than about 100 or at least about 10 and no more than about 40), inclusive of all values and ranges therebetween. In some embodiments, the electrochemical cell 400 can include about 3, about 4, about 5, about 6, about 7, about 8, about 9, about 10, about 15, about 20, about 25, about 30, about 35, about 40, about 45, about 50, about 55, about 60, about 65, about 70, about 75, about 80, about 85, about 90, about 95, or about 100 interlayers 460.

As shown, the diode D$_1$ connects the second interlayer 460*b* to the cathode current collector 440 and the diode D$_2$ connects the first interlayer 460*a* to the cathode current collector 440. In some embodiments, the diode D$_1$ can connect the first interlayer 460*a* to the anode current collector 420 and the diode D$_2$ can connect the second interlayer 460*b* to the anode current collector 420 while voltage is measured between the first interlayer 460*a* and the second interlayer 460*b* and between the first interlayer 460*a* and the cathode 430. In other words, the electrochemical energy can flow in the opposite direction to what is depicted in FIGS. 4A-4B.

In some embodiments, the separator 450*a*, the separator 450*b*, and/or the separator 450*c* can include a solid-state electrolyte. In some embodiments, the solid-state electrolyte layer can be incorporated into the electrochemical cell 400 instead of the separator 450*a*, the separator 450*b*, and/or the separator 450*c*. In some embodiments, the separator 450*b* can have a lower melting temperature than the separator 450*a*. In some embodiments, the separator 450*c* can have a lower melting temperature than the separator 450*a*. In some embodiments, the separator 450*c* can have a lower melting temperature than the separator 450*a*. In some embodiments, the separator 450*a*, the separator 450*b*, and/or the separator 450*c* can include a gel electrolyte. In some embodiments, the gel electrolyte can be included in the electrochemical cell 400 instead of either of the separators 450. In some embodiments, either of the separators 450 can include non-ionic conductive powders.

In some embodiments, the resistance across the diode D$_1$ can be greater than the resistance across the diode D$_2$. This allows more current to flow through the interlayer 460*a* than through the interlayer 460*b*, which can cause a dendrite that has penetrated the interlayer 460*b* to dissipate more rapidly. In some embodiments, a V$_1$ measurement of zero can cause a 'caution' alert to be sent to a user (e.g., via a BMS). For example, the caution can be a yellow light. In some embodiments, a V$_2$ measurement of zero can cause a 'warning' or 'danger' alert to be sent to the user. For example, a red light can be switched on for the user to see. In some embodiments, a V$_2$ measurement of zero can trigger safety actions. In some embodiments, the safety actions can include an external short circuit through a BMS. In some embodiments, the safety actions can include a rerouting of current through a heater (e.g., via a BMS).

In some embodiments, the separator 450*b* and/or the separator 450*c* can have a thickness of at least about 0.2 μm, at least about 0.3 μm, at least about 0.4 μm, at least about 0.5 μm, at least about 0.6 μm, at least about 0.7 μm, at least about 0.8 μm, at least about 0.9 μm, at least about 1 μm, at least about 1.5 μm, at least about 2 μm, or at least about 2.5 μm. In some embodiments, the separator 450*b* and/or separator 450*c* can have a thickness of no more than about 3 μm, no more than about 2.5 μm, no more than about 2 μm, no more than about 1.5 μm, no more than about 1 μm, no more than about 0.9 μm, no more than about 0.8 μm, no more than about 0.7 μm, no more than about 0.6 μm, no more than about 0.5 μm, no more than about 0.4 μm, or no more than about 0.3 μm. Combinations of the above-referenced thickness values are also possible (e.g., at least about 0.2 μm and no more than about 3 μm or at least about 0.5 μm and no more than about 1 μm), inclusive of all values and ranges therebetween. In some embodiments, the separator 450*b* and/or the separator 450*c* can have a thickness of about 0.2 μm, about 0.3 μm, about 0.4 μm, about 0.5 μm, about 0.6 μm, about 0.7 μm, about 0.8 μm, about 0.9 μm, about 1 μm, about 1.5 μm, about 2 μm, about 2.5 μm, or about 3 μm.

In some embodiments, the separator 450*b* and/or separator 450*c* can be excluded from the electrochemical cell 400. For example, the electrochemical cell 400 can include lithium metal anodes with or without mesh type current collectors. Lithium metal can be filled into the mesh current collector. In such a case, the V$_1$ monitoring capability is lost, but V$_2$ can still be monitored for safety purposes.

Figure 5:
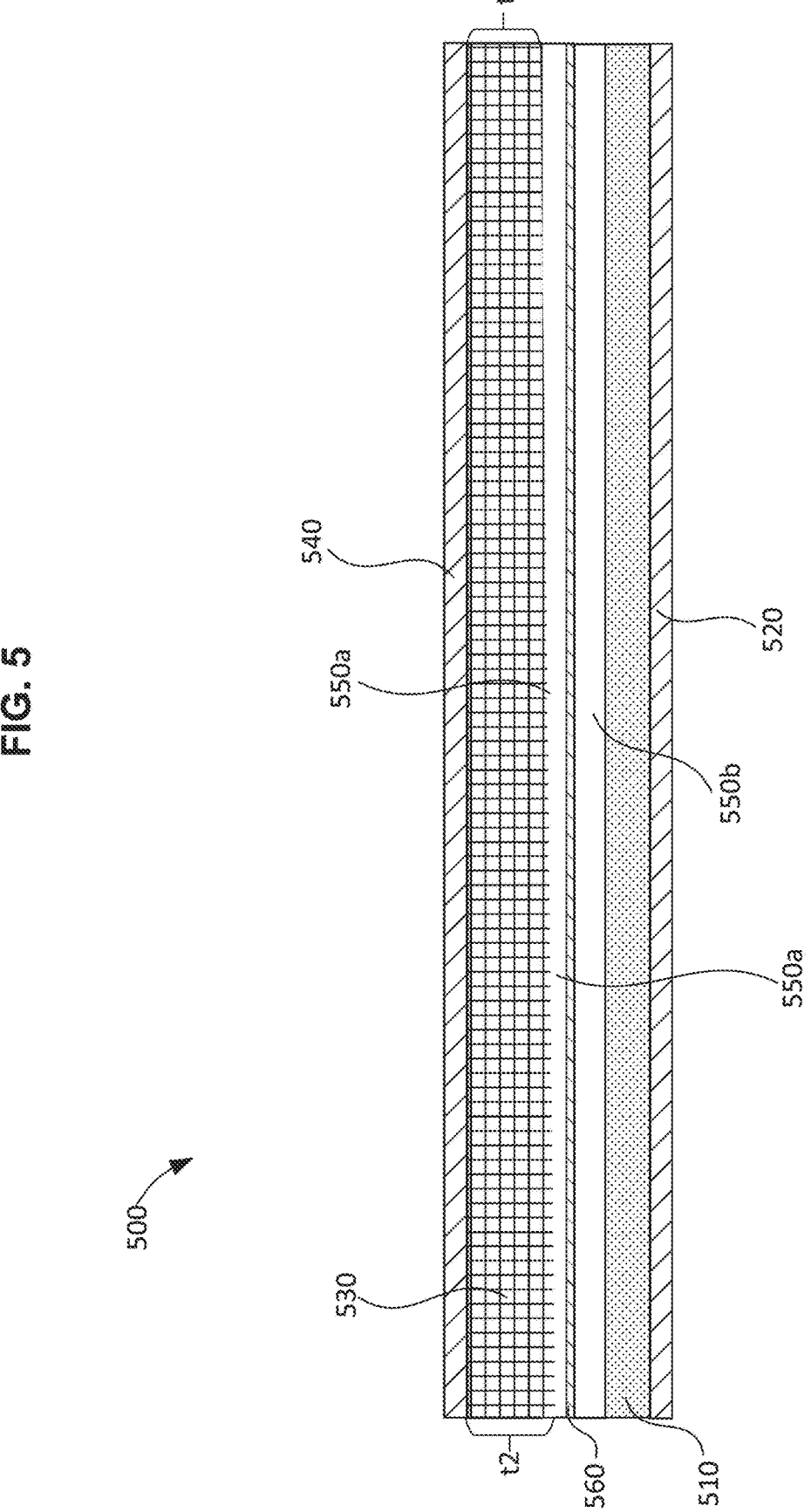
FIG. 5 is an illustration of an electrochemical cell with an interlayer, according to an embodiment.

FIG. 5 is an illustration of an electrochemical cell 500 with an interlayer 560, according to an embodiment. As shown, the electrochemical cell 500 includes an anode 510 disposed on an anode current collector 520, a cathode 530 disposed on a cathode current collector 540, with a first separator 550*a* and a second separator 550*b* disposed between the anode 510 and the cathode 530. The interlayer 560 is disposed between the first separator 550*a* and the second separator 550*b*. In some embodiments, the anode 510, the anode current collector 520, the cathode 530, the cathode current collector 540, the first separator 550*a*, the second separator 550*b*, and the interlayer 560 can be the same or substantially similar to the anode 210, the anode current collector 220, the cathode 230, the cathode current collector 240, the first separator 250*a*, the second separator 250*b*, and the interlayer 260, as described above with reference to FIGS. 2A-2B. Thus, certain aspects of the anode 510, the anode current collector 520, the cathode 530, the cathode current collector 540, the first separator 550*a*, the second separator 550*b*, and the interlayer 560 are not described in greater detail herein.

As shown, the cathode 530 has a non-uniform thickness. Without the interlayer 560, the SOC of the anode 510 and/or the cathode 530 can become varied due to coating thicknesses or impedance variations. Lithium ions are drawn to move inside the electrode to equalize the same potential. However, cathode materials (e.g., LNO or NMC) can have a greater potential slope than anode materials (e.g., graphite), depending on SOC, and lithium ions can move faster in the cathode material than in the anode material. Adding a lithium-reduced NMC (e.g., Li (1-*x*) NMC) in the interlayer 560 can reduce the SOC difference inside the cathode 530. In charging, electrons can go through the interlayer 560, but in discharging, the material does not move. The interlayer 560 can become a buffer capacity to equalize the SOC difference inside the cathode 530. In some embodiments, the thickness of the cathode 530 can be made non-uniform to balance distribution of lithium ions. In other words, the lithium ions can have a uniform or near uniform (e.g., within about 5%, within about 4%, within about 3%, within about 2%, or within about 1%) volumetric density of lithium ions (i.e., lithium ions per unit volume of electrode material) throughout the length of the cathode 530.

As shown, a first side of the cathode 530 has a first thickness t1 and a second side of the cathode 530 has a second thickness t2. The variable thickness of the cathode 530 (t1 and t2) can facilitate cathode and anode alignment and avoid misalignment when the electrochemical cell 500 when the electrochemical cell 500 is rolled (i.e., in a jelly roll format and placed into a can). In some embodiments, the first side of the cathode 530 can be adjacent to a tab where voltage is measured. In some embodiments, the second side of the cathode 530 can be adjacent to a tab where voltage is measured. In other words, the cathode 530 can be thicker on the side proximal to where voltage is measured, or the cathode 530 can be thicker on the side distal to where voltage is measured.

In some embodiments, t1 can be at least about 100 μm, at least about 150 μm, at least about 200 μm, at least about 250 μm, at least about 300 μm, at least about 350 μm, at least about 400 μm, at least about 450 μm, at least about 500 μm, at least about 550 μm, at least about 600 μm, at least about 650 μm, at least about 700 μm, at least about 750 μm, at least about 800 μm, at least about 850 μm, at least about 900 μm, at least about 950 μm, at least about 1,000 μm, at least about 1,100 μm, at least about 1,200 μm, at least about 1,300 μm, at least about 1,400 μm, at least about 1,500 μm, at least about 1,600 μm, at least about 1,700 μm, at least about 1,800 μm, or at least about 1,900 μm. In some embodiments, t1 can be no more than about 2,000 μm, no more than about 2,000 μm, no more than about 2,000 μm, no more than about 1,900 μm, no more than about 1,800 μm, no more than about 1,700 μm, no more than about 1,600 μm, no more than about 1,500 μm, no more than about 1,400 μm, no more than about 1,300 μm, no more than about 1,200 μm, no more than about 1,100 μm, no more than about 1,000 μm, no more than about 950 μm, no more than about 900 μm, no more than about 850 μm, no more than about 800 μm, no more than about 750 μm, no more than about 700 μm, no more than about 650 μm, no more than about 600 μm, no more than about 550 μm, no more than about 500 μm, no more than about 450 μm, no more than about 400 μm, no more than about 350 μm, no more than about 300 μm, no more than about 250 μm, no more than about 200 μm, or no more than about 150 μm. Combinations of the above-referenced thicknesses are also possible (e.g., at least about 100 μm and no more than about 2,000 μm or at least about 150 μm and no more than about 500 μm), inclusive of all values and ranges therebetween. In some embodiments, t1 can be about 100 μm, about 150 μm, about 200 μm, about 250 μm, about 300 μm, about 350 μm, about 400 μm, about 450 μm, about 500 μm, about 550 μm, about 600 μm, about 650 μm, about 700 μm, about 750 μm, about 800 μm, about 850 μm, about 900 μm, about 950 μm, about 1,000 μm, about 1,100 μm, about 1,200 μm, about 1,300 μm, about 1,400 μm, about 1,500 μm, about 1,600 μm, about 1,700 μm, about 1,800 μm, about 1,900 μm, or about 2,000 μm.

In some embodiments, t2 can be at least about 100 μm, at least about 150 μm, at least about 200 μm, at least about 250 μm, at least about 300 μm, at least about 350 μm, at least about 400 μm, at least about 450 μm, at least about 500 μm, at least about 550 μm, at least about 600 μm, at least about 650 μm, at least about 700 μm, at least about 750 μm, at least about 800 μm, at least about 850 μm, at least about 900 μm, at least about 950 μm, at least about 1,000 μm, at least about 1,100 μm, at least about 1,200 μm, at least about 1,300 μm, at least about 1,400 μm, at least about 1,500 μm, at least about 1,600 μm, at least about 1,700 μm, at least about 1,800 μm, or at least about 1,900 μm. In some embodiments, t2 can be no more than about 2,000 μm, no more than about 2,000 μm, no more than about 2,000 μm, no more than about 1,900 μm, no more than about 1,800 μm, no more than about 1,700 μm, no more than about 1,600 μm, no more than about 1,500 μm, no more than about 1,400 μm, no more than about 1,300 μm, no more than about 1,200 μm, no more than about 1,100 μm, no more than about 1,000 μm, no more than about 950 μm, no more than about 900 μm, no more than about 850 μm, no more than about 800 μm, no more than about 750 μm, no more than about 700 μm, no more than about 650 μm, no more than about 600 μm, no more than about 550 μm, no more than about 500 μm, no more than about 450 μm, no more than about 400 μm, no more than about 350 μm, no more than about 300 μm, no more than about 250 μm, no more than about 200 μm, or no more than about 150 μm. Combinations of the above-referenced thicknesses are also possible (e.g., at least about 100 μm and no more than about 2,000 μm or at least about 150 μm and no more than about 500 μm), inclusive of all values and ranges therebetween. In some embodiments, t2 can be about 100 μm, about 150 μm, about 200 μm, about 250 μm, about 300 μm, about 350 μm, about 400 μm, about 450 μm, about 500 μm, about 550 μm, about 600 μm, about 650 μm, about 700 μm, about 750 μm, about 800 μm, about 850 μm, about 900 μm, about 950 μm, about 1,000 μm, about 1,100 μm, about 1,200 μm, about 1,300 μm, about 1,400 μm, about 1,500 μm, about 1,600 μm, about 1,700 μm, about 1,800 μm, about 1,900 μm, or about 2,000 μm.

In some embodiments, t2 can be larger than t1 by at least about 50 nm, at least about 100 nm, at least about 200 nm, at least about 300 nm, at least about 400 nm, at least about 500 nm, at least about 600 nm, at least about 700 nm, at least about 800 nm, at least about 900 nm, at least about 1 μm, at least about 2 μm, at least about 3 μm, at least about 4 μm, at least about 5 μm, at least about 6 μm, at least about 7 μm, at least about 8 μm, at least about 9 μm, at least about 10 μm, at least about 15 μm, at least about 20 μm, at least about 25 μm, at least about 30 μm, at least about 35 μm, at least about 40 μm, or at least about 45 μm. In some embodiments, t2 can be larger than t1 by no more than about 50 μm, no more than about 45 μm, no more than about 40 μm, no more than about 35 μm, no more than about 30 μm, no more than about 25 μm, no more than about 20 μm, no more than about 15 μm, no more than about 10 μm, no more than about 9 μm, no more than about 8 μm, no more than about 7 μm, no more than about 6 μm, no more than about 5 μm, no more than about 4 μm, no more than about 3 μm, no more than about 2 μm, no more than about 1 μm, no more than about 900 nm, no more than about 800 nm, no more than about 700 nm, no more than about 600 nm, no more than about 500 nm, no more than about 400 nm, no more than about 300 nm, no more than about 200 nm, or no more than about 100 nm. Combinations of the above-referenced thickness differences are also possible (e.g., at least about 50 nm and no more than about 50 μm or at least about 500 nm and no more than about 10 μm), inclusive of all values and ranges therebetween.

In some embodiments, t2 can be greater than t1 by at least about 0.1%, at least about 0.2%, at least about 0.3%, at least about 0.4%, at least about 0.5%, at least about 0.6%, at least about 0.7%, at least about 0.8%, at least about 0.9%, at least about 1%, at least about 2%, at least about 3%, at least about 4%, at least about 5%, at least about 6%, at least about 7%, at least about 8%, or at least about 9%. In some embodiments, t2 can be greater than t1 by no more than about 10%, no more than about 9%, no more than about 8%, no more than about 7%, no more than about 6%, no more than about 5%, no more than about 4%, no more than about 3%, no more than about 2%, no more than about 1%, no more than about 0.9%, no more than about 0.8%, no more than about 0.7%, no more than about 0.6%, no more than about 0.5%, no more than about 0.4%, no more than about 0.3%, or no more than about 0.2%. Combinations of the above-referenced thickness differences are also possible (e.g., at least about 0.1% and no more than about 10% or at least about 0.5% and no more than about 5%), inclusive of all values and ranges therebetween. In some embodiments, t2 can be greater than t1 by about 0.1%, about 0.2%, about 0.3%, about 0.4%, about 0.5%, about 0.6%, about 0.7%, about 0.8%, about 0.9%, about 1%, about 2%, about 3%, about 4%, about 5%, about 6%, about 7%, about 8%, about 9%, or about 10%.

As shown, the cathode 530 has a non-uniform thickness. In some embodiments, the anode 510 can have a non-uniform thickness. In some embodiments, the first separator 550a and/or the second separator 550b can have a non-uniform thickness to conform to the non-uniform thickness of the cathode 530 and/or the anode 510. In other words, the first separator 550a and/or the second separator 550b can have a smaller thickness on the side of the electrochemical cell 200 including t1 and a larger thickness on the side of the electrochemical cell 200 including t2. In some embodiments, the first separator 550a and/or the second separator 550b can include a malleable structure, such that the non-uniform thickness of the cathode 530 and/or the anode 510 are absorbed and do not affect the uniformity of the thickness of the electrochemical cell 500.

Figure 6:
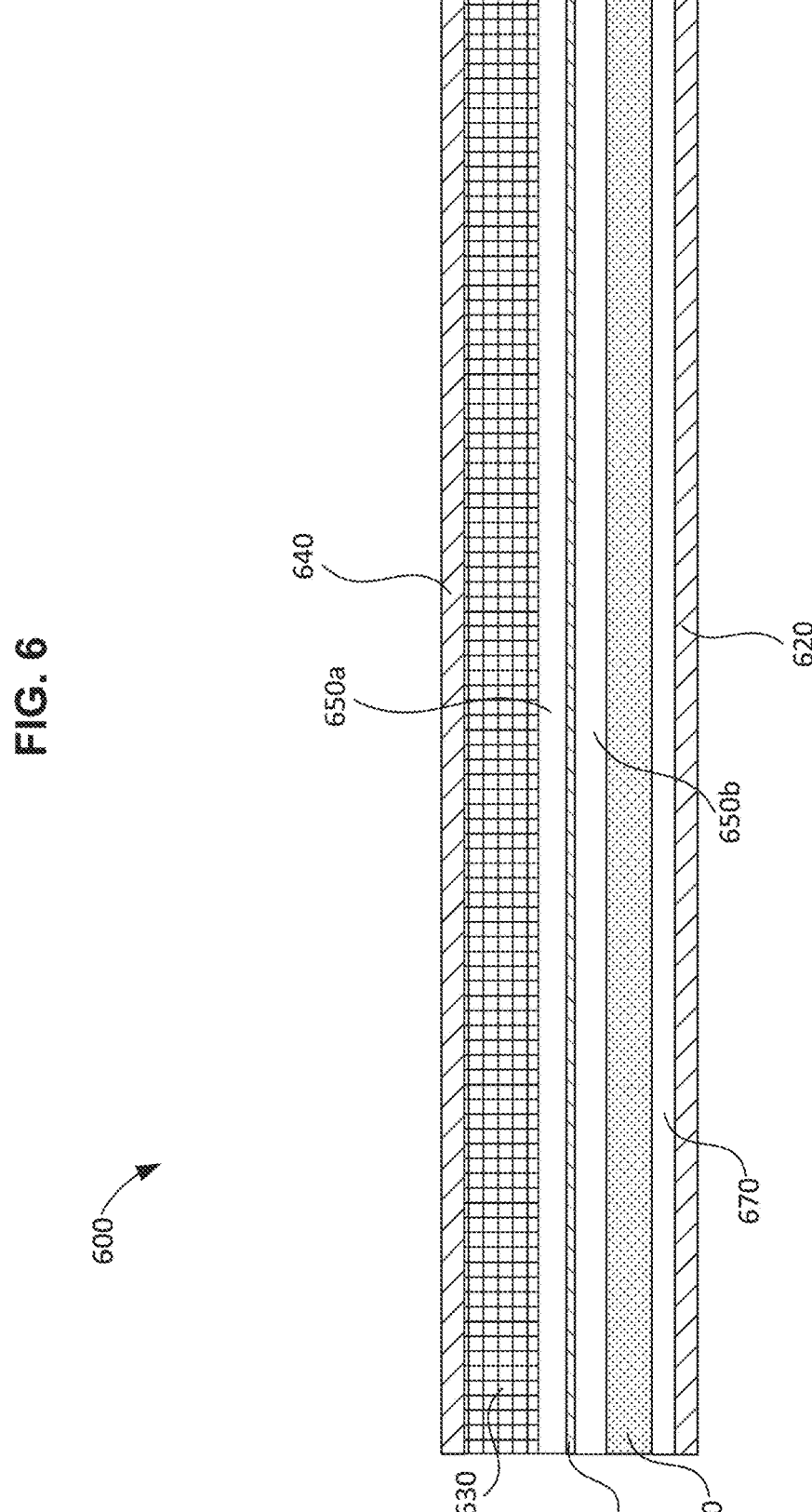
FIG. 6 is an illustration of an electrochemical cell with an interlayer, according to an embodiment.

FIG. 6 is an illustration of an electrochemical cell 600 with an interlayer 660, according to an embodiment. As shown, the electrochemical cell 600 includes an anode 610 disposed on an anode current collector 620 with a lithium metal layer 670 interposed therebetween, a cathode 630 disposed on a cathode current collector 640, with a first separator 650a and a second separator 650b disposed between the anode 610 and the cathode 630. The interlayer 660 is disposed between the first separator 650a and the second separator 650b. In some embodiments, the anode 610, the anode current collector 620, the cathode 630, the cathode current collector 640, the first separator 650a, the second separator 650b, and the interlayer 660 can be the same or substantially similar to the anode 210, the anode current collector 220, the cathode 230, the cathode current collector 240, the first separator 250a, the second separator 250b, and the interlayer 260, as described above with reference to FIGS. 2A-2B. Thus, certain aspects of the anode 610, the anode current collector 620, the cathode 630, the cathode current collector 640, the first separator 650a, the second separator 650b, and the interlayer 660 are not described in greater detail herein.

The lithium metal layer 670 is positioned adjacent to the anode 610. In some embodiments, the lithium metal layer 670 can aid in even electron distribution in the anode 610. In some embodiments, the anode 610 can include hard carbon coated onto the lithium metal layer 670. In some embodiments, the anode 610 can include silicon coated onto the lithium metal layer 670. In some embodiments, the anode 610 can include graphite coated onto the lithium metal layer 670. In some embodiments, the anode 610 can include indium coated onto the lithium metal layer 670.

In some embodiments, the lithium metal layer 670 can have a thickness of at least about 50 μm, at least about 60 μm, at least about 70 μm, at least about 80 μm, at least about 90 μm, at least about 100 μm, at least about 150 μm, at least about 200 μm, at least about 250 μm, at least about 300 μm, at least about 350 μm, at least about 400 μm, or at least about 450 μm. In some embodiments, the lithium metal layer 670 can have a thickness of no more than about 500 μm, no more than about 450 μm, no more than about 400 μm, no more than about 350 μm, no more than about 300 μm, no more than about 250 μm, no more than about 200 μm, no more than about 150 μm, no more than about 100 μm, no more than about 90 μm, no more than about 80 μm, no more than about 70 μm, or no more than about 60 μm. Combinations of the above-referenced thicknesses are also possible (e.g., at least about 50 μm and no more than about 500 μm or at least about 100 μm and no more than about 400 μm), inclusive of all values and ranges therebetween. In some embodiments, the lithium metal layer 670 can have a thickness of about 50 μm, about 60 μm, about 70 μm, about 80 μm, about 90 μm, about 100 μm, about 150 μm, about 200 μm, about 250 μm, about 300 μm, about 350 μm, about 400 μm, about 450 μm, or about 500 μm.

Figure 7A:
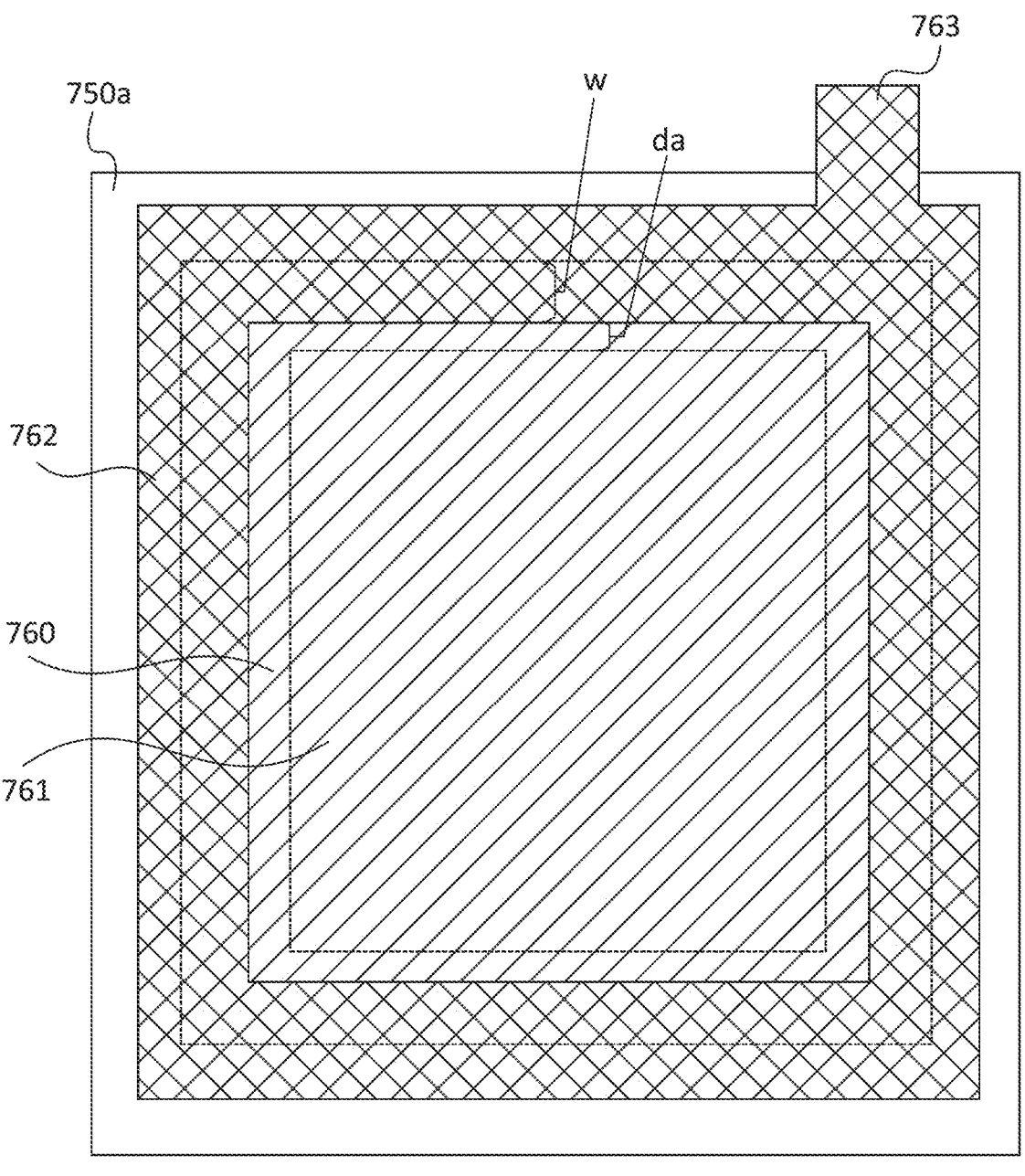
FIGS. 7A-7B are illustrations of separators with an interlayer disposed therebetween, according to an embodiment.
Figure 7B:
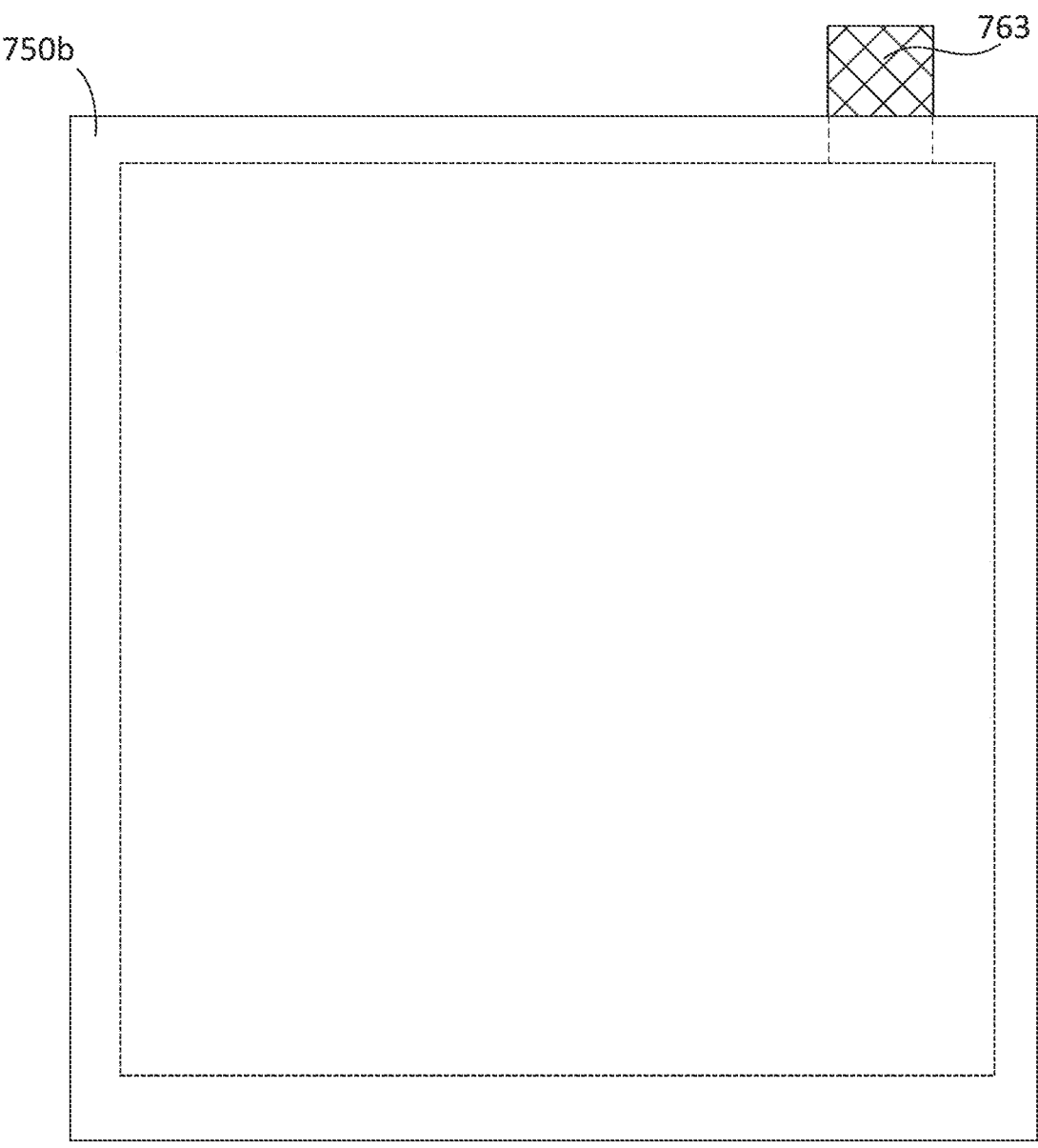

FIGS. 7A-7B are illustrations of separators 750a, 750b (collectively referred to as separators 750) with an interlayer 760 disposed therebetween, according to an embodiment. As shown, the interlayer 760 is disposed on the separator 750a. A frame 762 is disposed on the interlayer 760 and around an outside edge of the interlayer 760. A tab 763 is coupled to the frame 762 and extends beyond the separators 750, such that the tab 763 can couple to a voltage source or a voltage measurement lead. The second separator 750b is removed in FIG. 7A to show details of the components between the separators 750. FIG. 7B shows the second separator 750b in place, such that the components between the separators 750 are not visible. In some embodiments, the first separator 750a, the second separator 750b, and the interlayer 760 can be the same or substantially similar to the first separator 250a, the second separator 250b, and the interlayer 260, as described above with reference to FIGS. 2A-2B. Thus, certain aspects of the first separator 750a, the second separator 750b, and the interlayer 760 are not described in greater detail herein.

The frame 762 is disposed around an outside edge of the interlayer 760. In some embodiments, the frame 762 is composed of a conductive material. In some embodiments, the frame 762 can be composed of aluminum, copper, conductive ceramic, a conductive polymer, carbon fiber paper, nickel, titanium, or any combination thereof. In some embodiments, the frame 762 can be coupled to the first separator 750a and/or the second separator 750b via an adhesive. In some embodiments, the adhesive can be applied during the electrochemical cell manufacturing process. In some embodiments, the adhesive can be electrically conductive. In some embodiments, the tab 763 can be welded to the frame 762. In some embodiments, the tab 763 can be ultrasonically welded to the frame 762. In some embodiments, the tab 763 can be coupled to a pouch tab (not shown) via an adhesive. In some embodiments, the interlayer 760 can have multiple layers. In some embodiments, the interlayer 760 can include gold, carbon, indium, tin, or any combination thereof. In some embodiments, the interlayer 760 can be coated to the tab 763, the first separator 750a, and/or the second separator 750b. In some embodiments, the tab 763 can be directly welded to the interlayer 760, the first separator 750*a*, and/or the second separator 750*b*.

As shown, the frame 762 overlaps the interlayer 760 by an overlapping width w. The width w can vary to reduce the resistance of the frame 762 and can be tuned based on the material of the frame 762, the thickness of the frame 762, and/or the capacity of the electrochemical cell. In some embodiments, w can be at least about 250 μm, at least about 500 μm, at least about 750 μm, at least about 1 mm, at least about 1.5 mm, at least about 2 mm, at least about 2.5 mm, at least about 3 mm, at least about 3.5 mm, at least about 4 mm, at least about 4.5 mm, at least about 5 mm, at least about 5.5 mm, at least about 6 mm, at least about 6.5 mm, at least about 7 mm, at least about 7.5 mm, at least about 8 mm, at least about 8.5 mm, at least about 9 mm, or at least about 9.5 mm. In some embodiments, w can be no more than about 10 mm, no more than about 9.5 mm, no more than about 9 mm, no more than about 8.5 mm, no more than about 8 mm, no more than about 7.5 mm, no more than about 7 mm, no more than about 6.5 mm, no more than about 6 mm, no more than about 5.5 mm, no more than about 5 mm, no more than about 4.5 mm, no more than about 4 mm, no more than about 3.5 mm, no more than about 3 mm, no more than about 2.5 mm, no more than about 2 mm, no more than about 1.5 mm, no more than about 1 mm, no more than about 750 μm, or no more than about 500 μm. Combinations of the above-referenced values of w are also possible (e.g., at least about 250 μm and no more than about 10 mm or at least about 1 mm and no more than about 5 mm), inclusive of all values and ranges therebetween. In some embodiments, the width w can be about 250 μm, about 500 μm, about 750 μm, about 1 mm, about 1.5 mm, about 2 mm, about 2.5 mm, about 3 mm, about 3.5 mm, about 4 mm, about 4.5 mm, about 5 mm, about 5.5 mm, about 6 mm, about 6.5 mm, about 7 mm, about 7.5 mm, about 8 mm, about 8.5 mm, about 9 mm, about 9.5 mm, or about 10 mm.

As shown, the interlayer 760 includes an active area 761. A distance from the inside edge of the frame to the outside edge of the active area is represented as da. In some embodiments, the distance da can be at least about 1 mm, at least about 1.5 mm, at least about 2 mm, at least about 2.5 mm, at least about 3 mm, at least about 3.5 mm, at least about 4 mm, at least about 4.5 mm, at least about 5 mm, at least about 5.5 mm, at least about 6 mm, at least about 6.5 mm, at least about 7 mm, at least about 7.5 mm, at least about 8 mm, at least about 8.5 mm, at least about 9 mm, or at least about 9.5 mm. In some embodiments, the distance da can be no more than about 10 mm, no more than about 9.5 mm, no more than about 9 mm, no more than about 8.5 mm, no more than about 8 mm, no more than about 7.5 mm, no more than about 7 mm, no more than about 6.5 mm, no more than about 6 mm, no more than about 5.5 mm, no more than about 5 mm, no more than about 4.5 mm, no more than about 4 mm, no more than about 3.5 mm, no more than about 3 mm, no more than about 2.5 mm, no more than about 2 mm, or no more than about 1.5 mm. Combinations of the above-referenced distances for da are also possible (e.g., at least about 1 mm and no more than about 10 mm or at least about 2 mm and no more than about 8 mm), inclusive of all values and ranges therebetween. In some embodiments, the distance da can be about 1 mm, about 1.5 mm, about 2 mm, about 2.5 mm, about 3 mm, about 3.5 mm, about 4 mm, about 4.5 mm, about 5 mm, about 5.5 mm, about 6 mm, about 6.5 mm, about 7 mm, about 7.5 mm, about 8 mm, about 8.5 mm, about 9 mm, about 9.5 mm, or about 10 mm.

Figure 8A:
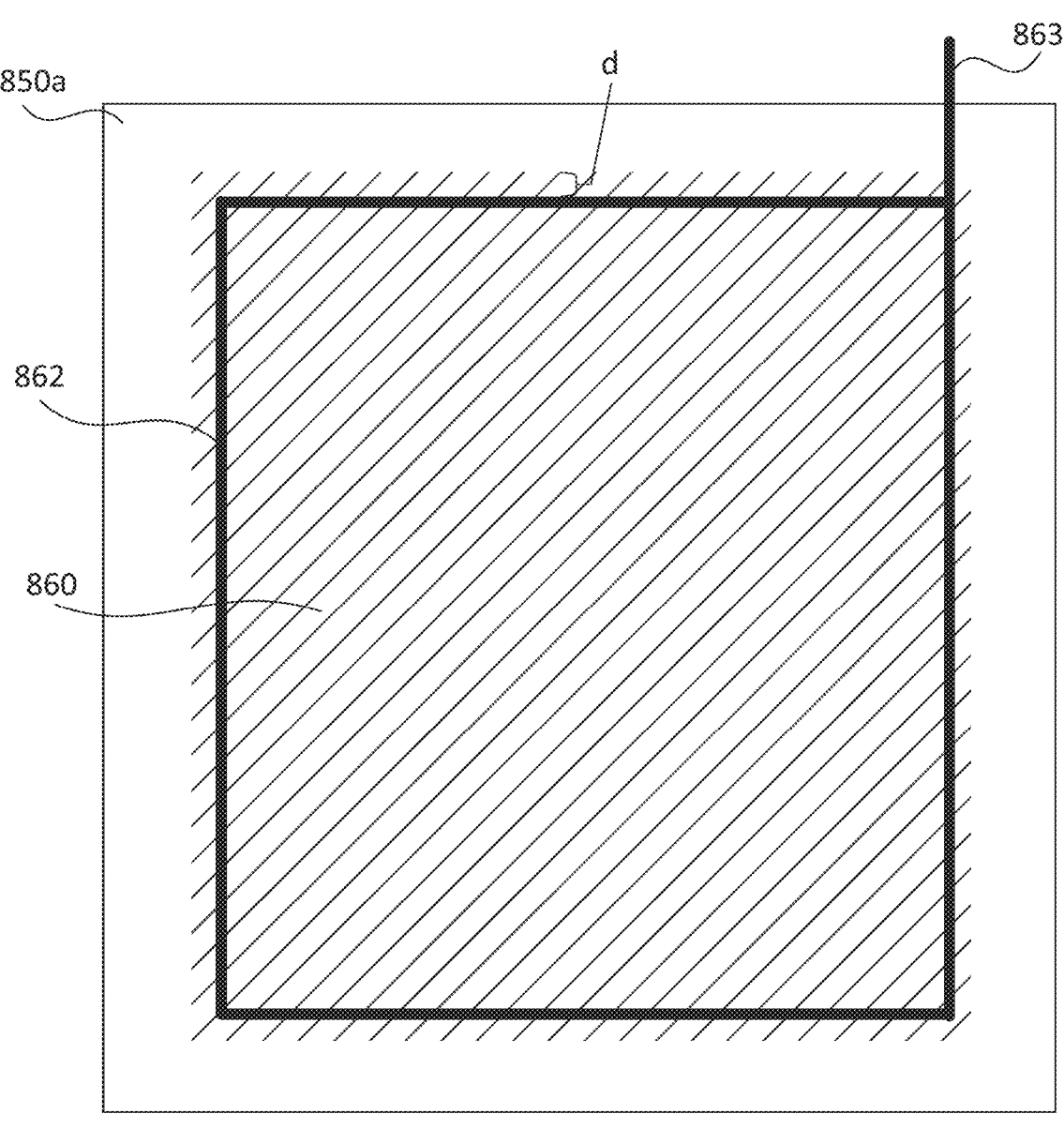
FIGS. 8A-8B are illustrations of separators with an interlayer disposed therebetween, according to an embodiment.
Figure 8B:
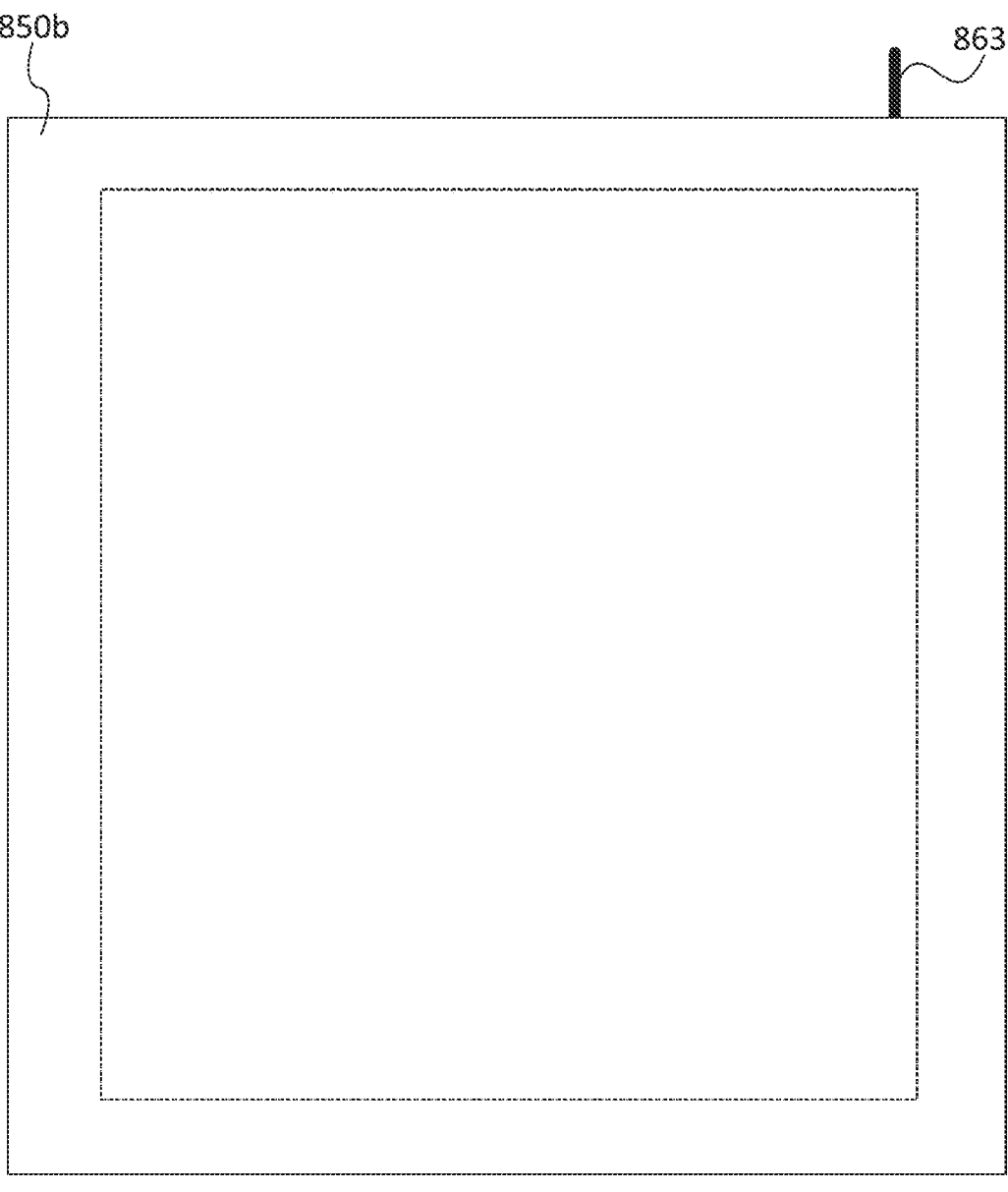

FIGS. 8A-8B are illustrations of separators 850*a*, 850*b* (collectively referred to as separators 850) with an interlayer

860 disposed therebetween, according to an embodiment. As shown, the interlayer 860 is disposed on the separator 850*a*. A wire 862 is disposed around an outside perimeter of the interlayer 860. A terminal end of the wire 862 acts as a tab 863 extending beyond the separators 850, such that the tab 863 can couple to a voltage source or a voltage measurement lead. The second separator 850*b* is removed in FIG. 8A to show details of the components between the separators 850. FIG. 8B shows the second separator 850*b* in place, such that the components between the separators 850 are not visible. In some embodiments, the first separator 850*a*, the second separator 850*b*, and the interlayer 860 can be the same or substantially similar to the first separator 750*a*, the second separator 750*b*, and the interlayer 760, as described above with reference to FIGS. 7A-7B. Thus, certain aspects of the first separator 850*a*, the second separator 850*b*, and the interlayer 860 are not described in greater detail herein.

In some embodiments, the wire 862 can be composed of aluminum. In some embodiments, the wire 862 can be composed of copper. In some embodiments, the gauge of the wire 862 can be selected based on the capacity of the electrochemical cell (i.e., a thicker wire can be incorporated into an electrochemical cell with a higher capacity). In some embodiments, the wire 862 can have 32 American Wire Gauge (AWG), 31 AWG, 30 AWG, 29 AWG, 28 AWG, 27 AWG, 26 AWG, 25 AWG, 24 AWG, 23 AWG, 22 AWG, 21 AWG, 20 AWG, 19 AWG, or 18 AWG, inclusive of all sizes therebetween. In some embodiments, the wire 862 can be attached to the first separator 850*a* and/or the second separator 850*b* via an adhesive. In some embodiments, the adhesive can be applied to the wire 862 during the electrochemical cell manufacturing process. In some embodiments, the adhesive can be electrically conductive.

In some embodiments, a coating can be molded around the wire 862. In some embodiments, the coating can include a polymer coating. In some embodiments, the coating can include polyethylene. In some embodiments, the wire 862 can be connected directly to a diode (not shown). In some embodiments, the wire 862 can be connected to a diode via soldering, butt splicing, or any other suitable connection. In some embodiments, an electrochemical cell that includes the wire 862 can have a lower mass than an electrochemical cell that includes a frame (e.g., the frame 762, as described above with reference to FIG. 7).

As shown, the wire 862 is offset from the edge of the interlayer 860 by an offset distance d. In some embodiments, d can be the same or substantially similar on all sides of the interlayer 860. In some embodiments, d can vary from one side of the interlayer 860 to another. In some embodiments, the wire 862 can be positioned on the edge of the interlayer 860, such that dis about 0 mm. In some embodiments, d can be at least about 0 mm, at least about 0.5 mm, at least about 1 mm, at least about 1.5 mm, at least about 2 mm, at least about 2.5 mm, at least about 3 mm, at least about 3.5 mm, at least about 4 mm, at least about 4.5 mm, at least about 5 mm, at least about 5.5 mm, at least about 6 mm, at least about 6.5 mm, at least about 7 mm, at least about 7.5 mm, at least about 8 mm, at least about 8.5 mm, at least about 9 mm, or at least about 9.5 mm. In some embodiments, d can be no more than about 10 mm, no more than about 9.5 mm, no more than about 9 mm, no more than about 8.5 mm, no more than about 8 mm, no more than about 7.5 mm, no more than about 7 mm, no more than about 6.5 mm, no more than about 6 mm, no more than about 5.5 mm, no more than about 5 mm, no more than about 4.5 mm, no more than about 4 mm, no more than about 3.5 mm, no more than about 3 mm, no more than about 2.5 mm, no more than about 2 mm, no more than about 1.5 mm, no more than about 1 mm, or no more than about 0.5 mm. Combinations of the above-referenced values of d are also possible (e.g., at least about 0 mm and no more than about 10 mm or at least about 1 mm and no more than about 5 mm), inclusive of all values and ranges therebetween. In some embodiments, d can be about 0 mm, about 0.5 mm, about 1 mm, about 1.5 mm, about 2 mm, about 2.5 mm, about 3 mm, about 3.5 mm, about 4 mm, about 4.5 mm, about 5 mm, about 5.5 mm, about 6 mm, about 6.5 mm, about 7 mm, about 7.5 mm, about 8 mm, about 8.5 mm, about 9 mm, about 9.5 mm, or about 10 mm.

Figure 9A:
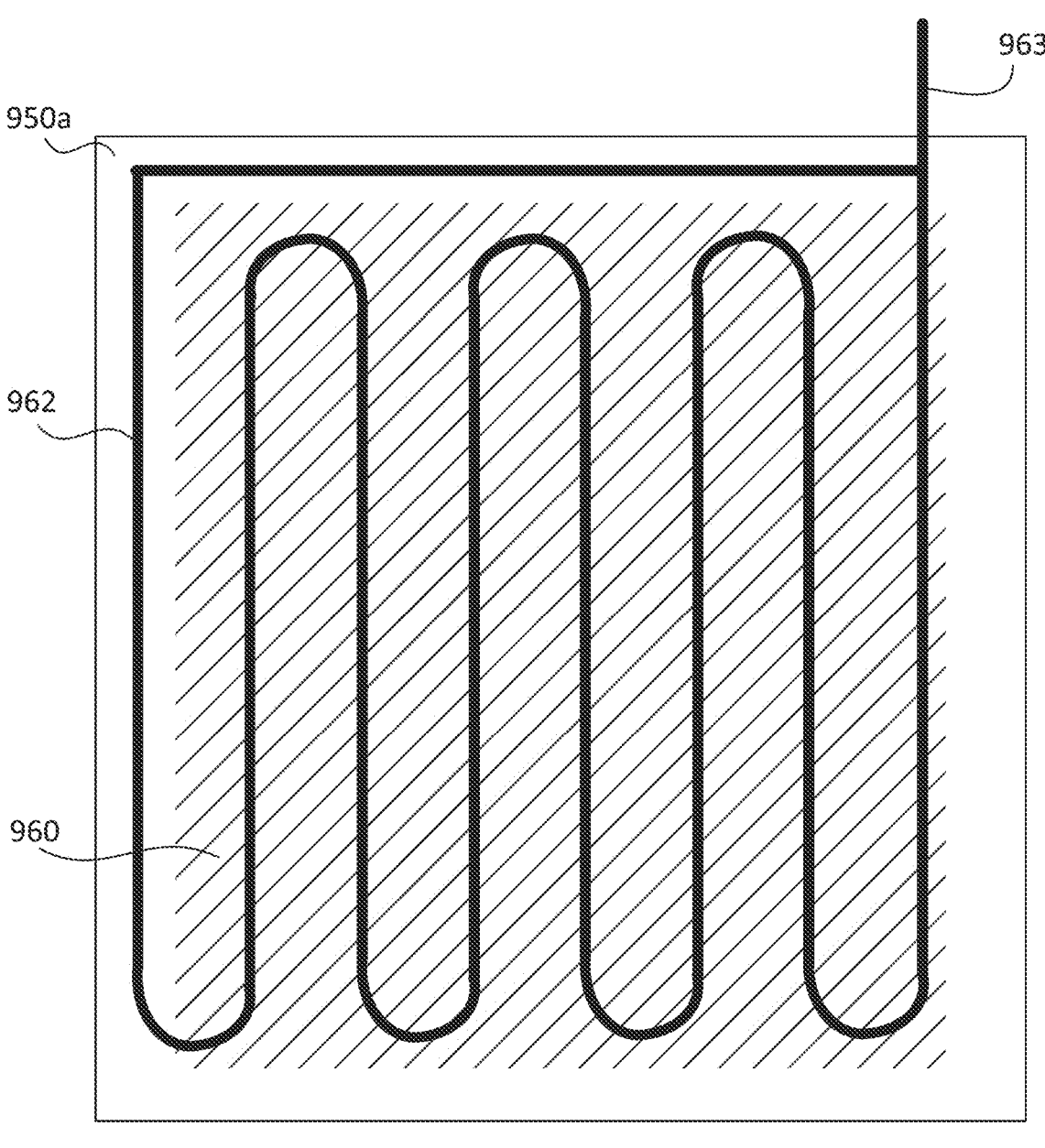
FIGS. 9A-9B are illustrations of separators with an interlayer disposed therebetween, according to an embodiment.
Figure 9B:
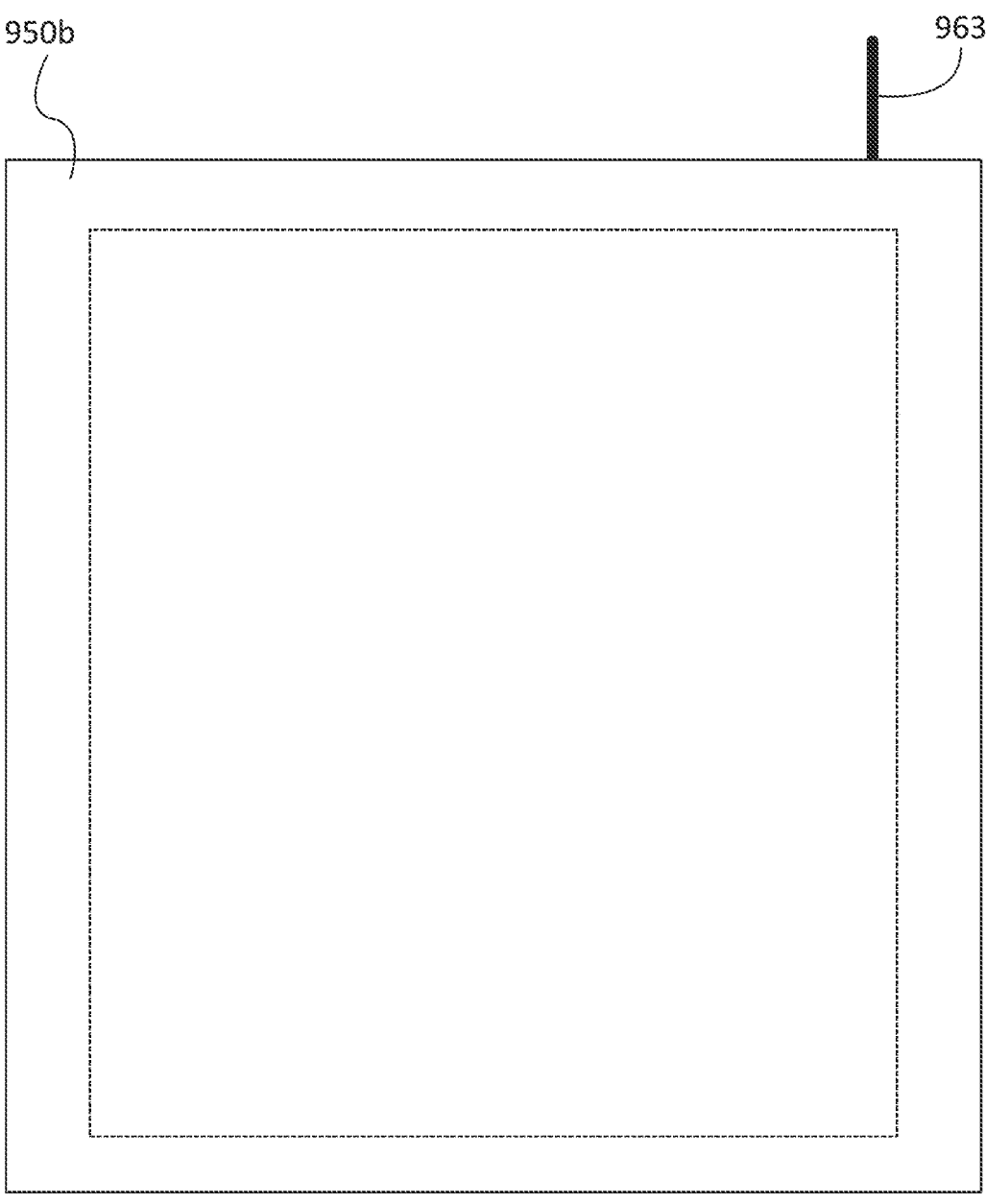

FIGS. 9A-9B are illustrations of separators 950a, 950b (collectively referred to as separators 950) with an interlayer 960 disposed therebetween, according to an embodiment. As shown, the interlayer 960 is disposed on the separator 950a. A wire 962 is disposed around portions of an outside perimeter of the interlayer 960 and the wire 962 is patterned across the interlayer 960. A terminal end of the wire 962 acts as a tab 963 extending beyond the separators 950, such that the tab 963 can couple to a voltage source or a voltage measurement lead. The second separator 950b is removed in FIG. 9A to show details of the components between separators 950. FIG. 9B shows the second separator 950b in place, such that the components between the separators 950 are not visible. In some embodiments, the first separator 950a, the second separator 950b, the interlayer 960, the wire 962, and the tab 963 can be the same or substantially similar to the first separator 850a, the second separator 850b, the interlayer 860, the wire 862, and the tab 863, as described above with reference to FIGS. 8A-8B. Thus, certain aspects of the first separator 950a, the second separator 950b, the interlayer 960, the wire 962, and the tab 963 are not described in greater detail herein.

In some embodiments, the pattern of the wire 962 can be optimized to decrease resistance of the electrochemical cell. For example, the pattern the wire 962 follows along the interlayer 960 can minimize the distance from a dendrite to the wire 962 to a diode, a resistor, a resistor, a fuse, a transistor, or any combination thereof. This can minimize the amount of growth a dendrite can experience in the interlayer 960, before redirecting the current and discharging the electrochemical cell. As shown, the wire 962 is formed in serpentine pattern with rounded edges. In some embodiments, the wire 962 can be formed in a serpentine pattern with sharp edges. In some embodiments, the wire 962 can be formed in a spiral pattern.

Figure 10A:
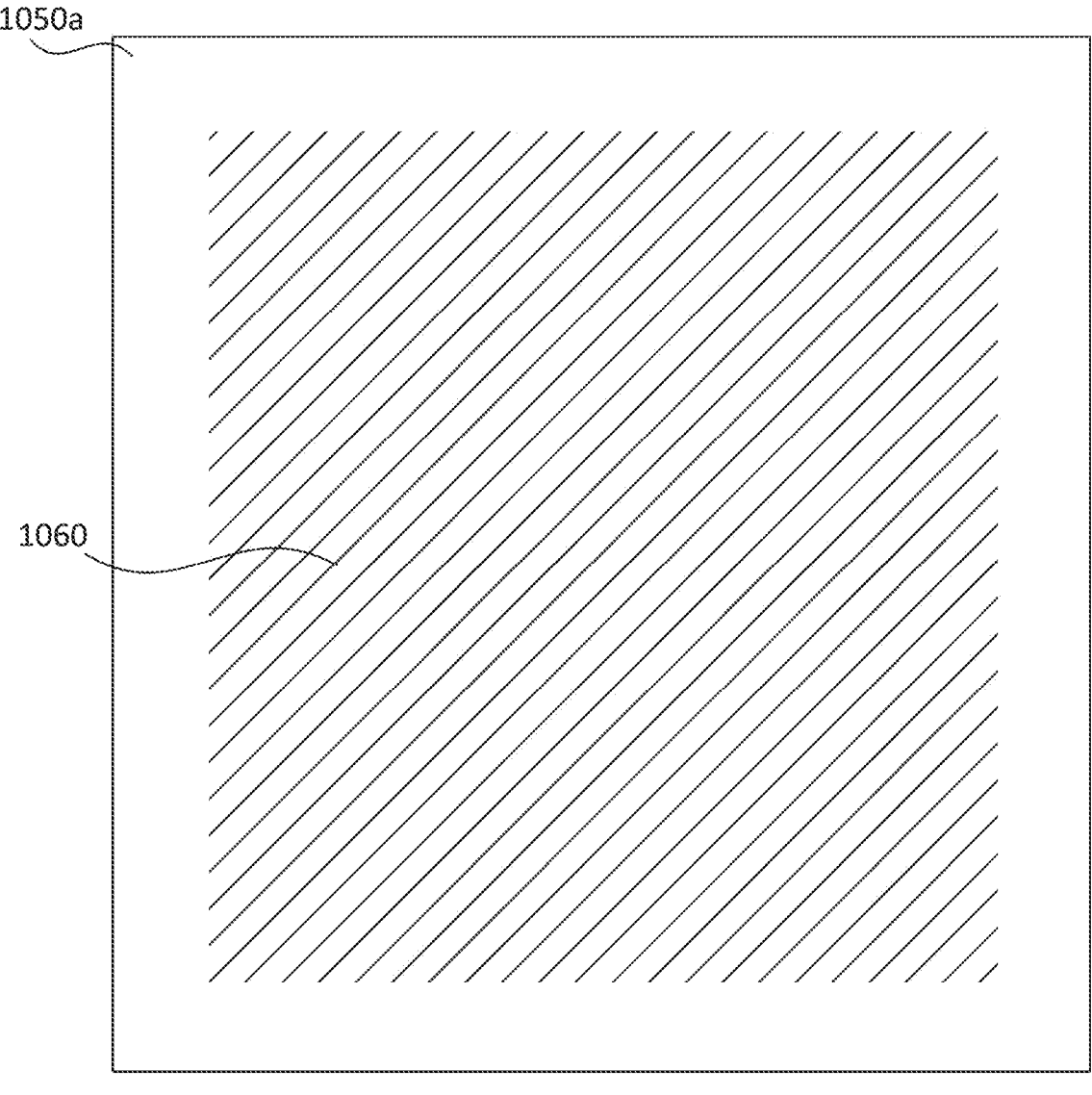
FIGS. 10A-10C are illustrations of separators with an interlayer disposed therebetween, according to an embodiment.
Figure 10B:
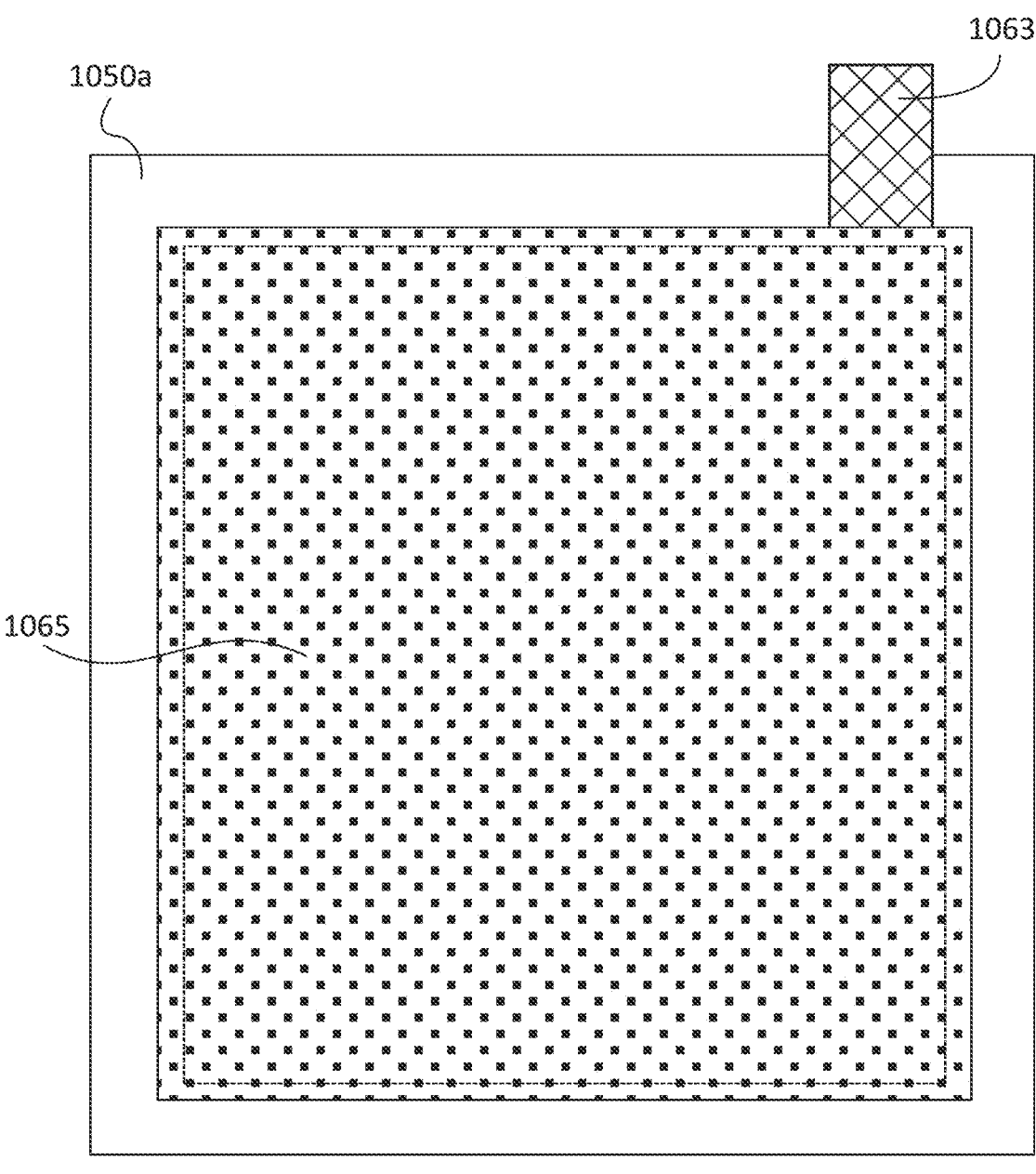
Figure 10C:
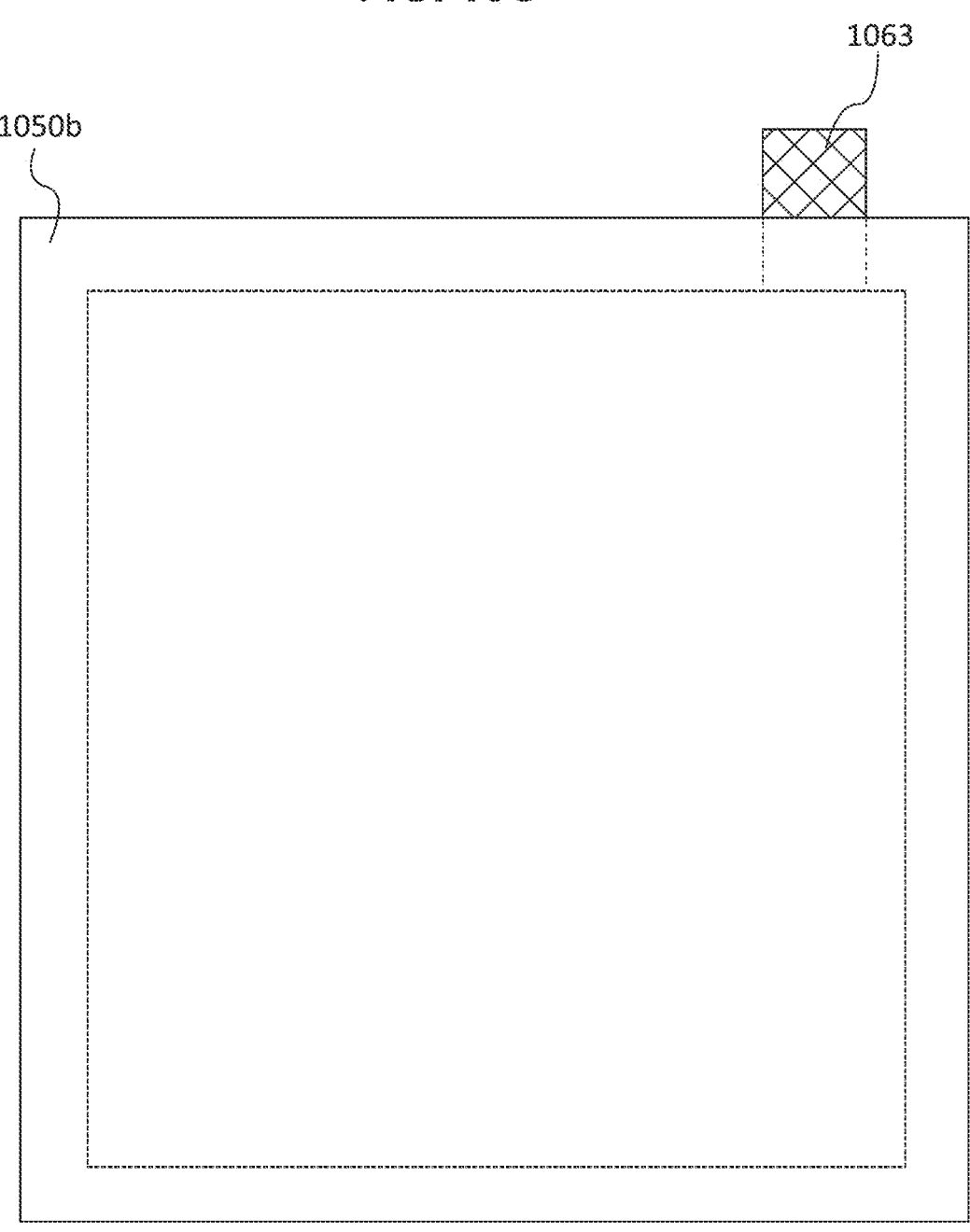

FIGS. 10A-10C are illustrations of separators 1050a, 1050b (collectively referred to as separators 1050) with an interlayer 1060 disposed therebetween, according to an embodiment. As shown, the interlayer 1060 is disposed on the separator 1050a. A conductive coating 1065 is disposed on the of the interlayer 1060 with a tab 1063 coupled to interlayer 1060, the conductive coating 1065, the first separator 1050a, and/or the second separator 1050b. The second separator 1050b and the conductive coating 1065 are removed in FIG. 10A. The second separator 1050b is removed from FIG. 10B to show details of the components between the separators 1050. FIG. 10C shows the second separator 1050b in place, such that the components between the separators 1050 are not visible. In some embodiments, the first separator 1050a, the second separator 1050b, and the interlayer 1060 can be the same or substantially similar to the first separator 750a, the second separator 750b, and the interlayer 760, as described above with reference to FIGS. 7A-7B. Thus, certain aspects of the first separator 1050a, the second separator 1050b, and the interlayer 1060 are not described in greater detail herein.

The conductive coating 1065 is disposed on the interlayer 1060. In some embodiments, the conductive coating 1065 can be composed of a conductive polymer. In some embodiments, the conductive coating 1065 can be composed of poly(3,4-ethylenedioxythiophene) polystyrene sulfonate (PEDOT:PSS), polyaniline (PANI), polypyrrole (PPy), or any combination thereof. In some embodiments, the tab 1063 can be in the form of a wire (e.g., the same or substantially similar to the tab 963, as described above with reference to FIGS. 9A-9B). In some embodiments, the tab 1063 can be composed of aluminum, copper, a conductive ceramic, a conductive polymer, a carbon fiber paper, or any combination thereof.

In some embodiments, the conductive coating 1065 can be coated onto the second separator 1050b. In some embodiments, the tab 1063 can be adhered to the first separator 1050a and/or the second separator 1050b and in conduct with the conductive coating 1065. In some embodiments, the tab 1063 can be coupled to a diode (not shown) via soldering, welding, butt splicing, or any other suitable coupling means. In some embodiments, the tab 1063 can be welded to a pouch tab (not shown) and connected to the diode. In some embodiments, the conductive coating 1065 can cover the entire active area of the interlayer 1065. In some embodiments, the conductive coating 1065 can be installed without a frame (e.g., the frame 762, as described above with reference to FIGS. 7A-7B).

Figure 11A:
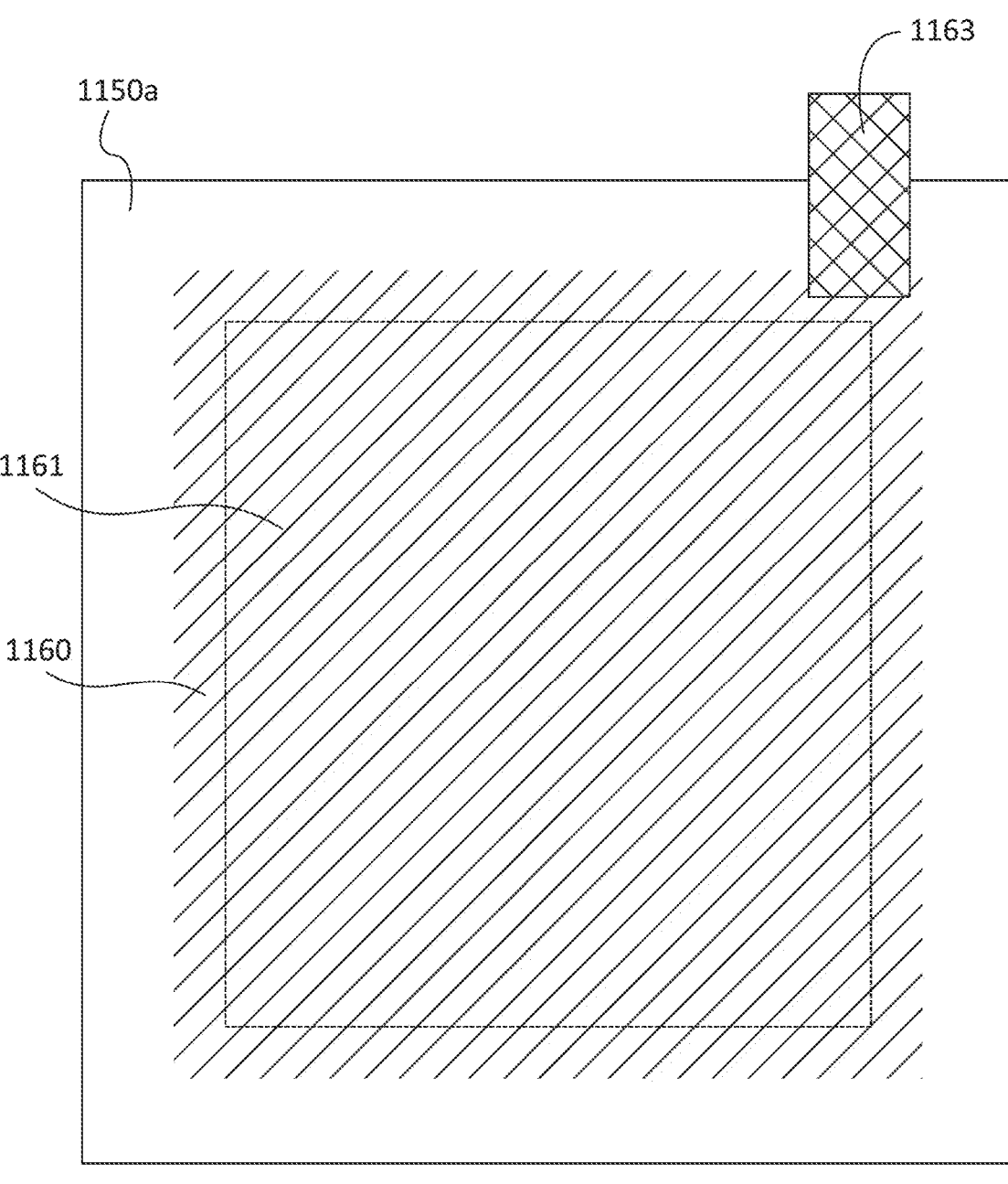
FIGS. 11A-11B are illustrations of separators with an interlayer disposed therebetween, according to an embodiment.
Figure 11B:
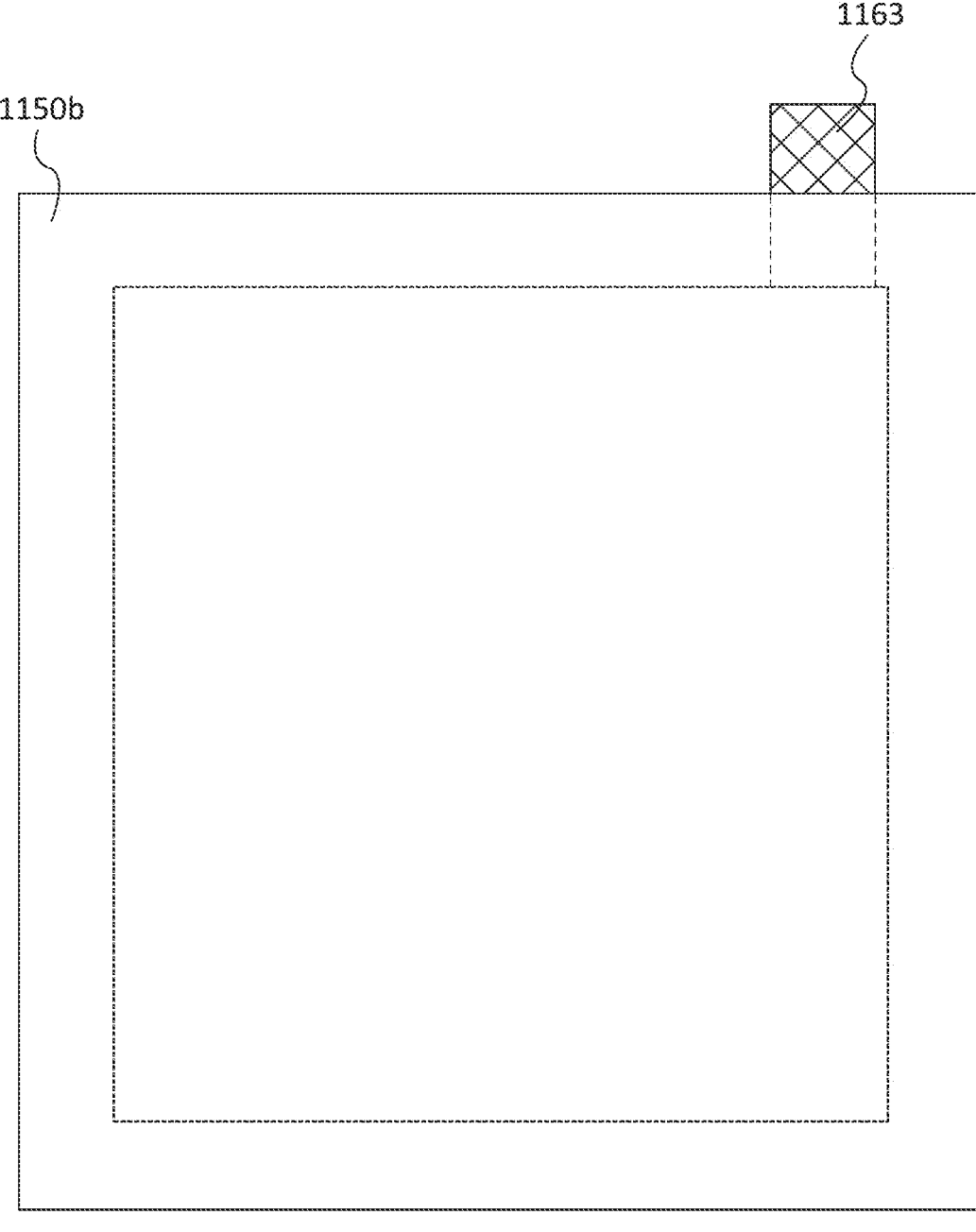

FIGS. 11A-11B are illustrations of separators 950a, 950b (collectively referred to as separators 1150) with an interlayer 1160 disposed therebetween, according to an embodiment. As shown, the interlayer 1160 is disposed on the separator 1150a. A tab 1163 is coupled directly to the interlayer 1160. The second separator 1150b is removed in FIG. 11A to show details of the components between separators 1150. FIG. 11B shows the second separator 1150b in place, such that the components between the separators 1150 are not visible. In some embodiments, the first separator 1150a, the second separator 1150b, the interlayer 1160, and the tab 1163 can be the same or substantially similar to the first separator 750a, the second separator 750b, the interlayer 760, and the tab 763, as described above with reference to FIGS. 7A-7B. Thus, certain aspects of the first separator 1150a, the second separator 1150b, the interlayer 1160, and the tab 1163 are not described in greater detail herein.

In some embodiments, the tab 1163 can be composed of aluminum, copper, conductive ceramic, conductive polymer, carbon fiber paper, or any combination thereof. In some embodiments, the tab 1163 can be pressed into the interlayer 1160. For example, the interlayer 1160 can include a carbon/binder slurry and the tab 1163 can be pressed into the carbon/binder slurry with such a force that the tab 1163 and/or the interlayer 1160 yields. In some embodiments, the tab 1163 can be attached to the either of the separators 1150 via an adhesive, a staple, ultrasonic welding, adhesive tape, adhesive glue, or any combination thereof. In some embodiments, the tab 1163 can be in contact with the interlayer 1160 via pressure applied to the electrochemical cell. In some embodiments, the configuration shown in FIGS. 11A-11B can reduce the mass of an electrochemical cell and improve energy density, in comparison with other embodiments.

In some embodiments, the distance from the sealing/adhesive area of the tab 1163 to the edge of the interlayer 1160 can be at least about 1 mm, at least about 1.5 mm, at least about 2 mm, at least about 2.5 mm, at least about 3 mm, at least about 3.5 mm, at least about 4 mm, at least about 4.5 mm, at least about 5 mm, at least about 5.5 mm, at least about 6 mm, at least about 6.5 mm, at least about 7 mm, at least about 7.5 mm, at least about 8 mm, at least about 8.5 mm, at least about 9 mm, or at least about 9.5 mm. In some embodiments, the distance from the sealing/adhesive area of the tab 1163 to the edge of the interlayer 1160 can be no more than about 10 mm, no more than about 9.5 mm, no more than about 9 mm, no more than about 8.5 mm, no more than about 8 mm, no more than about 7.5 mm, no more than about 7 mm, no more than about 6.5 mm, no more than about 6 mm, no more than about 5.5 mm, no more than about 5 mm, no more than about 4.5 mm, no more than about 4 mm, no more than about 3.5 mm, no more than about 3 mm, no more than about 2.5 mm, no more than about 2 mm, or no more than about 1.5 mm. Combinations of the above-referenced distances are also possible (e.g., at least about 1 mm and no more than about 10 mm or at least about 2 mm and no more than about 8 mm), inclusive of all values and ranges therebetween. In some embodiments, the distance from the sealing/adhesive area of the tab 1163 to the edge of the interlayer 1160 can be about 1 mm, about 1.5 mm, about 2 mm, about 2.5 mm, about 3 mm, about 3.5 mm, about 4 mm, about 4.5 mm, about 5 mm, about 5.5 mm, about 6 mm, about 6.5 mm, about 7 mm, about 7.5 mm, about 8 mm, about 8.5 mm, about 9 mm, about 9.5 mm, or about 10 mm.

In some embodiments, the width of the sealing/adhesive area of the tab 1163 (i.e., the distance along the length of the tab 1163, or in the direction up and down the page in FIG. 11A) can be at least about 1 mm, at least about 1.5 mm, at least about 2 mm, at least about 2.5 mm, at least about 3 mm, at least about 3.5 mm, at least about 4 mm, at least about 4.5 mm, at least about 5 mm, at least about 5.5 mm, at least about 6 mm, at least about 6.5 mm, at least about 7 mm, at least about 7.5 mm, at least about 8 mm, at least about 8.5 mm, at least about 9 mm, or at least about 9.5 mm. In some embodiments, the width of the sealing/adhesive area of the tab 1163 can be no more than about 10 mm, no more than about 9.5 mm, no more than about 9 mm, no more than about 8.5 mm, no more than about 8 mm, no more than about 7.5 mm, no more than about 7 mm, no more than about 6.5 mm, no more than about 6 mm, no more than about 5.5 mm, no more than about 5 mm, no more than about 4.5 mm, no more than about 4 mm, no more than about 3.5 mm, no more than about 3 mm, no more than about 2.5 mm, no more than about 2 mm, or no more than about 1.5 mm. Combinations of the above-referenced widths are also possible (e.g., at least about 1 mm and no more than about 10 mm or at least about 2 mm and no more than about 8 mm), inclusive of all values and ranges therebetween. In some embodiments, the width of the sealing/adhesive area of the tab 1163 can be about 1 mm, about 1.5 mm, about 2 mm, about 2.5 mm, about 3 mm, about 3.5 mm, about 4 mm, about 4.5 mm, about 5 mm, about 5.5 mm, about 6 mm, about 6.5 mm, about 7 mm, about 7.5 mm, about 8 mm, about 8.5 mm, about 9 mm, about 9.5 mm, or about 10 mm.

As shown, the interlayer 1160 includes an active area 1161. In some embodiments, the distance from the edge of the tab 1163 to the edge of the active area 1161 can be at least about 1 mm, at least about 1.5 mm, at least about 2 mm, at least about 2.5 mm, at least about 3 mm, at least about 3.5 mm, at least about 4 mm, at least about 4.5 mm, at least about 5 mm, at least about 5.5 mm, at least about 6 mm, at least about 6.5 mm, at least about 7 mm, at least about 7.5 mm, at least about 8 mm, at least about 8.5 mm, at least about 9 mm, or at least about 9.5 mm. In some embodiments, the distance from the edge of the tab 1163 to the edge of the active area 1161 can be no more than about 10 mm, no more than about 9.5 mm, no more than about 9 mm, no more than about 8.5 mm, no more than about 8 mm, no more than about 7.5 mm, no more than about 7 mm, no more than about 6.5 mm, no more than about 6 mm, no more than about 5.5 mm, no more than about 5 mm, no more than about 4.5 mm, no more than about 4 mm, no more than about 3.5 mm, no more than about 3 mm, no more than about 2.5 mm, no more than about 2 mm, or no more than about 1.5 mm. Combinations of the above-referenced distances are also possible (e.g., at least about 1 mm and no more than about 10 mm or at least about 2 mm and no more than about 8 mm), inclusive of all values and ranges therebetween. In some embodiments, the distance from the edge of the tab 1163 to the edge of the active area 1161 can be about 1 mm, about 1.5 mm, about 2 mm, about 2.5 mm, about 3 mm, about 3.5 mm, about 4 mm, about 4.5 mm, about 5 mm, about 5.5 mm, about 6 mm, about 6.5 mm, about 7 mm, about 7.5 mm, about 8 mm, about 8.5 mm, about 9 mm, about 9.5 mm, or about 10 mm.

Figure 12:
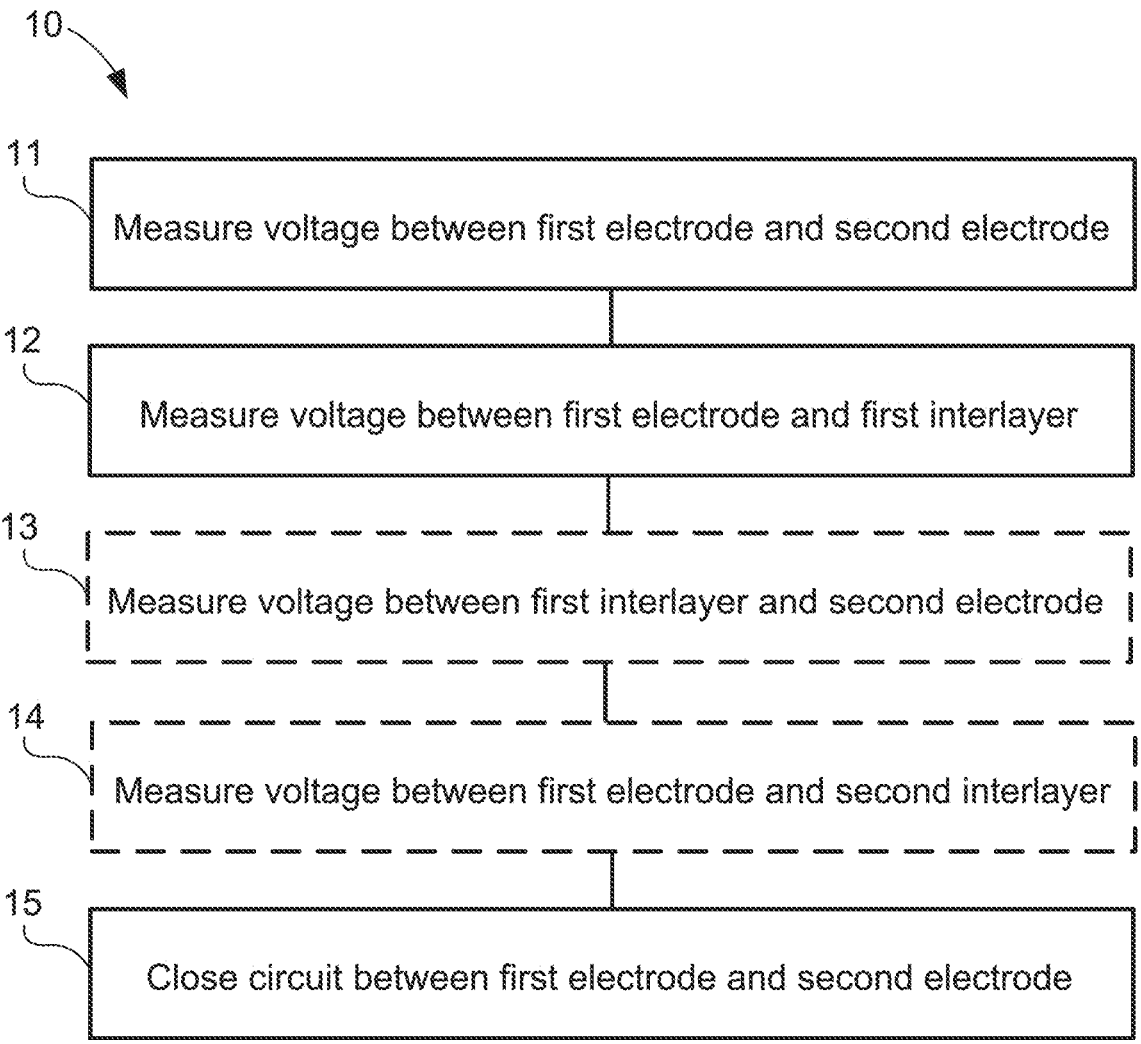
FIG. 12 is a flow diagram of a method of operating an electrochemical cell, according to an embodiment.

FIG. 12 is a flow diagram of a method 10 of operating an electrochemical cell, according to an embodiment. As shown, the method 10 includes measuring a voltage between a first electrode and a second electrode at step 11 and measuring a voltage between the first electrode and a first interlayer at step 12. The method 10 optionally includes measuring voltage between the first interlayer and a second electrode at step 13 and measuring a voltage between the first electrode and the second interlayer at step 14. The method 10 further includes closing a circuit between the first electrode and the second electrode at step 15.

Measuring the voltage between the first electrode and the second electrode at step 11 determines the voltage, at which the electrochemical cell is operating. Measuring the voltage between the first electrode and the first interlayer at step 12 provides a basis of comparison for detection of dendrites. If the voltage between the first electrode and the first interlayer decreases to less than a threshold value, this can be an indication of a short circuit between the first electrode and the first interlayer. In response, a circuit is closed between the first electrode and the second electrode at step 15. In some embodiments, the threshold voltage can be a voltage difference between the first electrode and the first interlayer. In some embodiments the threshold voltage can be about 0.001 V, about 0.002 V, about 0.003 V, about 0.004 V, about 0.005 V, about 0.006 V, about 0.007 V, about 0.008 V, about 0.009 V, about 0.01 V, about 0.02 V, about 0.03 V, about 0.04 V, about 0.05 V, about 0.06 V, about 0.07 V, about 0.08 V, about 0.09 V, about 0.1 V, about 0.2 V, about 0.3 V, about 0.4 V, about 0.5 V, about 0.6 V, about 0.7 V, about 0.8 V, about 0.9 V, or about 1 V, inclusive of all values and ranges therebetween. In some embodiments, the threshold voltage can be a threshold voltage fraction of the voltage measured between the first electrode and the interlayer to the voltage measured between the first electrode and the second electrode. In some embodiments, the threshold voltage fraction can be about 0.001, about 0.002, about 0.003, about 0.004, about 0.005, about 0.006, about 0.007, about 0.008, about 0.009, about 0.01, about 0.02, about 0.03, about 0.04, about 0.05, about 0.06, about 0.07, about 0.08, about 0.09, about 0.1, about 0.2, about 0.3, about 0.4, or about 0.5, inclusive of all values and ranges therebetween.

The method 10 optionally includes measuring the voltage between the first interlayer and the second electrode at step 13. In some embodiments, the circuit is closed at step 15 in response to the voltage measured between the first interlayer and the second electrode at step 13. In some embodiments, the closing of the circuit at step 15 can be in response to the voltage measured between the first interlayer and the second electrode decreasing to less than a threshold value. In some embodiments, the threshold voltage can be a voltage difference between the first electrode and the second interlayer. In some embodiments, the threshold voltage can be a voltage difference between the first interlayer and the second electrode. In some embodiments the threshold voltage can be about 0.001 V, about 0.002 V, about 0.003 V, about 0.004 V, about 0.005 V, about 0.006 V, about 0.007 V, about 0.008 V, about 0.009 V, about 0.01 V, about 0.02 V, about 0.03 V, about 0.04 V, about 0.05 V, about 0.06 V, about 0.07 V, about 0.08 V, about 0.09 V, about 0.1 V, about 0.2 V, about 0.3 V, about 0.4 V, about 0.5 V, about 0.6 V, about 0.7 V, about 0.8 V, about 0.9 V, or about 1 V, inclusive of all values and ranges therebetween. In some embodiments, the threshold voltage can be a threshold voltage fraction of the voltage measured between the first electrode and the second interlayer and the voltage measured between the first electrode and the second electrode. In some embodiments, the threshold voltage can be a threshold voltage fraction of the voltage measured between the first interlayer and the second electrode and the voltage measured between the first electrode and the second electrode. In some embodiments, the threshold voltage fraction can be about 0.001, about 0.002, about 0.003, about 0.004, about 0.005, about 0.006, about 0.007, about 0.008, about 0.009, about 0.01, about 0.02, about 0.03, about 0.04, about 0.05, about 0.06, about 0.07, about 0.08, about 0.09, about 0.1, about 0.2, about 0.3, about 0.4, or about 0.5, inclusive of all values and ranges therebetween.

Step 15 includes closing a circuit between the first electrode and the second electrode. In some embodiments, closing the circuit can include redirecting current through a resistor. In some embodiments, closing the circuit can include redirecting current through a separate device (e.g., a lightbulb, an additional electrochemical cell, etc.).

Figure 13:
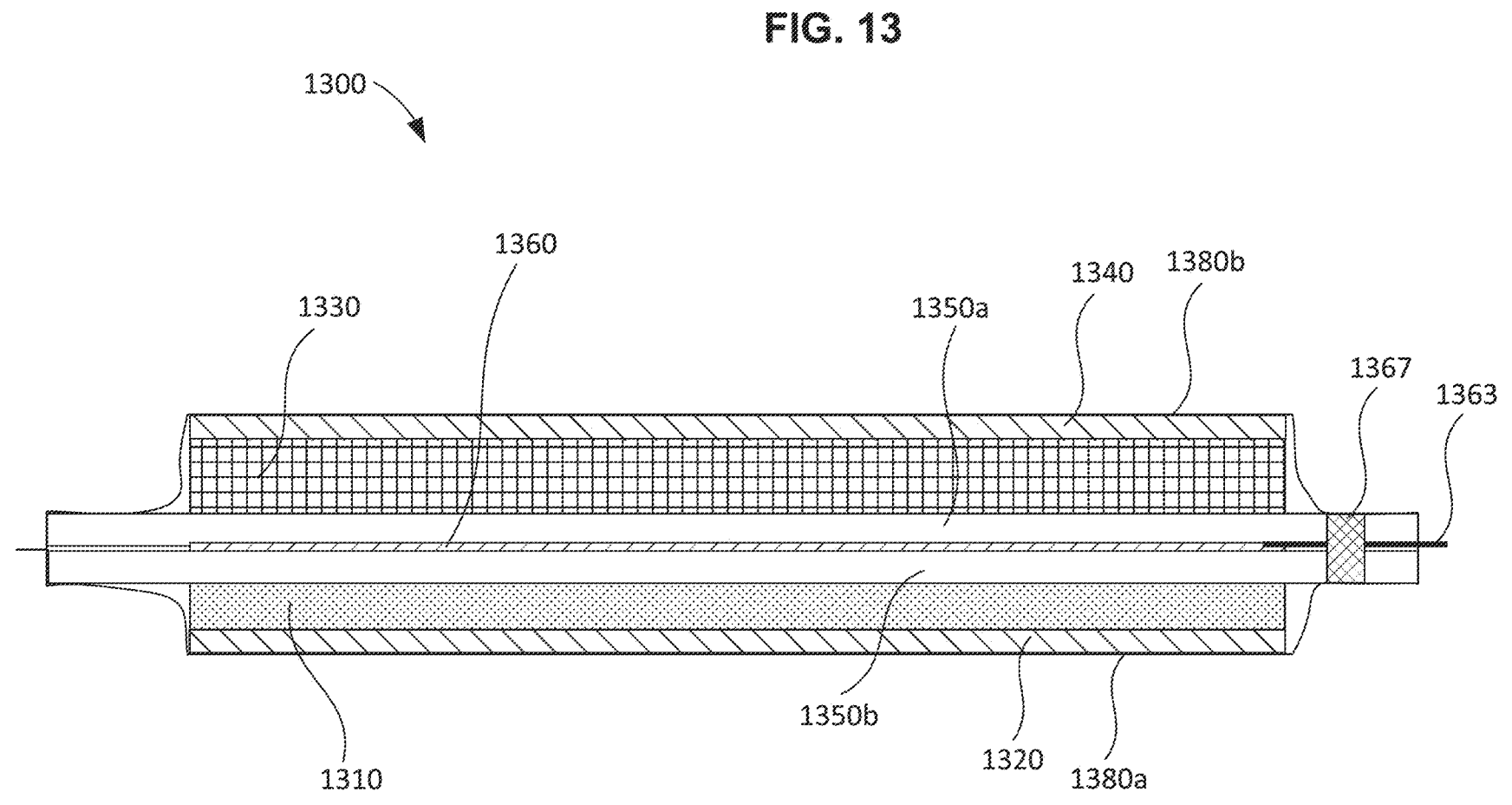

FIG. 13 is an illustration of an electrochemical cell 1300 with an interlayer 1360, according to an embodiment. As shown, the electrochemical cell 1300 includes an anode 1310 disposed on an anode current collector 1320, a cathode 1330 disposed on a cathode current collector 1340, with a first separator 1350a and a second separator 1350b (collectively referred to as separators 1350) disposed between the anode 1310 and the cathode 1330. The interlayer 1360 is disposed between the first separator 1350a and the second separator 1350b. A first film 1380a is coupled to the anode current collector 1320 and a second film 1380b is coupled to the cathode current collector 1340. The first film 1380b and the second film 1380b combine to form a pouch and are collectively referred to herein as a pouch 1380. A tab 1363 extends from the interlayer 1360. A staple 1367 is wrapped around the separators 1350 and the interlayer 1360. In some embodiments, the anode 1310, the anode current collector 1320, the cathode 1330, the cathode current collector 1340, the first separator 1350a, the second separator 1350b, and the interlayer 1360 can be the same or substantially similar to the anode 210, the anode current collector 220, the cathode 230, the cathode current collector 240, the first separator 250a, the second separator 250b, and the interlayer 260, as described above with reference to FIGS. 2A-2B. In some embodiments, the tab 1363 can be the same or substantially similar to the tab 763. as described above with reference to FIGS. 7A-7B. Thus, certain aspects of the anode 1310, the anode current collector 1320, the cathode 1330, the cathode current collector 1340, the first separator 1350a, the second separator 1350b, and the interlayer 1360 are not described in greater detail herein.

As shown, the tab 1363 protrudes from the pouch 1380. such that the tab 1363 can connect to a voltage source, a voltage measurement point, a diode, a resistor, a transistor, a fuse, or any combination thereof. The staple 1367 encircles the separators 1350 and the tab 1363, such that the staple 1367 presses the separators 1350 and the tab 1363 together. In some embodiments, the staple 1367 partially encircles the separators 1350 and the tab 1363. In some embodiments, the staple 1367 fully encircles the separators 1350 and the tab 1363. In some embodiments, the staple 1367 can add structural stability to the tab 1363 and the separators 1350, such that the 1367 aids in preventing the tab 1363 from being removed from the electrochemical cell 1300. As shown, the staple 1367 is positioned inside the first film 1380a and the second film 1380b. In other words, the staple 1367 is inside the pouch 1380. In some embodiments, the staple 1367 can be positioned outside the pouch 1380. In some embodiments, the staple 1367 can be composed of metal. In some embodiments, the staple 1367 can be composed of plastic. In some embodiments, the staple 1367 can create a sealing area around the separators 1350 and the tab 1363. In some embodiments, the sealing area can be formed via heat sealing. In some embodiments, the sealing area can be formed via pressing the staple 1367 onto the separators 1350 at a high pressure. In some embodiments, the sealing area can be formed via an adhesive between the staple 1367 and the separators 1350. In some embodiments, the sealing area can be formed via an adhesive between the staple 1367 and the pouch 1380.

As shown, the tab 1363 is positioned between the interlayer 1360 and the first separator 1350a. In some embodiments, the tab 1363 can be positioned between the interlayer 1360 and the second separator 1350b. In some embodiments, the tab 1363 can be sealed to the interlayer 1360, the first separator 1350a, and/or the second separator 1350b (e.g., via an adhesive, heat sealing, etc.). In some embodiments, the tab 1363 can be coupled to the interlayer 1360 before assembly of the electrochemical cell 1300. In some embodiments, the tab 1363 can be coupled to the interlayer 1360 after assembly of the electrochemical cell 1300. In some embodiments, the tab 1363 can protrude through a hole in the pouch 1380. In some embodiments, the hole can be cut into the pouch 1380 before installing the tab 1363. In some embodiments, the first film 1380a and/or the second film 1380b can be cut into a desired shape prior to coupling the first film 1380a and/or the second film 1380b to the anode current collector 1320 and/or the cathode current collector 1340. The anode current collector 1320 and the cathode current collector 1340 can also have tabs connected thereto. In some embodiments, the tabs connected to the anode current collector 1320 and the cathode current collector 1340 can penetrate precut holes in the first film 1380a and/or the second film 1380b.

Figure 14:
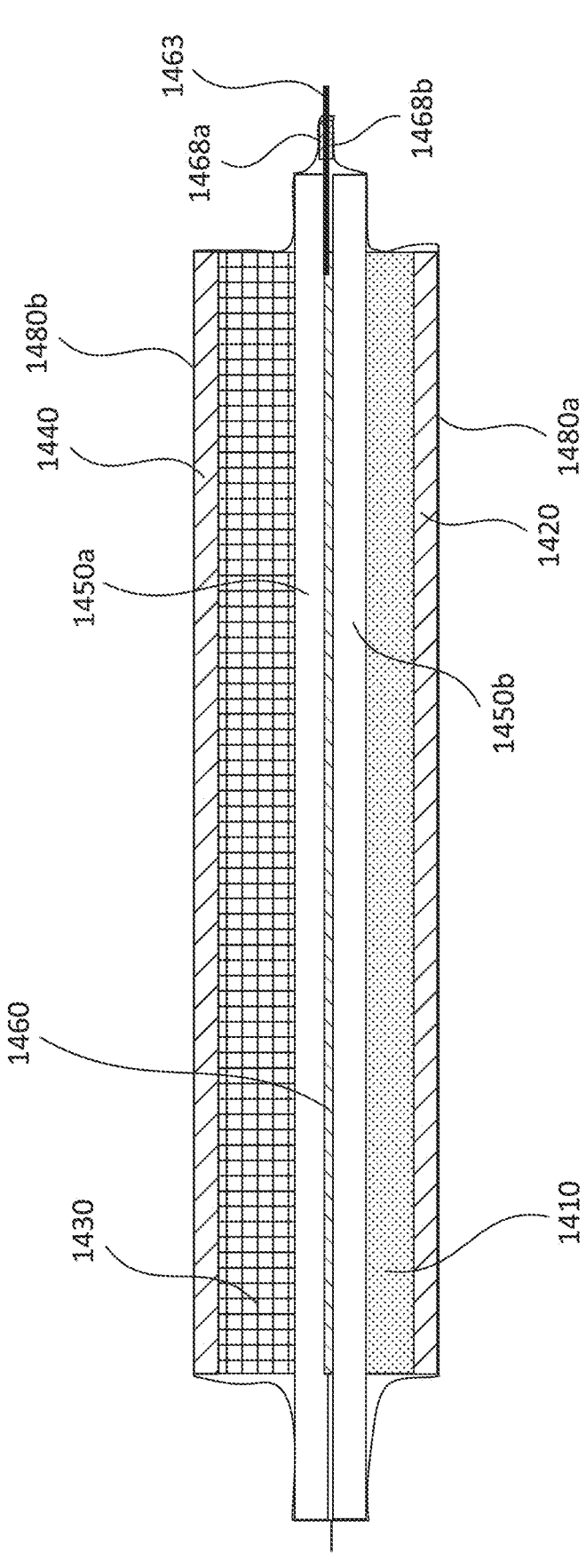
FIG. 14 is an illustration of an electrochemical cell with an interlayer, according to an embodiment.

FIG. 14 is an illustration of an electrochemical cell 1400 with an interlayer 1460, according to an embodiment. As shown, the electrochemical cell 1400 includes an anode 1410 disposed on an anode current collector 1420, a cathode 1430 disposed on a cathode current collector 1440, with a first separator 1450a and a second separator 1450b (collectively referred to as separators 1450) disposed between the anode 1410 and the cathode 1430. The interlayer 1460 is disposed between the first separator 1450a and the second separator 1450b. A first film 1480a is coupled to the anode current collector 1420 and a second film 1480b is coupled to the cathode current collector 1440. The first film 1480b and the second film 1480b combine to form a pouch and are collectively referred to herein as a pouch 1480. A tab 1463 extends from the interlayer 1460 and is bonded to the first film 1480a and the second film 1480b via a first sealing region 1468a and a second sealing region 1468b, respectively. In some embodiments, the anode 1410, the anode current collector 1420, the cathode 1430, the cathode current collector 1440, the first separator 1450a, the second separator 1450b, the interlayer 1460, the tab 1463, and the pouch 1480 can be the same or substantially similar to the anode 1310, the anode current collector 1320, the cathode 1330, the cathode current collector 1340, the first separator 1350a, the second separator 1350b, the interlayer 1360, the tab 1363, and the pouch 1380, as described above with reference to FIG. 13. Thus, certain aspects of the anode 1410, the anode current collector 1420, the cathode 1430, the cathode current collector 1440, the first separator 1450a, the second separator 1450b, the interlayer 1460, the tab 1463, and the pouch 1480 are not described in greater detail herein.

In some embodiments, the first sealing region 1468a and/or the second sealing region 1468b (collectively referred to as heat sealing regions 1468) can include a heat seal. In some embodiments, the sealing regions 1468 can include an adhesive layer bonding the tab 1463 to the pouch 1480. In some embodiments, the sealing regions 1468 can include tape. In some embodiments, the tape can be wrapped around the outside of the first film 1480a and/or the second film 1480b. In some embodiments, the separators 1450 can include ceramic separators. The stiffer ceramic materials can improve the stability of the sealing regions 1468 and the tab 1463 in general.

Figure 15A:
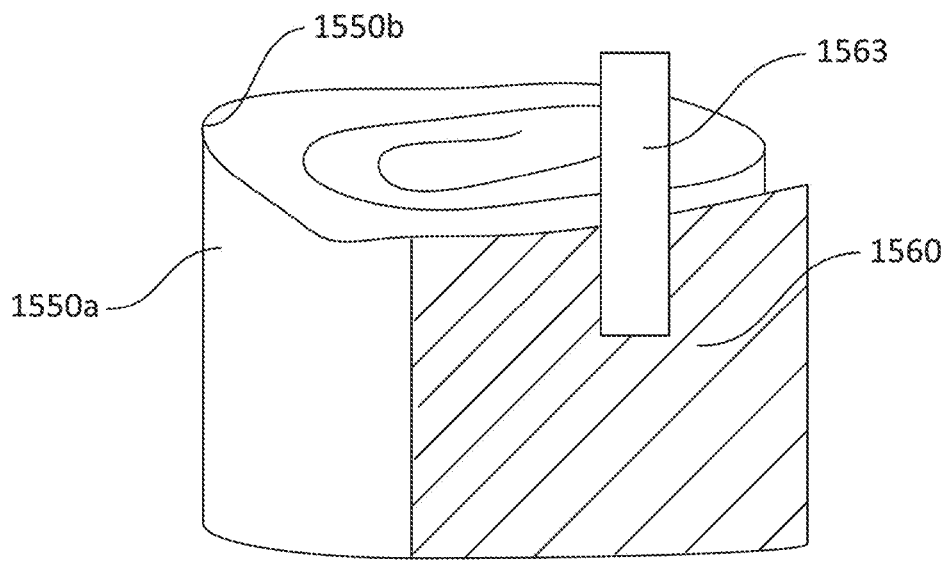
FIGS. 15A-15B are illustrations of an electrochemical cell with an interlayer, according to an embodiment.
Figure 15B:
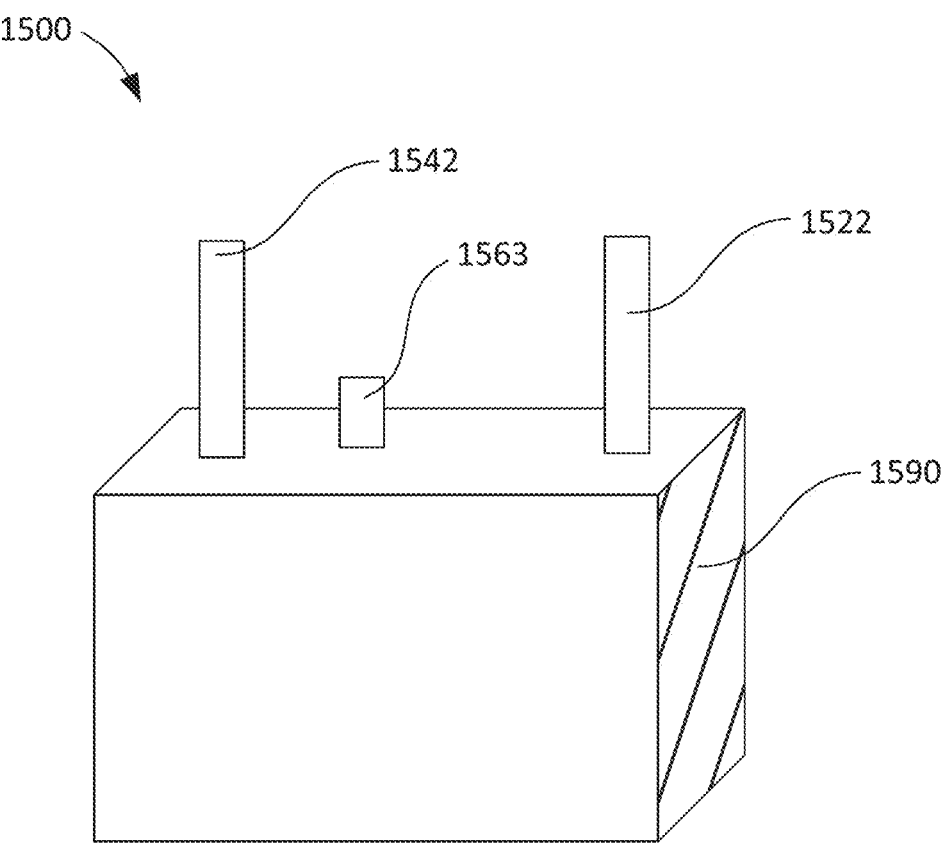

FIGS. 15A-15B show an electrochemical cell 1500 arranged in a jelly roll assembly. The electrochemical cell 1500 includes a first separator 1550a and a second separator 1550b (collectively referred to as separators 1550) with an interlayer 1560 disposed therebetween. An anode (not shown) and a cathode (not shown) are disposed on either side of the separators 1550. As shown, the second separator 1550b has the interlayer 1560 coated thereon, and the second separator 1550b is longer than the first separator 1550a, such that a portion of the interlayer 1560 is exposed. An interlayer tab 1563 is coupled to the exposed portion of the interlayer 1560. FIG. 15A shows components of the electrochemical cell 1500 without a casing 1590, and in FIG. 15B, the components of the electrochemical cell 1500 have been placed inside the casing 1590. An anode tab 1522 and a cathode tab 1542 extend from inside to outside the casing 1590. The interlayer tab 1563 extends from inside to outside the casing 1590. In some embodiments, multiple pairs of separators 1550 can be used to form the jelly roll. In some embodiments, multiple sections of the interlayer 1560 material can be exposed, such that multiple tabs 1563 can be connected to the interlayer. Any of the tabs 1563 can be connected outside of the casing 1590 to diodes, transistors, fuses, voltage measurements, voltage sources, etc. In some embodiments, one or more of the separators 1550 can be created by porous coating with or without containing ceramic particles. In some embodiments, one or more of the separators 1550 can be composed of polyvinylidene fluoride (PVDF), styrene-butadiene (SBR), carboxymethyl cellulose (CMC), polyethylene oxides (PEO), polytetrafluoroethylene (PTFE), (perfluoroalkoxy alkanes) PFA, polyacrylonitrile (PAN), poly(acrylic acid) PAA, Poly Olefin, polysulfone (PES), polyethylene terephthalate (PET), polyphenylene sulfide (PPS), polybenzimidazole (PBI), polyamide-imides (PAI), polyimide (PI), polyether ether ketone (PEEK), ultraviolet (UV) curable resin, urethane/epoxy acrylate, or any combination thereof. In some embodiments, the ceramic can include $Al_2O_3$, boehmite, MgO, $Al(HO)_3$, $ZrO_2$.

Figure 16A:
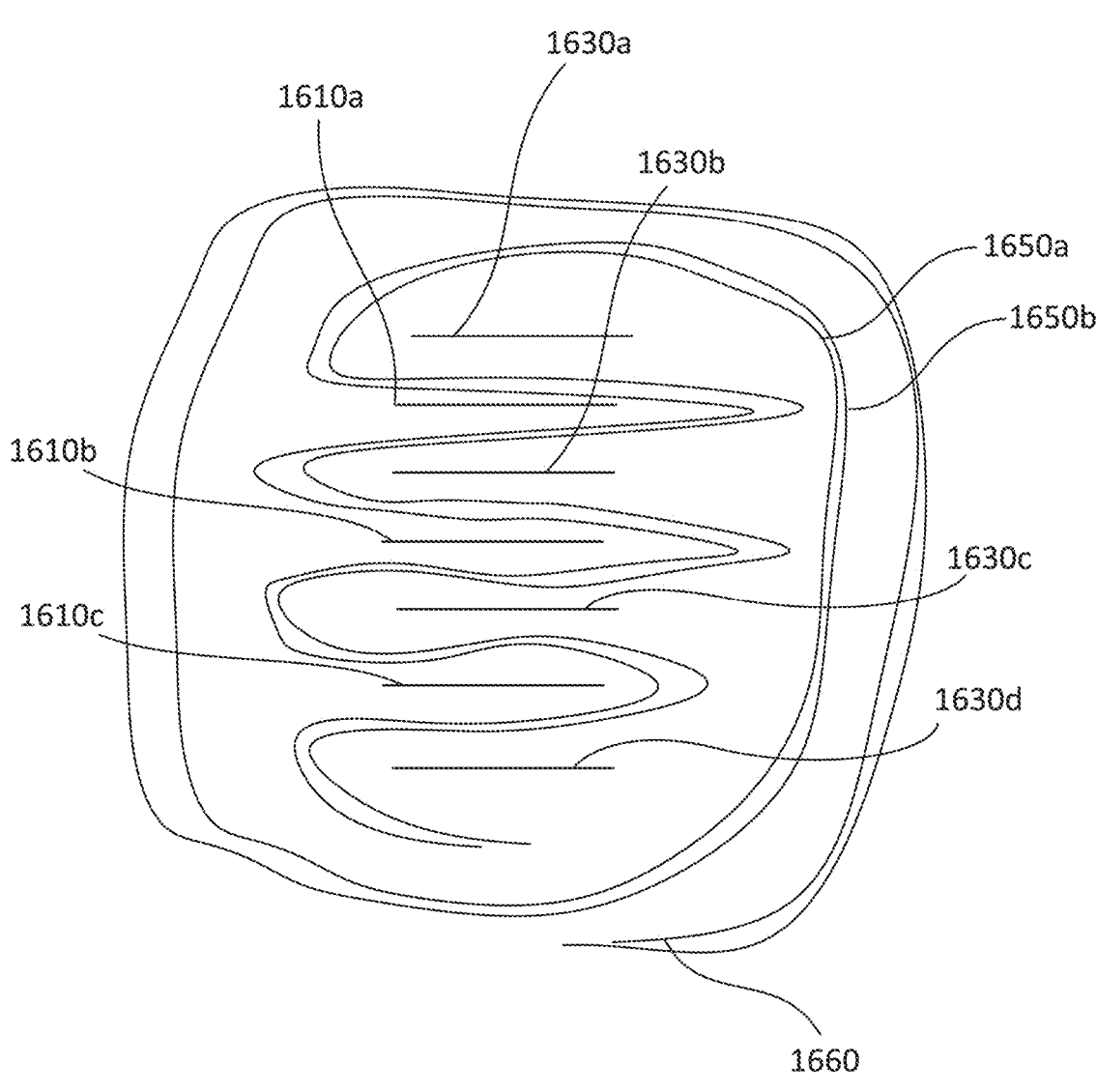
FIGS. 16A-16B are illustrations of an electrochemical cell stack with an interlayer, according to an embodiment.
Figure 16B:
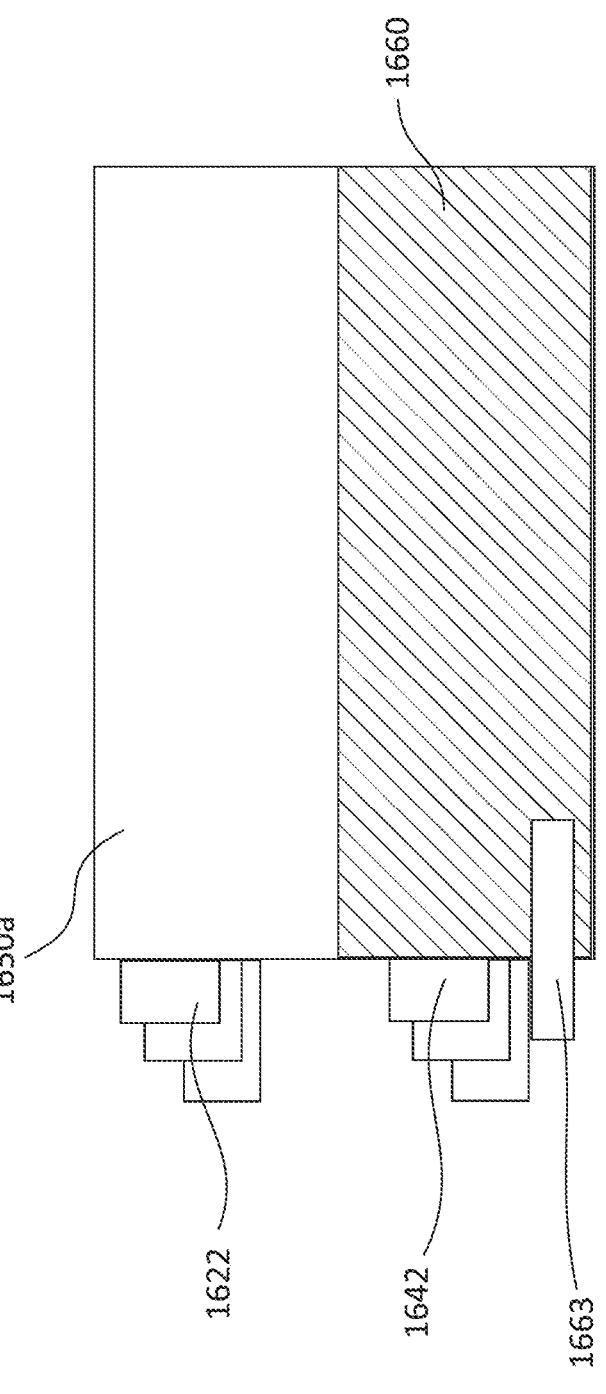

FIGS. 16A-16B show a stack of electrochemical cells with interlayers. As shown, the stack includes anodes 1610a, 1610b, 1610c (collectively referred to as anodes 1610) and cathodes 1630a, 1630b, 1630c, 1630d (collectively referred to as cathodes 1630). A first separator 1650a and a second separator 1650b (collectively referred to as separators 1650) are woven between the anodes 1610 and the cathodes 1630 in a serpentine or zig-zag pattern. An interlayer 1660 is disposed between the separators 1650. FIG. 16A shows a cross-sectional view of the separators 1650 with the interlayer 1660 therebetween as they are woven through the electrodes. As shown, the second separator 1650b is longer than the first separator 1650a, such that a portion of the interlayer 1660 disposed on the second separator 1650b is uncovered. FIG. 16B shows a bottom view of the stack, with the portion of the interlayer 1660 exposed. An interlayer tab 1663 is coupled to the interlayer 1660 and extends outward. Anode tabs 1622 and cathode tabs 1624 extend from the anodes 1610 and the cathodes 1630.

Figure 17A:
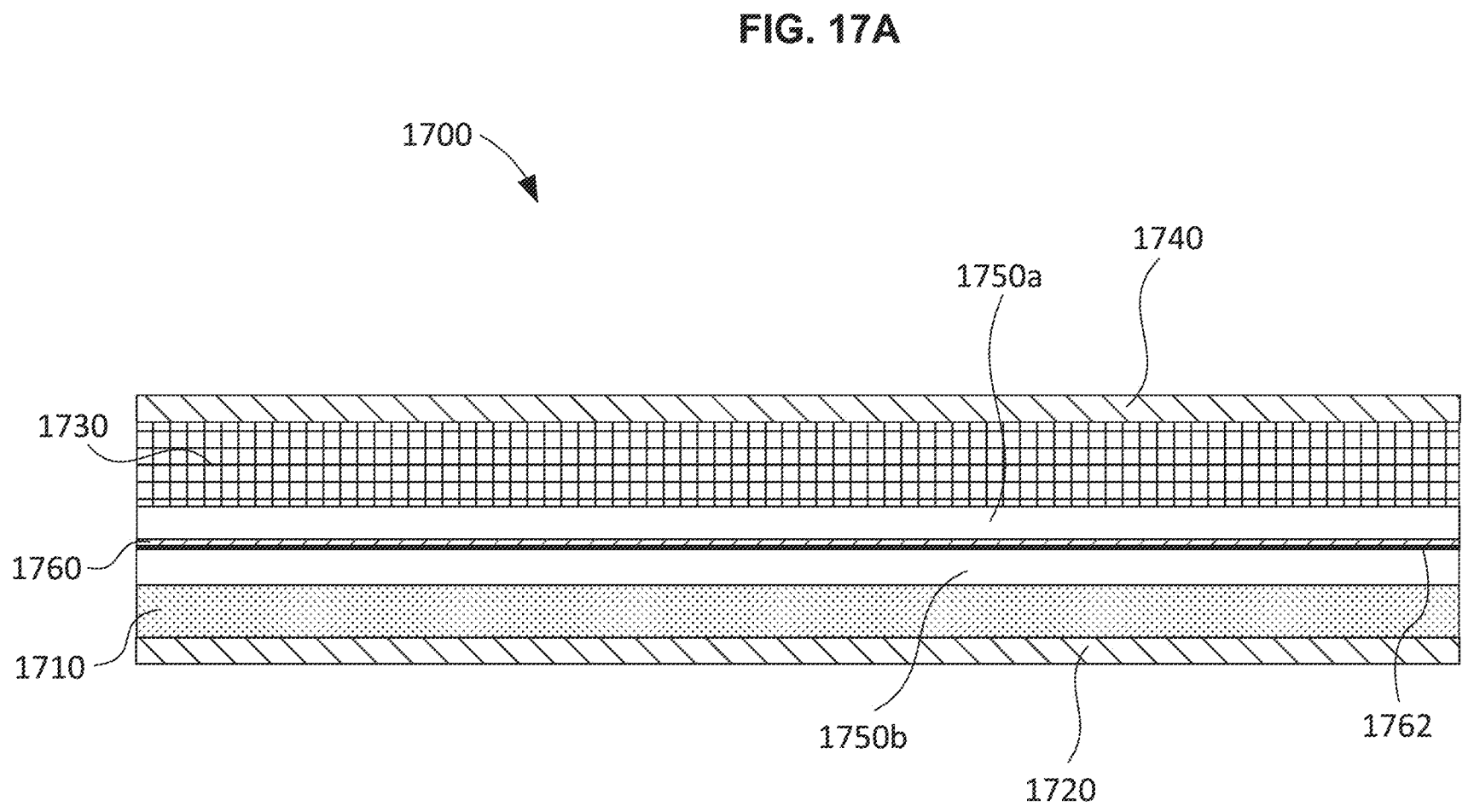
Figure 17B:
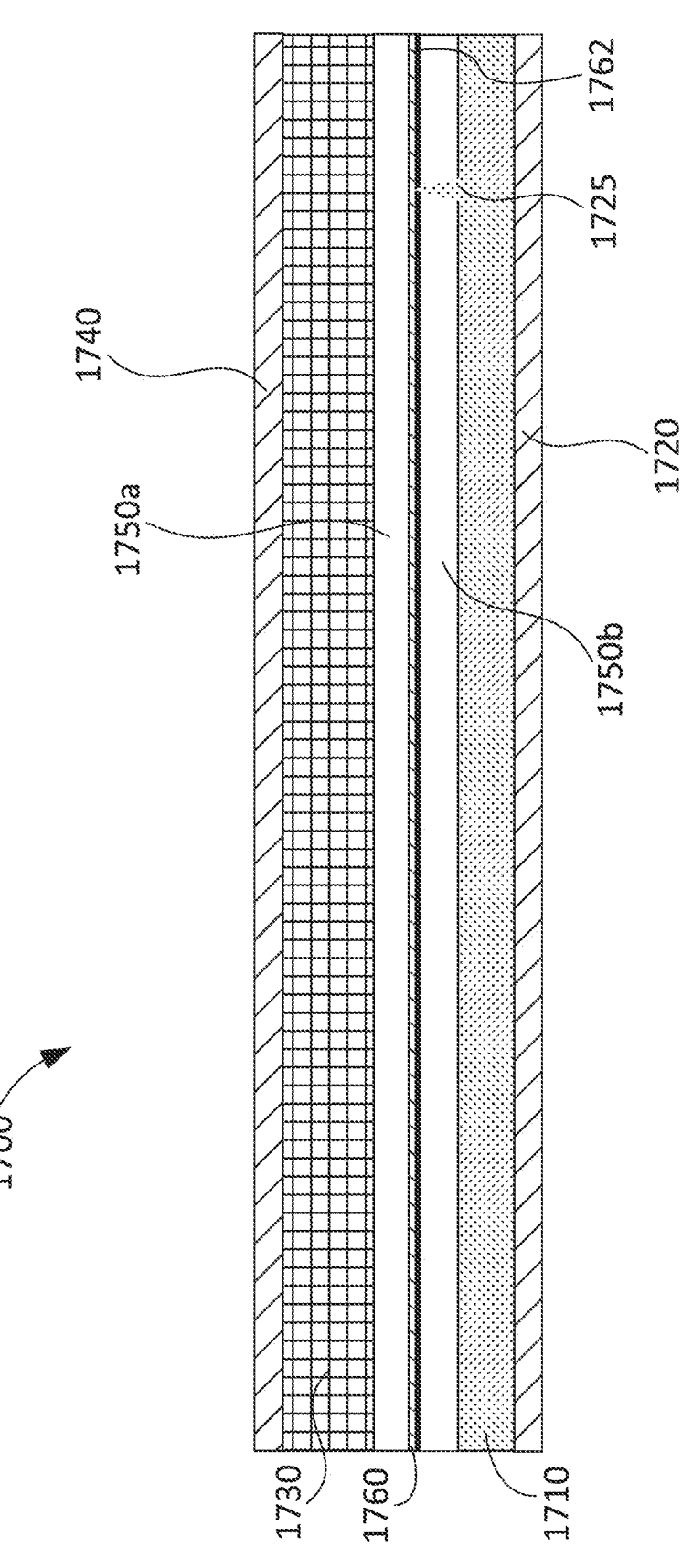

FIGS. 17A-17B are illustrations of an electrochemical cell 1700 with an interlayer 1760, according to an embodiment. As shown, the electrochemical cell 1700 includes an anode 1710 disposed on an anode current collector 1720, a cathode 1730 disposed on a cathode current collector 1740, with a first separator 1750a and a second separator 1750b disposed between the anode 1710 and the cathode 1730. The interlayer 1760 is disposed between the first separator 1750a and the second separator 1750b. In some embodiments, the anode 1710, the anode current collector 1720, the cathode 1730, the cathode current collector 1740, the first separator 1750a, the second separator 1750b, and the interlayer 1760 can be the same or substantially similar to the anode 210, the anode current collector 220, the cathode 230, the cathode current collector 240, the first separator 250a, the second separator 250b, and the interlayer 260, as described above with reference to FIGS. 2A-2B. Thus, certain aspects of the anode 1710, the anode current collector 1720, the cathode 1730, the cathode current collector 1740, the first separator 1750a, the second separator 1750b, and the interlayer 1760 are not described in greater detail herein.

As shown, the interlayer 1760 includes a solid-state electrolyte layer 1762. FIG. 17B shows the formation of a dendrite 1725. The solid-state electrolyte layer 1762 blocks the dendrite 1725 and prevents the dendrite 1725 from penetrating the interlayer 1762. As shown, the solid-state electrolyte layer 1762 is appended to the second separator 1750b. In some embodiments, the solid-state electrolyte layer 1762 can be appended to the first separator 1750a. In some embodiments, the solid-state electrolyte layer 1762 can be in a relatively central position in the interlayer 1760, such that the solid-state electrolyte layer 1762 is appended to neither the first separator 1750a nor the second separator 1750b. In some embodiments, the interlayer 1760 can include multiple solid-state electrolyte layers 1762.

Figure 18:
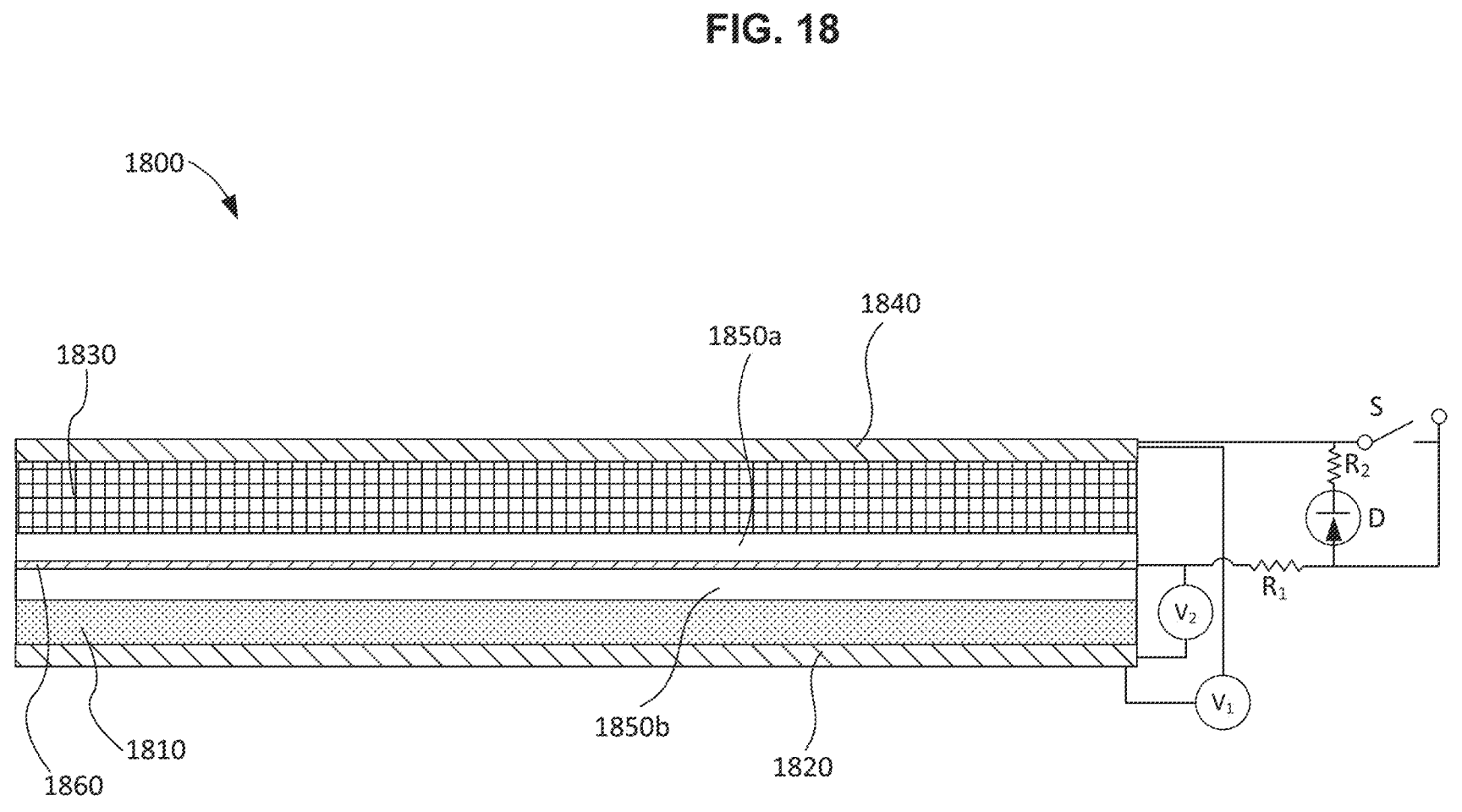

FIG. 18 is an illustration of an electrochemical cell 1800 with an interlayer 1860, according to an embodiment. As shown, the electrochemical cell 1800 includes an anode 1810 disposed on an anode current collector 1820, a cathode 1830 disposed on a cathode current collector 1840, with a first separator 1850a and a second separator 1850b disposed between the anode 1810 and the cathode 1830. The interlayer 1860 is disposed between the first separator 1850a and the second separator 1850b. In some embodiments, the anode 1810, the anode current collector 1820, the cathode 1830, the cathode current collector 1840, the first separator 1850a, the second separator 1850b, and the interlayer 1860 can be the same or substantially similar to the anode 210, the anode current collector 220, the cathode 230, the cathode current collector 240, the first separator 250a, the second separator 250b, and the interlayer 260, as described above with reference to FIGS. 2A-2B. Thus, certain aspects of the anode 1810, the anode current collector 1820, the cathode 1830, the cathode current collector 1840, the first separator 1850a, the second separator 1850b, and the interlayer 1860 are not described in greater detail herein.

As shown, the electrochemical cell 1800 includes a circuit between the cathode 1830 and the interlayer 1860, enabling the transfer of electrical energy between the cathode 1830 and the interlayer 1860. By connecting the cathode 1830 and the interlayer 1860 electrically, the voltage in the interlayer 1860 can be increased to such a level that dissolves and/or oxidizes dendrites that have penetrated into the interlayer 1860. As shown, a voltage $V_1$ is measured between the anode current collector 1820 and the interlayer 1860 and a voltage $V_2$ is measured between the anode current collector 1820 and the cathode current collector 1840. Current flows from the interlayer 1860 to the cathode current collector 1840 via an electrical pathway that includes a resistor $R_1$. The current can follow a path that includes a switch S. The current can also follow a path that includes a diode D and a resistor $R_2$. In some embodiments the switch can be closed during current flow allowing normal charge and discharge to happen in the cell. In some embodiments, the switch S can be opened during a controlled charge. During charge, when the switch S is open, the voltage potential of the interlayer can increase by the same value of the voltage drop of the diode D and the resistor $R_2$. In some embodiments, the diode D can be selected and placed for a specific forward or reverse breakdown voltage. In some embodiments, the breakdown voltage of the diode D can be about 0.4 V, about 0.5 V, about 0.6 V, about 0.7 V, about 0.8 V, about 0.9 V, about 1 V, about 1.5 V, about 2 V, about 2.5 V, about 3 V, about 3.5 V, about 4 V, about 4.5 V, about 5 V, about 5.5 V, or about 6 V, inclusive of all values and ranges therebetween.

In some embodiments, the resistance of the resistor $R_1$ can be the same or substantially similar to the resistance of the resistor $R_2$. In some embodiments, the resistance of the resistor $R_1$ can be different from the resistance of the resistor $R_2$. In some embodiments, the resistor $R_1$ and the resistor $R_2$ can have resistances that represent other impedances inherent to the electrochemical cell 1800. In some embodiments, the switch S can be replaced with a diode, a metal oxide silicon field effect transistor (MOSFET), a bipolar junction transistor (BJT), or any other suitable component. In some embodiments, the switch S can bypass the function of the diode D, creating a selective dendrite treatment mode or normal operation.

Figure 19:
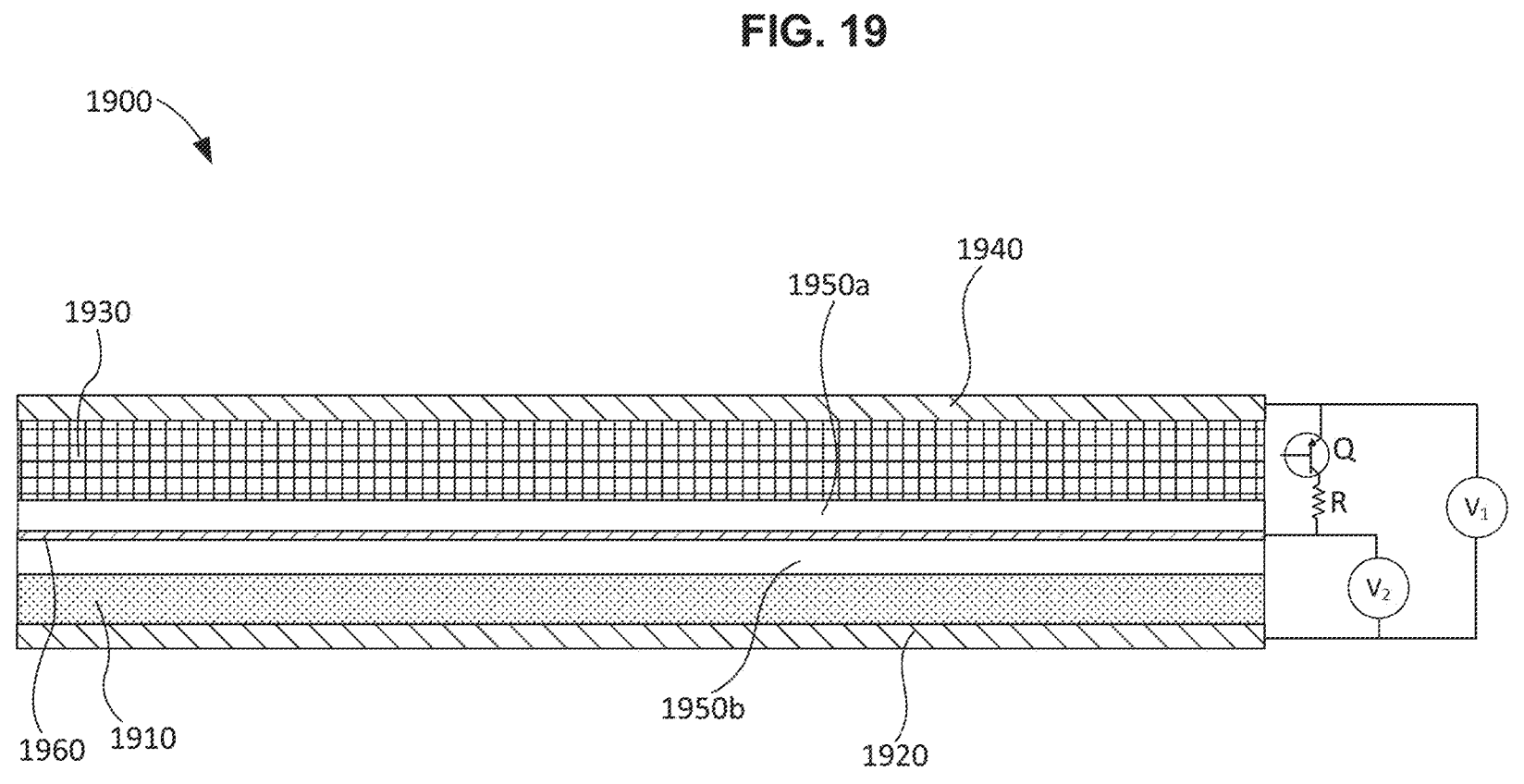

FIG. 19 is an illustration of an electrochemical cell 1900 with an interlayer 1960, according to an embodiment. As shown, the electrochemical cell 1900 includes an anode 1910 disposed on an anode current collector 1920, a cathode 1930 disposed on a cathode current collector 1940, with a first separator 1950a and a second separator 1950b disposed between the anode 1910 and the cathode 1930. The interlayer 1960 is disposed between the first separator 1950a and the second separator 1950b. In some embodiments, the anode 1910, the anode current collector 1920, the cathode 1930, the cathode current collector 1940, the first separator 1950a, the second separator 1950b, and the interlayer 1960 can be the same or substantially similar to the anode 210, the anode current collector 220, the cathode 230, the cathode current collector 240, the first separator 250a, the second separator 250b, and the interlayer 260, as described above with reference to FIGS. 2A-2B. Thus, certain aspects of the anode 1910, the anode current collector 1920, the cathode 1930, the cathode current collector 1940, the first separator 1950a, the second separator 1950b, and the interlayer 1960 are not described in greater detail herein.

As shown, flow of current from the interlayer 1960 to the cathode current collector 1940 can be controlled via a transistor Q. As shown, a voltage $V_1$ is measured between the anode current collector 1920 and the cathode current collector 1940 and a voltage $V_2$ is measured between the anode current collector 1920 and the interlayer 1960. Current can flow from the interlayer 1960 to the cathode current collector 1940 via the transistor Q (and an optional resistor R). The transistor Q can act as a switching device. In some embodiments, the transistor Q can be controlled by a BMS. In some embodiments, the transistor Q can be controlled by a local hardware circuit or other system control apparatus. In some embodiments, the resistance values can be from separate components, or they can represent other impedances inherent to the electrochemical cell 1900. In some embodiments, the transistor Q can include a BJT. In some embodiments, the transistor Q can be replaced with a diode. In some embodiments, the transistor Q can include a junction field effect transistor (JFET). In some embodiments, the transistor Q can include a MOSFET. In some embodiments, the transistor Q can be replaced with a switch.

Figure 20:
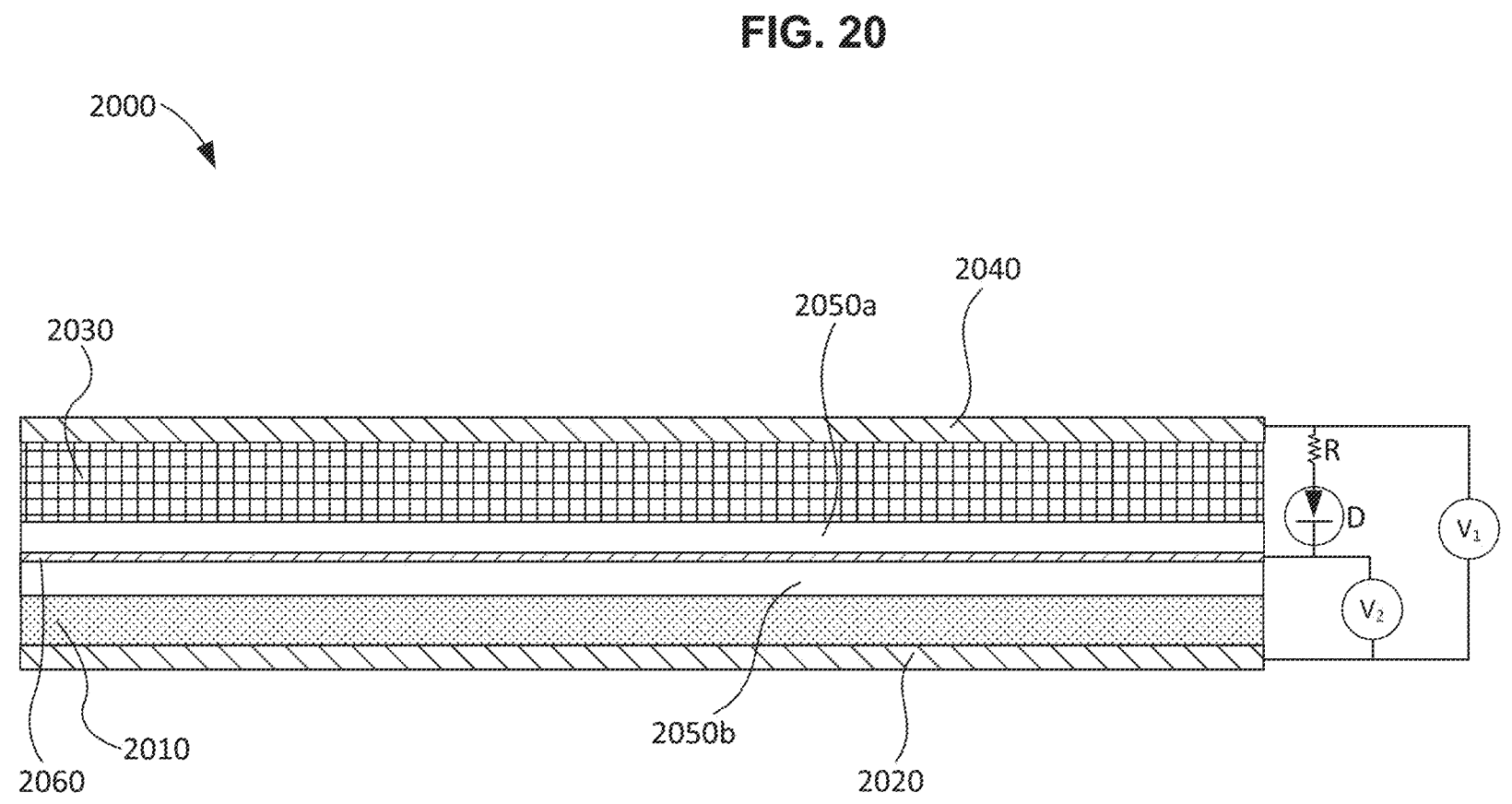

FIG. 20 is an illustration of an electrochemical cell 2000 with an interlayer 2060, according to an embodiment. As shown, the electrochemical cell 2000 includes an anode 2010 disposed on an anode current collector 2020, a cathode 2030 disposed on a cathode current collector 2040, with a first separator 2050a and a second separator 2050b disposed between the anode 2010 and the cathode 2030. The interlayer 2060 is disposed between the first separator 2050a and the second separator 2050b. In some embodiments, the anode 2010, the anode current collector 2020, the cathode 2030, the cathode current collector 2040, the first separator 2050a, the second separator 2050b, and the interlayer 2060 can be the same or substantially similar to the anode 210, the anode current collector 220, the cathode 230, the cathode current collector 240, the first separator 250a, the second separator 250b, and the interlayer 260, as described above with reference to FIGS. 2A-2B. Thus, certain aspects of the anode 2010, the anode current collector 2020, the cathode 2030, the cathode current collector 2040, the first separator 2050a, the second separator 2050b, and the interlayer 2060 are not described in greater detail herein.

As shown, flow of current between the interlayer 1960 and the cathode current collector 1940 can be controlled via a diode D. In the event the current through the diode D falls below a threshold value, the diode D can 'turn off,' preventing continuous current flow to the interlayer 1960. As shown, a voltage $V_1$ is measured between the anode current collector 2020 and the cathode current collector 2040 and a voltage $V_2$ is measured between the anode current collector 2020 and the interlayer 2060. If the voltage of the interlayer 2060 decreases to a value below the diode forward voltage, current can flow through the diode D (and an optional resistor R), increasing the potential of the interlayer 2060. In some embodiments, the resistance value can represent other impedances inherent to the electrochemical cell 2000.

Figure 21:
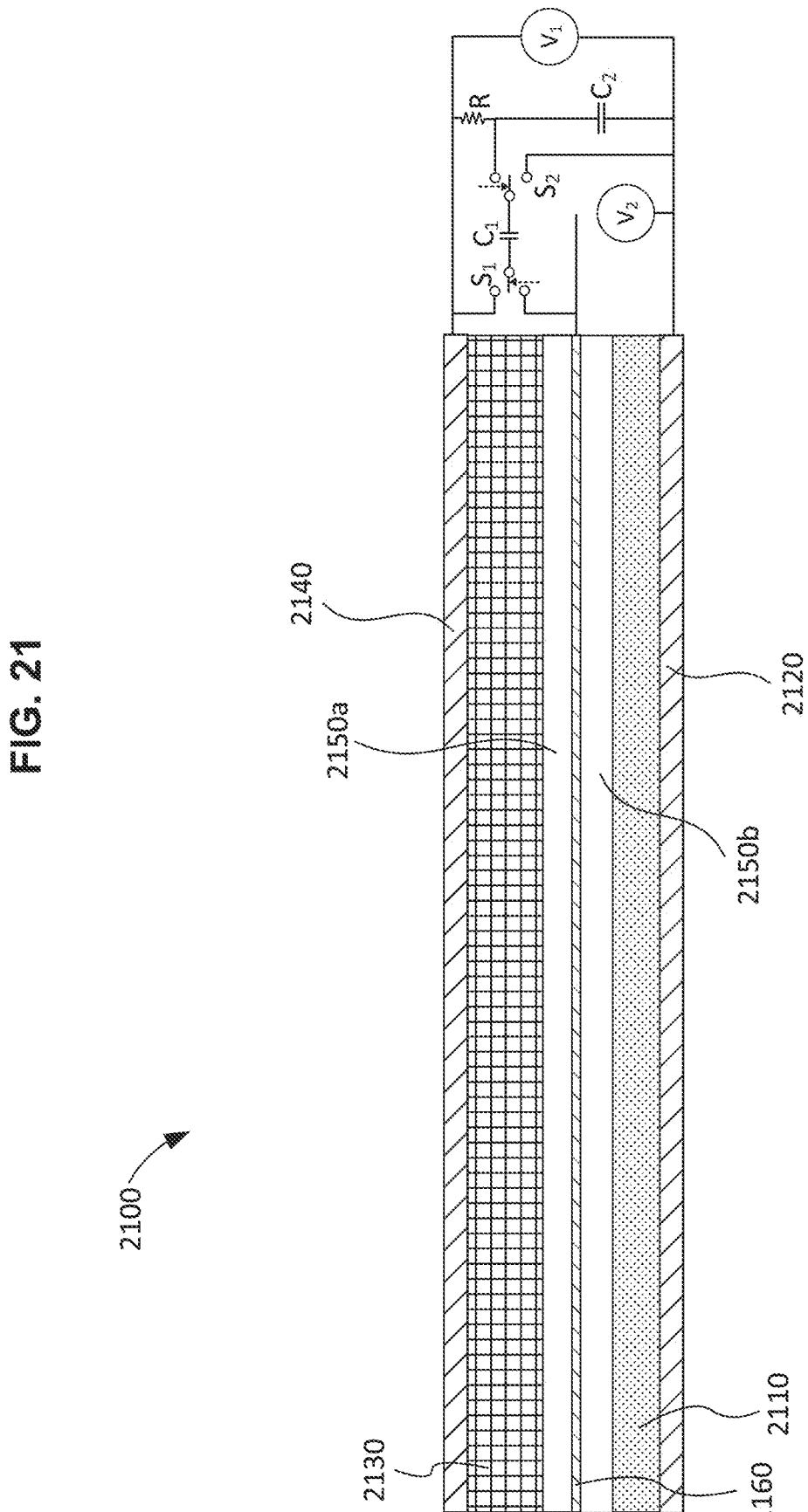
FIG. 21 is an illustration of an electrochemical cell with an interlayer, according to an embodiment.

FIG. 21 is an illustration of an electrochemical cell 2100 with an interlayer 2160, according to an embodiment. As shown, the electrochemical cell 2100 includes an anode 2110 disposed on an anode current collector 2120, a cathode 2130 disposed on a cathode current collector 2140, with a first separator 2150a and a second separator 2150b disposed between the anode 2110 and the cathode 2130. The interlayer 2160 is disposed between the first separator 2150a and the second separator 2150b. In some embodiments, the anode 2110, the anode current collector 2120, the cathode 2130, the cathode current collector 2140, the first separator 2150*a*, the second separator 2150*b*, and the interlayer 2160 can be the same or substantially similar to the anode 210, the anode current collector 220, the cathode 230, the cathode current collector 240, the first separator 250*a*, the second separator 250*b*, and the interlayer 260, as described above with reference to FIGS. 2A-2B. Thus, certain aspects of the anode 2110, the anode current collector 2120, the cathode 2130, the cathode current collector 2140, the first separator 2150*a*, the second separator 2150*b*, and the interlayer 2160 are not described in greater detail herein.

As shown, the electrochemical cell 2100 is configured as a voltage doubling mechanism, commonly called a 'charge pump'. Common components such as SEMTECH SC632A can be used to accomplish this or similar functions. As shown, a voltage $V_1$ is measured between the anode current collector 2120 and the cathode current collector 2140. The electrochemical cell 2100 includes switches $S_1$ and $S_2$, resistor R, and capacitors $C_1$ and $C_2$. A voltage $V_2$ is measured between the anode current collector 2120 and the interlayer 2160. As shown, switch $S_1$ and switch $S_2$ control the flow of current through the electrochemical cell 2100. Through control of the switching sequence of the switch $S_1$ and the switch $S_2$, a voltage equal to or double the voltage of the cathode 2130 relative to the anode 2110 can be applied to the interlayer 2160. For example, the switch $S_1$ can be switched to the up position while the switch $S_2$ is switched to the down position to charge the capacitor $C_1$. The capacitor $C_2$ can charge continuously via the resistor R. In order to apply a doubling voltage, the switch $S_1$ can be moved to the down position, connecting to the interlayer 2160, and the switch $S_2$ is moved to the up position, electrically connecting the capacitor $C_1$ to the top side of the capacitor $C_2$. In such a case, the total voltage applied to the interlayer 2160 is equal to $C_1 \times V_1 + C_2 \times V_1$, where $V_1$ is the voltage applied to the interlayer 2160. In cases where $C_1$ is equal to $C_2$, this equates to $2 \times V_1$. For example, if only cell voltage $V_1$ is applied, then the switch $S_2$ can remain in the down position and the switch $S_1$ can alternate between the up and the down position. In some embodiments, the input voltage can be taken from the electrochemical cell 2100 or from another source. The capacitor $C_2$ can also be replaced with a secondary voltage source, either galvanically isolated from the cell or on a common reference.

The energy transferred to the interlayer 2160 can be controlled via the resistance of the components of the electrochemical cell 2100 (including the resistor R) and/or via other resistors (not shown). In some embodiments, the energy transferred to the interlayer 2160 can be controlled via selection of the capacitor $C_1$ or use of other types of active components. In some embodiments, the resistances through each current flow path can be the same or substantially similar. In some embodiments, the resistances through each current flow path can be different from each other. In some embodiments, the resistance values can be from separate components, or they can represent other impedances inherent to the electrochemical cell 2100. In some embodiments, the switch $S_1$ and/or the switch $S_2$ can be replaced by a diode, a MOSFET, a BJT, or any other suitable device.

Figure 22:
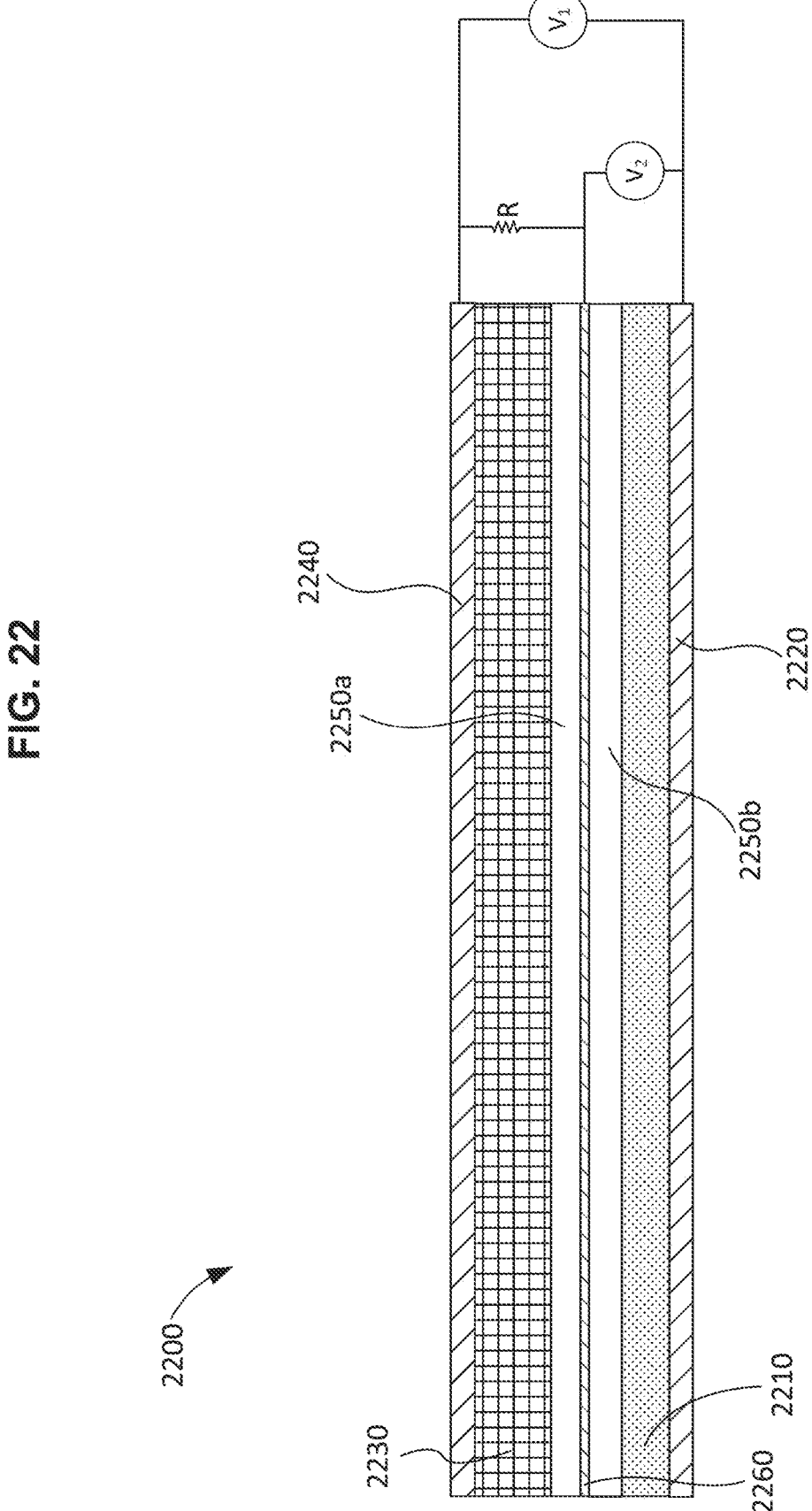
FIG. 22 is an illustration of an electrochemical cell with an interlayer, according to an embodiment.

FIG. 22 is an illustration of an electrochemical cell 2200 with an interlayer 2260, according to an embodiment. As shown, the electrochemical cell 2200 includes an anode 2210 disposed on an anode current collector 2220, a cathode 2230 disposed on a cathode current collector 2240, with a first separator 2250*a* and a second separator 2250*b* disposed between the anode 2210 and the cathode 2230. The interlayer 2260 is disposed between the first separator 2250*a* and the second separator 2250*b*. In some embodiments, the anode 2210, the anode current collector 2220, the cathode 2230, the cathode current collector 2240, the first separator 2250*a*, the second separator 2250*b*, and the interlayer 2260 can be the same or substantially similar to the anode 210, the anode current collector 220, the cathode 230, the cathode current collector 240, the first separator 250*a*, the second separator 250*b*, and the interlayer 260, as described above with reference to FIGS. 2A-2B. Thus, certain aspects of the anode 2210, the anode current collector 2220, the cathode 2230, the cathode current collector 2240, the first separator 2250*a*, the second separator 2250*b*, and the interlayer 2260 are not described in greater detail herein.

As shown, the circuitry in the electrochemical cell 2200 can have a bias circuit. In some embodiments, the resistances through each current flow path can be the same or substantially similar. In some embodiments, the resistances through each current flow path can be different from each other. In some embodiments, the resistance values can be from separate components, or they can represent other impedances inherent to the electrochemical cell 2200. As shown, a voltage $V_1$ is measured between the anode current collector 2220 and the cathode current collector 2240 and a voltage $V_2$ is measured between the anode current collector 2220 and the cathode current collector 2240. When the voltage of the interlayer 2260 decreases to a value of less than the voltage of the cathode current collector 2240, current can be routed to flow from the cathode current collector 2240 to the interlayer 2260, thereby increasing the potential of the interlayer 2260. As shown, a resistor R is placed between the interlayer 2260 and the cathode current collector 2240. In some embodiments, the resistance of the resistor R can be large enough to prevent self-discharge of the electrochemical cell 2200.

Figure 23:
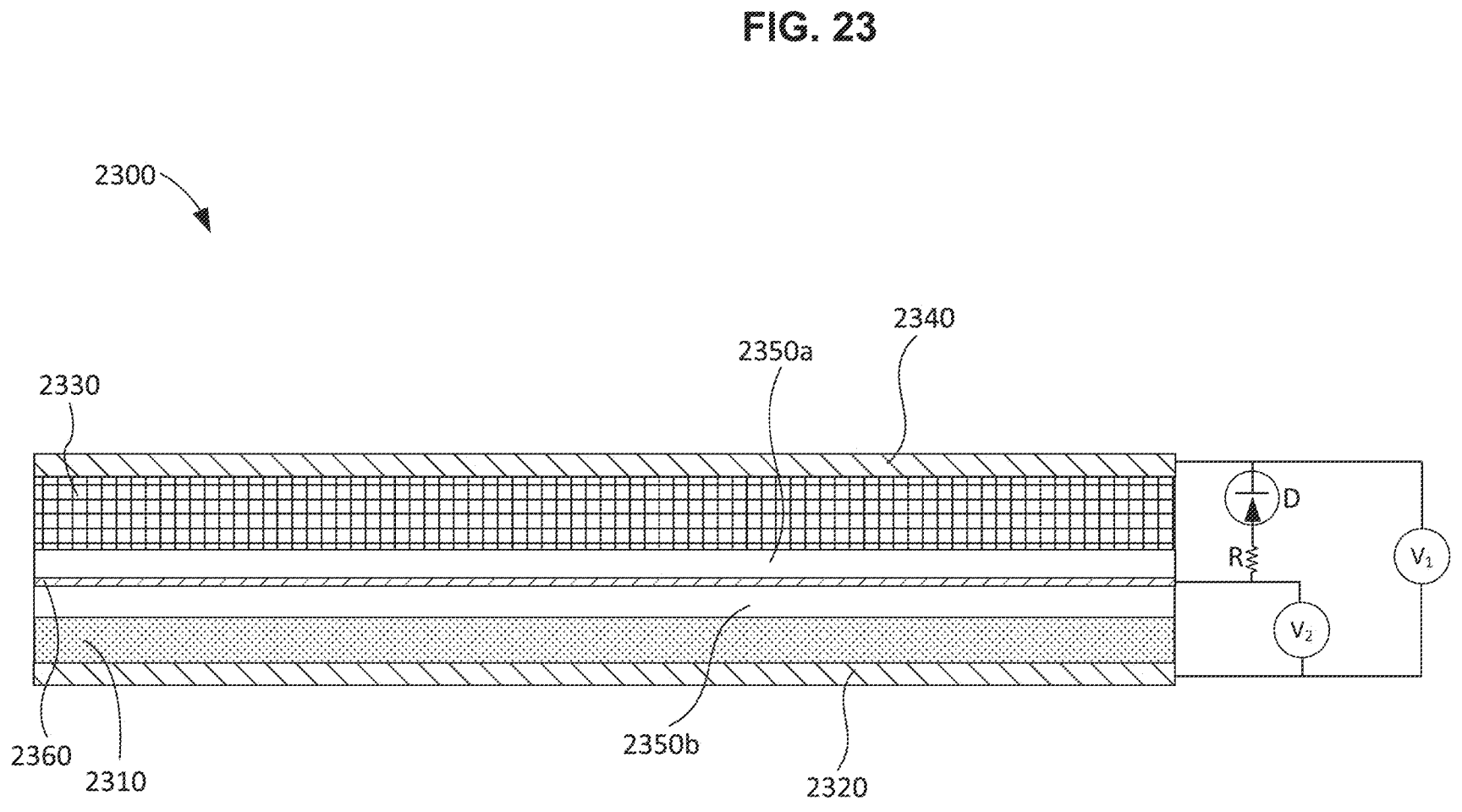

FIG. 23 is an illustration of an electrochemical cell 2300 with an interlayer 2360, according to an embodiment. As shown, the electrochemical cell 2300 includes an anode 2310 disposed on an anode current collector 2320, a cathode 2330 disposed on a cathode current collector 2340, with a first separator 2350*a* and a second separator 2350*b* disposed between the anode 2310 and the cathode 2330. The interlayer 2360 is disposed between the first separator 2350*a* and the second separator 2350*b*. In some embodiments, the anode 2310, the anode current collector 2320, the cathode 2330, the cathode current collector 2340, the first separator 2350*a*, the second separator 2350*b*, and the interlayer 2360 can be the same or substantially similar to the anode 210, the anode current collector 220, the cathode 230, the cathode current collector 240, the first separator 250*a*, the second separator 250*b*, and the interlayer 260, as described above with reference to FIGS. 2A-2B. Thus, certain aspects of the anode 2310, the anode current collector 2320, the cathode 2330, the cathode current collector 2340, the first separator 2350*a*, the second separator 2350*b*, and the interlayer 2360 are not described in greater detail herein.

As shown, the circuitry in the electrochemical cell 2300 can have a bias circuit. A first voltage $V_1$ is measured between the anode current collector 2320 and the cathode current collector 2340. A second voltage $V_2$ is measured between the interlayer 2360 and the cathode current collector 2340. In some embodiments, the resistances through each current flow path can be the same or substantially similar. In some embodiments, the resistances through each current flow path can be different from each other. In some embodiments, the resistance can represent other impedances inherent to the electrochemical cell 2300. As shown a resistor R and a diode D are placed between the interlayer 2360 and the cathode current collector 2340. When the voltage of the interlayer 2360 decreases below the voltage of the current collector 2340, leakage current can flow through the diode D, allowing the potential of the interlayer 2360 to increase. In some embodiments, the diode D can include a rectification diode (a diode not intended to function in reverse breakdown voltage). In embodiments where the diode D includes a rectification diode, current can be restricted in two ways. Reverse bias leakage current of the diode D (e.g., as defined by the manufacturer of the diode D) can be limited by specification of the diode D. Use of a standard diode can ensure that only reverse recovery current (as specified by the manufacturer of the diode) can flow through the circuit. When the recovery current is reached, the diode D can open, allowing only leakage current (as specified by the manufacturer). Also, the reverse recovery current of the diode D (e.g., as defined by the manufacturer of the diode D) can be limited by resistor R. In the event that the voltage of the interlayer 2360 exceeds the voltage of the cathode 2340, the diode D can allow a full rated current to flow, clamping the voltage potential to the voltage of the cathode 2340 and the forward voltage of the diode D.

Figure 24:
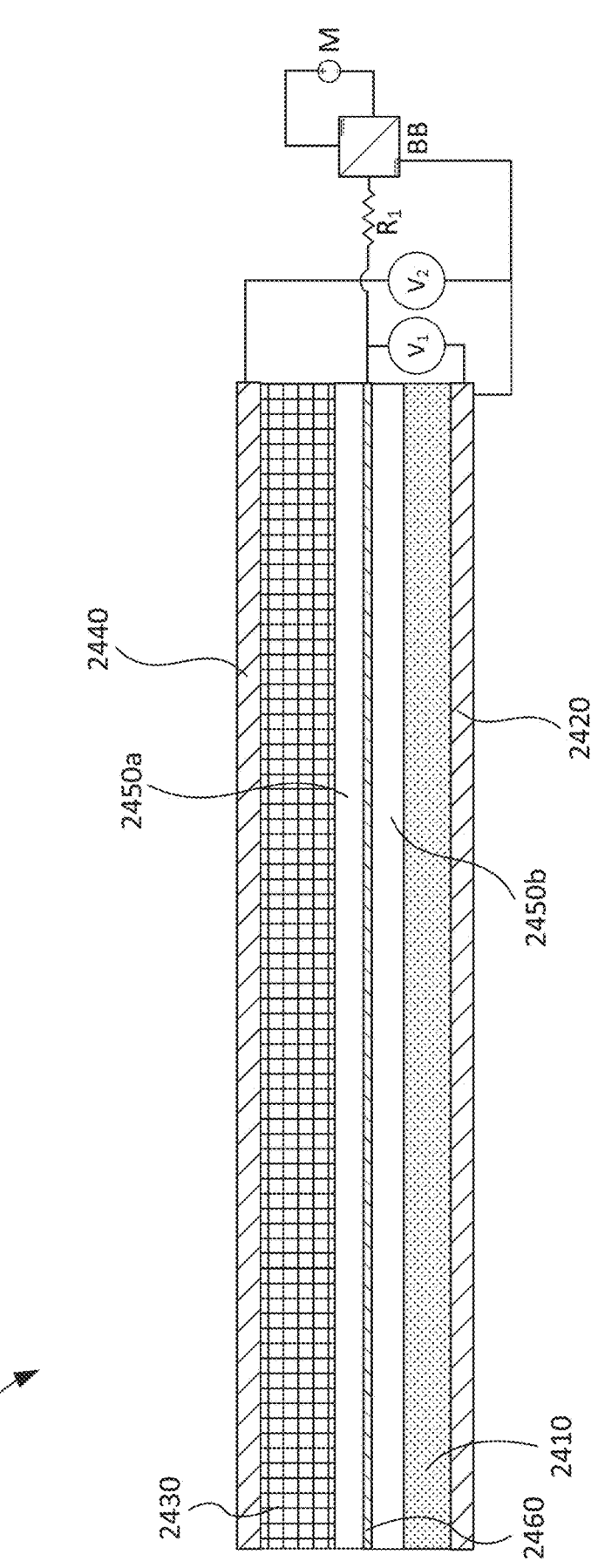
FIG. 24 is an illustration of an electrochemical cell with an interlayer, according to an embodiment.

FIG. 24 is an illustration of an electrochemical cell 2400 with an interlayer 2460, according to an embodiment. As shown, the electrochemical cell 2400 includes an anode 2410 disposed on an anode current collector 2420, a cathode 2430 disposed on a cathode current collector 2440, with a first separator 2450a and a second separator 2450b disposed between the anode 2410 and the cathode 2430. The interlayer 2460 is disposed between the first separator 2450a and the second separator 2450b. In some embodiments, the anode 2410, the anode current collector 2420, the cathode 2430, the cathode current collector 2440, the first separator 2450a, the second separator 2450b, and the interlayer 2460 can be the same or substantially similar to the anode 210, the anode current collector 220, the cathode 230, the cathode current collector 240, the first separator 250a, the second separator 250b, and the interlayer 260, as described above with reference to FIGS. 2A-2B. Thus, certain aspects of the anode 2410, the anode current collector 2420, the cathode 2430, the cathode current collector 2440, the first separator 2450a, the second separator 2450b, and the interlayer 2460 are not described in greater detail herein.

As shown, the electrochemical cell 2400 can act as an isolated DC-DC cell. A first voltage $V_1$ is measured between the anode current collector 2420 and the cathode current collector 2440. A second voltage $V_2$ is measured between the interlayer 2460 and the cathode current collector 2440. As shown, the electrochemical cell 2400 includes a resistor R and a converter BB powered by a module M. The converter can be configured based on the needs of the system as a buck type converter, a boost type converter or a buck-boost style converter. As used in reference to FIG. 24, the term buck-boost can be understood to include all types of switching regulators. The regulator can include a transformer or be a transformer-less topology. The buck-boost converter BB is a DC-DC converter that has an output voltage magnitude that is either greater than or less than the input voltage magnitude as defined by the needs of the system, including pre-selected and in real time control. In some embodiments, the buck-boost converter BB can be powered via an independent DC source. In some embodiments, the resistance can represent other impedances inherent to the electrochemical cell 2400. When the voltage of the interlayer 2460 decreases to below a defined level (e.g., about 1 V, about 1.5 V, about 2 V, about 2.5 V, about 3 V, about 3.5 V, about 4 V, about 4.5 V, about 5 V, about 5.5 V, or about 6 V, inclusive of all values and ranges therebetween), the current can be applied to the buck-boost converter BB (e.g., via the module M) to cause a defined voltage potential (e.g., about 1 V, about 1.5 V, about 2 V, about 2.5 V, about 3 V, about 3.5 V, about 4 V, about 4.5 V, about 5 V, about 5.5 V, or about 6 V inclusive of all values and ranges there between) to be applied to the interlayer 2460. In some embodiments, the buck-boost converter BB can be replaced by a buck converter. In some embodiments, the buck-boost converter BB can be replaced by a boost converter. In some embodiments, the buck-boost converter BB can be switched on or off via a BMS, a local hardware circuit, or any other suitable system control method. The buck, boost, and buck-boost converter topologies can be implemented in many ways by those skilled in the art.

Figure 25:
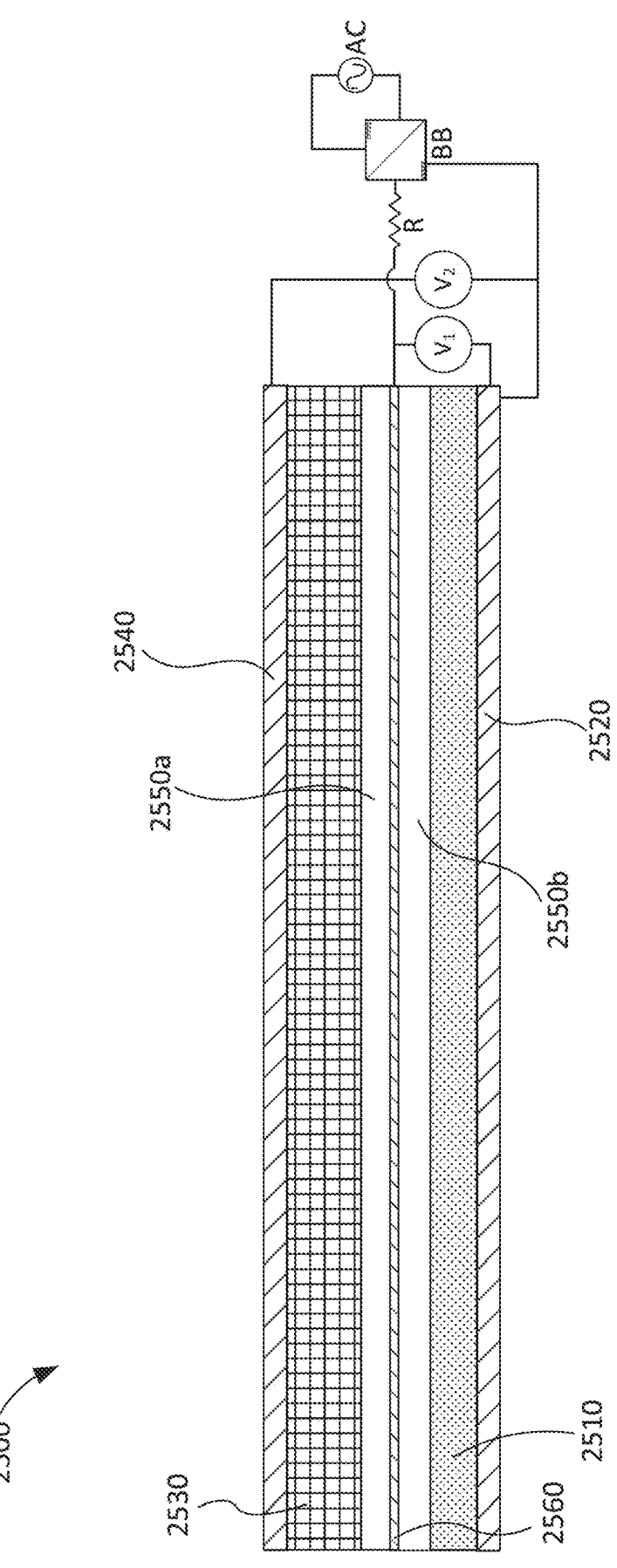
FIG. 25 is an illustration of an electrochemical cell with an interlayer, according to an embodiment.

FIG. 25 is an illustration of an electrochemical cell 2500 with an interlayer 2560, according to an embodiment. As shown, the electrochemical cell 2500 includes an anode 2510 disposed on an anode current collector 2520, a cathode 2530 disposed on a cathode current collector 2540, with a first separator 2550a and a second separator 2550b disposed between the anode 2510 and the cathode 2530. The interlayer 2560 is disposed between the first separator 2550a and the second separator 2550b. In some embodiments, the anode 2510, the anode current collector 2520, the cathode 2530, the cathode current collector 2540, the first separator 2550a, the second separator 2550b, and the interlayer 2560 can be the same or substantially similar to the anode 210, the anode current collector 220, the cathode 230, the cathode current collector 240, the first separator 250a, the second separator 250b, and the interlayer 260, as described above with reference to FIGS. 2A-2B. Thus, certain aspects of the anode 2510, the anode current collector 2520, the cathode 2530, the cathode current collector 2540, the first separator 2550a, the second separator 2550b, and the interlayer 2560 are not described in greater detail herein.

As shown, the electrochemical cell 2500 can have an isolated AC-DC converter attached to the cell. A first voltage $V_1$ is measured between the anode current collector 2520 and the cathode current collector 2540. A second voltage $V_2$ is measured between the interlayer 2560 and the cathode current collector 2540. As shown, the electrochemical cell 2500 includes a resistor R and a converter BB powered by an AC device. The converter can be configured based on the needs of the system as a buck type converter, a boost type converter or a buck-boost style converter. As used in reference to FIG. 24, the term buck-boost can be understood to include all types of switching regulators. The regulator can include a transformer or be a transformer-less topology. In some embodiments, the AC device can include a rectifier. In some embodiments, the AC device can include a transformer with a rectifier. When the voltage of the interlayer 2560 decreases to below a defined level (e.g., about 1 V, about 1.5 V, about 2 V, about 2.5 V, about 3 V, about 3.5 V, about 4 V, about 4.5 V, about 5 V, about 5.5 V, or about 6 V, inclusive of all values and ranges therebetween), the current can be applied to the buck-boost converter BB (e.g., via the AC source) to cause a voltage potential as defined by the needs of the system, including pre-selected and in real time control. to be applied to the interlayer 2460. In some embodiments, the resistance values can be from separate components, or they can represent other impedances inherent to the electrochemical cell 2500.

Figure 26:
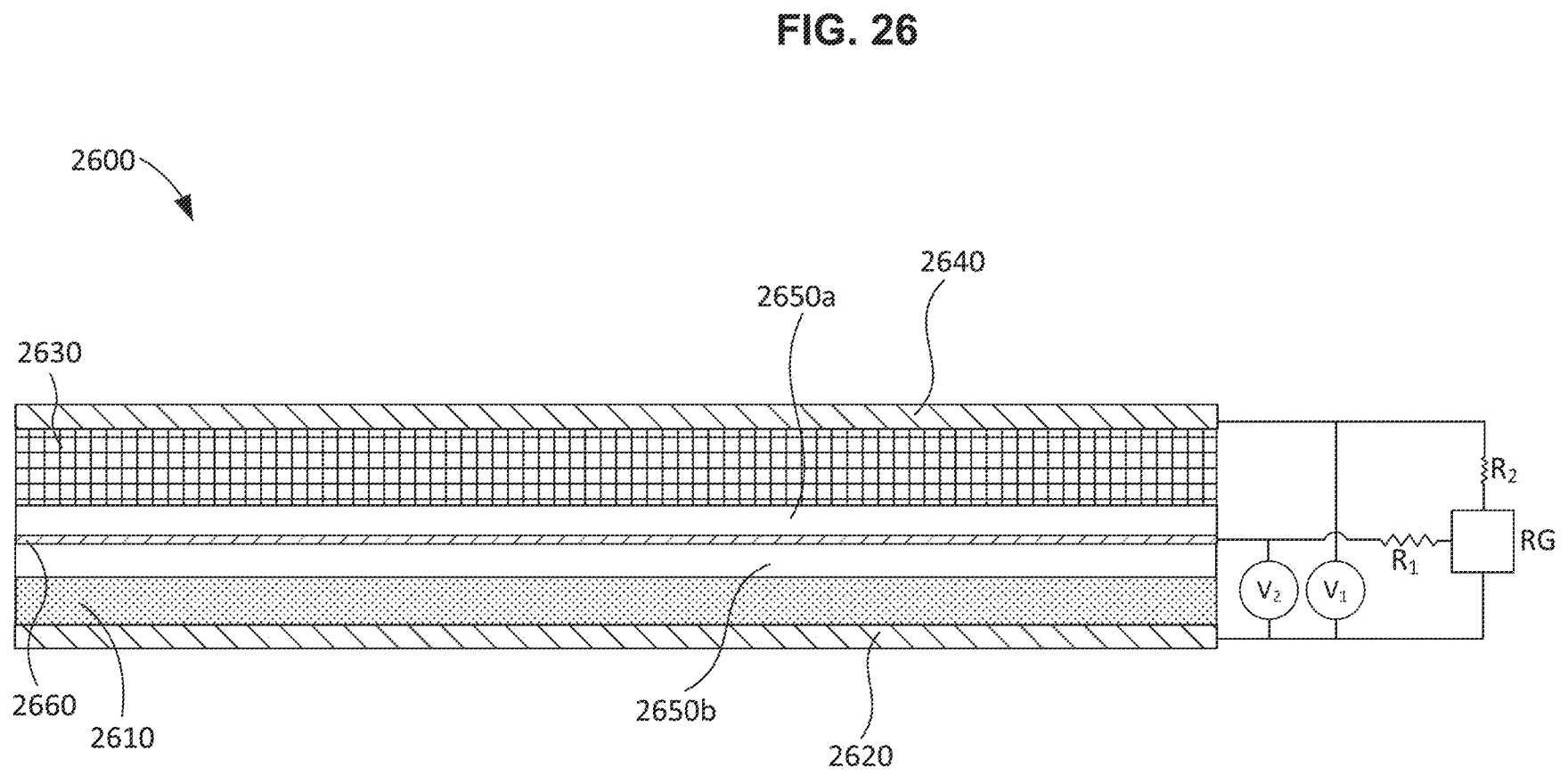

FIG. 26 is an illustration of an electrochemical cell 2600 with an interlayer 2660, according to an embodiment. As shown, the electrochemical cell 2600 includes an anode 2610 disposed on an anode current collector 2620, a cathode 2630 disposed on a cathode current collector 2640, with a first separator 2650a and a second separator 2650b disposed between the anode 2610 and the cathode 2630. The interlayer 2660 is disposed between the first separator 2650a and the second separator 2650b. In some embodiments, the anode 2610, the anode current collector 2620, the cathode 2630, the cathode current collector 2640, the first separator 2650a, the second separator 2650b, and the interlayer 2660 can be the same or substantially similar to the anode 210, the anode current collector 220, the cathode 230, the cathode current collector 240, the first separator 250a, the second separator 250b, and the interlayer 260, as described above with reference to FIGS. 2A-2B. Thus, certain aspects of the anode 2610, the anode current collector 2620, the cathode 2630, the cathode current collector 2640, the first separator 2650a, the second separator 2650b, and the interlayer 2660 are not described in greater detail herein.

As shown, the electrochemical cell 2600 can have a voltage regulator. A first voltage $V_1$ is measured between the anode current collector 2620 and the cathode current collector 2640. A second voltage $V_2$ is measured between the interlayer 2660 and the cathode current collector 2640. Current can flow from the interlayer 2660 to the cathode current collector 2640 via a regulator RG (with optional resistors $R_1$ and $R_2$ on either side of the regulator RG). In some embodiments, the regulator RG can include a linear regulator. In some embodiments, the regulator RG can include a switching or active regulator. When the voltage of the interlayer 2660 decreases below a defined level (e.g., about 1 V, about 1.5 V, about 2 V, about 2.5 V, about 3 V, about 3.5 V, about 4 V, about 4.5 V, about 5 V, about 5.5 V, or about 6 V, inclusive of all values and ranges therebetween), the regulator RG can cause current to flow to the interlayer 2660 to increase or decrease the voltage of the interlayer 2660. In some embodiments, the regulator RG can be controlled by a BMS, a local hardware circuit, or any other suitable system control mechanism. In some embodiments, the resistances through each current flow path can be the same or substantially similar. In some embodiments, the resistances through each current flow path can be different from each other. In some embodiments, the resistance values can be from separate components, or they can represent other impedances inherent to the electrochemical cell 2600.

In some embodiments, the resistances $R_1$ and $R_2$ can be representative of other impedances inherent to the system. When the voltage of the interlayer 2660 decreases to below a threshold value, current from the regulator RG can flow (e.g., via a BMS), causing a voltage potential to be applied to the interlayer 2660. In some embodiments, the regulator RG can be controlled via BMS or by local hardware circuit or another system control method.

Figure 27:
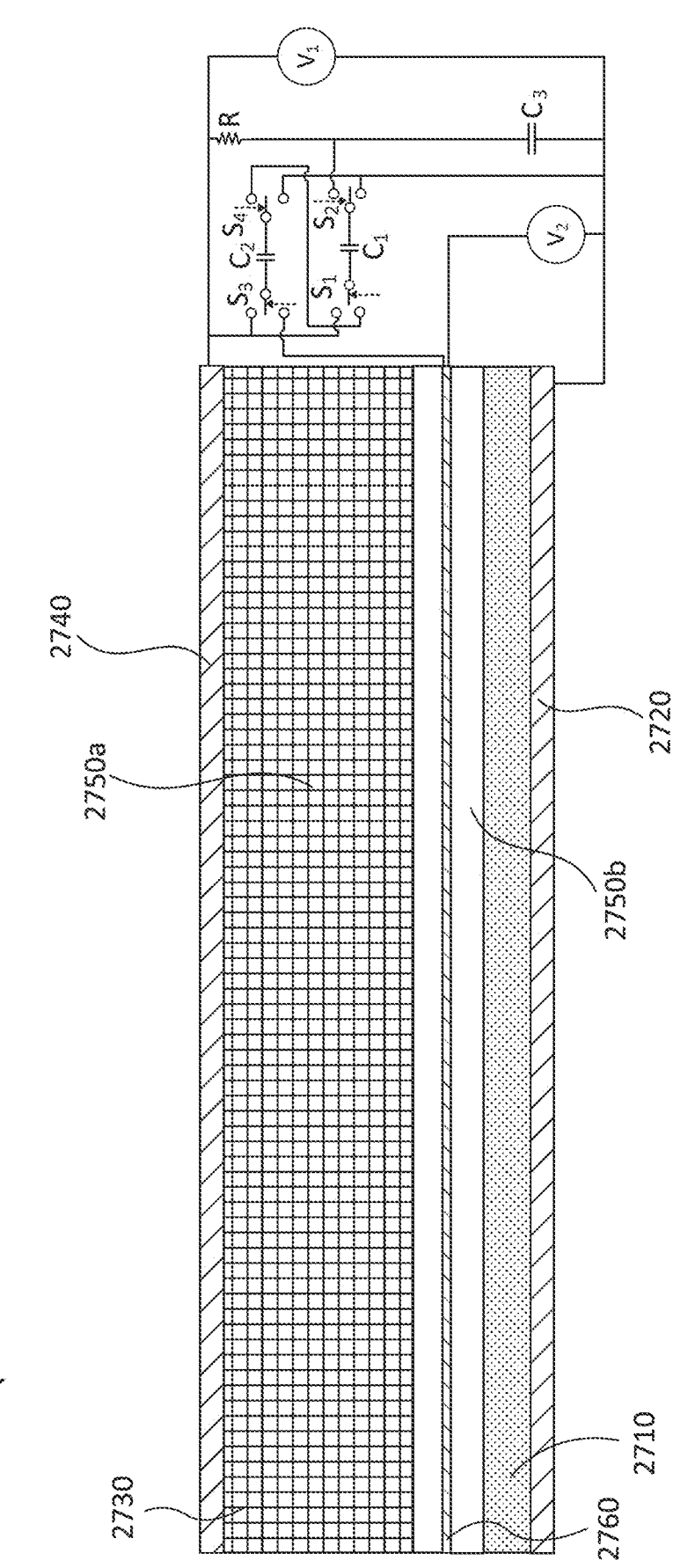
FIG. 27 is an illustration of an electrochemical cell with an interlayer, according to an embodiment.

FIG. 27 is an illustration of an electrochemical cell 2700 with an interlayer 2760, according to an embodiment. As shown, the electrochemical cell 2700 includes an anode 2710 disposed on an anode current collector 2720, a cathode 2730 disposed on a cathode current collector 2740, with a first separator 2750a and a second separator 2750b disposed between the anode 2710 and the cathode 2730. The interlayer 2760 is disposed between the first separator 2750a and the second separator 2750b. In some embodiments, the anode 2710, the anode current collector 2720, the cathode 2730, the cathode current collector 2740, the first separator 2750a, the second separator 2750b, and the interlayer 2760 can be the same or substantially similar to the anode 210, the anode current collector 220, the cathode 230, the cathode current collector 240, the first separator 250a, the second separator 250b, and the interlayer 260, as described above with reference to FIGS. 2A-2B. Thus, certain aspects of the anode 2710, the anode current collector 2720, the cathode 2730, the cathode current collector 2740, the first separator 2750a, the second separator 2750b, and the interlayer 2760 are not described in greater detail herein.

As shown, the electrochemical cell 2700 includes a voltage amplification system, including switches $S_1$, $S_2$, $S_3$, $S_4$. This circuit represents devices referred to as "charge pumps" and boost converters used in switching power supply applications such as the LT 3482 and the MAX633. These converters are used to create a boosted voltage for use in electronic devices. For representation, a basic functionality of a simplified charge pump is described herein. A capacitor $C_1$ is placed between the switch $S_1$ and the switch $S_2$. A capacitor $C_2$ is placed between the switch $S_3$ and the switch $S_4$. The electrochemical cell 2700 further includes a capacitor $C_3$ and a resistor R on a current flow pathway. A first voltage $V_1$ is measured between the anode current collector 2720 and the cathode current collector 2740. A second voltage $V_2$ is measured between the interlayer 2660 and the anode current collector 2740. Depending on how the switches $S_1$, $S_2$, $S_3$, $S_4$ are configured, a voltage of at least about 2, or at least about 3 times the voltage difference between the anode current collector 2720 and the cathode current collector 2740 can be applied to the interlayer 2760. For example, with switch $S_1$ and switch $S_3$ in the up position while switch $S_2$ and switch $S_4$ are in the down position, the capacitors $C_1$ and $C_2$ charge. Then, switching the switch $S_1$ and the switch $S_3$ to the down position while switching the switch $S_2$ and the switch $S_4$ to the up position, triple the voltage $V_1$ is applied to the interlayer 2760. This can be referred to as a "charge pump" procedure. In some embodiments, any of the switches $S_1$, $S_2$, $S_3$, $S_4$ can be replaced with a diode, a MOSFET, a BJT, or any other suitable device. In some embodiments, any of the switches $S_1$, $S_2$, $S_3$, $S_4$ can be controlled by a BMS, a hardware device, a control chip, an oscillator, or any other suitable controller device.

In some embodiments, the energy transferred to the interlayer 2760 can be controlled by the resistance of the system, or other resistors. In some embodiments, the energy transferred to the interlayer 2760 can be controlled by the selection of the capacitance or use of other types of active components. In some embodiments, additional stages of voltage amplification can be added to increase the total voltage applied to the interlayer 2760. In some embodiments, the resistances through each current flow path can be the same or substantially similar. In some embodiments, the resistances through each current flow path can be different from each other. In some embodiments, the resistance values can be from separate components, or they can represent other impedances inherent to the electrochemical cell 2700.

Figure 28:
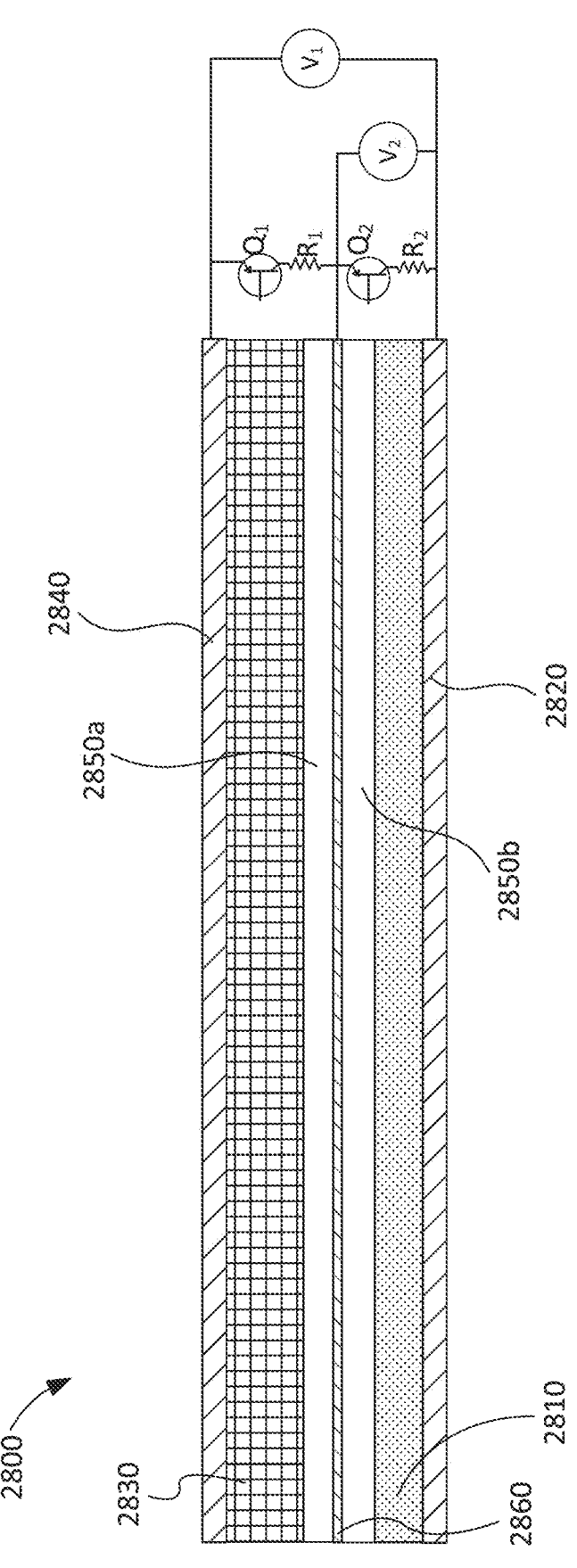
FIG. 28 is an illustration of an electrochemical cell with an interlayer, according to an embodiment.

FIG. 28 is an illustration of an electrochemical cell 2800 with an interlayer 2860, according to an embodiment. As shown, the electrochemical cell 2800 includes an anode 2810 disposed on an anode current collector 2820, a cathode 2830 disposed on a cathode current collector 2840, with a first separator 2850a and a second separator 2850b disposed between the anode 2810 and the cathode 2830. The interlayer 2860 is disposed between the first separator 2850a and the second separator 2850b. In some embodiments, the anode 2810, the anode current collector 2820, the cathode 2830, the cathode current collector 2840, the first separator 2750a, the second separator 2850b, and the interlayer 2860 can be the same or substantially similar to the anode 210, the anode current collector 220, the cathode 230, the cathode current collector 240, the first separator 250a, the second separator 250b, and the interlayer 260, as described above with reference to FIGS. 2A-2B. Thus, certain aspects of the anode 2810, the anode current collector 2820, the cathode 2830, the cathode current collector 2840, the first separator 2850a, the second separator 2850b, and the interlayer 2860 are not described in greater detail herein.

As shown, current flow and voltage potential between the cathode current collector 2840 and the interlayer 2860 can be controlled via a transistor $Q_1$ (and optional resistor $R_1$). As shown, flow of current between the interlayer 2860 and the cathode current collector 2840 can be controlled via a transistor $Q_2$ (and optional resistor $R_2$). As shown, a voltage $V_1$ is measured between the anode current collector 2820 and the cathode current collector 2840 and a voltage $V_2$ is measured between the anode current collector 2820 and the interlayer 2860. In some embodiments, the transistor $Q_1$ and/or the transistor $Q_2$ can act as a switching device. In some embodiments, the transistor $Q_1$ and/or the transistor $Q_2$ can be controlled by a BMS. In some embodiments, the transistor $Q_1$ and/or the transistor $Q_2$ can be controlled by a local hardware circuit or other system control apparatus. In some embodiments, the resistances through each current flow path can be the same or substantially similar. In some embodiments, the resistances through each current flow path can be different from each other. In some embodiments, the resistance values can be from separate components, or they can represent other impedances inherent to the electrochemical cell 2800. In some embodiments, the transistor $Q_1$ and/or the transistor $Q_2$ can include a BJT in a PNP or NPN configuration. In some embodiments, the transistor $Q_1$ and/ or the transistor $Q_2$ can be replaced with a diode. In some embodiments, the transistor $Q_1$ and/or the transistor $Q_2$ can include a JFET. In some embodiments, the transistor $Q_1$ and/or the transistor $Q_2$ can include a MOSFET. In some embodiments, the transistor $Q_1$ and/or the transistor $Q_2$ can be replaced with a switch. In some embodiments, the transistor $Q_1$ can be the same type of transistor or circuit device as the transistor $Q_2$. In some embodiments, the transistor $Q_1$ can be a different type of transistor or circuit device from the transistor $Q_2$. In some embodiments, the transistor $Q_1$ and the transistor $Q_2$ can be operated independently. In some embodiments, the transistor $Q_1$ and the transistor $Q_2$ can be operated in concert. In some embodiments, the resistances through each current flow path can be the same or substantially similar. In some embodiments, the resistances through each current flow path can be different from each other. In some embodiments, the resistance values can be from separate components, or they can represent other impedances inherent to the electrochemical cell 2800.

Figure 29:
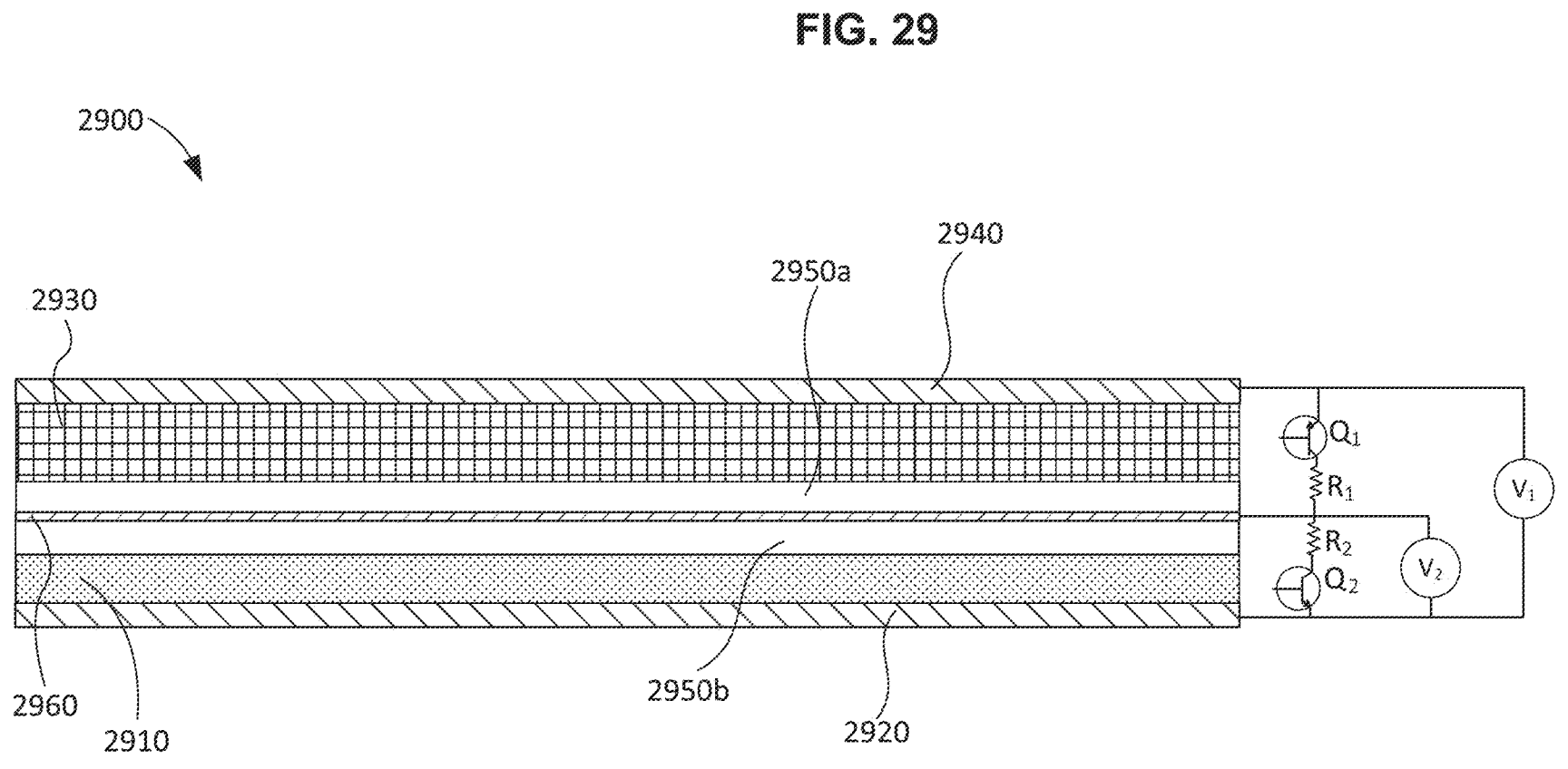

FIG. 29 is an illustration of an electrochemical cell 2900 with an interlayer 2960, according to an embodiment. As shown, the electrochemical cell 2900 includes an anode 2910 disposed on an anode current collector 2920, a cathode 2930 disposed on a cathode current collector 2940, with a first separator 2950a and a second separator 2950b disposed between the anode 2910 and the cathode 2930. The interlayer 2960 is disposed between the first separator 2950a and the second separator 2950b. In some embodiments, the anode 2910, the anode current collector 2920, the cathode 2930, the cathode current collector 2940, the first separator 2950a, the second separator 2950b, and the interlayer 2960 can be the same or substantially similar to the anode 2810, the anode current collector 2820, the cathode 2830, the cathode current collector 2840, the first separator 2850a, the second separator 2850b, and the interlayer 2860, as described above with reference to FIG. 28. Thus, certain aspects of the anode 2910, the anode current collector 2920, the cathode 2930, the cathode current collector 2940, the first separator 2950a, the second separator 2950b, and the interlayer 2960 are not described in greater detail herein.

As shown, a voltage $V_1$ is measured between the anode current collector 2920 and the cathode current collector 2940 and a voltage $V_2$ is measured between the anode current collector 2920 and the interlayer 2960. As shown, the electrochemical cell 2900 includes transistors $Q_1$, $Q_2$ and resistors $R_1$, $R_2$. As shown, the resistor $R_2$ is positioned upstream of the transistor $Q_2$ while the resistor $R_2$ is located downstream of the transistor $Q_1$. This differs from FIG. 28, in which the resistor $R_2$ is located downstream of the transistor $Q_2$. Otherwise, each of the components of the electrochemical cell 2900 can be the same or substantially similar to the components of the electrochemical cell 2800, as described above with reference to FIG. 28. In some embodiments, the resistances through each current flow path can be the same or substantially similar. In some embodiments, the resistances through each current flow path can be different from each other. In some embodiments, the resistance values can be from separate components, or they can represent other impedances inherent to the electrochemical cell 2900.

Figure 30:
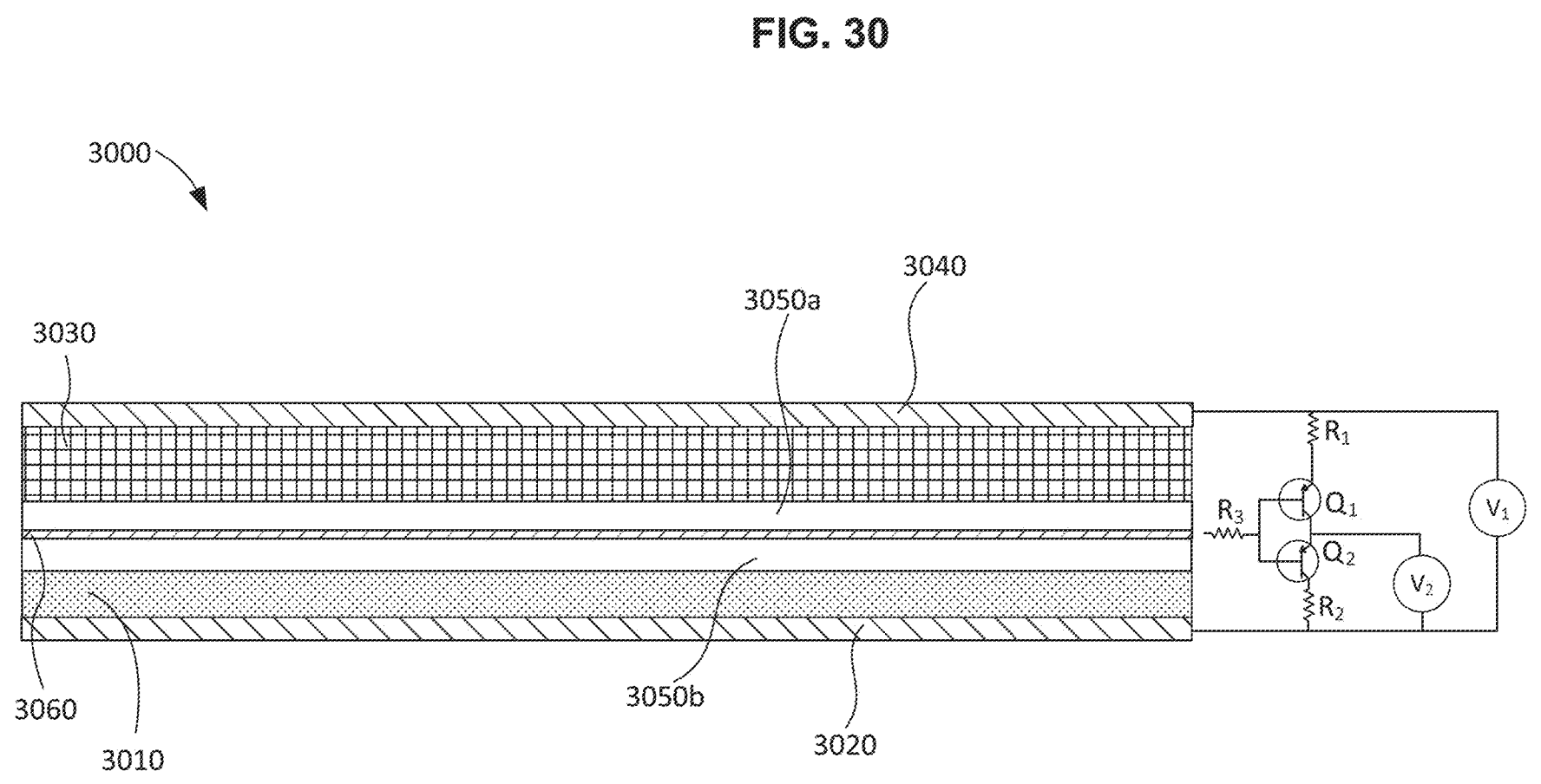

FIG. 30 is an illustration of an electrochemical cell 3000 with an interlayer 3060, according to an embodiment. As shown, the electrochemical cell 3000 includes an anode 3010 disposed on an anode current collector 3020, a cathode 3030 disposed on a cathode current collector 3040, with a first separator 3050a and a second separator 3050b disposed between the anode 3010 and the cathode 3030. The interlayer 3060 is disposed between the first separator 3050a and the second separator 3050b. In some embodiments, the anode 3010, the anode current collector 3020, the cathode 3030, the cathode current collector 3040, the first separator 3050a, the second separator 3050b, and the interlayer 3060 can be the same or substantially similar to the anode 2810, the anode current collector 2820, the cathode 2830, the cathode current collector 2840, the first separator 2850a, the second separator 2850b, and the interlayer 2860, as described above with reference to FIG. 28. Thus, certain aspects of the anode 3010, the anode current collector 3020, the cathode 3030, the cathode current collector 3040, the first separator 3050a, the second separator 3050b, and the interlayer 3060 are not described in greater detail herein.

As shown, the electrochemical cell includes transistors $Q_1$, $Q_2$ and resistors $R_1$, $R_2$, $R_3$. This circuit is commonly called a 'push-pull' amplifier. $V_1$ is measured between the anode current collector 3020 and the cathode current collector 3040 and a voltage $V_2$ is measured between the anode current collector 3020 and the interlayer 3060. As shown, the resistor $R_1$ is located upstream of the transistor $Q_1$ and the resistor $R_2$ is located downstream of the transistor $Q_2$. The resistor $R_3$ limits the flow of current through a base of the transistor $Q_1$ and the transistor $Q_2$. The emitters connect to the interlayer 3060 in order to flow current into the interlayer 3060 relative to the cathode current collector 3040 and the anode current collector 3020. The circuit can be used to set any voltage potential desired between the cathode current collector 3040 and the anode current collector 3020 by selection of the voltage potential of and the current applied through the resistor $R_3$. In some embodiments, the resistances through each current flow path can be the same or substantially similar. In some embodiments, the resistances through each current flow path can be different from each other. In some embodiments, the resistance values can be from separate components, or they can represent other impedances inherent to the electrochemical cell 3000.

Figure 31:
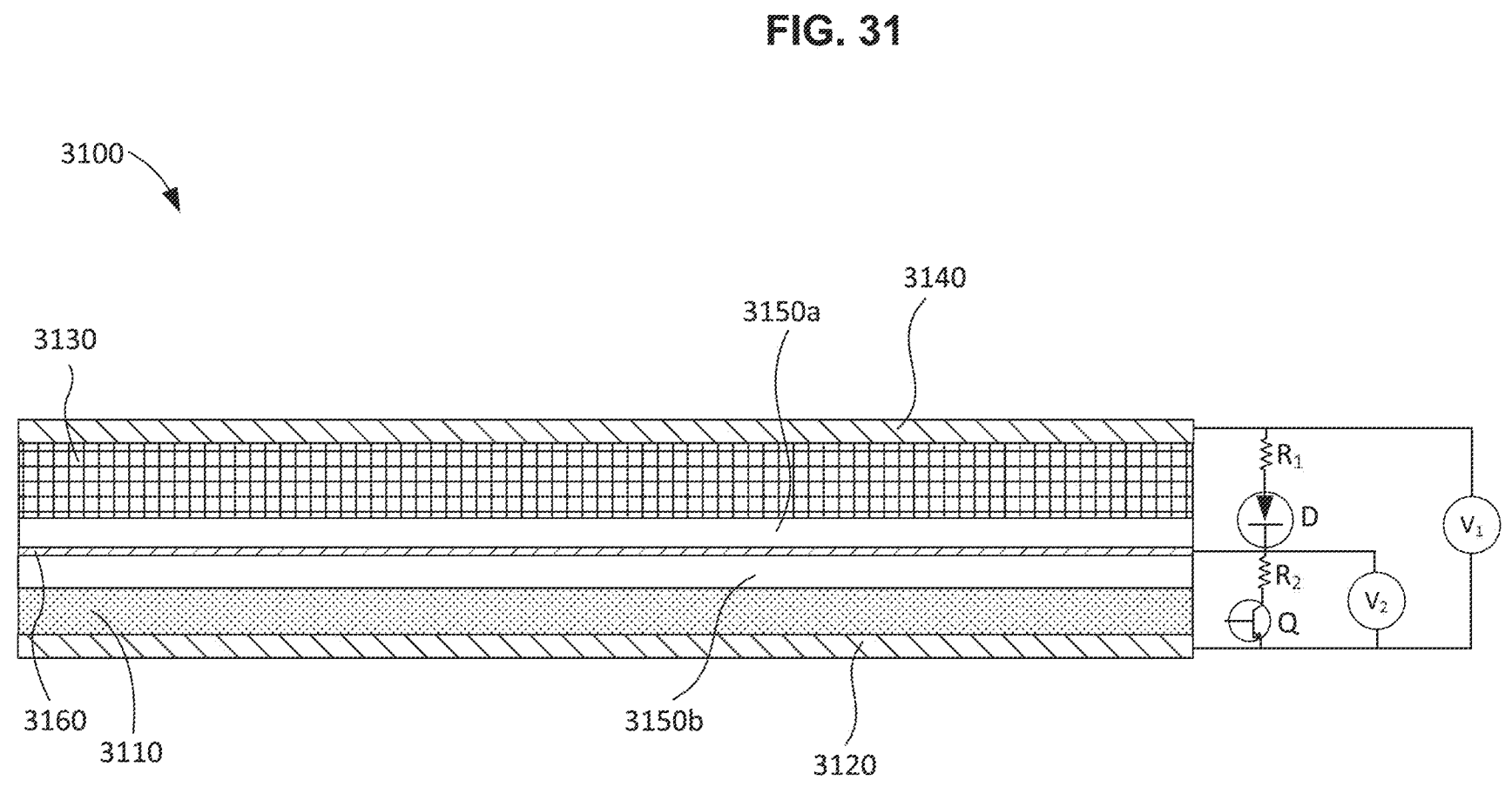

FIG. 31 is an illustration of an electrochemical cell 3100 with an interlayer 3160, according to an embodiment. As shown, the electrochemical cell 3100 includes an anode 3110 disposed on an anode current collector 3120, a cathode 3130 disposed on a cathode current collector 3140, with a first separator 3150*a* and a second separator 3150*b* disposed between the anode 3110 and the cathode 3130. The interlayer 3160 is disposed between the first separator 3150*a* and the second separator 3150*b*. In some embodiments, the anode 3110, the anode current collector 3120, the cathode 3130, the cathode current collector 3140, the first separator 3150*a*, the second separator 3150*b*, and the interlayer 3160 can be the same or substantially similar to the anode 2810, the anode current collector 2820, the cathode 2830, the cathode current collector 2840, the first separator 2850*a*, the second separator 2850*b*, and the interlayer 2860, as described above with reference to FIG. 28. Thus, certain aspects of the anode 3110, the anode current collector 3120, the cathode 3130, the cathode current collector 3140, the first separator 3150*a*, the second separator 3150*b*, and the interlayer 3160 are not described in greater detail herein.

As shown, a diode D is positioned in a circuit between the cathode current collector 3140 and the interlayer 3160 to provide a continuous bias potential and a transistor Q is positioned in a circuit between the interlayer 3160 and the anode current collector 3120 (with optional resistors $R_1$, $R_2$) to provide a variable potential. As shown, a voltage $V_1$ is measured between the anode current collector 3120 and the cathode current collector 3140 and a voltage $V_2$ is measured between the anode current collector 3120 and the interlayer 3160. The circuit can be used to shift the potential of the interlayer 3160 closer to the current collector 3120. In some embodiments, the resistances through each current flow path can be the same or substantially similar. In some embodiments, the resistances through each current flow path can be different from each other. In some embodiments, the resistance values can be from separate components, or they can represent other impedances inherent to the electrochemical cell 3100.

Figure 32:
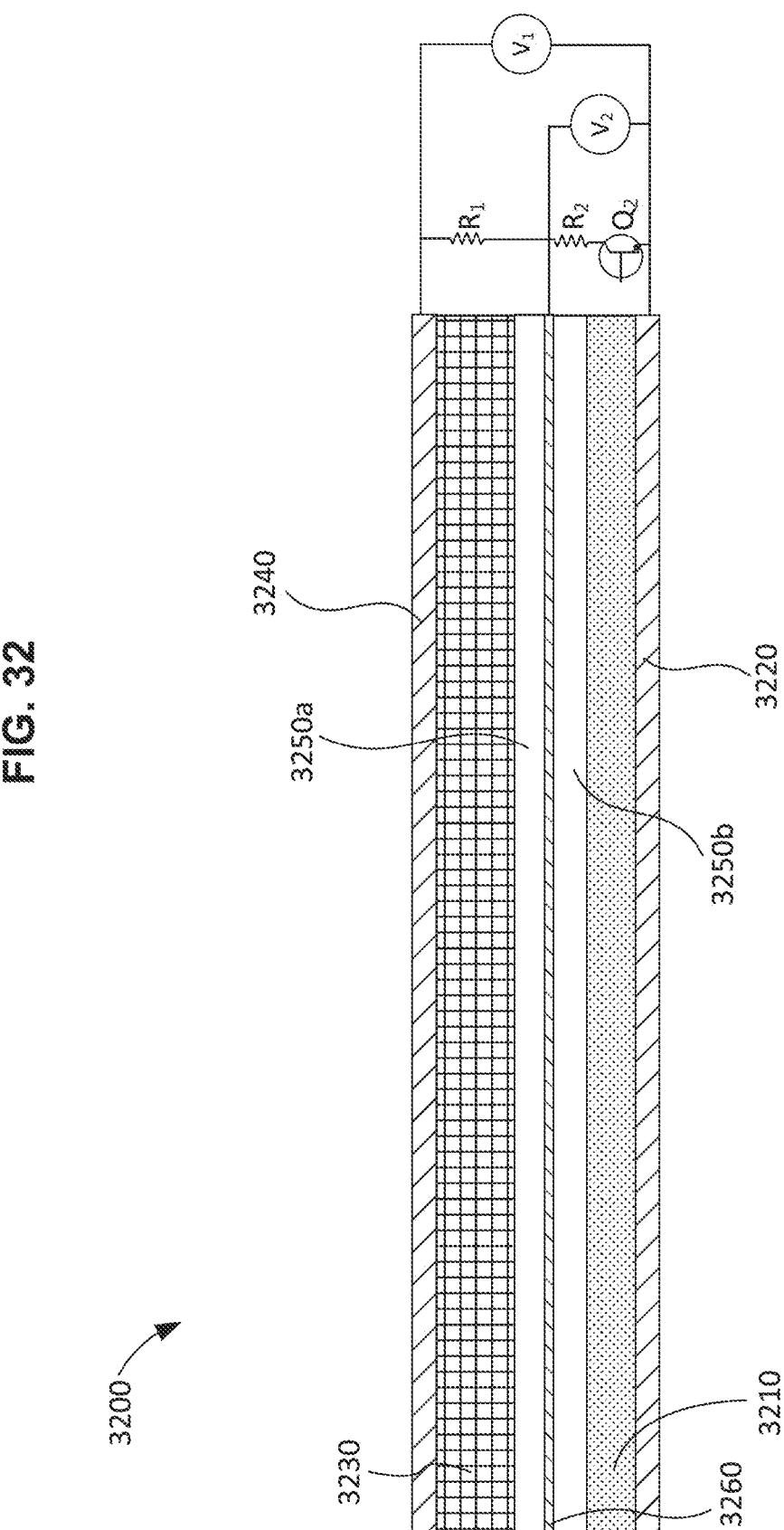
FIG. 32 is an illustration of an electrochemical cell with an interlayer, according to an embodiment.

FIG. 32 is an illustration of an electrochemical cell 3200 with an interlayer 3260, according to an embodiment. As shown, the electrochemical cell 3200 includes an anode 3210 disposed on an anode current collector 3220, a cathode 3230 disposed on a cathode current collector 3240, with a first separator 3250*a* and a second separator 3250*b* disposed between the anode 3210 and the cathode 3230. The interlayer 3260 is disposed between the first separator 3250*a* and the second separator 3250*b*. In some embodiments, the anode 3210, the anode current collector 3220, the cathode 3230, the cathode current collector 3240, the first separator 3250*a*, the second separator 3250*b*, and the interlayer 3260 can be the same or substantially similar to the anode 2810, the anode current collector 2820, the cathode 2830, the cathode current collector 2840, the first separator 2850*a*, the second separator 2850*b*, and the interlayer 2860, as described above with reference to FIG. 28. Thus, certain aspects of the anode 3210, the anode current collector 3220, the cathode 3230, the cathode current collector 3240, the first separator 3250*a*, the second separator 3250*b*, and the interlayer 3260 are not described in greater detail herein.

As shown, a transistor Q is positioned in a circuit between the interlayer 3160 and the anode current collector 3120 (with optional resistors $R_1$, $R_2$). As shown, a voltage $V_1$ is measured between the anode current collector 3240 and the cathode current collector 3240 and a voltage $V_2$ is measured between the anode current collector 3220 and the interlayer 3260. The electrochemical cell 3200 does not include a diode. Otherwise, the components of the electrochemical cell 3200 can be the same or substantially similar to the electrochemical cell 3100, as described above with reference to FIG. 31. In some embodiments, the resistances through each current flow path can be the same or substantially similar. In some embodiments, the resistances through each current flow path can be different from each other. In some embodiments, the resistance values can be from separate components, or they can represent other impedances inherent to the electrochemical cell 3200.

Figure 33:
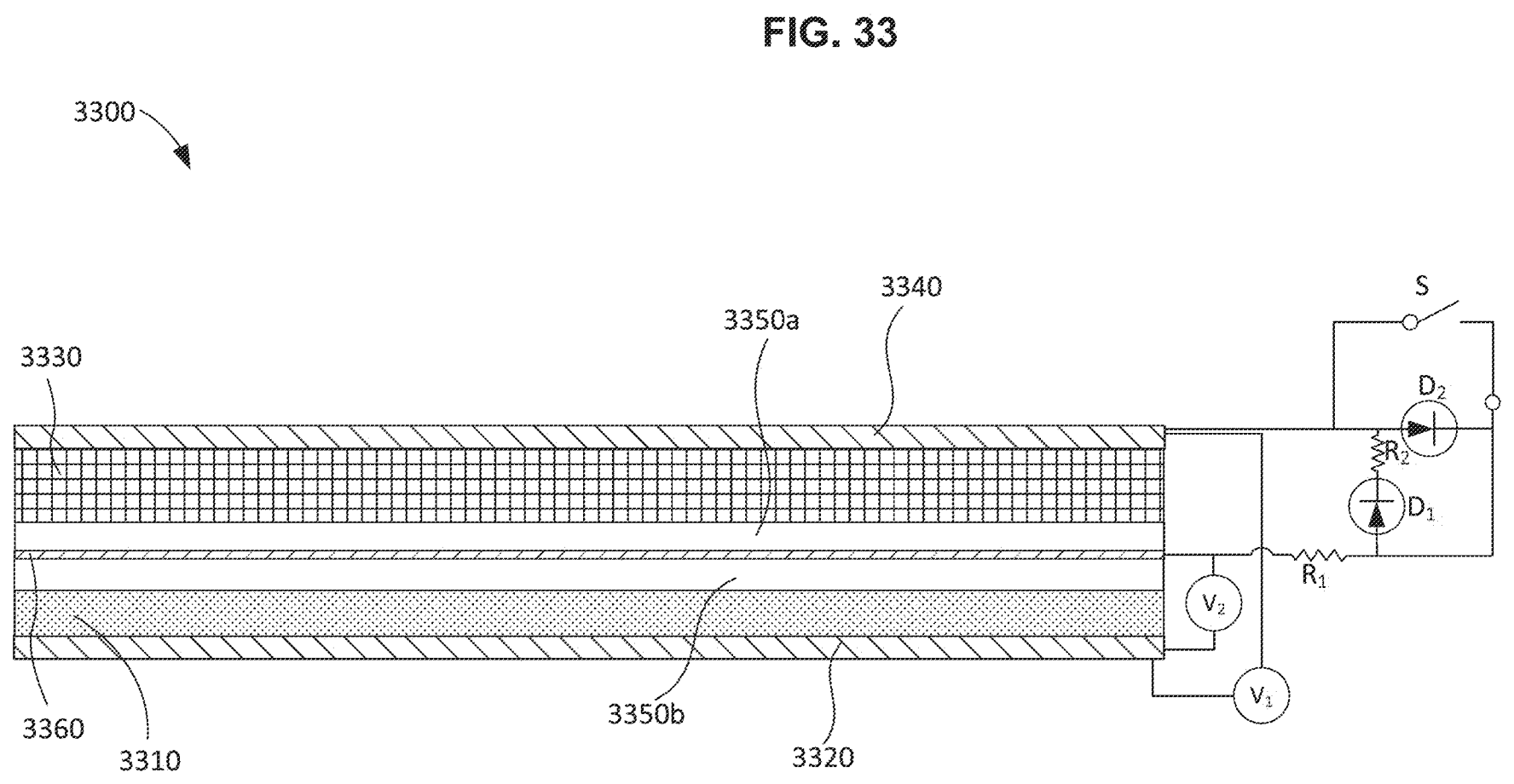

FIG. 33 is an illustration of an electrochemical cell 3300 with an interlayer 3360, according to an embodiment. As shown, the electrochemical cell 3300 includes an anode 3310 disposed on an anode current collector 3320, a cathode 3330 disposed on a cathode current collector 3340, with a first separator 3350*a* and a second separator 3350*b* disposed between the anode 3310 and the cathode 3330. The interlayer 3360 is disposed between the first separator 3350*a* and the second separator 3350*b*. In some embodiments, the anode 3310, the anode current collector 3320, the cathode 3330, the cathode current collector 3340, the first separator 3350*a*, the second separator 3350*b*, and the interlayer 3360 can be the same or substantially similar to the anode 2810, the anode current collector 2820, the cathode 2830, the cathode current collector 2840, the first separator 2850*a*, the second separator 2850*b*, and the interlayer 2860, as described above with reference to FIG. 28. Thus, certain aspects of the anode 3310, the anode current collector 3320, the cathode 3330, the cathode current collector 3340, the first separator 3350*a*, the second separator 3350*b*, and the interlayer 3360 are not described in greater detail herein.

As shown, the electrochemical cell 3300 includes diodes $D_1$, $D_2$. An optional switch S can bypass the diode $D_2$, creating a selective dendrite treatment mode or normal operation. In some embodiments, the electrochemical cell can be absent of the switch S. In some embodiments, the switch S can be replaced with a transistor, a MOSFET, a JFET, or any other device that can bypass the diode $D_2$. As shown, a voltage $V_1$ is measured between the anode current collector 3320 and the cathode current collector 3340 and a voltage $V_2$ is measured between the anode current collector 3320 and the interlayer 3360. As shown, a voltage $V_1$ is measured between the anode current collector 3320 and the cathode current collector 3340 and a voltage $V_2$ is measured between the anode current collector 3320 and the interlayer 3360. As shown, the circuit design of the electrochemical cell 3300 can act as a charge diode with a bypass. In some embodiments, the switch S can be opened during a controlled charge method. The diode $D_2$ can cause a voltage drop of the interlayer 3360 relative to the cathode 3330 equal to the forward voltage drop of the diode $D_2$. In some embodiments, the voltage drop can be about 0.1 V, about 0.2 V, about 0.3 V, about 0.4 V, about 0.5 V, about 1 V, about 1.5 V, about 2 V, about 2.5 V, about 3 V, about 3.5 V, about 4 V, about 4.5 V, about 5 V, about 5.5 V, or about 6 V, inclusive of all values and ranges therebetween. The diode $D_1$ can cause a voltage drop of the interlayer 3360 relative to the cathode 3330 equal to the forward voltage drop of the diode $D_2$ plus the voltage of the cathode current collector 3340 making the voltage of the interlayer 3360 higher than the voltage of the cathode current collector 3340. In some embodiments, the voltage drop can be about 0.1 V, about 0.2 V, about 0.3 V, about 0.4 V, about 0.5 V, about 1 V, about 1.5 V, about 2 V, about 2.5 V, about 3 V, about 3.5 V, about 4 V, about 4.5 V, about 5 V, about 5.5 V, or about 6 V, inclusive of all values and ranges there between. The switch S cand be closed to allow normal flow of current to the electrochemical cell 3300 without imparting voltage changes to the interlayer 3360. The switch S can be replaced by a diode, a MOSFET, a JFET, or any other suitable device or combinations thereof. The switch S can also be eliminated from the circuit using only the Diodes or other devices to apply the voltage potential on current flow. In some embodiments, the diodes $D_1$ and $D_2$ can also be replaced with switches diode, a MOSFET, a JFET, or any other suitable device or combinations thereof. In some embodiments, the resistances through each current flow path can be the same or substantially similar. In some embodiments, the resistances through each current flow path can be different from each other. In some embodiments, the resistance values can be from separate components, or they can represent other impedances inherent to the electrochemical cell 3300.

Figure 34:
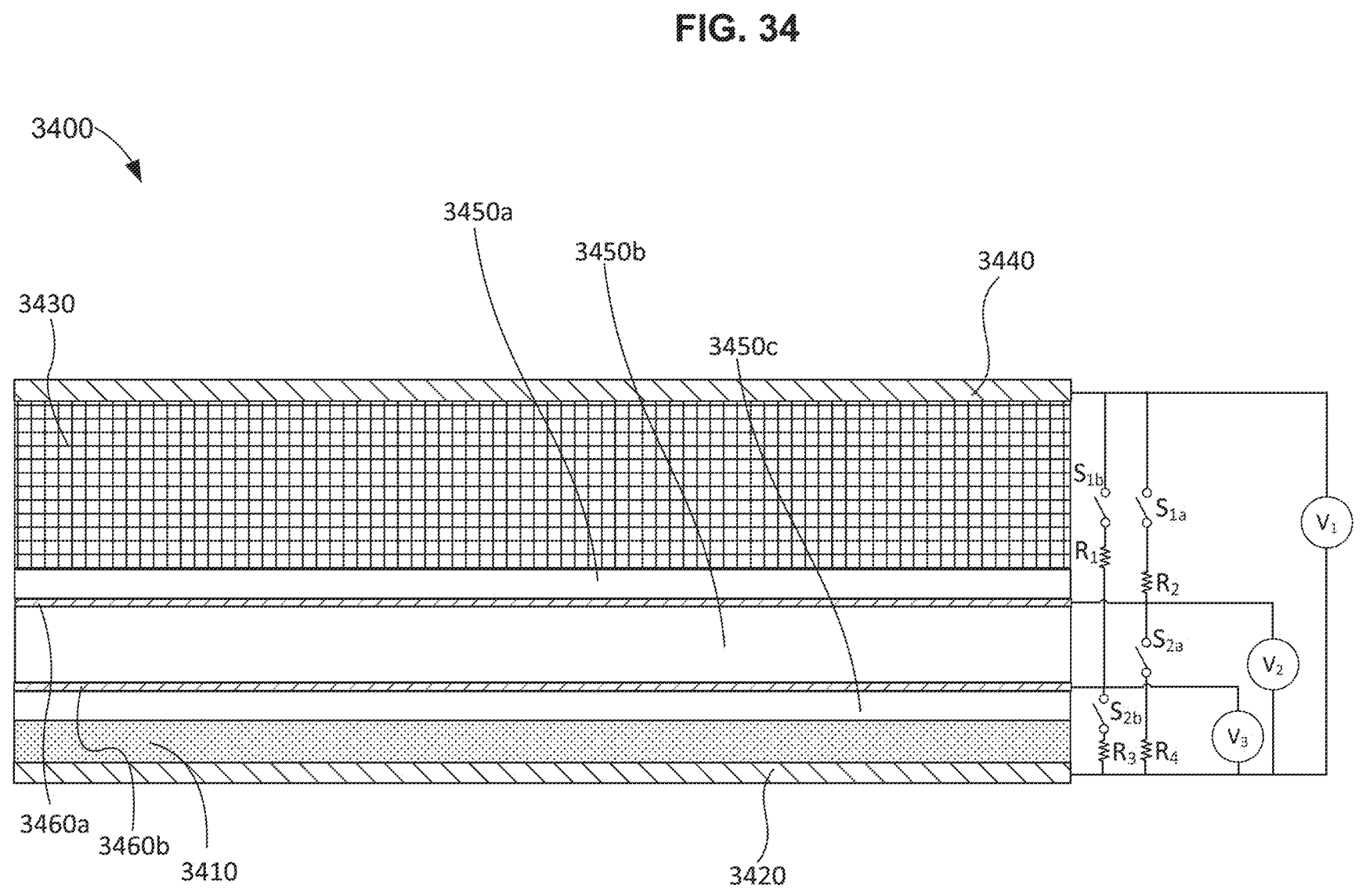

FIG. 34 is an illustration of an electrochemical cell 3400 with multiple interlayers 3460a, 3460b (collectively referred to as interlayers 3460), according to an embodiment. As shown, the electrochemical cell 3400 includes an anode 3410 disposed on an anode current collector 3420, a cathode 3430 disposed on a cathode current collector 3440, with a first separator 3450a, a second separator 3450b, and a third separator 3450c disposed between the anode 3410 and the cathode 3430. The interlayer 3460a is disposed between the first separator 3450a and the second separator 3450b and the second interlayer 3460b is disposed between the second separator 3450b and the third separator 3450c. In some embodiments, the anode 3410, the anode current collector 3420, the cathode 3430, the cathode current collector 3440, the first separator 3450a, the second separator 3450b, the third separator 3450c, and the interlayers 3460 can be the same or substantially similar to the anode 2810, the anode current collector 2820, the cathode 2830, the cathode current collector 2840, the separators 2850a, 2850b, and the interlayer 2860, as described above with reference to FIG. 28. Thus, certain aspects of the anode 3410, the anode current collector 3420, the cathode 3430, the cathode current collector 3440, the first separator 3450a, the second separator 3450b, the third separator 3450 and the interlayers 3460 are not described in greater detail herein.

As shown, a voltage $V_1$ is measured between the anode current collector 3420 and the cathode current collector 3440, a voltage $V_2$ is measured between the anode current collector 3420 and the interlayer 3460a, and a voltage $V_3$ is measured between the anode current collector 3440 and the interlayer 3460b. As shown, the electrochemical cell 3400 includes switches $S_{1a}$, $S_{1b}$, $S_{2a}$, $S_{2b}$ and optional resistors $R_1$, $R_2$, $R_3$, $R_4$. As shown, the switch Sla controls the flow of current between the anode current collector 3440 and the interlayer 3460a. As shown, the switch $S_{1b}$ controls the flow of current between the anode current collector 3440 and the interlayer 3460b. As shown, the switch $S_{2a}$ controls the flow of current between the interlayer 3460a and the cathode current collector 3420. As shown, the switch $S_{2b}$ controls the flow of current between the interlayer 3460b and the cathode current collector 3420.

In some embodiments, either of the switches $S_{1a}$, $S_{1b}$, $S_{2a}$, $S_{2b}$ can be replaced with a diode, a MOSFET, a JFET, or any other suitable device or combinations thereof. In some embodiments, the switches $S_{1a}$, $S_{1b}$, $S_{2a}$, $S_{2b}$ can each be replaced with the same device. In some embodiments, either of the switches $S_{1a}$, $S_{1b}$, $S_{2a}$, $S_{2b}$ can be replaced with different devices. In some embodiments, either of the switches $S_{1a}$, $S_{1b}$, $S_{2a}$, $S_{2b}$ can be controlled by a BMS. In some embodiments, either of the switches $S_{1a}$, $S_{1b}$, $S_{2a}$, $S_{2b}$ by a local hardware circuit or other system control method. In some embodiments, the interlayers 3460 can be controlled in concert, electrically connecting any of the anode 3410, the cathode 3440, the interlayer 3460a, and/or the interlayer 3460b. In some embodiments, the resistances through each current flow path can be the same or substantially similar. In some embodiments, the resistances through each current flow path can be different from each other. In some embodiments, the resistance values can be from separate components, or they can represent other impedances inherent to the electrochemical cell 3400.

Figure 35:
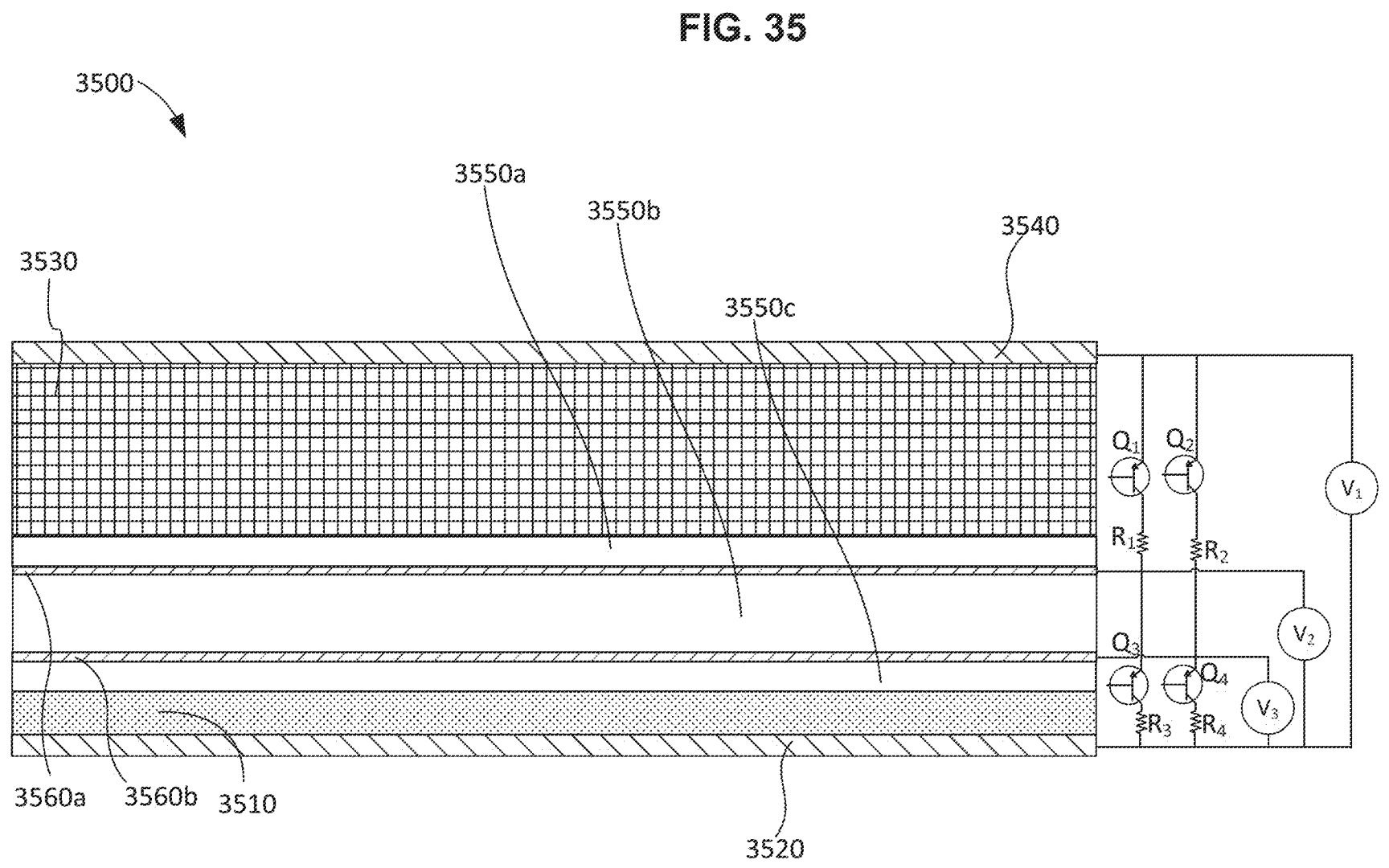

FIG. 35 is an illustration of an electrochemical cell 3500 with multiple interlayers 3560a, 3560b (collectively referred to as interlayers 3560), according to an embodiment. As shown, the electrochemical cell 3500 includes an anode 3510 disposed on an anode current collector 3520, a cathode 3530 disposed on a cathode current collector 3540, with a first separator 3550a, a second separator 3550b, and a third separator 3550c disposed between the anode 3510 and the cathode 3530. The interlayer 3560a is disposed between the first separator 3550a and the second separator 3550b and the second interlayer 3560b is disposed between the second separator 3550b and the third separator 3550c. In some embodiments, the anode 3510, the anode current collector 3520, the cathode 3530, the cathode current collector 3540, the first separator 3550a, the second separator 3550b, the third separator 3550c, and the interlayers 3560 can be the same or substantially similar to the anode 3410, the anode current collector 3420, the cathode 3430, the cathode current collector 3440, the first separator 3450a, the second separator 3450b, the third separator 3450c, and the interlayers 3460, as described above with reference to FIG. 34. Thus, certain aspects of the anode 3510, the anode current collector 3520, the cathode 3530, the cathode current collector 3540, the first separator 3550a, the second separator 3550b, the third separator 3550 and the interlayers 3560 are not described in greater detail herein.

As shown, a voltage $V_1$ is measured between the anode current collector 3520 and the cathode current collector 3540, a voltage $V_2$ is measured between the anode current collector 3520 and the interlayer 3560a, and a voltage $V_3$ is measured between the anode current collector 3540 and the interlayer 3560b. As shown, the electrochemical cell 3500 includes transistors $Q_1$, $Q_2$, $Q_3$, $Q_4$ and optional resistors $R_1$, $R_2$, $R_3$, $R_4$, $R_5$, $R_6$. The emitters connect to the interlayer 3560a in order to flow current into the interlayer 3560a relative to the anode current collector 3520 and the cathode current collector 3540. The circuit can be used to set any voltage potential desired between the cathode current collector 3540 and the anode current collector 3520 by selection of the voltage potential of and the current applied through $R_3$. The emitters connect to the interlayer 3560b in order to flow current into the interlayer 3560b relative to the cathode current collector 3540 and the anode current collector 3520. The circuit can be used to set any voltage potential desired between the cathode current collector 3540 and the anode current collector 3520 by selection of the voltage potential of and the current applied through $R_3$. In some embodiments, the resistances through each current flow path can be the same or substantially similar. In some embodiments, the resistances through each current flow path can be different from each other. In some embodiments, the resistance values can be from separate components, or they can represent other impedances inherent to the electrochemical cell 3600. In some embodiments, the functionality of the circuit can be the same or substantially similar to that of the electrochemical cell 3000, as described above with reference to FIG. 30.

Figure 36:
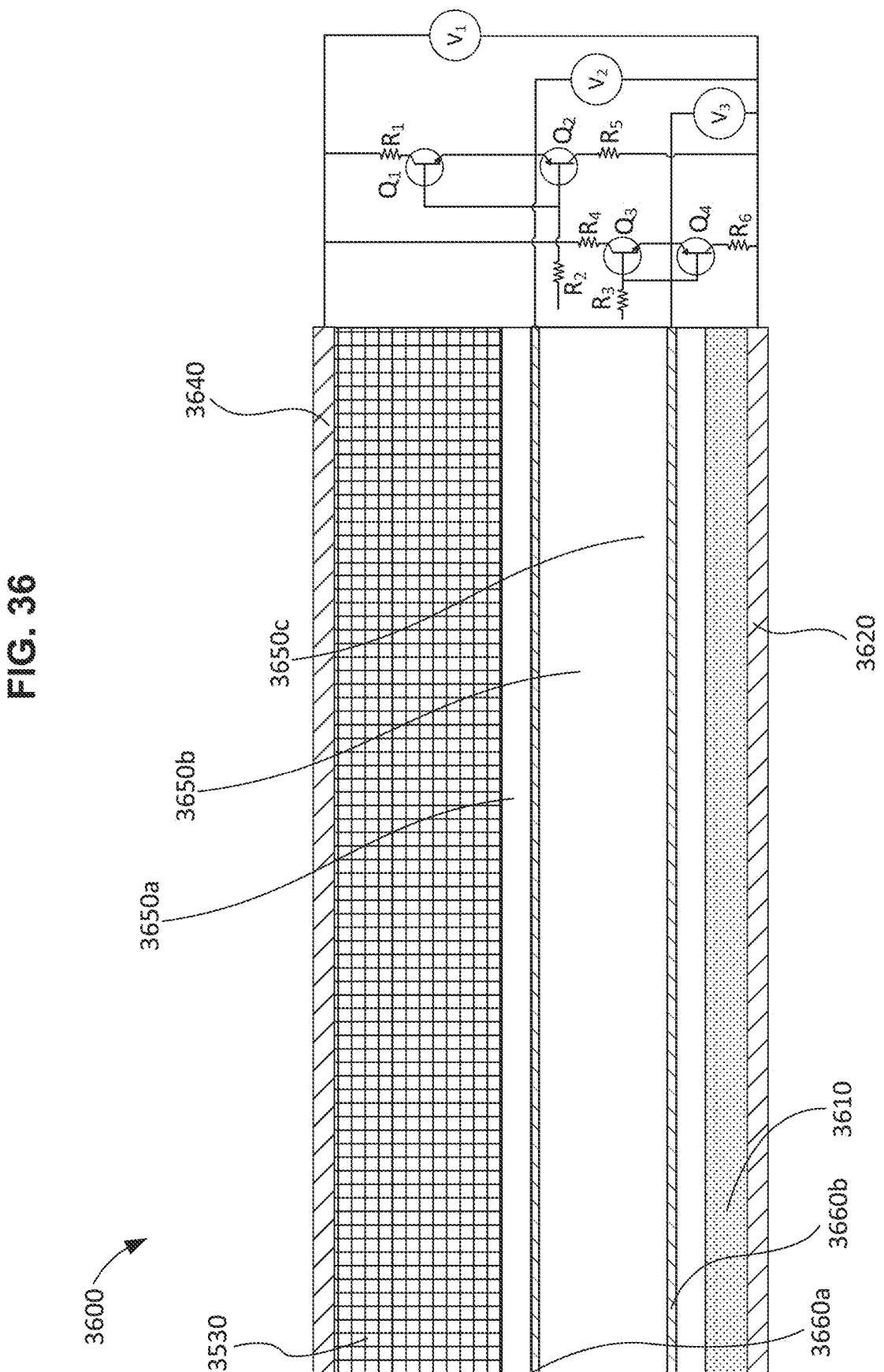
FIG. 36 is an illustration of an electrochemical cell with multiple interlayers, according to an embodiment.

FIG. 36 is an illustration of an electrochemical cell 3600 with multiple interlayers 3660a, 3660b (collectively referred to as interlayers 3660), according to an embodiment. As shown, the electrochemical cell 3600 includes an anode 3610 disposed on an anode current collector 3620, a cathode 3630 disposed on a cathode current collector 3640, with a first separator 3650a, a second separator 3650b, and a third separator 3650c disposed between the anode 3610 and the cathode 3630. The interlayer 3660a is disposed between the first separator 3650a and the second separator 3650b and the second interlayer 3660b is disposed between the second separator 3650b and the third separator 3650c. In some embodiments, the anode 3610, the anode current collector 3620, the cathode 3630, the cathode current collector 3640, the first separator 3650a, the second separator 3650b, the third separator 3650c, and the interlayers 3660 can be the same or substantially similar to the anode 3410, the anode current collector 3420, the cathode 3430, the cathode current collector 3440, the first separator 3450a, the second separator 3450b, the third separator 3450c, and the interlayers 3460, as described above with reference to FIG. 34. Thus, certain aspects of the anode 3610, the anode current collector 3620, the cathode 3630, the cathode current collector 3640, the first separator 3650a, the second separator 3650b, the third separator 3650 and the interlayers 3660 are not described in greater detail herein.

As shown, a voltage $V_1$ is measured between the anode current collector 3620 and the cathode current collector 3640, a voltage $V_2$ is measured between the anode current collector 3620 and the interlayer 3660a, and a voltage $V_3$ is measured between the anode current collector 3640 and the interlayer 3660b. As shown, the electrochemical cell 3500 includes transistors $Q_1$, $Q_2$, $Q_3$, $Q_4$ and optional resistors $R_1$, $R_2$, $R_3$, $R_4$, $R_5$, $R_6$. The resistor $R_2$ controls the flow of current between the transistor $Q_1$ and the transistor $Q_2$. The resistor $R_3$ controls the flow of current between the transistor $Q_3$ and the transistor $Q_4$. In some embodiments, the resistances through each current flow path can be the same or substantially similar. In some embodiments, the resistances through each current flow path can be different from each other. In some embodiments, the resistance values can be from separate components, or they can represent other impedances inherent to the electrochemical cell 3600.

Figure 37:
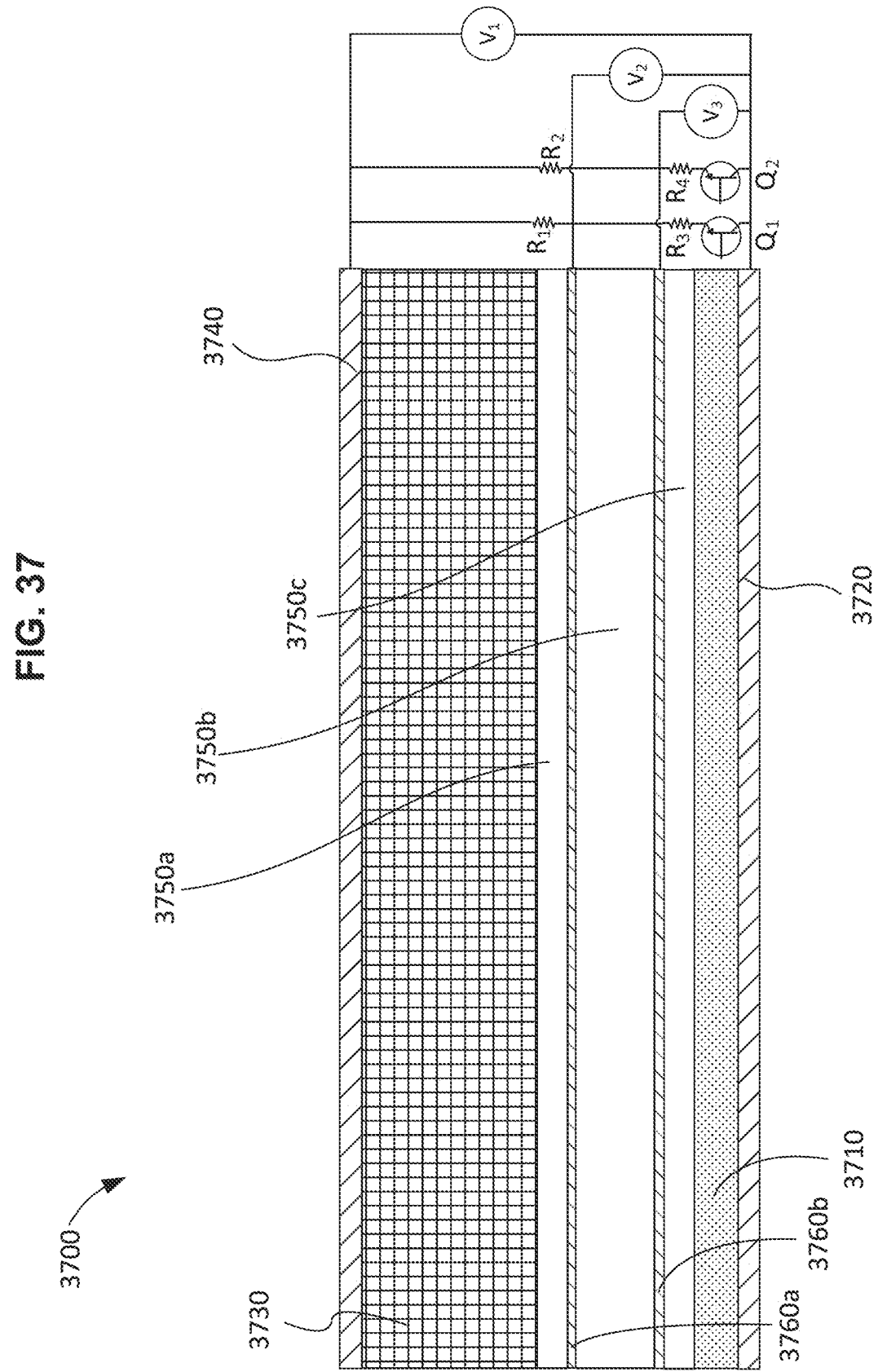
FIG. 37 is an illustration of an electrochemical cell with multiple interlayers, according to an embodiment.

FIG. 37 is an illustration of an electrochemical cell 3700 with multiple interlayers 3760a, 3760b (collectively referred to as interlayers 3760), according to an embodiment. As shown, the electrochemical cell 3700 includes an anode 3710 disposed on an anode current collector 3720, a cathode 3730 disposed on a cathode current collector 3740, with a first separator 3750a, a second separator 3750b, and a third separator 3750c disposed between the anode 3710 and the cathode 3730. The interlayer 3760a is disposed between the first separator 3750a and the second separator 3750b and the second interlayer 3760b is disposed between the second separator 3750b and the third separator 3750c. In some embodiments, the anode 3710, the anode current collector 3720, the cathode 3730, the cathode current collector 3740, the first separator 3750a, the second separator 3750b, the third separator 3750c, and the interlayers 3760 can be the same or substantially similar to the anode 3410, the anode current collector 3420, the cathode 3430, the cathode current collector 3440, the first separator 3450a, the second separator 3450b, the third separator 3450c, and the interlayers 3460, as described above with reference to FIG. 34. Thus, certain aspects of the anode 3710, the anode current collector 3720, the cathode 3730, the cathode current collector 3740, the first separator 3750a, the second separator 3750b, the third separator 3750 and the interlayers 3760 are not described in greater detail herein.

As shown, a voltage $V_1$ is measured between the anode current collector 3720 and the cathode current collector 3740, a voltage $V_2$ is measured between the anode current collector 3720 and the interlayer 3760a, and a voltage $V_3$ is measured between the anode current collector 3740 and the interlayer 3760b. As shown, the electrochemical cell 3700 includes transistors $Q_1$, $Q_2$, and optional resistors $R_1$, $R_2$, $R_3$, $R_4$. As shown, the transistor $Q_1$ and the resistor $R_3$ are placed on a circuit between the interlayer 3760a and the anode current collector 3720. As shown, the transistor $Q_2$ and the resistor $R_4$ are placed on a circuit between the interlayer 3760b and the anode current collector 3720. As shown, the resistor $R_1$ is placed on a circuit between the cathode current collector 3740 and the interlayer 3760a. As shown, the resistor $R_2$ is placed on a circuit between the cathode current collector 3740 and the interlayer 3760b. In some embodiments, the resistances through each current flow path can be the same or substantially similar. In some embodiments, the resistances through each current flow path can be different from each other. In some embodiments, the resistance values can be from separate components, or they can represent other impedances inherent to the electrochemical cell 3700. In some embodiments, the functionality of the circuit can be the same or substantially similar to that of the electrochemical cell 3200, as described above with reference to FIG. 32.

Figure 38:
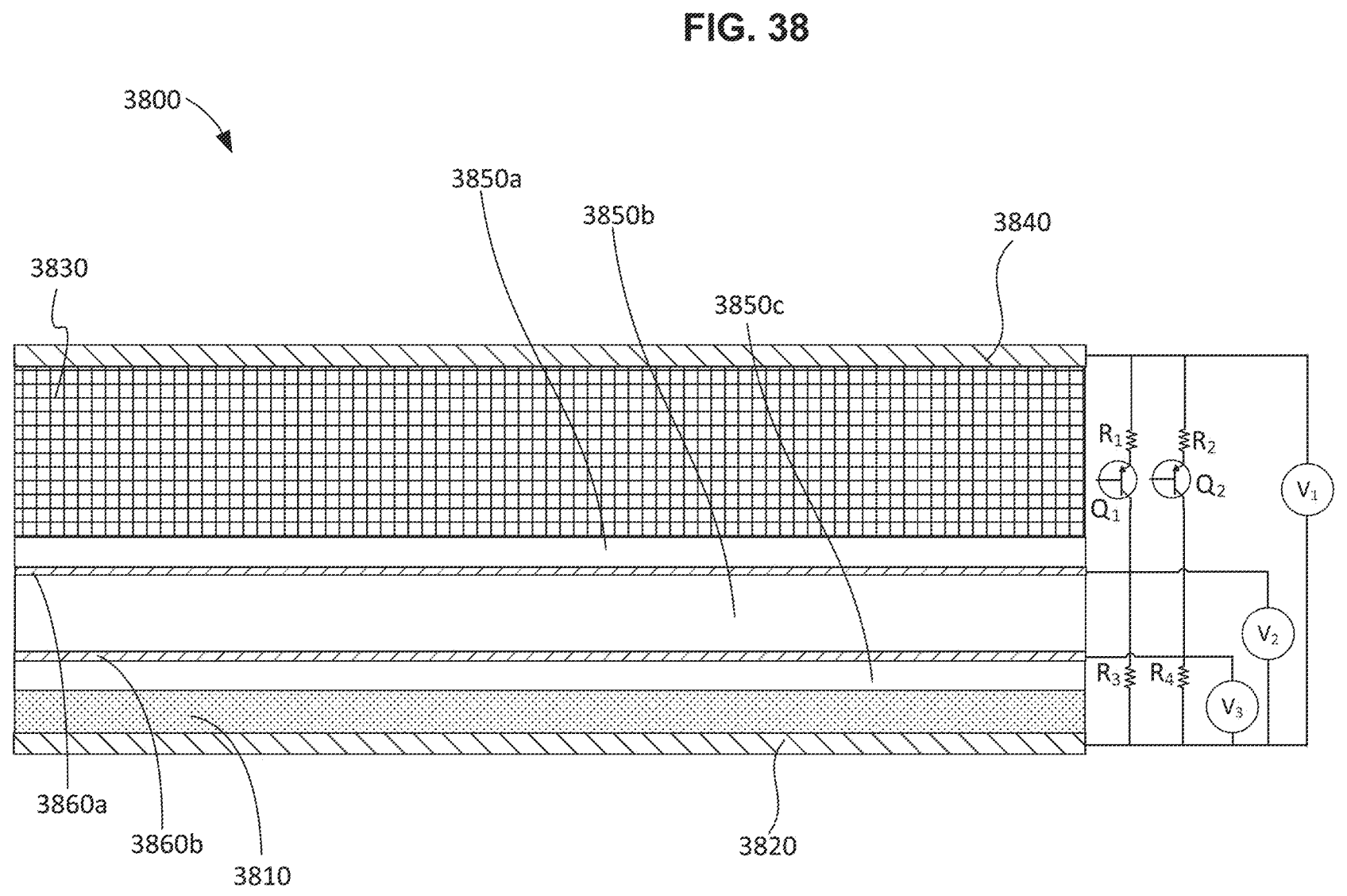

FIG. 38 is an illustration of an electrochemical cell 3800 with multiple interlayers 3860a, 3860b (collectively referred to as interlayers 3860), according to an embodiment. As shown, the electrochemical cell 3800 includes an anode 3810 disposed on an anode current collector 3820, a cathode 3830 disposed on a cathode current collector 3840, with a first separator 3850a, a second separator 3850b, and a third separator 3850c disposed between the anode 3810 and the cathode 3830. The interlayer 3860a is disposed between the first separator 3850a and the second separator 3850b and the second interlayer 3860b is disposed between the second separator 3850b and the third separator 3850c. In some embodiments, the anode 3810, the anode current collector 3820, the cathode 3830, the cathode current collector 3840, the first separator 3850a, the second separator 3850b, the third separator 3850c, and the interlayers 3860 can be the same or substantially similar to the anode 3410, the anode current collector 3420, the cathode 3430, the cathode current collector 3440, the first separator 3450a, the second separator 3450b, the third separator 3450c, and the interlayers 3560, as described above with reference to FIG. 34. Thus, certain aspects of the anode 3810, the anode current collector 3820, the cathode 3830, the cathode current collector 3840, the first separator 3850a, the second separator 3850b, the third separator 3850 and the interlayers 3860 are not described in greater detail herein.

As shown, a voltage $V_1$ is measured between the anode current collector 3820 and the cathode current collector 3840, a voltage $V_2$ is measured between the anode current collector 3820 and the interlayer 3860a, and a voltage $V_3$ is measured between the anode current collector 3840 and the interlayer 3860b. As shown, the electrochemical cell 3800 includes transistors $Q_1$, $Q_2$, and optional resistors $R_1$, $R_2$, $R_3$, $R_4$. As shown, the transistor $Q_1$ and the resistor $R_1$ are placed on a circuit between the interlayer 3860a and the cathode current collector 3840. As shown, the transistor $Q_2$ and the resistor $R_2$ are placed on a circuit between the interlayer 3860b and the cathode current collector 3840. As shown, the resistor $R_3$ is placed on a circuit between the anode current collector 3820 and the interlayer 3860a. As shown, the resistor $R_4$ is placed on a circuit between the anode current collector 3820 and the interlayer 3860b. In some embodiments, the resistances through each current flow path can be the same or substantially similar. In some embodiments, the resistances through each current flow path can be different from each other. In some embodiments, the resistance values can be from separate components, or they can represent other impedances inherent to the electrochemical cell 3800.

Figure 39:
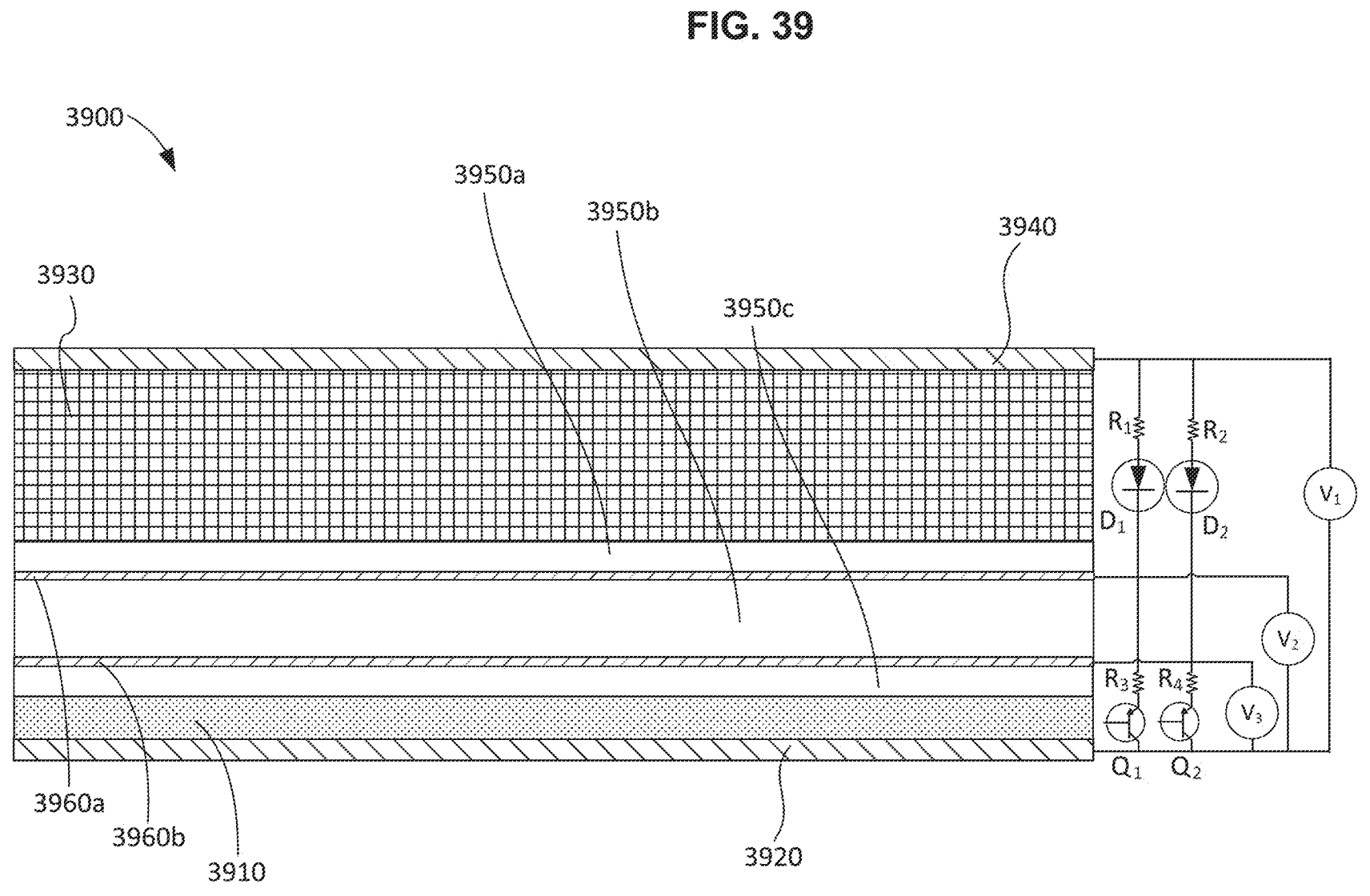

FIG. 39 is an illustration of an electrochemical cell 3900 with multiple interlayers 3960a, 3960b (collectively referred to as interlayers 3960), according to an embodiment. As shown, the electrochemical cell 3900 includes an anode 3910 disposed on an anode current collector 3920, a cathode 3930 disposed on a cathode current collector 3940, with a first separator 3950a, a second separator 3950b, and a third separator 3950c disposed between the anode 3910 and the cathode 3930. The interlayer 3960a is disposed between the first separator 3950a and the second separator 3950b and the second interlayer 3960b is disposed between the second separator 3950b and the third separator 3950c. In some embodiments, the anode 3910, the anode current collector 3920, the cathode 3930, the cathode current collector 3940, the first separator 3950a, the second separator 3950b, the third separator 3950c, and the interlayers 3960 can be the same or substantially similar to the anode 3410, the anode current collector 3420, the cathode 3430, the cathode current collector 3440, the first separator 3450a, the second separator 3450b, the third separator 3450c, and the interlayers 3560, as described above with reference to FIG. 34. Thus, certain aspects of the anode 3910, the anode current collector 3920, the cathode 3930, the cathode current collector 3940, the first separator 3950a, the second separator 3950b, the third separator 3950 and the interlayers 3960 are not described in greater detail herein.

As shown, a voltage $V_1$ is measured between the anode current collector 3920 and the cathode current collector 3940, a voltage $V_2$ is measured between the anode current collector 3920 and the interlayer 3960a, and a voltage $V_3$ is measured between the anode current collector 3940 and the interlayer 3960b. As shown, the electrochemical cell 3900 includes transistors $Q_1$, $Q_2$, diodes $D_1$, $D_2$ and optional resistors $R_1$, $R_2$, $R_3$, $R_4$. As shown, the diode $D_1$ and the resistor $R_1$ are placed on a circuit between the interlayer 3960a and the cathode current collector 3940. As shown, the diode $D_2$ and the resistor $R_2$ are placed on a circuit between the interlayer 3960b and the cathode current collector 3940. As shown, the resistor $R_3$ and the transistor $Q_1$ are placed on a circuit between the anode current collector 3920 and the interlayer 3960a. As shown, the transistor $Q_2$ and the resistor $R_4$ are placed on a circuit between the anode current collector 3920 and the interlayer 3960b. In some embodiments, the resistances through each current flow path can be the same or substantially similar. In some embodiments, the resistances through each current flow path can be different from each other. In some embodiments, the resistance values can be from separate components, or they can represent other impedances inherent to the electrochemical cell 3900. In some embodiments, the functionality of the circuit can be the same or substantially similar to that of the electrochemical cell 3100, as described above with reference to FIG. 31.

Figure 40:
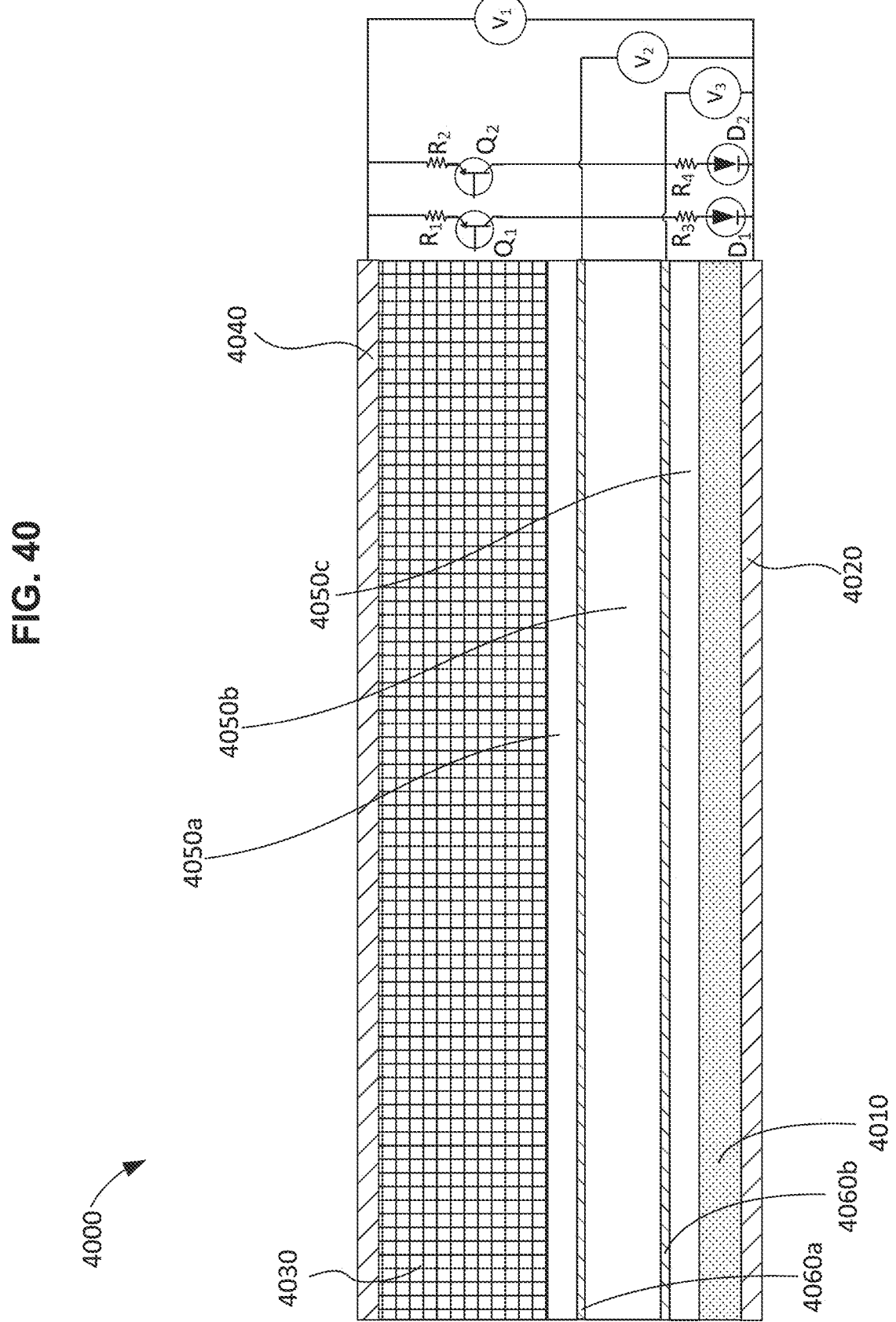
FIG. 40 is an illustration of an electrochemical cell with multiple interlayers, according to an embodiment.

FIG. 40 is an illustration of an electrochemical cell 4000 with multiple interlayers 4060a, 4060b (collectively referred to as interlayers 4060), according to an embodiment. As shown, the electrochemical cell 4000 includes an anode 4010 disposed on an anode current collector 4020, a cathode 4030 disposed on a cathode current collector 4040, with a first separator 4050a, a second separator 4050b, and a third separator 4050c disposed between the anode 4010 and the cathode 4030. The interlayer 4060a is disposed between the first separator 4050a and the second separator 4050b and the second interlayer 4060b is disposed between the second separator 4050b and the third separator 4050c. In some embodiments, the anode 4010, the anode current collector 4020, the cathode 4030, the cathode current collector 4040, the first separator 4050a, the second separator 4050b, the third separator 4050c, and the interlayers 4060 can be the same or substantially similar to the anode 3410, the anode current collector 3420, the cathode 3430, the cathode current collector 3440, the first separator 3450a, the second separator 3450b, the third separator 3450c, and the interlayers 3560, as described above with reference to FIG. 34. Thus, certain aspects of the anode 4010, the anode current collector 4020, the cathode 4030, the cathode current collector 4040, the first separator 4050a, the second separator 4050b, the third separator 4050 and the interlayers 4060 are not described in greater detail herein.

As shown, a voltage $V_1$ is measured between the anode current collector 4020 and the cathode current collector 4040, a voltage $V_2$ is measured between the anode current collector 4020 and the interlayer 4060a, and a voltage $V_3$ is measured between the anode current collector 4040 and the interlayer 4060b. As shown, the electrochemical cell 4000 includes transistors $Q_1$, $Q_2$, diodes $D_1$, $D_2$ and optional resistors $R_1$, $R_2$, $R_3$, $R_4$. As shown, the transistor $Q_1$ and the resistor $R_1$ are placed on a circuit between the interlayer 4060a and the cathode current collector 4040. As shown, the transistor $Q_2$ and the resistor $R_2$ are placed on a circuit between the interlayer 4060b and the cathode current collector 4040. As shown, the resistor $R_3$ and the diode $D_1$ are placed on a circuit between the anode current collector 4020 and the interlayer 4060a. As shown, the diode $D_2$ and the resistor $R_4$ are placed on a circuit between the anode current collector 4020 and the interlayer 4060b. In some embodiments, the resistances through each current flow path can be the same or substantially similar. In some embodiments, the resistances through each current flow path can be different from each other. In some embodiments, the resistance values can be from separate components, or they can represent other impedances inherent to the electrochemical cell 4000.

Figure 41:
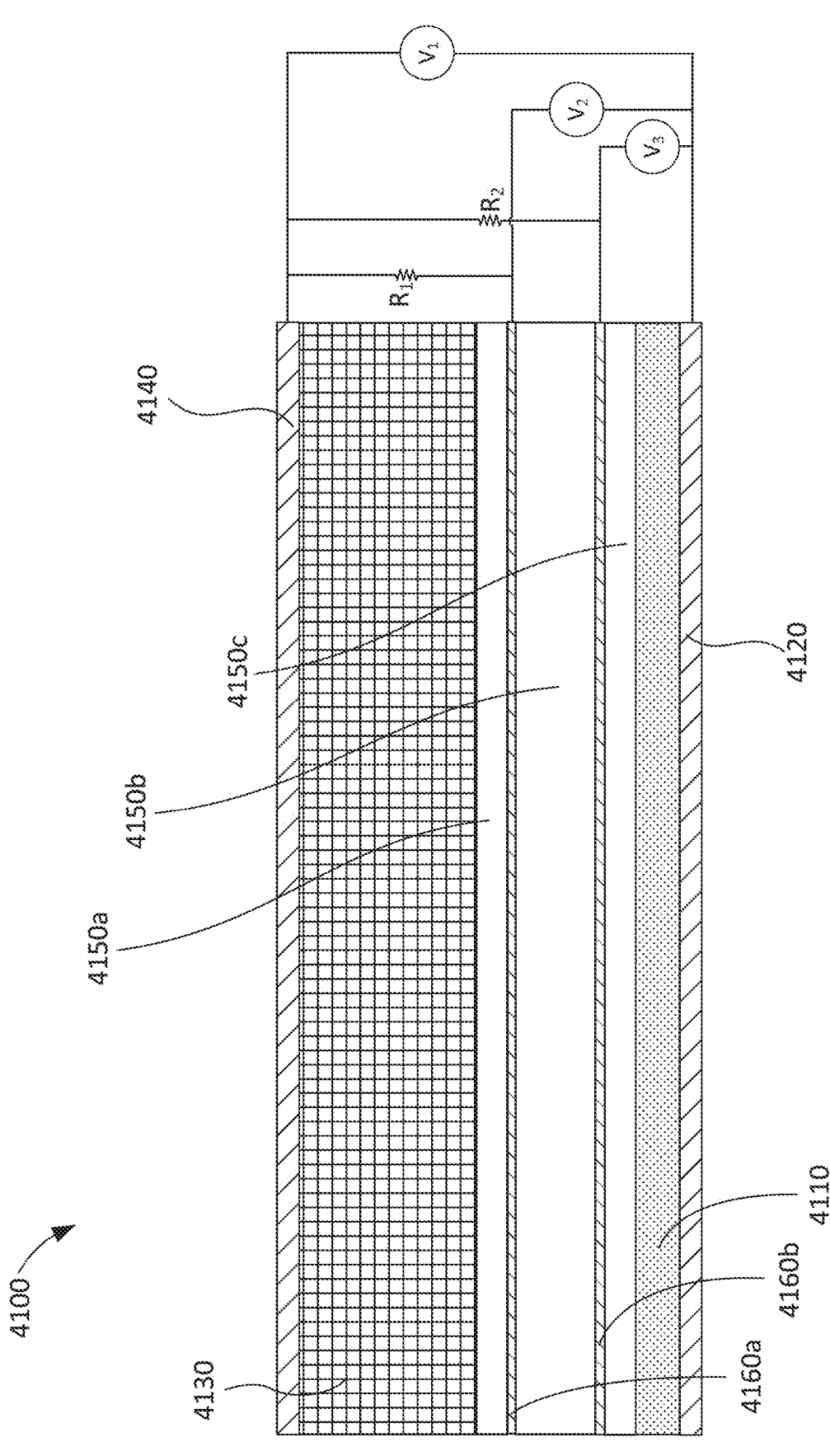
FIG. 41 is an illustration of an electrochemical cell with multiple interlayers, according to an embodiment.

FIG. 41 is an illustration of an electrochemical cell 4100 with multiple interlayers 4160a, 4160b (collectively referred to as interlayers 4160), according to an embodiment. As shown, the electrochemical cell 4100 includes an anode 4110 disposed on an anode current collector 4120, a cathode 4130 disposed on a cathode current collector 4140, with a first separator 4150a, a second separator 4150b, and a third separator 4150c disposed between the anode 4110 and the cathode 4130. The interlayer 4160a is disposed between the first separator 4150a and the second separator 4150b and the second interlayer 4160b is disposed between the second separator 4150b and the third separator 4150c. In some embodiments, the anode 4110, the anode current collector 4120, the cathode 4130, the cathode current collector 4140, the first separator 4150a, the second separator 4150b, the third separator 4150c, and the interlayers 4160 can be the same or substantially similar to the anode 3410, the anode current collector 3420, the cathode 3430, the cathode current collector 3440, the first separator 3450a, the second separator 3450b, the third separator 3450c, and the interlayers 3560, as described above with reference to FIG. 34. Thus, certain aspects of the anode 4110, the anode current collector 4120, the cathode 4130, the cathode current collector 4140, the first separator 4150a, the second separator 4150b, the third separator 4150 and the interlayers 4160 are not described in greater detail herein.

As shown, a voltage $V_1$ is measured between the anode current collector 4120 and the cathode current collector 4140, a voltage $V_2$ is measured between the anode current collector 4120 and the interlayer 4160a, and a voltage $V_3$ is measured between the anode current collector 4140 and the interlayer 4160b. As shown, the electrochemical cell 4100 includes resistors $R_1$, $R_2$. As shown, the resistor $R_1$ is placed on a circuit between the interlayer 4160a and the cathode current collector 4140. As shown, the transistor $Q_2$ and the resistor $R_2$ are placed on a circuit between the interlayer 4160b and the cathode current collector 4140. In some embodiments, the resistances through each current flow path can be the same or substantially similar. In some embodiments, the resistances through each current flow path can be different from each other. In some embodiments, the resistance values can be from separate components, or they can represent other impedances inherent to the electrochemical cell 4100. When the voltage of either of the interlayers 4160 decreases to a voltage less than the voltage of the cathode 4130, current can flow from the cathode 4130 to either of the interlayers 4160, allowing the potential of the interlayers 4160 to increase.

Figure 42:
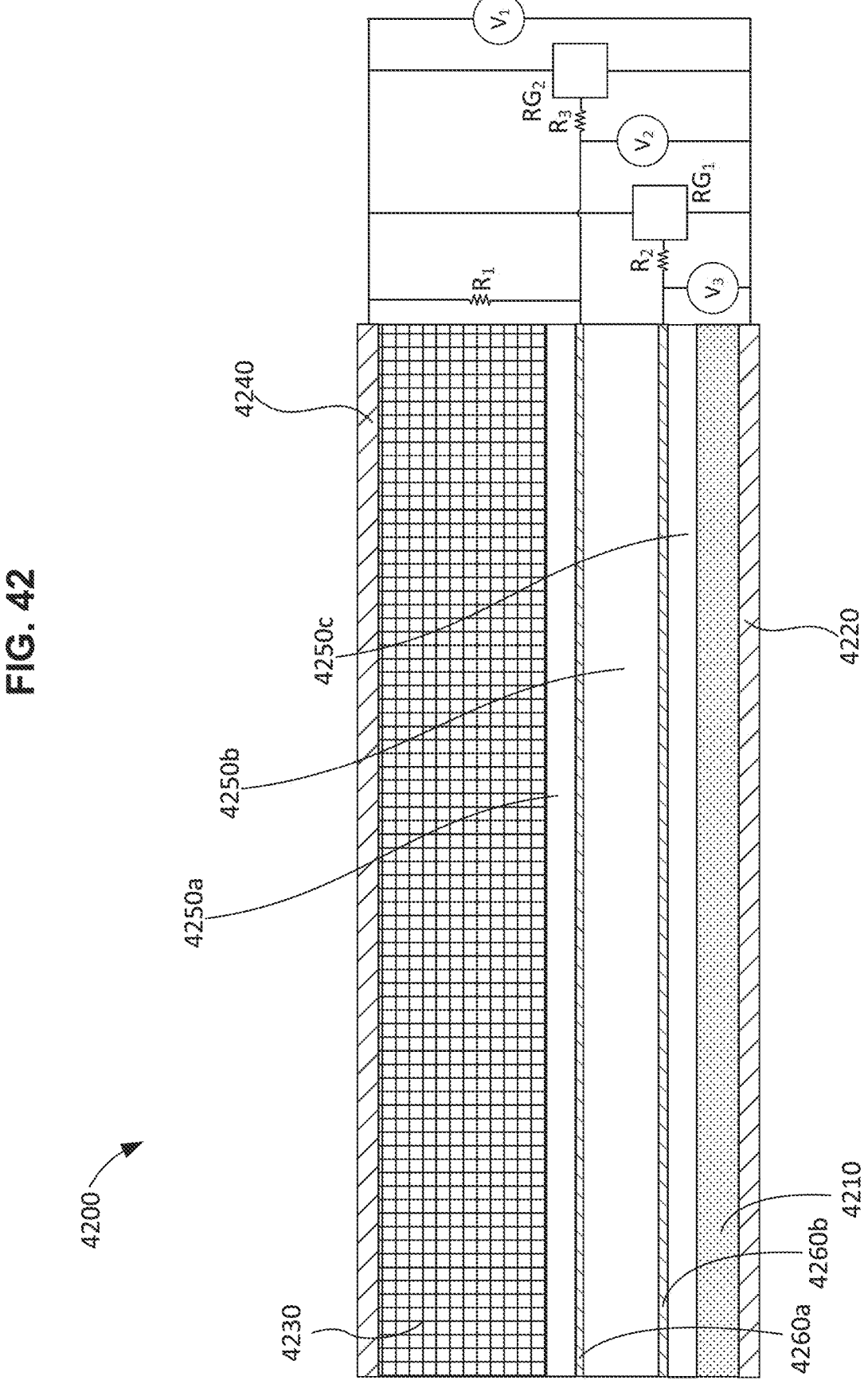
FIG. 42 is an illustration of an electrochemical cell with multiple interlayers, according to an embodiment.

FIG. 42 is an illustration of an electrochemical cell 4200 with multiple interlayers 4260a, 4260b (collectively referred to as interlayers 4260), according to an embodiment. As shown, the electrochemical cell 4200 includes an anode 4210 disposed on an anode current collector 4220, a cathode 4230 disposed on a cathode current collector 4240, with a first separator 4250a, a second separator 4250b, and a third separator 4250c disposed between the anode 4210 and the cathode 4230. The interlayer 4260a is disposed between the first separator 4250a and the second separator 4250b and the second interlayer 4260b is disposed between the second separator 4250b and the third separator 4250c. In some embodiments, the anode 4210, the anode current collector 4220, the cathode 4230, the cathode current collector 4240, the first separator 4250a, the second separator 4250b, the third separator 4250c, and the interlayers 4260 can be the same or substantially similar to the anode 3410, the anode current collector 3420, the cathode 3430, the cathode current collector 3440, the first separator 3450a, the second separator 3450b, the third separator 3450c, and the interlayers 3560, as described above with reference to FIG. 34. Thus, certain aspects of the anode 4210, the anode current collector 4220, the cathode 4230, the cathode current collector 4240, the first separator 4250a, the second separator 4250b, the third separator 4250 and the interlayers 4260 are not described in greater detail herein.

As shown, a voltage $V_1$ is measured between the anode current collector 4220 and the cathode current collector 4240, a voltage $V_2$ is measured between the anode current collector 4220 and the interlayer 4260a, and a voltage $V_3$ is measured between the anode current collector 4240 and the interlayer 4260b. As shown, the electrochemical cell 4200 includes regulators $RG_1$, $RG_2$ and optional resistors $R_1$, $R_2$, $R_3$. In some embodiments, the regulator $RG_1$ and/or the regulator $RG_2$ can include a buck converter, a buck-boost converter, and/or a boost converter. In some embodiments, the resistances through each current flow path can be the same or substantially similar. In some embodiments, the resistances through each current flow path can be different from each other. In some embodiments, the resistance values can be from separate components, or they can represent other impedances inherent to the electrochemical cell 4200. When the voltage of either of the interlayers 4260 decreases to below a defined level, the regulator $RG_1$ and/or the regulator $RG_2$ can cause a current to flow, causing a voltage potential to be applied to one or more of the interlayers 4260. In some embodiments, the switching of the regulators $RG_1$, $RG_2$ can be controlled by a BMS or by a local hardware circuit or other system control method. In some embodiments, the regulators $RG_1$, $RG_2$ can be operated in concert. In some embodiments, the regulators $RG_1$, $RG_2$ can be operated independently. In some embodiments, the functionality of the circuit can be the same or substantially similar to that of the electrochemical cell 2500, as described above with reference to FIG. 25.

In some embodiments, the resistances $R_1$, $R_2$, $R_3$ can be representative of actual resistors, or can represent impedances inherent to the system (i.e., the electrochemical cell 4200). When the voltage of the interlayer 4260 decreases to less than a threshold value, current can flow from the regulators $RG_1$, $RG_2$, causing a potential to be applied to the interlayer 4260. The regulator $RG_1$ and/or the regulator $RG_2$ can be controlled via one or more switching devices (not shown). In some embodiments, the switching devices can be controlled by a BMS or by a local hardware circuit or other system control method. In some embodiments, each of the components of the electrochemical cell 4200 can be operated in concert, or independently. In some embodiments, the voltage $V_1$, the voltage $V_2$, and/or the voltage $V_3$ can be monitored in real time.

Figure 43:
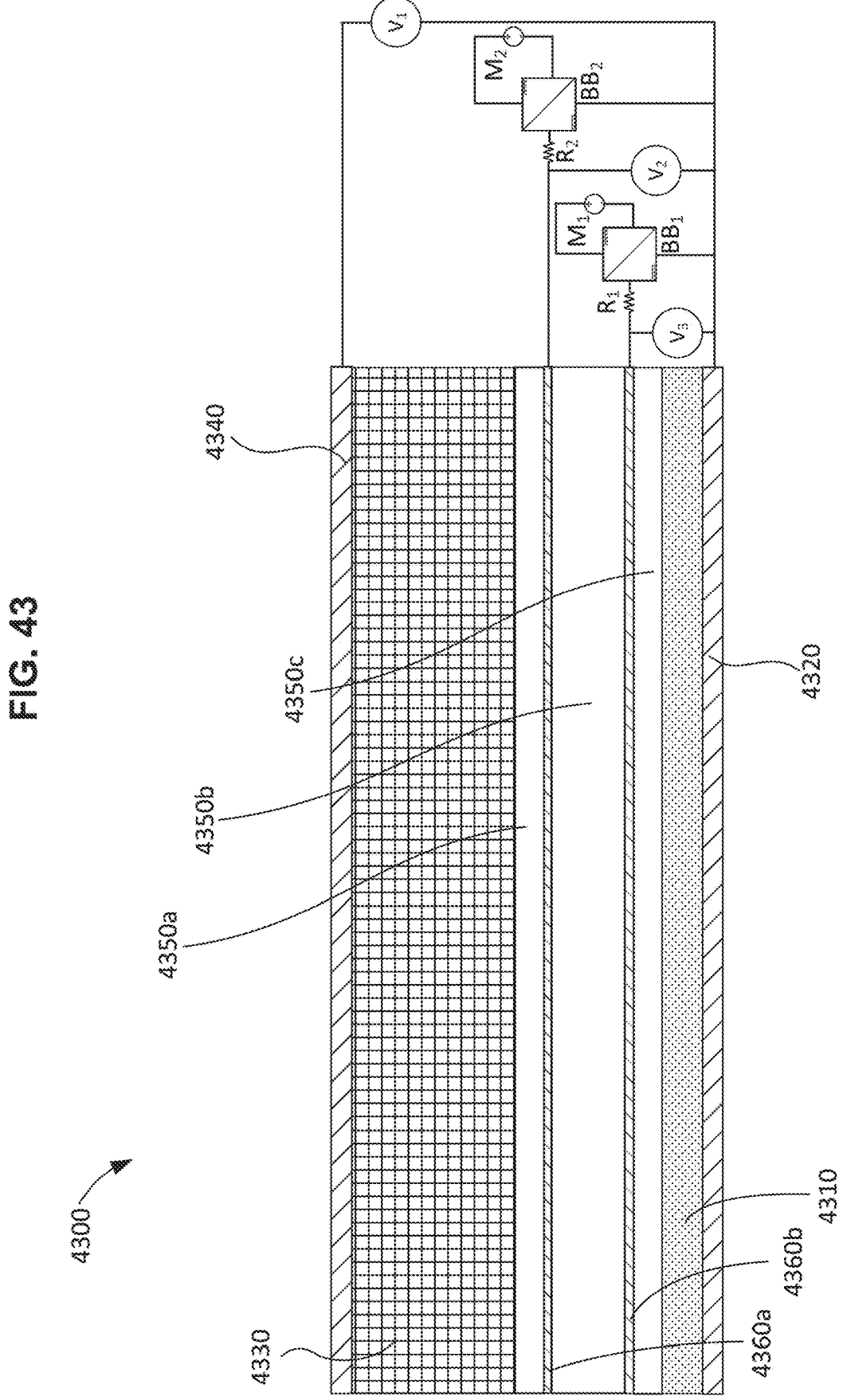
FIG. 43 is an illustration of an electrochemical cell with multiple interlayers, according to an embodiment.

FIG. 43 is an illustration of an electrochemical cell 4300 with multiple interlayers 4360a, 4360b (collectively referred to as interlayers 4360), according to an embodiment. As shown, the electrochemical cell 4300 includes an anode 4310 disposed on an anode current collector 4320, a cathode 4330 disposed on a cathode current collector 4340, with a first separator 4350a, a second separator 4350b, and a third separator 4350c disposed between the anode 4310 and the cathode 4330. The interlayer 4360a is disposed between the first separator 4350a and the second separator 4350b and the second interlayer 4360b is disposed between the second separator 4350b and the third separator 4350c. In some embodiments, the anode 4310, the anode current collector 4320, the cathode 4330, the cathode current collector 4340, the first separator 4350a, the second separator 4350b, the third separator 4350c, and the interlayers 4360 can be the same or substantially similar to the anode 3410, the anode current collector 3420, the cathode 3430, the cathode current collector 3440, the first separator 3450a, the second separator 3450b, the third separator 3450c, and the interlayers 3560, as described above with reference to FIG. 34. Thus, certain aspects of the anode 4310, the anode current collector 4320, the cathode 4330, the cathode current collector 4340, the first separator 4350a, the second separator 4350b, the third separator 4350 and the interlayers 4360 are not described in greater detail herein.

As shown, a voltage $V_1$ is measured between the anode current collector 4320 and the cathode current collector 4340, a voltage $V_2$ is measured between the anode current collector 4320 and the interlayer 4360a, and a voltage $V_3$ is measured between the anode current collector 4340 and the interlayer 4360b. The electrochemical cell 4300 includes isolated DC circuits. As shown, the electrochemical cell 4300 includes buck-boosts $BB_1$, $BB_2$ and optional resistors $R_1$, $R_2$. As shown, the buck-boosts $BB_1$, $BB_2$ are coupled to modules $M_1$, $M_2$. In some embodiments, the resistances through each current flow path can be the same or substantially similar. In some embodiments, the resistances through each current flow path can be different from each other. In some embodiments, the resistance values can be from separate components, or they can represent other impedances inherent to the electrochemical cell 4300. When the voltage of either of the interlayers 4360 decreases to below a defined level, the buck-boost $BB_1$ and/or the buck-boost $BB_2$ can cause a current to flow, causing a voltage potential to be applied to one or more of the interlayers 4360. In some embodiments, either of the buck-boosts $BB_1$, $BB_2$ can be replaced with a buck, a boost, a charge pump, a voltage multiplier and/or a diode ladder. In some embodiments, the switching of the buck-boosts $BB_1$, $BB_2$ can be controlled by a BMS or by a local hardware circuit or other system control method. In some embodiments, the buck-boosts $BB_1$, $BB_2$ can be operated in concert. In some embodiments, the buck-boosts $BB_1$, $BB_2$ can be operated independently. In some embodiments, either of the modules $M_1$, $M_2$ can include a battery or a battery pack, or any other source of DC energy. In some embodiments, the functionality of the circuit can be the same or substantially similar to that of the electrochemical cell 2400, as described above with reference to FIG. 24.

Figure 44:
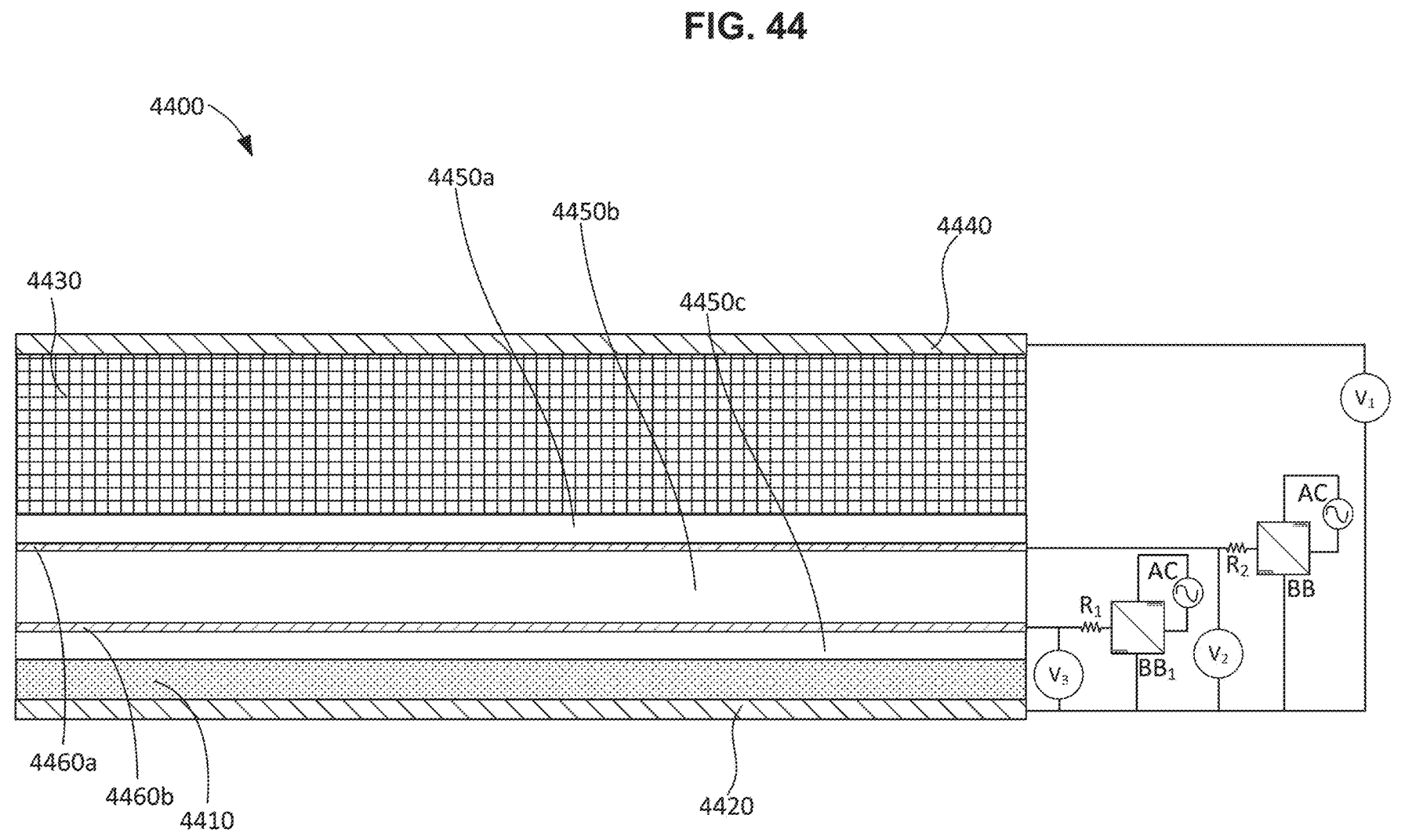

FIG. 44 is an illustration of an electrochemical cell 4400 with multiple interlayers 4460a, 4460b (collectively referred to as interlayers 4460), according to an embodiment. As shown, the electrochemical cell 4400 includes an anode 4410 disposed on an anode current collector 4420, a cathode 4430 disposed on a cathode current collector 4440, with a first separator 4450a, a second separator 4450b, and a third separator 4450c disposed between the anode 4410 and the cathode 4430. The interlayer 4460a is disposed between the first separator 4450a and the second separator 4450b and the second interlayer 4460b is disposed between the second separator 4450b and the third separator 4450c. In some embodiments, the anode 4410, the anode current collector 4420, the cathode 4430, the cathode current collector 4440, the first separator 4450a, the second separator 4450b, the third separator 4450c, and the interlayers 4460 can be the same or substantially similar to the anode 3410, the anode current collector 3420, the cathode 3430, the cathode current collector 3440, the first separator 3450a, the second separator 3450b, the third separator 3450c, and the interlayers 3560, as described above with reference to FIG. 34. Thus, certain aspects of the anode 4410, the anode current collector 4420, the cathode 4430, the cathode current collector 4440, the first separator 4450a, the second separator 4450b, the third separator 4450 and the interlayers 4460 are not described in greater detail herein.

As shown, a voltage $V_1$ is measured between the anode current collector 4420 and the cathode current collector 4440, a voltage $V_2$ is measured between the anode current collector 4420 and the interlayer 4460a, and a voltage $V_3$ is measured between the anode current collector 4440 and the interlayer 4460b. The electrochemical cell 4400 includes isolated DC circuits. As shown, the electrochemical cell 4400 includes buck-boosts $BB_1$, $BB_2$ and optional resistors $R_1$, $R_2$. As shown, the buck-boosts $BB_1$, $BB_2$ are coupled to AC power sources. In some embodiments, the resistances through each current flow path can be the same or substantially similar. In some embodiments, the resistances through each current flow path can be different from each other. In some embodiments, the resistance values can be from separate components, or they can represent other impedances inherent to the electrochemical cell 4400. When the voltage of either of the interlayers 4460 decreases to below a defined level, the buck-boost $BB_1$ and/or the buck-boost $BB_2$ can cause a current to flow, causing a voltage potential to be applied to one or more of the interlayers 4460. In some embodiments, the switching of the AC power sources can be controlled by a BMS or by a local hardware circuit or other system control method. In some embodiments, the AC power sources can be operated in concert. In some embodiments, the AC power sources can be operated independently. In some embodiments, the functionality of the circuit can be the same or substantially similar to that of the electrochemical cell 2500, as described above with reference to FIG. 25.

Figure 45:
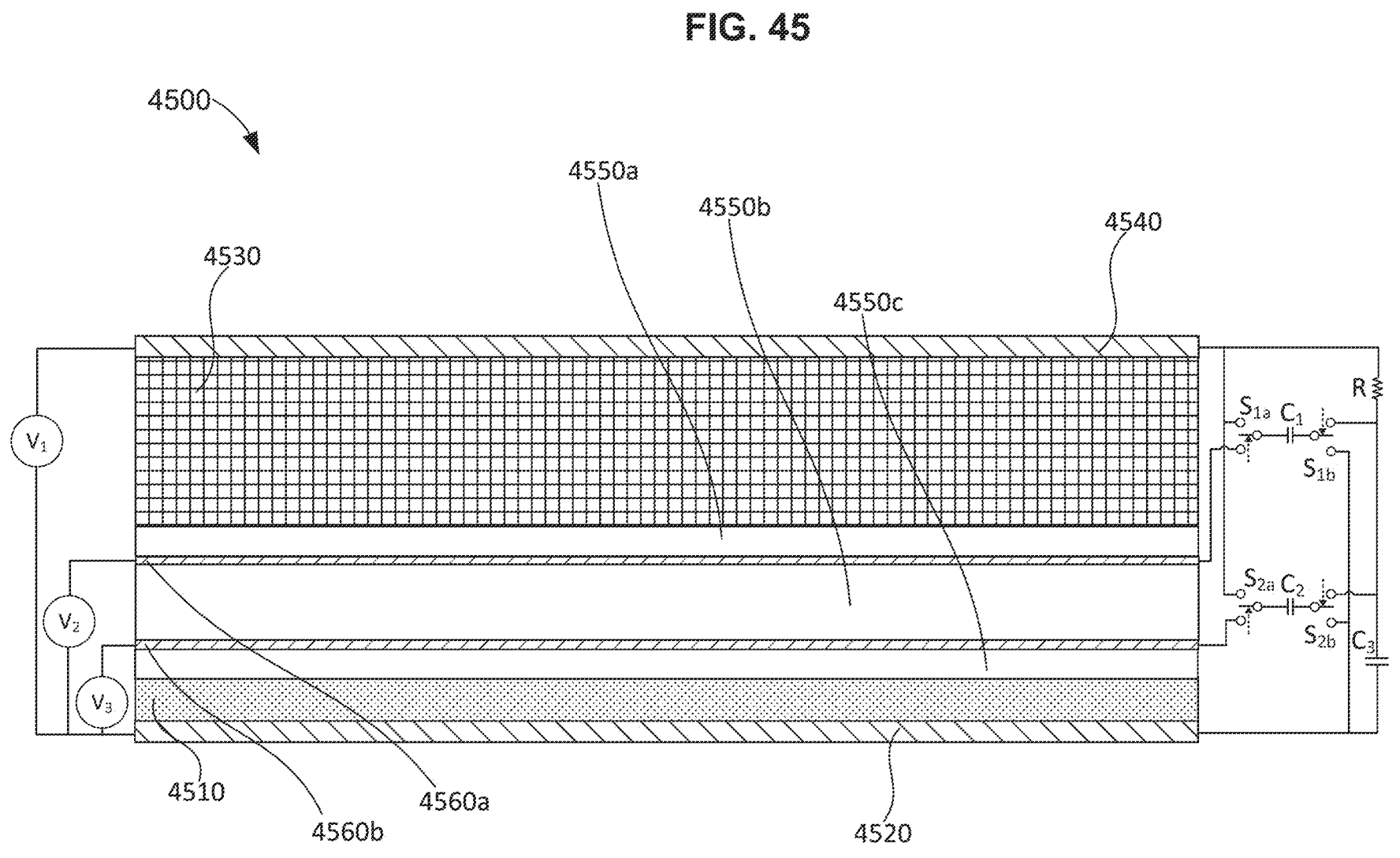

FIG. 45 is an illustration of an electrochemical cell 4500 with multiple interlayers 4560a, 4560b (collectively referred to as interlayers 4560), according to an embodiment. As shown, the electrochemical cell 4500 includes an anode 4510 disposed on an anode current collector 4520, a cathode 4530 disposed on a cathode current collector 4540, with a first separator 4550a, a second separator 4550b, and a third separator 4550c disposed between the anode 4510 and the cathode 4530. The interlayer 4560a is disposed between the first separator 4550a and the second separator 4550b and the second interlayer 4560b is disposed between the second separator 4550b and the third separator 4550c. In some embodiments, the anode 4510, the anode current collector 4520, the cathode 4530, the cathode current collector 4540, the first separator 4550a, the second separator 4550b, the third separator 4550c, and the interlayers 4560 can be the same or substantially similar to the anode 3410, the anode current collector 3420, the cathode 3430, the cathode current collector 3440, the first separator 3450a, the second separator 3450b, the third separator 3450c, and the interlayers 3560, as described above with reference to FIG. 34. Thus, certain aspects of the anode 4510, the anode current collector 4520, the cathode 4530, the cathode current collector 4540, the first separator 4550a, the second separator 4550b, the third separator 4550 and the interlayers 4560 are not described in greater detail herein.

As shown, a voltage $V_1$ is measured between the anode current collector 4520 and the cathode current collector 4540, a voltage $V_2$ is measured between the anode current collector 4520 and the interlayer 4560a, and a voltage $V_3$ is measured between the anode current collector 4540 and the interlayer 4560b. As shown, the electrochemical cell 4500 includes switches $S_{1a}$, $S_{1b}$, $S_{2a}$, $S_{2b}$, capacitors $C_1$, $C_2$, $C_3$, and optional resistor R. As shown, the electrochemical cell 4500 is configured as a voltage doubling mechanism. Through control of the switching sequence of the switches $S_{1a}$, $S_{1b}$, $S_{2a}$, $S_{2b}$, a voltage equal to or double the voltage of the cathode 4530 relative to the anode 4510 can be applied to the interlayer 4560a and/or the interlayer 4560b. For example, the switch Sla can be switched to the up position while the switch $S_{1b}$ is switched to the down position to charge the capacitor $C_1$. The capacitor $C_3$ can charge continuously via the resistor R. In order to apply a doubling voltage, the switch Sla can be moved to the down position, connecting to the interlayer 4560a, and the switch $S_{1b}$ is moved to the up position, electrically connecting the capacitor $C_1$ to the top side of the capacitor $C_3$. In such a case, the total voltage applied to the interlayer 4560a is equal to $C_1 \times V_1 + C_2 \times V_1$, where $V_1$ is the voltage applied to the interlayer 4560a. In cases where $C_1$ is equal to $C_3$, this equates to $2 \times V_1$. For example, if only cell voltage $V_1$ is applied, then the switch $S_{1b}$ can remain in the down position and the switch Sla can alternate between the up and the down position.

The energy transferred to the interlayer 4560a and/or the interlayer 4560b can be controlled via the resistance of the components of the electrochemical cell 4500 (including the resistor R) and/or via other resistors (not shown). In some embodiments, the energy transferred to the interlayers 4560 can be controlled via selection of the capacitor $C_1$, $C_2$, or use of other types of active components. In some embodiments, the resistances through each current flow path can be the same or substantially similar. In some embodiments, the resistances through each current flow path can be different from each other. In some embodiments, the resistance values can be from separate components, or they can represent other impedances inherent to the electrochemical cell 4500. In some embodiments, any of the switches $S_{1a}$, $S_{1b}$, $S_{2a}$, $S_{2b}$, can be replaced by a diode, a MOSFET, a BJT, or any other suitable device. In some embodiments, the functionality of the circuit can be the same or substantially similar to that of the electrochemical cell 2100, as described above with reference to FIG. 21.

Figure 46:
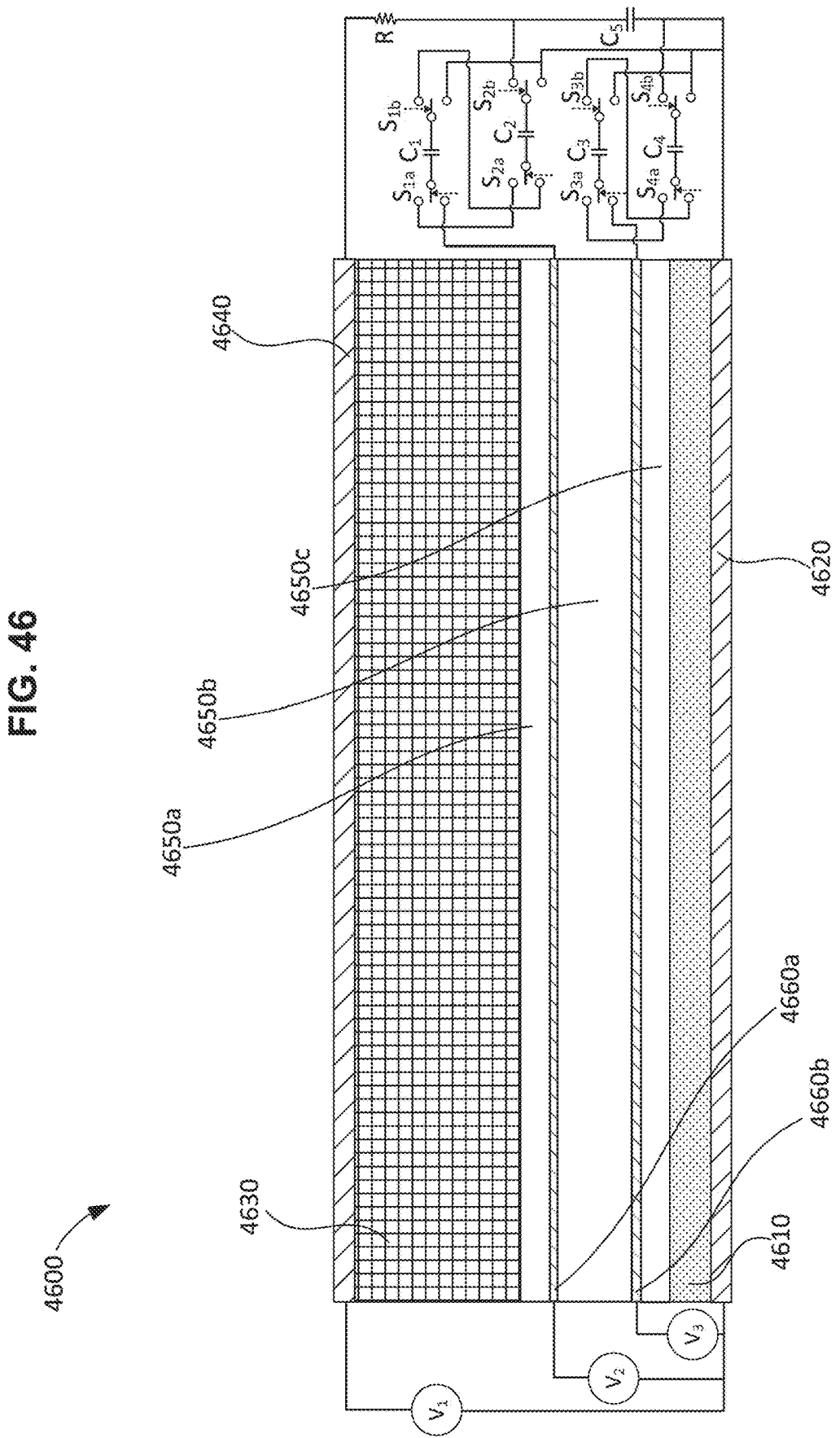
FIG. 46 is an illustration of an electrochemical cell with multiple interlayers, according to an embodiment.

FIG. 46 is an illustration of an electrochemical cell 4600 with multiple interlayers 4660a, 4660b (collectively referred to as interlayers 4660), according to an embodiment. As shown, the electrochemical cell 4600 includes an anode 4610 disposed on an anode current collector 4620, a cathode 4630 disposed on a cathode current collector 4640, with a first separator 4650a, a second separator 4650b, and a third separator 4650c disposed between the anode 4610 and the cathode 4630. The interlayer 4660a is disposed between the first separator 4650a and the second separator 4650b and the second interlayer 4660b is disposed between the second separator 4650b and the third separator 4650c. In some embodiments, the anode 4610, the anode current collector 4620, the cathode 4630, the cathode current collector 4640, the first separator 4650a, the second separator 4650b, the third separator 4650c, and the interlayers 4660 can be the same or substantially similar to the anode 3410, the anode current collector 3420, the cathode 3430, the cathode current collector 3440, the first separator 3450a, the second separator 3450b, the third separator 3450c, and the interlayers 3560, as described above with reference to FIG. 34. Thus, certain aspects of the anode 4610, the anode current collector 4620, the cathode 4630, the cathode current collector 4640, the first separator 4650a, the second separator 4650b, the third separator 4650 and the interlayers 4660 are not described in greater detail herein.

As shown, a voltage $V_1$ is measured between the anode current collector 4620 and the cathode current collector 4640, a voltage $V_2$ is measured between the anode current collector 4620 and the interlayer 4660a, and a voltage $V_3$ is measured between the anode current collector 4640 and the interlayer 4660b. As shown, the electrochemical cell 4600 includes switches $S_{1a}$, $S_{1b}$, $S_{2a}$, $S_{2b}$, $S_{3a}$, $S_{3b}$, $S_{4a}$, $S_{4b}$, capacitors $C_1$, $C_2$, $C_3$, $C_4$, $C_5$, and optional resistor R. The capacitor $C_5$ can charge continuously via the resistor R.

Depending on how the switches $S_{1a}$, $S_{1b}$, $S_{2a}$, $S_{2b}$, $S_{3a}$, $S_{3b}$, $S_{4a}$, $S_{4b}$, are configured, a voltage of at least about 2, or at least about 3 times the voltage difference between the anode current collector 4620 and the cathode current collector 4640 can be applied to the interlayer 4660a and/or interlayer 4660b. For example, with switch Sla and switch $S_{2a}$ in the up position while switch $S_{1b}$ and switch $S_{2b}$ are in the down position, the capacitors $C_1$ and $C_2$ charge. Then, switching the switch Sla and the switch $S_{2a}$ to the down position while switching the switch $S_{1b}$ and the switch $S_{2b}$ to the up position, triple the voltage $V_1$ is applied to the interlayer 4660. This is a charge pump procedure. In some embodiments, any of the switches $S_{1a}$, $S_{1b}$, $S_{2a}$, $S_{2b}$, $S_{3a}$, $S_{3b}$, $S_{4a}$, $S_{4b}$, can be replaced with a diode, a MOSFET, a BJT, or any other suitable device. In some embodiments, any of the switches $S_{1a}$, $S_{1b}$, $S_{2a}$, $S_{2b}$, $S_{3a}$, $S_{3b}$, $S_{4a}$, $S_{4b}$, can be controlled by a BMS, a hardware device, a control chip, an oscillator, or any other suitable controller device. In some embodiments, the resistances through each current flow path can be the same or substantially similar. In some embodiments, the resistances through each current flow path can be different from each other. In some embodiments, the resistance values can be from separate components, or they can represent other impedances inherent to the electrochemical cell 4600. In some embodiments, the functionality of the circuit can be the same or substantially similar to that of the electrochemical cell 2700, as described above with reference to FIG. 27.

Figure 47:
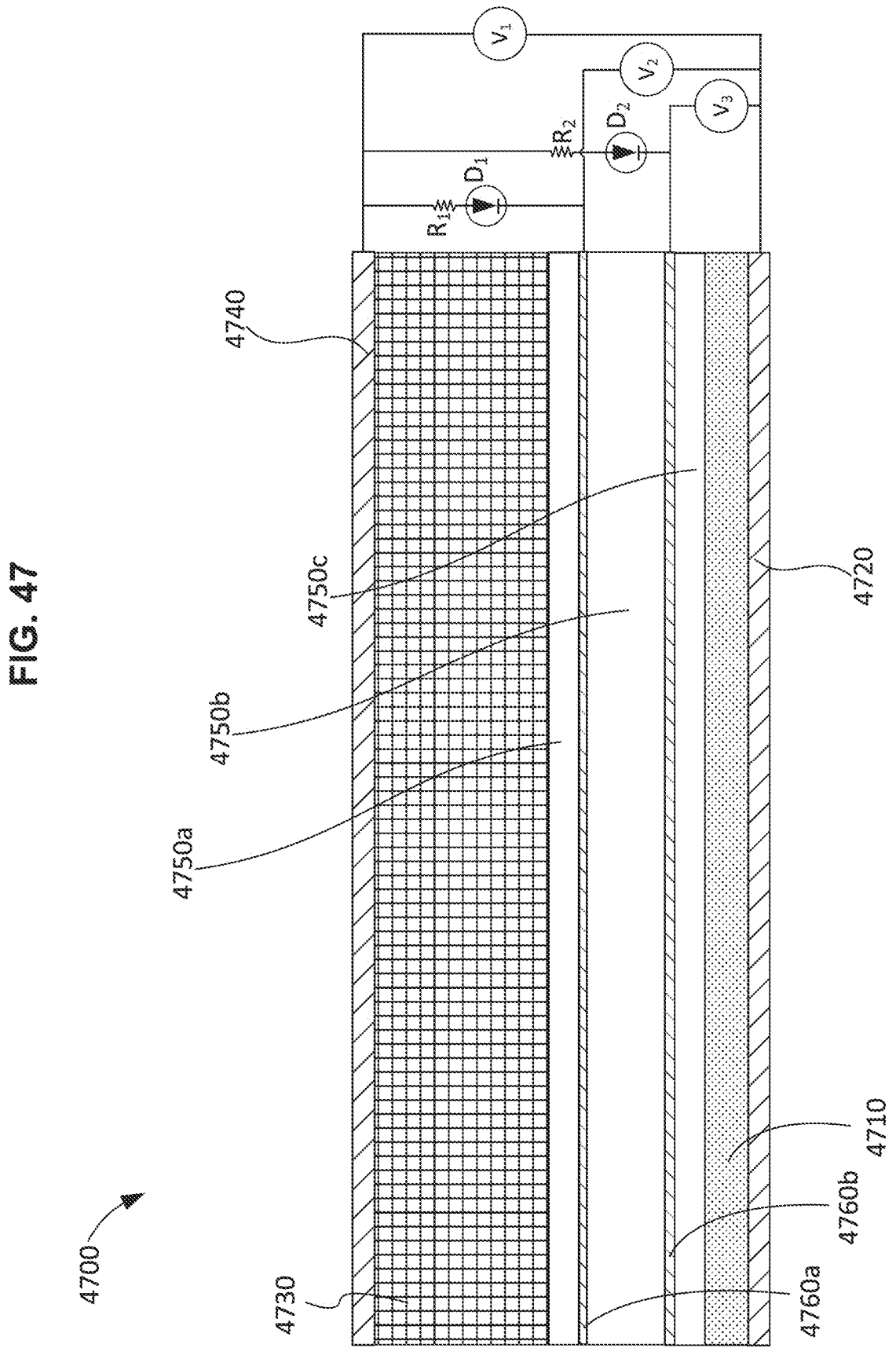
FIG. 47 is an illustration of an electrochemical cell with multiple interlayers, according to an embodiment.

FIG. 47 is an illustration of an electrochemical cell 4700 with multiple interlayers 4760a, 4760b (collectively referred to as interlayers 4760), according to an embodiment. As shown, the electrochemical cell 4700 includes an anode 4710 disposed on an anode current collector 4720, a cathode 4730 disposed on a cathode current collector 4740, with a first separator 4750a, a second separator 4750b, and a third separator 4750c disposed between the anode 4710 and the cathode 4730. The interlayer 4760a is disposed between the first separator 4750a and the second separator 4750b and the second interlayer 4760b is disposed between the second separator 4750b and the third separator 4750c. In some embodiments, the anode 4710, the anode current collector 4720, the cathode 4730, the cathode current collector 4740, the first separator 4750a, the second separator 4750b, the third separator 4750c, and the interlayers 4760 can be the same or substantially similar to the anode 3410, the anode current collector 3420, the cathode 3430, the cathode current collector 3440, the first separator 3450a, the second separator 3450b, the third separator 3450c, and the interlayers 3560, as described above with reference to FIG. 34. Thus, certain aspects of the anode 4710, the anode current collector 4720, the cathode 4730, the cathode current collector 4740, the first separator 4750a, the second separator 4750b, the third separator 4750 and the interlayers 4760 are not described in greater detail herein.

As shown, a voltage $V_1$ is measured between the anode current collector 4720 and the cathode current collector 4740, a voltage $V_2$ is measured between the anode current collector 4720 and the interlayer 4760a, and a voltage $V_3$ is measured between the anode current collector 4740 and the interlayer 4760b. As shown, the electrochemical cell 4700 includes diodes $D_1$, $D_2$ and optional resistors $R_1$, $R_2$. As shown, the diodes $D_1$, $D_2$ direct current from the cathode current collector 4740 to the interlayer 4760a and from the cathode current collector 4740 to the interlayer 4760b, respectively. The electrochemical cell 4700 acts as a diode conductance cell. When the voltage of the interlayer 4760a and/or the interlayer 4760b decreases to a value of less than the forward voltage of the diodes $D_1$, $D_2$, current can flow through either of the diodes $D_1$, $D_2$, increasing the potential of the interlayer 4760a and/or the interlayer 4760b. In some embodiments, the resistances through each current flow path can be the same or substantially similar. In some embodiments, the resistances through each current flow path can be different from each other. In some embodiments, the resistance values can be from separate components, or they can represent other impedances inherent to the electrochemical cell 4700. In some embodiments, the functionality of the circuit can be the same or substantially similar to that of the electrochemical cell 200, as described above with reference to FIGS. 2A-2B.

Figure 48:
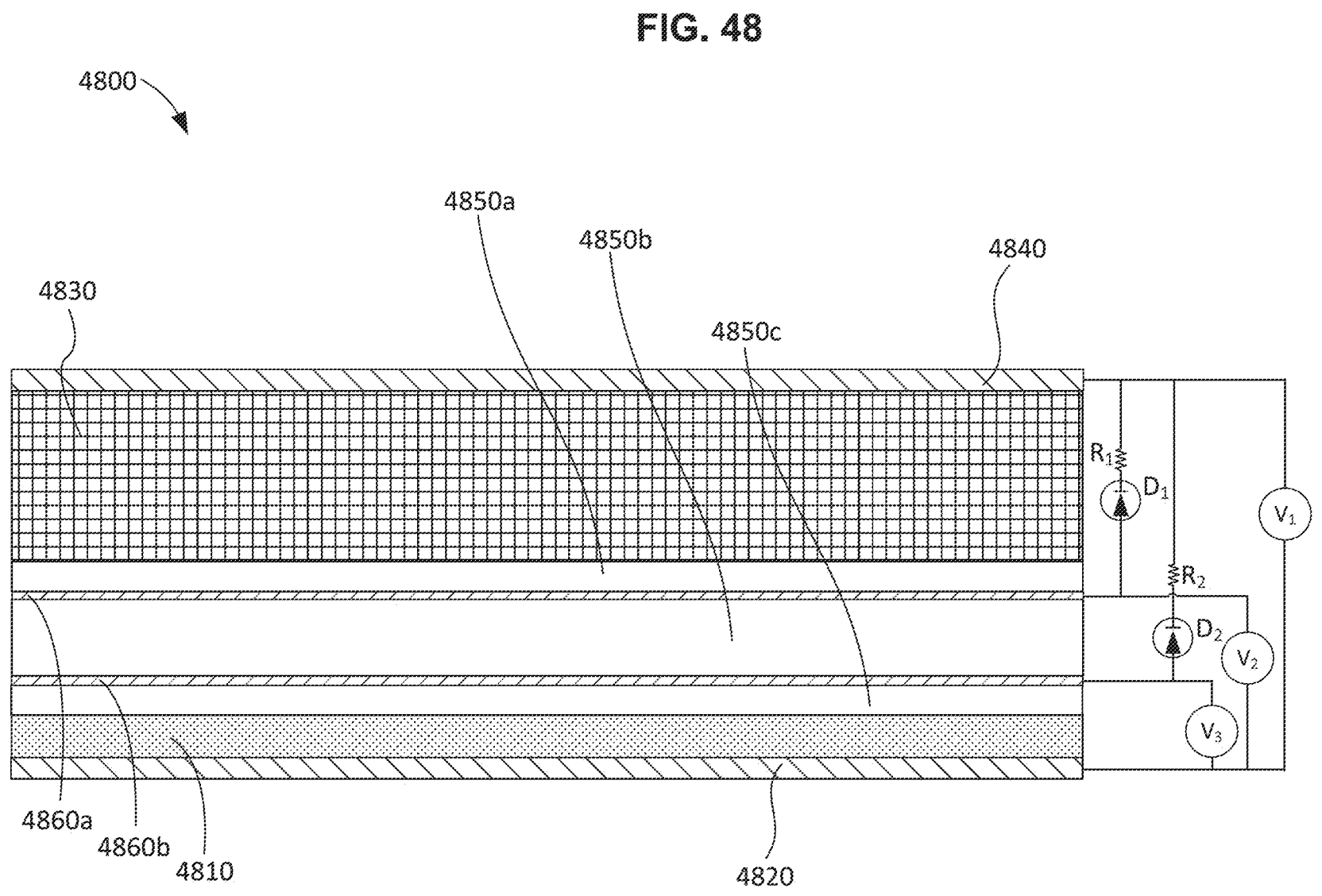

FIG. 48 is an illustration of an electrochemical cell 4800 with multiple interlayers 4860a, 4860b (collectively referred to as interlayers 4860), according to an embodiment. As shown, the electrochemical cell 4800 includes an anode 4810 disposed on an anode current collector 4820, a cathode 4830 disposed on a cathode current collector 4840, with a first separator 4850*a*, a second separator 4850*b*, and a third separator 4850*c* disposed between the anode 4810 and the cathode 4830. The interlayer 4860*a* is disposed between the first separator 4850*a* and the second separator 4850*b* and the second interlayer 4860*b* is disposed between the second separator 4850*b* and the third separator 4850*c*. In some embodiments, the anode 4810, the anode current collector 4820, the cathode 4830, the cathode current collector 4840, the first separator 4850*a*, the second separator 4850*b*, the third separator 4850*c*, and the interlayers 4860 can be the same or substantially similar to the anode 3410, the anode current collector 3420, the cathode 3430, the cathode current collector 3440, the first separator 3450*a*, the second separator 3450*b*, the third separator 3450*c*, and the interlayers 3560, as described above with reference to FIG. 34. Thus, certain aspects of the anode 4810, the anode current collector 4820, the cathode 4830, the cathode current collector 4840, the first separator 4850*a*, the second separator 4850*b*, the third separator 4850 and the interlayers 4860 are not described in greater detail herein. In some embodiments, the functionality of the circuit can be the same or substantially similar to that of the electrochemical cell 2000, as described above with reference to FIG. 20.

As shown, a voltage $V_1$ is measured between the anode current collector 4820 and the cathode current collector 4840, a voltage $V_2$ is measured between the anode current collector 4820 and the interlayer 4860*a*, and a voltage $V_3$ is measured between the anode current collector 4840 and the interlayer 4860*b*. As shown, the electrochemical cell 4800 includes diodes $D_1$, $D_2$ and optional resistors $R_1$, $R_2$. As shown, the diodes $D_1$, $D_2$ direct current from the interlayer 4860*a* to the cathode current collector 4840 and from the interlayer 4680*b* to the cathode current collector 4840, respectively. The electrochemical cell 4800 includes a backflow circuit bias. When the voltage of the interlayer 4860*a* and/or the interlayer 4860*b* decreases to a value of less than the forward voltage of the diodes $D_1$, $D_2$, current can flow through either of the diodes $D_1$, $D_2$, increasing the potential of the interlayer 4860*a* and/or the interlayer 4860*b*. In some embodiments, if either of the diodes $D_1$, $D_2$ includes a rectification diode (i.e., a diode not intended to function in a reverse breakdown voltage), the current can be restricted in two ways. First the reverse bias leakage current can be defined by the manufacturer of the component. Second the reverse recovery current of the diode $D_1$ and/or the diode $D_2$ can be defined by the manufacturer of the component. In the event the current exceeds a threshold value, the diode $D_1$ and/or the diode $D_2$ can switch off, preventing excess current flow to the interlayer 4860*a* and/or the interlayer 4860*b*. In some embodiments, the resistances through each current flow path can be the same or substantially similar. In some embodiments, the resistances through each current flow path can be different from each other. In some embodiments, the resistance values can be from separate components, or they can represent other impedances inherent to the electrochemical cell 4800. In some embodiments, the functionality of the circuit can be the same or substantially similar to that of the electrochemical cell 200, as described above with reference to FIGS. 2A-2B.

Figure 49:
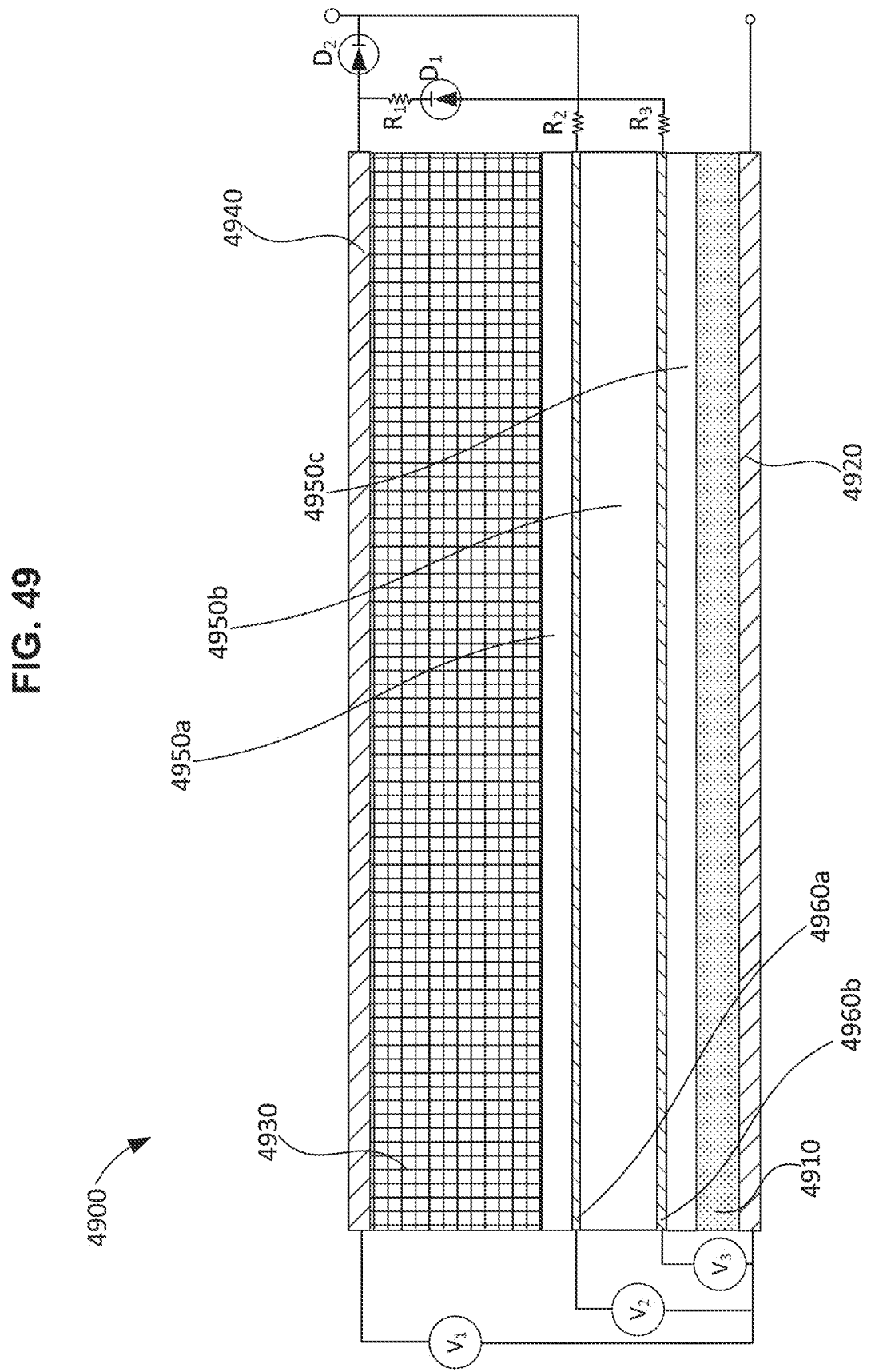
FIG. 49 is an illustration of an electrochemical cell with multiple interlayers, according to an embodiment.

FIG. 49 is an illustration of an electrochemical cell 4900 with multiple interlayers 4960*a*, 4960*b* (collectively referred to as interlayers 4960), according to an embodiment. As shown, the electrochemical cell 4900 includes an anode 4910 disposed on an anode current collector 4920, a cathode 4930 disposed on a cathode current collector 4940, with a first separator 4950*a*, a second separator 4950*b*, and a third separator 4950*c* disposed between the anode 4910 and the cathode 4930. The interlayer 4960*a* is disposed between the first separator 4950*a* and the second separator 4950*b* and the second interlayer 4960*b* is disposed between the second separator 4950*b* and the third separator 4950*c*. In some embodiments, the anode 4910, the anode current collector 4920, the cathode 4930, the cathode current collector 4940, the first separator 4950*a*, the second separator 4950*b*, the third separator 4950*c*, and the interlayers 4960 can be the same or substantially similar to the anode 3410, the anode current collector 3420, the cathode 3430, the cathode current collector 3440, the first separator 3450*a*, the second separator 3450*b*, the third separator 3450*c*, and the interlayers 3560, as described above with reference to FIG. 34. Thus, certain aspects of the anode 4910, the anode current collector 4920, the cathode 4930, the cathode current collector 4940, the first separator 4950*a*, the second separator 4950*b*, the third separator 4950 and the interlayers 4960 are not described in greater detail herein.

As shown, the electrochemical cell 4900 includes diodes $D_1$ and $D_2$ and optional resistors $R_1$, $R_2$, $R_3$. The electrochemical cell 4900 includes charge diode capability. The diode $D_2$ can cause a voltage drop of the interlayer 4960*a* relative to the cathode 4930 equal to the forward voltage drop of the diode $D_2$. This voltage drop can be about 0.1, about 0.2, about 0.3, about 0.4, about 0.5, about 0.6, about 0.7, about 0.8, about 0.9, or about 1 times the full voltage difference between the cathode 4930 and the anode 4910, inclusive of all values and ranges therebetween. The diode $D_2$ can operate in forward breakdown, reverse breakdown, and/or any other topology. The diode $D_1$ can be selected for a specific forward or reverse voltage and can be placed for forward or reverse voltage and can be placed for forward or reverse breakdown voltage. In some embodiments, the resistances through each current flow path can be the same or substantially similar. In some embodiments, the resistances through each current flow path can be different from each other. In some embodiments, the resistance values can be from separate components, or they can represent other impedances inherent to the electrochemical cell 4900. In some embodiments, the functionality of the circuit can be the same or substantially similar to that of the electrochemical cell 3300, as described above with reference to FIG. 33. In some embodiments, the interlayers 4960 can be connected together as shown, or the interlayers 4960 can be connected to different circuit types as described above in other embodiments or other types of circuits used to set the voltage potential of the interlayers 4960.

Figure 50:
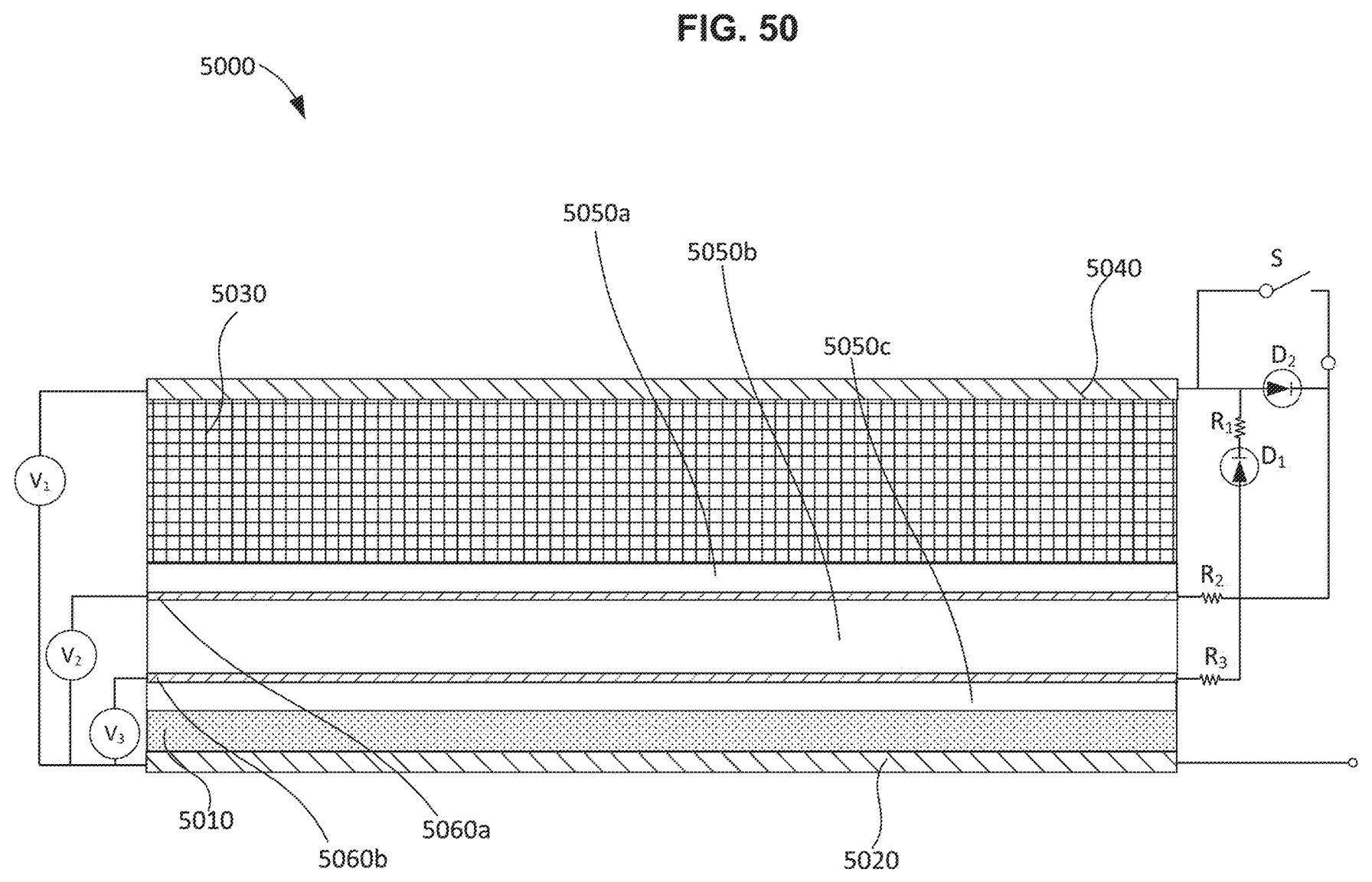

FIG. 50 is an illustration of an electrochemical cell 5000 with multiple interlayers 5060*a*, 5060*b* (collectively referred to as interlayers 5060), according to an embodiment. As shown, the electrochemical cell 5000 includes an anode 5010 disposed on an anode current collector 5020, a cathode 5030 disposed on a cathode current collector 5040, with a first separator 5050*a*, a second separator 5050*b*, and a third separator 5050*c* disposed between the anode 5010 and the cathode 5030. The interlayer 5060*a* is disposed between the first separator 5050*a* and the second separator 5050*b* and the second interlayer 5060*b* is disposed between the second separator 5050*b* and the third separator 5050*c*. In some embodiments, the anode 5010, the anode current collector 5020, the cathode 5030, the cathode current collector 5040, the first separator 5050*a*, the second separator 5050*b*, the third separator 5050*c*, and the interlayers 5060 can be the same or substantially similar to the anode 3410, the anode current collector 3420, the cathode 3430, the cathode current collector 3440, the first separator 3450*a*, the second separator 3450*b*, the third separator 3450*c*, and the interlayers 3560, as described above with reference to FIG. 34. Thus, certain aspects of the anode 5010, the anode current collector 5020, the cathode 5030, the cathode current collector 5040, the first separator 5050a, the second separator 5050b, the third separator 5050 and the interlayers 5060 are not described in greater detail herein.

As shown, the electrochemical cell 5000 includes diodes $D_1$ and $D_2$, switch S and optional resistors $R_1$, $R_2$, $R_3$. The electrochemical cell 5000 includes charge diode capability. The diode $D_2$ can cause a voltage drop of the interlayer 5060a relative to the cathode 5030 equal to the forward voltage drop of the diode $D_2$. This voltage drop can be about 0.1, about 0.2, about 0.3, about 0.4, about 0.5, about 0.6, about 0.7, about 0.8, about 0.9, or about 1 times the full voltage difference between the cathode 5030 and the anode 5010, inclusive of all values and ranges therebetween. The diode $D_2$ can operate in forward breakdown, reverse breakdown, and/or any other topology. The diode $D_1$ can be selected for a specific forward or reverse voltage and can be placed for forward or reverse voltage and can be placed for forward or reverse breakdown voltage. During charge, when the switch S is open, the voltage of the interlayer 5060a and/or the interlayer 5060b can increase by the same value as the voltage drop across any of the diodes $D_1$, $D_2$ or the resistors $R_1$, $R_2$, $R_3$. In some embodiments, the switch S can bypass the function of the diodes $D_1$, $D_2$, creating a selective dendrite treatment mode or normal operation. In some embodiments, the switch $S_2$ can be replaced with a transistor, a MOSFET, a JFET, or any other devices used to bypass the function of the diodes $D_1$, $D_2$. In some embodiments, the resistances through each current flow path can be the same or substantially similar. In some embodiments, the resistances through each current flow path can be different from each other. In some embodiments, the resistance values can be from separate components, or they can represent other impedances inherent to the electrochemical cell 5000. In some embodiments, the functionality of the circuit can be the same or substantially similar to that of the electrochemical cell 3000, as described above with reference to FIG. 30. In some embodiments, the interlayers 5060 can be connected together as shown, or the interlayers 4960 can be connected to different circuit types as described above in other embodiments or other types of circuits used to set the voltage potential of the interlayers 4960.

Figure 51A:
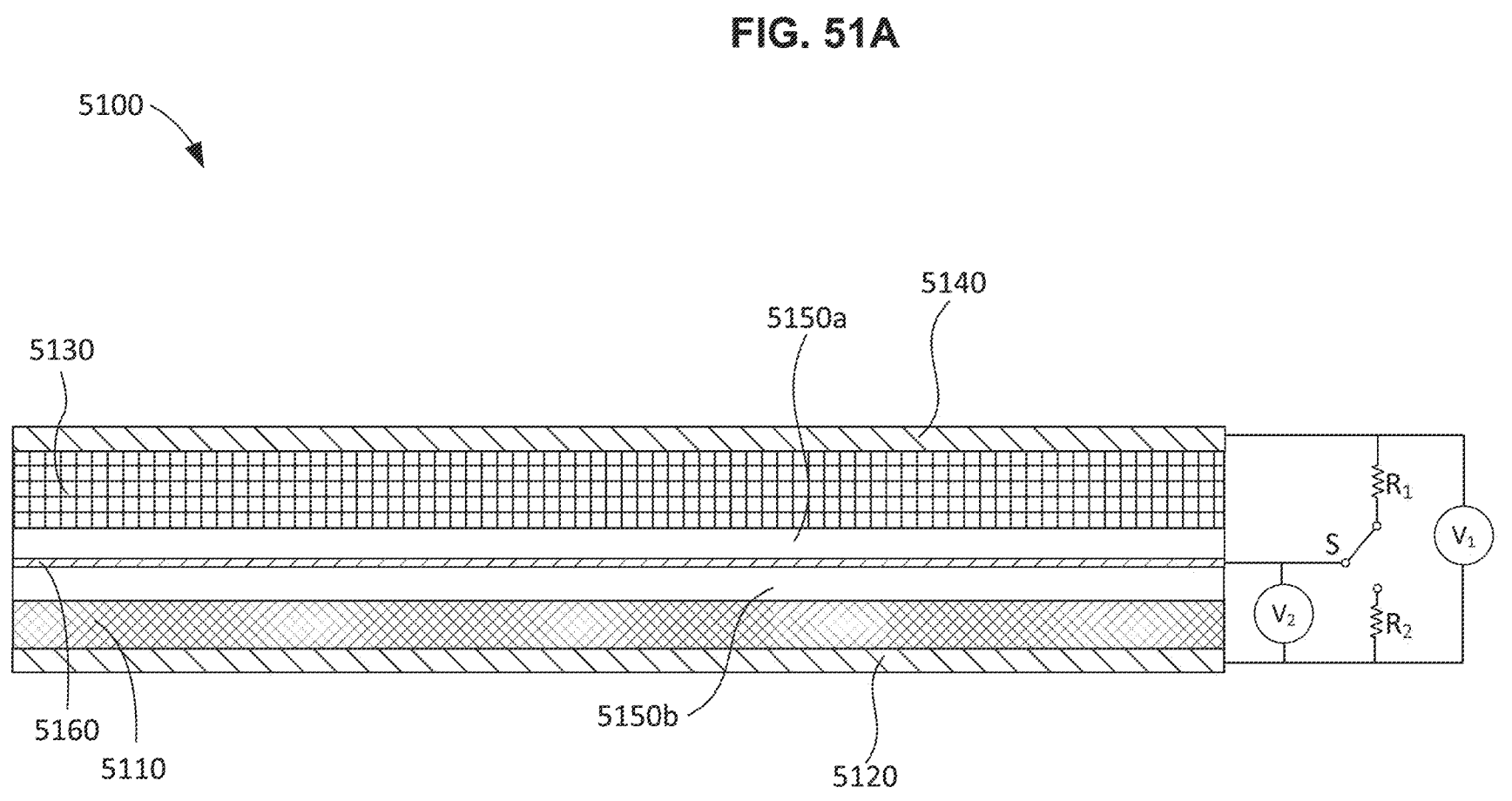
Figure 51B:
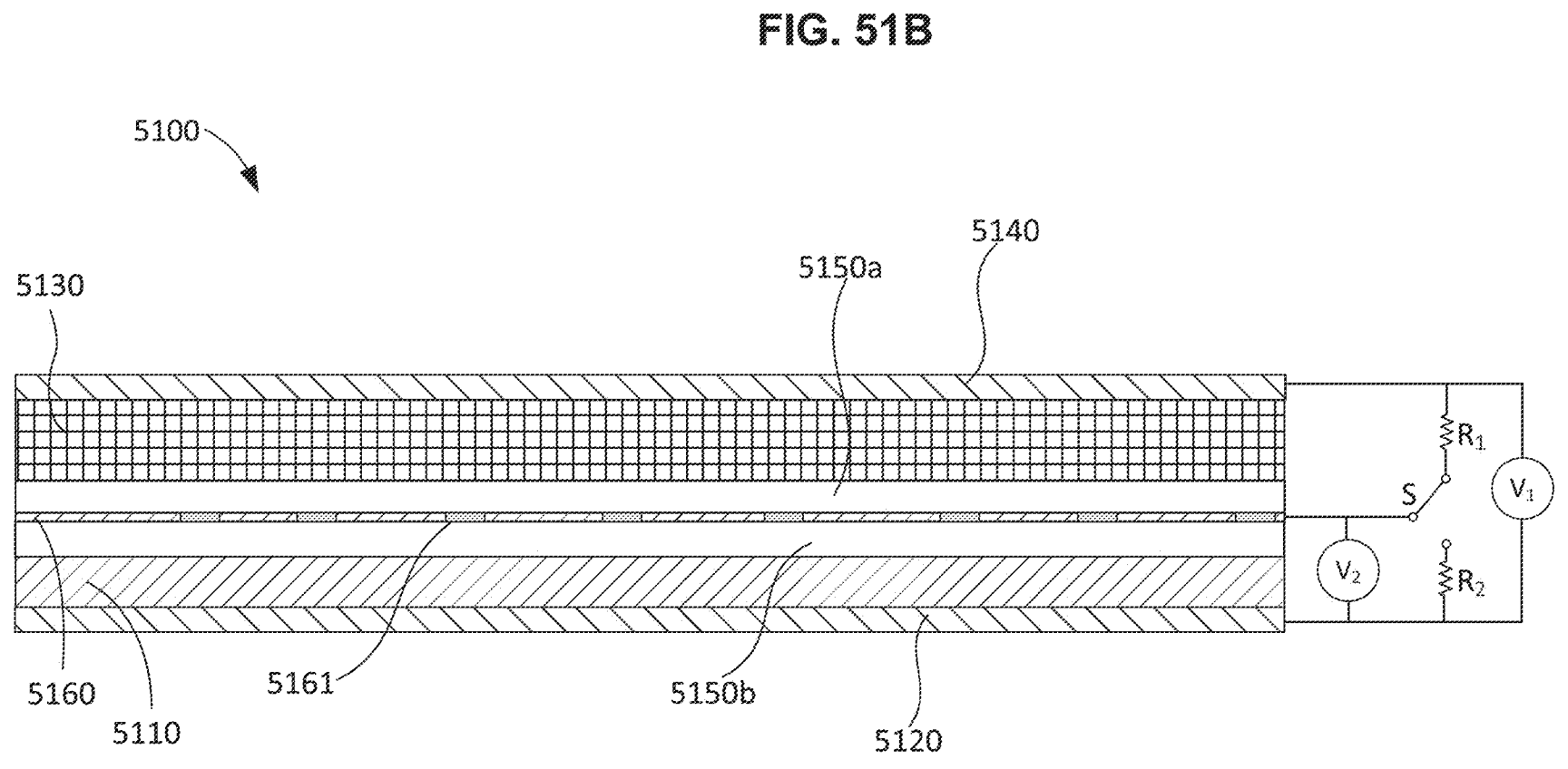
Figure 51C:
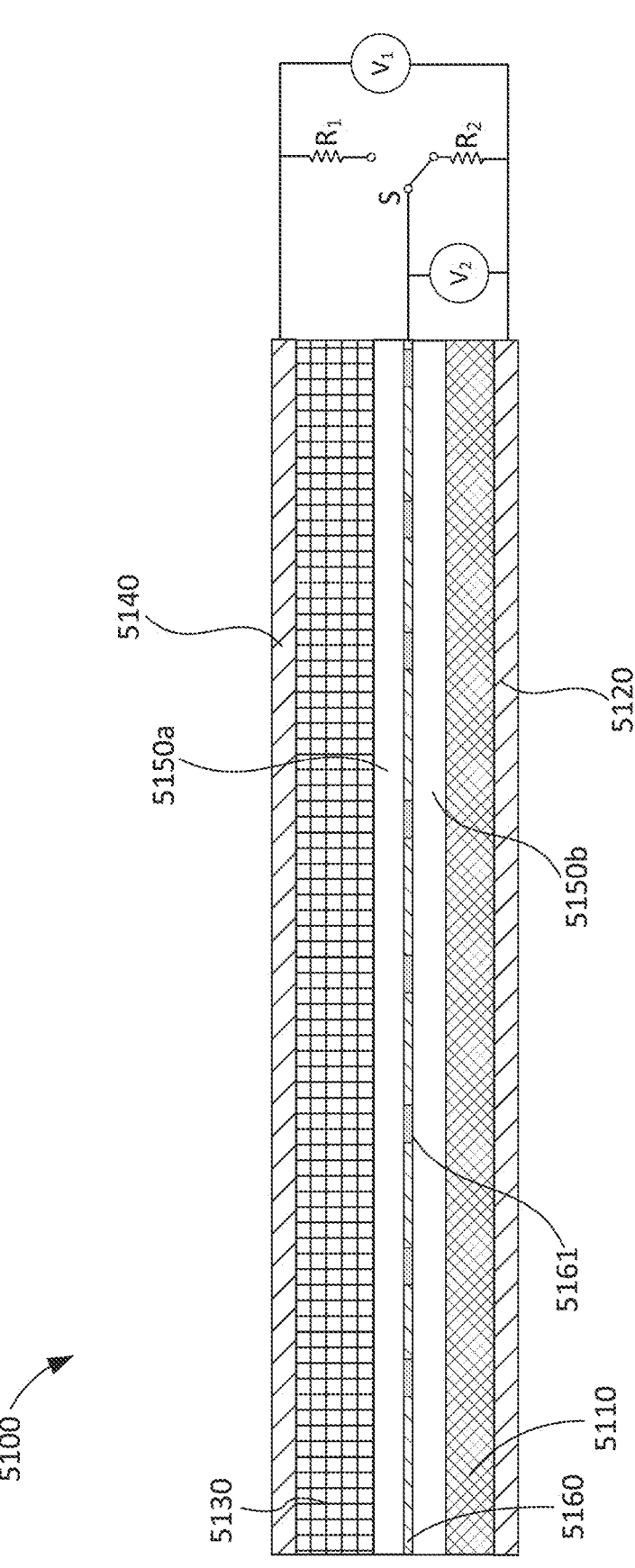

FIGS. 51A-51C are illustrations of a method of producing a prelithiated electrochemical cell 5100, according to an embodiment. As shown in FIG. 51A, the electrochemical cell 5100 includes an anode 5110 disposed on an anode current collector 5120, a cathode 5130 disposed on a cathode current collector 5140, with a first separator 5150a and a second separator 5150b disposed between the anode 5110 and the cathode 5130. The interlayer 5160 is disposed between the first separator 5150a and the second separator 5150b. In some embodiments, the anode 5110, the anode current collector 5120, the cathode 5130, the cathode current collector 5140, the first separator 5150a, the second separator 5150b, and the interlayer 5160 can be the same or substantially similar to the anode 210, the anode current collector 220, the cathode 230, the cathode current collector 240, the first separator 250a, the second separator 250b, and the interlayer 260, as described above with reference to FIGS. 2A-2B. Thus, certain aspects of the anode 5110, the anode current collector 5120, the cathode 5130, the cathode current collector 5140, the first separator 5150a, the second separator 5150b, and the interlayer 5160 are not described in greater detail herein.

As shown in FIG. 51A, a voltage $V_1$ is measured between the anode current collector 5120 and the cathode current collector 5140 and a voltage $V_2$ is measured between the anode current collector 5120 and the interlayer 5160. As shown in FIG. 51A, a switch S is placed on a circuit and joins the interlayer 5160 to the cathode current collector 5140 and to the anode current collector 5120 (with optional resistors $R_1$, $R_2$). The cathode 5130 includes a lithium-rich cathode material (i.e., a cathode material that includes a greater stoichiometric amount of lithium than the anode). The cathode material can produce a lithium-rich salt (i.e., if the cathode material has multiple lithium atoms per ionic compound). In some embodiments, the cathode material can include $Li_3N$, $Li_2O$, $Li_3PO_4$, $Li_2S$, or any combination thereof.

During initial cycling and gas formation depicted in FIG. 51A, current is passed from the cathode current collector 5140 to the interlayer 5160. In other words, a short circuit is formed between the cathode 5130 and the interlayer 5160. This forms lithium plating 5161 on the interlayer 5160, due to migration of lithium ions from the cathode current collector 5140 to the interlayer 5160 (as shown in FIG. 51B). In some embodiments, the current passing from the cathode current collector 5140 to the interlayer 5160 can increase the voltage of the interlayer 5160a relative to the cathode current collector 5140 to about 0.5 V, about 1 V, about 1.5 V, about 2 V, about 2.5 V, about 3 V, about 3.5 V, about 4 V, about 4.5 V, about 5 V, about 5.5 V, or about 6 V, inclusive of all values and ranges therebetween. The short circuit between the cathode current collector 5140 and the interlayer 5160 aids in formation of a solid-electrolyte interphase (SEI) layer on particles in the interlayer 5160. This stabilizes the interlayer 5160, and makes the interlayer 5160 more effective in limiting the growth of dendrites through the interlayer 5160. This prevents short circuiting during the operation of the electrochemical cell.

FIG. 51C shows the switch S configured such that current can pass between the interlayer 5160 and the anode current collector 5120. This can aid in balancing the SOC between the interlayer 5160 and the anode 5110. This balancing can improve stability during operation or dendrite detection. This also helps prevent the interlayer 5160 from becoming lithium reactive. In some embodiments, the interlayer 5160 can include a mesh. In some embodiments, a tab (e.g., a weld tab) can be connected to the mesh of the interlayer 5160.

Figure 52A:
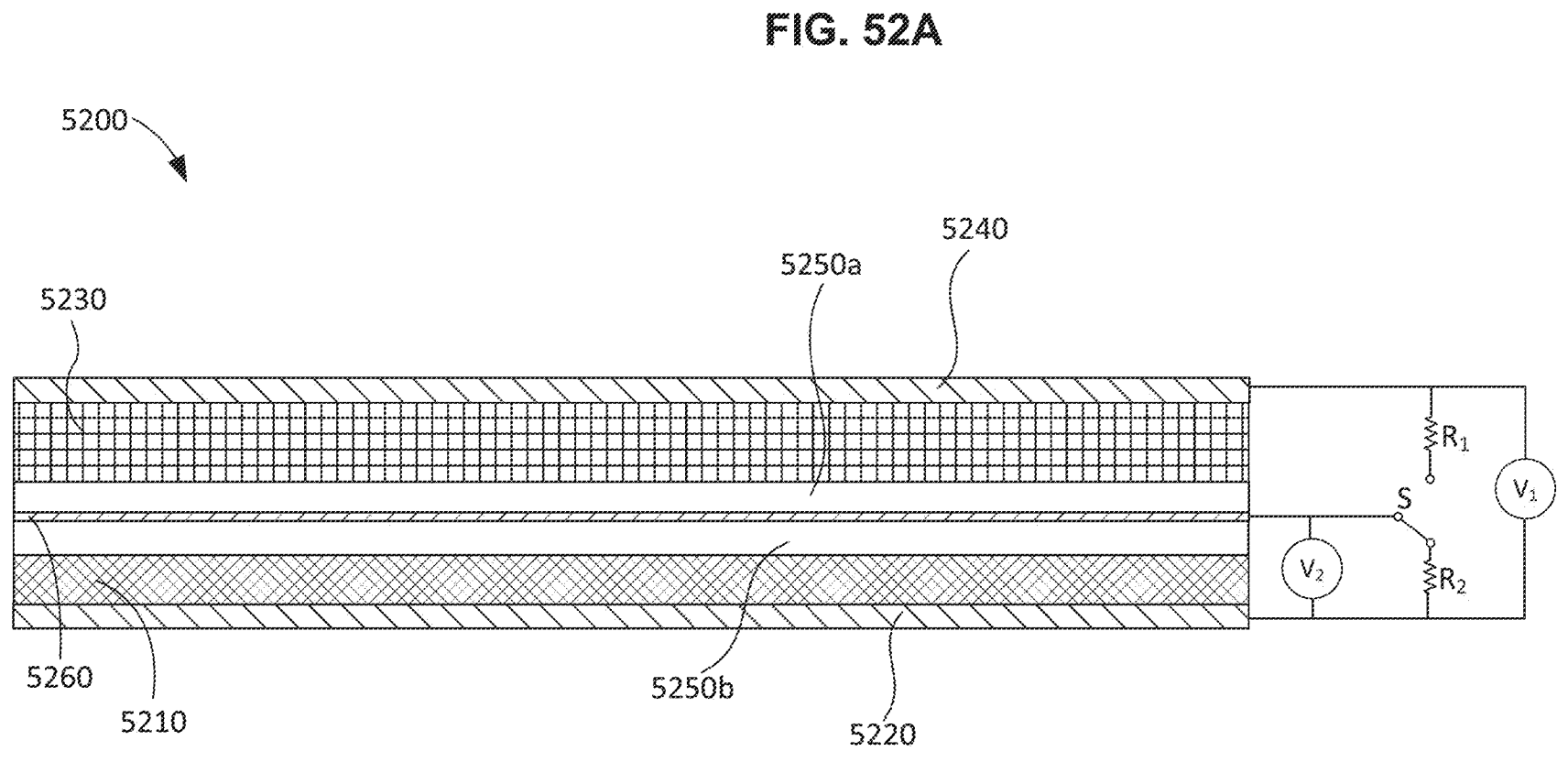
Figure 52B:
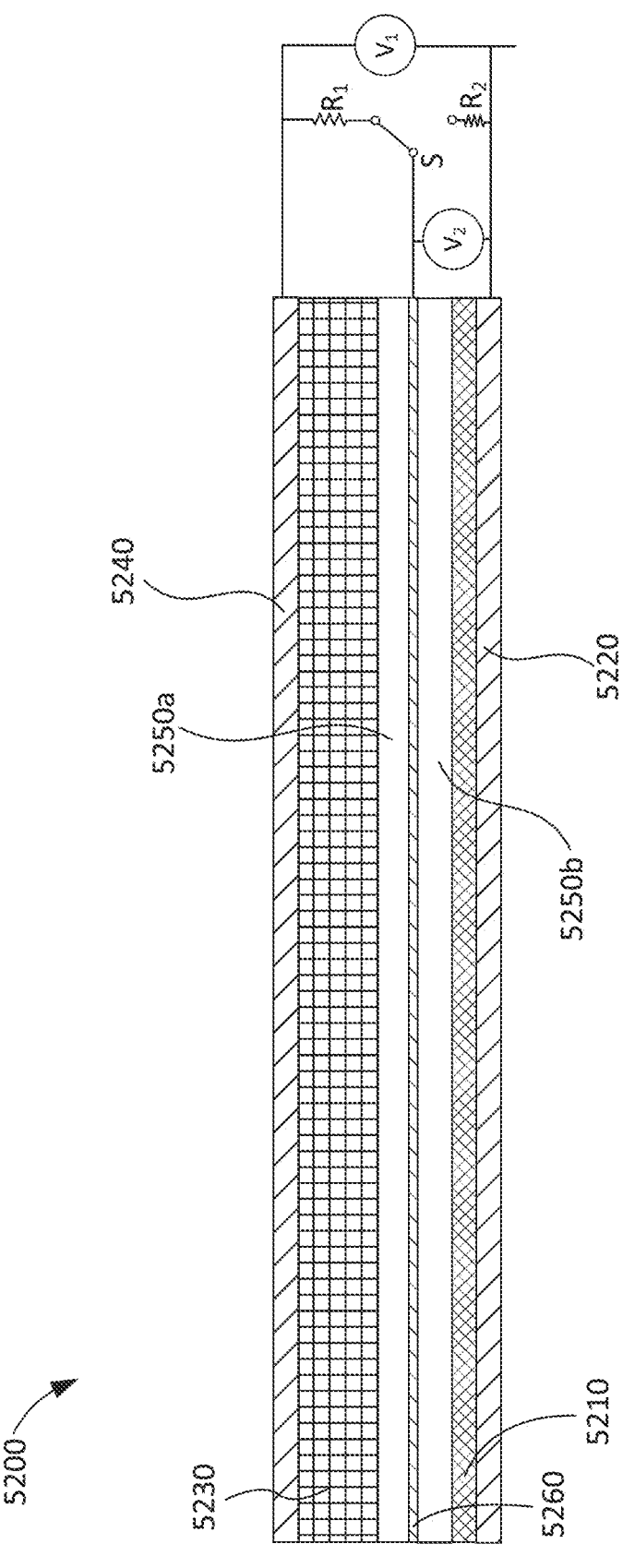
Figure 52C:
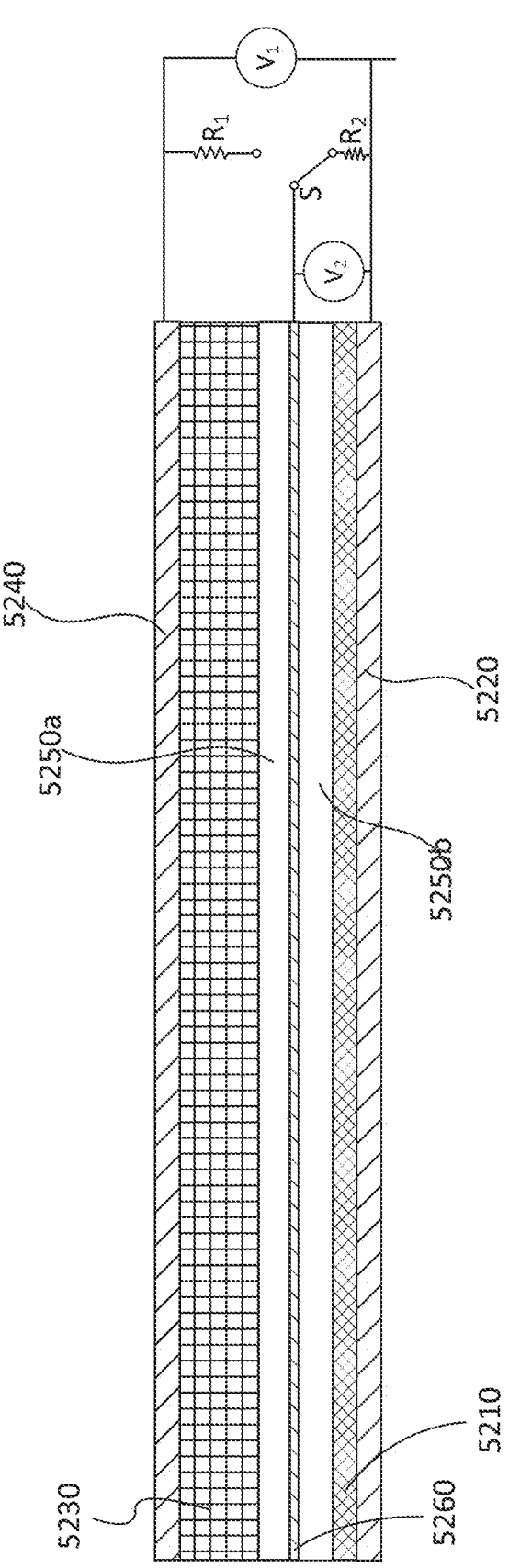

FIGS. 52A-52C are illustrations of a method of producing a prelithiated electrochemical cell 5200, according to an embodiment. As shown in FIG. 52A, the electrochemical cell 5200 includes an anode 5210 disposed on an anode current collector 5220, a cathode 5230 disposed on a cathode current collector 5240, with a first separator 5250a and a second separator 5250b disposed between the anode 5210 and the cathode 5230. The interlayer 5260 is disposed between the first separator 5250a and the second separator 5250b. In some embodiments, the anode 5210, the anode current collector 5220, the cathode 5230, the cathode current collector 5240, the first separator 5250a, the second separator 5250b, and the interlayer 5260 can be the same or substantially similar to the anode 5110, the anode current collector 5120, the cathode 5130, the cathode current collector 5140, the first separator 5150a, the second separator 5150b, and the interlayer 5160, as described above with reference to FIGS. 51A-51C. Thus, certain aspects of the anode 5210, the anode current collector 5220, the cathode 5230, the cathode current collector 5240, the first separator 5250a, the second separator 5250b, and the interlayer 5260 are not described in greater detail herein.

As shown in FIG. 52A, a voltage $V_1$ is measured between the anode current collector 5220 and the cathode current collector 5240 and a voltage $V_2$ is measured between the anode current collector 5220 and the interlayer 5260. As shown in FIG. 52A, a switch S is placed on a circuit and joins the interlayer 5260 to the anode current collector 5220 and to the anode current collector 5120 (with optional resistors $R_1$, $R_2$). In other words, a short circuit is formed between the anode 5210 and the interlayer 5260. The anode 5210 includes lithium. In some embodiments, the anode 5210 can include lithium metal. In some embodiments, the anode 5210 can include lithium intercalated into graphite.

While the anode 5210 is electrically connected to the interlayer 5260, lithium ions and electrons pass from the anode 5210 to the interlayer 5260. As shown, in FIG. 52B, the anode 5210 has reduced in size. This is due to the migration of lithium ions to the interlayer. In some embodiments, the migration of lithium ions from the anode 5210 to the interlayer 5260 can reduce the mass of the anode 5210 by about 50%, about 60%, about 70%, about 80%, about 90%, or about 100%, inclusive of all values and ranges therebetween. In some embodiments, all or substantially all of the mass of the anode 5210 can be depleted by the migration of the lithium ions.

In FIG. 52B, the switch S is switched to form a short circuit between the interlayer 5260 and the cathode 5230. This aids in SEI growth and stabilization on the particles in the interlayer 5260 and gas generation. In FIG. 52C, the switch S is switched back to a position to form a short circuit between the interlayer 5260 and the anode 5210. This can aid in balancing the state of charge between the interlayer 5260 and the anode 5210.

In some embodiments, the sequence depicted in FIGS. 51A-51C and the sequence depicted in FIGS. 52A-52C can be executed in tandem. In other words, lithium from both the anode and the cathode can be used to plate the interlayer. In some embodiments, either of the electrochemical cells described herein can be subject to hipot testing. In some embodiments, the hipot testing can include driving a thin conductive rod through an anode tab, a cathode tab, and a tab electrically connected to the interlayer. A high voltage is then applied across the rod. A stably formed SEI layer in the interlayer can aid in preventing any component failures in the electrochemical cell. In some embodiments, the voltage can be about 5V, about 6V, about 7V, about 8V, about 9V, or about 10V, inclusive of all values and ranges therebetween.

Figure 53:
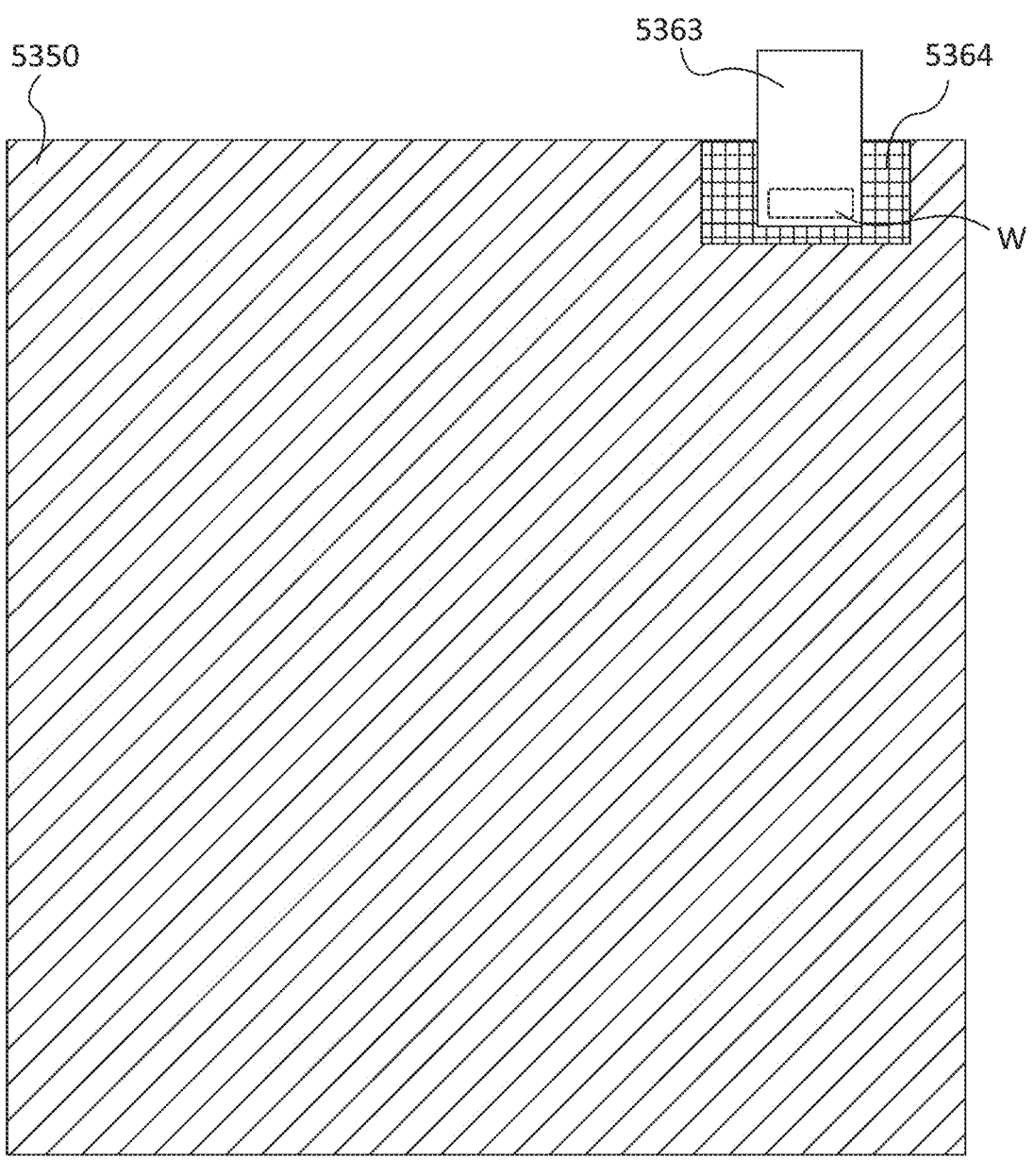
FIG. 53 is an illustration of a tab welding scheme to a separator, according to an embodiment.

FIG. 53 is an illustration of a tab welding scheme to a separator 5350, according to an embodiment. As shown, the separator 5350 is a carbon-coated separator. In some embodiments, the carbon coating on the separator can include CNT, CNF, carbon black, and/or graphene. The carbon-coating surface of the separator 5350 can contact an interlayer (not shown). The interlayer can be the same or substantially similar to any of the aforementioned interlayers. A metal section 5364 is coupled to the separator 5350 and contacts the carbon coating. In some embodiments, the metal section 5364 can include a folded metal foil. The folded metal foil can support the welding process. In some embodiments, the folded metal foil can be composed of aluminum, copper, and/or any other suitable material. In some embodiments, the metal section 5364 can include a sputtered metal. The sputtered metal can act as a substrate for welding of the tab 5363.

A tab 5363 is welded to the metal section 5364 via a weld area W. In some embodiments, the welding can be via ultrasonic welding. In some embodiments, the tab 5363 can be a mesh tab. The mesh tab can be light to avoid the tear of welding on the separator 5350. In some embodiments, the tab 5363 can include PE or a conductive polymer to be heat treated and then laminated to an interlayer. In some embodiments, the tab 5363 can be laminated to the separator 5350. In some embodiments, the tab 5363 can be stitched to the interlayer via a wire or thread, including metal wire, polyamide thread, polyester thread, or other polymer based material. In some embodiments, a male/female pinch can be used and a bolt can be tightened to fix the tab 5363 to the separator 5350.

Figure 54:
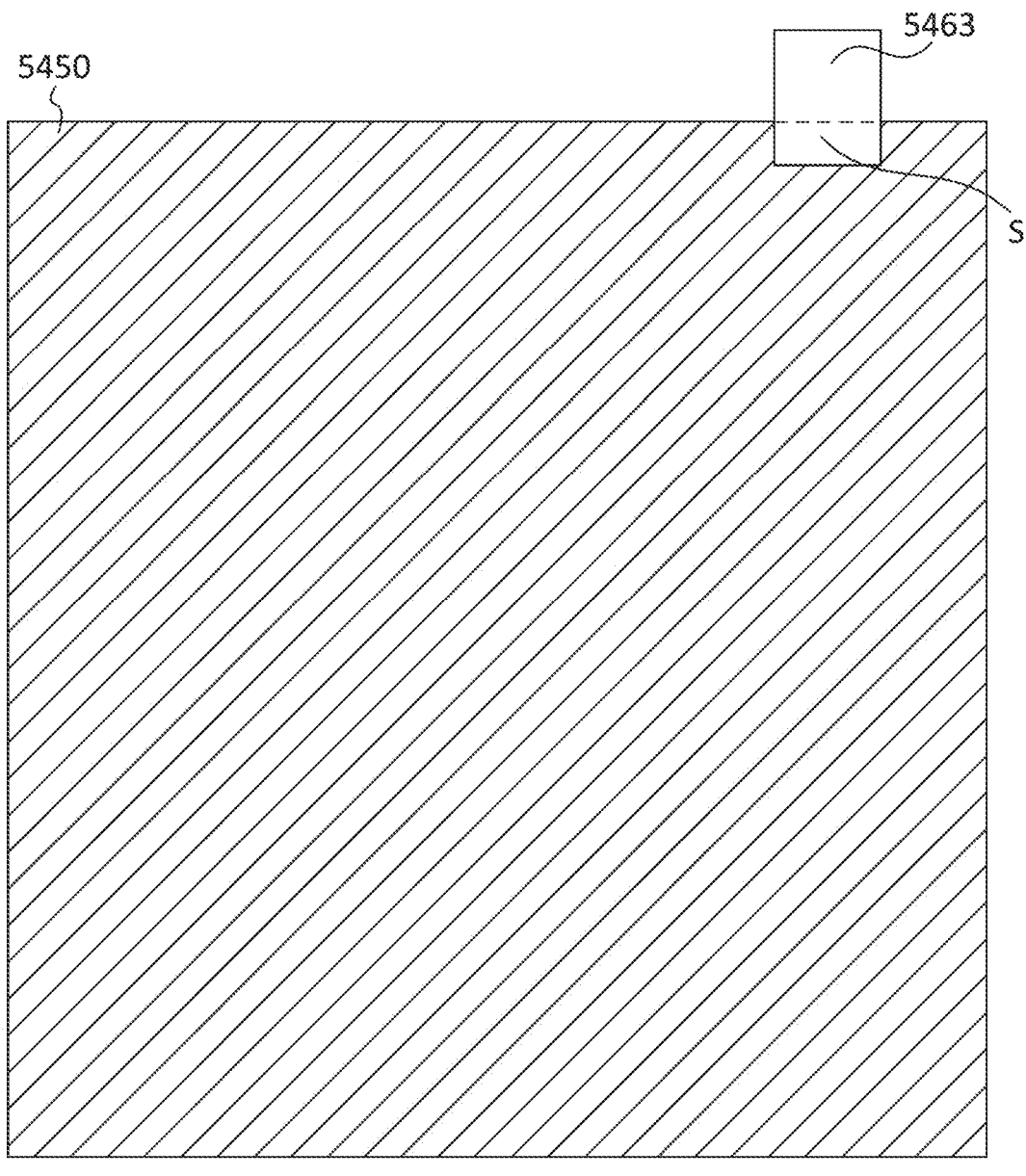
FIG. 54 is an illustration of a tab welding scheme to a separator, according to an embodiment.

FIG. 54 is an illustration of a tab welding scheme to a separator 5450, according to an embodiment. As shown, a tab 5463 is appended to the separator 5450 via a sealing area S. In some embodiments, the separator 5450 and the tab 5463 can be the same or substantially similar to the separator 5350 and the tab 5363, as described above with reference to FIG. 53. Thus, certain aspects of the separator 5450 and the tab 5463 are not described in greater detail herein. The separator 5450 can be carbon coated. In some embodiments, the tab 5463 can be coupled to the separator via an adhesive. In some embodiments, the adhesive can include a conductive adhesive. If the adhesive dissolves over time, an externally applied pressure can keep the tab 5463 in place long term. In other words, in some embodiments, the adhesive can be used to keep the tab in place only during assembly. In some embodiments, the tab 5463 can be soldered to the separator 5450.

Figure 55:
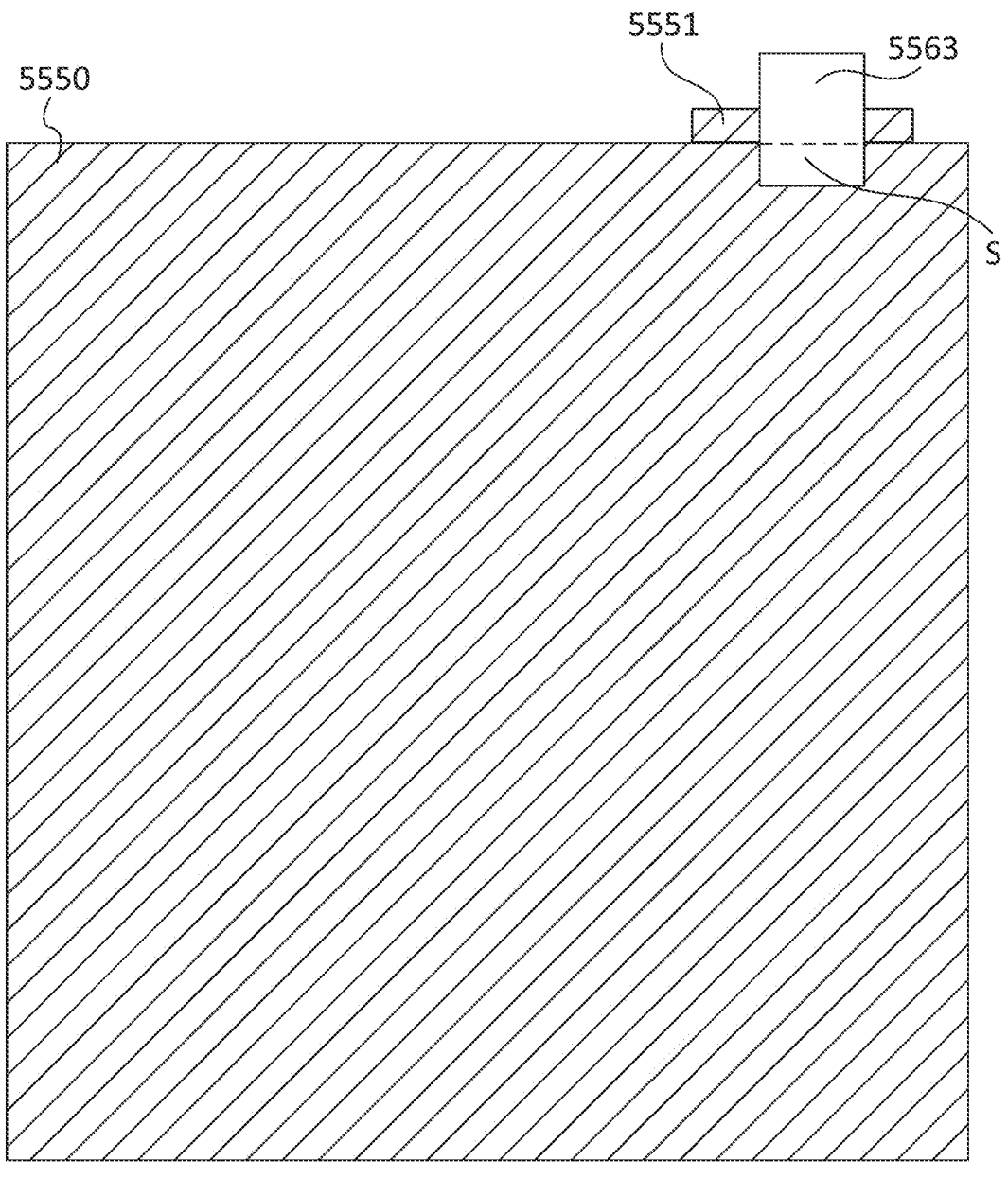
FIG. 55 is an illustration of a tab welding scheme to a separator, according to an embodiment.

FIG. 55 is an illustration of a tab welding scheme to a separator 5550, according to an embodiment. As shown, a tab 5563 is appended to the separator 5550 via a sealing area S. In some embodiments, the separator 5550 and the tab 5563 can be the same or substantially similar to the separator 5350 and the tab 5363, as described above with reference to FIG. 53. Thus, certain aspects of the separator 5550 and the tab 5563 are not described in greater detail herein. As shown, the separator 5550 includes an extension 5551, which provides additional surface for sealing or welding. The extension 5551 is also carbon coated.

Figure 56:
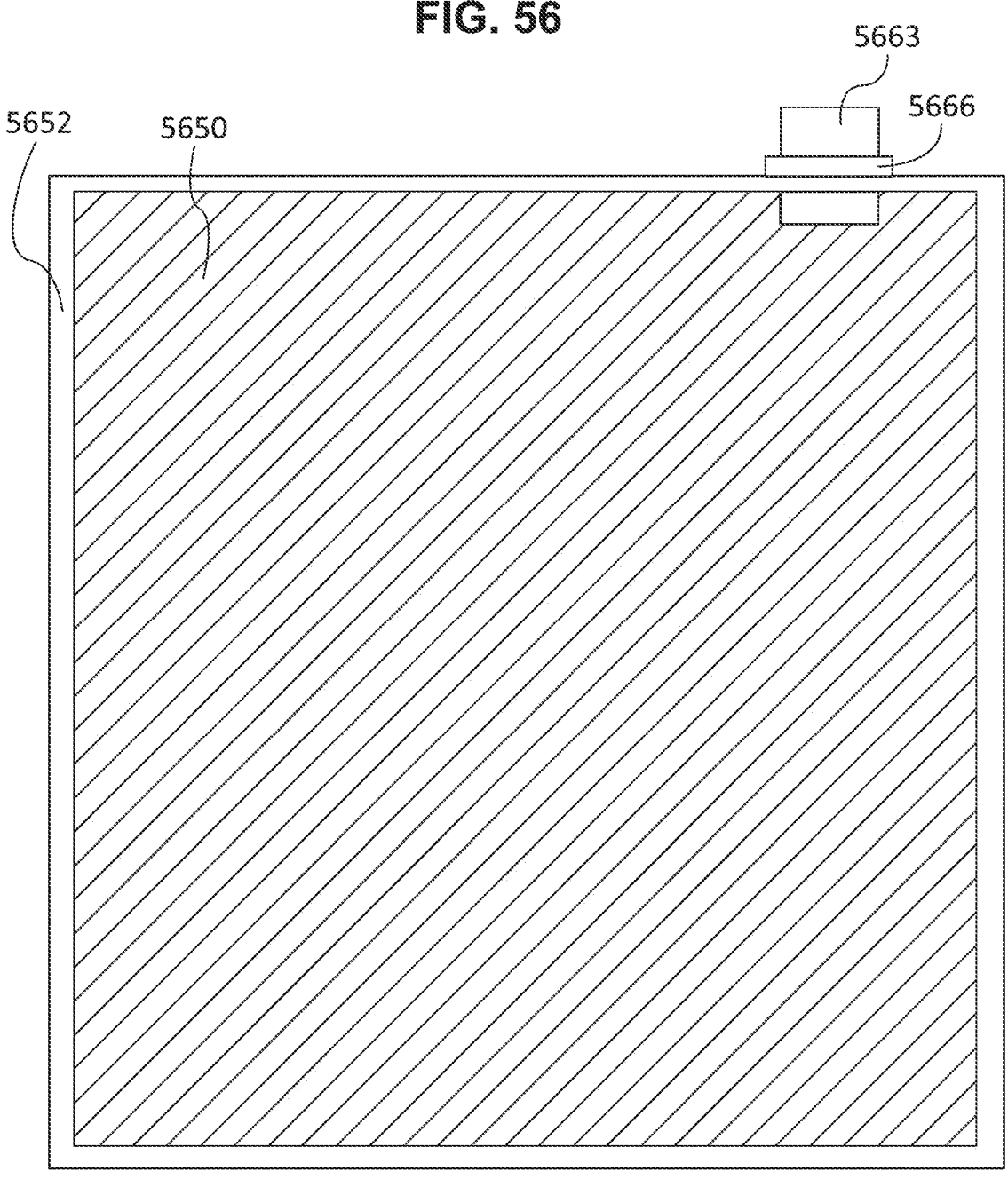
FIG. 56 is an illustration of a tab welding scheme to a separator, according to an embodiment.

FIG. 56 is an illustration of a tab welding scheme to a separator 5650, according to an embodiment. As shown, a tab 5663 is appended to the separator 5650 via a double-sided tape 5666 and a heat seal. In some embodiments, the separator 5650 and the tab 5663 can be the same or substantially similar to the separator 5350 and the tab 5363, as described above with reference to FIG. 53. Thus, certain aspects of the separator 5650 and the tab 5663 are not described in greater detail herein. During production, the heat seal is applied to the double-sided tape 5666 and around the perimeter of the separator 5650. A sealing region 5652 forms, around the perimeter of the separator 5650. The double-sided tape 5666 melts during the sealing process. The tab is aligned so the double-sided tape 5666 is in the sealing region 5652.

Figure 57:
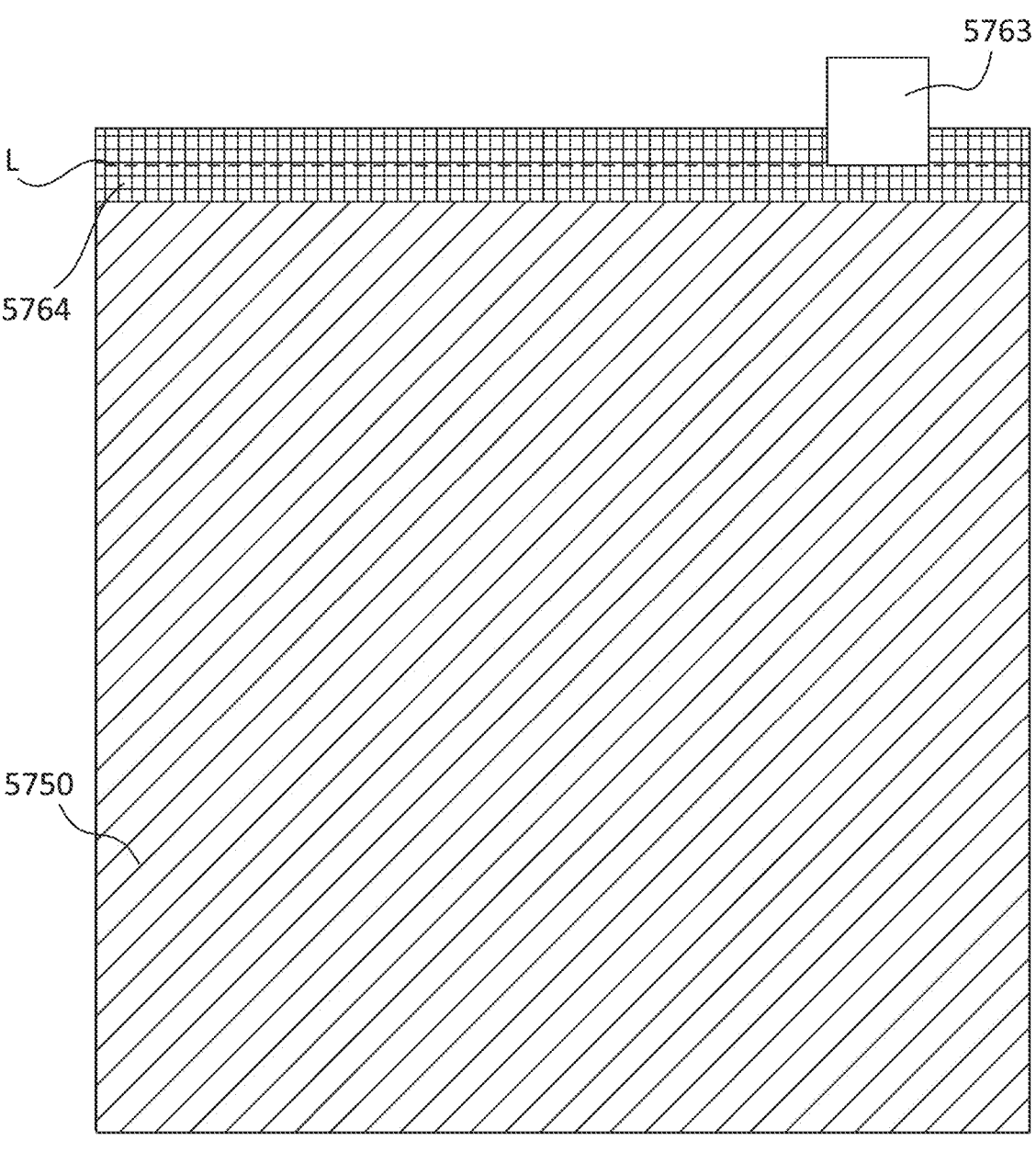
FIG. 57 is an illustration of a tab welding scheme to a separator, according to an embodiment.

FIG. 57 is an illustration of a tab welding scheme to a separator 5650, according to an embodiment. As shown, a tab 5763 is appended to a metal foil strip 5764, which is coupled to the separator 5750. The carbon coating coats the separator 5650 up to a line L. In other words, the carbon coating overlaps with the metal foil strip 5764, but does not cover the metal foil strip 5764. In some embodiments, the separator 5750 and the tab 5763 can be the same or substantially similar to the separator 5350 and the tab 5363, as described above with reference to FIG. 53. Thus, certain aspects of the separator 5750 and the tab 5763 are not described in greater detail herein. The tab 5763 is welded to the metal foil strip 5764.

Figure 58:
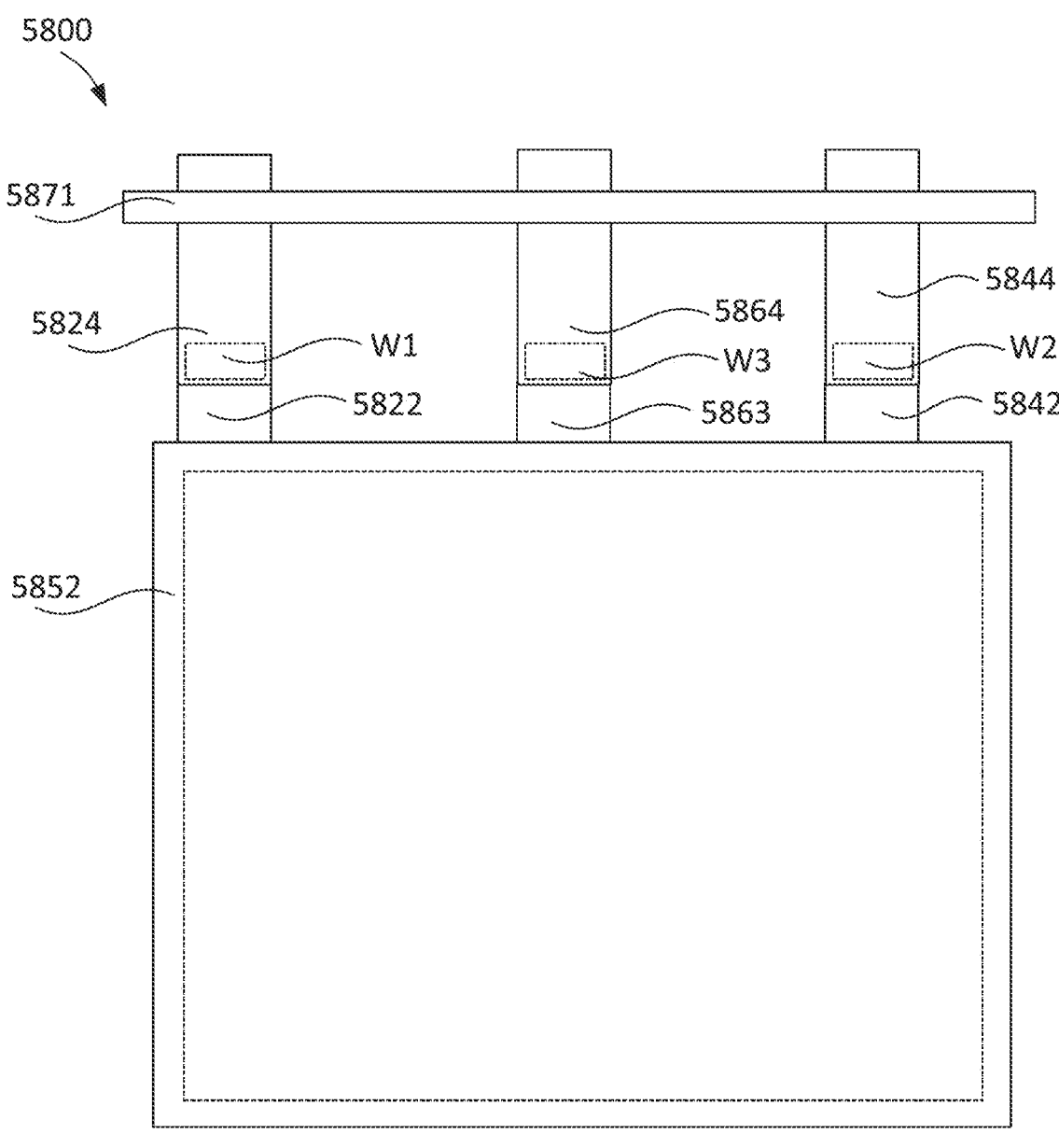
FIG. 58 is an illustration of an electrochemical cell with a tab sealing scheme, according to an embodiment.

FIG. 58 is an illustration of an electrochemical cell 5800 with a tab sealing scheme, according to an embodiment. Not shown in FIG. 58 are the anode, anode current collector, cathode, cathode current collector, and separator of the electrochemical cell. These components can have any of the properties of the cells described in the aforementioned embodiments. An anode tab 5822, a cathode tab 5842, and an interlayer tab 5863 each extend outward from their respective electrodes and/or current collectors and are held in place via a unit cell sealing region 5852. An anode tab extender 5824 is welded to the anode tab 5822 via welding region W1. A cathode tab extender 5844 is welded to the cathode tab 5842 via welding region W2. An interlayer tab extender 5864 is welded to the interlayer tab 5862 via welding region W3. A pouch heat sealing region 5871 is depicted as sealing the anode tab extender 5824, the cathode tab extender 5844, and the interlayer tab extender 5864 in place. The pouch heat sealing region 5871 is part of a pouch (e.g., an aluminized pouch that houses multiple unit cells.

In some embodiments, the interlayer tab 5863 can extend from a coupling to a carbon coated separator, as depicted in FIGS. 53-56. In some embodiments, the interlayer tab 5863 can include a thin foil tab. In some embodiments, the interlayer tab 5863, the anode tab 5822, and the cathode tab 5842 can include thin metal tabs and the interlayer tab extender 5864, the anode tab extender 5824, and the cathode tab extender 5844 can be thicker and more robust tabs that protrude through the pouch. This scheme can be employed in cells with a single interlayer as well as cells with multiple interlayers. In some embodiments, the separator can include a carbon-coated area that extends outside of the heat-sealed unit cell area. This can ease the attachment of the interlayer tab 5863 and/or the interlayer tab extender 5864 to the separator during manufacture.

Figure 59A:
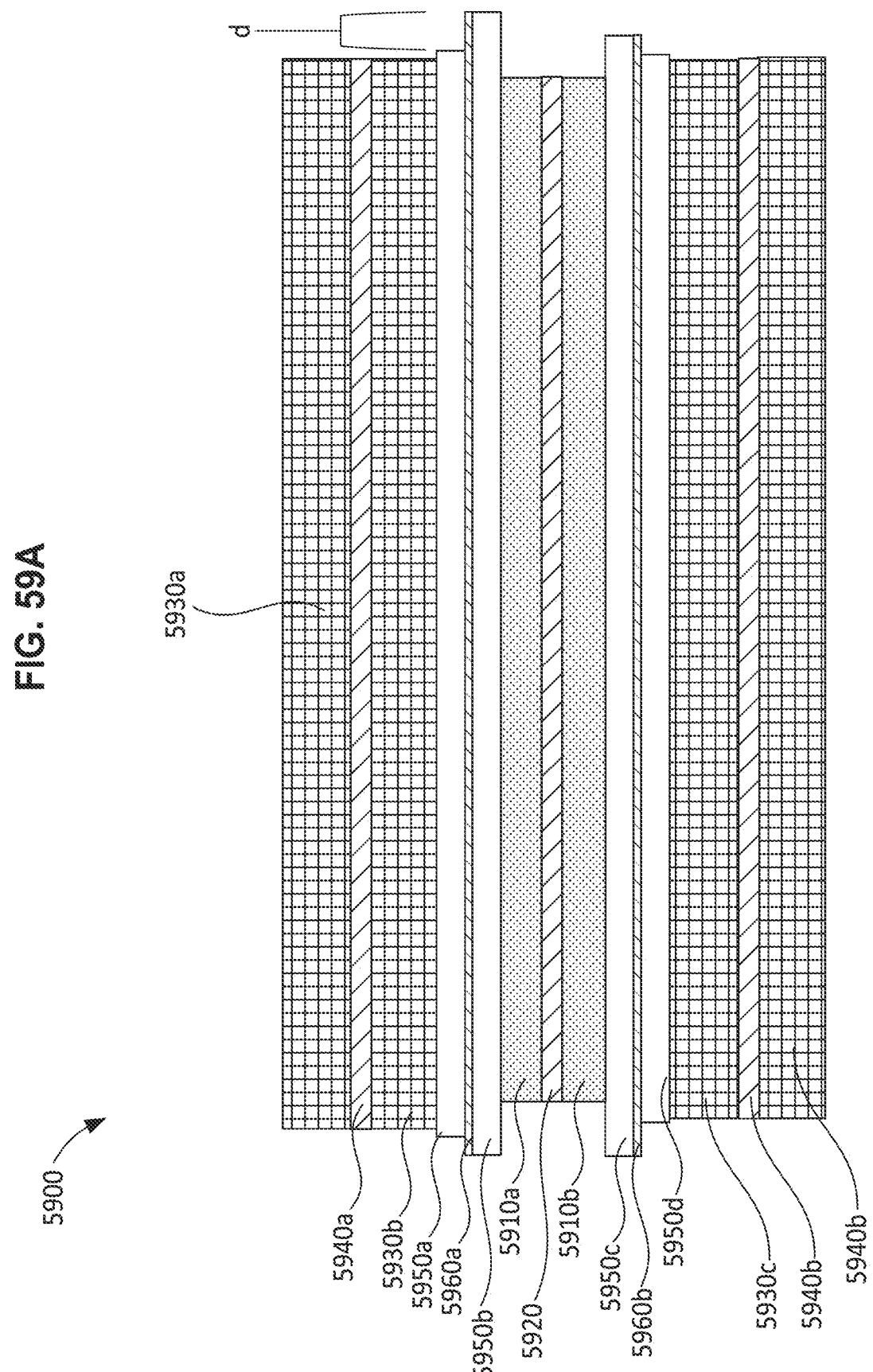
Figure 59B:
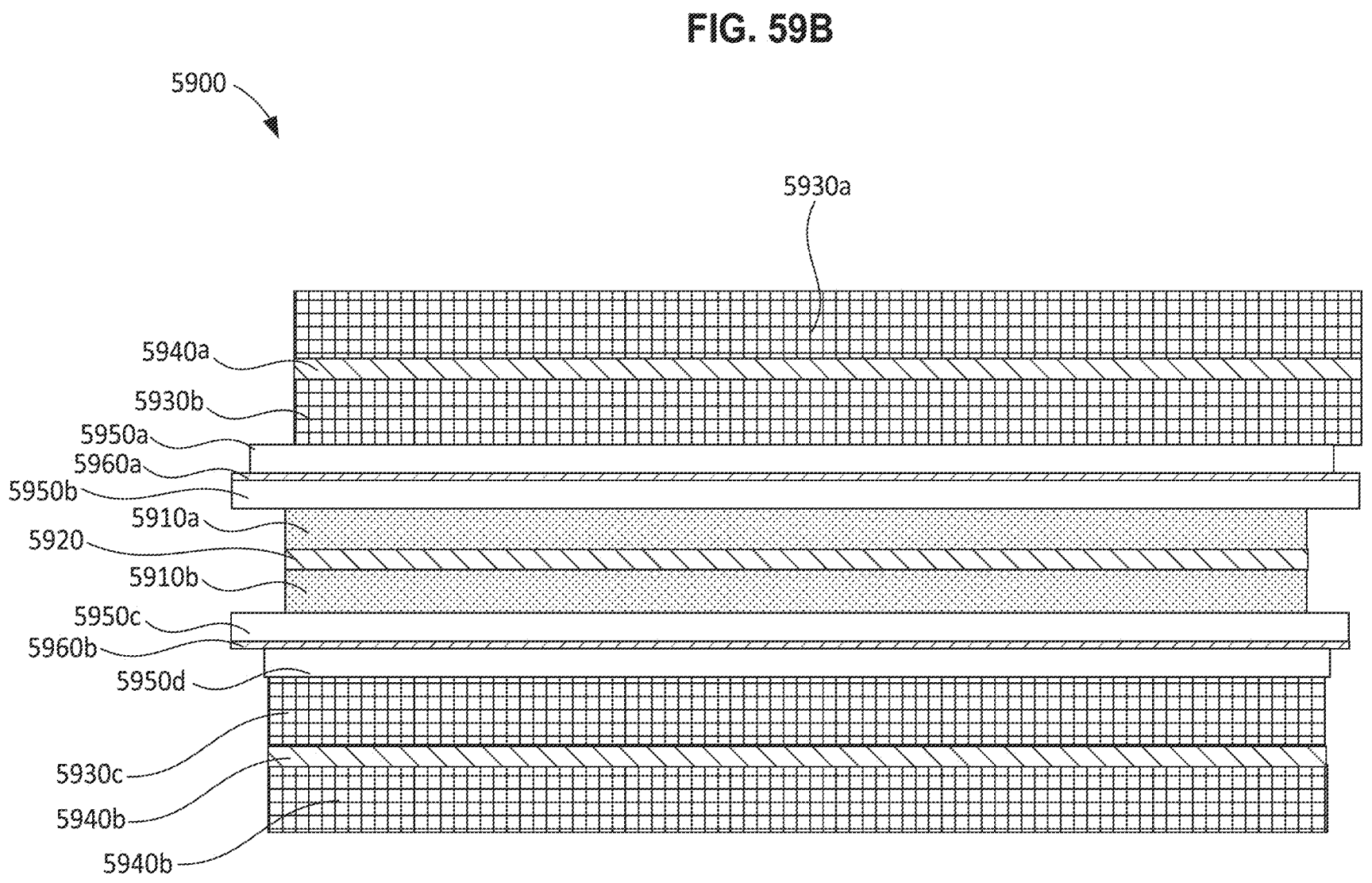
Figure 59C:
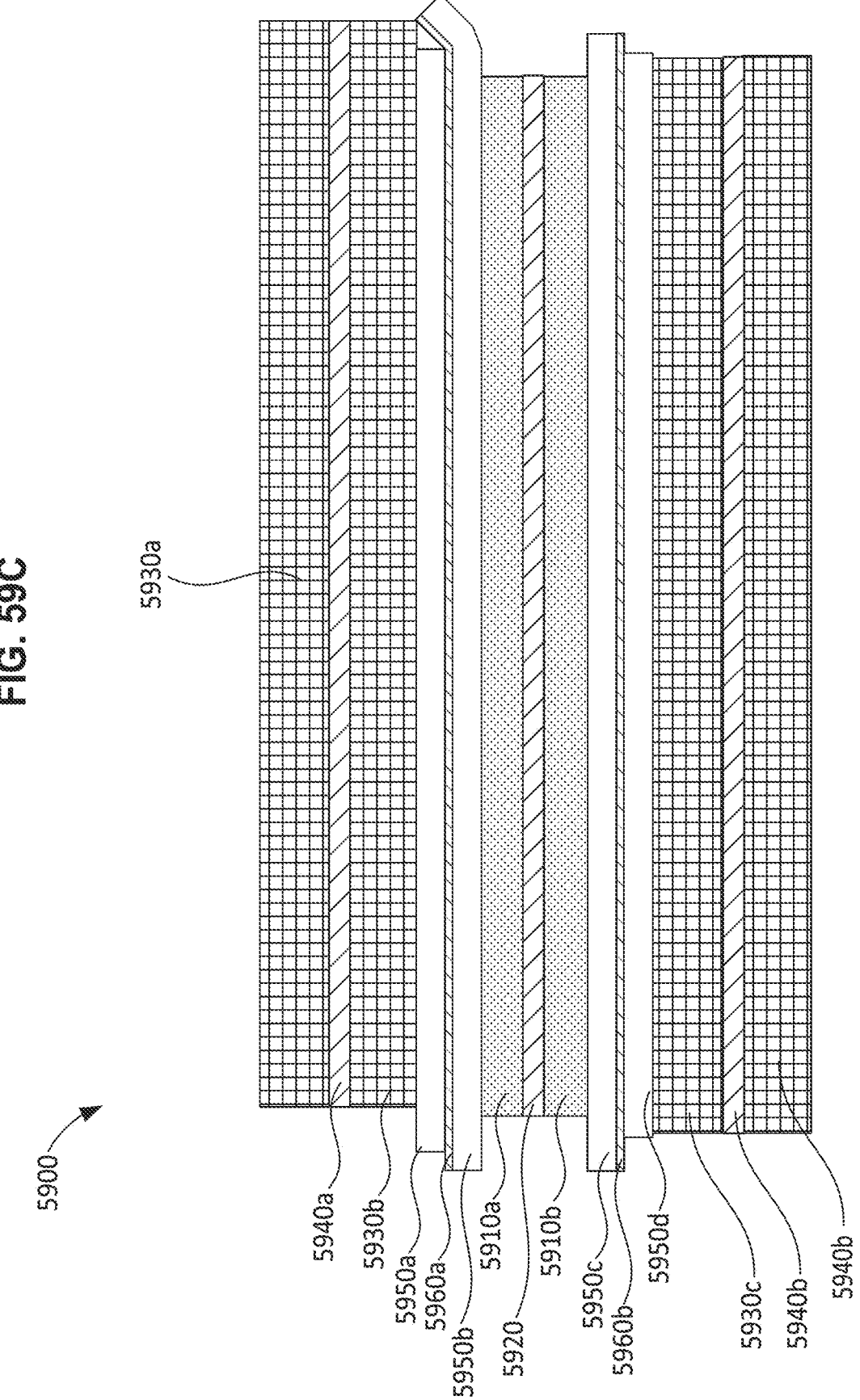

FIGS. 59A-59C are illustrations of an electrochemical cell stack 5900 with multiple interlayers 5960*a*, 5960*b* (collectively referred to as interlayers 5960), according to an embodiment. As shown, the electrochemical cell stack 5900 includes an anodes 5910*a*, 5910*b* (collectively referred to as anodes 5910) disposed on an anode current collectors 5920, cathodes 5930*a*, 5930*b*, 5930*c*, 5950*d* (collectively referred to as cathodes 5930) disposed on cathode current collectors 5940*a*, 5940*b* (collectively referred to as cathode current collectors 5940), with a first separator 5950*a* and a second separator 5950*b* disposed between the anode 5910*a* and the cathode 5930*b* and a third separator 5950*c* and a fourth separator 5950*d* disposed between the anode 5910*b* and the cathode 5930*c*. The interlayer 5960*a* is disposed between the first separator 5950*a* and the second separator 5950*b* and the interlayer 5960*b* is disposed between the third separator 5950*c* and the fourth separator 5950*d*. In some embodiments, the anodes 5910, the anode current collector 5920, the cathodes 5930, the cathode current collectors 5940, the first separator 5950*a*, the second separator 5950*b*, the third separator 5950*c*, the fourth separator 5950*c* and the interlayer 5960 can be the same or substantially similar to the anode 210, the anode current collector 220, the cathode 230, the cathode current collector 240, the first separator 250*a*, the second separator 250*b*, and the interlayer 260, as described above with reference to FIGS. 2A-2B. Thus, certain aspects of the anodes 5910, the anode current collector 5920, the cathodes 5930, the cathode current collectors 5940, the first separator 5950*a*, the second separator 5950*b*, the third separator 5950*c*, the fourth separator 5950*c* and the interlayer 5960 are not described in greater detail herein.

As shown in FIG. 59A, the interlayer 5960*a* and the second separator 5950*b* extend beyond the separator 5950*a* by a distance d. This offset aids in detecting misalignment between the anodes 5910 and the cathodes 5930. As shown, in FIG. 59B, the anode 5910*a* has become misaligned with the cathode 5930*b*. In FIG. 59C, the interlayer 5960*a* and the separator 5950*b* bend toward the cathode 5930*b*, such that the interlayer 5960*a* contacts the cathode 5930*b*. This creates a short circuit between the cathode 5930*b* and the interlayer 5960*a*. This misalignment would be detected by way of a zero voltage or a significantly reduced voltage difference between the interlayer 5960*a* and the cathode 5930*b*.

In some embodiments, the distance d can be at least about 50 μm, at least about 100 μm, at least about 200 μm, at least about 300 μm, at least about 400 μm, at least about 500 μm, at least about 600 μm, at least about 700 μm, at least about 800 μm, at least about 900 μm, at least about 1 mm, at least about 1.1 mm, at least about 1.2 mm, at least about 1.3 mm, at least about 1.4 mm, at least about 1.5 mm, at least about 1.6 mm, at least about 1.7 mm, at least about 1.8 mm, or at least about 1.9 mm. In some embodiments, the distance d can be no more than about 2 mm, no more than about 1.9 mm, no more than about 1.8 mm, no more than about 1.7 mm, no more than about 1.6 mm, no more than about 1.5 mm, no more than about 1.4 mm, no more than about 1.3 mm, no more than about 1.2 mm, no more than about 1.1 mm, no more than about 1 mm, no more than about 900 μm, no more than about 800 μm, no more than about 700 μm, no more than about 600 μm, no more than about 500 μm, no more than about 400 μm, no more than about 300 μm, no more than about 200 μm, or no more than about 100 μm. Combinations of the above-referenced distances d are also possible (e.g., at least about 50 μm and no more than about 2 mm or at least about 100 μm and no more than about 1 mm), inclusive of all values and ranges therebetween. In some embodiments, the distance d can be about 50 μm, about 100 μm, about 200 μm, about 300 μm, about 400 μm, about 500 μm, about 600 μm, about 700 μm, about 800 μm, about 900 μm, about 1 mm, about 1.1 mm, about 1.2 mm, about 1.3 mm, about 1.4 mm, about 1.5 mm, about 1.6 mm, about 1.7 mm, about 1.8 mm, about 1.9 mm, or about 2 mm.

In some embodiments, the anodes 5910, the anode current collector 5920, the cathodes 5930, the cathode current collectors 5940, the separators 5950*a*, 5950*b*, 5950*c*, 5950*d* (collectively referred to as separators 5950), and the interlayers 5960 can be oriented in a single sheet stacking orientation (as shown), a z-stacking configuration, a cylindrical winding configuration, or a prismatic winding configuration. Each of these configurations can allow for the contact to occur between the interlayers 5960 and an adjacent electrode. As shown, the interlayer 5960*a* contacts one of the cathodes 5930. In some embodiments, the short circuit can be caused by contact between one of the interlayers 5960 and one of the anodes 5910.

Figure 60:
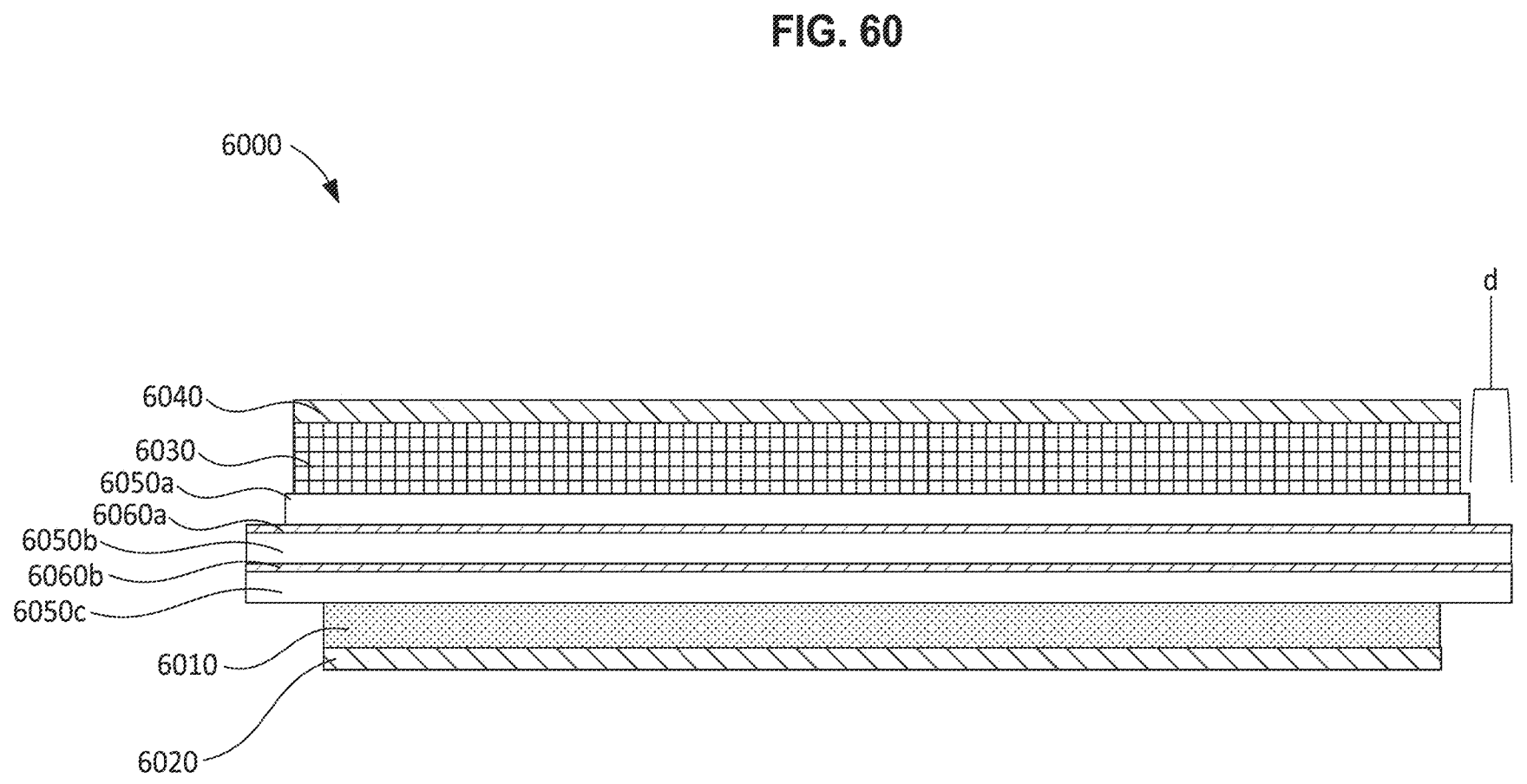

FIG. 60 is an illustration of an electrochemical cell 6000 with multiple interlayers 6060*a*, 6060*b* (collectively referred to as interlayers 6060), according to an embodiment. As shown, the electrochemical cell 6000 includes an anode 6010 disposed on an anode current collector 6020, a cathode 6030 disposed on a cathode current collector 6040, with a first separator 6050*a*, a second separator 6050*b*, and a third separator 6050*c* disposed between the anode 6010 and the cathode 6030. The interlayer 6060*a* is disposed between the first separator 6050*a* and the second separator 6050*b* and the second interlayer 6060*b* is disposed between the second separator 6050*b* and the third separator 6050*c*.odiments, the anode 6010, the anode current collector 6020, the cathode 6030, the cathode current collector 6040, the first separator 6050*a*, the second separator 6050*b*, the third separator 6050*c*, and the interlayers 6060 can be the same or substantially similar to the anodes 5910, the anode current collector 5920, the cathodes 5930, the cathode current collectors 5940, the first separator 5950*a*, the second separator 5950*b*, the third separator 5950*c*, and the interlayers 5960, as described above with reference to FIGS. 59A-59C. Thus, certain aspects of the anode 6010, the anode current collector 6020, the cathode 6030, the cathode current collector 6040, the first separator 6050*a*, the second separator 6050*b*, the third separator 6050*c* and the interlayers 6060 are not described in greater detail herein.

As shown, the interlayer 6060*a* extends beyond the separator 6050*a* by a distance d, while the interlayer 6060*b* is not offset from its adjacent separator 6050*c*. Such a configuration allows for the detection of electrode misalignments adjacent only to the interlayer 6060*a* and not to the interlayer 6060*b*. In some embodiments, the distance d can be any of the distances d described above with reference to FIGS. 59A-59C.

Figure 61:
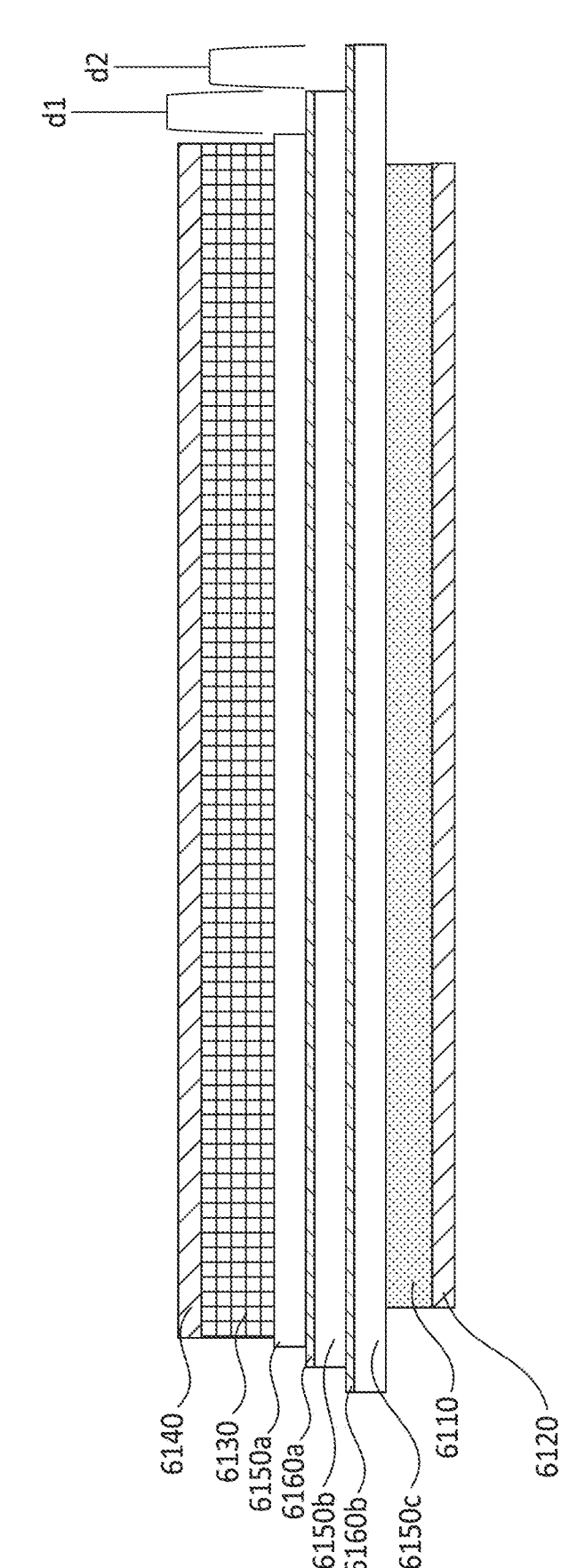
FIG. 61 is an illustration of an electrochemical cell with multiple interlayers, according to an embodiment.

FIG. 61 is an illustration of an electrochemical cell 6100 with multiple interlayers 6160*a*, 6160*b* (collectively referred to as interlayers 6160), according to an embodiment. As shown, the electrochemical cell 6100 includes an anode 6110 disposed on an anode current collector 6120, a cathode 6130 disposed on a cathode current collector 6140, with a first separator 6150*a*, a second separator 6150*b*, and a third separator 6150*c* disposed between the anode 6110 and the cathode 6130. The interlayer 6160*a* is disposed between the first separator 6150*a* and the second separator 6150*b* and the second interlayer 6160*b* is disposed between the second separator 6150*b* and the third separator 6150*c*. In some embodiments, the anode 6110, the anode current collector 6120, the cathode 6130, the cathode current collector 6140, the first separator 6150*a*, the second separator 6150*b*, the third separator 6150*c*, and the interlayers 6160 can be the same or substantially similar to the anodes 5910, the anode current collector 5920, the cathodes 5930, the cathode current collectors 5940, the first separator 5950*a*, the second separator 5950*b*, the third separator 5950*c*, and the interlayers 5960, as described above with reference to FIGS. 59A-59C. Thus, certain aspects of the anode 6110, the anode current collector 6120, the cathode 6130, the cathode current collector 6140, the first separator 6150*a*, the second separator 6150*b*, the third separator 6150*c* and the interlayers 6160 are not described in greater detail herein.

As shown, the interlayer 6160*a* and the separator 6150*b* are offset from the separator 6150*a* by a distance d1. As shown, the interlayer 6160*b* and the separator 6150*c* are offset from the separator 6150*b* by a distance d2. This double offset allows for both the interlayer 6160*a* and the interlayer 6160*b* to contact the cathode 6130 in the case of a misalignment. In some embodiments, the interlayer 6160*a* and/or the interlayer 6160*b* can extend by offset distances on the side adjacent to the anode 6110, such that a misalignment between the anode 6110 and either of the interlayers 6160 is detectable.

In some embodiments, the distance d1 and/or the distance d2 can be at least about 50 μm, at least about 100 μm, at least about 200 μm, at least about 300 μm, at least about 400 μm, at least about 500 μm, at least about 600 μm, at least about 700 μm, at least about 800 μm, at least about 900 μm, at least about 1 mm, at least about 1.1 mm, at least about 1.2 mm, at least about 1.3 mm, at least about 1.4 mm, at least about 1.5 mm, at least about 1.6 mm, at least about 1.7 mm, at least about 1.8 mm, or at least about 1.9 mm. In some embodiments, the distance d1 and/or the distance d2 can be no more than about 2 mm, no more than about 1.9 mm, no more than about 1.8 mm, no more than about 1.7 mm, no more than about 1.6 mm, no more than about 1.5 mm, no more than about 1.4 mm, no more than about 1.3 mm, no more than about 1.2 mm, no more than about 1.1 mm, no more than about 1 mm, no more than about 900 μm, no more than about 800 μm, no more than about 700 μm, no more than about 600 μm, no more than about 500 μm, no more than about 400 μm, no more than about 300 μm, no more than about 200 μm, or no more than about 100 μm. Combinations of the above-referenced distances d are also possible (e.g., at least about 50 μm and no more than about 2 mm or at least about 100 μm and no more than about 1 mm), inclusive of all values and ranges therebetween. In some embodiments, the distance d1 and/or the distance d2 can be about 50 μm, about 100 μm, about 200 μm, about 300 μm, about 400 μm, about 500 μm, about 600 μm, about 700 μm, about 800 μm, about 900 μm, about 1 mm, about 1.1 mm, about 1.2 mm, about 1.3 mm, about 1.4 mm, about 1.5 mm, about 1.6 mm, about 1.7 mm, about 1.8 mm, about 1.9 mm, or about 2 mm.

Figure 62A:
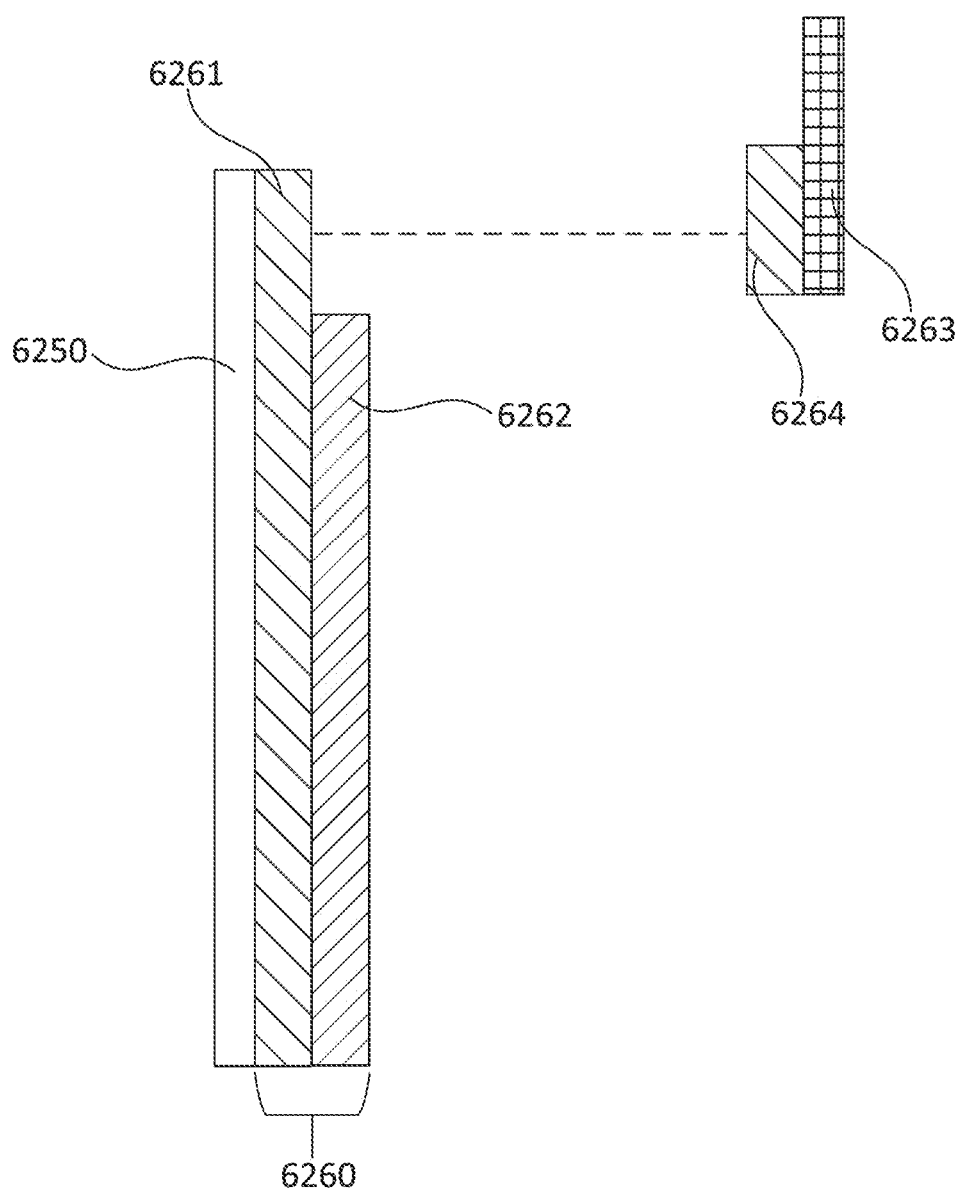
FIGS. 62A-62B are illustrations of a tabbing arrangement, according to an embodiment.
Figure 62B:
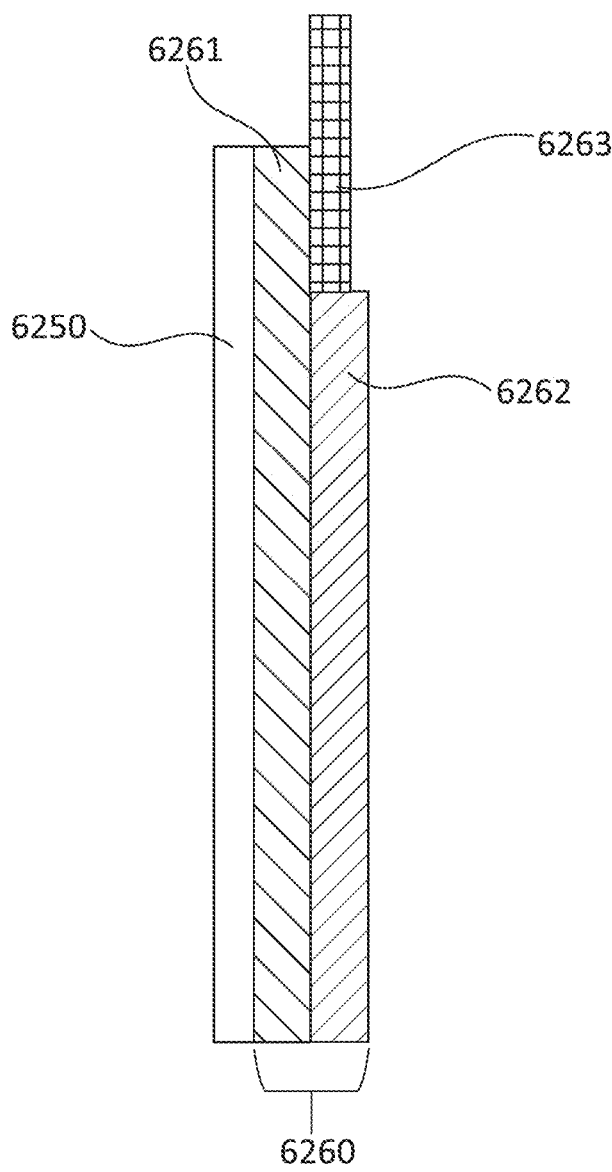

FIGS. 62A-62B are illustrations of a tabbing arrangement, according to an embodiment. FIG. 62A shows a separator 6250 and an interlayer 6260. The interlayer 6260 includes a carbon layer 6261 and a coating 6262. A weld tab 6263 with a tab coating 6264 is also shown in FIG. 62A.

In some embodiments, the carbon layer 6261 can include conductive carbon. In some embodiments, the carbon layer 6261 can include binder. In some embodiments, the carbon layer 6261 can include about 5 wt %, about 10 wt %, about 15 wt %, about 20 wt %, about 25 wt %, about 30 wt %, about 35 wt %, about 40 wt %, about 45 wt %, about 50 wt %, about 55 wt %, about 60 wt %, about 65 wt %, about 70 wt %, about 75 wt %, about 80 wt %, about 85 wt %, about 90 wt %, about 95 wt %, or about 100 wt % conductive carbon, inclusive of all values and ranges therebetween. In some embodiments, the carbon layer 6261 can include about 5 wt %, about 10 wt %, about 15 wt %, about 20 wt %, about 25 wt %, about 30 wt %, about 35 wt %, about 40 wt %, about 45 wt %, about 50 wt %, about 55 wt %, about 60 wt %, about 65 wt %, about 70 wt %, about 75 wt %, about 80 wt %, about 85 wt %, about 90 wt %, about 95 wt %, or about 100 wt % binder, inclusive of all values and ranges therebetween.

In some embodiments, the binder can include polyvinylidene chloride (PVDC). In some embodiments, the binder can include PVDF. In some embodiments, the binder and the conductive carbon can be bound together via melting and/or polymerizing (e.g., crosslinking) the binder and physically connecting the binder to the conductive carbon. In some embodiments, the binder and the conductive carbon can be melt-mixed together. In some embodiments, the binder can be melted via heating, ultrasonic application, and/or ultraviolet application. In some embodiments, the binder can be melted under pressure. In some embodiments, the mixing and/or melting of the binder with the conductive carbon can occur inside an electrochemical cell (i.e., after the electrochemical cell has been built). In some embodiments, the mixing and/or melting of the binder with the conductive carbon can occur outside of an electrochemical cell (e.g., in the construction of individual unit cells).

In some embodiments, the carbon layer 6261 can be mixed with a solvent before disposing the carbon layer 6261 onto the separator 6250. In some embodiments, the binder in the coating 6262 can be mixed with a solvent. In some embodiments, the carbon layer 6261 can include a first solvent and the coating 6262 can include a second solvent, the second solvent different from the first solvent. In some embodiments, the second solvent can be the same as the first solvent. In some embodiments, the carbon layer 6261 can be coated onto the separator 6250 with water, carboxymethyl cellulose (CMC), or any combination thereof. In some embodiments, the coating 6262 can include PVDF, n-methyl pyrrolidone (NMP), or any combination thereof.

As shown in FIG. 62A, a section of the carbon layer 6261 is not coated by the coating 6262. This allows for tabbing via the tab 6263. In FIG. 62B, the tab 6263 and the tab coating 6264 have been merged with the interlayer 6260. In some embodiments, the tab 6263 can have any of the properties of the tab 763, as described above with reference to FIGS. 7A-7B. In some embodiments, the tab coating 6264 can be the same or substantially similar to the coating 6262. In some embodiments, the tab 6263 and the tab coating 6264 can be pressed to the coating 6262. In some embodiments, the tab 6263 and the tab coating 6264 can be heat-pressed to the coating 6262. In some embodiments, the tab 6263 and the tab coating 6264 can be laminated to the coating 6262. In some embodiments, the tab 6263 and the tab coating 6264 can adhere to the coating 6262 via an adhesive. In some embodiments, the tab coating 6264 and the coating 6262 can be melted together. In some embodiments, the melting can be via heat, ultrasonic, UV, and/or with pressure. In some embodiments, the tab 6263 and the tab coating 6264 can be merged with the coating 6262 inside the electrochemical cell (i.e., after the electrochemical cell has been formed. In some embodiments, the tab 6263 and the tab coating 6264 can be merged with the coating 6262 outside the electrochemical cell.

Figure 63:
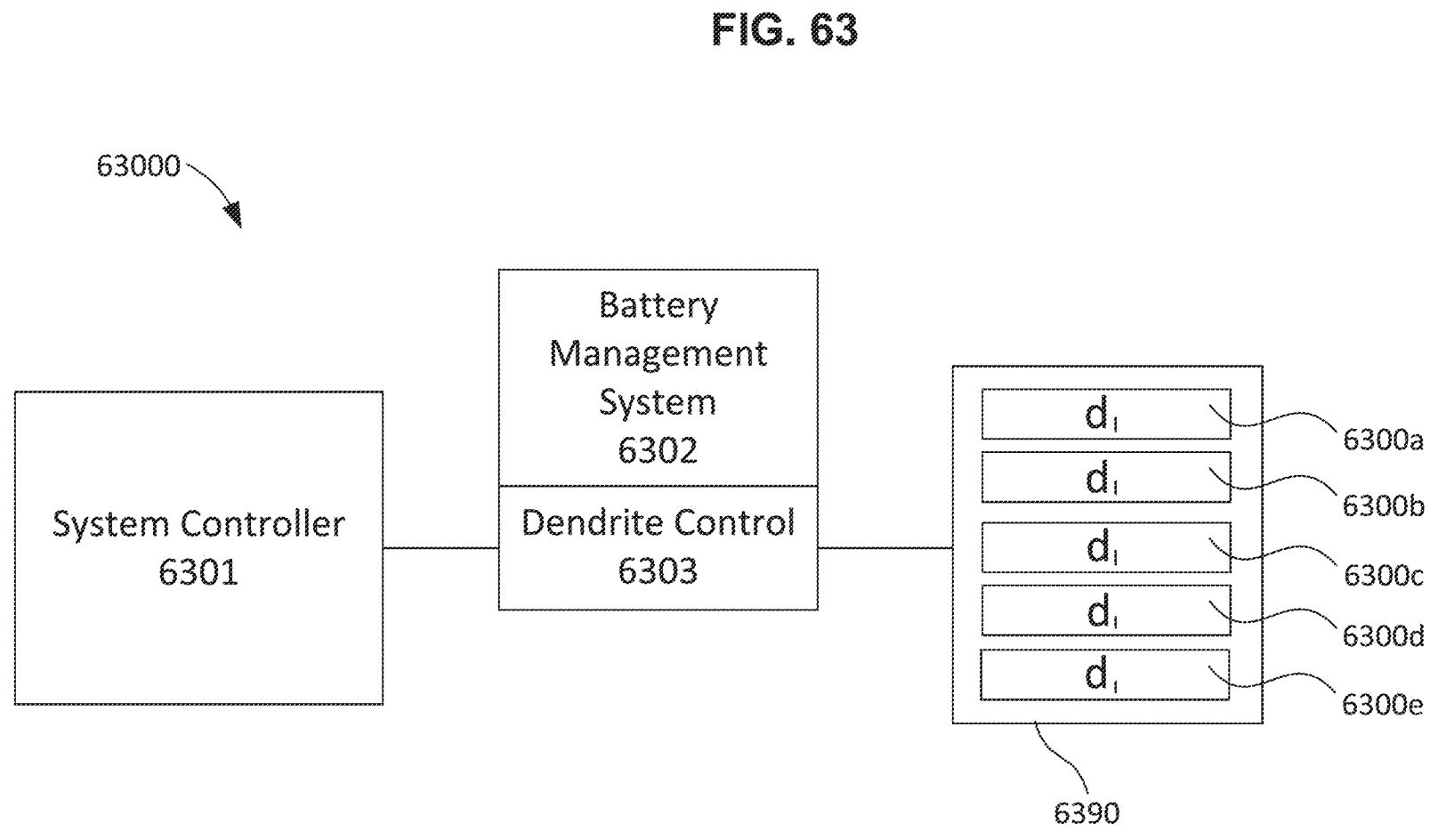

FIG. 63 is a block diagram of an electrochemical cell system 63000, according to an embodiment. As shown, the electrochemical cell system 63000 includes electrochemical cells 6300a, 6300b, 6300c, 6300d, 6300e (collectively referred to as electrochemical cells 6300) inside a casing 6390. As shown, the electrochemical cells 6300 include interlayers that extend beyond the breadth of the other components of their respective electrochemical cells, marked with 'd.' This can be the same or substantially similar to the interlayers 6090, 6190, as described above with respect to FIGS. 60 and 61, respectively. The electrochemical cell system 63000 further includes a system controller 6301, a battery management system (BMS) 6302, and a dendrite control 6303. As shown, the system controller 6301 controls the action of the dendrite control 6303 and the BMS 6302. The dendrite control 6303 controls the movement of current among the electrochemical cells 6300 and their various interlayers to prevent dendrite growth or dissipate dendrites. The dendrite control 6303 specifically interfaces to the interlayers in the electrochemical cells 6300 of the electrochemical cell system 63000. In some embodiments, the electrochemical cells 6300 and the casing 6390 can be the same or substantially similar to the electrochemical cell 1500 and the casing 1590, as described above with reference to FIGS. 15A-15B. Thus, certain aspects of the electrochemical cells 6300 and the casing 6390 are not described in greater detail herein. The electrochemical cells 6300 each include one or more interlayers.

Series voltage monitors can be used to detect the interlayer voltage relative to the anode or the cathode. Differential voltage monitors can also be used based on system implementation. The electrochemical cell system 63000 can compare the interlayer voltage to the voltage of an anode or a cathode. If he voltage, relative to the cathode, is within a defined range (e.g., about −0.2 V to about −1 V, about −0.1

V, about −0.2 V, about −0.3 V, about −0.4 V, about −0.5 V, about −0.6 V, about −0.7 V, about −0.8 V, about −0.9 V, about −1 V, about −1.1 V, about −1.2 V, about −1.3 V, about −1.4 V, or about −1.5 V, inclusive of all values and ranges therebetween), then no dendritic growth has been detected. If the voltage, relative to the cathode is below a defined level (e.g., less than about −0.5 V, less than about −0.6 V, less than about −0.7 V, less than about −0.8 V, less than about −0.9 V, less than about −1 V, less than about −1.1 V, less than about −1.2 V, less than about −1.3 V, less than about −1.4 V, or less than about −1.5 V, inclusive of all values and ranges therebetween), then dendritic growth has been detected.

In testing, dendritic growth has created perturbations of the interlayer voltage. The system controller 6301 can sense the voltage of the electrodes and also use advanced filtering and waveform evolution to detect dendritic growth. This filtering can be in the form of active hardware filtering or digital filters of various types. Hardware for filtering can include high pass, low pass, band pass, proportional, integration, differential, amplitude, frequency conversion, or other types of active or passive designs. A hardware filtering can be via an external circuit (e.g., a BMS), that can detect the voltage and current change and quantify the variations. The digital filtering can be done in a standard processor, a field-programmable gate array (FPGA), or a digital system processor (DSP) using compact, low speed, or high-speed filtering methods. The model used for digital filter can include finite impulse response (FIR), infinite impulse response (IIR), S model, Fast Fourier Transform (FFT), advanced Fast Fourier Transform (AFFT), or any other appropriate filtering or detection model method or combinations thereof in order to isolate the characteristic event.

In some embodiments, a device can be added to one or more of the electrochemical cells 6300 or to the system controller 6301 that can apply a constant potential, resistance, or current to the interlayer of the electrochemical cells 6300. In some embodiments, the device can provide a continuous excitation of the interlayer, such that a dendrite would not be able to form across the separator layer. In some embodiments, the device can be similar to devices described in the '597 publication. In some embodiments, the device can incorporate a single passive device, or any number of components in an electrical control methodology. In some embodiments, a prevention method can be used as part of an overall control strategy, in which the voltage potential, current, and resistance passing through the interlayer can be changed based on a control algorithm. In some embodiments, dendrites can be detective via actively modulating, pulsing, and/or alternating a controlled potential of the interlayer to remediate or prevent a dendrite from forming.

In some embodiments, the potential of the interlayers can be changed, depending on how the dendritic growth is dissolved or blocked. A high potential, close to or exceeding the cathode voltage can be effective to dissolve a metallic dendrite including lithium, iron, nickel, chromium, and/or copper. A low potential, close to or below the anode voltage can be effective to store the lithium ion in the hard carbon layer for pre-lithiation purposes. The system controller 6301 can act in an active prevention mode, where the potential of the interlayer can be modulated or changed to apply different voltage potentials and either increasing the voltage potentials (cathode side) or decreasing the voltage potentials (anode side) to maintain a cell function or health.

Figure 64:
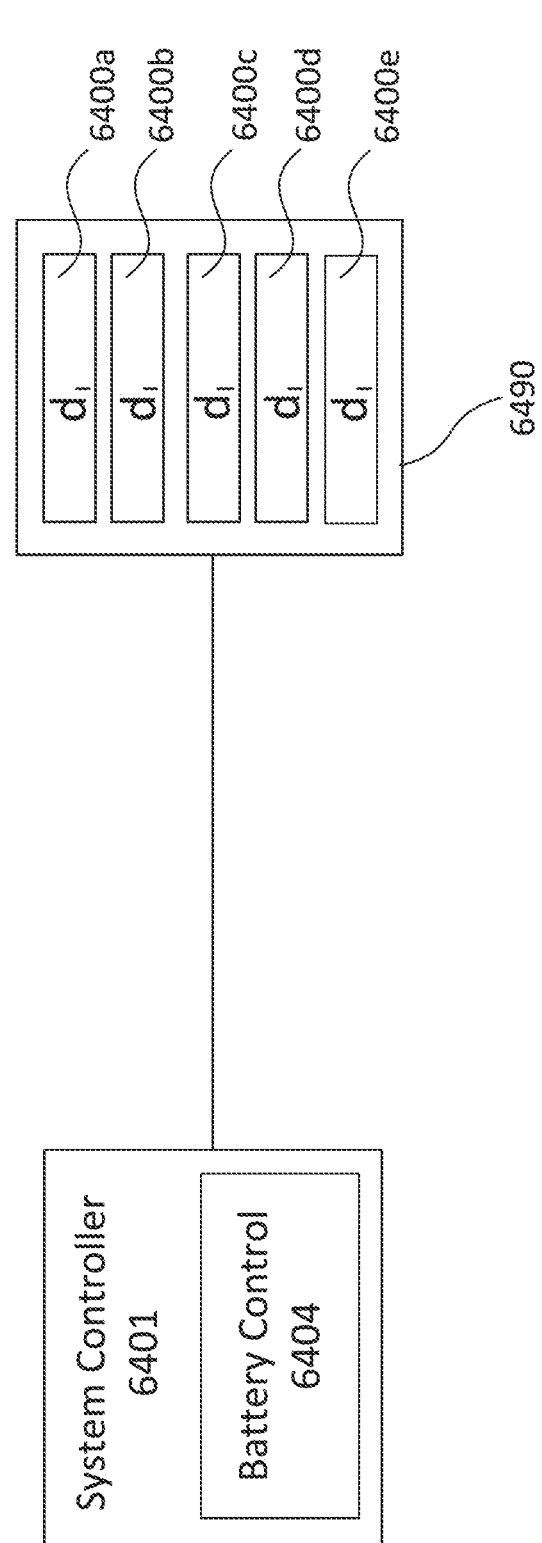
FIG. 64 is a block diagram of an electrochemical cell system, according to an embodiment.

FIG. 64 is a block diagram of an electrochemical cell system 64000, according to an embodiment. As shown, the electrochemical cell system 64000 includes electrochemical cells 6400a, 6400b, 6400c, 6400d, 6400e (collectively referred to as electrochemical cells 6400) inside a casing 6490. The electrochemical cell system 64000 further includes a system controller 6401, which includes a battery control 6404. The battery control 6404 can control movement of current among the electrochemical cells 6400. The battery control 6404 includes each of the functions needed to control the electrochemical cell system 64000. The battery control 6404 can be carried out via a BMS. In some embodiments, as shown in FIG. 64, the functions required to control the battery can be contained in the system controller, eliminating the separation of the BMS. In some embodiments, the electrochemical cells 6400 and the casing 6490 can be the same or substantially similar to the electrochemical cells 6300 and the casing 6390, as described above with reference to FIG. 63. Thus, certain aspects of the electrochemical cells 6400 and the casing 6490 are not described in greater detail herein.

Figure 65:
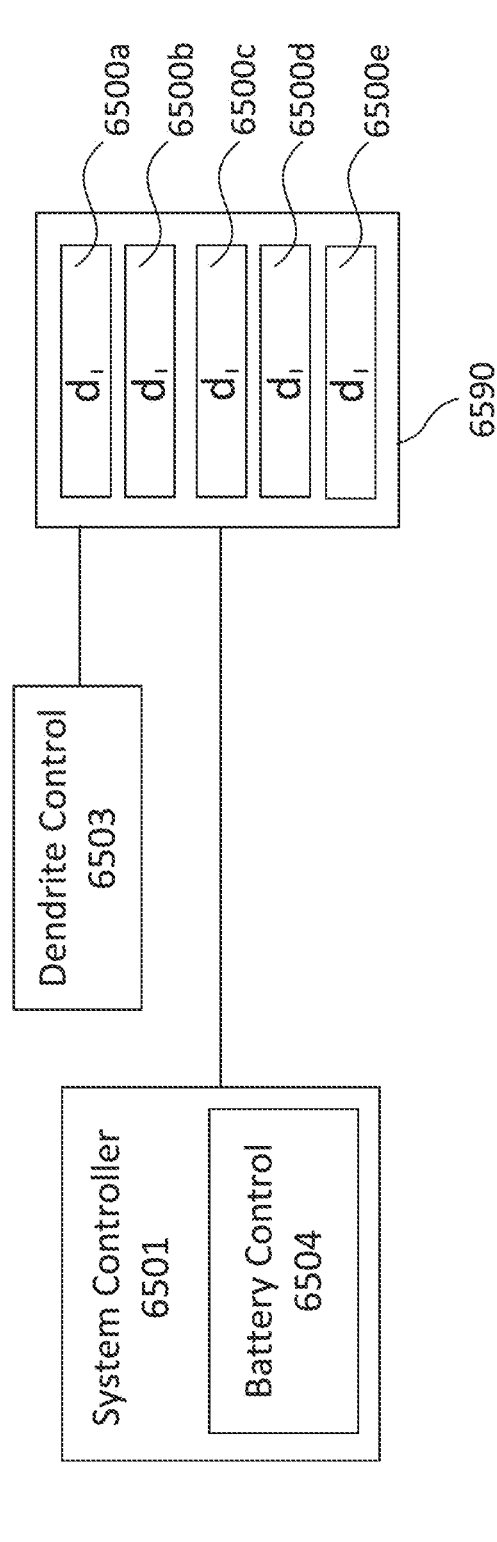
FIG. 65 is a block diagram of an electrochemical cell system, according to an embodiment.

FIG. 65 is a block diagram of an electrochemical cell system 65000, according to an embodiment. As shown, the electrochemical cell system 65000 includes electrochemical cells 6500a, 6500b, 6500c, 6500d, 6500e (collectively referred to as electrochemical cells 6500) inside a casing 6590. The electrochemical cell system 65000 further includes a system controller 6501, which includes a battery control 6504 and a dendrite control 6503. The dendrite control 6503 can operate independently of the system controller 6501. In some embodiments, the electrochemical cells 6500, the casing 6590, and the dendrite control 6503 can be the same or substantially similar to the electrochemical cells 6300, the casing 6390, and the dendrite control 6303, as described above with reference to FIG. 63. In some embodiments, the battery control 6504 can be the same or substantially similar to the battery control 6404, as described above with reference to FIG. 64. Thus, certain aspects of the electrochemical cells 6500, the casing 6590, the dendrite control 6503, and the battery control 6504 are not described in greater detail herein.

Figure 66:
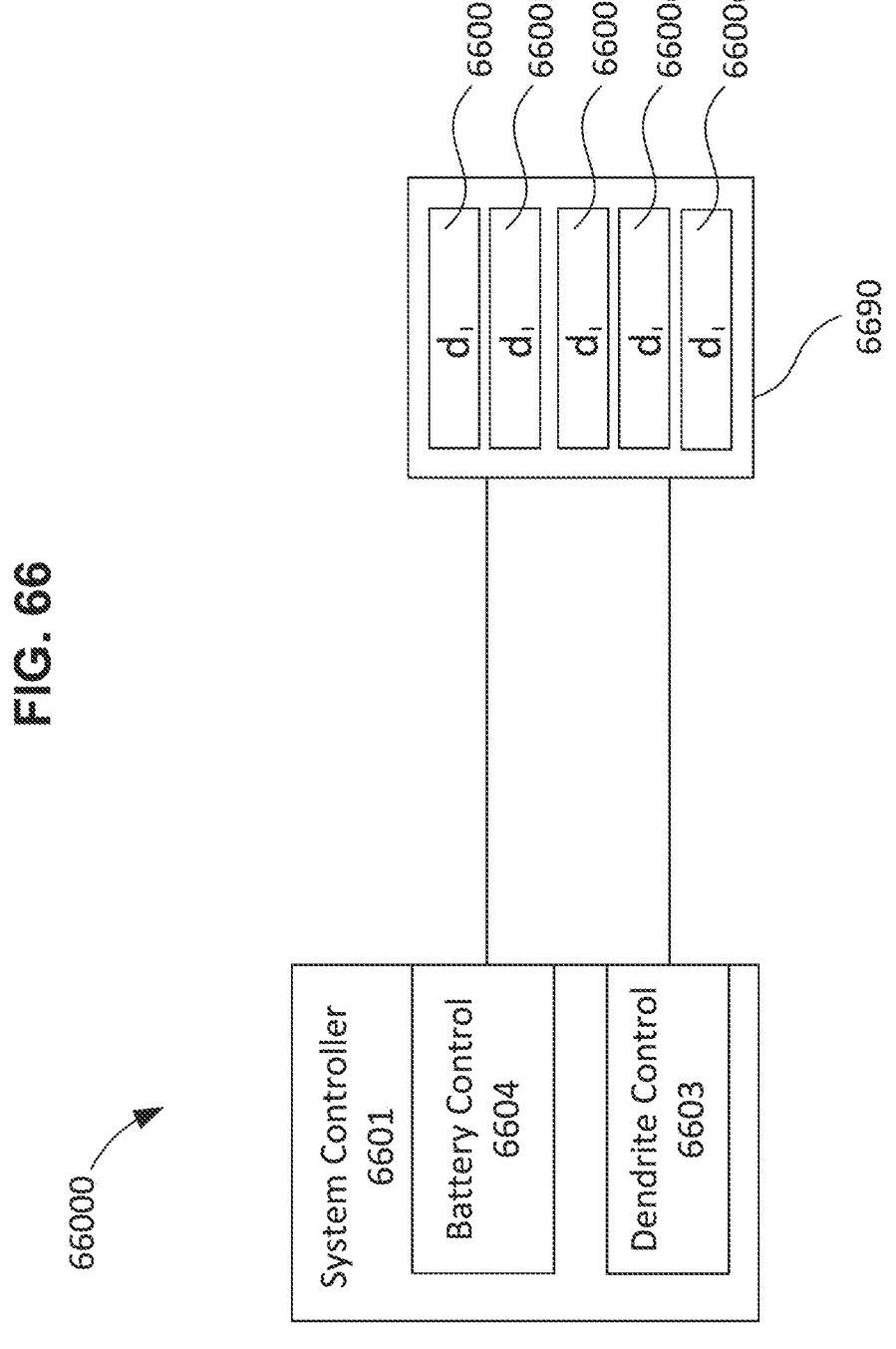
FIG. 66 is a block diagram of an electrochemical cell system, according to an embodiment.

FIG. 66 is a block diagram of an electrochemical cell system 66000, according to an embodiment. As shown, the electrochemical cell system 66000 includes electrochemical cells 6600a, 6600b, 6600c, 6600d, 6600e (collectively referred to as electrochemical cells 6600) inside a casing 6690. A system controller 6601 includes a dendrite control 6603 and a battery control 6604. The dendrite control 6603 and the battery control 6604 can each independently control the movement of current in the electrochemical cells 6600. In some embodiments, as shown in FIG. 66, the functions required to control the electrochemical cell system 66000 and dendrites can be contained in the system controller, eliminating the separation of the BMS or dendrite control 6603. In some embodiments, the electrochemical cells 6600, the casing 6690, the system controller 6601, the dendrite control 6603, and the battery control 6604 can be the same or substantially similar to the electrochemical cells 6500, the casing 6590, the system controller 6501, the dendrite control 6503, and the battery control 6504, as described above with reference to FIG. 65. Thus, certain aspects of the electrochemical cells 6600, the casing 6690, the system controller 6601, the dendrite control 6603, and the battery control 6604 are not described in greater detail herein.

Figure 67:
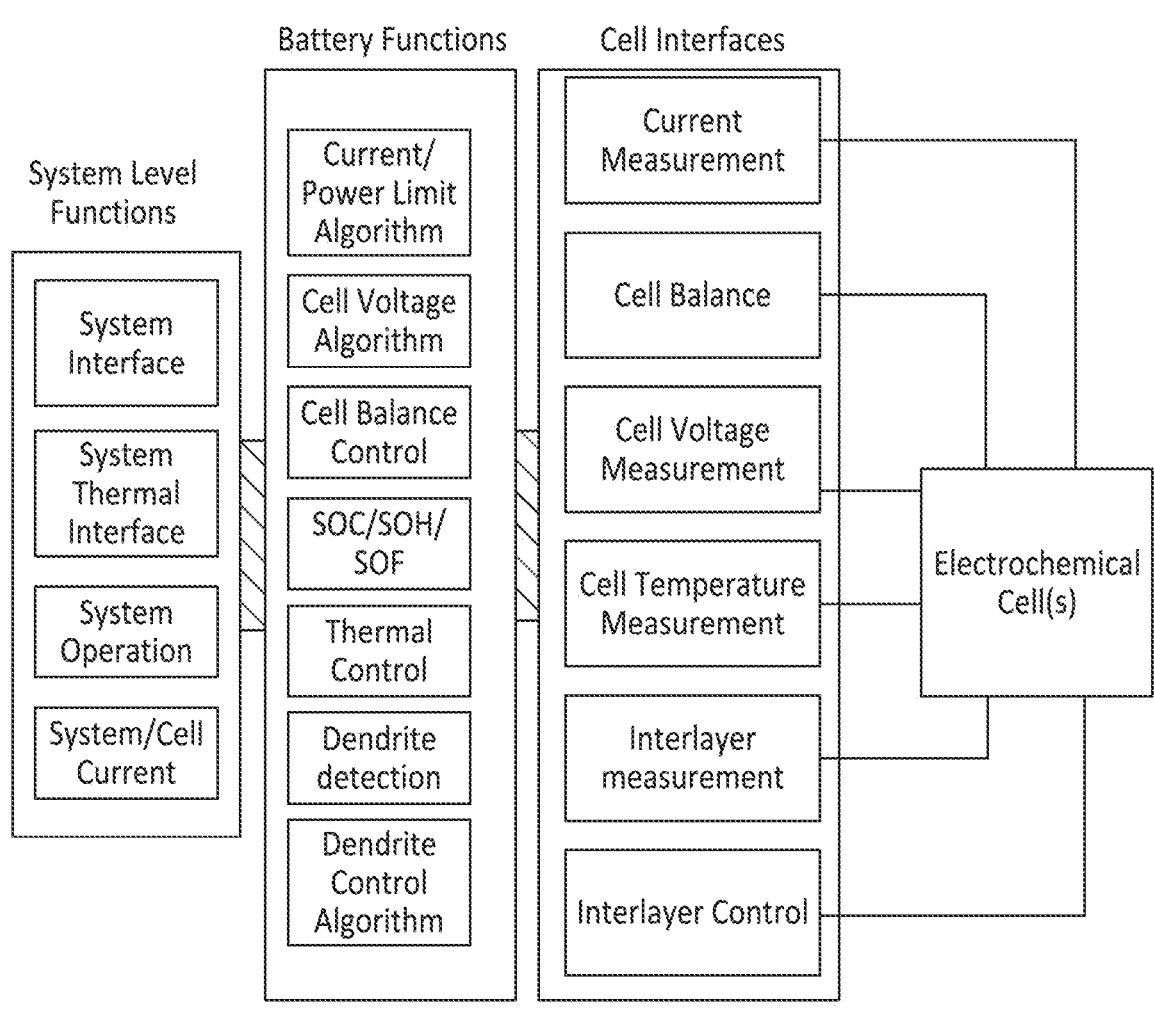
FIG. 67 is a block diagram of an electrochemical cell system, according to an embodiment.

FIG. 67 is a block diagram of an electrochemical cell system 67000, according to an embodiment. As shown, the electrochemical cell system 67000 includes system level functions, battery functions, cell interfaces, and electrochemical cells. The system level functions include system thermal interfaces, system operation, and system/cell current management subsystems. The system thermal interface monitors the temperature of the electrochemical cells to avoid temperature gradients and associated capacity loss. The system operation includes operating protocols for the electrochemical cells. The system/cell current subsystem manages current movement throughout the electrochemical cells. FIG. 67 as shown is a representative structure that can be included in a larger system or used as a standalone architecture. Additional functions and feature can be used or the functional blocks can be moved to other controllers or systems.

The battery functions can include, but are not limited to: a current/power limit algorithm, a cell voltage algorithm, a cell balance control, a state of charge (SOC)/state of health (SOH)/state of function (SOF) monitor, thermal control, dendrite detection, and a dendrite control algorithm. The current/power limit algorithm limits the amount of current that can flow through the electrochemical cells by onboard control or through the system interface. The cell voltage algorithm limits the maximum voltage of either of the electrodes with respect to the other electrodes in the electrochemical cells. The cell balance control prevents significant variations in cell voltage. The SOC/SOH/SOF monitor screens the general health of the electrochemical cells. The thermal control subsystem adjusts the movement of current based on the temperatures of the electrochemical cells and interfaces to heaters/chillers (not shown) as needed to heat and cool the electrochemical cell system 67000. The dendrite detection and dendrite control algorithms monitor voltage in the interlayers of the electrochemical cells and adjust current or potential to prevent or remove dendrites.

The cell interfaces can include, but are not limited to: current measurement, cell balance, cell voltage measurement, cell temperature measurement, interlayer measurement, and interlayer control algorithms. The current measurement algorithm measures the movement of current between electrochemical cells. The cell balance algorithm shifts the movement of current based on imbalances in the cells. The cell voltage measurement and cell temperature measurement algorithms measure the voltage and temperature of the cells. The interlayer measurement algorithm measures the voltage of the interlayers in the electrochemical cells. The interlayer control algorithm controls movement of current or potential into and out of the interlayers.

Figure 68:
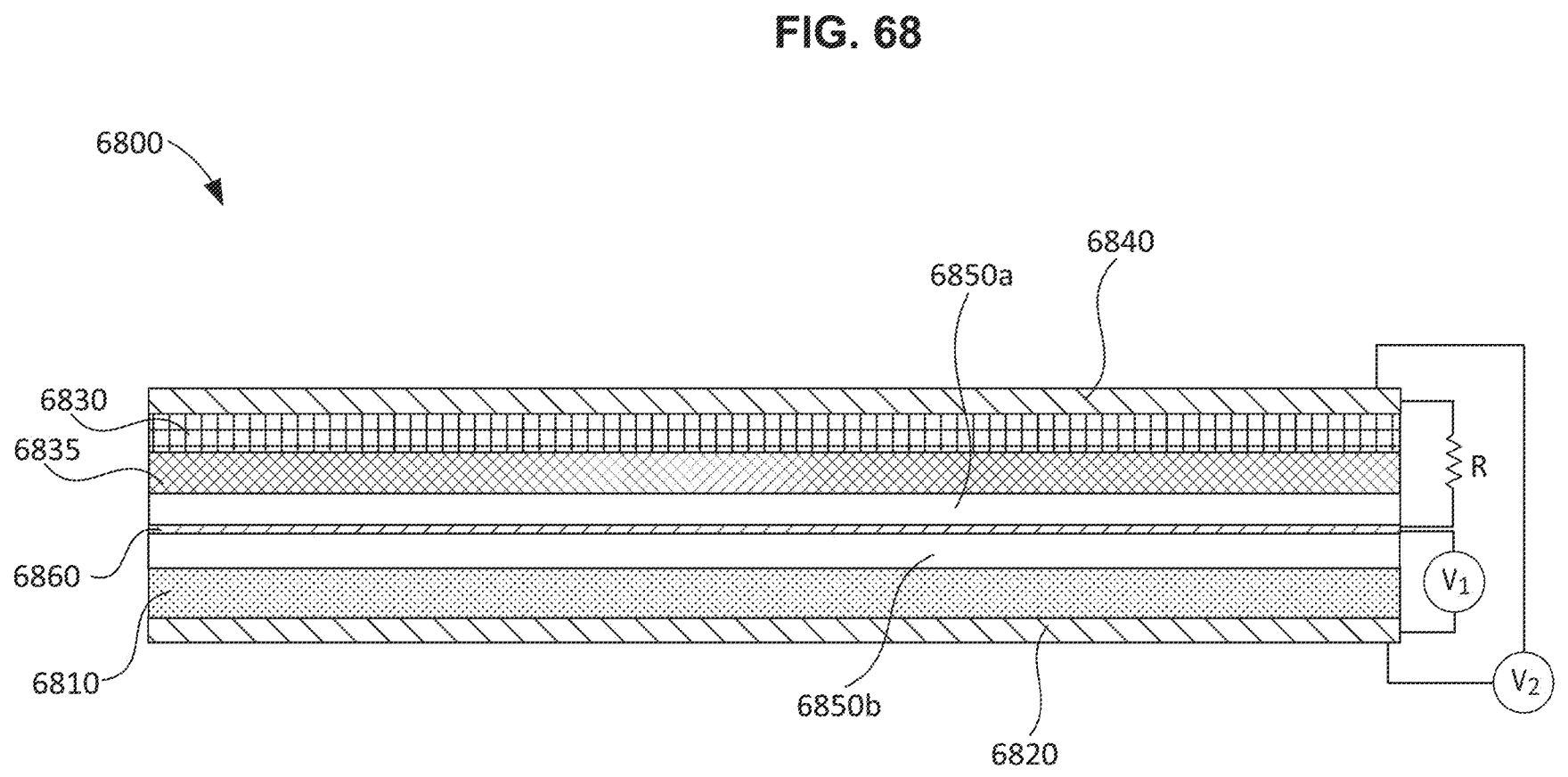

FIG. 68 is an illustration of an electrochemical cell 6800 with an interlayer 6860, according to an embodiment. As shown, the electrochemical cell 6800 includes an anode 6810 disposed on an anode current collector 6820, a cathode 6830 disposed on a cathode current collector 6840, with a first separator 6850a and a second separator 6850b disposed between the anode 6810 and the cathode 6830. The interlayer 6860 is disposed between the first separator 6850a and the second separator 6850b. A pre-lithiation layer 6855 is disposed between the cathode 6830 and the separator 6850a. In some embodiments, the anode 6810, the anode current collector 6820, the cathode 6830, the cathode current collector 6840, the first separator 6850a, the second separator 6850b, and the interlayer 6860 can be the same or substantially similar to the anode 2810, the anode current collector 2820, the cathode 2830, the cathode current collector 2840, the first separator 2850a, the second separator 2850b, and the interlayer 2860, as described above with reference to FIG. 28. Thus, certain aspects of the anode 6810, the anode current collector 6820, the cathode 6830, the cathode current collector 6840, the first separator 6850a, the second separator 6850b, and the interlayer 6860 are not described in greater detail herein.

A first voltage $V_1$ is measured between the anode current collector 6820 and the interlayer 6860. A second voltage $V_2$ is measured between the anode current collector 6820 and the anode current collector 6820 and the cathode current collector 6840. The pre-lithiation layer 6855 can be a functional layer. In some embodiments, the pre-lithiation layer 6855 can be coated on the separator 6850*a*. In some embodiments, the pre-lithiation layer 6855 can include functional lithium-containing materials with a high specific capacity and a low decomposition potential. During initial charge, the pre-lithiation layer 6855 can decompose to provide extra lithium ions for pre-lithiation of the anode 6810. In some embodiments, the pre-lithiation layer 6855 can include $LiFePO_4$, $Li_5FeO_4$, or any combination thereof. During operation, a continuous charge and discharge with an interlayer potential greater than about 1V can diminish a lithium dendrite that has penetrated the interlayer 6860 and revert charge back to the pre-lithiation layer 6855.

Figure 69:
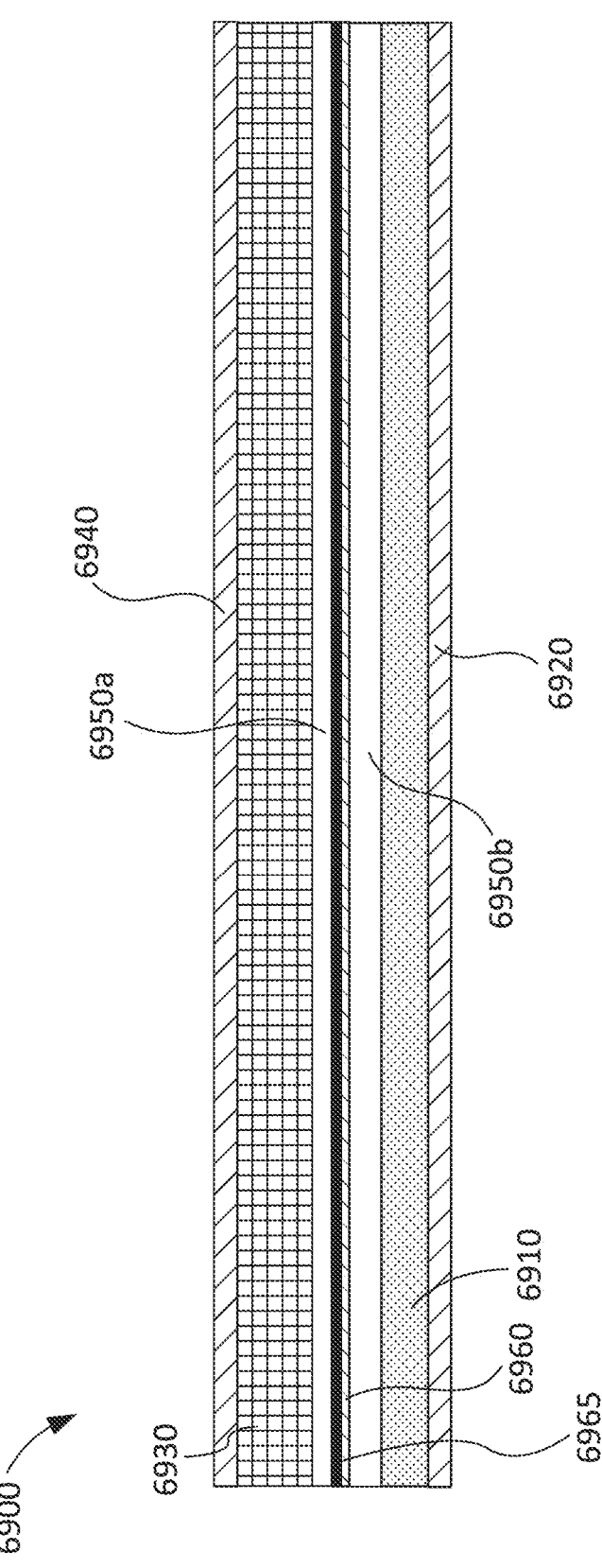
FIG. 69 is an illustration of an electrochemical cell with an interlayer, according to an embodiment.

FIG. 69 is an illustration of an electrochemical cell 6900 with an interlayer 6960, according to an embodiment. As shown, the electrochemical cell 6900 includes an anode 6910 disposed on an anode current collector 6920, a cathode 6930 disposed on a cathode current collector 6940, with a first separator 6950*a* and a second separator 6950*b* disposed between the anode 6910 and the cathode 6930. The interlayer 6960 is disposed between the first separator 6950*a* and the second separator 6950*b*. A positive temperature coefficient (PTC) layer 6965 is disposed between the interlayer 6960 and the separator 6950*a*. In some embodiments, the anode 6910, the anode current collector 6920, the cathode 6930, the cathode current collector 6940, the first separator 6950*a*, the second separator 6950*b*, and the interlayer 6960 can be the same or substantially similar to the anode 210, the anode current collector 220, the cathode 230, the cathode current collector 240, the first separator 250*a*, the second separator 250*b*, and the interlayer 260, as described above with reference to FIGS. 2A-2B. Thus, certain aspects of the anode 6910, the anode current collector 6920, the cathode 6930, the cathode current collector 6940, the first separator 6950*a*, the second separator 6950*b*, and the interlayer 6960 are not described in greater detail herein.

The PTC layer 6965 can resist the flow of current therethrough when the PTC layer 6965 takes on heat. In some embodiments, the PTC layer 6965 can have a temperature-dependent electrical resistance. In some embodiments, the PTC layer 6965 can be composed of poly-crystalline materials, conductive polymers, barium carbonate, titanium oxide, tantalum, silica, manganese, activated carbon, hard carbon, graphite, carbon grains, or any combination thereof. In some embodiments, the PTC layer 6965 can include a polymer with carbon grains embedded therein. In some embodiments, the PTC layer 6965 can include any of the properties of the PTC materials described in U.S. Patent Publication No. 2023/0022329 ("the '329 publication"), filed Jul. 20, 2022 and titled "Electrodes and Electrochemical Cells with Positive Temperature Coefficient Materials and Methods of Producing the Same," the disclosure of which is hereby incorporated by reference in its entirety.

As shown, the PTC layer 6965 is disposed between the interlayer 6960 and the separator 6950*a*. In some embodiments, the PTC layer 6965 can be disposed between the interlayer 6960 and the separator 6950*b*. In some embodiments, the PTC layer 6965 can be disposed between the separator 6950*a* and the cathode 6930. In some embodiments, the PTC layer 6965 can be disposed between the separator 6950*b* and the anode 6910.

In use, a short circuit is detected (i.e., via the interlayer 6960). Energy is then directed away from the positive electrode to reduce the SOC of the electrochemical cell 6900. The voltage is then reduced. In other words, an external short circuit is initiated. Activation of the PTC layer 6965 is slow during an internal short circuit, and the PTC layer 6965 does not react fast enough to stop the flow of current through the electrochemical cell 6900. The external short circuit provides enough heat through the cell to induce the PTC layer 6965 to substantially increase its electrical resistance.

Figure 70A:
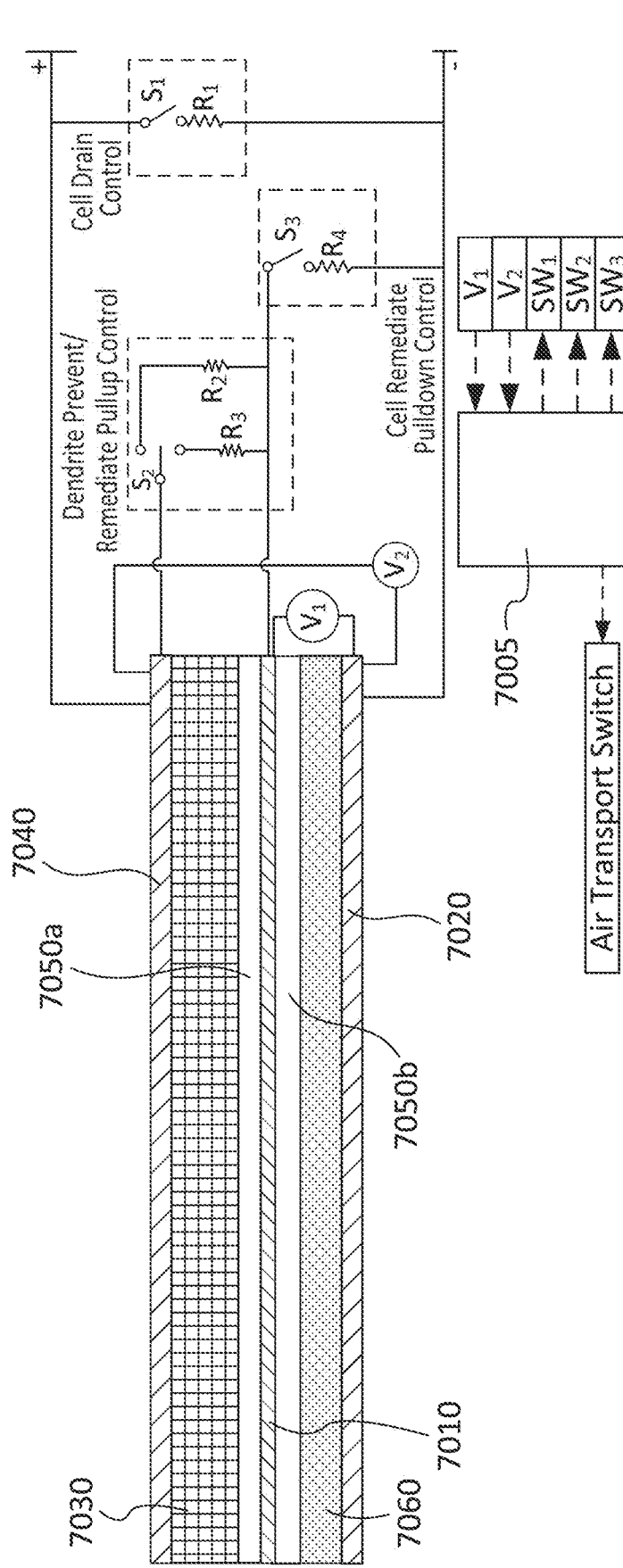

FIG. 70A is an illustration of an electrochemical cell 7000 with an interlayer 7060, according to an embodiment. As shown, the electrochemical cell 7000 includes a controller 7005, an anode 7010 disposed on an anode current collector 7020, a cathode 7030 disposed on a cathode current collector 7040, with a first separator 7050*a* and a second separator 7050*b* disposed between the anode 7010 and the cathode 7030. The interlayer 7060 is disposed between the first separator 7050*a* and the second separator 7050*b*. In some embodiments, the anode 7010, the anode current collector 7020, the cathode 7030, the cathode current collector 7040, the first separator 7050*a*, the second separator 7050*b*, and the interlayer 7060 can be the same or substantially similar to the anode 210, the anode current collector 220, the cathode 230, the cathode current collector 240, the first separator 250*a*, the second separator 250*b*, and the interlayer 260, as described above with reference to FIGS. 2A-2B. Thus, certain aspects of the anode 7010, the anode current collector 7020, the cathode 7030, the cathode current collector 7040, the first separator 7050*a*, the second separator 7050*b*, and the interlayer 7060 are not described in greater detail herein.

As shown, a voltage $V_1$ is measured between the anode current collector 7020 and the interlayer 7060, a voltage $V_2$ is measured between the anode current collector 7020 and the cathode current collector 7040. As shown, a switch $S_1$ and a resistor $R_1$ control a cell drain control module. The drain control module is effectively a cell shutdown module. By engaging the switch $S_1$, the electrochemical cell 7000 is shut down and the voltage is drained to zero or near zero. The drain control module can be used if other efforts to prevent or remediate a detected dendrite are unsuccessful.

A switch $S_2$ and resistors $R_2$ and $R_3$ control a dendrite prevention and remediation control module. The switch $S_2$ is closed to create a circuit with the resistor $R_3$ to activate the prevention control module. The switch $S_2$ is closed to create a circuit with the resistor $R_2$ to activate the remediation control module. The prevention control module pulls up the voltage of the interlayer 7060 to be more similar to the voltage of the cathode 7030. This prevents dendrites from forming or growing through the interlayer 7060. The remediation control module also pulls up the voltage of the interlayer 7060 to be closer to that of the cathode 7030. This shrinks and aids in eliminating dendrites that have already formed in the interlayer 7060. The resistance of the resistor $R_2$ is less than the resistance $R_3$, so that more energy from the dendrites can flow through the resistor $R_2$, as compared to prevention. In some embodiments, the resistor $R_2$ can have a resistance less than that of the resistor $R_3$ by a factor of about 1.1, about 1.2, about 1.3, about 1.4, about 1.5, about 1.6, about 1.7, about 1.8, about 1.9, about 2, about 3, about 4, about 5, about 6, about 7, about 8, about 9, about 10, about 20, about 30, about 40, about 50, about 60, about 70, about 80, about 90, or about 100, inclusive of all values and ranges therebetween.

A switch $S_3$ and resistor $R_4$ control a cell remediation pulldown control module. The controller 7005 receives information about voltage $V_1$ and $V_2$ and controls switches $S_1$, $S_2$, $S_3$ as well as an air transport switch.

The controller 7005 can operate via a BMS to manage the growth of dendrites. In some embodiments, the controller 7005 can include main functions and function decompositions. The main functions can include (1) providing communications, (2) providing current flow control, (3) providing safe operation, (4) providing dendrite control module, and/or (5) providing cell protection. The (1) providing communications function can include (a) providing calibration and/or (b) providing operating status of the electrochemical cell 7000. The (2) providing current flow control module can include (a) providing current flow between the cathode 7030 and the interlayer 7060, (b) providing current flow between the cathode 7030 and the anode 7010, and/or (c) providing no current flow in the electrochemical cell 7000. In some embodiments, the (3) providing safe operation module can include (a) providing dendrite remediation, (b) preventing a thermal event, and/or (c) providing a safe state. In some embodiments, the (4) providing dendrite control module can include (a) providing dendrite detection, (b) providing dendrite prevention, (c) providing dendrite remediation, and/or (d) providing voltage sense. In some embodiments, the (5) providing cell protection module can include (a) providing fault protection, and/or (b) providing data logging.

In use, the electrochemical cell can practice a protocol that includes detection, prevention, and remediation. Detection can include using a PI loop to measure the voltage difference between the total cell voltage (i.e., the voltage between the anode current collector 7020 and the cathode current collector 7040) and the interlayer voltage (i.e., the voltage between the interlayer 7060 and the anode current collector 7020). If the interlayer voltage decreases to less than a set threshold value, the potential of the interlayer 7060 is increased by electrically connecting the interlayer 7060 to the cathode current collector 7040 via the switch $S_2$ through the resistor $R_3$. This takes advantage of the pullup control module.

Dendrite prevention can be exercised by applying a resistance to the interlayer 7060. This resistance can provide continuous excitation of the interlayer 7060, such that a dendrite cannot form across either of the separators 7050. This prevention method can be used as part of an overall control strategy where the voltage potential, current, and resistance to the interlayer 7060 can be changed based on a control algorithm (e.g., a control algorithm used by the controller 7005).

The control system can act in an active prevention mode where the potential of the interlayer 7060 is modulated or changed to apply different potentials and increasing them (i.e., to be closer to the potential of the cathode 7030) or decreasing them (i.e., to be closer to the potential of the anode 7010) via the switch $S_3$ and the resistor $R_4$ to maintain the functioning of the electrochemical cell 7000. When the dendrite forms and interfaces with the interlayer 7060, the voltage of the interlayer 7060 can be pulled up toward the potential of the cathode 7030. The dendrite is dissolved or remediated, and the voltage potential of the interlayer 7060 returns to near the voltage potential of the cathode 7030 with respect to the anode 7010.

As shown, the cell drain control module closes the switch $S_1$ and runs current through the resistor $R_1$ to drain the electrochemical energy from the electrochemical cell 7000. This module can be used after the aforementioned dendrite remediation mechanisms fail. This can be enabled in extreme situations where the controller 7005 deems that a thermal event can be pending. The dendrite prevention pullup control module can be enabled to slowly pass a current potential to the interlayer 7060 to prevent dendrites from forming. The dendrite remediation pullup control mechanism can be enabled to more rapidly pass a current potential to the interlayer 7060 to raise the voltage of the interlayer 7060 to be closer to that of the cathode 7030. This can be used to remediate any dendrites the controller 7005 identifies during a detection phase. The cell remediation pulldown control module can be used during early development testing to lower the voltage of the interlayer 7060 to be more similar to that of the anode 7010.

In some embodiments, multiple versions or iterations of the electrochemical cell 7000 can be connected in series and/or in parallel. In some embodiments, the control of the electrochemical cell 7000 or multiple electrochemical cells connected in series and/or in parallel can be via a BMS. The types of switches and resistors employed in the electrochemical cell 7000 can be implemented in many ways in the detailed circuit design. The air transport switch can be used to drain the electrochemical cell 7000 to a desired SOC (e.g., about 5%, about 10%, about 15%, about 20%, about 25%, about 30%, about 35%, about 40%, about 45%, or about 50% SOC, inclusive of all values and ranges therebetween) for air transport or any other shipping or movement of the electrochemical cell 7000. This can reduce the probability of dangerous electrical discharges During operation, the controller 7005 can send various signals to the components of the electrochemical cell 7000. Table 1 shows example signals that can be sent from the controller 7005 to the to the components of the electrochemical cell 7000.

TABLE 1

| | Sample signal functions of controller 7005 | | |
| --- | --- | --- | --- |
| Signal | Function | Default State | Additional Function |
| Cell +/− | Cell positive and negative connections continuing to main BMS power circuits. | N/A | |
| SW1-DRAIN | Discrete signal from controller 7005 to enable/disable the cell drain function. | OFF | |
| SW2-PREVENT | Discrete signal from the controller 7005 to enable/disable the dendrite remediate function. | OFF | Pulled to ground in case control is lost. |
| SW2-REMEDIATE | Discrete Signal from Controller to enable/disable dendrite remediate function. | OFF | Pulled to ground in case control is lost. |

TABLE 1-continued

| Signal | Function | Default State | Additional Function |
|--------|----------|---------------|---------------------|
| Sample signal functions of controller 7005 | | | |
| SW3-PU-REMEDIATE | Discrete signal from controller to enable/disable the dendrite remediate function via pullup. | OFF | Pulled to ground in case control is lost. |
| SW3-PD-REMEDIATE | Discrete signal from controller to enable/disable the dendrite remediate function via pulldown. | OFF | Pulled to ground in case control is lost. |
| CELL-V-SENSE | Analog signal to the controller 7005 to sense positive or negative cell stack voltage. | N/A | Used to determine differential voltage to the INTERLAYER(1,2)-V-SENSE voltage used in detection function. |
| INTERLAYER (1,2)-V-SENSE | Analog signal to the controller 7005 to sense the interlayer to negative voltage. | N/A | To be used to determine differential voltage to the CELL_V_SENSE voltage used in the detection function. |
| SW4-AIR-TRANSPORT | Discrete input from the user button to drain the electrochemical cell to about 15% SOC for air transport. | N/A | |

In some embodiments, the controller 7005 can implement one or more software control methods. In some embodiments, the controller 7005 can implement a dendrite detection method. Using a software monitoring loop, a voltage difference is measured between the total cell voltage (i.e., the voltage between the anode 7010 and the cathode 7030) and the interlayer voltage (i.e., the voltage between the anode 7010 and the interlayer 7060). If the interlayer voltage decreases to less than a threshold value (e.g., about 1 V, about 1.5 V, about 2 V, about 2.5 V, about 3 V, about 4 V, etc.), the potential of the interlayer 7060 is increased by connecting the interlayer 7060 to the cathode 7030 (i.e., through the resistor R₂ or the resistor R₃).

In some embodiments, the controller 7005 can implement a prevention control method via software. In implementing the prevention control method, a resistance can be applied to the interlayer 7060. Specifically, the switch S₂ can close to switch on the resistor R₃ to provide current flow from the cathode 7030 to the interlayer 7060 to help prevent dendrite growth. The resistance provides a continuous excitation of the interlayer 7060, such that a dendrite would not be able to form across either of the separators 7050. The prevention method can be used as part of an overall control strategy, wherein the voltage potential, current, and resistance to the interlayer 7060 can be changed based on a software control algorithm.

In some embodiments, the controller 7005 can implement a remediation control method via software. In implementing the remediation control method, the controller 7005 can act in an active prevention mode, where the potential of the interlayer 7060 is modulated or changed to apply different potentials. The potential of the interlayer 7060 can be increased (cathode side) or decreased (anode side) to maintain the cell function. When the dendrite forms and interfaces with the interlayer 7060, the voltage of the interlayer 7060 can be pulled up to the potential of the cathode 7030, with respect to the anode 7010. The dendrite is dissolved or remediated, and the voltage potential of the interlayer 7060 can return to be more similar to the voltage potential of the cathode 7030 with respect to the anode 7010.

The software implemented by the controller 7005 can include many operating modes. In some embodiments, the controller 7005 can implement an initialization mode, which executes once the controller 7005 has powered up. The controller 7005 can implement a monitoring mode. The monitoring mode can act as a main loop, in which voltages are read and a dendrite detection algorithm is repeatedly executed. In some embodiments, the controller 7005 can implement a remediation mode, in which voltages are read and a remediation algorithm executes. In some embodiments, the controller 7005 can implement a draining mode. This discharges the cell voltage (i.e., the voltage between the anode 7010 and the cathode 7030) down to about 0 V to prevent a thermal event. This mode should be implemented to protect the safety and property of the user. In some embodiments, the controller 7005 can include a power down mode, implemented via a BMS master controller when the BMS is powering down. In some embodiments, the controller 7005 can implement a prevention mode, in which voltages are read and a prevention algorithm executes. This mode can be executed at various intervals to allow a small potential of current to flow from the cathode 7030 to the interlayer 7060 to prevent formation of dendrites.

In some embodiments, the controller 7005 can implement a fault mode. The fault mode is a state entered when a fault is detected by the controller 7005. The electrochemical cell 7000 can operate in a safe state when fault mode is entered. The safe state can be defined by the control system functional design as determined by the system architectural design of the given device. Faults can be implemented in software control systems to protect the hardware of the electrochemical cell 7000 and the safety of the user. Examples of faults can include dendrite circuit overtemperature fault, overtemperature of the electrochemical cell 7000 fault, under temperature of the electrochemical cell 7000 fault, drain cell active fault (in which the aforementioned drain functionality has been activated), dendrite remediate failed fault (in which the aforementioned remediation functionality has failed), dendrite prevention failed fault (in which the aforementioned prevention functionality has failed), interlayer voltage differential warning fault (in which the differential between the voltage of the interlayer 7060 and the anode 7010 has decreased to less than a threshold value), interlayer voltage differential critical fault (in which the differential between the voltage of the inter-layer 7060 and the anode 7010 has decreased to less than a more critical threshold value), overall cell voltage overvolt-age fault, and/or overall cell voltage undervoltage fault.

In some embodiments, signals from throughout the elec-trochemical cell 7000 can be transferred (e.g., via a control-ler area network (CAN) bus) to the controller 7005. In some embodiments, such signals can include overall cell voltage between the anode 7010 and the cathode 7030, maximum overall cell voltage during the current power cycle, mini-mum overall cell voltage during the current power cycle, dendrite detection counter, fault status, voltage difference between the anode 7010 and the interlayer 7060, maximum voltage difference between the anode 7010 and the interlayer 7060, minimum voltage difference between the anode 7010 and the interlayer 7060, drain switch status and override, prevent switch status and override, remediate switch status and override, and power down command.

In some embodiments, the software implemented by the controller 7005 can include a detection algorithm. Via the detection algorithm, the controller 7005 can use software to detect the difference between dendrite growth, a cell short circuit, and cell gas generation. Once detected, the controller 7005 can take appropriate reactionary steps to attempt to remediate and report the system status via CAN messaging.

In some embodiments, the software implemented by the controller 7005 can execute signal filtering. For voltage signal inputs, several potential software filter algorithm methods can be implemented. These can include a median filter, a moving average filter, and a low-pass filter. Such filter algorithms can also be used with other types of sensors. The proper filter can depend on factors such as signal dynamics, accuracy, and loss limit.

Figure 70B:
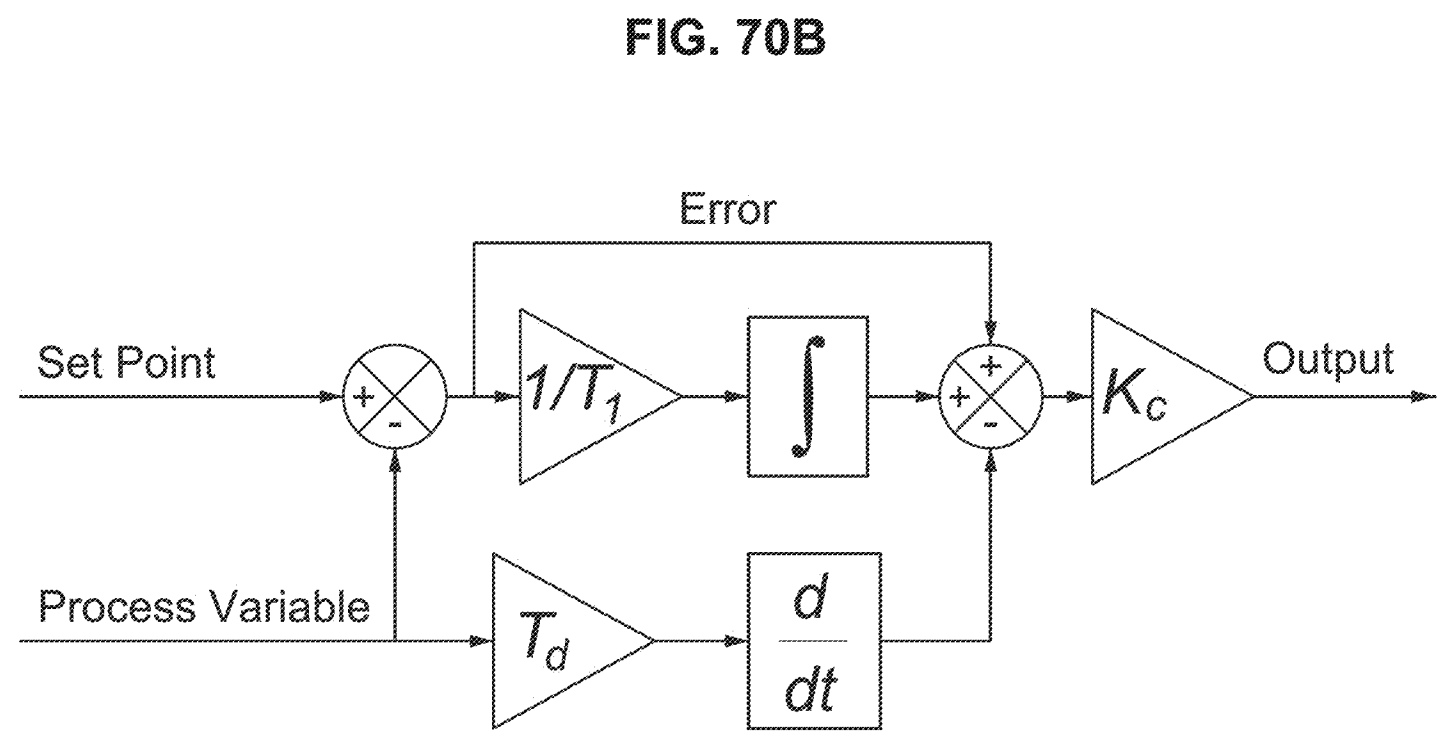

In some embodiments, the software implemented by the controller 7005 can include a dendrite control algorithm. For controlling the dendrite growth remediation, a closed loop control system can be used, implementing a proportional-integral-derivative (PID)_algorithm, as diagrammed in FIG. 70B. The setpoint in a PID algorithm can be a desired voltage differential calculated by subtracting the interlayer voltage from the cell voltage, for example, and dividing the difference by 2 (although other detection levels may be used). The process variable can be the actual real time voltage differential calculated by subtracting the software filtered interlayer voltage from the software filtered overall cell voltage and dividing the difference by 2. The output from the PID algorithm can be the control output that initiates the dendrite remediation action. In some embodi-ments, the control output can include a switch that applies a known resistance between the cathode 7030 and the inter-layer 7060. The derivative time (Td) can be determined during testing to tune the PID algorithm but can be tuned to be as small as possible. The proportional, integral, and derivative gains applied in the algorithm can also be deter-mined during testing to tune the algorithm.

Figure 71:
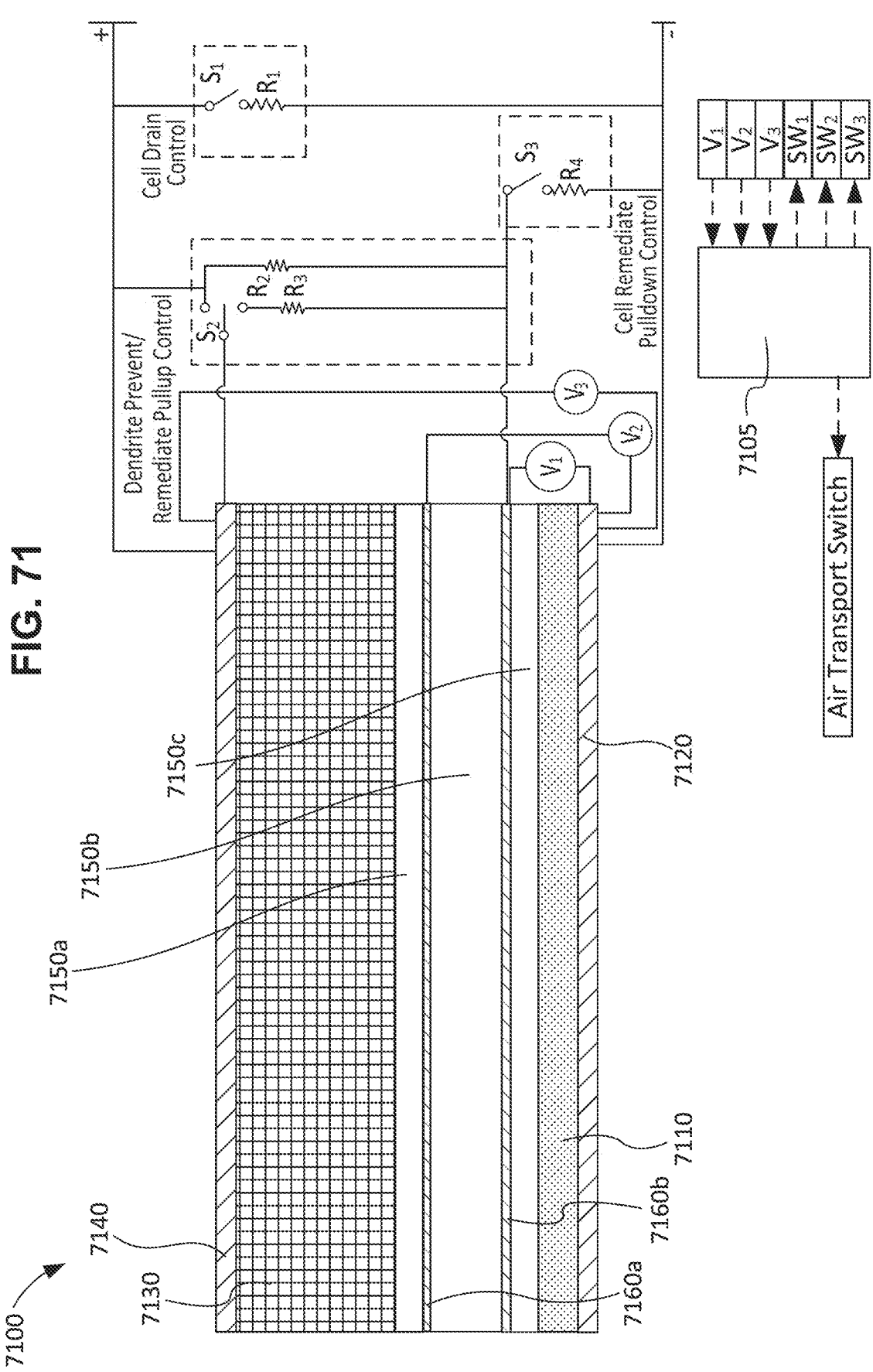
FIG. 71 is an illustration of an electrochemical cell with an interlayer, according to an embodiment.

FIG. 71 is an illustration of an electrochemical cell 7100 with interlayers 7160a, 7160b (collectively referred to as interlayers 7160), according to an embodiment. As shown, the electrochemical cell 7100 includes a controller 7105, an anode 7110 disposed on an anode current collector 7120, a cathode 7130 disposed on a cathode current collector 7140, with a first separator 7150a, a second separator 7150b, and a third separator 7150c disposed between the anode 7110 and the cathode 7130. The interlayer 7160a is disposed between the first separator 7150a and the second separator 7150b and the interlayer 7160b is disposed between the second separator 7150b and the third separator 7150c. In some embodiments, the anode 7110, the anode current collector 7120, the cathode 7130, the cathode current col-lector 7140, the first separator 7150a, the second separator 7150b, the third separator 7150c, and the interlayers 7160 can be the same or substantially similar to the anode 410, the anode current collector 420, the cathode 430, the cathode current collector 440, the first separator 450a, the second separator 450b, the third separator 450c, and the interlayers 460, as described above with reference to FIG. 4. In some embodiments, the controller 7105 can be the same or sub-stantially similar to the controller 7005, as described above with reference to FIG. 70. Thus, certain aspects of the controller 7105, the anode 7110, the anode current collector 7120, the cathode 7130, the cathode current collector 7140, the first separator 7150a, the second separator 7150b, the third separator 7150c, and the interlayers 7160 are not described in greater detail herein.

As shown, a voltage $V_1$ is measured between the anode current collector 7120 and the interlayer 7160a, a voltage $V_2$ is measured between the anode current collector 7120 and the interlayer 7160b, and a voltage $V_3$ is measured between the anode current collector 7120 and the cathode current collector 7140. As shown, a switch $S_1$ and a resistor $R_1$ control a cell drain control module. A switch $S_2$ and resistors $R_2$ and $R_3$ control a dendrite prevention and remediation control module. A switch $S_3$ and resistor $R_4$ control a cell remediation pulldown control module. The controller 7105 receives information about voltage $V_1$ and $V_2$ and controls switches $S_1$, $S_2$, $S_3$ as well as an air transport switch.

In some embodiments, the electrochemical cell 7100 and its controller 7105 can have any of the functionalities of the electrochemical cell 7000, and the controller 7005, as described above with reference to FIG. 70. A difference between these two cells is the presence of multiple inter-layers 7160 in the electrochemical cell 7100. The controller 7105 can include functionalities to pullup or pulldown the voltages of the interlayer 7160b. As shown, the interlayer 7160a is used for voltage and dendrite sensing and is not operably coupled to any switches. In some embodiments, the interlayer 7160a can be operably coupled to one or more switches, such that the interlayer 7160a can be subject to pullup and/or pulldown of voltage.

Figure 72:
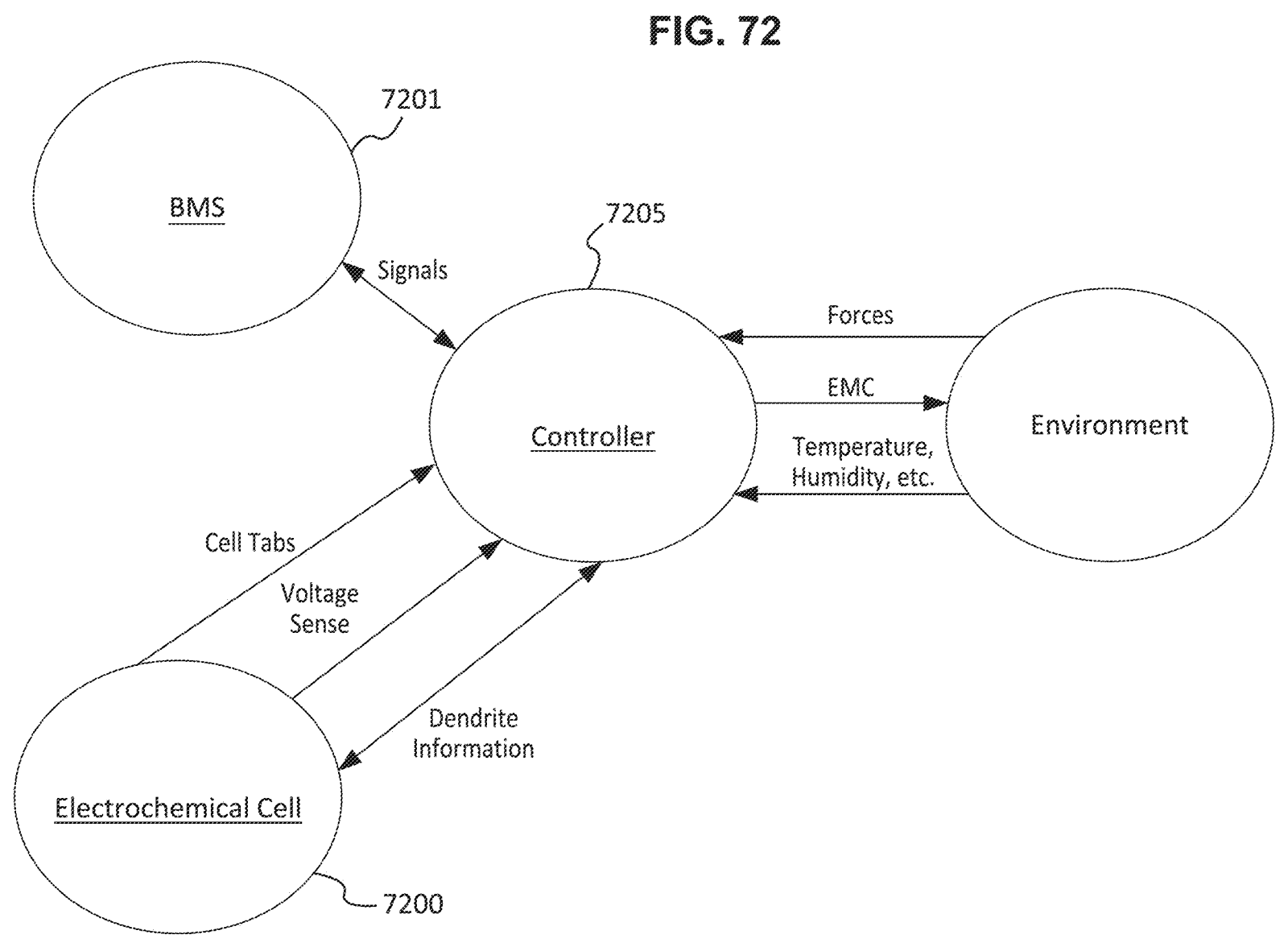

FIG. 72 shows interrelationships between a controller 7205 and related devices, according to an embodiment. As shown, the controller 7205 is in communication with a BMS 7201, an electrochemical cell 7200, and a surrounding environment. In some embodiments, the electrochemical cell 7200 can be the same or substantially similar to the electrochemical cell 7100, as described above with reference to FIG. 71. The controller 7205 is in communication with the electrochemical cell 7200 via cell tabs (e.g., an anode tab and a cathode tab). Voltage sense information and dendrite information are sent from the electrochemical cell 7200 to the controller 7205. The controller 7205 processes the received information and sends commands to various switches in the electrochemical cell 7200 via the BMS, based on the detection of dendrites. Additionally, the con-troller 7205 receives signals from the BMS 7201. These signals can include voltage measurement, current measure-ment, or any other information pertinent to the cells. The controller 7205 receives information from the surrounding environment, including temperature information, humidity information, and/or incident force information. The controller 7205 can simultaneously transmit electromagnetic compatibility (EMC) information to the surrounding environment.

Figure 73:
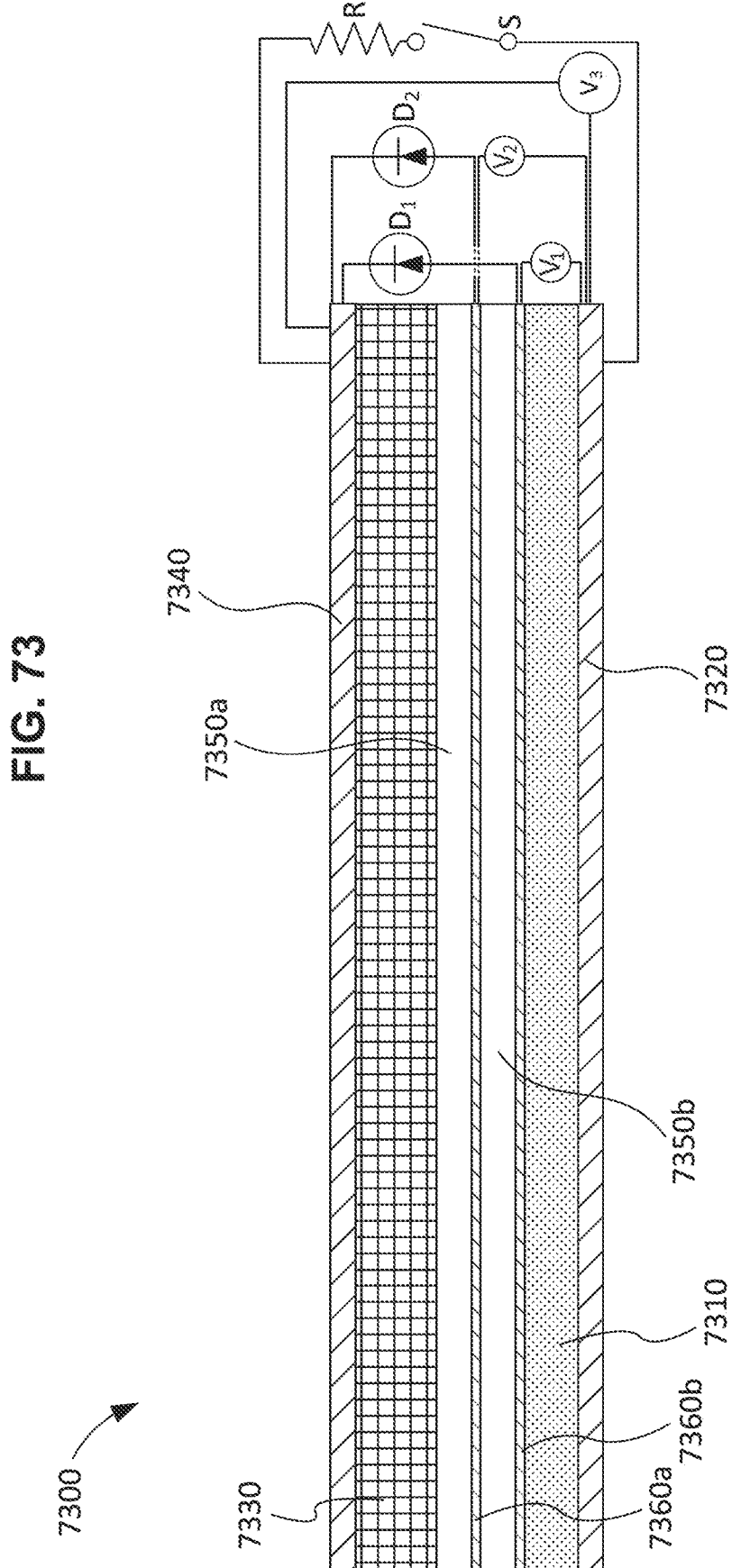
FIG. 73 is an illustration of an electrochemical cell with an interlayer, according to an embodiment.

FIG. 73 is an illustration of an electrochemical cell 7300 with interlayers 7360a, 7360b (collectively referred to as interlayers 7360), according to an embodiment. As shown, the electrochemical cell 7300 includes an anode 7310 disposed on an anode current collector 7320, a cathode 7330 disposed on a cathode current collector 7340, with a first separator 7350a and a second separator 7350b disposed between the anode 7310 and the cathode 7330. An interlayer 7360a is disposed between the first separator 7350a and the second separator 7350b and the interlayer 7360b is disposed between the second separator 7350b and the anode 7310. In some embodiments, the anode 7310, the anode current collector 7320, the cathode 7330, the cathode current collector 7340, the first separator 7350a, the second separator 7350b, the third separator 7350c, and the interlayers 7360 can be the same or substantially similar to the anode 410, the anode current collector 420, the cathode 430, the cathode current collector 440, the first separator 450a, the second separator 450b, the third separator 450c, and the interlayers 460, as described above with reference to FIG. 4.

As shown, a voltage $V_1$ is measured between the anode current collector 7320 and the interlayer 7360a, a voltage $V_2$ is measured between the anode current collector 7320 and the interlayer 7360b, and a voltage $V_3$ is measured between the anode current collector 7320 and the cathode current collector 7340. A diode $D_1$ connects the interlayer 7360b and the cathode current collector 7340. A diode $D_2$ connects the interlayer 7360a to the cathode current collector 7340. Current can flow from the anode current collector 7320 to the cathode current collector 7340 via a switch S and a resistor R.

As shown, the interlayer 7360b is in direct contact with the anode 7310. In some embodiments, the interlayer 7360b can be directly coupled to the anode 7310. With this direct coupling, the interlayer 7360b is shorted from the beginning of the operation of the electrochemical cell 7300. In some embodiments, the interlayer 7360b can be welded and/or brazed to the anode 7310. In some embodiments, the anode 7310 can include a lithium metal. In some embodiments, the anode 7310 can include a zero-lithium anode. In use, closing the switch S can create a external short circuit in response to signals from measuring the voltage $V_1$. The interlayer 7360b can be dedicated to its function as a coating but can be attached to the anode 7310. In some embodiments, the interlayer 7360a and/or the interlayer 7360b can include carbon. In some embodiments, the interlayer 7360a and/or the interlayer 7360b can include allotropes of carbon including activated carbon, hard carbon, soft carbon, Ketjen, carbon black, graphitic carbon, carbon fibers, carbon microfibers, vapor-grown carbon fibers (VGCF), fullerenic carbons including "buckyballs", carbon nanotubes (CNTs), multiwall carbon nanotubes (MWNTs), single wall carbon nanotubes (SWNTs), graphene, graphene sheets or aggregates of graphene sheets, and materials comprising fullerenic fragments, or any combination thereof.

In some embodiments, the interlayer 7360b can include scarified additives to form an insulative and/or stabilized SEI layer. In some embodiments, the anode 7310 can be connected to an external circuit. The external circuit can have a high resistance sufficient to prevent a short circuit between the anode 7310 and the interlayer 7360b. In some embodiments, the resistance of the external circuit can be variable. For example, the external circuit can have a first voltage during formation and/or initial charging of the electrochemical cell 7300 and a second voltage during discharge of the electrochemical cell 7300. During formation, the resistance can be lower than during cycling in order to facilitate SEI growth. The resistance can then be increased during cycling to limit self-discharge. This can facilitate controlled deposition between the interlayer 7360b and the anode 7310, such that the deposited material does not penetrate the separator 7350b or the separator 7350a. In some embodiments, the resistance of the electrochemical cell 7300 and the components thereof can be tuned to control SEI formation with a desired speed and morphology. This control can be exercised by changing the external resistance to the interlayer 7360b and effecting direct contact between the interlayer 7360b and different hosts (e.g., carbon, metals) that alloy with lithium or polymers. In some embodiments, the electrochemical cell 7300 can include a SEI forming additive. In some embodiments, the SEI forming additives can be included in the electrolyte. In some embodiments, the SEI forming additive can include decomposition additives, such as a nitrate based salt ($LiNO_3$, $Mg(NO_3)_2$, $KNO_3$), and/or a sulfite based salt. In some embodiments, the SEI forming additives can include a fluorine-rich solvent or additive, such as fluorinated ether. In some embodiments, the SEI forming additive can include a carbonate, and/or an acetate. In some embodiments, the SEI forming additive can include a morphology-controlled additive such as cessium bistriflimide, and/or $LiASF_6$. In some embodiments, the SEI forming additive can include fluoroethylene carbonate (FEC) and 2-fluoropyridine (2-FP). In some embodiments, the SEI forming additives can include vinylene carbonate (VC), dimethyl sulfate (DMS), poly(sulfur-random-1,3-di-isopropenylbenzene) (PSD), N,N-dimethylethanolamine (DMEA), trimethylsilyl (fluorosulfonyl) (n-nonafluorobutanesulfonyl) imide (TMS-FNFSI), tripropargyl phosphate (TPP), and/or tris(2, 2, 2-trifluoroethyl) borate (TTFEB). In some embodiments, the SEI forming additive can include organic salts (e.g., lithium bis(oxalato) borate (LiBOB), lithium difluoro (oxalate) borate (LiDFOB).

Figure 74:
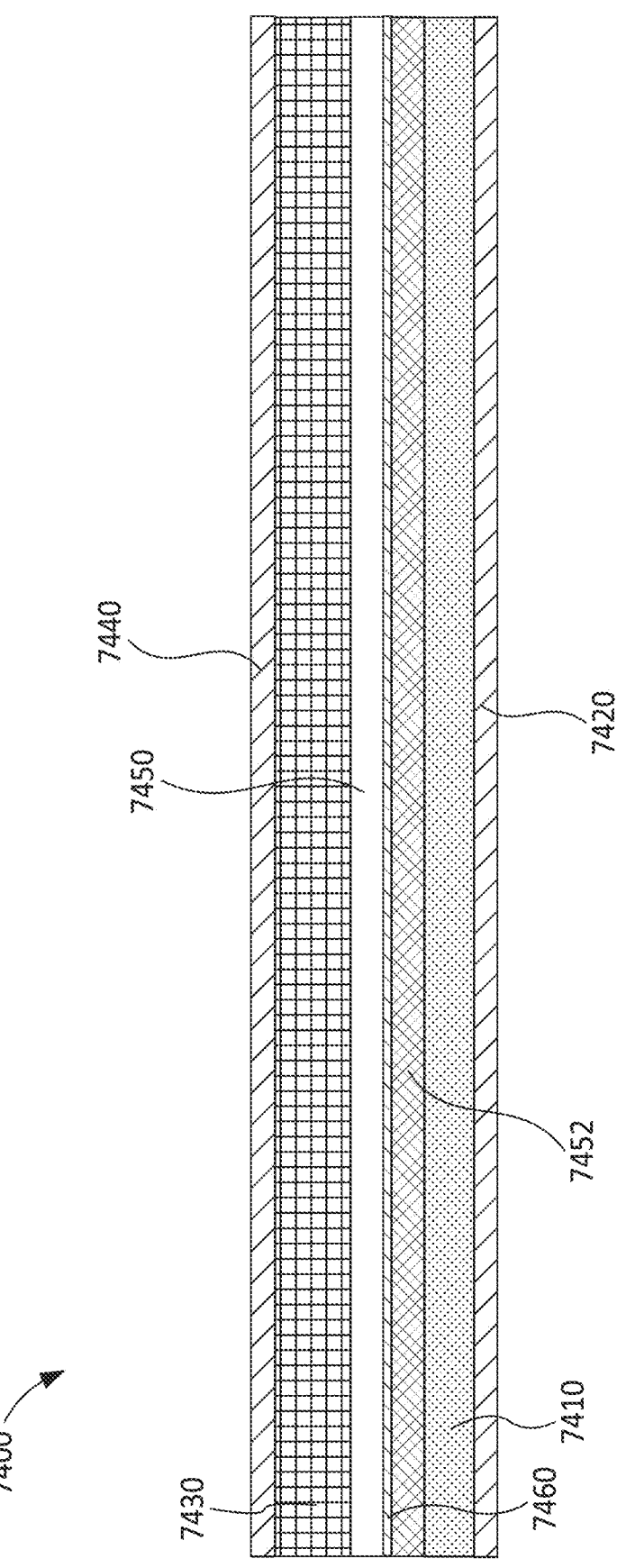
FIG. 74 is an illustration of an electrochemical cell with an interlayer, according to an embodiment.

FIG. 74 is an illustration of an electrochemical cell 7400 with an interlayer 7460, according to an embodiment. As shown, the electrochemical cell 7400 includes an anode 7410 disposed on an anode current collector 7420, a cathode 7430 disposed on a cathode current collector 7440, with a separator 7450 and a solid-state electrolyte (SSE) layer 7452 disposed between the anode 7410 and the cathode 7430. An interlayer 7460 is disposed between the separator 7350 and the SSE layer 7452. In some embodiments, the anode 7410, the anode current collector 7420, the cathode 7430, the cathode current collector 7440, the separator 7450, and the interlayer 7460 can be the same or substantially similar to the anode 210, the anode current collector 220, the cathode 230, the cathode current collector 240, the separator 250, and the interlayer 260, as described above with reference to FIGS. 2A-2B. Thus, certain aspects of the anode 7410, the anode current collector 7420, the cathode 7430, the cathode current collector 7440, the separator 7450, and the interlayer 7460 are not described in greater detail herein.

In some embodiments, the anode 7410 can include lithium metal. The interface between the SSE layer 7452 and a lithium metal anode delivers high coulombic efficiency without liquid electrolyte. Further, a dry interface (i.e., between a metal and a solid electrolyte layer) leads to good cycling and capacity retention. However, the dry interface alone does not necessarily stop lithium dendrite formation. Thus, the cathode 7430 includes a liquid electrolyte (i.e., a catholyte). In some embodiments, the cathode 7430 can include a semi-solid electrode. In some embodiments, the cathode 7430 can include a conventional solid electrode (i.e., with binder) with a liquid electrolyte. In some embodiments, the interlayer 7460 can include carbon and a solid-state electrolyte to act as a conductive layer. In some embodiments, the SSE layer 7452 can include sulfide. The combination of the SSE layer 7452 and the interlayer 7460 can prevent dendrites from forming. At the same time, liquid electrolyte can be prevented from entering the anode side of the electrochemical cell 7400 so the interface between the anode 7410 and the SSE layer 7452 remains dry. Also, this arrangement can prevent the liquid electrolyte from dissolving the SSE layer 7452 and the solid-state electrolyte in the interlayer 7460, particularly for sulfide-type solid-state electrolyte.

In production, carbon (e.g., activated carbon, hard carbon, soft carbon, Ketjen, carbon black, graphitic carbon, carbon fibers, carbon microfibers, VGCFs, fullerenic carbons, CNTs, MWNTs, SWNTs, graphene, graphene sheets or aggregates of graphene sheets, materials comprising fullerinic fragments, or any combination thereof), binder, are combined with a solid-state electrolyte to form the interlayer 7460. This creates a barrier with little or no porosity for preventing catholyte from migrating from the cathode 7430 to the anode 7410. This prevents dissolution of the SSE layer 7452. Alternatively, the separator 7450 can be coated with binder to produce the same effect. In some embodiments, the interlayer 7460 can have a porosity of less than about 5%, less than about 4%, less than about 3%, less than about 2%, less than about 1%, less than about 0.9%, less than about 0.8%, less than about 0.7%, less than about 0.6%, less than about 0.5%, less than about 0.4%, less than about 0.3%, less than about 0.2%, less than about 0.1%, or about 0%. In some embodiments, the separator 7450 can include a ceramic coating with a polymer.

Figure 75A:
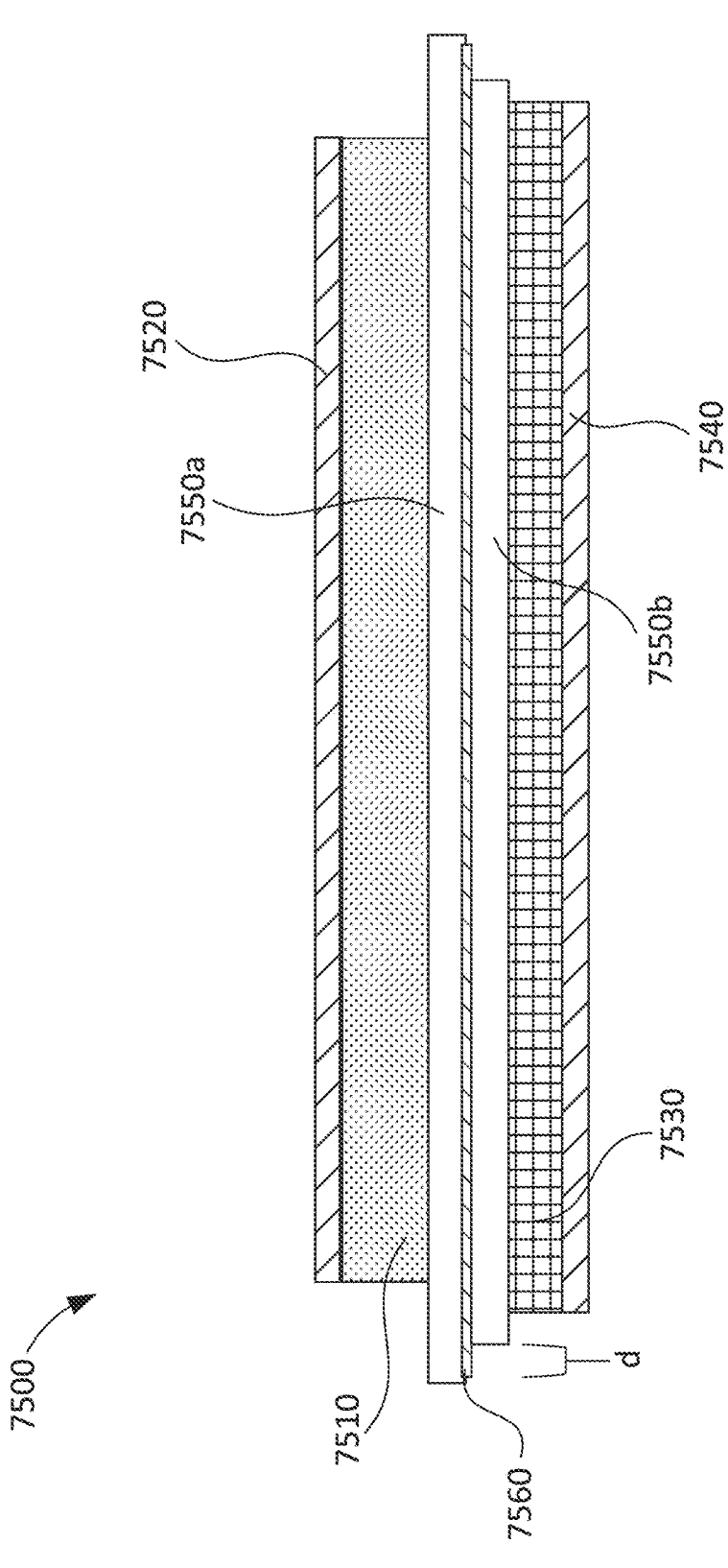
FIGS. 75A-75C are illustrations of an electrochemical cell with an interlayer, according to an embodiment.
Figure 75B:
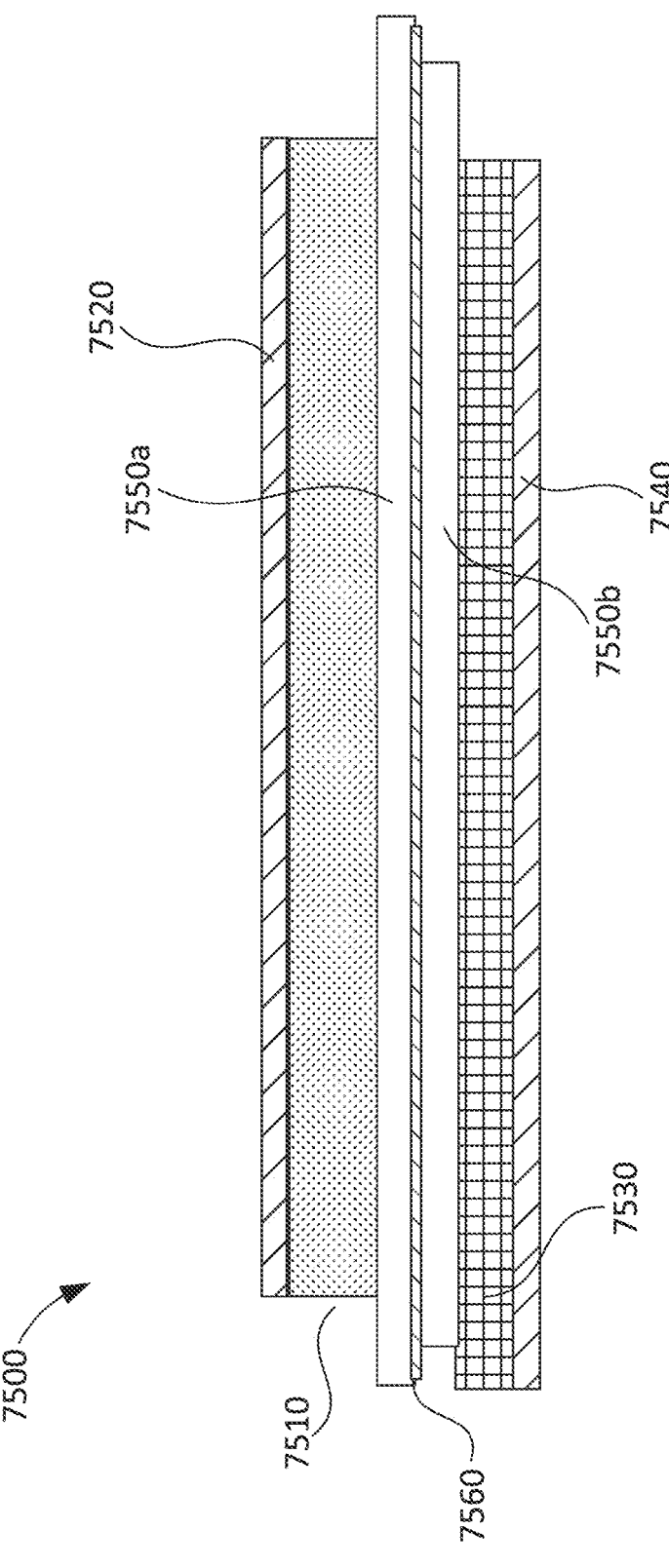
Figure 75C:
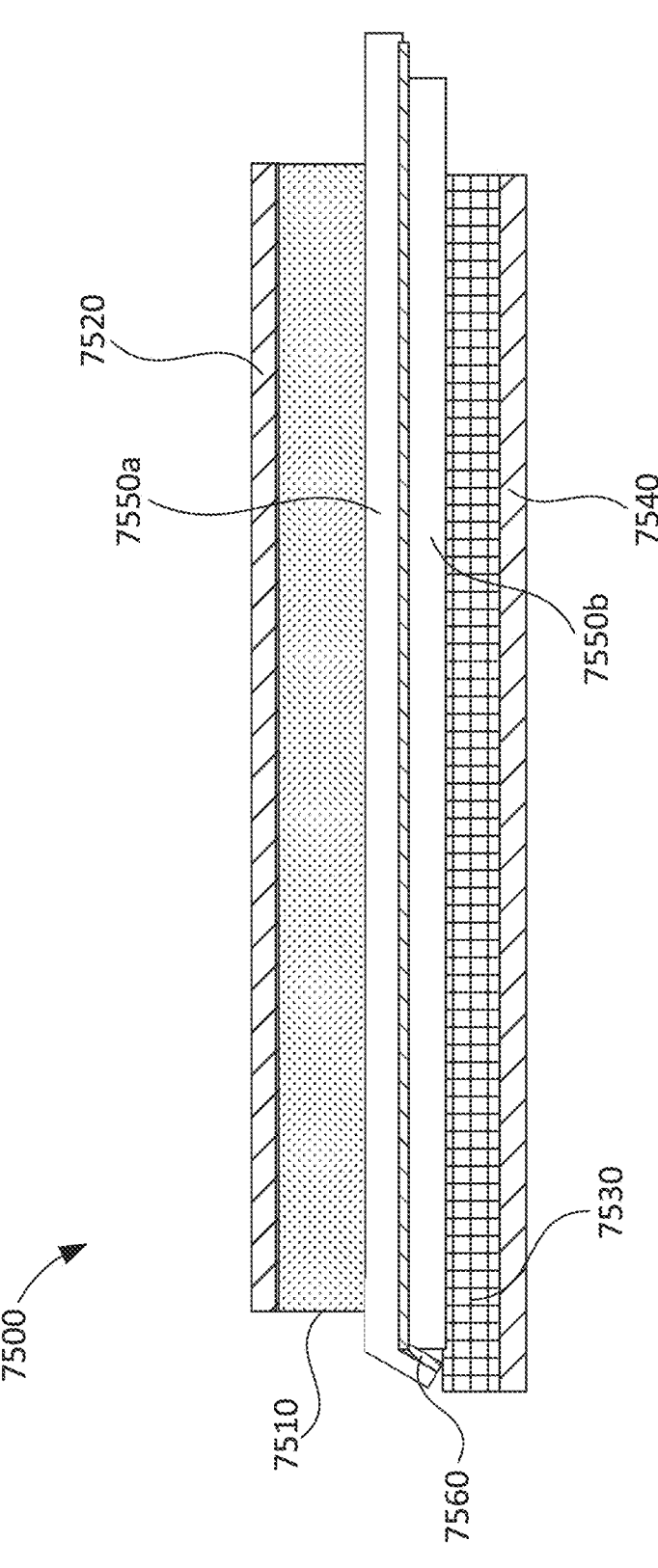

FIGS. 75A-75C are illustrations of an electrochemical cell 7500 with an interlayer 7560, according to an embodiment. As shown, the electrochemical cell 7500 includes an anode 7510 disposed on an anode current collector 7520, a cathode 7530 disposed on a cathode current collector 7540, with a first separator 7550a and a second separator 7550b disposed between the anode 7510 and the cathode 7530. The interlayer 7560 is disposed between the first separator 7550a and the second separator 7550b. In some embodiments, the anode 7510, the anode current collector 7520, the cathode 7530, the cathode current collector 7540, the first separator 7550a, the second separator 7550b, and the interlayer 7560 can be the same or substantially similar to the anode 210, the anode current collector 220, the cathode 230, the cathode current collector 240, the first separator 250a, the second separator 250b, and the interlayer 260, as described above with reference to FIGS. 2A-2B. Thus, certain aspects of the anode 7510, the anode current collector 7520, the cathode 7530, the cathode current collector 7540, the first separator 7550a, the second separator 7550b, and the interlayer 7560 are not described in greater detail herein.

As shown, the first separator 7550a and the interlayer 7560 extend beyond the outside edges of the second separator 7550b by an extension distance d. This allows for the interlayer 7560 to potentially contact the cathode 7530 if the cathode 7530 becomes misaligned from the anode 7510. This effectively blocks the cathode 7530 from contacting the anode 7510 and short circuiting. Rather, the cathode 7530 contacts the interlayer 7560 and short circuits. The extension of the interlayer 7560 acts as an edge detection point, and measuring the voltage between the cathode 7530 and the interlayer 7560 can detect such a short circuit (i.e., when the voltage difference is decreased to less than a threshold value). The electrochemical cell 7500 can subsequently be disabled in order to prevent a more catastrophic short circuit event.

In some embodiments, the extension distance d can be at least about 100 μm, at least about 200 μm, at least about 300 μm, at least about 400 μm, at least about 500 μm, at least about 600 μm, at least about 700 μm, at least about 800 μm, at least about 900 μm, at least about 1 mm, at least about 1.1 mm, at least about 1.2 mm, at least about 1.3 mm, at least about 1.4 mm, at least about 1.5 mm, at least about 1.6 mm, at least about 1.7 mm, at least about 1.8 mm, or at least about 1.9 mm. In some embodiments, the extension distance d can be no more than about 2 mm, no more than about 1.9 mm, no more than about 1.8 mm, no more than about 1.7 mm, no more than about 1.6 mm, no more than about 1.5 mm, no more than about 1.4 mm, no more than about 1.3 mm, no more than about 1.2 mm, no more than about 1.1 mm, no more than about 1 mm, no more than about 900 μm, no more than about 800 μm, no more than about 700 μm, no more than about 600 μm, no more than about 500 μm, no more than about 400 μm, no more than about 300 μm, or no more than about 200 μm. Combinations of the above-referenced extension distances d are also possible (e.g., at least about 100 μm and no more than about 2 mm or at least about 300 μm and no more than about 1 mm), inclusive of all values and ranges therebetween. In some embodiments, the extension distance d can be about 100 μm, about 200 μm, about 300 μm, about 400 μm, about 500 μm, about 600 μm, about 700 μm, about 800 μm, about 900 μm, about 1 mm, about 1.1 mm, about 1.2 mm, about 1.3 mm, about 1.4 mm, about 1.5 mm, about 1.6 mm, about 1.7 mm, about 1.8 mm, about 1.9 mm, or about 2 mm.

FIG. 75A shows the electrochemical cell 7500 in a condition where the anode 7510 is aligned properly with the cathode 7530. In FIG. 75B, the cathode 7530 has become misaligned with the anode 7510. In FIG. 75C, the first separator 7550a and the interlayer 7560 contact the cathode 7530 to prevent short-circuiting between the anode 7510 and the cathode 7530. As shown, the first separator 7550a and the interlayer 7560 are bent to contact the cathode 7530. In some embodiments, the cathode 7530 can bend to contact the interlayer 7560. In some embodiments, the cathode 7530, the first separator 7550a, and the interlayer 7560 can each bend to contact each other. As shown, the first separator 7550a and the interlayer 7560 are wider than the second separator 7550b, such that the interlayer 7560 can contact the cathode 7530. In some embodiments, the second separator 7550b and the interlayer 7560 can be longer than the first separator 7550a, such that the interlayer 7560 can contact the anode 7510. As shown, the first separator 7550a and the interlayer 7560 extend beyond the second separator 7550b on all sides. In some embodiments, the first separator 7550a and the interlayer 7560 can extend beyond the second separator 7550b on one side, two side, three sides, or any number of sides. As shown, the edge of the interlayer 7560 is approximately flush with the edge of the first separator 7550a. In some embodiments, the edge of the first separator 7550a can extend beyond the edge of the interlayer 7560 (e.g., by a distance of about 100 μm, about 200 μm, about 300 μm, about 400 μm, about 500 μm, about 600 μm, about 700 μm, about 800 μm, about 900 μm, about 1 mm, about 1.1 mm, about 1.2 mm, about 1.3 mm, about 1.4 mm, about 1.5 mm, about 1.6 mm, about 1.7 mm, about 1.8 mm, about 1.9 mm, or about 2 mm, inclusive of all values and ranges therebetween).

Figure 76A:
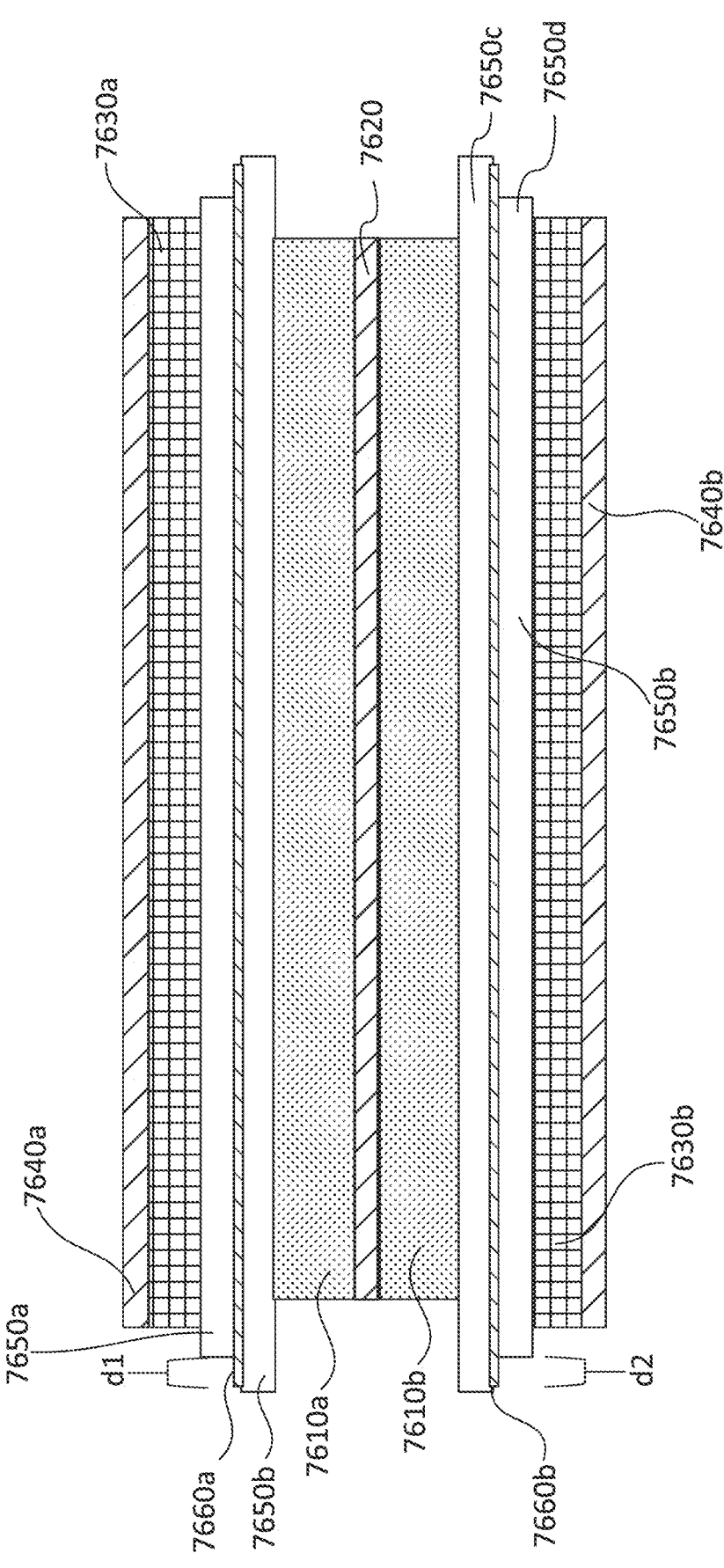
FIGS. 76A-76C are illustrations of an electrochemical cell with multiple interlayers, according to an embodiment.
Figure 76B:
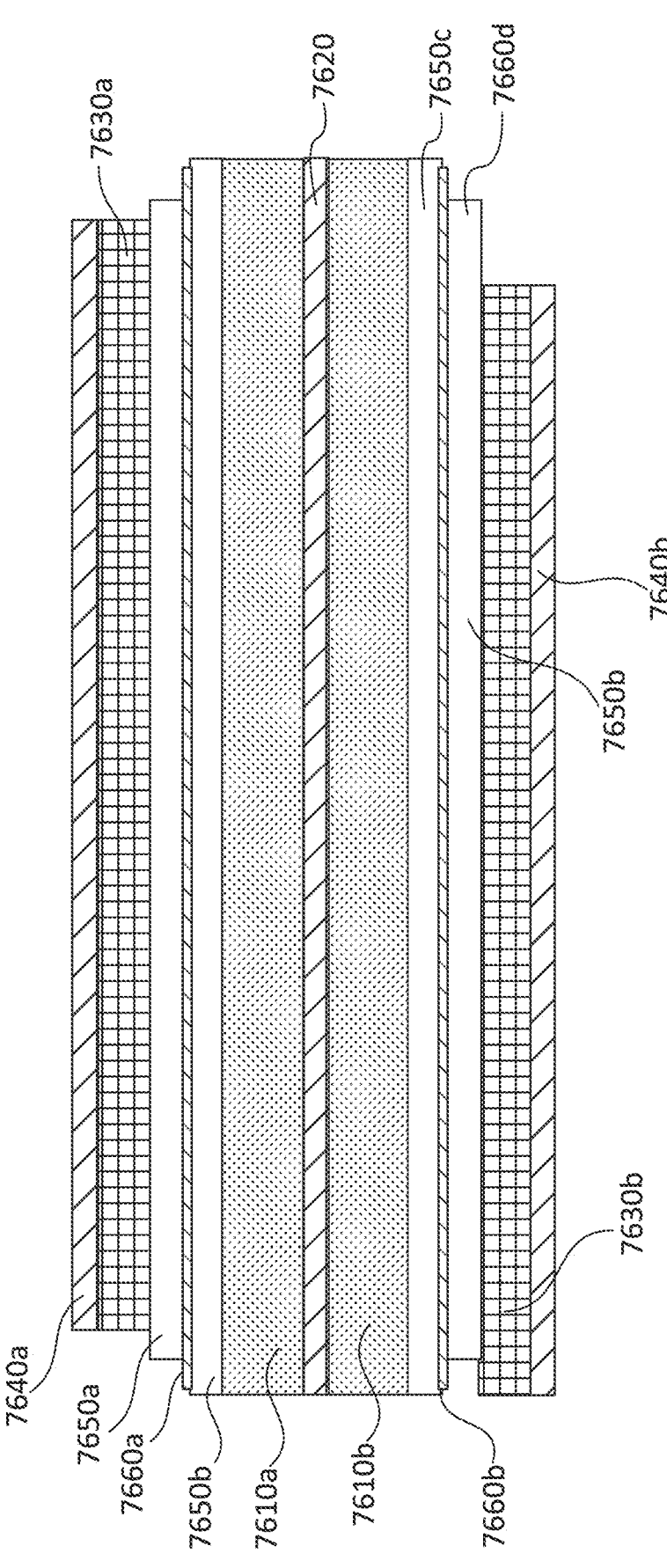
Figure 76C:
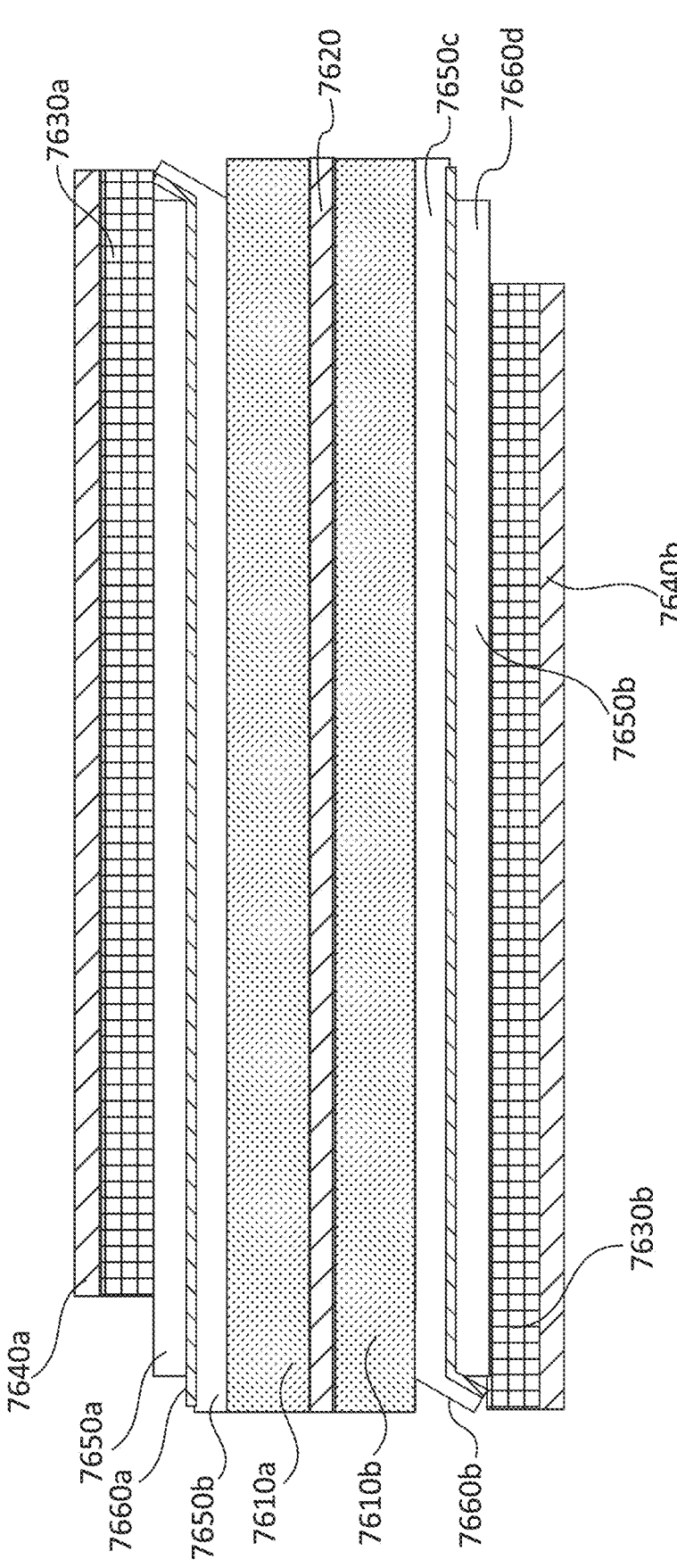

FIGS. 76A-76C are illustrations of an electrochemical cell 7600 with interlayers 7660a, 7660b (collectively referred to as interlayers 7660). As shown, the electrochemical cell 7600 operates as a bicell with anodes 7610*a*, 7610*b* (collectively referred to as anodes 7610) disposed on an anode current collector 7610, cathodes 7630*a*, 7630*b* (collectively referred to as cathodes 7630) disposed on cathode current collectors 7640*a*, 7640*b* (collectively referred to as cathode current collectors 7640), separators 7650*a*, 7650*b* disposed between the anode 7610*a* and the cathode 7630*a*, the interlayer 7660*a* disposed between the separators 7650*a*, 7650*b*, and the interlayer 7660*b* disposed between separators 7650*c*, 7650*d* (separators 7650*a*, 7650*b*, 7650*c*, 7650*d* collectively referred to as separators 7650). In some embodiments, the anodes 7610, the anode current collector 7620, the cathodes 7630, the cathode current collectors 7640, the separators 7650, and the interlayers 7660 can be the same or substantially similar to anodes 7510, the anode current collector 7520, the cathodes 7530, the cathode current collectors 7540, the separators 7550, and the interlayers 7560, as described above with reference to FIGS. 75A-75C. Thus, certain aspects of the anodes 7610, the anode current collector 7620, the cathodes 7630, the cathode current collectors 7640, the separators 7650, and the interlayers 7660 are not described in greater detail herein.

As shown, the interlayer 7660*a* and the separator 7650*b* extend beyond the separator 7650*a* by an extension distance d1. As shown, the interlayer 7660*b* and the separator 7650*c* extend beyond the separator 7650*d* by an extension distance d2. In some embodiments, the extension distances d1 and/or d2 can be at least about 100 µm, at least about 200 µm, at least about 300 µm, at least about 400 µm, at least about 500 µm, at least about 600 µm, at least about 700 µm, at least about 800 µm, at least about 900 µm, at least about 1 mm, at least about 1.1 mm, at least about 1.2 mm, at least about 1.3 mm, at least about 1.4 mm, at least about 1.5 mm, at least about 1.6 mm, at least about 1.7 mm, at least about 1.8 mm, or at least about 1.9 mm. In some embodiments, the extension distances d1 and/or d2 can be no more than about 2 mm, no more than about 1.9 mm, no more than about 1.8 mm, no more than about 1.7 mm, no more than about 1.6 mm, no more than about 1.5 mm, no more than about 1.4 mm, no more than about 1.3 mm, no more than about 1.2 mm, no more than about 1.1 mm, no more than about 1 mm, no more than about 900 µm, no more than about 800 µm, no more than about 700 µm, no more than about 600 µm, no more than about 500 µm, no more than about 400 µm, no more than about 300 µm, or no more than about 200 µm. Combinations of the above-referenced extension distances d1 and/or d2 are also possible (e.g., at least about 100 µm and no more than about 2 mm or at least about 300 µm and no more than about 1 mm), inclusive of all values and ranges therebetween. In some embodiments, the extension distances d1 and/or d2 can be about 100 µm, about 200 µm, about 300 µm, about 400 µm, about 500 µm, about 600 µm, about 700 µm, about 800 µm, about 900 µm, about 1 mm, about 1.1 mm, about 1.2 mm, about 1.3 mm, about 1.4 mm, about 1.5 mm, about 1.6 mm, about 1.7 mm, about 1.8 mm, about 1.9 mm, or about 2 mm.

FIG. 76A shows the cathodes 7630 properly aligned with the anodes 7610. FIG. 76B show the cathodes 7630 misaligned with the anodes 7610. In FIG. 76C, the interlayer 7660*a* and the separator 7650*b* are bent, such that the cathode 7630*a* contacts the interlayer 7660*a*, while the interlayer 7660*b* and the separator 7650*c* are bent, such that the cathode 7630*b* contacts the interlayer 7660*b*. In some embodiments, the anodes 7610 and the cathodes 7630 can have the opposite orientation to how they are depicted in FIGS. 76A-76C. In other words, the electrochemical cell

7600 can be built out from a central cathode current collector 7640 with anodes 7610 on the outside.

Figure 77A:
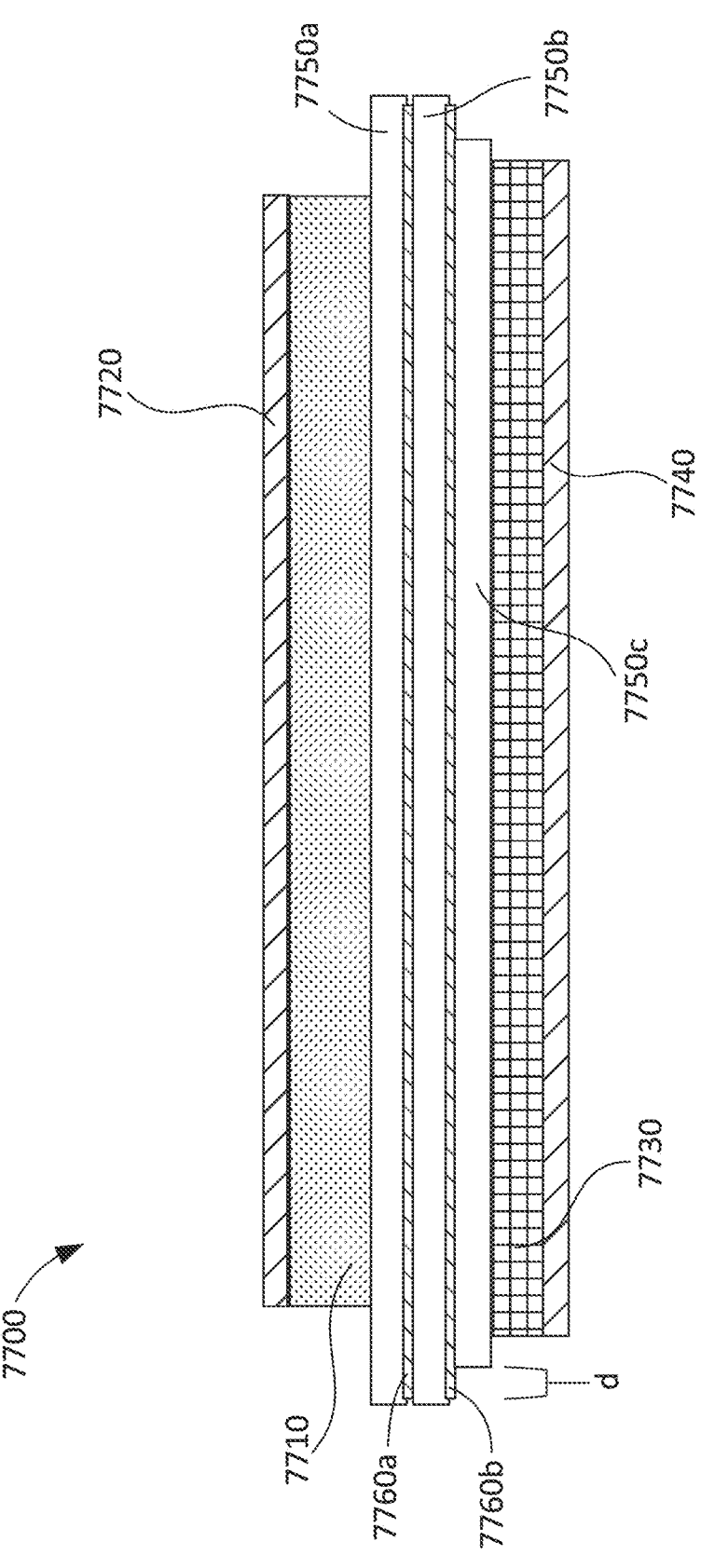
FIGS. 77A-77C are illustrations of an electrochemical cell with multiple interlayers, according to an embodiment.
Figure 77B:
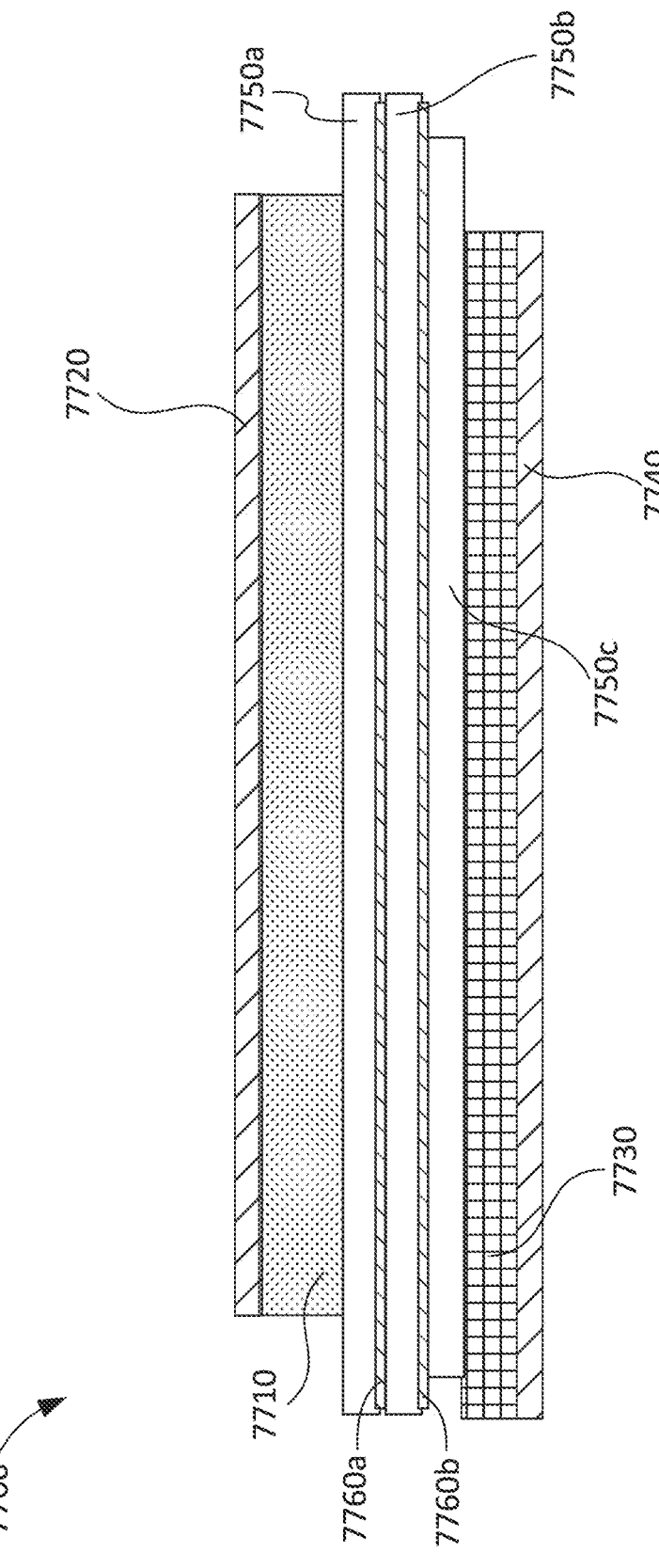
Figure 77C:
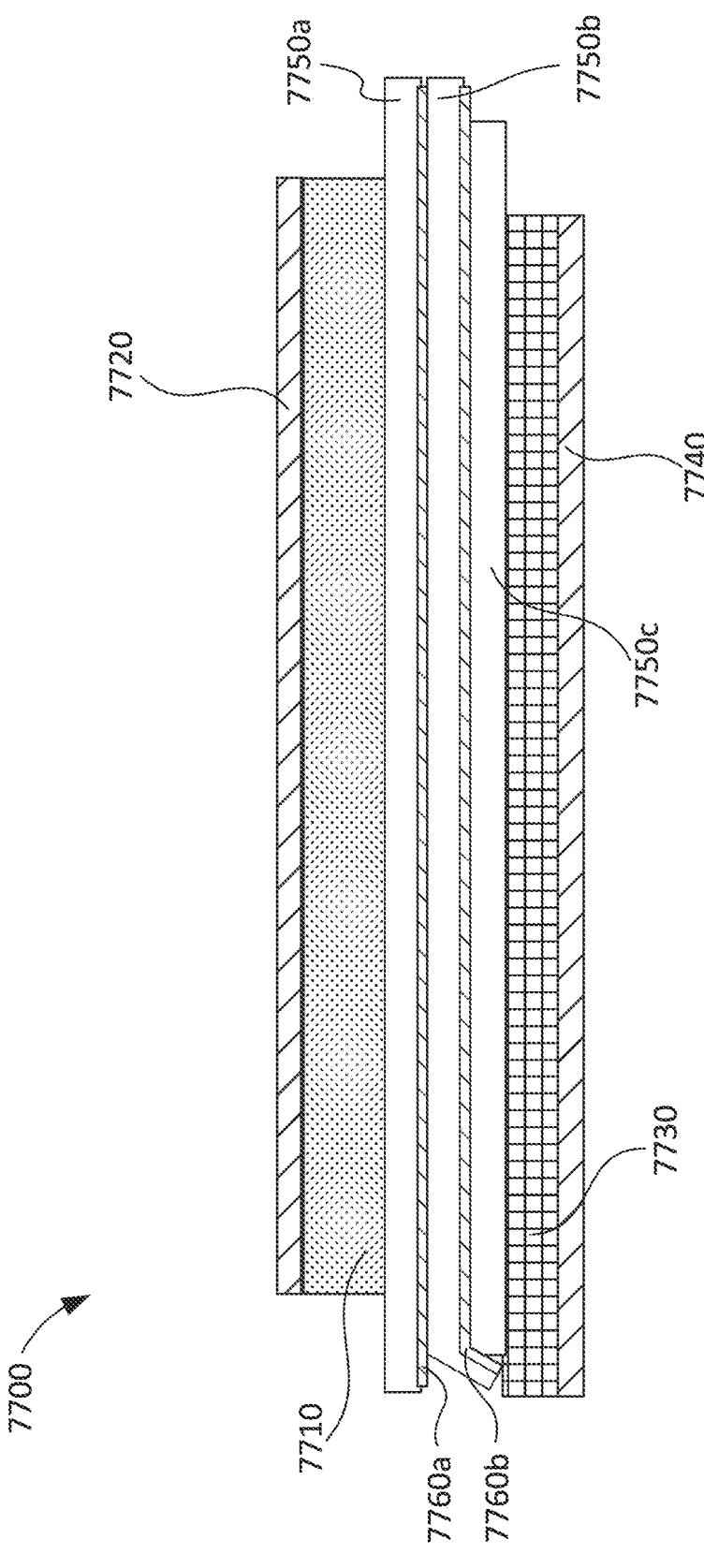

FIGS. 77A-77C are illustrations of an electrochemical cell 7700 with multiple interlayers, according to an embodiment. As shown, the electrochemical cell 7700 includes an anode 7710 disposed on an anode current collector 7720, a cathode 7730 disposed on a cathode current collector 7740, with a first separator 7750*a*, a second separator 7750*b*, and a third separator 7750*c* (collectively referred to as separators 7750) disposed between the anode 7710 and the cathode 7730. A first interlayer 7760*a* is disposed between the first separator 7750*a* and the second separator 7750*b*. A second interlayer 7760*b* is disposed between the second separator 7750*b* and the third separator 7750*c*. In some embodiments, the anode 7710, the anode current collector 7720, the cathode 7730, the cathode current collector 7740, the first separator 7750*a*, the second separator 7750*b*, the third separator 7750*c*, the first interlayer 7760*a*, and the second interlayer 7760*b* can be the same or substantially similar to the anode 410, the anode current collector 420, the cathode 430, the cathode current collector 440, the first separator 450*a*, the second separator 450*b*, the third separator 450*c*, the first interlayer 460*a*, and the second interlayer 460*b*. Thus, certain aspects of the anode 7710, the anode current collector 7720, the cathode 7730, the cathode current collector 7740, the first separator 7750*a*, the second separator 7750*b*, the third separator 7750*c*, the first interlayer 7760*a*, and the second interlayer 7760*b* are not described in greater detail herein.

As shown, the interlayer 7760*b* extends beyond the separator 7750*c* by an extension distance d. In some embodiments, the extension distance d can be at least about 100 µm, at least about 200 µm, at least about 300 µm, at least about 400 µm, at least about 500 µm, at least about 600 µm, at least about 700 µm, at least about 800 µm, at least about 900 µm, at least about 1 mm, at least about 1.1 mm, at least about 1.2 mm, at least about 1.3 mm, at least about 1.4 mm, at least about 1.5 mm, at least about 1.6 mm, at least about 1.7 mm, at least about 1.8 mm, or at least about 1.9 mm. In some embodiments, the extension distance d can be no more than about 2 mm, no more than about 1.9 mm, no more than about 1.8 mm, no more than about 1.7 mm, no more than about 1.6 mm, no more than about 1.5 mm, no more than about 1.4 mm, no more than about 1.3 mm, no more than about 1.2 mm, no more than about 1.1 mm, no more than about 1 mm, no more than about 900 µm, no more than about 800 µm, no more than about 700 µm, no more than about 600 µm, no more than about 500 µm, no more than about 400 µm, no more than about 300 µm, or no more than about 200 µm. Combinations of the above-referenced extension distances d are also possible (e.g., at least about 100 µm and no more than about 2 mm or at least about 300 µm and no more than about 1 mm), inclusive of all values and ranges therebetween. In some embodiments, the extension distance d can be about 100 µm, about 200 µm, about 300 µm, about 400 µm, about 500 µm, about 600 µm, about 700 µm, about 800 µm, about 900 µm, about 1 mm, about 1.1 mm, about 1.2 mm, about 1.3 mm, about 1.4 mm, about 1.5 mm, about 1.6 mm, about 1.7 mm, about 1.8 mm, about 1.9 mm, or about 2 mm.

In FIG. 77A, the cathode 7730 is in proper alignment with the anode 7710. In FIG. 77B, the cathode 7730 has shifted and is misaligned with the anode 7710. In FIG. 77C, the interlayer 7760*b* has bent, such that the separator 7760*b* contacts the cathode 7730. As shown, the interlayer 7760*a* and the separator 7750*a* do not extend beyond the separator 7750*b*. This configuration provides a short circuit opportunity for the interlayer 7760b and the cathode 7730 while preventing a short circuit opportunity between the interlayer 7760a and the cathode 7730. As shown, the electrochemical cell 7700 is configured such that the interlayer 7760b short circuits with the cathode 7730. In some embodiments, the electrochemical cell 7700 can be configured such that the interlayer 7760a short circuits with the anode 7710. In other words, the interlayer 7760a can extend beyond an outside edge of the separator 7750a.

Figure 78A:
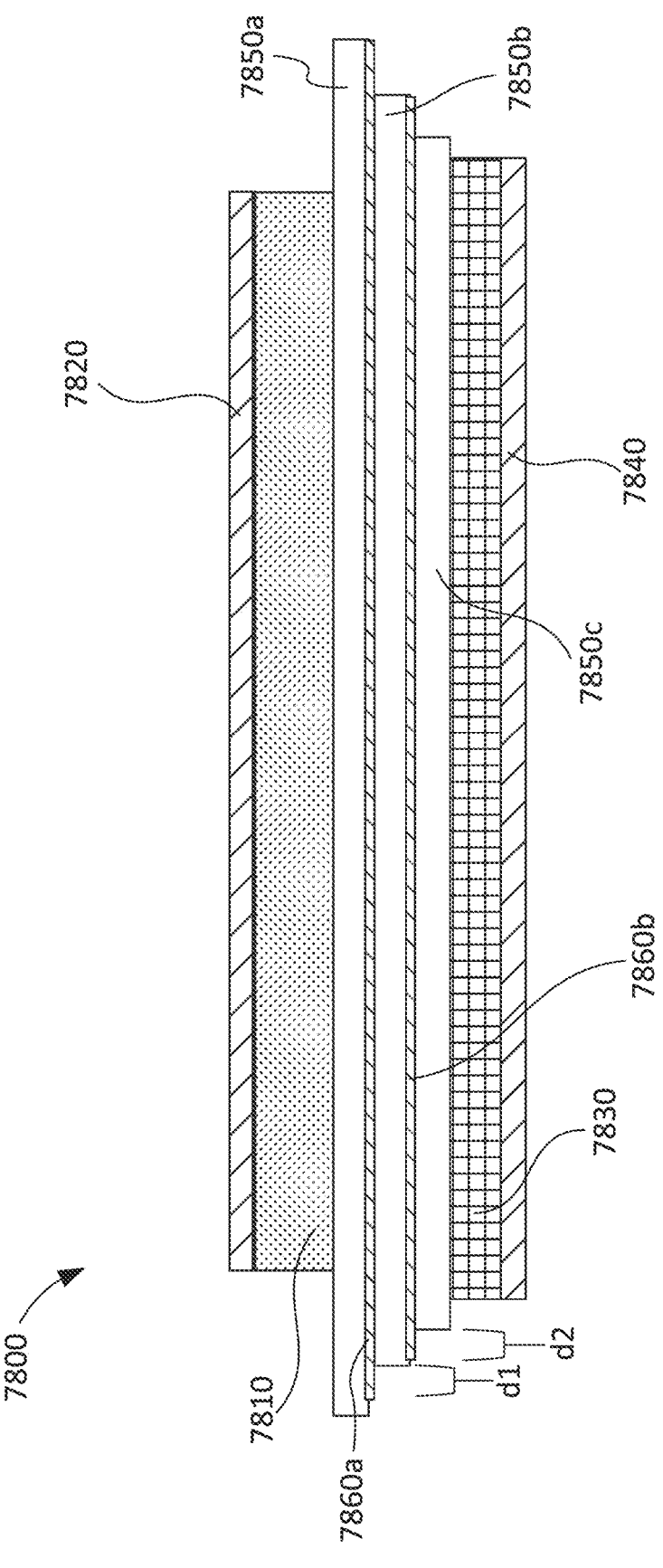
Figure 78B:
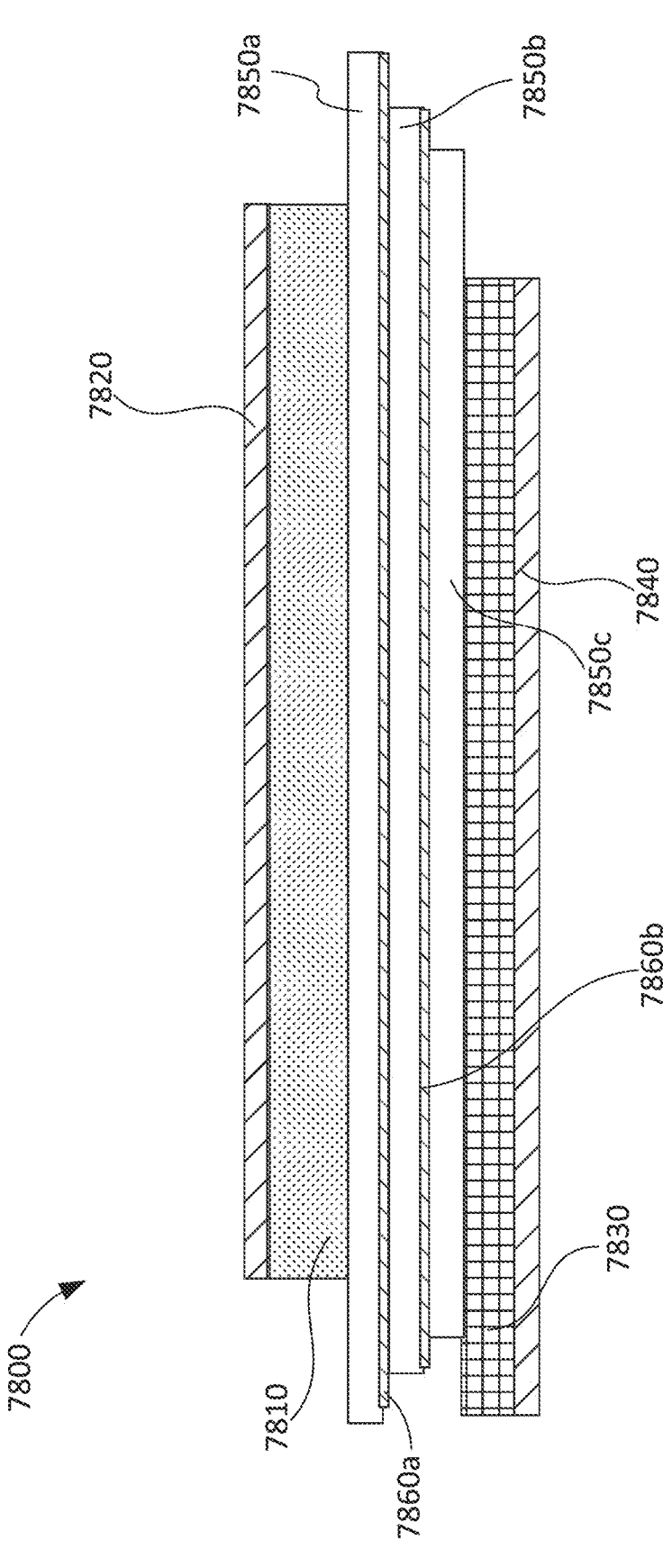
Figure 78C:
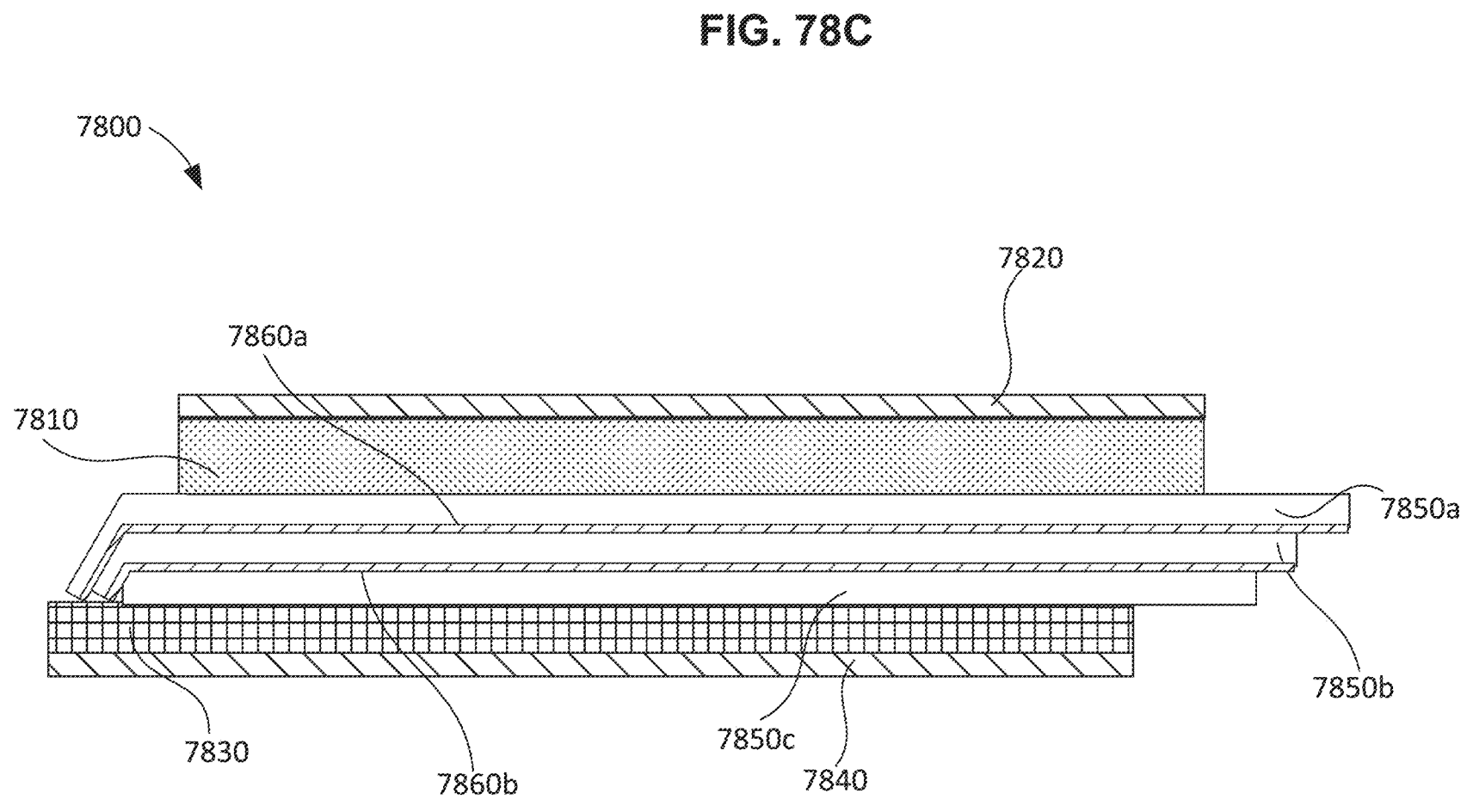

FIGS. 78A-78C are illustrations of an electrochemical cell 7800 with multiple interlayers, according to an embodiment. As shown, the electrochemical cell 7800 includes an anode 7810 disposed on an anode current collector 7820, a cathode 7830 disposed on a cathode current collector 7840, with a first separator 7850a, a second separator 7850b, and a third separator 7850c (collectively referred to as separators 7850) disposed between the anode 7810 and the cathode 7830. A first interlayer 7860a is disposed between the first separator 7850a and the second separator 7850b. A second interlayer 7860b is disposed between the second separator 7850b and the third separator 7850c. In some embodiments, the anode 7810, the anode current collector 7820, the cathode 7830, the cathode current collector 7840, the first separator 7850a, the second separator 7850b, the third separator 7850c, the first interlayer 7860a, and the second interlayer 7860b can be the same or substantially similar to the anode 7710, the anode current collector 7720, the cathode 7730, the cathode current collector 7740, the first separator 7750a, the second separator 7750b, the third separator 7750c, the first interlayer 7760a, and the second interlayer 7760b. Thus, certain aspects of the anode 7810, the anode current collector 7820, the cathode 7830, the cathode current collector 7840, the first separator 7850a, the second separator 7850b, the third separator 7850c, the first interlayer 7860a, and the second interlayer 7860b are not described in greater detail herein.

As shown, the interlayer 7860a and the separator 7850a extend beyond the separator 7850b by an extension distance d1. As shown, the interlayer 7860b and the separator 7850b extend beyond the separator 7850c by an extension distance d2. In some embodiments, the extension distances d1 and/or d2 can be at least about 100 µm, at least about 200 µm, at least about 300 µm, at least about 400 µm, at least about 500 µm, at least about 600 µm, at least about 700 µm, at least about 800 µm, at least about 900 µm, at least about 1 mm, at least about 1.1 mm, at least about 1.2 mm, at least about 1.3 mm, at least about 1.4 mm, at least about 1.5 mm, at least about 1.6 mm, at least about 1.7 mm, at least about 1.8 mm, or at least about 1.9 mm. In some embodiments, the extension distances d1 and/or d2 can be no more than about 2 mm, no more than about 1.9 mm, no more than about 1.8 mm, no more than about 1.7 mm, no more than about 1.6 mm, no more than about 1.5 mm, no more than about 1.4 mm, no more than about 1.3 mm, no more than about 1.2 mm, no more than about 1.1 mm, no more than about 1 mm, no more than about 900 µm, no more than about 800 µm, no more than about 700 µm, no more than about 600 µm, no more than about 500 µm, no more than about 400 µm, no more than about 300 µm, or no more than about 200 µm. Combinations of the above-referenced extension distances d1 and/or d2 are also possible (e.g., at least about 100 µm and no more than about 2 mm or at least about 300 µm and no more than about 1 mm), inclusive of all values and ranges therebetween. In some embodiments, the extension distances d1 and/or d2 can be about 100 µm, about 200 µm, about 300 µm, about 400 µm, about 500 µm, about 600 µm, about 700 µm, about 800 µm, about 900 µm, about 1 mm, about 1.1 mm, about 1.2 mm, about 1.3 mm, about 1.4 mm, about 1.5 mm, about 1.6 mm, about 1.7 mm, about 1.8 mm, about 1.9 mm, or about 2 mm.

In FIG. 78A, the cathode 7830 is in proper alignment with the anode 7810. In FIG. 78B, the cathode 7830 has shifted and is misaligned with the anode 7810. In FIG. 78C, the separator 7850a, the interlayer 7860a, the separator 7850b, and the interlayer 7860b have bent, such that the interlayer 7860a and the interlayer 7860b contact the cathode 7830. This configuration provides a short circuit opportunity between the interlayer 7860b and the cathode 7830 and between the interlayer 7860a and the cathode 7830. As shown, the electrochemical cell 7700 is configured such that the interlayer 7860a and the interlayer 7860b short circuit with the cathode 7830. In some embodiments, the electrochemical cell 7800 can be configured such that the interlayer 7860a and the interlayer 7860b short circuit with the cathode 7810. In other words, the interlayer 7860a can extend beyond an outside edge of the separator 7850a and the interlayer 7860b can extend beyond the outside edge of the separator 7850b.

Figure 79A:
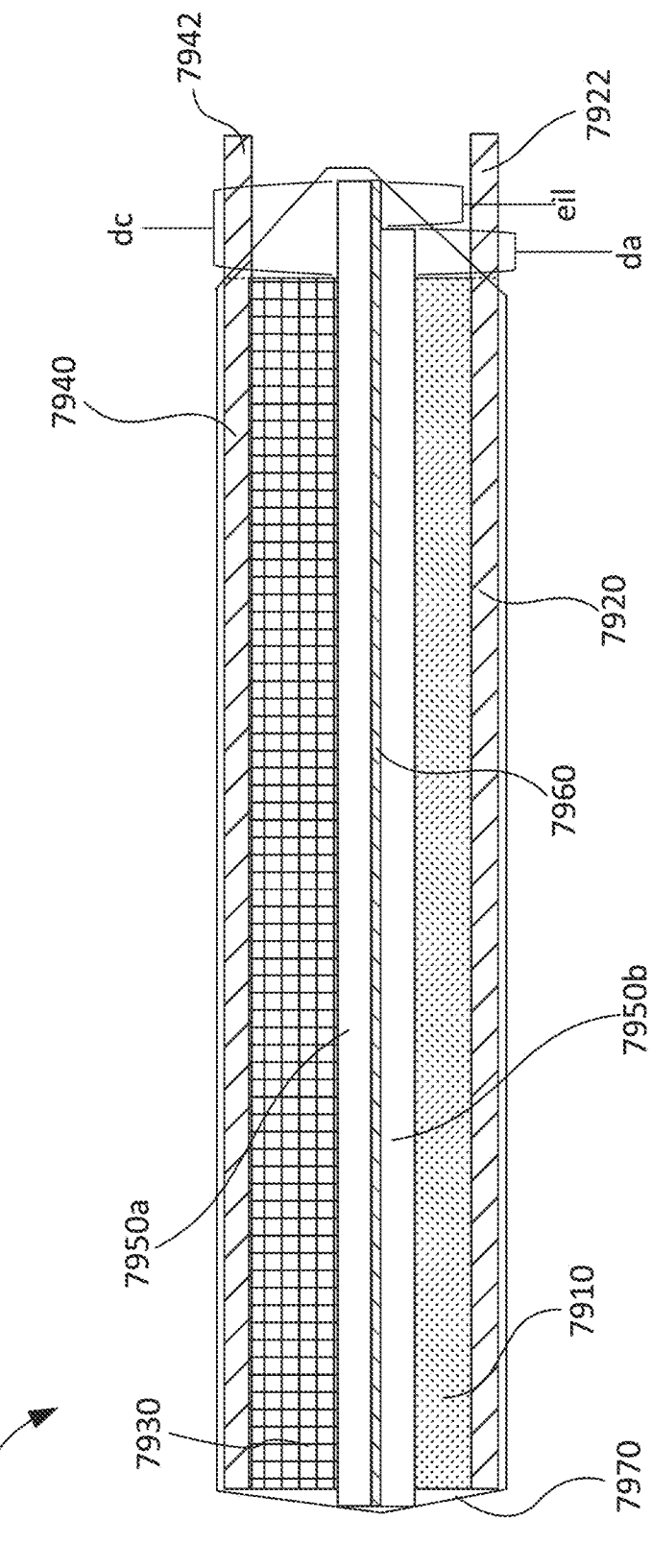
FIGS. 79A-79B are illustrations of an electrochemical cell with an interlayer, according to an embodiment.
Figure 79B:
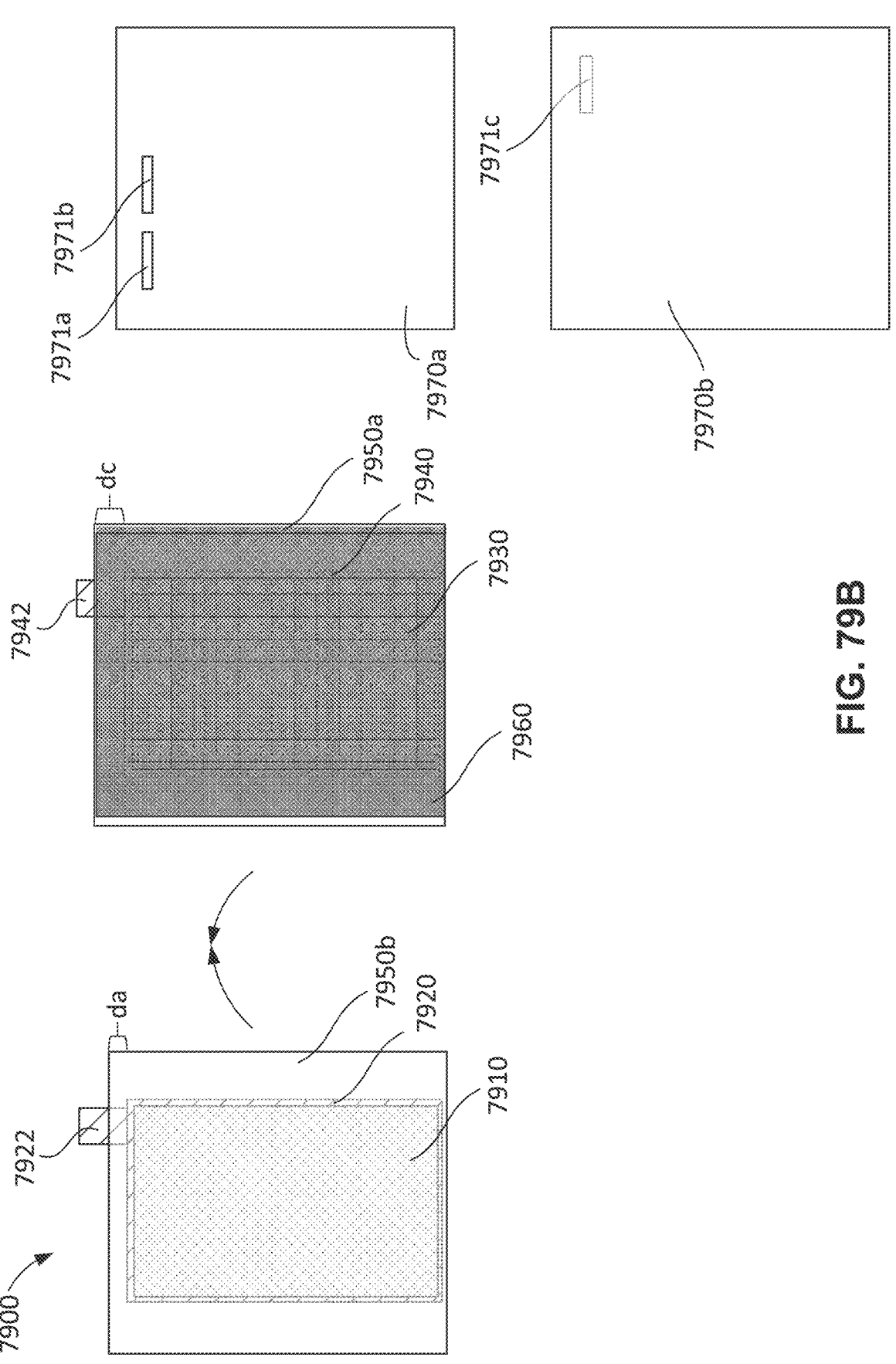

FIGS. 79A-79B of an electrochemical cell with an interlayer 7960, according to an embodiment. As shown, the electrochemical cell 7900 includes an anode 7910 disposed on an anode current collector 7920, a cathode 7930 disposed on a cathode current collector 7940, with a first separator 7950a and a second separator 7950b disposed between the anode 7910 and the cathode 7930. The interlayer 7960 is disposed between the first separator 7950a and the second separator 7950b. As shown, the anode current collector 7920 includes an anode tab 7922 and the cathode current collector includes a cathode tab 7942. As shown, the electrochemical cell 7900 includes a pouch 7970 formed from films 7970a, 7970b, in which each of the other components of the electrochemical cell 7900 are disposed. In some embodiments, the anode 7910, the anode current collector 7920, the cathode 7930, the cathode current collector 7940, the first separator 7950a, the second separator 7950b, and the interlayer 7960 can be the same or substantially similar to the anode 210, the anode current collector 220, the cathode 230, the cathode current collector 240, the first separator 250a, the second separator 250b, and the interlayer 260, as described above with reference to FIGS. 2A-2B. Thus, certain aspects of the anode 7910, the anode current collector 7920, the cathode 7930, the cathode current collector 7940, the first separator 7950a, the second separator 7950b, and the interlayer 7960 are not described in greater detail herein.

FIG. 79A shows a cross-sectional view of the electrochemical cell 7900, while FIG. 79B shows a partially exploded view of the electrochemical cell 7900 with the anode 7910 and associated components separated from the cathode 7930 and associated components. As shown, the interlayer 7960 is coated onto the first separator 7950a, with the interlayer 7960 and the first separator 7950a extending beyond the second separator 7950b. In some embodiments, the interlayer 7960 can include a carbon coating (e.g., CNT, CNF, carbon black, and/or graphene). As shown, the second separator 7950b extends beyond the anode 7910 by a distance da. As shown, the first separator 7950a and the interlayer 7960 extend beyond the cathode 7930 by a distance db. The distance db is larger than the distance da. This allows for an exposed region of the interlayer 7960 to act as a tab, such that a voltage measurement can be made from the exposed region of the interlayer 7960 without including a tab. As shown, the interlayer has an exposed interlayer length eil.

In some embodiments, the distance da can be at least about 100 µm, at least about 200 µm, at least about 300 µm, at least about 400 µm, at least about 500 µm, at least about 600 µm, at least about 700 µm, at least about 800 µm, at least about 900 µm, at least about 1 mm, at least about 2 mm, at least about 3 mm, at least about 4 mm, at least about 5 mm, at least about 6 mm, at least about 7 mm, at least about 8 mm, or at least about 9 mm. In some embodiments, the distance da can be no more than about 1 cm, no more than about 9 mm, no more than about 8 mm, no more than about 7 mm, no more than about 6 mm, no more than about 5 mm, no more than about 4 mm, no more than about 3 mm, no more than about 2 mm, no more than about 1 mm, no more than about 900 µm, no more than about 800 µm, no more than about 700 µm, no more than about 600 µm, no more than about 500 µm, no more than about 400 µm, no more than about 300 µm, or no more than about 200 µm. Combinations of the above-referenced distances da are also possible (e.g., at least about 100 µm and no more than about 1 cm or at least about 500 µm and no more than about 5 mm), inclusive of all values and ranges therebetween. In some embodiments, the distance da can be about 100 µm, about 200 µm, about 300 µm, about 400 µm, about 500 µm, about 600 µm, about 700 µm, about 800 µm, about 900 µm, about 1 mm, about 2 mm, about 3 mm, about 4 mm, about 5 mm, about 6 mm, about 7 mm, about 8 mm, about 9 mm, or about 1 cm.

In some embodiments, the distance dc can be at least about 500 µm, at least about 600 µm, at least about 700 µm, at least about 800 µm, at least about 900 µm, at least about 1 mm, at least about 2 mm, at least about 3 mm, at least about 4 mm, at least about 5 mm, at least about 6 mm, at least about 7 mm, at least about 8 mm, at least about 9 mm, at least about 1 cm, at least about 2 cm, at least about 3 cm, or at least about 4 cm. In some embodiments, the distance dc can be no more than about 5 cm, no more than about 4 cm, no more than about 3 cm, no more than about 2 cm, no more than about 1 cm, no more than about 9 mm, no more than about 8 mm, no more than about 7 mm, no more than about 6 mm, no more than about 5 mm, no more than about 4 mm, no more than about 3 mm, no more than about 2 mm, no more than about 1 mm, no more than about 900 µm, no more than about 800 µm, no more than about 700 µm, or no more than about 600 µm. Combinations of the above-referenced distances dc are also possible (e.g., at least about 500 µm and no more than about 5 cm or at least about 5 mm and no more than about 3 cm), inclusive of all values and ranges therebetween. In some embodiments, the distance dc can be about 500 µm, about 600 µm, about 700 µm, about 800 µm, about 900 µm, about 1 mm, about 2 mm, about 3 mm, about 4 mm, about 5 mm, about 6 mm, about 7 mm, about 8 mm, about 9 mm, about 1 cm, about 2 cm, about 3 cm, about 4 cm, or about 5 cm.

In some embodiments, the exposed interlayer length eil can be at least about 100 µm, at least about 200 µm, at least about 300 µm, at least about 400 µm, at least about 500 µm, at least about 600 µm, at least about 700 µm, at least about 800 µm, at least about 900 µm, at least about 1 mm, at least about 2 mm, at least about 3 mm, at least about 4 mm, at least about 5 mm, at least about 6 mm, at least about 7 mm, at least about 8 mm, at least about 9 mm, at least about 1 cm, at least about 2 cm, or at least about 3 cm. In some embodiments, the exposed interlayer length eil can be no more than about 4 cm, no more than about 3 cm, no more than about 2 cm, no more than about 1 cm, no more than about 9 mm, no more than about 8 mm, no more than about 7 mm, no more than about 6 mm, no more than about 5 mm, no more than about 4 mm, no more than about 3 mm, no more than about 2 mm, no more than about 1 mm, no more than about 900 µm, no more than about 800 µm, no more than about 700 µm, no more than about 600 µm, no more than about 500 µm, no more than about 400 µm, no more than about 300 µm, or no more than about 200 µm. Combinations of the above-referenced exposed interlayer lengths eil are also possible (e.g., at least about 100 µm and no more than about 4 cm or at least about 1 mm and no more than about 1 cm), inclusive of all values and ranges therebetween. In some embodiments, the exposed interlayer length eil can be about 100 µm, about 200 µm, about 300 µm, about 400 µm, about 500 µm, about 600 µm, about 700 µm, about 800 µm, about 900 µm, about 1 mm, about 2 mm, about 3 mm, about 4 mm, about 5 mm, about 6 mm, about 7 mm, about 8 mm, about 9 mm, about 1 cm, about 2 cm, about 3 cm, or about 4 cm.

FIG. 79B shows a partially exploded view of the electrochemical cell 7900. The first separator 7950a, the second separator 7950b, and the interlayer 7960 are shown partially transparent with the interlayer 7960 disposed on the first separator 7950a. The pouch 7970 is shown separate from the other components. In some embodiments, the pouch 7970 can be formed from sheets of laminate film. As shown, the pouch 7970 includes holes 7971a, 7971b, 7971c (collectively referred to as holes 7971). In some embodiments, the holes 7971 can be pre-punched into the pouch 7970. The hole 7971b can allow for contact with the interlayer 7960, as the interlayer 7960 protrudes beyond the second separator 7950b. In some embodiments, the film of the pouch 7970 can be cut after the rest of the electrochemical cell 7900 is assembled. This can allow construction of the electrochemical cell 7900 without any unnecessary cutting of the current collectors. Each of the components shown in FIG. 79B can be brought together to form the electrochemical cell 7900.

As shown in FIGS. 79A-79B, the first separator 7950a coupled to the cathode 7930 and the interlayer 7960 are both longer than the second separator 7950b. In some embodiments, the second separator 7950b and the interlayer 7960 can be longer than the first separator 7950a. In other words, the positioning of the anode 7910 and the cathode 7930 can be reversed from how they are depicted.

Figure 80:
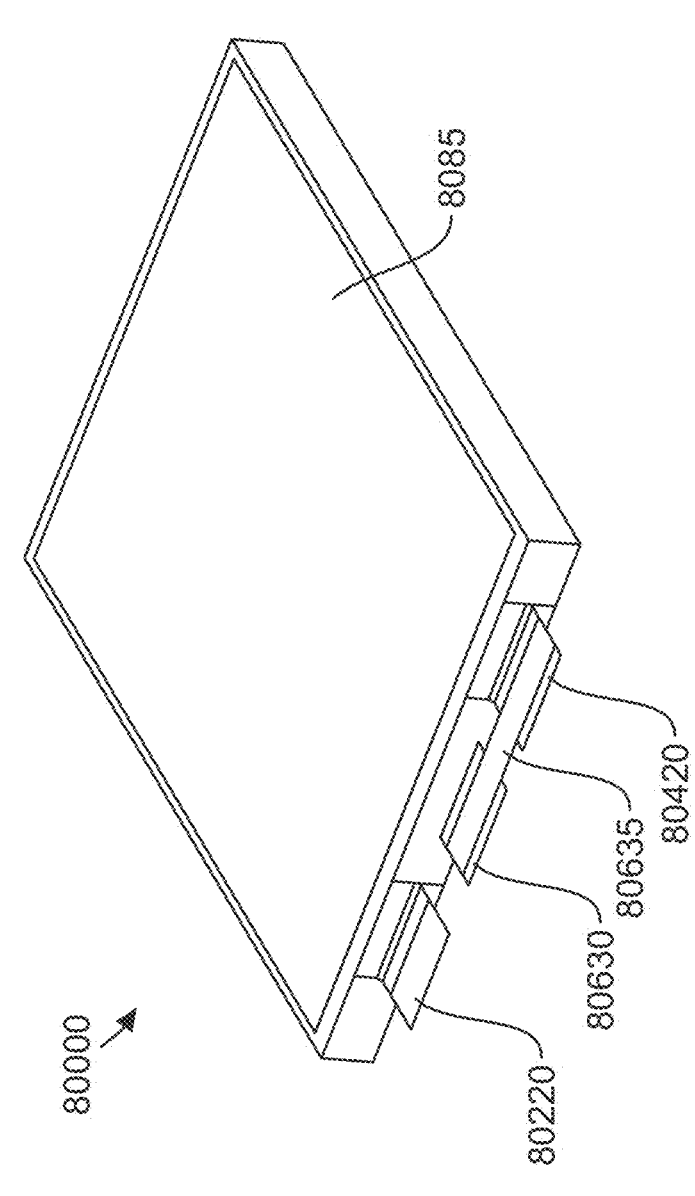
FIG. 80 is an illustration of an electrochemical cell stack, according to an embodiment.

FIG. 80 is an illustration of an electrochemical cell stack 80000, according to an embodiment. Components shown in FIG. 80 include a common anode tab 80220, a common cathode tab 80420, a common interlayer tab 80630, a thin film resistor 80635, and a casing 8085. For ease of viewing, certain items are excluded from the depiction in FIG. 80, including anodes, anode current collectors, cathode current collectors, anode tabs, cathode tabs, separators, and interlayers. The common anode tab 80220 is electrically coupled to a collection of anode tabs. The common cathode tab 80420 is electrically coupled to a collection of cathode tabs. The thin film resistor 80635 electrically couples the common interlayer tab 80630 and the common cathode tab 80420. The thin film resistor 80635 electrically couples the cathodes of the electrochemical cell stack 80000 and the interlayers of the electrochemical cell stack 80000. In some embodiments, the thin film resistor 8063 electrically couples the common anode tab 80220 and the common interlayer tab 80630. The thin film resistor 80635 can be directly connected between the Cathode and the interlayer allowing for direct pullup. This can be used in systems where BMS modification is not implemented but where protection is desired to prevent dendrites from crossing the separator. Additionally this could be built such that each individual cell has a separate connection from the cathode to the interlayer, allowing the electrochemical cell 80000 to be safe from dendrites from time of manufacture with build in protection. As shown, the resistor would have the same function as in FIG. 3A. It would be possible to implement any of the aforementioned circuit combinations or other implementations for the connection of the interlayer.

In some embodiments, the thin film resistor 80635 can have a resistance of at least about 1Ω, at least about 2Ω, at least about 3Ω, at least about 4Ω, at least about 5Ω, at least about 6Ω, at least about 7Ω, at least about 8Ω, at least about 9Ω, at least about 10Ω, at least about 20Ω, at least about 30Ω, at least about 40Ω, at least about 50Ω, at least about 60Ω, at least about 70Ω, at least about 80Ω, at least about 90Ω, at least about 100Ω, at least about 200Ω, at least about 300Ω, at least about 400Ω, at least about 500Ω, at least about 600Ω, at least about 700Ω, at least about 800Ω, or at least about 900Ω. In some embodiments, the thin film resistor 80635 can have a resistance of no more than about 1,000Ω, no more than about 900Ω, no more than about 800Ω, no more than about 700Ω, no more than about 600Ω, no more than about 500Ω, no more than about 400Ω, no more than about 300Ω, no more than about 200Ω, no more than about 100Ω, no more than about 90Ω, no more than about 80Ω, no more than about 70Ω, no more than about 60Ω, no more than about 50Ω, no more than about 40Ω, no more than about 30Ω, no more than about 20Ω, no more than about 10Ω, no more than about 9Ω, no more than about 8Ω, no more than about 7Ω, no more than about 6Ω, no more than about 5Ω, no more than about 4Ω, no more than about 3Ω, or no more than about 2Ω. Combinations of the above-referenced resistances are also possible (e.g., at least about 1Ω and no more than about 1,000Ω or at least about 5Ω and no more than about 500Ω inclusive of all values and ranges therebetween. In some embodiments, the thin film resistor 80635 can have a resistance of about 1Ω, about 2Ω, about 3Ω, about 4Ω, about 5Ω, about 6Ω, about 7Ω, about 8Ω, about 9Ω, about 10Ω, about 20Ω, about 30Ω, about 40Ω, about 50Ω, about 60Ω, about 70Ω, about 80Ω, about 90Ω, about 100Ω, about 200Ω, about 300Ω, about 400Ω, about 500Ω, about 600Ω, about 700Ω, about 800Ω, about 900Ω, or about 1,000Ω.

Figure 81A:
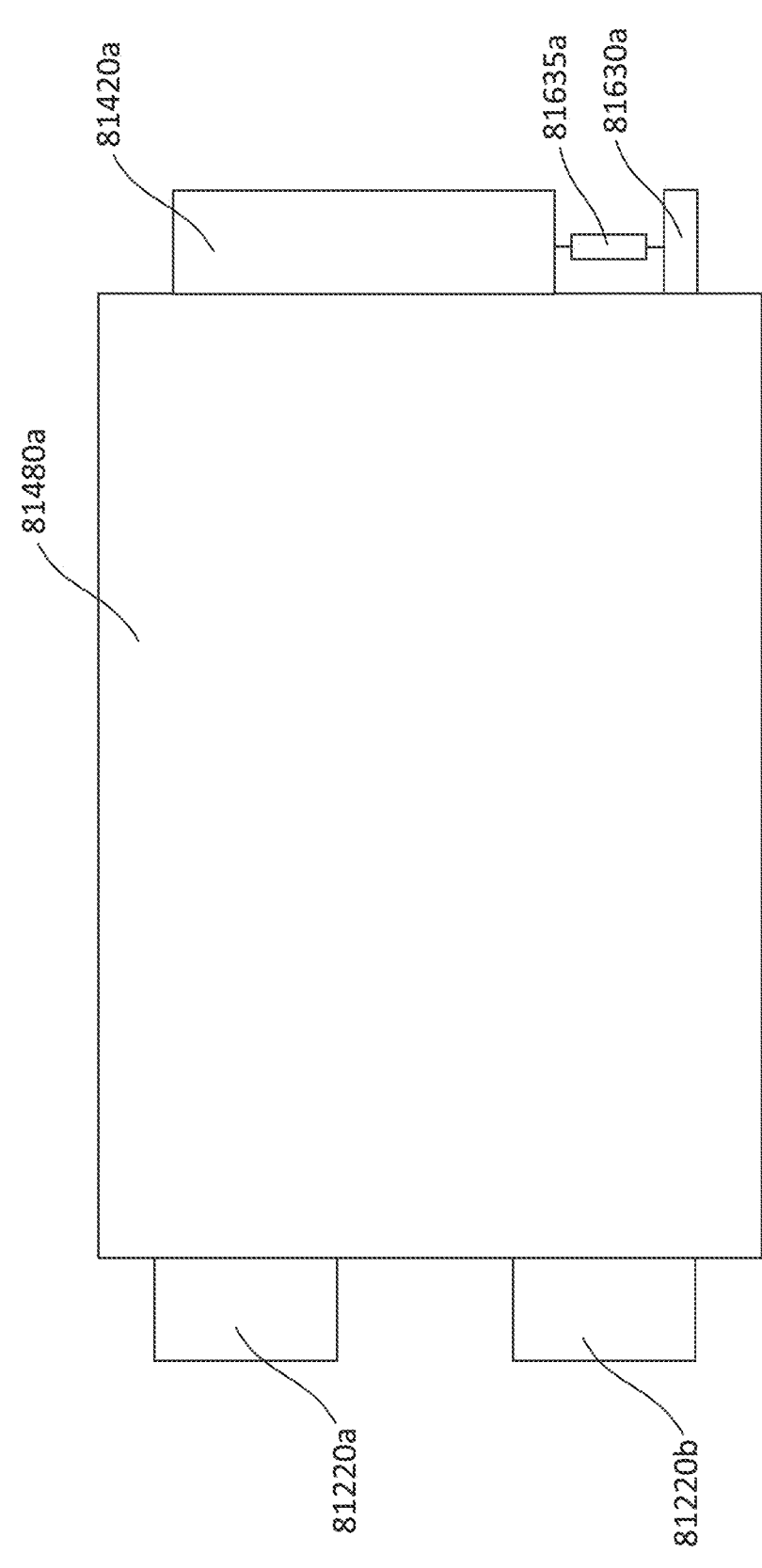
FIGS. 81A-81B are illustrations of a collection of electrochemical cell stacks, according to an embodiment.
Figure 81B:
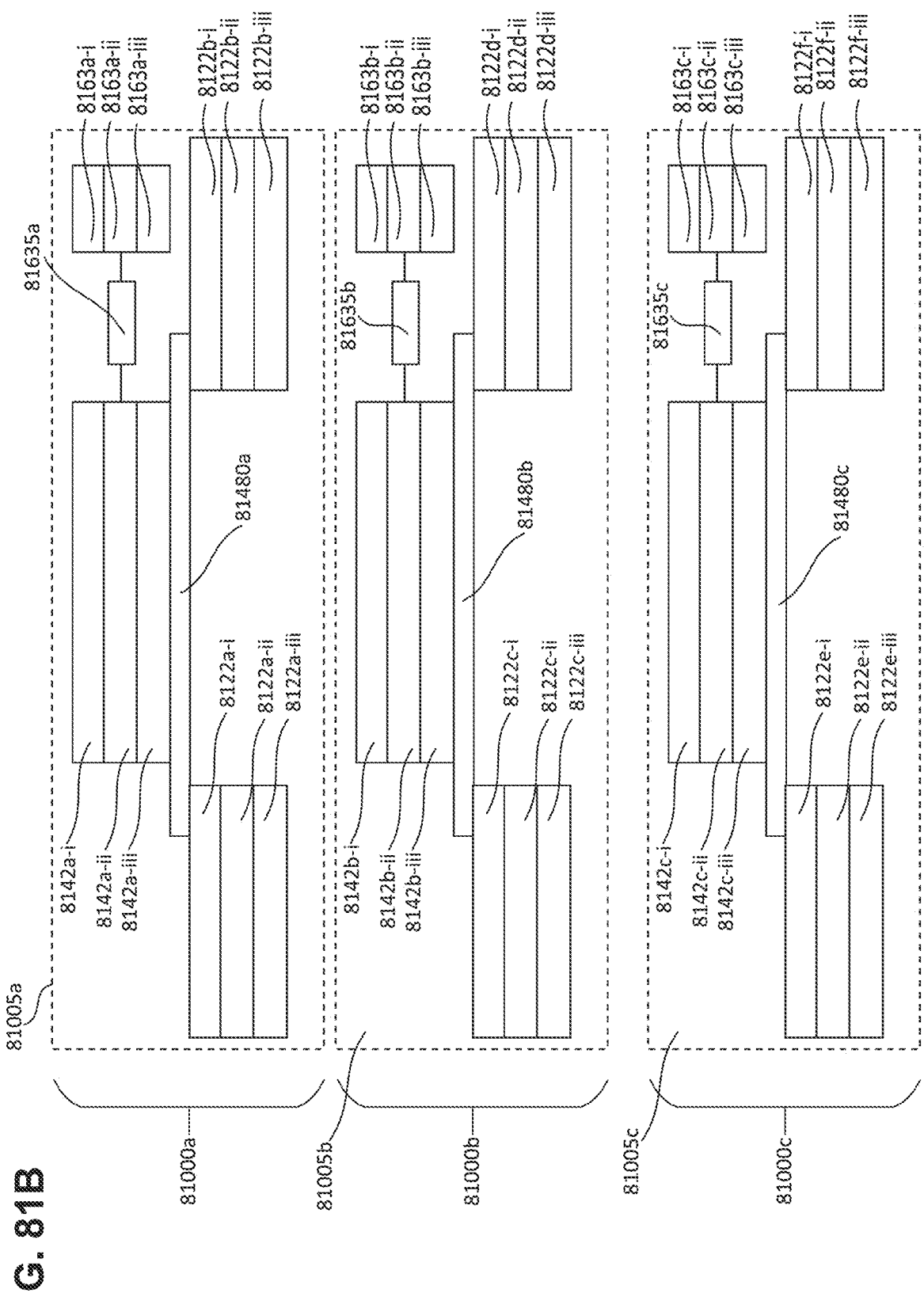

FIGS. 81A-81B are illustrations of a collection of electrochemical cell stacks 81000a, 81000b, 81000c (collectively referred to as electrochemical cell stacks 81000), according to an embodiment. FIG. 81A shows an overhead view of the electrochemical cell stacks 81000, while FIG. 81B shows a side profile view of the electrochemical cell stacks 81000. As shown, the electrochemical cell stacks 81000 are arranged as bicells. As shown in FIG. 81A, two common anode tabs 81220a, 81220b extend from the electrochemical cell stack 81000a. A common cathode tab 81420a and a common interlayer tab 81630a extend from the electrochemical cell stack 81000a. A thin film resistor 81635a electrically couples the common cathode tab 81420a and the common interlayer tab 81630a. A casing 81480a is shown, which houses the components of the electrochemical cells. For ease of viewing, most of the components of the electrochemical cells are not shown, including anodes, anode current collectors, cathode current collectors, anode tabs, cathode tabs, separators, and interlayers.

FIG. 81B shows a side view of each of the electrochemical cell stacks 81000a, 81000b, 81000c. As shown, the electrochemical cell stack 81000a includes anode tabs 8122a-i, 8122a-ii, 8122a-iii, 8122b-i, 8122b-ii, 8122b-iii (collectively referred to as anode tabs 8122a, b), cathode tabs 8142a-i, 8142a-ii, 8142a-iii (collectively referred to as cathode tabs 8142a), interlayer tabs 8163a-i, 8163a-ii,

8163a-iii (collectively referred to as interlayer tabs 8163a), and casing 81480a, disposed in a pre-assembled socket 81005a. As shown, the electrochemical cell stack 81000b includes anode tabs 8122c-i, 8122c-ii, 8122c-iii, 8122d-i, 8122d-ii, 8122d-iii (collectively referred to as anode tabs 8122c, d), cathode tabs 8142b-i, 8142b-ii, 8142b-iii (collectively referred to as cathode tabs 8142b), interlayer tabs 8163b-i, 8163b-ii, 8163b-iii (collectively referred to as interlayer tabs 8163b), and casing 81480b, disposed in a pre-assembled socket 81005b. As shown, the electrochemical cell stack 81000c includes anode tabs 8122e-i, 8122e-ii, 8122e-iii, 8122f-i, 8122f-ii, 8122f-iii (collectively referred to as anode tabs 8122e, f), cathode tabs 8142c-i, 8142c-ii, 8142c-iii (collectively referred to as cathode tabs 8142c), interlayer tabs 8163c-i, 8163c-ii, 8163c-iii (collectively referred to as interlayer tabs 8163c), and casing 81480c, disposed in a pre-assembled socket 81005c.

In some embodiments, the interlayer tabs 8163a, 8163b, 8163c (collectively referred to as interlayer tabs 8163) can be composed of aluminum (e.g., when electrically coupled to cathode tabs 8142). In some embodiments, the interlayer tabs 8163 can be composed of copper and/or nickel (e.g., when electrically coupled to anode tabs 8122). In some embodiments, the anode current collectors (not shown) can be coated on a single side. In some embodiments, the anode current collectors can be coated on both sides. In some embodiments, the cathode current collectors (not shown can be coated on a single side. In some embodiments, the cathode current collectors can be coated on both sides. As shown, the collection of electrochemical cell stacks 81000a, 81000b, 81000c includes 3 cells arranged in parallel, with each parallel arrangement connected in series. In some embodiments, any number of electrochemical cells can be connected in series and/or parallel (e.g., 2, 3, 4, 5, 6, 7, 8, 9, 10, 11, 12, 13, 14, 15, 16, 17, 18, 19, 20, inclusive of all values and ranges therebetween).

Figure 82A:
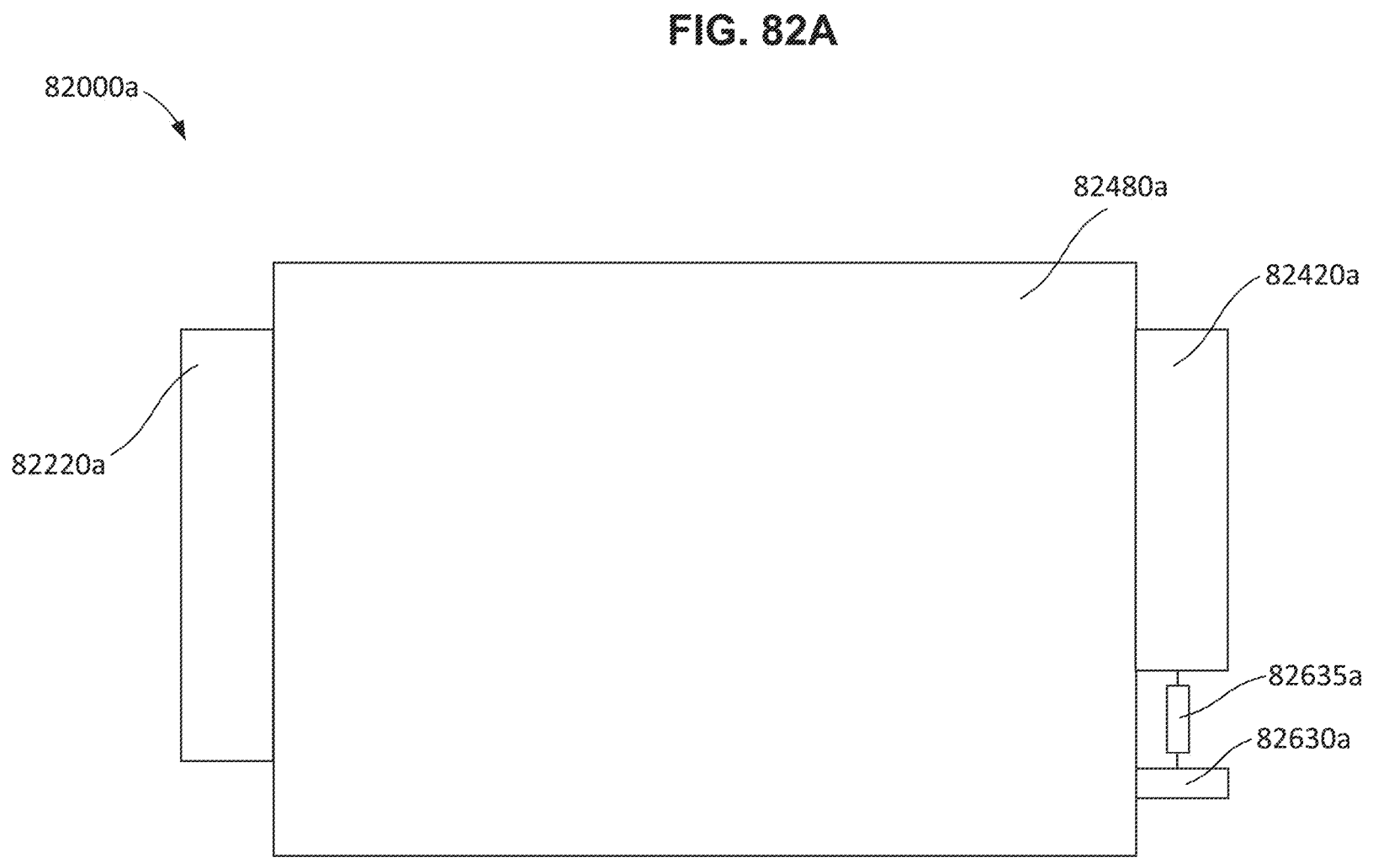
Figure 82B:
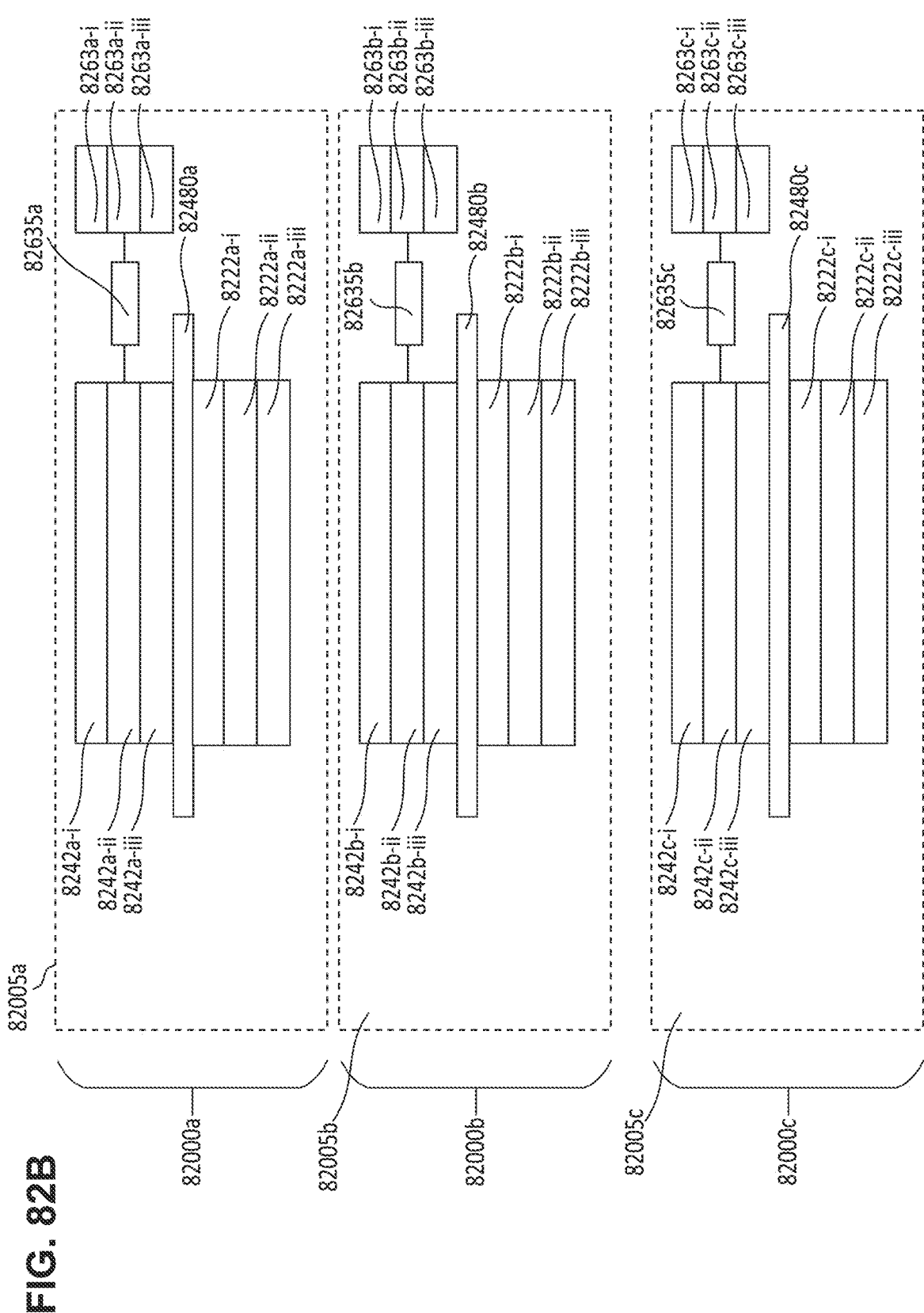

FIGS. 82A-82B are illustrations of a collection of electrochemical cell stacks 82000a, 82000b, 82000c (collectively referred to as electrochemical cell stacks 82000), according to an embodiment. FIG. 82A shows an overhead view of the electrochemical cell stacks 82000, while FIG. 82B shows a side profile view of the electrochemical cell stacks 82000. As shown, the electrochemical cell stacks 82000 are arranged as single cells. As shown in FIG. 82A, one common anode tab 82220a extends from the electrochemical cell stack 82000a. A common cathode tab 82420a and a common interlayer tab 82630a extend from the electrochemical cell stack 82000a. A thin film resistor 82635a electrically couples the common cathode tab 82420a and the common interlayer tab 82630a. A casing 82480a is shown, which houses the components of the electrochemical cells. For ease of viewing, most of the components of the electrochemical cells are not shown, including anodes, anode current collectors, cathode current collectors, anode tabs, cathode tabs, separators, and interlayers.

FIG. 82B shows a side view of each of the electrochemical cell stacks 82000a, 82000b, 82000c. As shown, the electrochemical cell stack 82000a includes anode tabs 8222a-i, 8222a-ii, 8222a-iii (collectively referred to as anode tabs 8222a), cathode tabs 8242a-i, 8242a-ii, 8242a-iii (collectively referred to as cathode tabs 8242a), interlayer tabs 8263a-i, 8263a-ii, 8263a-iii (collectively referred to as interlayer tabs 8263a), and casing 82480a, disposed in a pre-assembled socket 82005a. As shown, the electrochemical cell stack 82000b includes anode tabs 8222b-i, 8222b-ii, 8222b-iii, (collectively referred to as anode tabs 8222b), cathode tabs 8242b-i, 8242b-ii, 8242b-iii (collectively referred to as cathode tabs 8242*b*), interlayer tabs 8263*b-i*, 8263*b-ii*, 8263*b-iii* (collectively referred to as interlayer tabs 8263*b*), and casing 82480*b*, disposed in a pre-assembled socket 82005*b*. As shown, the electrochemical cell stack 82000*c* includes anode tabs 8222*e-i*, 8222*e-ii*, 8222*e-iii*, 8222*f-i*, 8222*f-ii*, 8222*f-iii* (collectively referred to as anode tabs 8222*e, f*), cathode tabs 8242*c-i*, 8242*c-ii*, 8242*c-iii* (collectively referred to as cathode tabs 8242*c*), interlayer tabs 8263*c-i*, 8263*c-ii*, 8263*c-iii* (collectively referred to as interlayer tabs 8263*c*), and casing 82480*c*, disposed in a pre-assembled socket 82005*c*.

In some embodiments, the interlayer tabs 8263*a*, 8263*b*, 8263*c* (collectively referred to as interlayer tabs 8263) can be composed of aluminum (e.g., when electrically coupled to cathode tabs 8242). In some embodiments, the interlayer tabs 8263 can be composed of copper and/or nickel (e.g., when electrically coupled to anode tabs 8222). In some embodiments, the anode current collectors (not shown) can be coated on a single side. In some embodiments, the anode current collectors can be coated on both sides. In some embodiments, the cathode current collectors (not shown can be coated on a single side. In some embodiments, the cathode current collectors can be coated on both sides. As shown, the collection of electrochemical cell stacks 82000*a*, 82000*b*, 82000*c* includes 3 cells arranged in parallel, with each parallel arrangement connected in series. In some embodiments, any number of electrochemical cells can be connected in series and/or parallel (e.g., 2, 3, 4, 5, 6, 7, 8, 9, 10, 11, 12, 13, 14, 15, 16, 17, 18, 19, 20, inclusive of all values and ranges therebetween).

Figure 83A:
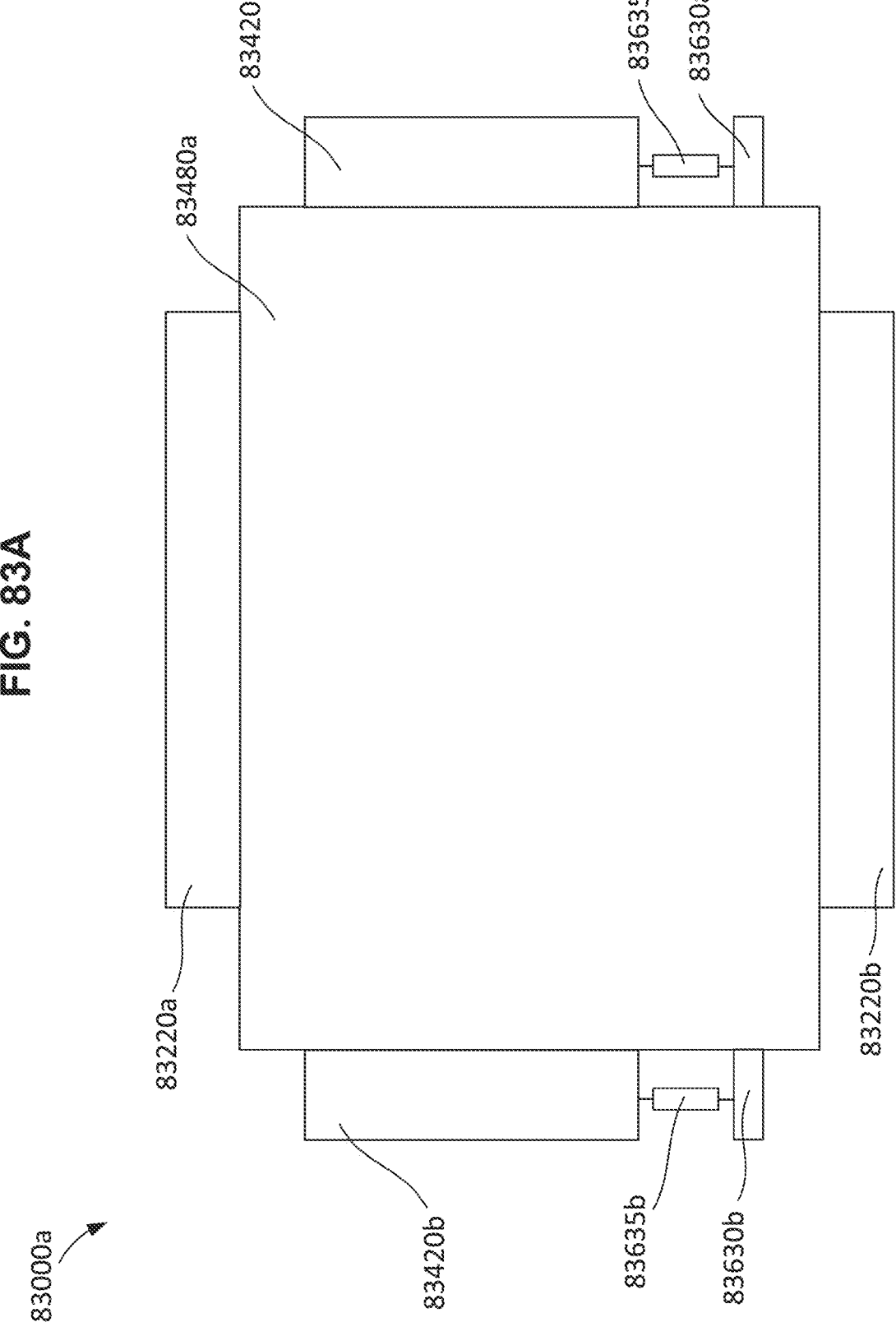
FIGS. 83A-83B are illustrations of a collection of electrochemical cell stacks, according to an embodiment.
Figure 83B:
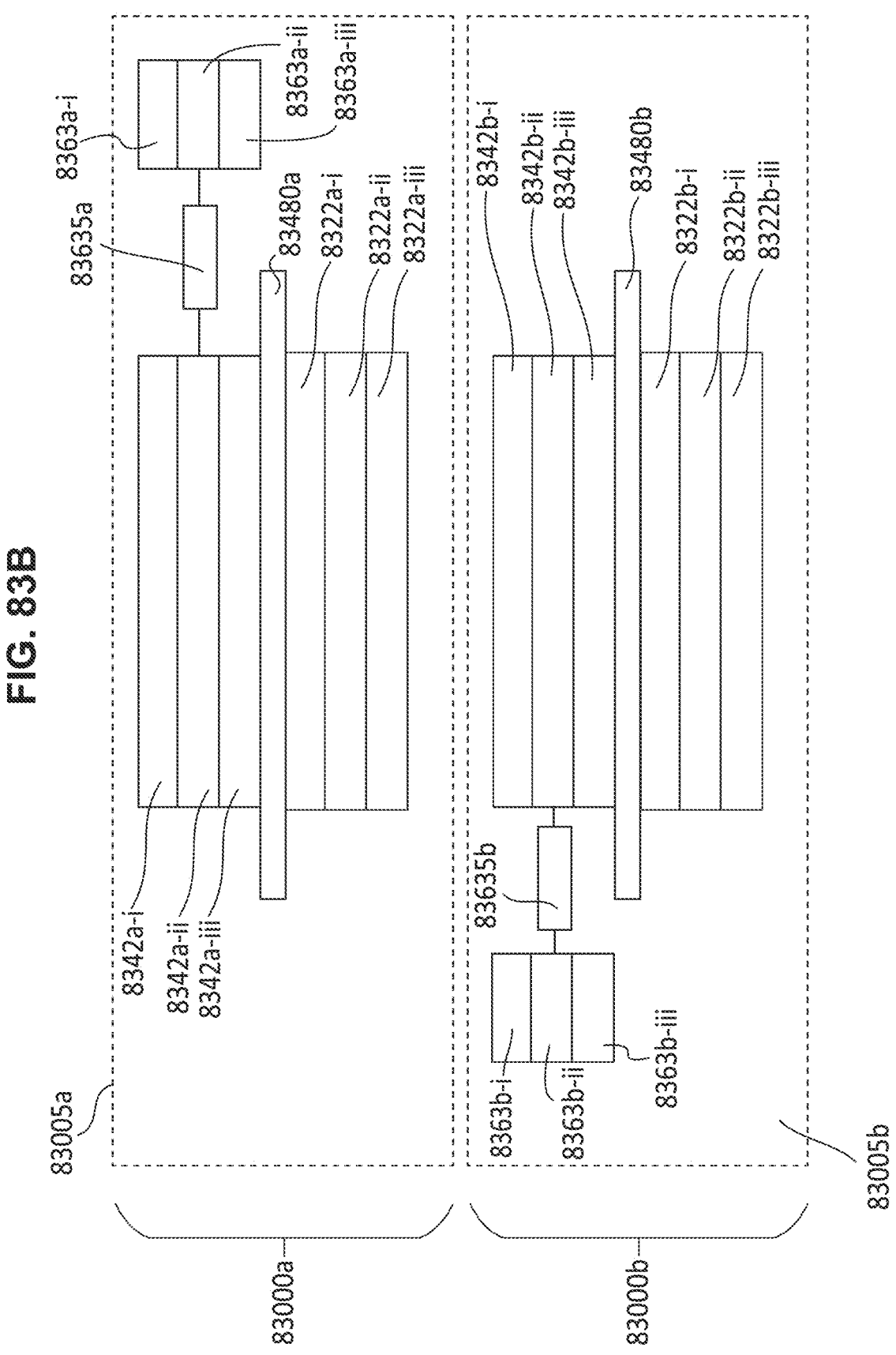

FIGS. 83A-83B are illustrations of a collection of electrochemical cell stacks 83000*a*, 83000*b* (collectively referred to as electrochemical cell stacks 83000), according to an embodiment. FIG. 83A shows an overhead view of the electrochemical cell stacks 83000, while FIG. 83B shows a side profile view of the electrochemical cell stacks 83000. As shown, the electrochemical cell stacks 83000 are arranged as single cells. As shown in FIG. 83A, two common anode tabs 83220*a*, 83220*b* extend from the electrochemical cell stack 83000*a* in opposite directions. Two common cathode tabs 83420*a*, 83420*b* and two common interlayer tab 83630*a*, 83630*b* extend from the electrochemical cell stack 83000*a*. A thin film resistor 83635*a* electrically couples the common cathode tab 83420*a* and the common interlayer tab 83630*a*. A thin film resistor 83635*b* electrically couples the common cathode tab 83420*b* and the common interlayer tab 83630*b*. A casing 83480*a* is shown, which houses the components of the electrochemical cells. For ease of viewing, most of the components of the electrochemical cells are not shown, including anodes, anode current collectors, cathode current collectors, anode tabs, cathode tabs, separators, and interlayers.

FIG. 83B shows a side view of each of the electrochemical cell stacks 83000*a*, 83000*b*. As shown, the electrochemical cell stack 83000*a* includes anode tabs 8322*a-i*, 8322*a-ii*, 8322*a-iii* (collectively referred to as anode tabs 8322*a*), cathode tabs 8342*a-i*, 8342*a-ii*, 8342*a-iii* (collectively referred to as cathode tabs 8242*a*), interlayer tabs 8363*a-i*, 8363*a-ii*, 8363*a-iii* (collectively referred to as interlayer tabs 8363*a*), and casing 83480*a*, disposed in a pre-assembled socket 83005*a*. As shown, the electrochemical cell stack 83000*b* includes anode tabs 8322*b-i*, 8322*b-ii*, 8322*b-iii*, (collectively referred to as anode tabs 8322*b*), cathode tabs 8342*b-i*, 8342*b-ii*, 8342*b-iii* (collectively referred to as cathode tabs 8342*b*), interlayer tabs 8363*b-i*, 8363*b-ii*, 8363*b-iii* (collectively referred to as interlayer tabs 8363*b*), and casing 83480*b*, disposed in a pre-assembled socket 83005*b*.

In some embodiments, the interlayer tabs 8363*a*, 8363*b* (collectively referred to as interlayer tabs 8363) can be composed of aluminum (e.g., when electrically coupled to cathode tabs 8342). In some embodiments, the interlayer tabs 8363 can be composed of copper and/or nickel (e.g., when electrically coupled to anode tabs 8322). In some embodiments, the anode current collectors (not shown) can be coated on a single side. In some embodiments, the anode current collectors can be coated on both sides. In some embodiments, the cathode current collectors (not shown can be coated on a single side. In some embodiments, the cathode current collectors can be coated on both sides. As shown, the collection of electrochemical cell stacks 83000*a*, 83000*b* includes 3 cells arranged in parallel, with each parallel arrangement connected in series. In some embodiments, any number of electrochemical cells can be connected in series and/or parallel (e.g., 2, 3, 4, 5, 6, 7, 8, 9, 10, 11, 12, 13, 14, 15, 16, 17, 18, 19, 20, inclusive of all values and ranges therebetween).

Figure 84A:
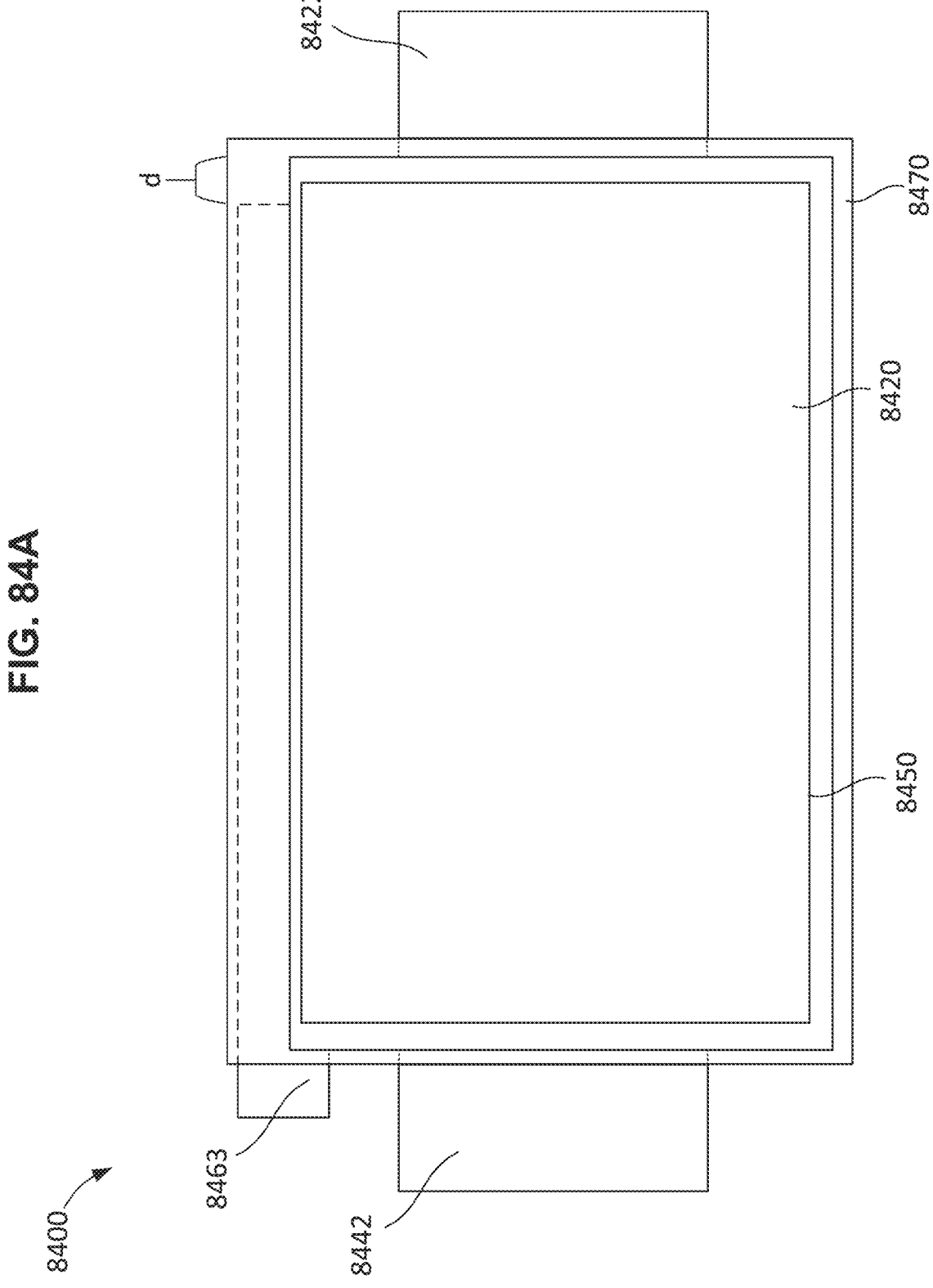
FIGS. 84A-84B are illustrations of an electrochemical cell, according to an embodiment.
Figure 84B:
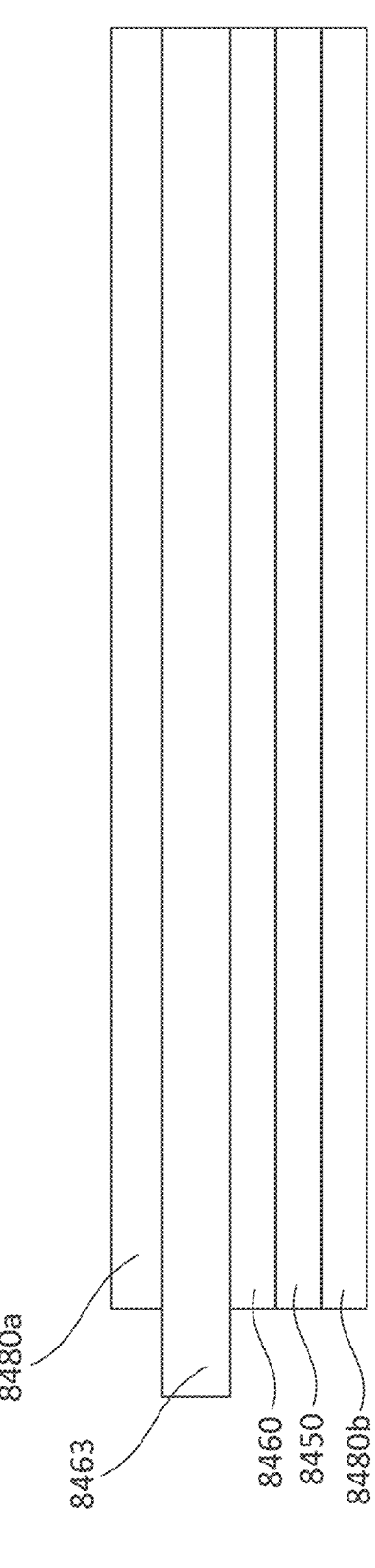

FIGS. 84A-84B are illustrations of an electrochemical cell 8400, according to an embodiment. As shown, the electrochemical cell 8400 includes an anode (not shown) disposed on an anode current collector 8420, a cathode tab 8422, a cathode (not shown) disposed on a cathode current collector (not shown), a cathode tab 8442, a separator 8450, an interlayer 8460, an interlayer tab 8463, and pouch films 8470*a*, 8470*b* (collectively forming a pouch 8470). In some embodiments, the anode current collector 8420, the cathode, the cathode current collector, the separator 8450, and the interlayer 8460 can be the same or substantially similar to the anode 210, the anode current collector 220, the cathode 230, the cathode current collector 240, the separators 250, and the interlayer 260, as described above with reference to FIGS. 2A-2B. In some embodiments, the interlayer tab 8463 can be the same or substantially similar to the anode tab 763, as described above with reference to FIGS. 7A-7B. In some embodiments, the pouch 8470 can be the same or substantially similar to the pouch 7970, as described above with reference to FIGS. 79A-79B. Thus, certain aspects of the anode current collector 8420, the cathode, the cathode current collector, the separator 8450, the interlayer 8460, the interlayer tab 8463, and the pouch 8470 are not described in greater detail herein.

FIG. 84A shows an overhead view of the electrochemical cell 8400. FIG. 84B shows a cross section of the electrochemical cell 8400 with some components of the electrochemical cell 8400 obstructed by the inter layer 8460, the separator 8450, the interlayer tab 8463, and the pouch 8470. As shown, the interlayer tab 8463 extends along approximately the full length of the electrochemical cell 8400. As shown, a proximal end of the interlayer tab 8463 is recessed from a proximal end of the electrochemical cell by a distance d. In some embodiments, the distance d can be about 0 µm, about 500 µm, about 1 mm, about 2 mm, about 3 mm, about 4 mm, about 5 mm, about 6 mm, about 7 mm, about 8 mm, about 9 mm, or about 10 mm, inclusive of all values and ranges therebetween. In some embodiments, the interlayer 8460 can include a carbon coating. In some embodiments, the interlayer tab 8463 can be bonded to the pouch film 8470*a*. In some embodiments, the interlayer 8450 can be bonded to the pouch film 8470*b*. A long adhesion length between the interlayer tab 8463 and the pouch film 8470*a* can provide a strong adhesive bond between the interlayer tab 8463 and the pouch film 8470a. In other words, a large sealing area provides high structural integrity.

Figure 85:
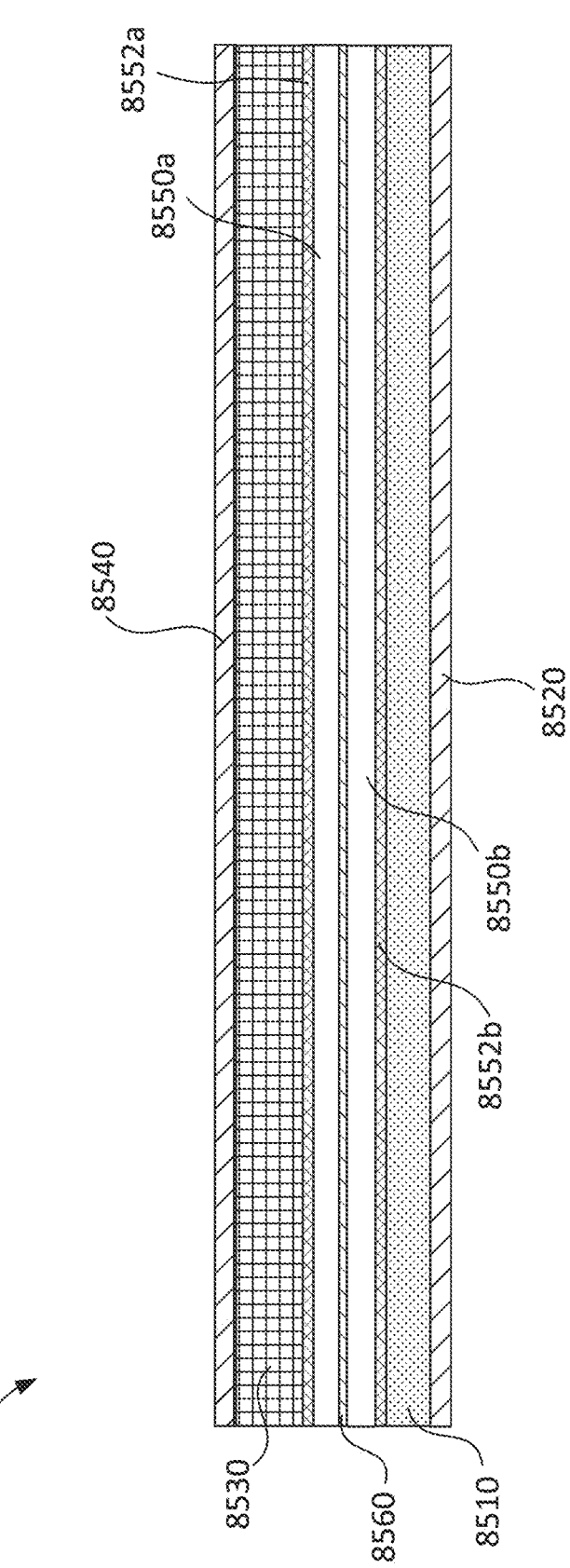
FIG. 85 is an illustration of an electrochemical cell, according to an embodiment.

FIG. 85 is an illustration of an electrochemical cell 8500, according to an embodiment. As shown, the electrochemical cell 8500 includes an anode 8510 disposed on an anode current collector 8520, a cathode 8530 disposed on a cathode current collector 8540, with a first separator 8550a, a second separator 8550b, an interlayer 8560 is disposed between the first separator 8550a and the second separator 8550b. A first coating layer 8552a is disposed between the first separator 8550a and the cathode 8530. A second coating layer 8552b is disposed between the second separator 8550b and the anode 8510. In some embodiments, the anode 8510, the anode current collector 8520, the cathode 8530, the cathode current collector 8540, the first separator 8550a, the second separator 8550b, and the interlayer 8560 can be the same or substantially similar to the anode 210, the anode current collector 220, the cathode 230, the cathode current collector 240, the first separator 250a, the second separator 250b, and the interlayer 260, as described above with reference to FIGS. 2A-2B. Thus, certain aspects of the anode 8510, the anode current collector 8520, the cathode 8530, the cathode current collector 8540, the first separator 8550a, the second separator 8550b, and the interlayer 8560 are not described in greater detail herein.

In some embodiments, the separators 8550a, 8550b (collectively referred to as separators 8550) can be wetted before or after application of the separators 8550 (e.g., as described above with respect to wettability regarding FIG. 1). For example, solvents such as ethylene carbonate, propylene, and/or dimethyl carbonate can be used to wet the separators 8550. In some embodiments, the substance used for wetting can interact with the interlayer 8560, the anode 8510, and/or the cathode 8530 can form micropores in the separators 8550. These micropores can create short circuits between the anode 8510 and the interlayer 8560 and/or between cathode 8530 and the interlayer 8560. In some cases, the micropores can be formed via thermal action (i.e., burning). In some cases, the micropores can be formed via dissolving via the wetting solvent. In some cases, a combination of thermal action and dissolving can contribute to the micropore formation. The first coating layer 8552a and/or the second coating layer 8552b can prevent the formation of these micropores. In some embodiments, the electrochemical cell 8500 can include the first coating layer 8552a and not the second coating layer 8552b. In some embodiments, the electrochemical cell 8500 can include the second coating layer 8552b and not the first coating layer 8552a. In some embodiments, the electrochemical cell 8500 can include both the first coating layer 8552a and the second coating layer 8552b.

In some embodiments, the first coating layer 8552a and/or the second coating layer 8552b can include alumina, PVDF, boehmite, polyimide, cellulose, cellulosic materials, methyl cellulose, ethyl cellulose, hydroxyethyl cellulose, hydroxy-propyl cellulose, hydroxyethyl methyl cellulose, hydroxy-propyl methyl cellulose, ethyl hydroxyethyl cellulose, car-boxymethyl cellulose, or any combination thereof. In some embodiments, the first coating 8552a and/or the second coating 8552b can have a thickness of at least about 1 μm, at least about 1.5 μm, at least about 2 μm, at least about 2.5 μm, at least about 3 μm, at least about 3.5 μm, at least about 4 μm, or at least about 4.5 μm. In some embodiments, the first coating 8552a and/or the second coating 8552b can have a thickness of no more than about 5 μm, no more than about 4.5 μm, no more than about 4 μm, no more than about 3.5 μm, no more than about 3 μm, no more than about 2.5

μm, no more than about 2 μm, or no more than about 1.5 μm. Combinations of the above-referenced thicknesses are also possible (e.g., at least about 1 μm and no more than about 5 μm or at least about 2 μm and no more than about 4 μm), inclusive of all values and ranges therebetween. In some embodiments, the first coating 8552a and/or the second coating 8552b can have a thickness of about 1 μm, about 1.5 μm, about 2 μm, about 2.5 μm, about 3 μm, about 3.5 μm, about 4 μm, about 4.5 μm, or about 5 μm.

After the electrochemical cell 8500 has been formed, the conductivity of the separators 8550 can be measured to confirm that micropores have not formed. In some embodiments, this determination can be conducted via a resistance measurement. In some embodiments, the resistance across the combination of the first separator 8550a, the interlayer 8560, and the second separator 8550b (including the first coating layer 8552a and/or the second coating layer 8552b) can be at least about 500 kΩ, at least about 600 kΩ, at least about 700 kΩ, at least about 800 kΩ, at least about 900 kΩ, at least about 1 MΩ, at least about 1.1 MΩ, at least about 1.2 MΩ, at least about 1.3 MΩ, at least about 1.4 MΩ, at least about 1.5 MΩ, at least about 1.6 MΩ, at least about 1.7 MΩ, at least about 1.8 MΩ, at least about 1.9 MΩ, at least about 2 MΩ, at least about 2.5 MΩ, at least about 3 MΩ, at least about 3.5 MΩ, at least about 4 MΩ, at least about 4.5 MΩ, or at least about 5Ω.

Figure 86:
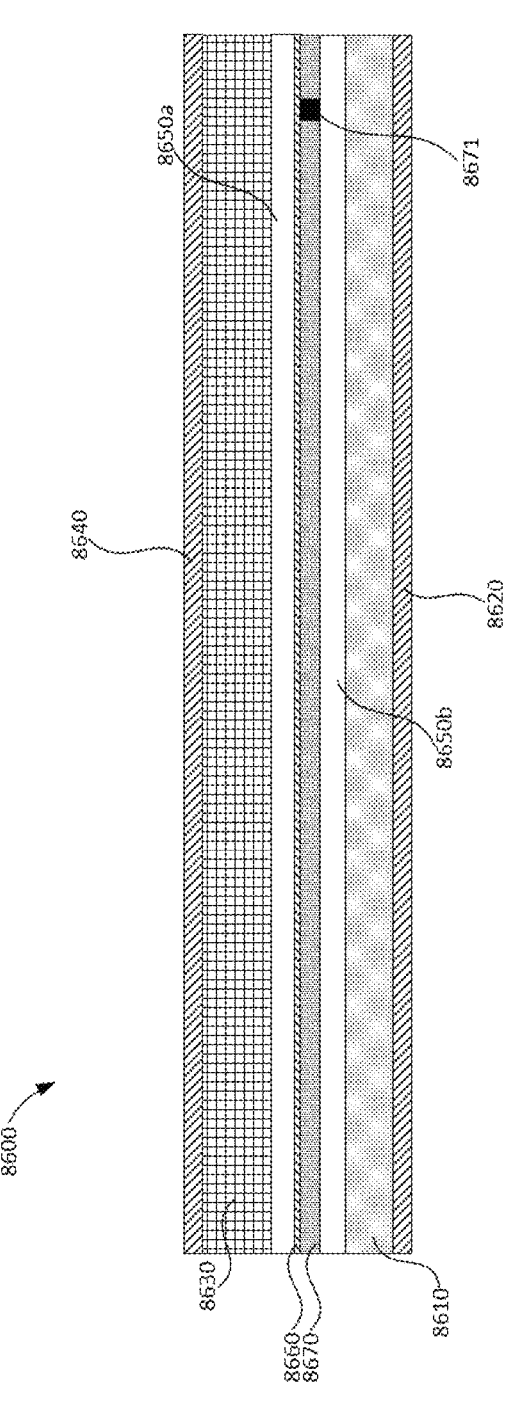
FIG. 86 is an illustration of an electrochemical cell, according to an embodiment.

FIG. 86 is an illustration of an electrochemical cell 8600, according to an embodiment. As shown, the electrochemical cell 8600 includes an anode 8610 disposed on an anode current collector 8620, a cathode 8630 disposed on a cathode current collector 8640, with a first separator 8650a, a second separator 8650b, an interlayer 8660 is disposed between the first separator 8650a and the second separator 8650b. A metal coating layer 8670 is disposed between the first separator on the interlayer 8660. As shown, the metal coating layer 8670 is disposed on the anode side of the interlayer 8660. In some embodiments, the metal coating layer 8670 can be disposed on the cathode side of the interlayer 8660. The metal coating layer 8670 includes a pinhole 8671. In some embodiments, the anode 8610, the anode current collector 8620, the cathode 8630, the cathode current collector 8640, the first separator 8650a, the second separator 8650b, and the interlayer 8660 can be the same or substantially similar to the anode 210, the anode current collector 220, the cathode 230, the cathode current collector 240, the first separator 250a, the second separator 250b, and the interlayer 260, as described above with reference to FIGS. 2A-2B. Thus, certain aspects of the anode 8610, the anode current collector 8620, the cathode 8630, the cathode current collector 8640, the first separator 8650a, the second separator 8650b, and the interlayer 8660 are not described in greater detail herein.

The metal coating layer 8670 can be coated onto the separator 8650b (or the separator 8650a) before the inter-layer 8660 is applied. The metal coating layer 8670 can prevent the risk of local zero-voltage at the interlayer 8660, as the pinhole 8671 can prevent such occurrences. In some embodiments, the metal coating layer 8670 can have a thickness of at least about 10 μm, at least about 20 μm, at least about 30 μm, at least about 40 μm, at least about 50 μm, at least about 60 μm, at least about 70 μm, at least about 80 μm, at least about 90 μm, at least about 100 μm, at least about 200 μm, at least about 300 μm, at least about 400 μm, at least about 500 μm, at least about 600 μm, at least about 700 μm, at least about 800 μm, at least about 900 μm, at least about 1 mm, at least about 1.5 mm, at least about 2 mm, at least about 2.5 mm, at least about 3 mm, at least about 3.5 mm, at least about 4 mm, or at least about 4.5 mm. In some embodiments, the metal coating layer 8670 can have a thickness of no more than about 5 mm, no more than about 4.5 mm, no more than about 4 mm, no more than about 3.5 mm, no more than about 3 mm, no more than about 2.5 mm, no more than about 2 mm, no more than about 1.5 mm, no more than about 1 mm, no more than about 900 μm, no more than about 800 μm, no more than about 700 μm, no more than about 600 μm, no more than about 500 μm, no more than about 400 μm, no more than about 300 μm, no more than about 200 μm, no more than about 100 μm, no more than about 90 μm, no more than about 80 μm, no more than about 70 μm, no more than about 60 μm, no more than about 50 μm, no more than about 40 μm, no more than about 30 μm, or no more than about 20 μm. Combinations of the above-referenced thicknesses are also possible (e.g., at least about 10 μm and no more than about 5 mm or at least about 100 μm and no more than about 600 μm), inclusive of all values and ranges therebetween. In some embodiments, the metal coating layer 8670 can have a thickness of about 10 μm, about 20 μm, about 30 μm, about 40 μm, about 50 μm, about 60 μm, about 70 μm, about 80 μm, about 90 μm, about 100 μm, about 200 μm, about 300 μm, about 400 μm, about 500 μm, about 600 μm, about 700 μm, about 800 μm, about 900 μm, about 1 mm, about 1.5 mm, about 2 mm, about 2.5 mm, about 3 mm, about 3.5 mm, about 4 mm, about 4.5 mm, or about 5 mm.

In some embodiments, the pinhole 8671 can have a width of at least about 10 μm, at least about 20 μm, at least about 30 μm, at least about 40 μm, at least about 50 μm, at least about 60 μm, at least about 70 μm, at least about 80 μm, at least about 90 μm, at least about 100 μm, at least about 200 μm, at least about 300 μm, at least about 400 μm, at least about 500 μm, at least about 600 μm, at least about 700 μm, at least about 800 μm, at least about 900 μm, at least about 1 mm, at least about 1.5 mm, at least about 2 mm, at least about 2.5 mm, at least about 3 mm, at least about 3.5 mm, at least about 4 mm, or at least about 4.5 mm. In some embodiments, the pinhole 8671 can have a width of no more than about 5 mm, no more than about 4.5 mm, no more than about 4 mm, no more than about 3.5 mm, no more than about 3 mm, no more than about 2.5 mm, no more than about 2 mm, no more than about 1.5 mm, no more than about 1 mm, no more than about 900 μm, no more than about 800 μm, no more than about 700 μm, no more than about 600 μm, no more than about 500 μm, no more than about 400 μm, no more than about 300 μm, no more than about 200 μm, no more than about 100 μm, no more than about 90 μm, no more than about 80 μm, no more than about 70 μm, no more than about 60 μm, no more than about 50 μm, no more than about 40 μm, no more than about 30 μm, or no more than about 20 μm. Combinations of the above-referenced thicknesses are also possible (e.g., at least about 10 μm and no more than about 5 mm or at least about 100 μm and no more than about 600 μm), inclusive of all values and ranges therebetween. In some embodiments, the pinhole 8671 can have a thickness of about 10 μm, about 20 μm, about 30 μm, about 40 μm, about 50 μm, about 60 μm, about 70 μm, about 80 μm, about 90 μm, about 100 μm, about 200 μm, about 300 μm, about 400 μm, about 500 μm, about 600 μm, about 700 μm, about 800 μm, about 900 μm, about 1 mm, about 1.5 mm, about 2 mm, about 2.5 mm, about 3 mm, about 3.5 mm, about 4 mm, about 4.5 mm, or about 5 mm.

EXAMPLES

Figure 87:
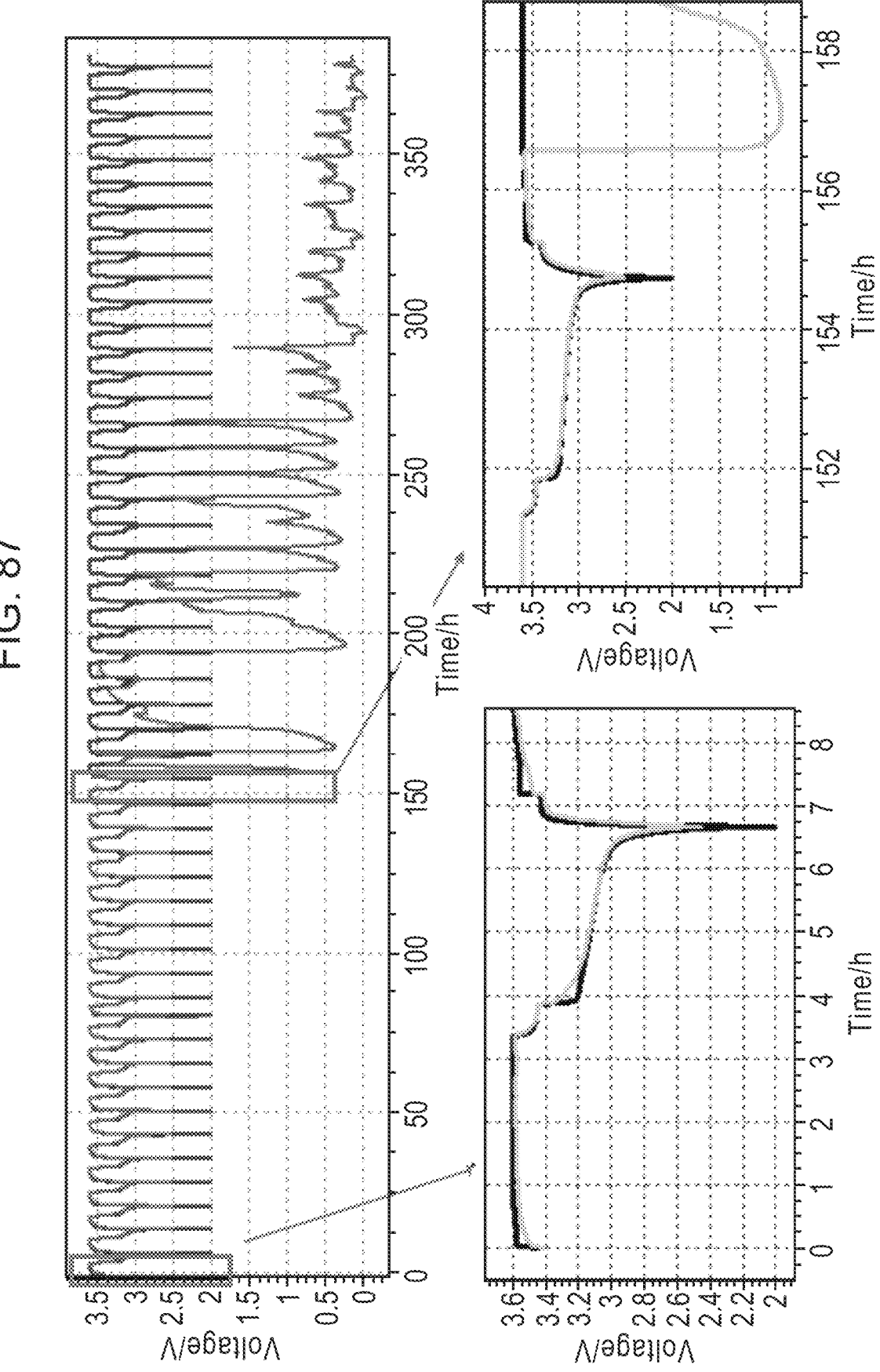
FIG. 87 is a graphic representation of a point in time when a dendrite forms and interfaces with the interlayer.

FIG. 87 is a graphic representation of monitoring of an interlayer to detect dendritic growth. The electrochemical cell cycled included a lithium metal anode with a thickness of 100 μm, a LFP cathode, a ceramic separator with a thickness of 15 μm on the cathode side, a polyethylene separator with a thickness of 7 μm on the anode side with a 5 μm hard carbon interlayer disposed between the separators. The electrochemical cell included an ether-based electrolyte. A 1 kΩ resistor was placed in a circuit with the cathode current collector and the interlayer. The electrochemical cell was charged and discharged at C/3 under high stack pressure. The green trace represents the voltage potential of an interlayer with respect to the anode. The blue curve represents the voltage of the cathode with respect to the anode. As shown, when the dendrite forms and interfaces with the interlayer (i.e., around 200 h), the voltage of the interlayer is reduced to be similar to the anode potential. In this way, the system that monitors the electrochemical cell is able to detect dendrite growth in real time.

Figure 88:
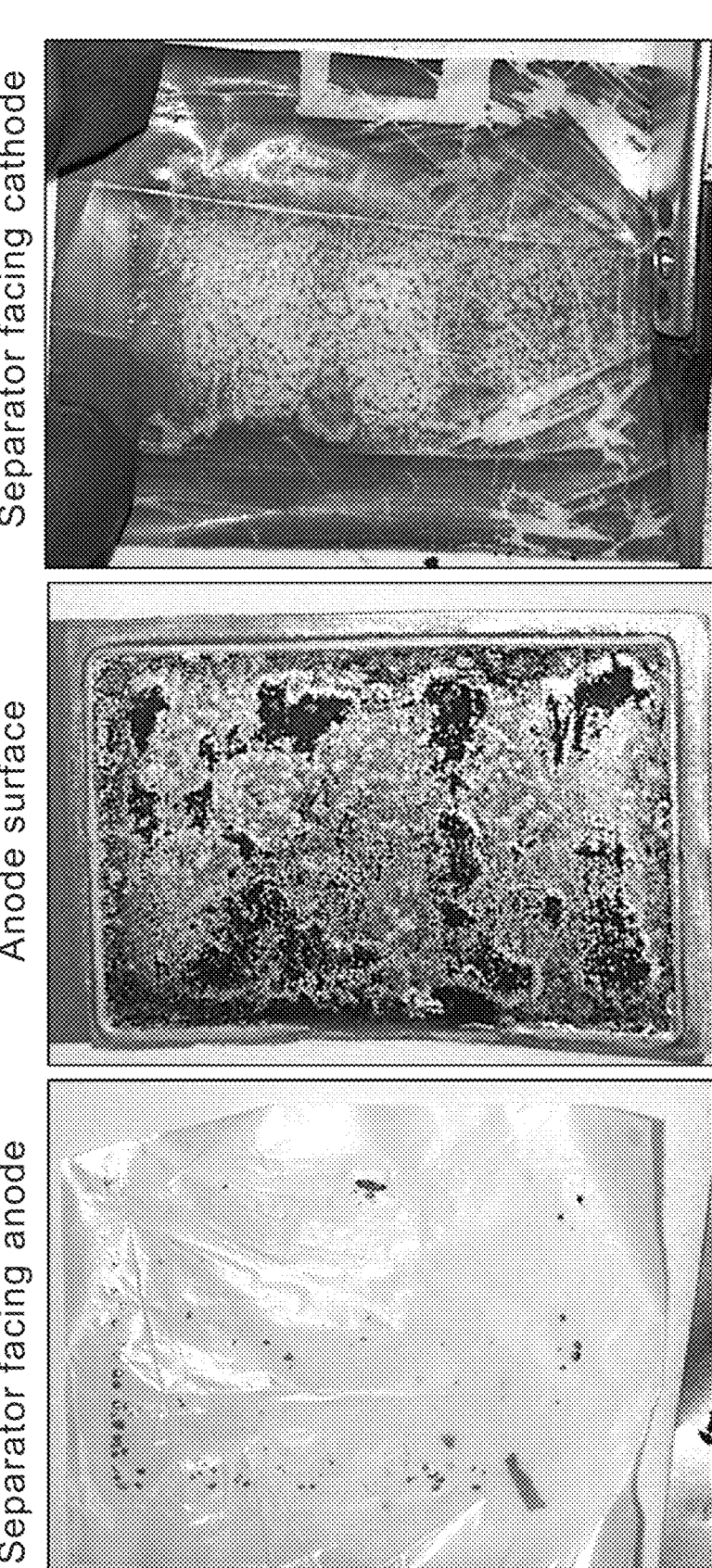
FIG. 88 is a photograph of dendritic formation at interfaces with an interlayer.
Figure 89:
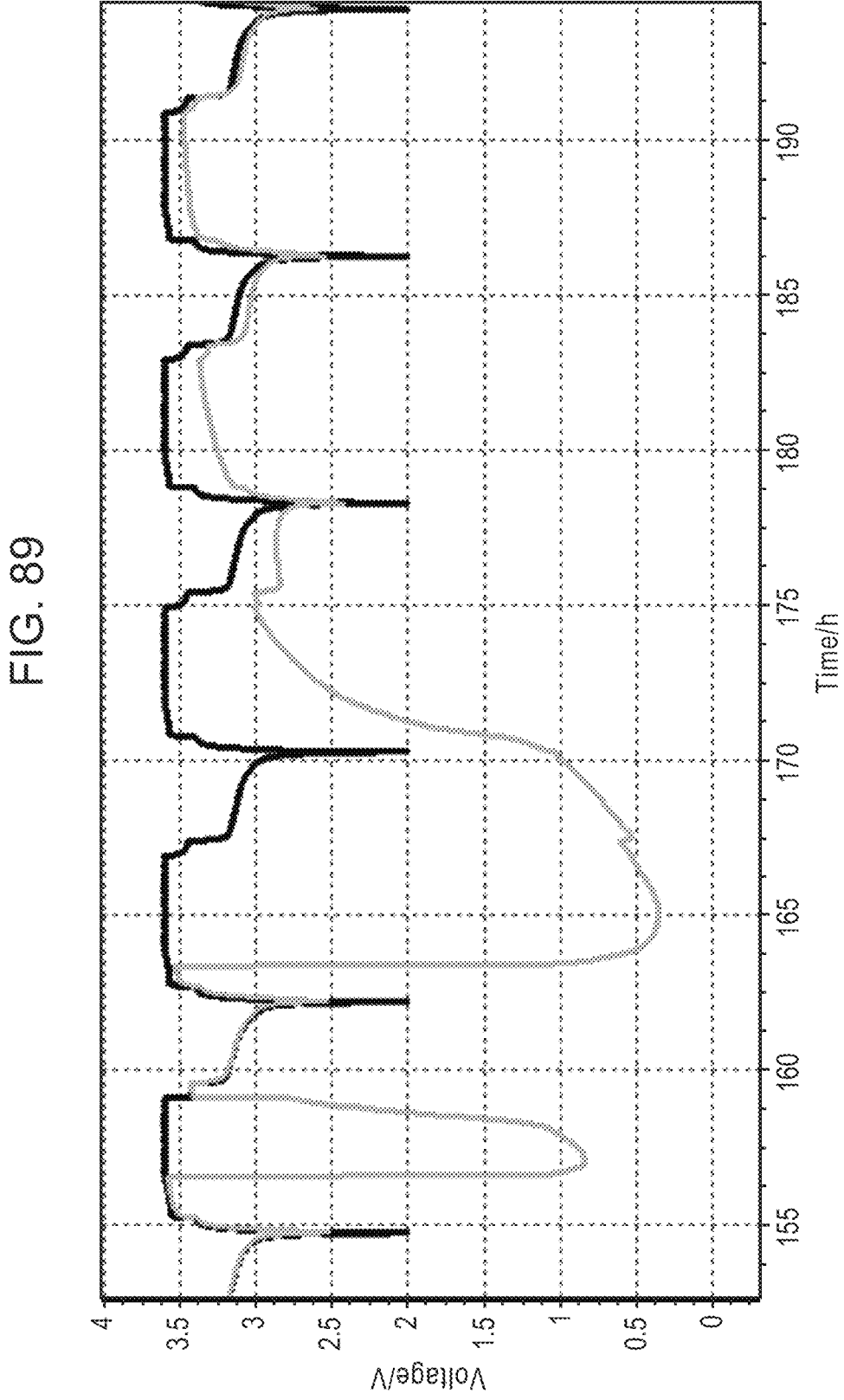
FIG. 89 is a graphic representation of an electrochemical cell with an interlayer maintained with a passive resistor.

FIG. 88 is a photograph of dendritic formation at interfaces with the interlayer described above with respect to FIG. 87. The image on the left shows a side of the separator facing the anode, the image in the center includes the anode surface, and the image on the right includes a side of the separator facing the cathode. The cell was contaminated to create dendrite growth. Control cells with this contamination fail within a few cycles. The interlayer was maintained with a passive resistor pull to the potential for the cathode and the life was greatly increased. When the cell failed, it was due to loss of capacity rather than a thermal event. FIG. 89 is a graphic representation of the point in time when the dendrite forms and interfaces with the interlayer (i.e., a close-up view of FIG. 87). The green trace represents the voltage potential of the interlayer with respect to the anode. As shown, the dendrite forms and interfaces with the interlayer (i.e., around 180 h). The voltage of the interlayer has been held up to the cathode potential with a passive resistor.

Figure 90:
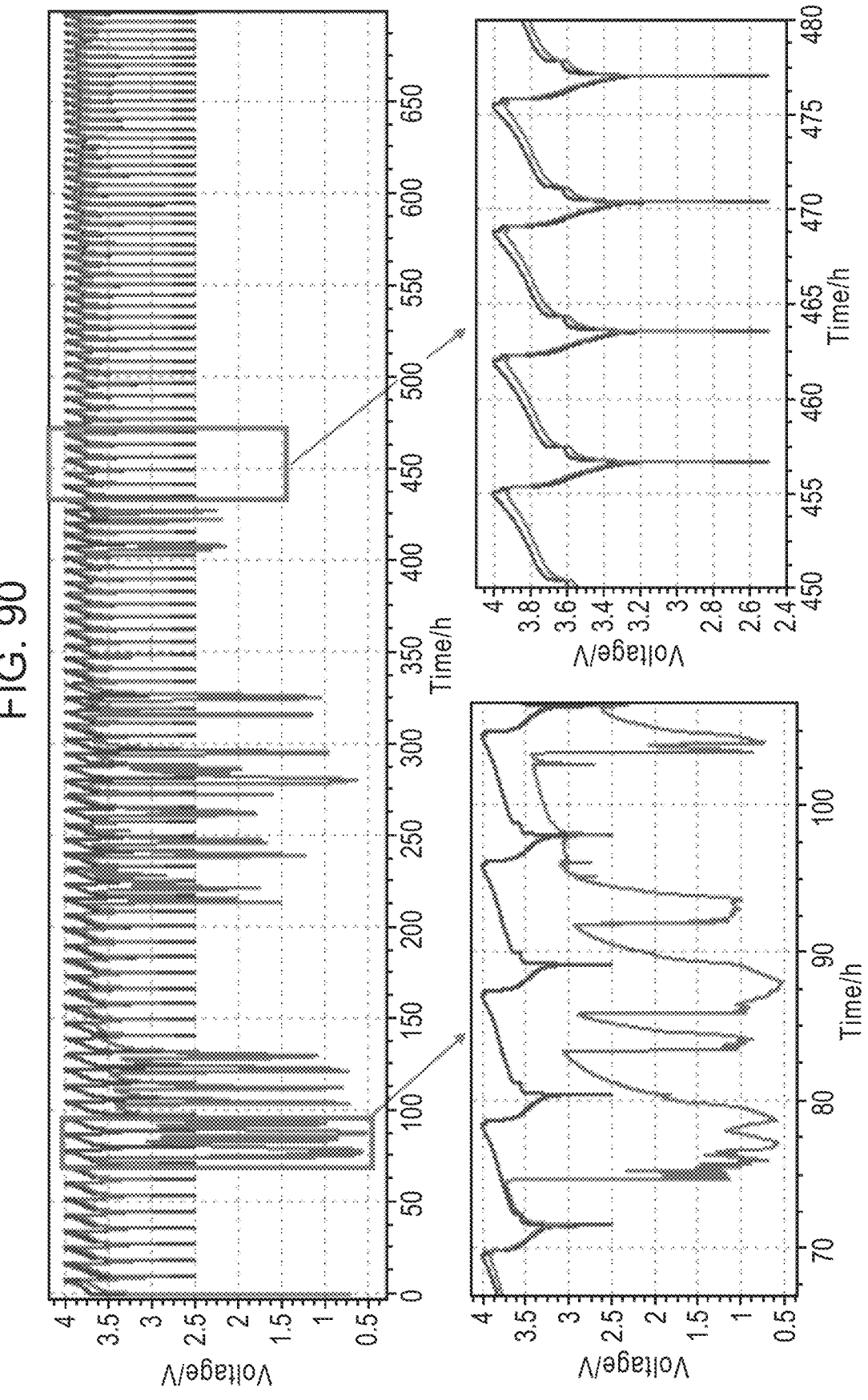
FIG. 90 a graphical representation of a prevention of a dendrite from penetrating a separator and creating a localized short circuit.

FIG. 90 a graphical representation of a prevention of a dendrite from penetrating a separator and creating a localized short circuit. The electrochemical cell cycled included no anode, a LFP cathode, a ceramic separator with a thickness of 15 μm on the cathode side, a polyethylene separator with a thickness of 7 μm on the anode side with a 5 μm hard carbon interlayer disposed between the separators. The electrochemical cell included an ether-based electrolyte. A 1 kΩ resistor was placed in a circuit with the cathode current collector and the interlayer. The electrochemical cell was charged at C/10 and discharged at C/3 under high stack pressure. The green trace represents the voltage potential of the interlayer with respect to a copper anode current collector. The blue curve represents the voltage of the cathode with respect to the copper anode current collector. As shown, when the dendrite forms and interfaces with the interlayer (i.e., around 60 h), the voltage of the interlayer increases to be similar to the cathode potential with respect to the anode current collector. The dendrite is dissolved or remediated, and the voltage potential of the interlayer returns to near the voltage potential of the cathode with respect to the anode.

Figure 91:
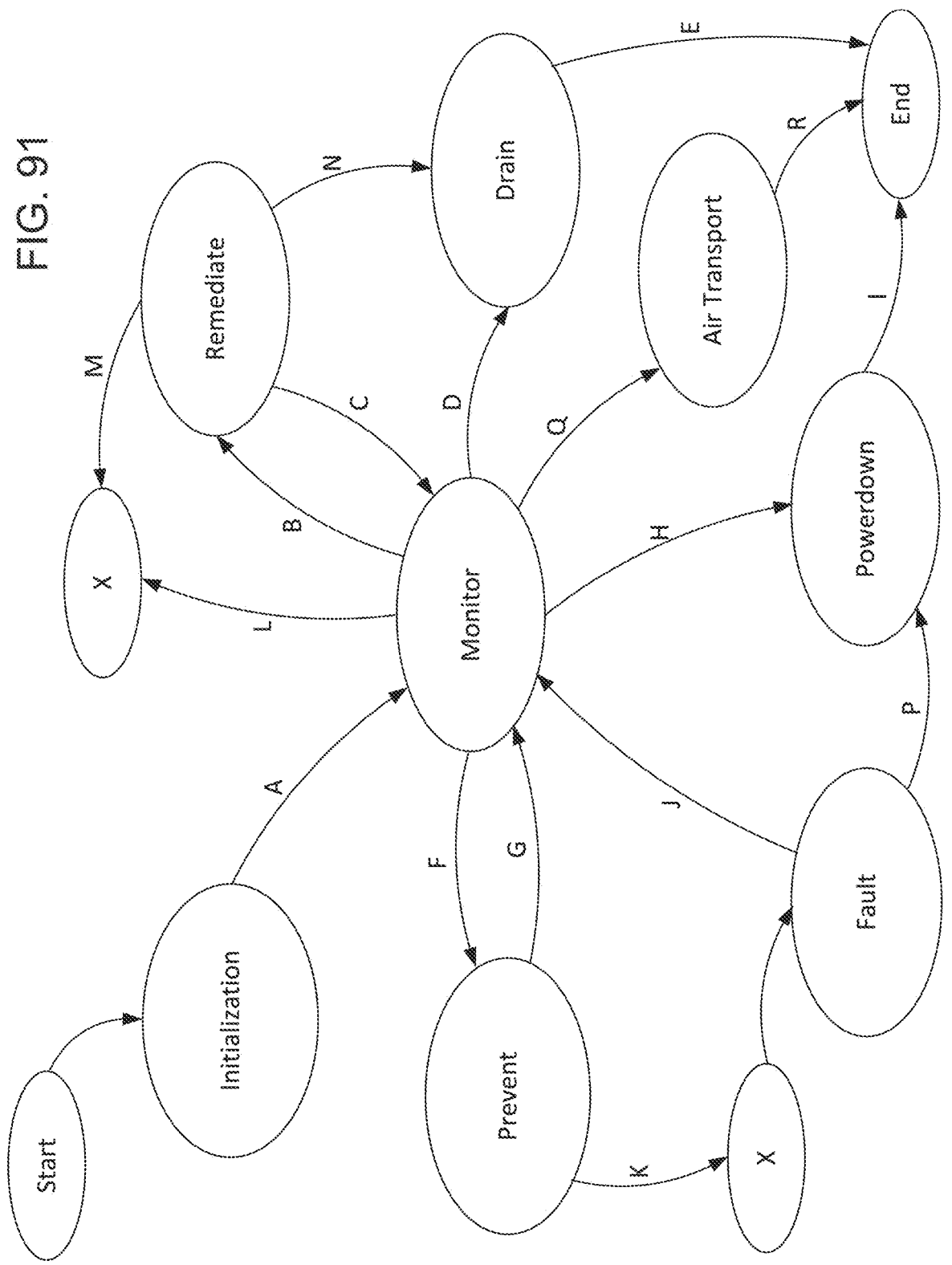
FIG. 91 is a sample control operating mode state transition diagram.

FIG. 91 is a sample control operating mode state transition diagram. Table 2 shows a sample protocol for the operating mode to follow.

TABLE 2

Summary of algorithm control modules.

| Control State | Purpose |
| --- | --- |
| Initialization | Executes once at the power-up of the BMS circuit |
| | a. Functions: |
| | I. Initialize all control signals OFF. |
| | II. Initialize all algorithm (ex: PI loop, software filter, etc.) parameters in preparation to be used in the Monitor state. |
| | b. Transitions out: |
| | I. A = (IF Initialization = COMPLETE then GOTO Monitor state) |
| Monitor | Main loop where voltages are read and Detection portion of the algorithm executes |
| | a. Functions: |
| | I. Algorithm monitors INTERLAYER(1,2)_V_SENSE for drop in voltage compared to CELL_V_SENSE. |
| | II. Controls all switch outputs based on previous state transitions. |
| | III. Communicates operating mode status, fault status, voltage sense, switch status, data collection, etc. to CAN and/or the master BMS controller. |
| | IV. Monitors for faults. |
| | b. Transitions out: |
| | I. B = (IF Detection algorithm indicates dendrite present the GOTO Remediate state) |
| | II. L = (IF fault detected then GOTO fault state) |
| | III. D = (IF remediation failed and transition to Drain state failed in Remediate state OR thermal event probable then GOTO Drain state) NOTE: This will "kill" the pack, only to be performed to protect users and property. |
| | IV. H = (IF BMS master controller commands powerdown then GOTO Powerdown state) |
| | V. F = (IF Detection indicates no dendrite growth and algorithm allows, then GOTO Prevention state) |
| | VI. R = (IF SW4_AIR_TRANSPORT_EN = TRUE then GOTO Air Transport state) |
| Remediate | Voltages are read and Remediation portion of algorithm executes |
| | a. Functions: |
| | I. Set SW2_PREVENT(1)_EN = OFF. |
| | II. Control SW2_PU_REMEDIATE(1)_EN (SW3_PD_REMEDIATE(1)_EN control is TBD) per algorithm. |
| | III. Algorithm monitors INTERLAYER(1,2)_V_SENSE for recovery rise (indicates dendrite removed) in voltage compared to CELL_V_SENSE. |
| | IV. Communicates operating mode status, fault status, voltage sense, switch status, data collection, etc. to CAN and/or the master BMS controller. |
| | V. Monitors for faults. |
| | b. Transitions out: |
| | I. C = (IF Remediate algorithm indicates no dendrites present then GOTO Monitor state) |
| | II. M = (IF fault detected then GOTO fault state) |
| | III. N = (IF dendrite remediation fails AND thermal event probable then GOTO Drain state) NOTE: This will "kill" the pack, only to be performed to protect users and property. |

TABLE 2-continued

Summary of algorithm control modules.

| Control State | Purpose |
| --- | --- |
| Drain | Discharges a parallel cell stack to ~0 V to prevent thermal event - only used to protect the users and property. |
| | a. Functions: |
| | I. Set SW2_PU_REMEDIATE(1)_EN, SW3_PD_REMEDIATE(1)_EN, SW2_PREVENT(1)_EN = OFF. |
| | II. Set SW1_DRAIN_EN = ON and monitor CELL_V_SENSE for ~0 V. |
| | III. Communicates operating mode status, fault status, voltage sense, switch status, data collection, etc. to CAN and/or the master BMS controller. |
| | b. Transitions out: |
| | I. E = (IF CELL_V_SENSE = ~0 V then GOTO End) – TBD what effect this will have at the module/pack level . . . will the BMS still be functional/powered? |
| Powerdown | Commanded by the BMS master controller that the BMS is powering down |
| | a. Functions: |
| | I. Set SW2_PU_REMEDIATE(1)_EN, SW3_PD_REMEDIATE(1)_EN, SW2_PREVENT(1)_EN, SW1_DRAIN_EN = OFF. |
| | II. Communicates operating mode status, fault status, voltage sense, switch status, data collection, etc. to CAN and/or the master BMS controller. |
| | III. Store any pertinent data to EEPROM. |
| | b. Transitions out: |
| | I. I = (IF all powerdown functions complete then GOTO End) |
| Fault | State entered if a fault was detected by control system |
| | a. Functions: |
| | I. Set SW2_PU_REMEDIATE(1)_EN, SW3_PD_REMEDIATE(1)_EN, SW2_PREVENT(1)_EN, SW1_DRAIN_EN = OFF. |
| | II. Communicates operating mode status, fault status, voltage sense, switch status, data collection, etc. to CAN and/or the master BMS controller. |
| | III. Check fault status for any faults in the FAILED state (fault maturation). Some faults may be latched for the entire power cycle, some may be allowed to self-clear if the fault condition de-matures (transitions to PASS). |
| | b. Transitions out: |
| | I. J = (IF fault self-clearing fault conditions all = PASS then GOTO Monitor state) |
| | II. P = (IF any latched faults are FAILED then GOTO Powerdown state) |
| Prevent | Voltages are read and Prevent portion of algorithm execute. This mode is intended to be executed at certain intervals to allow a small potential of current flow the cathode to the interlayer to prevent dendrites from forming. |
| | a. Functions: |
| | I. Set SW2_PREVENT(1)_EN = ON. |
| | II. Set SW2_PU_REMEDIATE(1)_EN, SW3_PD_REMEDIATE(1)_EN = OFF. |
| | III. Algorithm monitors INTERLAYER(1,2)_V_SENSE for abnormal imbalance in voltage compared to CELL_V_SENSE. |

TABLE 2-continued

Summary of algorithm control modules.

| Control State | Purpose |
| --- | --- |
| | IV. Communicates operating mode status, fault status, voltage sense, switch status, data collection, etc. to CAN and/or the master BMS controller. |
| | V. Monitors for faults. |
| | b. Transitions out: |
| | I. G = (IF algorithm indicates dendrites present OR Prevent is no longer needed then GOTO Monitor state) |
| | II. K = (IF fault detected then GOTO fault state) |
| Air Transport | User commanded via pushbutton or a user interface on the module or pack. This mode will perform same function as Drain state - but exit when the module SOC achieves ≤15%. |
| | a. Functions: |
| | II. Set SW2_PU_REMEDIATE(1)_EN, SW3_PD_REMEDIATE(1)_EN, SW2_PREVENT(1)_EN = OFF. |
| | III. Set SW1_DRAIN_EN = ON. |
| | b. Transitions out: |
| | I. R = (IF module SOC <= 15% then GOTO End) |

Figure 92:
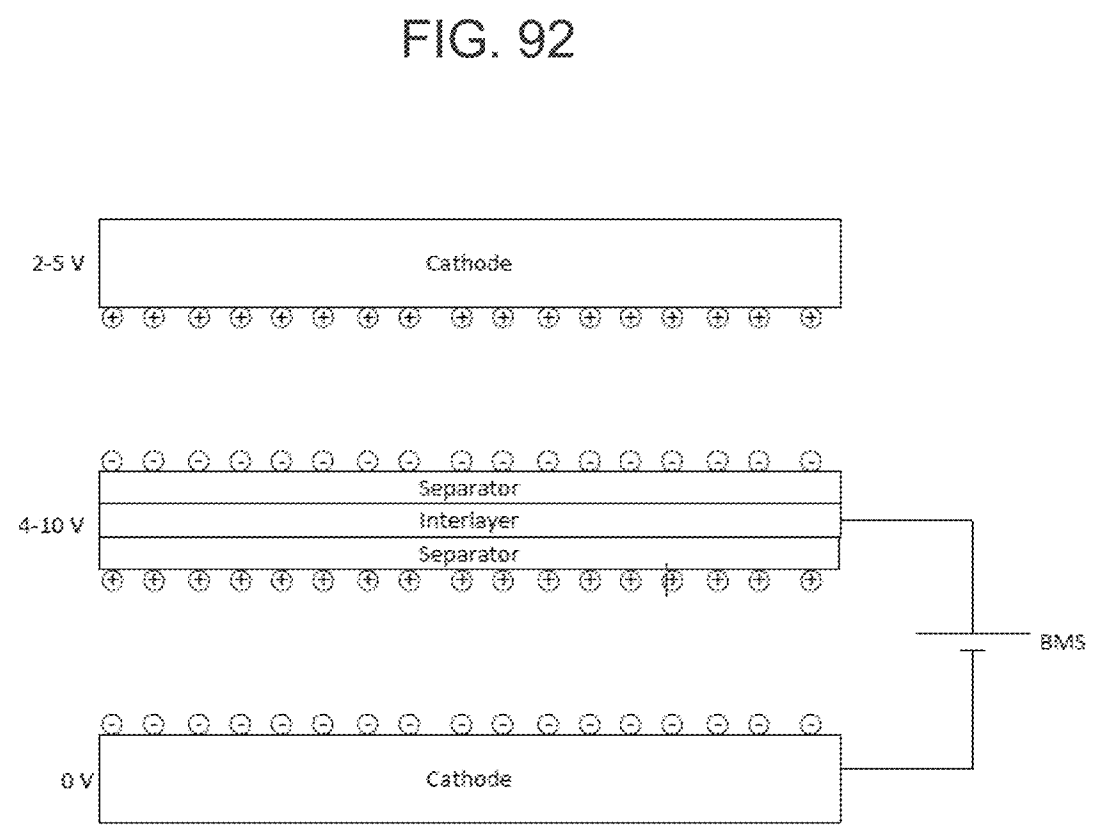

FIG. 92 is an illustration of the formation of a dual ion system. With a potential applied to an interlayer that is higher than that applied to a cathode, a dual ion system is formed. By holding a voltage in the interlayer that is higher than the voltage of the cathode, cations (e.g., $Li^+$ ions) are concentrated at the cathode and anion surface, while anions are concentrated near the separator and/or the interlayer. Upon charging and/or discharging, there is little or no ion flux through the interlayer and the separators. However, intercalation and/or lithiation at the cathode and anode is through the local concentrated cation. In some cases, anions (e/g/. $AlCl_4^-$ and/or $PF_6^-$) can also intercalate to the interlayer. Thus, metal migration from the cathode is blocked, which reduces the risk of dendrite formation via metal contamination or metal dissolution. The electrolyte system included can include lithium salt (e.g., $LiPF_6$, LiFSI, LiTFSI, $LiBF_4$, LiBCN, and/or LiTCB, and solvents, including cyclic carbonates, linear carbonates, and/or ether.

Figure 93:
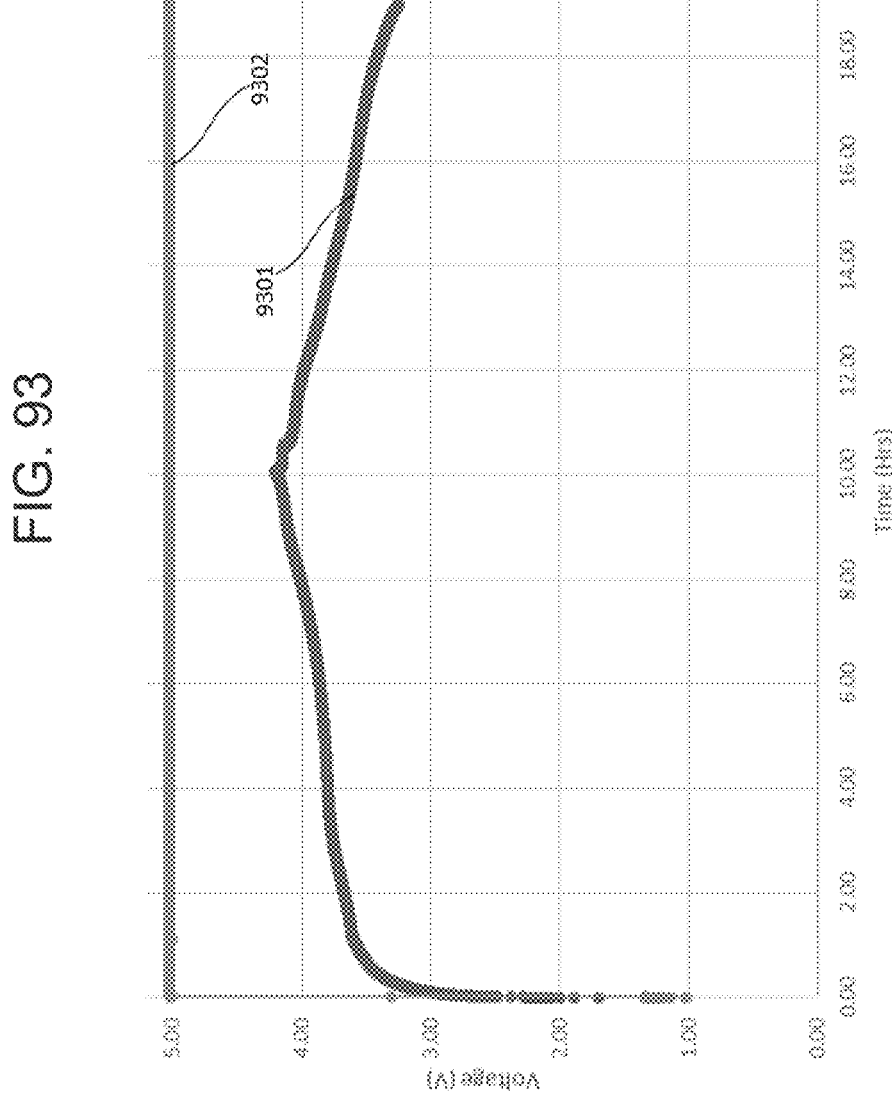
FIG. 93 is a graphical representation of a cell voltage and an interlayer voltage.

FIG. 93 is a graphical representation of a cell voltage 9301 as compared to an interlayer voltage 9302 when an external voltage is applied to the interlayer. In such an application, the electrochemical cell can complete the formation of the dual ion system through normal initial cycling.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure. Where methods and steps described above indicate certain events occurring in a certain order, those of ordinary skill in the art having the benefit of this disclosure would recognize that the ordering of certain steps may be modified and such modification are in accordance with the variations of the invention. Additionally, certain of the steps may be performed concurrently in a parallel process when possible, as well as performed sequentially as described above. The embodiments have been particularly shown and described, but it will be understood that various changes in form and details may be made.

The invention claimed is:

1. An electrochemical cell, comprising:
a first electrode;
a second electrode;
a first separator disposed on the first electrode; and
a second separator disposed on the second electrode, the second separator including an electrically conductive material;
wherein the first electrode, the second electrode, the first separator, and the second separator are formed in a rolled structure, the second separator forming an outer surface of the rolled structure, a portion of the electrically conductive material exposed on the outer surface.

2. The electrochemical cell of claim 1, wherein the electrically conductive material is disposed on the second separator.

3. The electrochemical cell of claim 1, wherein the first electrode includes an anode and the second electrode includes a cathode.

4. The electrochemical cell of claim 1, wherein the electrically conductive material includes at least one of activated carbon, hard carbon, soft carbon, conductive carbon particles, carbon black, graphitic carbon, carbon fibers, carbon microfibers, vapor-grown carbon fibers (VGCF), fullerenic carbons including "buckyballs", carbon nanotubes (CNTs), multiwall carbon nanotubes (MWNTs), single wall carbon nanotubes (SWNTs), graphene, graphene sheets or aggregates of graphene sheets, or materials comprising fullerenic fragments.

5. The electrochemical cell of claim 1, wherein the second separator extends beyond the first separator on the outer surface of the rolled structure by an extension distance.

6. The electrochemical cell of claim 5, wherein the extension distance is between about 100 pm and about 2 mm.

7. The electrochemical cell of claim 1, further comprising:
a casing configured to house the rolled structure.

8. The electrochemical cell of claim 7, wherein the exposed portion of the electrically conductive material contacts the casing.

9. The electrochemical cell of claim 7, further comprising a tab coupled to the electrically conductive material and extending to a region external to the casing.

10. The electrochemical cell of claim 9, wherein the tab includes an electrically conductive polymer.

11. An electrochemical cell, comprising:
an anode current collector;
a first anode material disposed on a first side of the anode current collector;
a second anode material disposed on a second side of the anode current collector, the second side opposite the first side;
a first separator assembly disposed on the first anode material, the first separator assembly including a first electrically conductive interlayer disposed between a first separator and a second separator;
a second separator assembly disposed on the second anode material, the second separator assembly including a second electrically conductive interlayer disposed between a third separator and a fourth separator;
a cathode material disposed on the first separator; and
a cathode current collector coupled to the cathode material.

12. The electrochemical cell of claim 11, wherein at least one of the first separator, the second separator, the third separator, or the fourth separator includes at least one of polyvinylidene fluoride (PVDF), styrene-butadiene (SBR), carboxymethyl cellulose (CMC), polyethylene oxides (PEO), polytetrafluoroethylene (PTFE), perfluoroalkoxy alkanes (PF A), 162 polyacrylonitrile (PAN), poly (acrylic acid) PAA, Poly Olefin, polysulfone (PES), polyethylene terephthalate (PET), polyphenylene sulfide (PPS), polybenzimidazole (PBI), polyamide-imides (PAI), polyimide (PI), polyether ether ketone (PEEK), ultraviolet (UV) curable resin, urethane/epoxy acrylate, A1203, boehmite, MgO, Al(OH)3, or ZrO2.

13. The electrochemical cell of claim 11, wherein the first separator assembly extends beyond the second separator assembly by an extension distance.

14. The electrochemical cell of claim 11, wherein at least one of the first electrically conductive interlayer or the second electrically conductive interlayer includes at least one of activated carbon, hard carbon, soft carbon, conductive carbon particles, carbon black, graphitic carbon, carbon fibers, carbon microfibers, vapor-grown carbon fibers (VGCF), fullerenic carbons including "bucky balls", carbon nanotubes (CNTs), multiwall carbon nanotubes (MWNTs), single wall carbon nanotubes (SWNTs), graphene, graphene sheets or aggregates of graphene sheets, or materials comprising fullerenic fragments.

15. The electrochemical cell of claim 11, wherein the cathode material includes at least one of LFP, LNO, or NMC.

16. The electrochemical cell of claim 11, wherein the second electrically conductive interlayer is electrically coupled to the first electrically conductive interlayer.

17. The electrochemical cell of claim 11, wherein the second electrically conductive interlayer is in physical contact with the first electrically conductive interlayer.

18. The electrochemical cell of claim 11, wherein at least one of the first electrically conductive interlayer or the second electrically conductive interlayer includes Li(ix) NMC and x is between 0 and 1.

19. The electrochemical cell of claim 11, wherein at least one of the first anode material or the second anode material includes at least one of graphite, lithium metal, or silicon.

20. An electrochemical cell, comprising:
an anode;
a first separator assembly disposed on a first side of the anode, the first separator assembly including a first separator, second separator, and a first electrically conductive material, the first separator assembly having a first length;
a cathode disposed on the first separator assembly; and
a second separator assembly disposed on a second side of the anode, the second separator assembly including a third separator, a fourth separator, and a second electrically conductive material, the second separator assembly having a second length longer than the first length.

21. The electrochemical cell of claim 20, wherein the electrochemical cell is wound in a rolled configuration such that a leading edge of the second separator assembly extends beyond a leading edge of the first separator assembly.

22. The electrochemical cell of claim 20, wherein at least one of the first separator, the second separator, the third separator, or the fourth separator includes at least one of polyvinylidene fluoride (PVDF), styrene-butadiene (SBR), carboxymethyl cellulose (CMC), polyethylene oxides (PEO), polytetrafluoroethylene (PTFE), perfluoroalkoxy alkanes (PF A), polyacrylonitrile (PAN), poly (acrylic acid) PAA, Poly Olefin, polysulfone (PES), polyethylene terephthalate (PET), polyphenylene sulfide (PPS), polybenzimidazole (PBI), polyamide-imides (PAI), polyimide (PI), polyether ether ketone (PEEK), ultraviolet (UV) curable resin, urethane/epoxy acrylate, A1203, boehmite, MgO, Al(OH)3, or ZrO2.

23. The electrochemical cell of claim 20, wherein at least one of the first electrically conductive material or the second electrically conductive material includes at least one of activated carbon, hard carbon, soft carbon, conductive carbon particles, carbon black, graphitic carbon, carbon fibers, carbon microfibers, vapor-grown carbon fibers (VGCF), fullerenic carbons including "buckyballs", carbon nanotubes (CNTs), multiwall carbon nanotubes (MWNTs), single wall carbon nanotubes (SWNTs), graphene, graphene sheets or aggregates of graphene sheets, or materials comprising fullerenic fragments.

24. The electrochemical cell of claim 20, wherein the first electrically conductive material is electrically coupled to the second electrically conductive material.

25. The electrochemical cell of claim 20, wherein the anode includes a first anode material disposed on a first side of an anode current collector and a second anode material disposed on a second side of the anode current collector, the second side opposite the first side.

26. The electrochemical cell of claim 25, wherein at least one of the first anode material or the second anode material includes at least one of graphite, lithium metal, or silicon.

27. A method of forming an electrochemical cell, comprising:
rolling a cathode around a central axis;
rolling a first separator assembly around the central axis, such that the first separator assembly is disposed on the cathode, the first separator assembly including a first electrically conductive interlayer disposed between a first separator and a second separator;
rolling an anode around the central axis, such that the anode is disposed on the first separator assembly; and
rolling a second separator assembly around the central axis to form the electrochemical cell, such that the second separator assembly is disposed on the anode, the second separator assembly including a second electrically conductive interlayer disposed between a third separator and a fourth separator.

28. The method of claim 27, wherein the second separator assembly extends beyond the first separator assembly.

29. The method of claim 27, wherein a portion of the second electrically conductive interlayer is exposed on an outside surface of the electrochemical cell.

30. The method of claim 27, wherein at least one of the first electrically conductive interlayer or the second electrically conductive interlayer includes at least one of activated carbon, hard carbon, soft carbon, conductive carbon particles, carbon black, graphitic carbon, carbon fibers, carbon microfibers, vapor-grown carbon fibers (VGCF), fullerenic carbons including "buckyballs", carbon nanotubes (CNTs), multiwall carbon nanotubes (MWNTs), single wall carbon nanotubes (SWNTs), graphene, graphene sheets or aggregates of graphene sheets, or materials comprising fullerenic fragments.

* * * * *